US006224787B1

(12) United States Patent
Hanna et al.

(10) Patent No.: US 6,224,787 B1
(45) Date of Patent: May 1, 2001

(54) LIQUID CRYSTALLINE CHARGE TRANSPORT MATERIAL

(75) Inventors: Junichi Hanna; Kyoko Kogo, both of Shinjuku-ku (JP); Komei Kafuku, Las Vegas, NV (US)

(73) Assignee: Dai Nippon Printing Co., Ltd. (JP)

( * ) Notice: Subject to any disclaimer, the term of this patent is extended or adjusted under 35 U.S.C. 154(b) by 0 days.

(21) Appl. No.: 09/035,937

(22) Filed: Mar. 6, 1998

(30) Foreign Application Priority Data

Mar. 10, 1997 (JP) .................................................. 9-070870

(51) Int. Cl.[7] ......................... C09K 19/58; C09K 19/54; C09K 19/00; G03G 15/02; G02F 1/03

(52) U.S. Cl. ................................ 252/299.3; 252/299.01; 428/1.1; 430/58; 359/257

(58) Field of Search ........................ 430/58; 252/299.01, 252/299.3; 428/1.1; 359/257

(56) References Cited

U.S. PATENT DOCUMENTS

| | | | | |
|---|---|---|---|---|
| 4,891,293 | * | 1/1990 | Sacripante et al. | 430/109 |
| 5,072,262 | * | 12/1991 | Uekita et al. | 357/6 |
| 5,429,770 | * | 7/1995 | Closs et al. | 252/299.61 |
| 5,646,050 | * | 7/1997 | Li et al. | 437/4 |
| 5,670,791 | * | 9/1997 | Halls et al. | 257/40 |
| 5,736,068 | * | 4/1998 | Hauessling et al. | 252/299.62 |
| 5,741,921 | * | 4/1998 | Kreuder et al. | 556/406 |
| 5,766,510 | * | 6/1998 | Hanna et al. | 252/299.62 |
| 5,853,906 | * | 12/1998 | Hsieh | 428/690 |

FOREIGN PATENT DOCUMENTS

| | | |
|---|---|---|
| 44 22 332 A1 | 1/1996 | (DE) . |
| 44 29 597 A1 | 2/1996 | (DE) . |
| 0 364 185 A2 | 4/1990 | (EP) . |
| 0 763 532 A2 | 3/1997 | (EP) . |
| 0 860 417 A2 | 8/1998 | (EP) . |

* cited by examiner

*Primary Examiner*—C. H. Kelly
(74) *Attorney, Agent, or Firm*—Parkhurst & Wendel, L.L.P

(57) ABSTRACT

A novel liquid crystalline charge transport material is provided which simultaneously has advantages of an amorphous material, that is, evenness in a large area, and advantages of a crystalline material having molecular alignment, is excellent in high-quality charge transport capability, film forming properties, various types of durability and the like, and permits the alignment to be regulated by external stimulation. The liquid crystalline charge transport material has smectic liquid crystallinity and an electron mobility of not less than $1\times10^{-5}$ cm$^2$/v.s.

11 Claims, 5 Drawing Sheets

LIQUID CRYSTALLINE CHARGE TRANSPORT MATERIAL

FIELD OF THE INVENTION

The present invention relates to a liquid crystalline charge (carrier) transport material, and more particularly to an organic material having liquid crystallinity and hole and/or electron charge transport capability and various elements and devices using the organic material.

BACKGROUND OF THE INVENTION

Materials, wherein a charge transport molecule which serves as a charge transport site are dissolved or dispersed in a matrix material, such as a polycarbonate resin, or materials, wherein a charge transport molecule structure pendent as a pendant from a polymer backbone, such as polyvinyl carbazole, are known in the art. These materials have been extensively used as materials for photoconductors in copying machines, printers and the like.

For the above conventional charge transport materials, in the case of dispersive charge transport materials, that the charge transport molecule has high solubility in the polymer as a matrix is preferred from the viewpoint of improving the charge transport capability. In fact, however, bringing the charge transport molecule to a high concentration in the matrix leads to crystallization of the charge transport molecule in the matrix, and, for this reason, the upper limit of the concentration of the charge transport molecule is generally 20 to 50% by weight although it varies depending upon the kind of the charge transport molecule. This means that the matrix not having charge transport capability occupies not less than 50% by weight of the whole material. This in turn raises a new problem that the charge transport capability and response speed of a film formed from the material are limited by the excess matrix present in the material.

On the other hand, in the case of the pendant type charge transport polymer, the proportion of the pendant having charge transport capability can be increased. This polymer, however, involves many practical problems associated with mechanical strength, environmental stability and durability of the formed film, film-forming properties and the like. In this type of charge transport material, the charge transport pendants are locally located in close proximity, and the local proximity portion serves as a stable site in hopping of charges and functions as a kind of trap, unfavorably resulting in lowered charge mobility.

For all the above charge transport materials, electrical properties of such amorphous materials raise a problem that, unlike crystalline materials, the hopping site fluctuates in terms of space, as well as in terms of energy. For this reason, the charge transport depends greatly upon the concentration of the charge transport site, and the mobility is generally about $1\times10^{-6}$ to $1\times10^{-5}$ cm$^2$/v.s which is much smaller than that of molecular crystal, 0.1 to 1 cm$^2$/v.s. Further, the amorphous materials have an additional problem that the charge transport properties depend greatly upon temperature and field strength. This is greatly different from the crystalline charge transport materials.

A polycrystalline charge transport material is a promising material in applications where a charge transport layer having a large area is necessary, because it can form an even charge transport film having a large area. The polycrystalline material, however, is inherently uneven from the microscopic viewpoint and involves a problem that a defect formed in the interface of particles should be inhibited.

Accordingly, the present invention aims to solve the above problems of the prior art and to provide a novel charge transport material which simultaneously realizes advantages of the amorphous materials, that is, structural flexibility and evenness in a large area, and advantages of the crystalline materials having molecular alignment and is excellent in high-quality charge transport capability, thin film-forming properties, various types of durability and the like.

According to the material of the present invention, the anisotropy of the charge mobility derived from the molecular alignment can be expected and is structurally flexible, permitting the alignment to be regulated by external stimulation. Materials useful as the charge transport material are not less than 1×10–5 cm$^2$/v.s in terms of the carrier mobility. When the carrier mobility is less than $1\times10^{-5}$ cm$^2$/v.s, no high-speed response can be expected.

DISCLOSURE OF INVENTION

The above object of the present invention can be attained by the following present invention. Specifically, according to the present invention, there is provided a liquid crystalline charge transport material which exhibits smectic liquid crystallinity and has an electron mobility of not less than $1\times10^{-5}$ cm$^2$/v.s.

Liquid crystalline molecules, by virtue of the molecular structure, have a self-aligning property, and use thereof as a hopping site, unlike the above molecule dispersed material, inhibits spatial and energetic dispersion and can realize a band-like transport property such as found in molecular crystals. This results in the development of a feature that larger mobility than that in the conventional molecule dispersed materials can be realized and the mobility does not depend upon an electric field.

BEST MODE FOR CARRYING OUT THE INVENTION

Figure 1:
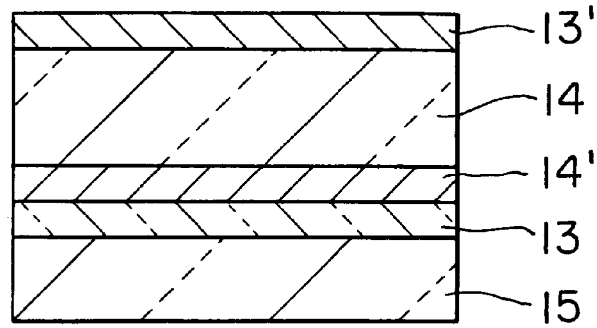
FIG. 1 is a typical diagram showing an image display device.

The present invention will be described in more detail with reference to the following preferred embodiments.

The liquid crystalline charge transport materials of the present invention will be described. Preferred charge transport materials include those which satisfy the above requirements and have a core of (aromatic ring of 6π electron system) 1, (aromatic ring of 10π electron system) m, and (aromatic ring of 14π electron system) n (wherein 1+m+n =1 to 4 and 1, m, and n are an integer of 0 to 4) and, at the same time, liquid crystallinity and those which satisfy the above requirements and wherein the aromatic ring of 6π electron system, 10π electron system or 14π electron system is linked through a group having a carbon-carbon double bond or a carbon-carbon triple bond. The number of links of the aromatic rings is limited from the viewpoint of the mobility. Aromatic rings of 6π electron system include, for example, a benzene ring, a pyridine ring, a pyrimidine ring, a pyridazine ring, a pyrazine ring, and a tropolone ring. Aromatic rings of 10π electron system include, for example, a naphthalene ring, an azulene ring, a benzofuran ring, an indole ring, an indazole ring, a benzothiazole ring, a benzoxazole ring, a benzoimidazole ring, a quinoline ring, an isoquinoline ring, a quinazoline ring, and a quinoxaline ring. Aromatic rings of 14π electron system include, for example, a phenanthrene ring and an anthracene ring.

TABLE 1

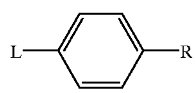

| L | R | Cr | | LC |
|---|---|---|---|---|
| $C_5H_{11}$— | —CO—NH—NH—CO—$CH_2$—CN | K 142 | S 215 | |
| $C_6H_{13}$— | —CO—NH—NH—CO—$CH_2$—CN | K 142 | S 215 | |
| $C_7H_{15}$— | —CO—NH—NH—CO—$CH_2$—CN | K 142 | S 215 | |
| $C_8H_{17}$— | —CO—NH—NH—CO—$CH_2$—CN | K 142 | S 215 | |
| $C_4H_9$—O— | —CO—NH—NH—CO—$CH_2$—CN | K 142 | S 215 | |
| $C_5H_{11}$—O— | —CO—NH—NH—CO—$CH_2$—CN | K 142 | S 215 | |
| $C_6H_{13}$—O— | —CO—NH—NH—CO—$CH_2$—CN | K 142 | S 2151 | |
| $C_7H_{15}$—O— | —CO—NH—NH—CO—$CH_2$—CN | K 142 | S 2151 | |
| $C_8H_{17}$—O— | —CO—NH—NH—CO—$CH_2$—CN | K 142 | S 2151 | |
| $C_9H_9$—O— | —CH═CH—CO—NH—NH—CO—$CH_2$—CN | K 142 | S 2151 | |
| $C_6H_{13}$—O— | —NH—$CH_3$CH—CO—$C_6H_{13}$ | K 68.9 | E 68.8 | A 73.3 |
| $CF_3$— | —COO—$C_2H_4$—$C_{10}F_{21}$ | K 62.0 | A 41.0 | |

TABLE 2

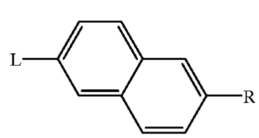

| L | R | | Cr | | | LC | | |
|---|---|---|---|---|---|---|---|---|
| $C_{10}H_{21}$—O— | —COO—$C_3H_6$—$SlMe_2C_4H_9$ | | K 1 | | | | A 27 | 1 |
| $C_{10}H_{21}$—O— | —$C_4H_8$—CHMe—O—$C_3H_7$ | 1 | K ? | S 20 | S 21 | C* 31 | A 37 | U |
| $C_{10}H_{21}$—O— | —$C_3H_6$—CHMe—O—$C_3H_7$ | | K 19.0 | X 35.0 | | | | |

TABLE 3

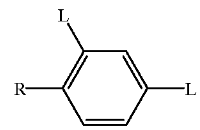

| LCReg | L | R | Phases | |
|---|---|---|---|---|
| 41103 | $C_9H_{19}$—CONH— | —$CH_3$ | Cr 132.0 | X 162.0 |
| 41104 | $C_{10}H_{21}$—CONH— | —$CH_3$ | Cr 145.0 | X 159.0 |
| 41105 | $C_{11}H_{23}$—CONH— | —$CH_3$ | Cr 133.0 | X 159.0 |
| 41106 | $C_{13}H_{27}$—CONH— | —$CH_3$ | Cr 145.0 | X 152.0 |
| 41107 | $C_{15}H_{31}$—CONH— | —$CH_3$ | Cr 139.0 | X 148.0 |
| 41108 | $C_{17}H_{35}$—CONH— | —$CH_3$ | Cr 138.0 | X 144.0 |

TABLE 4

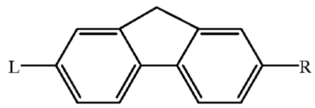

| LCReg | L | R | Phases | | | |
|---|---|---|---|---|---|---|
| 65405 | $C_9H_{19}$— | —Br | Cr 31.0 | A 80.0 | | |
| 269 | $C_8H_{17}$—COO— | —Br | Cr 85.3 | A 92.4 | | |
| 270 | $C_9H_{19}$—COO— | —Br | Cr 85.0 | A 95.0 | | |
| 279 | $C_{11}H_{23}$—COO— | —CN | Cr 81.0 | A 84.2 | | |
| 280 | $C_{13}H_{27}$—COO— | —CN | Cr 76.4 | A 91.5 | | |
| 281 | $C_{14}H_{29}$—COO— | —CN | Cr 80.4 | A 92.9 | | |
| 285 | $C_5H_{11}$— | —O—$C_8H_{17}$ | Cr 93.0 | A 102.0 | | |
| 287 | $C_7H_{15}$— | —O—$C_8H_{17}$ | Cr 94.5 | A 97.5 | | |
| 288 | $C_7H_{15}$— | —O—$C_{14}H_{29}$ | Cr 82.5 | A 90.0 | | |
| 289 | $C_{12}H_{25}$— | —O—$C_8H_{17}$ | Cr 83.0 | A 93.0 | | |
| 292 | $C_5H_{11}$— | —CO—$C_6H_{13}$ | CrX 72.5 | CrX 76.0 | Cr 93.0 | B 92.0 |
| | | | A 125.0 | | | |
| 293 | $C_5H_{11}$— | —CO—$C_8H_{17}$ | Cr 79.5 | A 121.0 | | |
| 294 | $C_5H_{11}$— | —CO—$C_{11}H_{23}$ | Cr 99.0 | A 114.5 | | |
| 295 | $C_6H_{13}$— | —CO—$C_5H_{11}$ | CrX 106.0 | Cr 116.0 | A 121.0 | |
| 296 | $C_7H_{15}$— | —CO—$C_6H_{13}$ | Cr 114.0 | A 121.0 | | |

TABLE 5

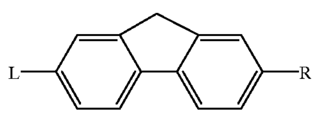

| LCReg | L | R | * | Phases | |
|---|---|---|---|---|---|
| 297 | $C_8H_{17}$— | —CO—$C_7H_{15}$ | | CrX 88.0 | Cr 110.0 |
| | | | | A 118.0 | |
| 298 | $C_9H_{19}$— | —CO—$CH_3$ | | Cr 64.0 | A 81.0 |
| 299 | $C_9H_{19}$— | —CO—$C_2H_5$ | | Cr 80.0 | A 105.0 |
| 300 | $C_9H_{19}$— | —CO—$C_3H_7$ | | Cr 105.0 | A 98.0 |
| | | | | N 100.0 | |
| 301 | $C_9H_{19}$— | —CO—$C_3H_7$ | | Cr 101.5 | A 111.5 |
| 302 | $C_9H_{19}$— | —CO—$C_5H_{11}$ | | Cr 111.0 | A 114.0 |
| 303 | $C_9H_{19}$— | —CO—$C_8H_{17}$ | | Cr 108.5 | A 115.5 |
| 304 | $C_9H_{19}$— | —CO—$C_{11}H_{23}$ | | Cr 101.0 | A 112.5 |
| 348 | $C_4H_9$—CO— | —$C_4H_8$—CH(—$C_4H_9$ | | Cr 64.0 | A 78.5 |
| 349 | $C_4H_9$—CO— | —$C_4H_8$—CH(—$C_6H_{13}$ | | Cr 32.0 | A 54.0 |
| 351 | $C_5H_{11}$—CO— | —$C_4H_8$—CH(—$C_4H_9$ | | Cr 49.0 | A 70.0 |
| 352 | $C_5H_{11}$—CO— | —$C_4H_8$—CH(—$C_6H_{13}$ | | Cr 36.0 | A 52.0 |
| 353 | $C_6H_{13}$—CO— | —$C_4H_8$—CH(—$C_4H_9$ | | Cr 59.0 | A 69.0 |
| 355 | $C_4H_9$—CO— | —$C_4H_8$—CH($C_2H_4$—/—$C_4H_9$ | 2 | Cr 32.0 | A 67.0 |
| 356 | $C_5H_{11}$—CO— | —$C_4H_8$—CH($C_2H_4$—/—$C_4H_9$ | 2 | Cr 34.5 | N 62.0 |

TABLE 6

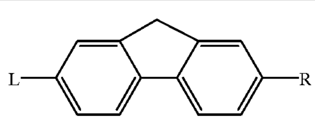

| LCReg | L | R | Phases | |
|---|---|---|---|---|
| 311 | $C_3H_7$—O— | —CO—$C_6H_{13}$ | Cr 108.0 | A 154.0 |
| 313 | $C_7H_{15}$—O— | —CO—$CH_3$ | Cr 106.0 | S 108.0 |
| 314 | $C_8H_{17}$—O— | —CO—$CH_3$ | Cr 98.0 | S 108.5 |
| 315 | $C_8H_{17}$—O— | —CO—$C_4H_9$ | Cr 114.0 | A 152.0 |

TABLE 6-continued

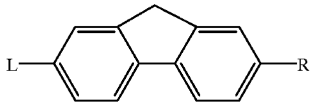

| LCReg | L | R | Phases | | |
|---|---|---|---|---|---|
| 316 | $C_8H_{17}$—O— | —CO—$C_6H_{13}$ | Cr 117.0 | A 149.0 | |
| 317 | $C_8H_{17}$—O— | —CO—$C_{11}H_{23}$ | Cr 109.0 | A 138.0 | |
| 318 | $C_9H_{19}$—O— | —CO—$CH_3$ | Cr 100.0 | S 110.0 | |
| 319 | $C_{10}H_{21}$—O— | —CO—$CH_3$ | Cr 97.5 | S 109.0 | |
| 320 | $C_{14}H_{29}$—O— | —CO—$C_6H_{13}$ | Cr 105.4 | A 136.0 | |
| 321 | $C_{16}H_{33}$—O— | —CO—$C_6H_{13}$ | Cr 106.0 | A 131.0 | |
| 305 | $C_7H_{15}$—O— | —COO—$C_3H_7$ | Cr 68.0 | S 114.0 | |
| 306 | $C_8H_{17}$—O— | —COO—$C_3H_7$ | Cr 67.0 | S 112.0 | |
| 307 | $C_9H_{19}$—O— | —COO—$C_3H_7$ | Cr 78.0 | S 110.0 | |
| 308 | $C_{10}H_{21}$—O— | —COO—$C_3H_7$ | Cr 68.0 | S 108.0 | |
| 358 | $C_2H_5$—CO— | —CO—$C_{10}H_{21}$ | CrX 98.0 | Cr 104.0 | A 143.0 |

TABLE 7

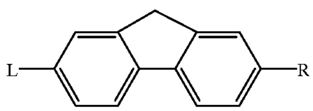

| LCReg | L | R | * | Phases | | |
|---|---|---|---|---|---|---|
| 359 | $C_3H_7$—CO— | —CO—$C_9H_{19}$ | | Cr 118.0 | A 141.0 | |
| 361 | $C_4H_9$—CO— | —CO—$C_8H_{17}$ | | Cr 101.0 | A 154.5 | |
| 362 | $C_4H_9$—CO— | —CO—$C_{11}H_{23}$ | | Cr 100.5 | A 151.0 | |
| 363 | $C_5H_{11}$—CO— | —CO—$C_5H_{11}$ | | Cr 141.0 | C 149.0 | A 152.0 |
| 364 | $C_5H_{11}$—CO— | —CO—$C_7H_{15}$ | | Cr 117.0 | C 129.0 | A 143.0 |
| 365 | $C_6H_{13}$—CO— | —CO—$C_6H_{13}$ | | Cr 142.0 | C 150.0 | A 160.0 |
| 366 | $C_6H_{13}$—CO— | —CO—$C_{11}H_{23}$ | | Cr 105.0 | A 155.5 | |
| 367 | $C_7H_{15}$—CO— | —CO—$C_7H_{15}$ | | Cr 137.0 | C 150.0 | A 157.0 |
| 368 | $C_8H_{17}$—CO— | —CO—$C_8H_{17}$ | | Cr 130.0 | C 147.0 | A 155.0 |
| 369 | $C_{11}H_{23}$—CO— | —CO—$C_{11}H_{23}$ | | Cr 133.0 | A 148.5 | |
| 370 | $C_{15}H_{31}$—CO— | —CO—$C_{15}H_{31}$ | | Cr 134.0 | B 139.0 | |
| 373 | $C_8H_{17}$—O— | —CO—CHMe—$C_4H_9$ | 2 | Cr 34.5 | A 36.5 | |
| 384 | $C_{11}H_{23}$—CO— | —CO—$CH_2$—CHMe—$C_3H_7$ | 2 | Cr 78.0 | C 92.5 | A 102.0 |
| 385 | $C_{11}H_{23}$—CO— | —CO—$CH_2$—CHMe—$C_6H_{13}$ | 2 | Cr 78.5 | S 82.0 | C 94.5 |
| | | | | A 98.5 | | |
| 386 | $C_2H_5$—CO— | —$C_2H_4$—CHMe—$C_3H_7$ | 2 | Cr 107.0 | A 108.5 | |

TABLE 8

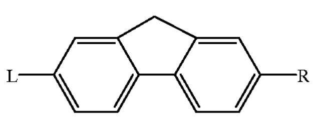

| LCReg | L | R | Phases | |
|---|---|---|---|---|
| 388 | $C_4H_9$—CO— | —$C_2H_4$—CHMe—$C_4H_7$ | Cr 61.0 | A 97.5 |
| 389 | $C_4H_9$—CO— | —$C_2H_4$—CHMe—$C_6H_{13}$ | Cr 51.0 | A 84.0 |
| 390 | $C_8H_{17}$—CO— | —$C_2H_4$—CHMe—$C_3H_7$ | Cr 63.5 | A 89.0 |
| 391 | $C_8H_{17}$—CO— | —$C_2H_4$—CHMe—$C_6H_{13}$ | Cr 61.5 | A 78.5 |
| 392 | $C_{11}H_{23}$—CO— | —$C_2H_4$—CHMe—$C_3H_7$ | Cr 66.0 | A 85.5 |
| 394 | $C_5H_{11}$—CO— | —$C_3H_6$—CHMe—$CH_3$ | Cr 99.0 | A 102.0 |
| 395 | $C_6H_{13}$—CO— | —$C_3H_6$—CHMe—$CH_3$ | Cr 88.0 | A 105.0 |
| 396 | $C_8H_{17}$—CO— | —$C_3H_6$—CHMe—$CH_3$ | Cr 80.5 | A 100.5 |
| 399 | $C_8H_{17}$—CO— | —$C_2H_4$—CHMe—$C_3H_6$—CHMe—$CH_3$ | Cr 73.0 | A 79.0 |
| 400 | $C_8H_{17}$—CO— | —$C_2H_4$—CHMe—$C_3H_6$—CHMe—$CH_3$ | Cr 73.0 | A 79.0 is |

TABLE 8-continued

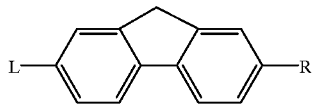

| LCReg | L | R | Phases | |
|---|---|---|---|---|
| 65406 | $C_5H_{11}$— | —O—$C_6H_{12}$—CH═$CH_2$ | (65.0) | CrX 65.0 |
| | | | Cr 71.0 | E 86.0 |
| | | | A 92.0 | |
| 65407 | $C_5H_{11}$— | —OOC—$C_7H_{14}$—CH═$CH_2$ | Cr 73.0 | A 79.0 is |
| 66965 | $C_5H_{11}$— | —OOC—$C_8H_{16}$—CH═$CH_2$ | (70.0) | CrX 55.0 |
| | | | Cr 73.0 | E 73.0 |
| | | | A 79.0 | |

TABLE 9

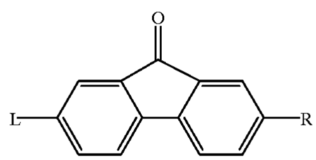

| LCReg | L | | | |
|---|---|---|---|---|
| 412 | $C_8H_{17}$—O— | —CO—C11H23 | Cr 95.0 | A 131.0 |
| 413 | $C_4H_9$—CO— | —CO—C11H23 | Cr 149.0 | A 183.5 |

TABLE 10

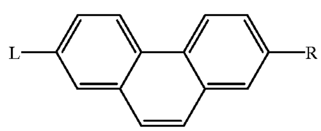

| L | R | Cr | | | LC | |
|---|---|---|---|---|---|---|
| $C_3H_7$— | —CO—$C_7H_{15}$ | K 116 | A 119 | I | | |
| $C_4H_9$— | —CO—$C_6H_{13}$ | K 114 | A 123 | I | | |
| $C_5H_{11}$— | —CO—$C_5H_{11}$ | K 107 | E 83 | A 127 | I | |
| $C_6H_{13}$— | —CO—$C_4H_9$ | K 92 | E 92 | A 126 | I | |
| $C_7H_{15}$— | —CO—$C_3H_7$ | K 75 | E 73 | A 107 | I | |
| $C_8H_{17}$— | —CO—$C_2H_5$ | K 80 | E 55 | A 117 | I | |
| $C_9H_{19}$— | —CO—$C_2H_5$ | K 75 | A 120 | I | | |
| $C_9H_{19}$— | —CO—$C_3H_7$ | K 74 | E 64 | A 104 | I | |
| $C_9H_{19}$— | —CO—$C_4H_9$ | K 71 | A 118 | I | | |
| $C_9H_{19}$— | —CO—$C_5H_{11}$ | K 98 | A 118 | I | | |
| $C_8H_{13}$—O— | —O—$C_6H_{13}$ | K 114 | S 125 | I | | |
| $C_7H_{15}$—O— | —O—$C_7H_{15}$ | K 99 | S 101 | S 123 | I | |
| $C_8H_{17}$—O— | —O—$C_8H_{17}$ | K 90 | S 93 | S 122 | I | |
| $C_9H_{19}$—O— | —O—$C_9H_{19}$ | K 93 | S 119 | I | | |
| $C_{10}H_{21}$—O— | —O—$C_{10}H_{21}$ | K 94 | S 117 | I | | |
| $C_{11}H_{23}$—O— | —O—$C_{11}H_{23}$ | K 98 | S 113 | I | | |
| $C_{12}H_{25}$—O— | —O—$C_{12}H_{25}$ | K 99 | S 109 | I | | |
| $C_4H_9$—CO— | —CO—$C_4H_9$ | K 130 | E 108 | A 157 | I | |
| $C_5H_{11}$—CO— | —CO—$C_5H_{11}$ | K 149 | A 164 | I | | |
| $C_6H_{13}$—CO— | —CO—$C_6H_{13}$ | K 146.5 | A 166 | I | | |
| $C_7H_{15}$—CO— | —CO—$C_7H_{15}$ | K 140 | A 167 | I | | |
| $C_5H_{11}$—COO— | —OOC—$C_5H_{11}$ | K 109 | A 117 | B | | |
| $C_6H_{13}$—COO— | —OOC—$C_6H_{13}$ | K 72 | X 105 | A 119 | B | |
| $C_7H_{15}$—COO— | —OOC—$C_7H_{15}$ | K 57 | X 83 | X 93 | A 123 | B |
| $C_9H_{19}$—COO— | —OOC—$C_9H_{19}$ | K 88 | A 126 | B | | |

TABLE 11

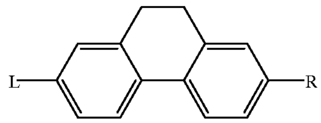

| LCReg | L | R | Phases | | |
|---|---|---|---|---|---|
| 464 | $C_3H_7$— | —CO—$C_7H_{15}$ | Cr 37.0 | A 43.5 | |
| 467 | $C_4H_9$— | —CO—$C_4H_9$ | Cr 39.5 | A 20.0 | N 25.0 chg |
| 468 | $C_4H_9$— | —CO—$C_6H_{13}$ | Cr 40.0 | A 45.0 | |
| 469 | $C_4H_9$— | —CO—$C_7H_{15}$ | Cr 49.0 | A 65.0 | |
| 471 | $C_5H_{11}$— | —CO—$C_4H_9$ | Cr 40.0 | N 34.0 | |
| 472 | $C_5H_{11}$— | —CO—$C_5H_{11}$ | Cr 29.5 | A 38.5 | |
| 473 | $C_5H_{11}$— | —CO—$C_6H_{13}$ | Cr 30.0 | A 49.0 | |
| 474 | $C_5H_{11}$— | —CO—$C_7H_{15}$ | Cr 57.5 | A 51.5 | |
| 475 | $C_5H_{11}$— | —CO—$C_8H_{17}$ | Cr 54.0 | A 57.0 | |
| 477 | $C_6H_{13}$— | —CO—$C_4H_9$ | Cr 41.0 | A 30.0 | N 32.0 |
| 478 | $C_6H_{13}$— | —CO—$C_5H_{11}$ | Cr 34.0 | A 42.0 | |
| 479 | $C_6H_{13}$— | —CO—$C_6H_{13}$ | Cr 28.0 | A 51.0 | |
| 480 | $C_6H_{13}$— | —CO—$C_7H_{15}$ | Cr 50.0 | A 49.0 | |
| 481 | $C_6H_{13}$— | —CO—$C_8H_{17}$ | Cr 56.5 | A 61.5 | |
| 482 | $C_7H_{15}$— | —CO—$C_3H_7$ | Cr 47.0 | N 19.0 | |

TABLE 12

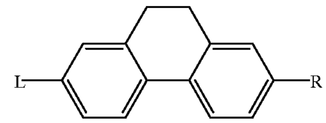

| LCReg | L | R | Phases | | |
|---|---|---|---|---|---|
| 483 | $C_7H_{15}$— | —CO—$C_4H_9$ | Cr 41.0 | A 30.0 | N 32.0 |
| 484 | $C_7H_{15}$— | —CO—$C_5H_{11}$ | Cr 39.0 | A 42.5 | |
| 485 | $C_7H_{15}$— | —CO—$C_6H_{13}$ | Cr 40.0 | A 55.0 | |
| 486 | $C_8H_{17}$— | —CO—$C_2H_5$ | Cr 31.5 | N 39.0 | |
| 487 | $C_8H_{17}$— | —CO—$C_3H_7$ | Cr 36.5 | N 20.0 | |
| 488 | $C_8H_{17}$— | —CO—$C_4H_9$ | Cr 22.5 | A 31.5 | N 33.0 |
| 489 | $C_8H_{17}$— | —CO—$C_5H_{11}$ | Cr 33.0 | A 48.0 | |
| 490 | $C_8H_{17}$— | —CO—$C_6H_{13}$ | Cr 35.5 | A 56.0 | |
| 491 | $C_9H_{19}$— | —CO—$CH_3$ | Cr 31.0 | N 13.0 | |
| 492 | $C_9H_{19}$— | —CO—$C_2H_5$ | Cr 45.0 | N 47.5 | N 32.0 |
| 493 | $C_9H_{19}$— | —CO—$C_3H_7$ | Cr 40.0 | N 26.0 | |
| 494 | $C_9H_{19}$— | —CO—$C_4H_9$ | Cr 37.0 | A 38.0 | N 40.0 |
| 495 | $C_9H_{19}$— | —CO—$C_5H_{11}$ | Cr 40.0 | A 46.0 | |
| 499 | $C_4H_9$—CO— | —CO—$C_4H_9$ | Cr 75.0 | A 119.0 | |
| 500 | $C_5H_{11}$—CO— | —CO—$C_5H_{11}$ | Cr 74.0 | N 67.0 | |

TABLE 13

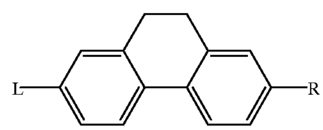

| LCReg | L | R | * | Phases | |
|---|---|---|---|---|---|
| 501 | $C_6H_{13}$—CO— | —CO—$C_6H_{13}$ | | Cr 58.0 | A 35.0 |
| 502 | $C_7H_{15}$—CO— | —CO—$C_7H_{15}$ | | Cr 60.0 | A 85.0 |
| 504 | $C_4H_9$—CO— | —$CH_2$—CHMe—$C_2H_5$ | 2 | Cr 46.5 | S 12.0 |
| 505 | $C_4H_9$—CO— | —$C_2H_4$—CHMe—$C_3H_7$ | 2 | Cr 15.0 | S 25.0 |
| 507 | $C_5H_{11}$—CO— | —$C_2H_4$—CHMe—$C_3H_7$ | 2 | Cr 37.0 | N 28.0 |
| 508 | $C_6H_{13}$—CO— | —$C_2H_4$—CHMe—$C_6H_{13}$ | 2 | Cr 29.0 | A 33.0 |
| 509 | $C_7H_{15}$—CO— | —$C_2H_4$—CHMe—$C_6H_{13}$ | 2 | Cr 39.0 | A 26.0 |
| 510 | $C_8H_{17}$—CO— | —$C_2H_4$—CHMe—$C_3H_7$ | 2 | Cr 39.0 | A 42.0 |
| 511 | $C_8H_{17}$—CO— | —$C_2H_4$—CHMe—$C_6H_{13}$ | 2 | Cr 21.0 | A 37.5 |
| 512 | $C_9H_{19}$—CO— | —$C_2H_4$—CHMe—$C_6H_{13}$ | 2 | Cr 30.0 | A 37.0 |
| 513 | $C_{10}H_{21}$—CO— | —$C_2H_4$—CHMe—$C_6H_{13}$ | 2 | Cr 33.0 | A 39.0 |
| 514 | $C_{11}H_{23}$—CO— | —$C_2H_4$—CHMe—$C_6H_{13}$ | 2 | Cr 36.0 | A 35.0 |
| 515 | $C_5H_{11}$—CO— | —$C_3H_6$—CHMe—$CH_3$ | | Cr 60.0 | A 34.0 |
| 516 | $C_6H_{13}$—CO— | —$C_3H_6$—CHMe—$CH_3$ | | Cr 43.5 | A 42.0 |
| 519 | $C_4H_9$—CO— | —$C_3H_6$—CHMe—$C_2H_5$ | 2 | Cr 33.0 | A 19.5 |

TABLE 14

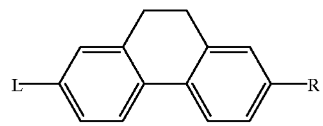

| LCReg | L | R | * | Phases | |
|---|---|---|---|---|---|
| 520 | $C_5H_{11}$—CO— | —$C_3H_6$—CHMe—$C_2H_5$ | 2 | Cr 48.5 | A 28.0 |
| 521 | $C_7H_{15}$—CO— | —$C_3H_6$—CHMe—$C_5H_{11}$ | 2 | Cr 48.0 | A 35.0 |
| 522 | $C_8H_{17}$—CO— | —$C_3H_6$—CHMe—$C_2H_5$ | 2 | Cr 57.0 | S 44.5 |
| 523 | $C_8H_{17}$—CO— | —$C_3H_6$—CHMe—$C_5H_{11}$ | 2 | Cr 23.5 | S 35.5 |
| 524 | $C_{11}H_{23}$—CO— | —$C_3H_6$—CHMe—$C_2H_5$ | 2 | Cr 58.0 | N 47.0 |
| 525 | $C_4H_9$—CO— | —$C_6H_{12}$—CHMe—$C_2H_5$ | 2 | Cr 26.5 | A 30.0 |
| 526 | $C_5H_{11}$—CO— | —$C_6H_{12}$—CHMe—$C_2H_5$ | 2 | Cr 21.0 | A 37.0 |
| 527 | $C_6H_{13}$—CO— | —$C_6H_{12}$—CHMe—$C_2H_5$ | 2 | Cr 33.0 | A 50.0 |
| 528 | $C_8H_{17}$—CO— | —$C_6H_{12}$—CHMe—$C_2H_5$ | 2 | Cr 54.0 | A 59.0 |
| 529 | $C_9H_{19}$—CO— | —$C_6H_{12}$—CHMe—$C_2H_5$ | 2 | Cr 50.5 | A 59.0 |
| 530 | $C_{10}H_{21}$—CO— | —$C_6H_{12}$—CHMe—$C_2H_5$ | 2 | Cr 50.5 | A 59.0 |
| 531 | $C_{11}H_{23}$—CO— | —$C_6H_{12}$—CHMe—$C_2H_5$ | 2 | Cr 31.0 | A 62.0 |
| 532 | $C_{15}H_{31}$—CO— | —$C_6H_{12}$—CHMe—$C_2H_5$ | 2 | Cr 46.0 | A 60.0 |
| 533 | $C_4H_9$—CO— | —$C_7H_{14}$—CHMe—$CH_3$ | | Cr 36.0 | A 22.0 |

TABLE 15

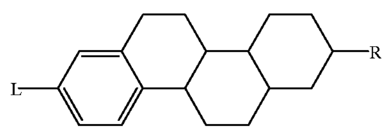

| LCReg | L | R | * | Phases | | |
|---|---|---|---|---|---|---|
| 667 | $CH_3$—O— | —$C_6H_{13}$ | 1 | Cr 102.8 | N* 123.8 | |
| 669 | $C_9H_{19}$—COO— | —$C_6H_{13}$ | 1 | Cr 76.8 | A 112.5 | N* 119.8 |
| 670 | $C_8H_{17}$—COO— | —CO—$C_5H_{11}$ | 1 | Cr 90.0 | A 114.9 | N* 116.3 |

TABLE 16

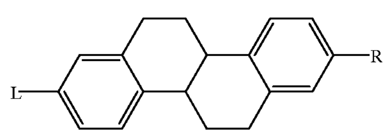

| LCReg | L | R | * | Phases | |
|---|---|---|---|---|---|
| 649 | $C_5H_{11}$— | —O—$CH_3$ | 2 | Cr 102.5 | X 168.6 |
| 650 | $C_5H_{11}$— | —O—$C_3H_7$ | 2 | Cr 137.6 | X 182.0 |
| 651 | $C_5H_{11}$— | —O—$C_4H_9$ | 2 | Cr 135.2 | X 182.0 |
| 652 | $C_5H_{11}$— | —O—$C_5H_{11}$ | 2 | Cr 115.0 | X 165.0 |
| 653 | $C_6H_{13}$— | —O—$C_3H_7$ | 2 | Cr 116.5 | X 176.8 |
| 654 | $C_6H_{13}$— | —O—$C_4H_9$ | 2 | Cr 118.5 | X 171.7 |
| 655 | $C_6H_{13}$— | —O—$C_5H_{11}$ | 2 | Cr 119.3 | X 169.4 |

TABLE 16-continued

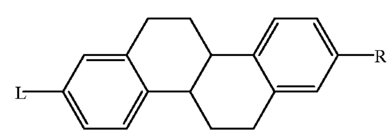

| LCReg | L | R | * | Phases | |
|---|---|---|---|---|---|
| 656 | $C_5H_{11}$— | —OOC—$C_3H_7$ | 2 | Cr 145.0 | X 200.0 |
| 658 | $C_6H_{13}$— | —OOC—$C_3H_7$ | 2 | Cr 131.7 | X 194.9 |
| 661 | $C_4H_9$—O— | —O—$C_4H_9$ | | Cr 132.0 | N 116.0 |
| 662 | $C_5H_{11}$—O— | —O—$C_5H_{11}$ | | Cr 92.0 | N 108.0 |
| 663 | $C_6H_{13}$—O— | —O—$C_6H_{13}$ | | Cr 107.0 | N 110.0 |
| 664 | $C_7H_{15}$—O— | —O—$C_7H_{15}$ | | Cr 95.0 | A 106.0 |

TABLE 17

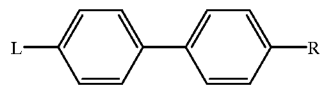

| L | R | Cr | | LC | Ref |
|---|---|---|---|---|---|
| H—O—$C_6H_{12}$—O— | —O—$C_6H_{12}$—O—H | K 97.9 | S 178.8 | I | 5165 |
| H—CONH— | —NH—OC—H | K 274 | S 286 | I | 4109 |
| Br—$C_3H_6$—COO— | —OOC—$C_3H_6$—Br | K 114 | S 142 | I | 7455 |
| Br—$C_4H_8$—COO— | —OOC—$C_4H_8$—Br | K 96 | S 116 | I | 7455 |
| Br—$C_5H_{10}$—COO— | —OOC—$C_5H_{10}$—Br | K 57 | S 103 | I | 7455 |
| Br—$C_7H_{14}$—COO— | —OOC—$C_7H_{14}$—Br | K 71 | S 99 | I | 7455 |

TABLE 18

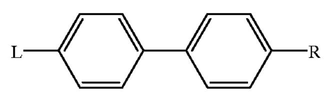

| L | R | | Cr | | LC | |
|---|---|---|---|---|---|---|
| Br—$C_{10}H_{20}$—COO— | —OOC—$C_{10}H_{20}$—Br | | K 83 | S 100 | I | |
| $C_5H_{11}$— | —H | | K 11.5 | N −34 | E | |
| $C_5H_{11}$— | —$C_2H_4$—O—H | | K 72 | S 112.5 | I | |
| $C_2H_5$—O— | —O—H | | K 169 | X 176 | I | |
| $C_8H_{17}$— | —O—$CH_2$—CHlBu—OH | S | K 95 | S 56 | S 103 | |
| | | | | S 113.1 | S 113.6 | |
| | | | | S 115.6 | A 119.5 | I |
| $CH_3$—O— | —O—$C_8H_{12}$—OOC—CMe═CH—H | | K 66 | S 73 | I | |
| $C_2H_5$—O— | —O—$C_8H_{12}$—OOC—CMe═CH—H | | K 63.1 | N 87.6 | I | |
| $C_5H_{11}$—O— | —O—$C_8H_{12}$—OOC—CMe═CH—H | | K 53 | S 57 | I | |
| $C_6H_{13}$—O— | —O—$C_8H_{12}$—OOC—CMe═CH—H | | K 79 | S 84 | I | |
| $C_4H_9$— | —CO—H | | K 4.5 | N 2 | I | |
| $C_5H_{11}$— | —CO—H | | K 21.5 | N 23.5 | I | |
| $C_6H_{13}$— | —CO—H | | K −5.5 | N 17.5 | I | |
| $C_7H_{15}$— | —CO—H | | K 4.5 | N 33 | I | |
| $C_8H_{17}$— | —CO—H | | K 20.5 | S 30 | N 36 | I |
| $C_9H_{19}$— | —CO—H | | K 31 | S 42 | N 45 | I |

TABLE 19

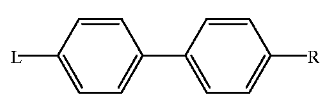

| LCReg | L | R | Phases | |
|---|---|---|---|---|
| 830 | H—O—$C_3H_6$— | —CN | Cr 101.0 | N 108.0 |
| 831 | H—O—$C_4H_8$— | —CN | Cr 64.0 | N 74.7 |
| 832 | H—O—$C_5H_{10}$— | —CN | Cr 73.0 | N 95.0 |
| 838 | H—O—$C_6H_{12}$—O— | —CN | Cr 93.5 | N 110.9 |
| 63651 | H—O—$C_7H_{14}$—O— | —CN | Cr 76.9 | N 103.2 |
| 63809 | H—O—$C_8H_{16}$—O— | —CN | Cr 87.7 | N 104.0 |
| 63812 | H—O—$C_9H_{18}$—O— | —CN— | Cr 81.4 | N 98.9 |
| 840 | H—O—$C_{12}H_{24}$—O— | —CN | Cr 90.3 | N 99.4 |
| 843 | H—NH—$C_5H_{10}$—O— | —CN | Cr 62.2 | N 95.6 |
| 41018 | H—NH—$C_6H_{12}$—O— | —CN | Cr 67.7 | N 92.1 |
| 41019 | H—NH—$C_7H_{14}$—O— | —CN | Cr 69.0 | N 88.0 |
| 41020 | H—NH—$C_8H_{16}$—O— | —CN | Cr 73.5 | N 86.1 |
| 41021 | H—NH | —CN | Cr 75.9 | N 83.2 |
| 59537 | NC— | —O—$C_5H_{10}$—SiMe2—O—SiMe3 | Cr 30.4 | A 50.3 |
| 59538 | NC— | —O—$C_6H_{12}$—SiMe2—O—SiMe3 | Cr 36.0 | A 53.8 |

TABLE 20

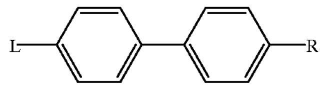

| LCReg | L | R | Phases | |
|---|---|---|---|---|
| 59539 | NC— | —O—$C_8H_{16}$—SiMe2—O—SiMe3 | Cr 37.0 | A 60.9 |
| 59540 | NC— | —O—$C_{10}H_{20}$—SiMe2—O—SiMe3 | CrX 37.9 | Cr 41.0 |
| | | | A 68.0 | |
| 59541 | NC— | —O—$C_{11}H_{22}$—SiMe2—O—SiMe3 | Cr 30.0 | A 73.0 |
| 41410 | OCN— | —NCO | Cr 107.0 | N 131.0 |
| 65440 | OCN—$C_2H_4$—COO— | —OOC—$C_2H_4$—NCO | Cr 135.0 | X 160.0 |
| 65441 | OCN—$C_5H_{10}$—COO— | —OOC—$C_5H_{10}$—NCOCN | Cr 70.5 | X 79.5 |
| 61624 | $CH_3$—O— | —O—$C_4H_8$—OOC—CMe═CH—H | Cr 80.0 | S 84.0 |
| 70206 | $C_6H_{13}$—O— | —NHOC—H | (170.0) | Cr 176.0 |
| | | | A 179.0 | |
| 70207 | $C_7H_{15}$—O— | —NHOC—H | (167.0) | Cr 173.0 |
| | | | A 180.0 | |
| 70208 | $C_8H_{17}$—O— | —NHOC—H | (163.0) | Cr 168.0 |
| | | | A 181.0 | |
| 70209 | $C_9H_{19}$—O— | —NHOC—H | (161.0) | Cr 166.0 |
| | | | A 180.0 | |
| 70210 | $C_{10}H_{21}$—O— | —NHOC—H | (160.0) | Cr 165.0 |
| | | | A 180.0 | |
| 70211 | $C_{11}H_{23}$—O— | —NHOC—H | (160.0) | Cr 165.0 |
| | | | C 162.0 | A 179.0 |
| 70212 | $C_{12}H_{25}$—O— | —NHOC—H | (159.0) | Cr 164.0 |
| | | | C 166.0 | A 177.0 |
| 1072 | $C_5H_{11}$— | —CH═N—O—H | Cr 126.0 | N 142.0 |
| | | | is | |

TABLE 21

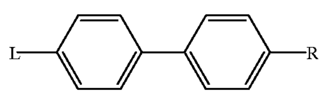

| LCReg | L | R | * | Phaese | | |
|---|---|---|---|---|---|---|
| 1073 | $C_6H_{13}$— | —CH═N—O—H | | Cr 118.0 | N 128.5 | |
| 1074 | $C_7H_{15}$— | —CH═N—O—H | | Cr 118.5 | N 127.0 | |
| 1075 | $C_8H_{17}$— | —CH═N—O—H | | Cr 118.0 | S 120.0 | |
| | | | | N 128.0 | | |
| 1076 | $C_9H_{19}$— | —CH═N—O—H | | Cr 116.5 | S 124.0 | |
| | | | | N 130.0 | | |
| 1077 | $C_{10}H_{21}$— | —CH═N—O—H | | Cr 115.5 | S 128.5 | |
| 1078 | $C_5H_{11}$— | —CMe═N—O—H | | Cr 139.0 | A 145.0 | |
| 1091 | $C_2H_5$—CHMe—$CH_2$—O— | —O—$C_6H_{12}$—OOC—CMe═CH—H | S | Cr 42.5 | S 49.0 | |
| 1257 | $C_5H_{11}$— | ——C≡C-1 | | Cr 110.0 | X 119.0 | |
| 1264 | $C_5H_{11}$— | —CN | | Cr 24.0 | N 35.3 | |
| 1265 | $C_6H_{13}$— | —CN | | Cr 14.3 | N 30.1 | |
| 1266 | $C_7H_{15}$— | —CN | | CrX 15.0 | Cr 30.0 | |
| | | | | N 42.8 | | |
| 1267 | $C_8H_{17}$— | —CN | | Cr 21.5 | A 33.5 | N 40.5 |
| 1268 | $C_9H_{19}$— | —CN | | CrX 29.5 | Cr 42.0 | |
| | | | | A 48.0 | N 49.5 | |
| 1269 | $C_{10}H_{21}$— | —CN | | Cr 44.0 | A 54.5 | |
| 1270 | $C_{11}H_{23}$— | —CN | | Cr 53.0 | A 57.5 | |

TABLE 22

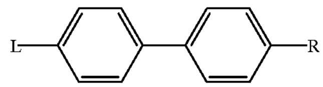

| L | R | | Cr | | LC | |
|---|---|---|---|---|---|---|
| $C_{10}H_{21}$— | —CO—H | | K 42 | S 44 | I | |
| $C_8H_{17}$—O— | —COO—$CH_2$—CHMe—O—H | S | K 119 | A 118 | I | |
| $C_2H_5$—O— | —OOC—CMe═CH—H | | K 95 | X 105 | I | |
| $C_8H_{17}$—O— | —OOC—$C_4H_8$—OOC—CMe═CH—H | | K 80.6 | S 86.2 | I | |
| $C_8H_{17}$—O— | —OOC—$C_2H_4$—CHMe—$CH_2$—OOC—CMe═CH—H | 1 | K 46 | S 64.1 | I | |
| $C_6H_{13}$—O— | —OOC—$C_{11}H_{22}$—NHOC—CMe═CH—H | | K 111 | S 132 | X ? | I |
| $C_2H_5$—CHMe—CHF—$CH_2$—OOC— | —O—H | 3 | K 127.5 | I | | |
| $CH_3$—CHMe—$CH_2$—CHCl—$CH_2$—OOC— | —O—H | S | K 48.3 | I | | |
| $C_2H_5$—CHMe—$CH_2$—O— | —O—$C_8H_{12}$—OOC—CMe═CH—H | S | K 42.5 | S 49 | I | |
| $C_8F_{17}$—$C_{11}H_{22}$—O— | —CONH—H | | K 224 | I | | |
| $H_2C$═CH—$C_4H_8$—O— | —O—H | | K 136 | I | | |
| $H_2C$═CH—$C_9H_{18}$—O— | —O—H | | K 134 | S 139 | I | |
| $C_5H_{11}$— | —CH═CH—F | | K ? | S 123 | I | |
| $C_3H_7$— | —$SO_2$—F | | K 94 | N −100 | E | |
| $C_4H_9$—C≡C— | —F | | K ? | S 73.7 | I | |
| $C_5H_{11}$— | —$C_2H_4$—Cl | | K 49 | N 14 | E | |
| $C_4H_9$—O— | —CO—$CH_2$—Cl | | K 115 | E 110 | I | |
| $C_5H_{11}$—O— | —CO—$CH_2$—Cl | | K 98 | E 72 | A 103 | I |
| $C_6H_{13}$—O— | —CO—$CH_2$—Cl | | K 87 | E 107 | A 116 | I |
| $C_7H_{15}$—O— | —CO—$CH_2$—Cl | | K 93 | E 106 | A 122 | I |
| $C_8H_{17}$—O— | —CO—$CH_2$—Cl | | K 88 | E 105 | A 126 | I |

TABLE 23

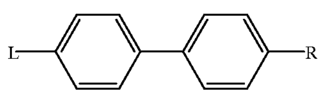

| L | R | | Cr | | LC | |
|---|---|---|---|---|---|---|
| $C_9H_{19}$—O— | —CO—$CH_2$—Cl | | K 95 | E 102 | A 126 | I |
| $C_{10}H_{21}$—O— | —CO—$CH_2$—Cl | | K 89 | E 101 | A 128 | I |
| $C_5H_{11}$—CO—$C_2H_4$—CO— | —Br | | K 119 | A 123.8 | I | |
| $C_6H_{13}$—CO—$C_2H_4$—CO— | —Br | | K 120.3 | A 127.5 | I | |
| $C_3H_7$—COO—$CH_2$—CO— | —Br | | K 94.4 | S 112 | I | |
| $C_5H_{11}$—COO— | —Br | | K 70 | E 83 | B 103 | I |
| $C_6H_{13}$—COO— | —Br | | K 68.5 | E 74 | B 104 | I |
| $C_7H_{15}$—COO— | —Br | | K 76 | S 59.7 | B 104.5 | |
| $C_8H_{17}$—COO— | —Br | | K 69 | E 46 | B 103 | I |
| $C_9H_{19}$—COO— | —Br | | K 73.5 | B 102.5 | I | |
| $C_5H_{11}$— | —$CH_2$—Br | | K 76 | N 1.5 | E | |
| $C_5H_{11}$— | —C≡C—Br | | K 88 | X 108 | I | |
| $CH_3$—O— | —O—$C_9H_{18}$—Br | | K 88.4 | I | | |
| $C_8H_{13}$— | —CO—$CH_2$—Br | | K 64 | A 52 | I | |
| $C_7H_{15}$— | —CO—$CH_2$—Br | | K 60.5 | A 59.5 | I | |
| $C_8H_{17}$— | —CO—$CH_2$—Br | | K 65.5 | A 64 | I | |
| $C_9H_{19}$— | —CO—$CH_2$—Br | | K 64 | A 67 | I | |
| $C_{10}H_{21}$— | —CO—$CH_2$—Br | | K 72.5 | A 70 | I | |
| $C_2H_5$—O— | —CO—$CH_2$—Br | | K 137 | S 112.5 | I | |
| $C_3H_7$—O— | —CO—$CH_2$—Br | | K 124 | S 118.5 | I | |
| $C_4H_9$—O— | —CO—$CH_2$—Br | | K 107 | E 106 | I | |
| $C_5H_{11}$—O— | —CO—$CH_2$—Br | | K 93 | E 101 | I | |
| $C_6H_{13}$—O— | —CO—$CH_2$—Br | | K 79 | E 98 | A 104 | I |
| $C_7H_{15}$—O— | —CO—$CH_2$—Br | | K 96 | E 92 | A 104 | I |
| $C_8H_{17}$—O— | —CO—$CH_2$—Br | | K 80 | E 95 | A 107 | I |
| $C_9H_{19}$—O— | —CO—$CH_2$—Br | | K 95 | E 100 | A 116 | I |
| $C_{10}H_{21}$—O— | —CO—$CH_2$—Br | | K 91 | E 98 | A 116 | I |
| $C_7H_{15}$—O— | —CO—CHCl—Br | 2 | K 95 | A 56 | I | |
| $C_8H_{17}$—O— | —CO—CHCl—Br | 2 | K 68 | A 71 | I | |
| $C_9H_{19}$—O— | —CO—CHCl—Br | 2 | K 68 | A 78 | I | |
| $C_{10}H_{21}$—O— | —CO—CHCl—Br | 2 | K 65 | A 66 | I | |
| $C_2H_5$—CHMe—$C_2H_4$—COO— | —Br | 1 | K 56 | S 28 | I | |
| $C_5H_{11}$—O— | —$NO_2$ | | K 54.5 | N <42 | I | |
| $C_6H_{13}$—O— | —$NO_2$ | | K 67 | N 32.5 | I | |

TABLE 23-continued

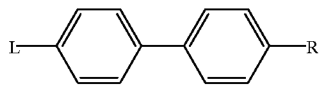

| L | R | | Cr | | LC | |
|---|---|---|---|---|---|---|
| $C_7H_{15}$—O— | —$NO_2$ | | K 36.5 | A 30.5 | N 38.5 | B |
| $C_8H_{17}$—O— | —$NO_2$ | | K 51.5 | A 49.5 | N 51.5 | B |
| $H_2C$═CH—O—$C_{11}H_{22}$—O— | —$NO_2$ | | K 97 | I | | |
| $C_6H_{13}$— | —CH═$CF_2$ | | K 59 | S 95.8 | I | |
| $C_5H_{11}$— | —$CH_2$—CH═$CF_2$ | | K 36.9 | S 53.1 | I | |
| $C_5H_{11}$— | —$C_2H_4$—CH═$CF_2$ | | K −25.4 | S 30.8 | S 50.6 | I |
| $C_9H_{19}$—O— | —COO-isopinocamphenyl | R | K 67.5 | A 48.7 | N* 55.7 | I |
| $CH_3$— | —$C_5H_{11}$ | | K 48 | N 1 | I | |

TABLE 24

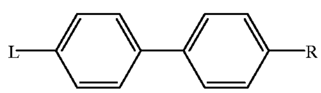

| L | R | Cr | | | LC | | |
|---|---|---|---|---|---|---|---|
| $C_2H_5$— | —$C_5H_{11}$ | K <20 | S 33.9 | I | | | |
| $C_3H_7$— | —$C_5H_{11}$ | K −18 | S 47.8 | I | | | |
| $C_3H_7$— | —$C_6H_{13}$ | K −10.5 | E 48 | I | | | |
| $C_3H_7$— | —$C_7H_{15}$ | K −14 | E 29 | B 50.5 | I | | |
| $C_4H_9$— | —$C_6H_{13}$ | K −2 | E 40.5 | B 48.5 | I | | |
| $C_4H_9$— | —$C_7H_{15}$ | K −15 | E 16.5 | B 38.5 | I | | |
| $C_5H_{11}$— | —$C_5H_{11}$ | K 25.1 | E 46.1 | E 47.1 | L 52.3 | I | |
| $C_5H_{11}$— | —$C_6H_{13}$ | K ? | E 11.7 | E 41.7 | E 42.6 | L 53.7 | I |
| $C_5H_{11}$— | —$C_7H_{15}$ | K ? | E 36 | B 63 | I | | |
| $C_6H_{13}$— | —$C_6H_{13}$ | K 25.1 | E 46.1 | E 47.1 | L 52.3 | I | |
| $C_6H_{13}$— | —$C_7H_{15}$ | K ? | E 29.7 | E 30.2 | L 58.1 | I | |
| $C_7H_{15}$— | —$C_7H_{15}$ | K ? | E 19.5 | E 35.1 | L 61 | I | |
| $C_8H_{17}$— | —$C_8H_{17}$ | K 57 | P 61 | I | | | |
| $C_9H_{19}$— | —$C_9H_{19}$ | K 57 | P 68 | I | | | |
| $C_5H_{11}$— | —$CH_2$—O—$CH_3$ | K 48 | S 47 | I | | | |
| $C_5H_{11}$— | —$CH_2$—O—$C_3H_7$ | K 27 | S 21 | I | | | |
| $C_5H_{11}$— | —$CH_2$—O—$C_5H_{11}$ | K 16 | S 10 | I | | | |
| $C_5H_{11}$— | —O—$C_2H_5$ | K 72 | S 81 | I | | | |
| $C_5H_{11}$— | —O—$C_4H_9$ | K 37 | S 80.1 | S 88.1 | I | | |
| $C_5H_{11}$— | —O—$C_6H_{13}$ | K 82 | S 84 | I | | | |
| $C_6H_{13}$— | —O—$C_6H_{13}$ | K 9 | E 68 | B 83.9 | I | | |
| $C_7H_{15}$— | —O—$C_6H_{13}$ | K 58 | B 86.5 | I | | | |
| $C_8H_{17}$— | —O—$C_6H_{13}$ | K 46 | B 84 | I | | | |
| $C_8H_{17}$— | —O—$C_8H_{17}$ | K 57 | E 86 | I | | | |
| $C_9H_{19}$— | —O—$C_6H_{13}$ | K 34 | B 82 | I | | | |
| $C_3H_7$— | —NH—$C_4H_9$ | K 75 | S 74.1 | I | | | |
| $C_5H_{11}$— | —NH—$C_4H_9$ | K 45 | A 78 | I | | | |
| $C_3H_7$— | —CO—$C_2H_5$ | K 42 | S 130 | I | | | |
| $C_5H_{11}$— | —CO—$CH_3$ | K 77 | B 84 | I | | | |
| $C_5H_{11}$— | —CO—$C_4H_9$ | K 90 | S 106.2 | S 110.5 | I | | |

TABLE 25

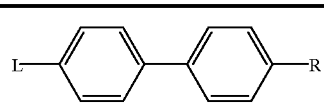

| L | R | Cr | | LC | |
|---|---|---|---|---|---|
| $C_5H_{11}$— | —CO—$C_5H_{11}$ | K 106 | B 104 | A 109.5 | I |
| $C_5H_{11}$— | —CO—$C_6H_{13}$ | K 96 | A 111 | I | |
| $C_6H_{13}$— | —CO—$CH_3$ | K 79 | B 85.5 | I | |
| $C_6H_{13}$— | —CO—$C_5H_{11}$ | K 106 | A 105.9 | I | |
| $C_7H_{15}$— | —CO—$CH_3$ | K 76.5 | B 84.5 | I | |
| $C_7H_{15}$— | —CO—$C_5H_{11}$ | K 94.3 | B 95.6 | A 103.8 | I |
| $C_8H_{17}$— | —CO—$CH_3$ | K 86.5 | B 84 | I | |

TABLE 25-continued

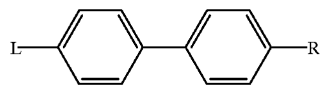

| L | R | Cr | LC | | | |
|---|---|---|---|---|---|---|
| $C_8H_{17}$— | —CO—$C_5H_{11}$ | K 87.5 | B 92.2 | A 101.3 | I | |
| $C_9H_{19}$— | —CO—$CH_3$ | K 85 | B 82.5 | I | | |
| $C_9H_{19}$— | —CO—$C_5H_{11}$ | K 80.2 | B 88.1 | A 99.7 | I | |
| $C_{10}H_{21}$— | —CO—$C_5H_{11}$ | K 77.5 | B 88.8 | A 98.7 | I | |
| $C_{10}H_{21}$— | —CO—$C_9H_{19}$ | K 57.8 | E 110 | I | | |
| $C_5H_{11}$— | —CO—$CH_2$—CO—$CH_3$ | K 110 | X 135 | I | | |
| $C_{10}H_{21}$— | —CO—$CH_2$—CO—$CH_3$ | K 86 | E 97 | B 107 | A 135 | I |
| $C_5H_{11}$— | —CO—$CH_2$—COO—$C_3H_7$ | K 85 | S 147 | I | | |
| $C_8H_{17}$— | —CO—$CH_2$—COO—$C_3H_7$ | K 70 | S 144 | I | | |
| $C_6H_{13}$— | —CO—CH═CH—COO—$C_2H_5$ | K 40 | S 59 | I | | |
| $C_6H_{13}$— | —CO—CH═CH—COO—$C_3H_7$ | K 40 | S 66 | I | | |
| $C_6H_{13}$— | —CO—CH═CH—COO—$C_4H_9$ | K 34 | S 68 | I | | |
| $C_6H_{13}$— | —CO—CH═CH—COO—$C_2H_5$ | K 25 | S 57 | I | | |
| $C_8H_{17}$— | —CO—CH═CH—COO—$C_5H_{11}$ | K 62 | S 72 | I | | |
| $C_8H_{17}$— | —CO—CH═CH—COO—$C_4H_9$ | K 56 | S 69 | I | | |
| $C_8H_{17}$— | —CO—CH═CH—COO—$C_5H_{11}$ | K 54 | S 70 | I | | |
| $C_8H_{17}$— | —CO—CH═CH—COO—$C_6H_{13}$ | K 36 | S 71 | I | | |
| $C_8H_{17}$— | —CO—CH═CH—COO—$C_7H_{15}$ | K 40 | S 72 | I | | |
| $C_3H_7$— | —CO—CH═CH—COO—$C_8H_{17}$ | K 35 | S 71 | I | | |
| $C_5H_{11}$— | —COO—$C_3H_7$ | K 63 | X 61 | I | | |
| $C_5H_{11}$— | —COO—$C_3H_7$ | K 55 | X 58 | I | | |
| $C_5H_{11}$— | —COO—$C_8H_{17}$ | K 29 | B 25 | I | | |
| $C_8H_{17}$— | —COO—$C_2H_5$ | K 64 | B 61.4 | A 61.4 | I | |

TABLE 26

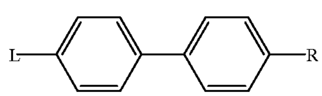

| L | R | | Cr | LC | | | |
|---|---|---|---|---|---|---|---|
| $C_8H_{17}$— | —COO—$C_3H_7$ | | K 60 | A 57 | I | | |
| $C_5H_{11}$— | —COS—$C_2H_5$ | | K ? | E 103.5 | L 113 | A 121.4 | U |
| $C_5H_{11}$— | —COS—$C_3H_7$ | | K ? | E 90 | L 110.3 | A 118.5 | I |
| $C_5H_{11}$— | —COS—$C_4H_9$ | | K ? | E 75 | L 109 | A 120.5 | I |
| $C_5H_{11}$— | —COS—$C_5H_{11}$ | | K ? | E 59.8 | L 104.5 | A 120 | I |
| $C_5H_{11}$— | —COS—$C_6H_{13}$ | | K ? | E 50 | L 102 | A 118 | I |
| $C_5H_{11}$— | —COS—$C_7H_{15}$ | | K ? | E 40.1 | L 100.2 | A 116.7 | I |
| $C_5H_{11}$— | —COS—$C_8H_{17}$ | | K ? | E 33 | L 99.8 | A 116.3 | I |
| $C_5H_{11}$— | —COS—$C_9H_{19}$ | | K ? | E 25 | L 95.4 | A 113.8 | I |
| $C_5H_{11}$— | —COS—$C_{10}H_{21}$ | | K ? | E 15 | L 94 | A 113.2 | I |
| $C_5H_{11}$— | —OOC—$C_5H_{11}$ | | K 45.7 | S 87.4 | I | | |
| $C_8H_{17}$— | —OOC—$C_7H_{15}$ | | K 65 | E 83 | B 91 | I | |
| $C_7H_{15}$— | —OOC—CHMe—CHMe—O—$CH_3$ | 1 | K −18 | C* 9 | A 13 | I | |
| $C_8H_{17}$— | —OOC—CHMe—CHMe—O—$CH_3$ | 1 | K 32 | C* 10 | A 15 | I | |
| $C_5H_{11}$— | —CMe═N—O—$C_2H_5$ | | K 73 | A 91 | I | | |
| $C_6H_{13}$— | —CMe═N—OOC—$C_4H_9$ | | K 89 | A 88 | I | | |
| $C_6H_{13}$— | —CMe═N—OOC—$C_8H_{17}$ | | K 70 | A 86 | I | | |
| $C_8H_{17}$—O— | —$C_5H_{10}$—CHMe—O—$C_3H_7$ | 1 | K 14 | S 18 | S 37 | C* 41 | I |
| $C_{10}H_{21}$—O— | —$C_5H_{10}$—CHMe—O—$CH_3$ | 1 | K 41 | S 49 | C* 53 | I | |
| $C_{10}H_{21}$—O— | —$C_5H_{10}$—CHMe—O—$C_2H_5$ | 1 | K 31 | S 32 | S 38 | C* 48 | I |
| $C_{10}H_{21}$—O— | —$C_5H_{10}$—CHMe—O—$C_3H_7$ | 1 | K 28 | S 23 | S 35 | C* 44 | I |
| $C_{10}H_{21}$—O— | —$C_5H_{10}$—CHMe—O—$C_4H_9$ | 1 | K 33 | S 25 | C* 35 | A 39 | I |
| $C_{10}H_{21}$—O— | —$C_5H_{10}$—CHMe—O—$C_5H_{11}$ | 1 | K 32 | S 27 | C* 30 | A 36 | I |
| $C_{12}H_{25}$—O— | —$C_5H_{10}$—CHMe—O—$C_3H_7$ | 1 | K 40 | C* 44 | U | | |
| $C_{10}H_{21}$—O— | —$C_6H_{12}$—CHMe—O—$C_3H_7$ | 1 | K 43 | S 46 | S 56 | I | |
| $C_2H_5$—O— | —O—$C_2H_5$ | | K 176 | X 185 | I | | |
| $C_6H_{13}$—O— | —O—$C_6H_{13}$ | | K 124 | N 130 | U | | |
| $C_8H_{17}$—O— | —O—CHMe—COO—$CH_3$ | S | K 57 | A 49.2 | I | | |
| $C_8H_{17}$—O— | —O—CHMe—COO—$C_2H_5$ | S | K 39 | A 42 | I | | |
| $CH_3$—O— | —CO—$C_2H_5$ | | K 145.7 | E 146.4 | I | | |

TABLE 27

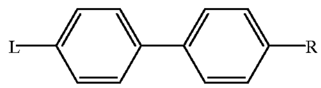

| L | R | Cr | | LC | |
|---|---|---|---|---|---|
| $CH_3$—O— | —CO—$C_3H_7$ | K 126.2 | E 122.2 | A 125.9 | I |
| $CH_3$—O— | —CO—$C_4H_9$ | K 120.5 | A 117.7 | I | |
| $CH_3$—O— | —CO—$C_5H_{11}$ | K 123 | A 119 | I | |
| $CH_3$—O— | —CO—$C_6H_{13}$ | K 118 | A 117 | I | |
| $CH_3$—O— | —CO—$C_7H_{15}$ | K 120 | A 117.7 | I | |
| $CH_3$—O— | —CO—$C_8H_{17}$ | K 116 | A 116.2 | I | |
| $CH_3$—O— | —CO—$C_9H_{19}$ | K 118 | A 116.7 | I | |
| $C_2H_5$—O— | —CO—$CH_3$ | K 96 | E 156.2 | I | |
| $C_2H_5$—O— | —CO—$C_2H_5$ | K 124 | E 172.4 | I | |
| $C_2H_5$—O— | —CO—$C_3H_7$ | K 123 | E 156.2 | I | |
| $C_2H_5$—O— | —CO—$C_4H_9$ | K 106 | E 136 | A 153 | I |
| $C_2H_5$—O— | —CO—$C_5H_{11}$ | K 110 | E 129.9 | A 150.6 | I |
| $C_2H_5$—O— | —CO—$C_6H_{13}$ | K 107 | E 124 | A 148 | I |
| $C_2H_5$—O— | —CO—$C_7H_{15}$ | K 111.5 | E 121 | A 146.4 | I |
| $C_2H_5$—O— | —CO—$C_8H_{17}$ | K 108 | E 120.2 | A 144.8 | I |
| $C_2H_5$—O— | —CO—$C_9H_{19}$ | K 116 | E 121.7 | A 143.1 | I |
| $C_3H_7$—O— | —CO—$CH_3$ | K 107 | E 155.6 | I | |
| $C_3H_7$—O— | —CO—$C_2H_5$ | K 119 | E 177.3 | I | |
| $C_3H_7$—O— | —CO—$C_3H_7$ | K 136.5 | E 153.9 | A 158.2 | I |
| $C_3H_7$—O— | —CO—$C_4H_9$ | K 126 | E 135.7 | A 154.6 | I |
| $C_3H_7$—O— | —CO—$C_5H_{11}$ | K 116 | E 125.9 | A 150.3 | I |
| $C_3H_7$—O— | —CO—$C_6H_{13}$ | K 113 | E 120.1 | A 147.3 | I |
| $C_3H_7$—O— | —CO—$C_7H_{15}$ | K 118 | E 121 | A 145.2 | I |
| $C_3H_7$—O— | —CO—$C_8H_{17}$ | K 115 | E 120.3 | A 143 | I |
| $C_3H_7$—O— | —CO—$C_9H_{19}$ | K 106 | E 119.5 | A 141 | I |
| $C_4H_9$—O— | —CO—$CH_3$ | K 97 | E 144 | I | |
| $C_4H_9$—O— | —CO—$C_2H_5$ | K 114 | E 167.3 | A 171.4 | I |
| $C_4H_9$—O— | —CO—$C_3H_7$ | K 101.5 | E 145.7 | A 155.9 | I |
| $C_4H_9$—O— | —CO—$C_4H_9$ | K 124 | E 136.2 | A 156.8 | I |
| $C_4H_9$—O— | —CO—$C_5H_{11}$ | K 115 | E 120 | A 150.8 | I |

TABLE 28

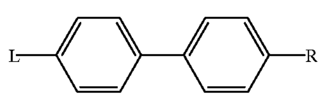

| L | R | Cr | | LC | |
|---|---|---|---|---|---|
| $C_4H_9$—O— | —CO—$C_6H_{13}$ | K 109 | E 115 | A 151.5 | I |
| $C_4H_9$—O— | —CO—$C_7H_{15}$ | K 99 | E 113.7 | A 148.3 | I |
| $C_4H_9$—O— | —CO—$C_8H_{17}$ | K 102.5 | E 111.8 | A 146.8 | I |
| $C_4H_9$—O— | —CO—$C_9H_{19}$ | K 107 | E 111.5 | A 144.7 | I |
| $C_5H_{11}$—O— | —CO—$CH_3$ | K 90 | E 139.5 | I | |
| $C_5H_{11}$—O— | —CO—$C_2H_5$ | K 91 | E 155.6 | A 169 | I |
| $C_5H_{11}$—O— | —CO—$C_3H_7$ | K 93 | E 129.5 | A 150.8 | I |
| $C_5H_{11}$—O— | —CO—$C_4H_9$ | K 124 | E 121 | A 152.1 | I |
| $C_5H_{11}$—O— | —CO—$C_5H_{11}$ | K 128.8 | E 127 | A 147.8 | I |
| $C_5H_{11}$—O— | —CO—$C_6H_{13}$ | K 117 | E 113 | A 146.3 | I |
| $C_5H_{11}$—O— | —CO—$C_7H_{15}$ | K 111 | E 108 | A 143.8 | I |
| $C_5H_{11}$—O— | —CO—$C_8H_{17}$ | K 104 | E 101 | A 144 | I |
| $C_5H_{11}$—O— | —CO—$C_9H_{19}$ | K 102.7 | E 101.5 | A 141.8 | I |
| $C_6H_{13}$—O— | —CO—$CH_3$ | K 91 | E 137 | I | |
| $C_6H_{13}$—O— | —CO—$C_2H_5$ | K 78 | E 149 | A 165.5 | I |
| $C_6H_{13}$—O— | —CO—$C_3H_7$ | K 82 | E 121.8 | A 147 | I |
| $C_6H_{13}$—O— | —CO—$C_4H_9$ | K 109 | E 116 | A 149.6 | I |
| $C_6H_{13}$—O— | —CO—$C_5H_{11}$ | K 120.5 | A 145.3 | I | |
| $C_6H_{13}$—O— | —CO—$C_6H_{13}$ | K 124.5 | A 145.2 | I | |
| $C_6H_{13}$—O— | —CO—$C_7H_{15}$ | K 123 | A 142.5 | I | |

TABLE 28-continued

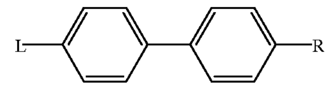

| L | R | Cr | | LC | |
|---|---|---|---|---|---|
| $C_6H_{13}$—O— | —CO—$C_8H_{17}$ | K 113.5 | A 141.2 | I | |
| $C_6H_{13}$—O— | —CO—$C_9H_{19}$ | K 110.2 | A 139.5 | I | |
| $C_7H_{15}$—O— | —CO—$CH_3$ | K 99 | E 136 | I | |
| $C_7H_{15}$—O— | —CO—$C_2H_5$ | K 98 | E 146.8 | A 163.7 | I |
| $C_7H_{15}$—O— | —CO—$C_3H_7$ | K 87 | E 120.2 | A 145.2 | I |
| $C_7H_{15}$—O— | —CO—$C_4H_9$ | K 108 | E 110 | A 147 | I |
| $C_7H_{15}$—O— | —CO—$C_5H_{11}$ | K 112.5 | A 142.3 | I | |
| $C_7H_{15}$—O— | —CO—$C_6H_{13}$ | K 123 | A 138 | I | |
| $C_7H_{15}$—O— | —CO—$C_7H_{15}$ | K 126.5 | A 139.7 | I | |
| $C_7H_{15}$—O— | —CO—$C_8H_{17}$ | K 119 | A 138.7 | I | |

TABLE 29

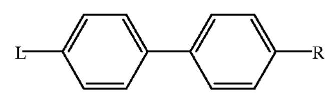

| L | R | Cr | | LC | |
|---|---|---|---|---|---|
| $C_7H_{15}$—O— | —CO—$C_9H_{19}$ | K 114 | A 134.7 | I | |
| $C_8H_{17}$—O— | —CO—$CH_3$ | K 96 | E 136.5 | I | |
| $C_8H_{17}$—O— | —CO—$C_2H_5$ | K 104 | E 144.8 | I | |
| $C_8H_{17}$—O— | —CO—$C_3H_7$ | K 96 | E 118.9 | A 161.8 | I |
| $C_8H_{17}$—O— | —CO—$C_4H_9$ | K 106.5 | E 107 | A 142.9 | I |
| $C_8H_{17}$—O— | —CO—$C_5H_{11}$ | K 104 | E 140 | A 145.7 | I |
| $C_8H_{17}$—O— | —CO—$C_6H_{13}$ | K 116 | A 140.3 | I | |
| $C_8H_{17}$—O— | —CO—$C_7H_{15}$ | K 125 | A 138.5 | I | |
| $C_8H_{17}$—O— | —CO—$C_8H_{17}$ | K 124.5 | A 137.4 | I | |
| $C_8H_{17}$—O— | —CO—$C_9H_{19}$ | K 124.5 | A 134.9 | I | |
| $C_9H_{19}$—O— | —CO—$CH_3$ | K 104.2 | A 135 | I | |
| $C_9H_{19}$—O— | —CO—$C_2H_5$ | K 112 | E 144.3 | I | |
| $C_9H_{19}$—O— | —CO—$C_3H_7$ | K 103.5 | E 118.2 | A 160 | I |
| $C_9H_{19}$—O— | —CO—$C_4H_9$ | K 101 | E 106.4 | A 141 | I |
| $C_9H_{19}$—O— | —CO—$C_5H_{11}$ | K 106 | E 138.5 | A 143.9 | I |
| $C_9H_{19}$—O— | —CO—$C_6H_{13}$ | K 112.8 | A 139 | I | |
| $C_9H_{19}$—O— | —CO—$C_7H_{15}$ | K 124 | A 136 | I | |
| $C_9H_{19}$—O— | —CO—$C_8H_{17}$ | K 124.5 | A 135.4 | I | |
| $C_9H_{19}$—O— | —CO—$C_9H_{19}$ | K 128.5 | A 132.8 | I | |
| $C_{10}H_{21}$—O— | —CO—$CH_3$ | K 103 | A 132 | I | |
| $C_{10}H_{21}$—O— | —CO—$C_2H_5$ | K 92 | E 143.4 | I | |
| $C_{10}H_{21}$—O— | —CO—$C_3H_7$ | K 90 | E 117.5 | A 157.5 | I |
| $C_{10}H_{21}$—O— | —CO—$C_4H_9$ | K 97 | E 106 | A 138.8 | I |
| $C_{10}H_{21}$—O— | —CO—$C_5H_{11}$ | K 101.9 | E 136.6 | A 141.2 | I |
| $C_{10}H_{21}$—O— | —CO—$C_6H_{13}$ | K 108.7 | A 137 | I | |
| $C_{10}H_{21}$—O— | —CO—$C_7H_{15}$ | K 110.5 | A 134 | I | |
| $C_{10}H_{21}$—O— | —CO—$C_8H_{17}$ | K 118 | A 133.3 | I | |
| $C_{10}H_{21}$—O— | —CO—$C_9H_{19}$ | K 123.5 | A 130.9 | I | |
| $C_{11}H_{23}$—O— | —CO—$CH_3$ | K 110.5 | A 130.6 | I | |
| $C_{12}H_{25}$—O— | —CO—$CH_3$ | K 108.6 | E 129.9 | I | |

TABLE 30

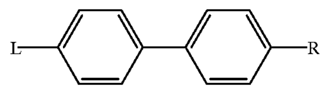

| L | R | Cr | LC | | | |
|---|---|---|---|---|---|---|
| $C_{12}H_{25}$—O— | —CO—$C_2H_5$ | K 95.5 | E 139.3 | A 151.5 | I | |
| $C_{12}H_{25}$—O— | —CO—$C_3H_7$ | K 105.5 | E 115.5 | A 134.8 | I | |
| $C_{12}H_{25}$—O— | —CO—$C_4H_9$ | K 102 | E 105 | S 115 | A 141 | I |
| $C_{12}H_{25}$—O— | —CO—$C_5H_{11}$ | K 98 | A 132.5 | I | | |
| $C_{12}H_{25}$—O— | —CO—$C_6H_{13}$ | K 105 | A 131 | I | | |
| $C_{12}H_{25}$—O— | —CO—$C_7H_{15}$ | K 108.5 | A 129.7 | I | | |
| $C_{12}H_{25}$—O— | —CO—$C_8H_{17}$ | K 112.5 | A 129.8 | I | | |
| $C_{12}H_{25}$—O— | —CO—$C_9H_{19}$ | K 115.5 | A 127.4 | I | | |
| $C_{14}H_{29}$—O— | —CO—$CH_3$ | K 112.1 | E 123.2 | B | | |
| $C_{16}H_{33}$—O— | —CO—$CH_3$ | K 116.8 | E 122.5 | I | | |
| $C_4H_9$—O— | —CO—$CH_2$—CO—$C_4H_9$ | K 126.1 | A 155.4 | I | | |
| $C_6H_{13}$—O— | —CO—$CH_2$—CO—$C_2H_5$ | K 108.6 | E 128.1 | A 172.5 | I | |
| $C_8H_{17}$—O— | —CO—$CH_2$—CO—$CH_3$ | K 108.7 | E 140.7 | A 176.5 | I | |
| $C_8H_{17}$—O— | —CO—$CH_2$—CO—$C_2H_5$ | K 101 | E 124.3 | A 173.1 | I | |
| $C_8H_{17}$—O— | —CO—$CH_2$—CO—$C_4H_9$ | K 110.2 | A 152.5 | I | | |
| $C_8H_{17}$—O— | —CO—$CH_2$—CO—$C_8H_{17}$ | K 125.3 | A 137 | I | | |
| $C_9H_{19}$—O— | —CO—$CH_2$—CO—$CH_3$ | K 104.5 | E 141 | A 175.5 | I | |
| $C_{10}H_{21}$—O— | —CO—$CH_2$—CO—$CH_3$ | K 100.5 | E 137.4 | A 173.8 | I | |
| $C_{10}H_{21}$—O— | —CO—$CH_2$—CO—$C_2H_5$ | K 98.5 | E 123.4 | A 168.3 | I | |
| $C_{11}H_{23}$—O— | —CO—$CH_2$—CO—$CH_3$ | K 108.5 | E 135.6 | A 172 | I | |
| $C_{11}H_{23}$—O— | —CO—$CH_2$—CO—$C_2H_5$ | K 105.1 | E 123.7 | A 166.8 | I | |
| $C_{12}H_{25}$—O— | —CO—$CH_2$—CO—$CH_3$ | K 105 | E 135 | A 167.5 | I | |
| $C_{12}H_{25}$—O— | —CO—$CH_2$—CO—$C_2H_5$ | K 95.8 | E 120 | A 161.5 | I | |
| $C_{12}H_{25}$—O— | —CO—$CH_2$—CO—$C_3H_7$ | K 112.5 | E 103.3 | A 147 | I | |
| $C_{12}H_{25}$—O— | —CO—$CH_2$—CO—$C_4H_9$ | K 105.2 | A 133.8 | I | | |
| $C_{12}H_{25}$—O— | —CO—$CH_2$—CO—$C_{12}H_{25}$ | K 124.4 | A 125.8 | I | | |
| $C_{14}H_{29}$—O— | —CO—$CH_2$—CO—$C_2H_5$ | K 106 | E 120.5 | A 158.5 | I | |
| $C_{16}H_{33}$—O— | —CO—$CH_2$—CO—$CH_3$ | K 118.9 | E 139.1 | A 162 | I | |
| $C_{18}H_{37}$—O— | —CO—$CH_2$—CO—$CH_3$ | K 121.7 | E 137 | A 157.8 | I | |
| $C_{18}H_{37}$—O— | —CO—$CH_2$—CO—$C_2H_5$ | K 113 | E 114.5 | A 150.7 | I | |

TABLE 31

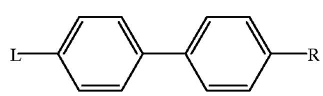

| L | R | Cr | | LC | | |
|---|---|---|---|---|---|---|
| $CH_3$—O— | —COO—$C_6H_{13}$ | K 61.7 | E 45.4 | I | | |
| $C_2H_5$—O— | —COO—$C_3H_7$ | K 102 | S 103 | I | | |
| $C_3H_7$—O— | —COO—$C_3H_7$ | K 105 | S 107 | I | | |
| $C_4H_9$—O— | —COO—$C_3H_7$ | K 97 | A 113.5 | I | | |
| $C_4H_9$—O— | —COO—$C_4H_9$ | K 93 | E 92 | A 102 | I | |
| $C_5H_{11}$—O— | —COO—$C_2H_5$ | K 114.5 | A 123.5 | I | | |
| $C_5H_{11}$—O— | —COO—$C_3H_7$ | K 80 | A 106.5 | I | | |
| $C_5H_{11}$—O— | —COO—$C_6H_{13}$ | K 63.7 | E 63.3 | B 68.4 | A 85.4 | I |
| $C_5H_{11}$—O— | —COO—$C_7H_{15}$ | K ? | E 59 | B 65 | A 81 | I |
| $C_5H_{11}$—O— | —COO—$C_{12}H_{25}$ | K 70.4 | E 54.4 | A 70.6 | I | |
| $C_6H_{13}$—O— | —COO—$CH_3$ | K 124 | E 132 | B 139 | A 139 | I |
| $C_6H_{13}$—O— | —COO—$C_2H_5$ | K 81 | E 92 | B 97 | A 119 | I |
| $C_6H_{13}$—O— | —COO—$C_3H_7$ | K 80 | E 67 | B 74 | A 107 | I |
| $C_6H_{13}$—O— | —COO—$C_4H_9$ | K 58 | B 64 | A 92 | I | |
| $C_6H_{13}$—O— | —COO—$C_5H_{11}$ | K 83 | B 58 | A 90 | E | |
| $C_6H_{13}$—O— | —COO—$C_6H_{13}$ | K 79 | B 57.5 | A 86 | E | |
| $C_6H_{13}$—O— | —COO—$C_7H_{15}$ | K 76 | B 57 | A 84 | E | |
| $C_6H_{13}$—O— | —COO—$C_8H_{17}$ | K 74 | B 56 | A 82 | I | |
| $C_6H_{13}$—O— | —COO—$C_9H_{19}$ | K 71 | B 55 | A 80 | I | |
| $C_6H_{13}$—O— | —COO—$C_{10}H_{21}$ | K 59 | B 54.5 | A 78 | I | |
| $C_7H_{15}$—O— | —COO—$CH_3$ | K 124 | E 127 | B 133 | A 133 | I |
| $C_7H_{15}$—O— | —COO—$C_2H_5$ | K 52 | E 88 | B 94 | A 111 | I |
| $C_7H_{15}$—O— | —COO—$C_3H_7$ | K 78 | E 54 | B 64 | A 102 | I |
| $C_7H_{15}$—O— | —COO—$C_4H_9$ | K 62 | C 59 | A 89 | I | |
| $C_7H_{15}$—O— | —COO—$C_5H_{11}$ | K 79 | C 50 | A 87 | E | |

TABLE 31-continued

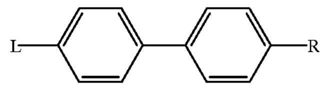

| L | R | Cr | | LC | |
|---|---|---|---|---|---|
| $C_7H_{15}$—O— | —COO—$C_6H_{13}$ | K 86 | C 60 | A 84 | E |
| $C_7H_{15}$—O— | —COO—$C_7H_{15}$ | K 86 | C 55 | A 82 | E |
| $C_7H_{15}$—O— | —COO—$C_8H_{17}$ | K 76 | A 80 | I | |
| $C_7H_{15}$—O— | —COO—$C_9H_{19}$ | K 69 | A 78 | I | |
| $C_7H_{15}$—O— | —COO—$C_{10}H_{21}$ | K 69 | A 76 | I | |

TABLE 32

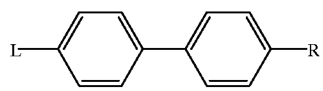

| L | R | Cr | | LC | | |
|---|---|---|---|---|---|---|
| $C_8H_{17}$—O— | —COO—$CH_3$ | K 117 | E 126 | B 132 | A 132 | I |
| $C_8H_{17}$—O— | —COO—$C_2H_5$ | K 75 | E 88 | B 96 | A 112 | I |
| $C_8H_{17}$—O— | —COO—$C_3H_7$ | K 83 | B 64 | A 101 | I | |
| $C_8H_{17}$—O— | —COO—$C_4H_9$ | K 56 | C 56 | A 86 | I | |
| $C_8H_{17}$—O— | —COO—$C_5H_{11}$ | K 66 | C 55 | A 88 | E | |
| $C_8H_{17}$—O— | —COO—$C_6H_{13}$ | K 72 | C 56 | A 82 | E | |
| $C_8H_{17}$—O— | —COO—$C_7H_{15}$ | K 87 | C 46 | A 83 | E | |
| $C_8H_{17}$—O— | —COO—$C_8H_{17}$ | K 80 | A 80 | I | | |
| $C_8H_{17}$—O— | —COO—$C_9H_{19}$ | K 79 | A 80 | I | | |
| $C_8H_{17}$—O— | —COO—$C_{10}H_{21}$ | K 75 | A 79 | I | | |
| $C_8H_{17}$—O— | —COO—$C_{11}H_{23}$ | K 74 | A 79 | I | | |
| $C_8H_{17}$—O— | —COO—$C_{12}H_{25}$ | K 78 | A 76 | I | | |
| $C_8H_{17}$—O— | —COO—$C_{13}H_{27}$ | K 77 | A 76 | I | | |
| $C_8H_{17}$—O— | —COO—$C_{14}H_{29}$ | K 80 | A 74 | I | | |
| $C_8H_{17}$—O— | —COO—$C_{15}H_{31}$ | K 77 | A 74 | I | | |
| $C_8H_{17}$—O— | —COO—$C_{16}H_{33}$ | K 83 | A 72 | I | | |
| $C_8H_{17}$—O— | —COO—$C_{17}H_{35}$ | K 81 | A 72 | E | | |
| $C_8H_{17}$—O— | —COO—$C_{18}H_{37}$ | K 80 | A 70 | E | | |
| $C_8H_{17}$—O— | —COO—$C_{19}H_{39}$ | K 81 | A 69 | E | | |
| $C_9H_{19}$—O— | —COO—$CH_3$ | K 124 | E 123 | B 129 | A 129 | I |
| $C_9H_{19}$—O— | —COO—$C_2H_5$ | K 78 | E 81 | B 91 | A 106 | I |
| $C_9H_{19}$—O— | —COO—$C_3H_7$ | K 67 | B 63 | A 99 | I | |
| $C_9H_{19}$—O— | —COO—$C_4H_9$ | K 64 | C 56 | A 86 | E | |
| $C_9H_{19}$—O— | —COO—$C_5H_{11}$ | K 62 | C 55 | A 86 | E | |
| $C_9H_{19}$—O— | —COO—$C_6H_{13}$ | K 71 | C 57 | A 83 | E | |
| $C_9H_{19}$—O— | —COO—$C_7H_{15}$ | K 84 | C 54 | A 82 | E | |
| $C_9H_{19}$—O— | —COO—$C_8H_{17}$ | K 86 | C 136 | A <84 | E | |
| $C_{10}H_{21}$—O— | —COO—$CH_3$ | K 122 | E 117 | B 124 | A 124 | I |
| $C_{10}H_{21}$—O— | —COO—$C_2H_5$ | K 71 | E 80 | B 90 | A 104 | I |
| $C_{10}H_{21}$—O— | —COO—$C_3H_7$ | K ? | B 67.9 | A 99 | I | |

TABLE 33

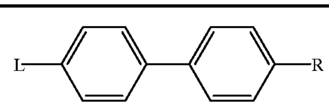

| L | | | | LC | |
|---|---|---|---|---|---|
| $C_{10}H_{21}$—O— | —COO—$C_4H_9$ | K 54 | C 49 | A 82 | I |
| $C_{10}H_{21}$—O— | —COO—$C_5H_{11}$ | K 66 | C 53 | A 82 | I |
| $C_{10}H_{21}$—O— | —COO—$C_6H_{13}$ | K 60 | C 67 | A 84 | I |
| $C_{10}H_{21}$—O— | —COO—$C_7H_{15}$ | K 74 | C 66 | A 80 | E |
| $C_{10}H_{21}$—O— | —COO—$C_8H_{17}$ | K 83 | C 67 | A 78 | E |

TABLE 33-continued

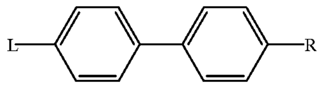

| L | | | | | LC | |
|---|---|---|---|---|---|---|
| $C_{10}H_{21}$—O— | —COO—$C_9H_{19}$ | K 86 | C 52 | A ? | E | |
| $C_{10}H_{21}$—O— | —COO—$C_{10}H_{21}$ | K 85 | C 54 | A ? | E | |
| $C_{12}H_{25}$—O— | —COO—$CH_3$ | K 122.5 | S 124 | I | | |
| $C_{12}H_{25}$—O— | —COO—$C_2H_5$ | K 80.5 | S 102.5 | I | | |
| $C_{12}H_{25}$—O— | —COO—$C_3H_7$ | K 71 | S 97 | I | | |
| $C_{12}H_{25}$—O— | —COO—$C_6H_{13}$ | K 69 | G 57.8 | C 67.5 | A 801 | I |
| $C_{12}H_{25}$—O— | —COO—$C_7H_{15}$ | K 77 | G 72 | C 74 | A 81 | I |
| $C_{12}H_{25}$—O— | —COO—$C_4H_{17}$ | K 76.3 | C 72.6 | A 80 | I | |
| $C_{14}H_{29}$—O— | —COO—$C_6H_{13}$ | K 68 | G 58.8 | C 68.2 | A 81 | I |
| $C_{14}H_{29}$—O— | —COO—$C_7H_{15}$ | K 71.2 | C 72.5 | A 82.5 | I | |
| $C_{14}H_{29}$—O— | —COO—$C_8H_{17}$ | K 76 | C 72.5 | A 80.5 | I | |
| $C_{16}H_{33}$—O— | —COO—$C_2H_{15}$ | K 88 | B 82 | A 94 | I | |
| $C_{16}H_{33}$—O— | —COO—$C_3H_7$ | K 80 | B 46 | A 89 | E | |
| $C_{16}H_{33}$—O— | —COO—$C_4H_9$ | K 78 | A 79 | I | | |
| $C_{16}H_{33}$—O— | —COO—$C_5H_{11}$ | K 79 | G 40 | A 81 | E | |
| $C_{16}H_{33}$—O— | —COO—$C_6H_{13}$ | K 75 | G 60 | A 78 | E | |
| $C_{16}H_{33}$—O— | —COO—$C_7H_{15}$ | K 77 | G 72 | A 80 | I | |
| $C_{16}H_{33}$—O— | —COO—$C_8H_{17}$ | K 74 | G 76 | A 78 | I | |
| $C_{16}H_{33}$—O— | —COO—$C_9H_{19}$ | K 83 | G 78 | A 80 | I | |
| $C_{16}H_{33}$—O— | —COO—$C_{10}H_{21}$ | K 83 | G 77 | A 78 | E | |
| $C_{16}H_{33}$—O— | —COO—$C_{11}H_{23}$ | K 86 | G 72 | A 79 | E | |
| $C_{16}H_{33}$—O— | —COO—$C_{12}H_{25}$ | K 89 | G 64 | A 77 | E | |
| $C_{16}H_{33}$—O— | —COO—$C_{13}H_{27}$ | K 91 | G 40 | A 78 | E | |
| $C_{18}H_{37}$—O— | —COO—$C_2H_5$ | K 72 | B 55 | A 78 | E | |
| $C_{18}H_{37}$—O— | —COO—$C_3H_7$ | K 83 | A 86 | I | | |

TABLE 34

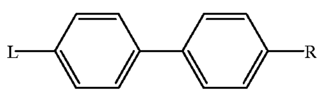

| LCReg | L | R | | | Phases | | |
|---|---|---|---|---|---|---|---|
| 1271 | $C_{12}H_{25}$— | —CN | Cr 48.0 | A 58.5 | | | |
| 1276 | $C_5H_{11}$—O— | —CN | CrX 48.0 | Cr 53.0 | N 68.0 | | |
| 1277 | $C_6H_{13}$—O— | —CN | CrX 44.0 | Cr 57.0 | N 75.5 | | |
| 1278 | $C_7H_{15}$—O— | —CN | CrX 47.5 | Cr 53.5 | N 75.0 | | |
| 1279 | $C_8H_{17}$—O— | —CN | CrX 46.0 | CrX 51.0 | Cr 54.5 | A 67.0 | N 80.0 |
| 1280 | $C_9H_{19}$—O— | —CN | Cr 64.0 | A 77.5 | N 80.0 | | |
| 1281 | $C_{10}H_{21}$—O— | —CN | Cr 59.5 | A 84.0 | | | |
| 1282 | $C_{11}H_{23}$—O— | —CN | Cr 71.5 | A 87.5 | | | |
| 1283 | $C_{12}H_{25}$—O— | —CN | Cr 70.0 | A 90.0 | | | |
| 136 | $C_{16}H_{33}$—O— | —CN | CrX 70.0 | CrX 78.0 | Cr 81.3 | A 92.0 | |
| 41137 | $C_{20}H_{41}$—O— | —CN | (81.0) | Cr 89.7 | A 90.2 | | |
| 1303 | $C_5H_{11}$—NH— | —CN | Cr 86.3 | N 90.7 | | | |
| 1306 | $C_8H_{17}$—NH— | —CN | Cr 68.0 | S 82.0 | N 92.0 | | |
| 1307 | $C_9H_{19}$—NH— | —CN | Cr 84.0 | S 84.5 | N 87.5 | | |
| 1308 | $C_{10}H_{21}$—NH— | CN | Cr 84.0 | S 86.0 | N 94.5 | | |

TABLE 35

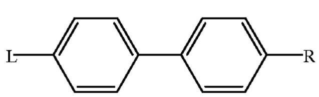

| L | R | Cr | | LC | |
|---|---|---|---|---|---|
| $C_{18}H_{37}$—O— | —COO—$C_4H_9$ | K 83 | A 78 | I | |
| $C_{18}H_{37}$—O— | —COO—$C_5H_{11}$ | K 83 | A 79 | I | |
| $C_{18}H_{37}$—O— | —COO—$C_6H_{13}$ | K 84 | G 50 | A 76 | E |
| $C_{18}H_{37}$—O— | —COO—$C_7H_{15}$ | K 82 | G 67 | A 78 | E |
| $C_{18}H_{37}$—O— | —COO—$C_8H_{17}$ | K 84 | G 75 | A 76 | E |

TABLE 35-continued

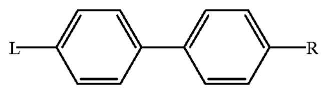

| L | R | Cr | LC | | |
|---|---|---|---|---|---|
| $C_{18}H_{37}$—O— | —COO—$C_9H_{19}$ | K 80 | G 77 | A 78 | I |
| $C_{18}H_{37}$—O— | —COO—$C_{10}H_{21}$ | K 84 | G 75 | A 76 | E |
| $C_{18}H_{37}$—O— | —COO—$C_{11}H_{23}$ | K 81 | G 66 | A 78 | E |
| $C_{18}H_{37}$—O— | —COO—$C_{12}H_{25}$ | K 88 | A 76 | E | |
| $C_5H_{11}$—O— | —COO—$C_6H_{13}$ | K 91 | L 121 | A 149.5 | I |
| $C_5H_{11}$—O— | —COO—$C_5H_{11}$ | K ? | E 97.7 | B 106 | I |
| $C_8H_{17}$—O— | —COO—$C_9H_{19}$ | K 67 | G 107 | F 108.5 | I |
| $C_8H_{17}$—O— | —COO—$C_{11}H_{23}$ | K 78 | G 105 | F 108.5 | I |
| $C_8H_{17}$—O— | —COO—$C_{13}H_{27}$ | K 82 | G 104 | F 108 | I |
| $C_7H_{15}$—NH— | —NH—$C_7H_{15}$ | K 96.8 | C 93 | M 103.8 | I |
| $C_8H_{17}$—NH— | —NH—$C_8H_{17}$ | K 99 | I 98.1 | C 110 | |
| | | | N 110.4 | I | |
| $C_9H_{19}$—NH— | —NH—$C_9H_{19}$ | K 93.8 | I 102 | C 112.8 | I |
| $C_{10}H_{21}$—NH— | —NH—$C_{10}H_{21}$ | K 97.1 | I 108.8 | C 116.8 | I |
| $C_{11}H_{23}$—NH— | —NH—$C_{11}H_{23}$ | K 85.4 | F 92.8 | I 109.9 | |
| | | | C 117 | I | |
| $C_{12}H_{25}$—NH— | —NH—$C_{12}H_{25}$ | K 96.4 | I 113.5 | C 117.8 | I |
| $C_{16}H_{33}$—NH— | —NH—$C_{16}H_{33}$ | K 103 | I 115.6 | I | |
| $C_{18}H_{37}$—NH— | —NH—$C_{18}H_{37}$ | K 105.2 | I 114.6 | I | |
| $CH_3$—O—$C_2H_4$—O— | —O—$C_2H_4$—O—$CH_3$ | K 127 | K 139 | I | |
| $C_2H_5$—O—$C_2H_4$—O— | —O—$C_2H_4$—O—$C_2H_5$ | K 75 | K 118 | I | |
| $C_6H_{13}$—OCOO—$C_2H_4$—O— | —O—$C_2H_4$—OCOO—$C_6H_{13}$ | K 83 | S 109 | I | |
| $C_7H_{15}$—OCOO—$C_2H_4$—O— | —O—$C_2H_4$—OCOO—$C_7H_{15}$ | K 77 | S 85 | I | |
| $C_8H_{17}$—OCOO—$C_2H_4$—O— | —O—$C_2H_4$—OCOO—$C_8H_{17}$ | K 83 | S 88 | I | |
| $CH_3$—OCCO—$C_8H_{12}$—O— | —O—$C_8H_{12}$—OCOO—$CH_3$ | K 107 | S 159 | I | |
| $C_2H_5$—OCOO—$C_8H_{12}$—O— | —O—$C_8H_{12}$—OCOO—$C_2H_5$ | K 96 | S 166 | I | |
| $C_3H_7$—OCOO—$C_8H_{12}$—O— | —O—$C_8H_{12}$—OCOO—$C_3H_7$ | K 95 | S 157 | I | |
| $C_4H_9$—OCOO—$C_8H_{12}$—O— | —O—$C_8H_{12}$—OCOO—$C_4H_9$ | K 90 | S 170 | I | |
| $C_5H_{11}$—OCOO—$C_8H_{12}$—O— | —O—$C_8H_{12}$—OCOO—$C_5H_{11}$ | K 89 | S 150 | I | |
| $C_6H_{13}$—OCOO—$C_8H_{12}$—O— | —O—$C_8H_{12}$—OCOO—$C_6H_{13}$ | K 89 | S 168 | I | |
| $C_7H_{15}$—OCOO—$C_8H_{12}$—O— | —O—$C_8H_{12}$—OCOO—$C_7H_{15}$ | K 85 | S 150 | I | |
| $C_8H_{17}$—OCOO—$C_8H_{12}$—O— | —O—$C_8H_{12}$—OCOO—$C_8H_{17}$ | K 88 | S 172 | I | |
| $C_9H_{19}$—CO— | —CO—$C_9H_{19}$ | K 149.3 | C 147.6 | I | |
| $C_{10}H_{21}$—CO— | —CO—$C_{10}H_{21}$ | K 141 | S 142 | I | |
| $C_5H_{11}$—CO— | —OOC—$C_5H_{11}$ | K 87.5 | E 91 | B 111.5 | |
| | | | A 140 | I | |
| $C_2H_5$—CO— | —NHOC—$C_3H_7$ | K 233 | S 225 | I | |
| $C_2H_5$—OOC— | —COO—$C_2H_5$ | K 114 | X <? | U | |

TABLE 36

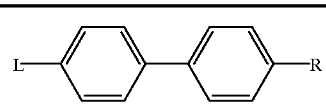

| L | R | Cr | LC | | |
|---|---|---|---|---|---|
| $CH_3$—OOC— | —OOC—$C_4H_9$ | K 86.5 | | | |
| $C_2H_5$—OOC— | —OOC—$C_4H_9$ | K 96 | | | |
| $C_3H_7$—OOC— | —OOC—$C_4H_9$ | K 59.6 | | | |
| $C_4H_9$—OOC— | —OOC—$C_4H_9$ | K 60.3 | S 63.4 | L 64.9 | |
| | | | A 74.4 | I | |
| $C_5H_{11}$—OOC— | —OOC—$C_4H_9$ | K 49.7 | S 52.8 | L 55.4 | |
| | | | A 70.2 | I | |
| $C_6H_{13}$—OOC— | —OOC—$C_4H_9$ | K 49.1 | L 56.7 | A 68.4 | I |
| $C_7H_{15}$—OOC— | —OOC—$C_4H_9$ | K 47.3 | L 52.6 | A 66.6 | I |
| $C_7H_{15}$—OOC— | —OOC—$C_5H_{11}$ | K 50 | B 80.5 | A 83 | I |
| $C_7H_{15}$—OOC— | —OOC—$C_7H_{15}$ | K 57 | B 76.5 | A 79 | I |
| $C_8H_{17}$—OOC— | —OOC—$C_4H_9$ | K 61.4 | L 52.3 | A 66.6 | I |
| $C_8H_{17}$—OOC— | —OOC—$C_7H_{15}$ | K 52 | B 70.5 | A 76 | I |
| $C_8H_{17}$—OOC— | —OOC—$C_9H_{19}$ | K 49 | B 82 | A 85 | I |
| $C_9H_{19}$—OOC— | —OOC—$C_4H_9$ | K 49.6 | B 48.4 | A 61.8 | I |
| $C_{10}H_{21}$—OOC— | —OOC—$C_4H_9$ | K 68.4 | A 60.2 | I | |
| $C_{10}H_{21}$—OOC— | —OOC—$C_5H_{11}$ | K 55 | B 65 | A 68 | I |

TABLE 36-continued

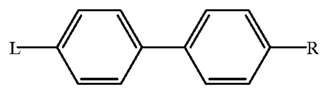

| L | R | | Cr | | LC | |
|---|---|---|---|---|---|---|
| $C_{10}H_{21}$—OOC— | —OOC—$C_9H_{19}$ | | K 62.5 | B 77.5 | A 81 | I |
| $C_{11}H_{23}$—OOC— | —OOC—$C_4H_9$ | | K 59.8 | A 62.8 | I | |
| $C_8H_{17}$—COO— | —COO—$CH_2$—CHMe—O—$CH_3$ | 1 | K 49.6 | A 48.3 | I | |
| $C_8H_{17}$—COO— | —COO—$CH_2$—CHMe—O—$C_3H_7$ | 1 | K 28 | I* 21.1 | A 44.2 | I |
| $C_8H_{17}$—COO— | —COO—$CH_2$—CHMe—O—$C_6H_{13}$ | 1 | K ? | A 39.7 | I | |
| $C_9H_{19}$—COO— | —COO—$CH_2$—CHMe—O—$CH_3$ | 1 | K 35.8 | A 52.6 | I | |
| $C_9H_{19}$—COO— | —COO—$CH_2$—CHMe—O—$C_3H_7$ | 1 | K 33.1 | I* 28 | A 50 | I |
| $C_9H_{19}$—COO— | —COO—$CH_2$—CHMe—O—$C_6H_{13}$ | 1 | K 35.7 | A 44.4 | I | |
| $C_{10}H_{21}$—COO— | —COO—$CH_2$—CHMe—O—$CH_3$ | 1 | K 53 | A 54.4 | I | |
| $C_{10}H_{21}$—COO— | —COO—$CH_2$—CHMe—O—$C_3H_7$ | 1 | K 39.8 | I* 32.1 | A 49.6 | I |
| $C_{10}H_{21}$—COO— | —COO—$CH_2$—CHMe—O—$C_6H_{13}$ | 1 | K 38.9 | A 46.3 | I | |
| $C_{11}H_{23}$—COO— | —COO—$CH_2$—CHMe—O—$CH_3$ | 1 | K 47 | A 58 | I | |
| $C_{11}H_{23}$—COO— | —COO—$CH_2$—CHMe—O—$C_3H_7$ | 1 | K 47 | A 58 | I | |
| $C_{11}H_{23}$—COO— | —COO—$CH_2$—CHMe—O—$C_6H_{13}$ | 1 | K 47.1 | A 48.4 | I | |
| $C_{13}H_{27}$—COO— | —COO—$CH_2$—CHMe—O—$C_3H_7$ | 1 | K 58.2 | A 60.4 | I | |

TABLE 37

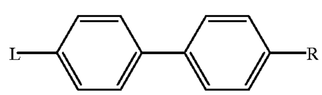

| LCReg | L | R | | Phses | |
|---|---|---|---|---|---|
| 1319 | $C_6H_{13}$—O—$C_2H_4$—O— | —CN | Cr 11.0 | N 19.0 | |
| 1322 | $C_2H_5$—O—$C_{11}H_{22}$—O— | —CN | Cr 51.0 | A 60.1 | |
| 1287 | $C_4H_9$—COO— | —CN | Cr 34.5 | N 65.0 | |
| 1288 | $C_5H_{11}$—COO— | —CN | CrX 52.0 | Cr 56.0 | N 72.0 |
| 1289 | $C_6H_{13}$—COO— | —CN | Cr 59.0 | N 71.0 | |
| 1291 | $C_8H_{17}$—COO— | —CN | Cr 42.5 | A 63.0 | N 76.0 |
| 1292 | $C_9H_{19}$—COO— | —CN | Cr 51.0 | A 76.0 | N 76.5 |
| 1328 | $C_5H_{11}$—OCOO— | —CN | Cr 51.0 | N 61.1 | |
| 1330 | $C_7H_{15}$—OCOO— | —CN | Cr 50.5 | N 65.2 | |
| 1331 | $C_8H_{17}$—OCOO— | —CN | Cr 52.4 | N 67.7 | |
| 1332 | $C_9H_{19}$—OCOO— | —CN | Cr 53.1 | A 68.1 | N 70.0 |
| 1333 | C10H21—OCOO— | —CN | Cr 60.0 | S 74.0 | |
| 1339 | $C_5H_{11}$— | —CH═CH—CN | Cr 80.0 | A 99.0 | N 147.1 |
| 57670 | $C_7H_{15}$— | —CH═CH—CN | Cr 75.0 | N 144.0 | |
| 1340 | $C_5H_{11}$— | —C≡C—CN | Cr 51.0 | N 120.2 | |

TABLE 38

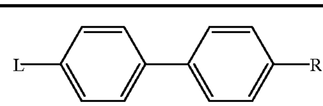

| LCReg | L | R | | Phases | |
|---|---|---|---|---|---|
| 61500 | $C_6H_{13}$—S | —NCS | Cr 76.0 | N 49.0 | B 78.0 |
| 61501 | $C_8H_{17}$—S— | —NCS | Cr 76.0 | B 77.0 | N =45.0 |
| 61502 | $C_{10}H_{21}$—S— | —NCS | Cr 68.0 | B 73.5 | N =47.0 |
| 60843 | $C_8H_{17}$—O— | —$C_5H_{10}$—CHMe—O—$C_2H_5$ | Cr ? | S 19.0 | S 21.0 |
| | | | S 44.0 | C* 47.0 | |
| 60061 | $C_8H_{17}$—O— | —$C_5H_{10}$—CHMe—O—$C_3H_7$ | Cr 14.0 | S 18.0 | S 37.0 |
| | | | C* 41.0 | | |
| 68951 | $C_6H_{13}$—O— | —O—$C_{12}H_{25}$ | Cr 104.4 | A 107.7 | |

TABLE 38-continued

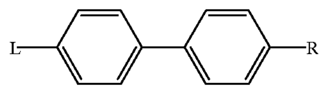

| LCReg | L | R | Phases | | |
|---|---|---|---|---|---|
| 69688 | $C_5H_{11}$—O— | —COO—$C_4H_9$ | Cr ? | B 72.3 | A 93.5 |
| 1902 | $C_{12}H_{25}$—O— | —COO—$C_2H_4$—CHMe—$C_2H_4$—CH═CMe—$CH_3$ | Cr ? | C* 46.8 | A 52.7 |
| 1907 | $C_8H_{17}$—O— | —COO—$CH_2$—CHMe—O—$C_4H_9$ | Cr 34.0 | X 36.0 | |
| 1908 | $C_8H_{17}$—O— | —COO—$CH_2$—CHMe—O—$C_7H_{15}$ | Cr 23.0 | X 39.0 | |
| 1910 | $C_{10}H_{21}$—O— | —COO—$C_3H_6$—CHMe—O—$C_8H_{17}$ | (26.0) | Cr 42.8 | A 32.9 |
| 1913 | $C_8H_{17}$—O— | —COO—CHMe—COO—$CH_3$ | Cr 57.0 | A 49.2 | |
| 1914 | $C_8H_{17}$—O— | —COO—CHMe—COO—$C_2H_5$ | Cr 39.5 | A 42.0 | |
| 1919 | $C_8H_{17}$—O— | —OOC—CFMe—$C_2H_5$ | Cr 69.5 | S 69.4 | A 77.5 |
| 1921 | $C_{10}H_{21}$—O— | —OOC—$CH_2$—CH(OH)—$C_6H_{13}$ | (81.0) | Cr 102.0 | S 118.0 |
| | | | B 137.0 | | |

TABLE 39

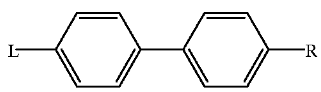

| LCReg | L | R | Phases | | | |
|---|---|---|---|---|---|---|
| 1428 | $C_6H_{13}$— | —NC | Cr 9.0 | X 19.0 | | |
| 59523 | $C_5H_{11}$—O— | —NC | Cr 61.0 | N 71.0 | | |
| 59524 | $C_6H_{13}$—O— | —NC | Cr 52.0 | N 78.0 | | |
| 59525 | $C_7H_{15}$—O— | —NC | Cr 45.0 | N 76.0 | | |
| 59526 | $C_8H_{17}$—O— | —NC | Cr 41.0 | A 48.0 | N 78.0 | |
| 59527 | $C_9H_{19}$—O— | —NC | Cr 56.0 | A 71.0 | N 80.0 | |
| 59528 | $C_{10}H_{21}$—O— | —NC | Cr 53.0 | A 79.0 | N 83.0 | |
| 59529 | $C_{11}H_{23}$—O— | —NC | Cr 64.0 | A 81.0 | | |
| 59530 | $C_{12}H_{25}$—O— | —NC | Cr 52.0 | A 84.0 | | |
| 1429 | $C_5H_{11}$— | —NCO | Cr 132.0 | N ? | | |
| 1430 | $C_5H_{11}$— | —NCS | Cr 53.0 | E 74.5 | N =50.0 | |
| 1432 | $C_7H_{15}$— | —NCS | Cr 60.0 | E 72.5 | B 73.5 | N =50.0 |
| 1433 | $C_4H_9$—O— | —NCS | Cr 116.5 | B 118.5 | N =82.0 | |
| 61498 | $C_2H_5$—S— | —NCS | Cr 77.5 | B 79.0 | N =43.0 | |
| 1434 | $C_4H_9$—S— | —NCS | Cr 78.5 | B 79.0 | N =44.0 | |

TABLE 40

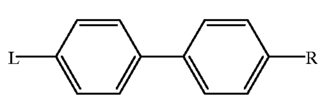

| LCReg | L | R | Phases | | | |
|---|---|---|---|---|---|---|
| 1395 | $C_8F_{17}$—$C_{11}H_{22}$—O— | —CN | Cr 100.0 | C 119.0 | A 146.0 | |
| 1363 | $C_3H_7$—CH═CH— | —CN | Cr 92.4 | N 125.5 | | |
| 1372 | $H_2C$═CH—O—$C_4H_8$—O— | —CN | Cr 73.3 | N 77.1 | | |
| 63649 | $H_2C$═CH—O—$C_8H_{16}$—O— | —CN | Cr 54.0 | N 70.8 | | |
| 63815 | $H_2C$═CH—O—$C_{10}H_{20}$—O— | —CN | Cr 65.4 | N 69.8 | | |
| 1364 | $H_2C$═CH—COO— | —CN | Cr 100.0 | N 130.0 | | |
| 1383 | $H_2C$═CH—$CH_2$—COO— | —CN | Cr 136.0 | N 166.0 | | |
| 1389 | $H_2C$═CH—$C_4H_8$—O— | —CN | Cr 36.8 | N 52.2 | | |
| 1390 | $H_2C$═CH—$C_4H_8$—COO— | —CN | Cr 49.8 | X 61.5 | | |
| 59533 | $H_2C$═CH—$C_6H_{12}$—O— | —CN | Cr 36.3 | N 59.3 | | |
| 59534 | $H_2C$═CH—$C_8H_{16}$—O— | —CN | Cr 42.4 | A 65.7 | N 69.8 | chg |
| 1391 | $H_2C$═CH—$C_8H_{16}$—COO— | —CN | Cr 50.0 | A 67.5 | N 73.0 | |
| 1392 | $H_2C$═CH—$C_9H_{18}$—O— | —CN | Cr 58.1 | A 74.3 | N 75.3 | |

TABLE 40-continued

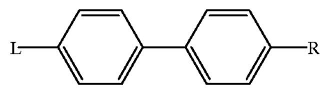

| LCReg | L | R | Phases | | |
|---|---|---|---|---|---|
| 1400 | $C_7H_{15}-C\equiv C-$ | | Cr 32.4 | A 50.1 | N 53.8 |
| 1401 | $C_8H_{17}-C\equiv C-$ | | Cr 35.0 | A 50.3 | |

TABLE 41

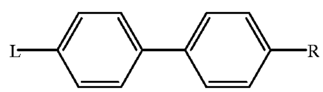

| L | R | | Cr | | LC | |
|---|---|---|---|---|---|---|
| $CH_3$—COO— | —OOC—$CH_3$ | | K 163 | X <? | I | |
| $C_5H_{11}$—COO— | —OOC—$C_5H_{11}$ | | K 117 | S 118 | I | |
| $C_6H_{13}$—COO— | —OOC—$C_6H_{13}$ | | K 105 | S 118 | I | |
| $C_7H_{15}$—COO— | —OOC—$C_7H_{15}$ | | K 93 | S 112 | I | |
| $C_8H_{17}$—COO— | —OOC—$C_8H_{17}$ | | K 95 | S 121 | I | |
| $C_9H_{19}$—COO— | —OOC—$C_9H_{19}$ | | K 98 | S 122 | I | |
| $C_5H_{11}$—COO— | —OOC—CHMe—CHMe—O—$CH_3$ | 1 | K 47 | C* 55 | I | |
| $C_6H_{13}$—COO— | —OOC—CHMe—CHMe—O—$CH_3$ | 1 | K 23 | S 31 | C* 39 | I |
| $C_7H_{15}$—COO— | —OOC—CHMe—CHMe—O—$CH_3$ | 1 | K 37 | C* 46 | I | |
| $C_8H_{17}$—COO— | —OOC—CHMe—CHMe—O—$CH_3$ | 1 | K 38 | C* 47 | I | |
| $C_9H_{19}$—COO— | —OOC—CHMe—CHMe—O—$C_4H_9$ | 1 | K 47 | S 49 | C* 56 | I |
| $CH_3$—OCOO— | —OCOO—$CH_3$ | | K 148 | X <? | I | |
| $C_2H_5$—OCOO— | —OCOO—$C_2H_5$ | | K 96 | X <? | I | |
| $C_4H_9$—COO—N═CMe— | —CMe═N—OOC—$C_4H_9$ | | K 111 | A 121 | I | |
| $C_8H_{17}$—COO—N═CMe— | —CMe═N—OOC—$C_8H_{17}$ | | K 104 | A 132 | I | |
| $C_8H_{17}$— | —O—CHMe—$C_6H_{13}$ | 1 | K ? | I | | |
| $C_7H_{15}$— | —OOC—CHMe—$C_2H_5$ | 1 | K 28.5 | S 57.3 | I | |
| $C_9H_{19}$—O— | —$C_2H_4$—COO—CHMe—$C_6H_{13}$ | 1 | K 72.4 | N* 145.9 | U | |
| $C_{12}H_{25}$—O— | —CO—CHMe—$C_3H_7$ | 2 | K 47 | A 49 | I | |
| $C_6H_{13}$—O— | —COO—CHMe—$C_2H_5$ | 1 | K 43 | A 36 | U | |
| $C_8H_{17}$—O— | —COO—CHMe—$C_2H_5$ | S | K 64.5 | C* 30 | A 53 | I |
| $C_9H_{19}$—O— | —COO—CHMe—$C_8H_{13}$ | 1 | K ? | C* ? | N* ? | U |
| $C_8H_{17}$—O— | —COO—CHMe—$CH_3$ | | K 75 | C 41 | A 69 | I |
| $C_8H_{17}$—O— | —COO—CHMe—$C_2H_5$ | 2 | K 67 | C 31 | A 50 | I |
| $C_8H_{17}$—O— | —COO—CHMe—$C_3H_7$ | 2 | K 43 | C 26 | A 36 | I |
| $C_8H_{17}$—O— | —COO—CHMe—$C_4H_9$ | 2 | K 49 | A 34 | E | |
| $C_8H_{17}$—O— | —COO—CHMe—$C_5H_{11}$ | 2 | K 61 | A 30 | E | |
| $C_8H_{17}$—O— | —COO—CHMe—$C_6H_{13}$ | 2 | K 57 | A 37 | E | |
| $C_8H_{17}$—O— | —COO—CHMe—$C_7H_{15}$ | 2 | K 61 | A 37 | E | |
| $C_6H_{13}$—O— | —COO—$CH_2$—CHCl—CHMe—$CH_3$ | 1 | K 46 | C* 15 | A 15 | U |

TABLE 42

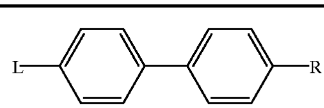

| L | R | | Cr | | | LC |
|---|---|---|---|---|---|---|
| $C_8H_{17}$—O— | —COO—$CH_2$—CHCl—CHMe—$CH_3$ | 1 | K 34 | C* 34 | A 54 | I |
| $C_9H_{19}$—O— | —COO—$CH_2$—CHCl—CHMe—$CH_3$ | 1 | K 39 | C* 44 | A 58 | I |
| $C_{10}H_{21}$—O— | —COO—$CH_2$—CHCl—CHMe—$CH_3$ | 1 | K 36 | C* 45 | A 58 | I |
| $C_{11}H_{23}$—O— | —COO—$CH_2$—CHCl—CHMe—$CH_3$ | 1 | K 55 | C* 49 | A 60 | I |
| $C_{12}H_{25}$—O— | —COO—$CH_2$—CHCl—CHMe—$CH_3$ | 1 | K 52 | C* 47 | A 61 | I |

TABLE 42-continued

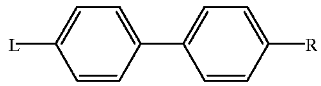

| L | R | | Cr | | | LC | | |
|---|---|---|---|---|---|---|---|---|
| $C_{13}H_{27}$—O— | —COO—$CH_2$—CHCl—CHMe—$CH_3$ | 1 | K 57 | A 61 | I | | | |
| $C_6H_{13}$—O— | —COO—$CH_2$—CHCl—CHMe—$C_2H_5$ | 3 | K 31 | C* 10 | A 40 | I | | |
| $C_7H_{15}$—O— | —COO—$CH_2$—CHCl—CHMe—$C_2H_5$ | 3 | K 75 | C* 39 | A 56 | I | | |
| $C_8H_{17}$—O— | —COO—$CH_2$—CHCl—CHMe—$C_2H_5$ | 3 | K 15 | S 16 | C* 32 | A 50 | I | |
| $C_9H_{19}$—O— | —COO—$CH_2$—CHCl—CHMe—$C_2H_5$ | 3 | K 27 | C* 40 | A 53 | I | | |
| $C_{10}H_{21}$—O— | —COO—$CH_2$—CHCl—CHMe—$C_2H_5$ | 3 | K 39 | C* 41 | A 54 | I | | |
| $C_{11}H_{23}$—O— | —COO—$CH_2$—CHCl—CHMe—$C_2H_5$ | 3 | K 35 | C* 42 | A 55 | I | | |
| $C_{12}H_{25}$—O— | —COO—$CH_2$—CHCl—CHMe—$C_2H_5$ | 3 | K 40 | C* 43 | A 57 | I | | |
| $C_{13}H_{27}$—O— | —COO—$CH_2$—CHCl—CHMe—$C_2H_5$ | 3 | K 45 | C* 47 | A 60 | I | | |
| $C_8H_{17}$—O— | —COO—CHMe—COO—CHMe—$C_6H_{13}$ | 3 | K 42 | A 21 | I | | | |
| $C_8H_{17}$—O— | —OOC—CHMe—$C_2H_5$ | 1 | K 69.4 | C* 84.4 | I | | | |
| $C_{10}H_{21}$—O— | —OOC—CHMe—$C_2H_5$ | S | K 74.8 | H 75.8 | C* 79.4 | A 83.2 | I | |
| $C_{11}H_{23}$—O— | —OOC—CHMe—$C_2H_5$ | 1 | K 7 | C* 72 | I | | | |
| $C_{12}H_{25}$—O— | —OOC—CHMe—$C_2H_5$ | 1 | K 6 | C* 69 | I | | | |
| $C_{14}H_{29}$—O— | —OOC—CHMe—$C_2H_5$ | 1 | K 8 | A 81.4 | I | | | |
| $C_7H_{15}$—O— | —OOC—CHF—CHMe—$CH_3$ | S | K 8 | S 105 | A 107 | I | | |
| $C_8H_{17}$—O— | —OOC—CHF—CHMe—$CH_3$ | S | K 9 | S 103 | N* 109 | I | | |
| $C_8H_{17}$—O— | —OOC—CHF—CHMe—$C_2H_5$ | 3 | K ? | C* ? | I | | | |
| $C_{10}H_{21}$—O— | —OOC—CHF—CHMe—$C_2H_5$ | 3 | K ? | I | | | | |
| $C_{12}H_{25}$—O— | —OOC—CHF—CHMe—$C_2H_5$ | 3 | K 61 | A 72 | I | | | |
| $C_8H_{17}$—O— | —OOC—CHF—CHMe—$C_2H_5$ | 5 | K 84 | C* 86 | A 94 | I | | |
| $C_{12}H_{25}$—O— | —OOC—CHF—CHMe—$C_2H_5$ | 5 | K 71 | C* 81 | A 93 | I | | |
| $C_6H_{13}$—O— | —OOC—CHCl—CHMe—$CH_3$ | 1 | K ? | G* 77.6 | A 83.3 | I | | |
| $C_7H_{15}$—O— | —OOC—CHCl—CHMe—$CH_3$ | 1 | K 72 | H 64 | G* 71 | C* 73 | A 81.5 | I |
| $C_8H_{17}$—O— | —OOC—CHCl—CHMe—$CH_3$ | 1 | K 76 | S 66 | C* 71 | A 83 | I | |

TABLE 43

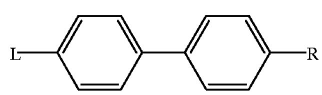

| L | R | | Cr | | | LC | |
|---|---|---|---|---|---|---|---|
| $C_9H_{19}$—O— | —OOC—CHCl—CHMe—$CH_3$ | 1 | K 80 | S 62.5 | C* 88 | A 82.5 | I |
| $C_{10}H_{21}$—O— | —OOC—CHCl—CHMe—$CH_3$ | 1 | K 82 | C* 69 | A 81 | I | |
| $C_{11}H_{23}$—O— | —OOC—CHCl—CHMe—$CH_3$ | S | K 86 | A 85 | I | | |
| $C_{12}H_{25}$—O— | —OOC—CHCl—CHMe—$CH_3$ | 1 | K 92 | A 85 | I | | |
| $C_7H_{15}$—O— | —OOC—CHCl—CHMe—$CH_3$ | 2 | K ? | G 70.2 | C 72.4 | A 82 | I |
| $C_5H_{11}$—O— | —OOC—CHCl—CHMe—$C_2H_5$ | 3 | K ? | C* 55 | A 64 | B | |
| $C_6H_{13}$—O— | —OOC—CHCl—CHMe—$C_2H_5$ | 3 | K 47 | S 48 | C* 51.5 | A 61 | I |
| $C_7H_{15}$—O— | —OOC—CHCl—CHMe—$C_2H_5$ | 3 | K 55 | C* 55 | A 62 | I | |
| $C_8H_{17}$—O— | —OOC—CHCl—CHMe—$C_2H_5$ | 3 | K 48 | S 36 | C 56 | A 66 | I |
| $C_9H_{19}$—O— | —OOC—CHCl—CHMe—$C_2H_5$ | 3 | K 52 | C* 53.5 | A 65 | I | |
| $C_{10}H_{21}$—O— | —OOC—CHCl—CHMe—$C_2H_5$ | 3 | K 50 | C* 43 | A 49 | U | |
| $C_{12}H_{25}$—O— | —OOC—CHCl—CHMe—$C_2H_5$ | 3 | K 62 | C* 66 | A 67 | I | |
| $C_{14}H_{29}$—O— | —OOC—CHCl—CHMe—$C_2H_5$ | 3 | K 66 | A 68 | I | | |
| $C_8H_{17}$—O— | —OOC—CHCl—CHMe—$C_2H_5$ | 5 | K ? | C* 59 | A 60 | I | |
| $C_6H_{13}$—O— | —OOC—CHBr—CHMe—$CH_3$ | S | K 64 | C* 67 | I | | |
| $C_8H_{17}$—O— | —OOC—CHBr—CHMe—$CH_3$ | S | K 35 | C* 48 | A 56 | I | |
| $C_{10}H_{21}$—O— | —OOC—CHBr—CHMe—$CH_3$ | S | K 55 | C* 57 | A 68 | I | |
| $C_{12}H_{25}$—O— | —OOC—CHBr—CHMe—$CH_3$ | S | K 69 | A 70 | I | | |
| $C_6H_{13}$—O— | —OOC—CHBr—CHMe—$C_2H_5$ | 3 | K ? | C* 55 | B | | |
| $C_8H_{17}$—O— | —OOC—CHBr—CHMe—$C_2H_5$ | 3 | K 20 | C* 42 | A 53 | I | |
| $C_{10}H_{21}$—O— | —OOC—CHBr—CHMe—$C_2H_5$ | 3 | K ? | C* 49 | A 58 | B | |
| $C_{12}H_{25}$—O— | —OOC—CHBr—CHMe—$C_2H_5$ | 3 | K ? | C* 47 | A 59 | B | |
| $C_8H_{17}$—O— | —OOC—CHMe—CHMe—$C_2H_5$ | 3 | K 48 | I* 36 | C* 53 | A 64 | I |
| $C_8H_{17}$—O— | —OCOO—$CH_2$—CHCl—CHMe—$C_2H_5$ | 3 | K 43 | C* 50 | I | | |
| 2($C_2H_5$—OOC)—CH—$C_6H_{12}$—O— | —O—CHMe—$C_6H_{13}$ | S | K −20 | X 19 | I | | |
| $C_5H_{11}$—COO— | —CO—CHMe—$C_2H_5$ | S | K ? | S 15 | S 32 | A 57 | I |
| $C_8H_{17}$—COO— | —CO—CHMe—$C_2H_5$ | S | K 47.8 | A 65.1 | I | | |
| $C_{13}H_{27}$—COO— | —CO—CHMe—$C_2H_5$ | S | K 69.4 | A 66.7 | I | | |
| $C_7H_{15}$—COO— | —COO—CHMe—$C_2H_5$ | R | K 46.7 | C* 22.4 | A 44.6 | I | |
| $C_8H_{17}$—COO— | —COO—CHMe—$C_2H_5$ | R | K 56.2 | C* 26.4 | A 45.6 | I | |

TABLE 44

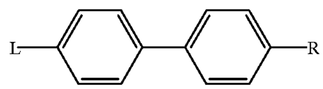

| L | R | | Cr | LC | | | |
|---|---|---|---|---|---|---|---|
| $C_8H_{17}$—COO— | —COO—CHMe—$C_3H_7$ | 1 | K 46.2 | A 38.4 | I | | |
| $C_8H_{17}$—COO— | —COO—CHMe—$C_4H_9$ | 1 | K 29.6 | A 32.6 | I | | |
| $C_8H_{17}$—COO— | —COO—CHMe—$C_5H_{11}$ | 1 | K 37 | A 31.9 | I | | |
| $C_8H_{17}$—COO— | —COO—CHMe—$C_6H_{13}$ | 1 | K 34.3 | A 26.3 | I | | |
| $C_8H_{17}$—COO— | —COO—CHMe—$C_7H_{15}$ | 1 | K 34 | A 28 | I | | |
| $C_9H_{19}$—COO— | —COO—$CHMe_{13}$—$C_2H_5$ | R | K 31.3 | J* 21.1 | C* 35.2 | | |
| | | | | A 48.9 | I | | |
| $C_{10}H_{21}$—COO— | —COO—$CHMe_{13}$—$C_2H_5$ | R | K 44.6 | J* 31.1 | C* 36.9 | | |
| | | | | A 48.5 | I | | |
| $C_{11}H_{23}$—COO— | —COO—$CHMe_{13}$—$C_2H_5$ | R | K 41.2 | J 38.6 | C* 41.2 | | |
| | | | | A 50.5 | I | | |
| $C_{12}H_{25}$—COO— | —COO—$CHMe_{13}$—$C_2H_5$ | R | K 43.5 | J* 41.3 | A 50 | I | |
| $C_{13}H_{27}$—COO— | —COO—$CHMe_{13}$—$C_2H_5$ | R | K 49.8 | J* 46.7 | A 52.7 | I | |
| $C_6H_{13}$—COO— | —COO—$CH_2$—CHCl—CHMe—$CH_3$ | 1 | K 46 | C* 15 | A 45 | I | |
| $C_8H_{17}$—COO— | —COO—$CH_2$—CHCl—CHMe—$CH_3$ | 1 | K 37 | I* 10 | C* 40 | A 54 | I |
| $C_9H_{19}$—COO— | —COO—$CH_2$—CHCl—CHMe—$CH_3$ | 1 | K ? | C* ? | I | | |
| $C_{10}H_{21}$—COO— | —COO—$CH_2$—CHCl—CHMe—$CH_3$ | 1 | K 36 | C* 45 | A 58 | I | |
| $C_6H_{13}$—COO— | —COO—$CH_2$—CHCl—CHMe—$C_2H_5$ | 3 | K 31 | C* 10 | A 40 | I | |
| $C_8H_{17}$—COO— | —COO—$CH_2$—CHCl—CHMe—$C_2H_5$ | 3 | K 36 | S 13 | C* 36 | A 49 | I |
| $C_{10}H_{21}$—COO— | —COO—$CH_2$—CHCl—CHMe—$C_2H_5$ | 3 | K 36 | C* 41 | A 52 | I | |
| $C_8H_{17}$—COO— | —COO—$CH_2$—CHCl—CHMe—$C_2H_5$ | 5 | K 6 | C* 37 | A 47 | I | |
| $C_8H_{17}$—COO— | —COO—$CH_2$—CH(OMe)—CHMe—$CH_3$ | R | K 25 | S 10 | C* 19 | A 39 | I |
| $C_8H_{17}$—COO— | —COO—$CH_2$—CH(OMe)—CHMe—$C_2H_5$ | 3 | K 38 | C* 18 | A 37 | I | |
| $C_8H_{17}$—COO— | —OOC—CHCl—CHMe—$CH_3$ | 1 | K 66 | S 85 | C* 95 | I | |
| $C_9H_{19}$—COO— | —OOC—CHCl—CHMe—$CH_3$ | 1 | K 68 | S 82 | C* 91 | A 92 | I |
| $C_6H_{13}$—COO— | —OOC—CHCl—CHMe—$C_2H_5$ | 3 | K 36 | S 51 | C* 67 | I | |
| $C_7H_{15}$—COO— | —OOC—CHCl—CHMe—$C_2H_5$ | 3 | K ? | C* ? | I | | |
| $C_8H_{17}$—COO— | —OOC—CHCl—CHMe—$C_2H_5$ | 3 | K 41 | S 49 | C* 71 | I | |
| $C_{10}H_{21}$—COO— | —OOC—CHCl—CHMe—$C_2H_5$ | 3 | K 48 | S 53 | C* 80 | I | |
| $C_6H_{13}$—COO— | —OCOO—$CH_2$—CHCl—CHMe—$C_2H_5$ | 3 | K 53 | S 49 | I | | |
| $C_8H_{17}$—COO— | —OCOO—$CH_2$—CHCl—CHMe—$C_2H_5$ | 3 | K 46 | S 46 | C* 53 | I | |
| $C_9H_{19}$—COO— | —OCOO—$CH_2$—CHCl—CHMe—$C_2H_5$ | 3 | K 54 | S 54 | C* 56 | I | |
| $C_8H_{17}$—OCOO— | —CO—CHMe—$C_2H_5$ | S | K 47.3 | A 41.6 | I | | |

TABLE 45

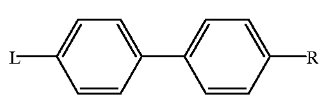

| L | R | | Cr | LC | | | |
|---|---|---|---|---|---|---|---|
| $CH_3$—OCOO— | —COO—CHMe—$C_6H_{13}$ | 1 | K <20 | I | | | |
| $C_9H_{19}$—OCOO— | —COO—$CH_2$—CHCl—CHMe—$CH_3$ | 1 | K 60 | C* 36 | I | | |
| $C_9H_{19}$—OCOO— | —OOC—CHCl—CHMe—$CH_3$ | 1 | K 50 | I* 55 | C* 58 | I | |
| $C_8H_{17}$—OCOO— | —OOC—CHCl—CHMe—$C_2H_5$ | 3 | K 29 | C* 29 | A 41 | I | |
| $C_9H_{19}$—OCOO— | —OOC—CHCl—CHMe—$C_2H_5$ | 3 | K 25 | I* 27 | C* 43 | I | |
| $C_8H_{17}$—OCOO— | —OOC—CHCl—CHMe—$C_2H_5$ | 5 | K 22 | I* 25 | C* 37 | I | |
| $C_9H_{19}$—OCOO— | —OOC—CHCl—CHMe—$C_2H_5$ | 5 | K 15 | I* 25 | C* 39 | I | |
| $C_8H_{17}$— | —CO—CH=CH—COO—$CH_2$—CHMe—$CH_3$ | | K 68.5 | N 43 | I | | |
| $C_7H_{15}$— | —OOC—$CH_2$—CHMe—$C_2H_5$ | S | K 40.4 | S 68.7 | I | | |
| $C_8H_{17}$—O— | —O—$CH_2$—CHMe—$C_2H_5$ | S | K 70.2 | S 83.7 | H 86 | I | |
| $C_{10}H_{21}$—O— | —O—$CH_2$—CHMe—$C_2H_5$ | S | K 76 | H 78.3 | C* 80.3 | I | |
| $C_{12}H_{25}$—O— | —O—$CH_2$—CHMe—$C_2H_5$ | S | K 75.3 | S 73.9 | H 77.4 | C* 78.9 | |
| | | | | A 79.8 | I | | |
| $C_8H_{17}$—O— | —CO—$CH_2$—CHMe—$C_2H_5$ | S | K 70.4 | C* 68.3 | A 98.3 | I | |
| $C_{12}H_{25}$—O— | —CO—$CH_2$—CHMe—$C_2H_5$ | 2 | K 74 | A 86 | I | | |
| $C_4H_9$—O— | —COO—$CH_2$—CHMe—$C_2H_5$ | S | K 55.5 | S 73.8 | I | | |
| $C_5H_{11}$—O— | —COO—$CH_2$—CHMe—$C_2H_5$ | S | K 57.5 | A 65.3 | I | | |
| $C_6H_{13}$—O— | —COO—$CH_2$—CHMe—$C_2H_5$ | S | K 48 | A 66 | I | | |
| $C_7H_{15}$—O— | —COO—$CH_2$—CHMe—$C_2H_5$ | S | K 41.5 | C* 43 | A 64.2 | I | |
| $C_8H_{17}$—O— | —COO—$CH_2$—CHMe—$C_2H_5$ | S | K 49.2 | C* 44 | A 65.9 | I | |
| $C_9H_{19}$—O— | —COO—$CH_2$—CHMe—$C_2H_5$ | S | K 60 | C* 38 | A 64.4 | I | |
| $C_{10}H_{21}$—O— | —COO—$CH_2$—CHMe—$C_2H_5$ | S | K 48.2 | C* 41.2 | A 66.2 | I | |

TABLE 45-continued

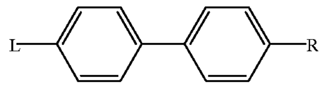

| L | R | | Cr | | LC | | |
|---|---|---|---|---|---|---|---|
| $C_{11}H_{23}$—O— | —COO—$CH_2$—CHMe—$C_2H_5$ | S | K 40 | C* 50 | A 63 | U | |
| $C_{12}H_{25}$—O— | —COO—$CH_2$—CHMe—$C_2H_5$ | S | K 53.2 | C* 39 | A 63.8 | I | |
| $C_{13}H_{27}$—O— | —COO—$CH_2$—CHMe—$C_2H_5$ | S | K 50 | C* 51 | A 64 | U | |
| $C_{14}H_{29}$—O— | —COO—$CH_2$—CHMe—$C_2H_5$ | S | K 61.1 | A 61.7 | I | | |
| $C_6H_{13}$—O— | —COO—$CH_2$—CHCl—$CH_2$—CHMe—$CH_3$ | 1 | K 36 | C* 4 | A 30 | I | |
| $C_8H_{17}$—O— | —COO—$CH_2$—CHCl—$CH_2$—CHMe—$CH_3$ | 1 | K 35 | S 0 | C* 30 | A 40 | I |
| $C_9H_{19}$—O— | —COO—$CH_2$—CHCl—$CH_2$—CHMe—$CH_3$ | 1 | K 50 | C* 36 | A 45 | I | |
| $C_{10}H_{21}$—O— | —COO—$CH_2$—CHCl—$CH_2$—CHMe—$CH_3$ | 1 | K 28 | C* 40 | A 47 | I | |
| $C_{11}H_{23}$—O— | —COO—$CH_2$—CHCl—$CH_2$—CHMe—$CH_3$ | 1 | K 35 | A 47 | I | | |

TABLE 46

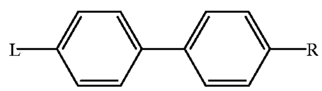

| L | R | | Cr | | LC | | |
|---|---|---|---|---|---|---|---|
| $C_{12}H_{25}$—O— | —COO—$CH_2$—CHCl—$CH_2$—CHMe—$CH_3$ | 1 | K 48 | C* 42 | A 48 | I | |
| $C_8H_{17}$—O— | —OOC—$CH_2$—CHMe—$C_2H_5$ | S | K 56.2 | S 91.8 | C* 94.8 | I | |
| $C_{10}H_{21}$—O— | —OOC—$CH_2$—CHMe—$C_2H_5$ | S | K 65.7 | H 63.4 | C* 83.9 | A 99.8 | I |
| $C_{14}H_{29}$—O— | —OOC—$CH_2$—CHMe—$C_2H_5$ | S | K 77.5 | C* 83.4 | A 89.5 | I | |
| $C_5H_{11}$—O— | —OOC—CHCl—$CH_2$—CHMe—$CH_3$ | 1 | K ? | E 62.9 | L 71.3 | A 74.5 | I |
| $C_8H_{13}$—O— | —OOC—CHCl—$CH_2$—CHMe—$CH_3$ | 1 | K 71 | C* 65 | A 74 | I | |
| $C_7H_{15}$—O— | —OOC—CHCl—$CH_2$—CHMe—$CH_3$ | 1 | K 54 | C* 57 | A 67.5 | I | |
| $C_8H_{17}$—O— | —OOC—CHCl—$CH_2$—CHMe—$CH_3$ | 1 | K 64 | C* 56.5 | A 67 | I | |
| $C_9H_{19}$—O— | —OOC—CHCl—$CH_2$—CHMe—$CH_3$ | 1 | K 67 | C* 54 | A 66.5 | I | |
| $C_2H_5$—OOC— | —OOC—CHMe—O—$CH_2$—CHMe—$C_2H_5$ | 3 | K ? | I | | | |
| $C_7H_4$—COO— | —$CH_2$—CHMe—$C_2H_5$ | S | K 30 | B 66 | I | | |
| $C_4H_9$—COO— | —O—$CH_2$—CHMe—$C_2H_5$ | S | K 86 | B 85 | I | | |
| $C_9H_{19}$—COO— | —O—$CH_2$—CHMe—$C_2H_5$ | 1 | K ? | B 117 | I | | |
| $C_6H_{13}$—COO— | —COO—$CH_2$—CHMe—$C_2H_5$ | S | K 22.4 | C* 18.4 | A 51.9 | I | |
| $C_7H_{15}$—COO— | —COO—$CH_2$—CHMe—$C_2H_5$ | S | K 33.7 | C* 33.1 | A 57.1 | I | |
| $C_8H_{17}$—COO— | —COO—$CH_2$—CHMe—$C_2H_5$ | S | K 35.9 | C* 41.8 | A 59.7 | I | |
| $C_9H_{19}$—COO— | —COO—$CH_2$—CHMe—$C_2H_5$ | S | K 34.2 | C* 47.4 | A 61.6 | I | |
| $C_{10}H_{21}$—COO— | —COO—$CH_2$—CHMe—$C_2H_5$ | S | K 43.9 | C* 49.6 | A 62.3 | I | |
| $C_{11}H_{23}$—COO— | —COO—$CH_2$—CHMe—$C_2H_5$ | S | K 45 | C* 50.4 | A 63.8 | I | |
| $C_{12}H_{25}$—COO— | —COO—$CH_2$—CHMe—$C_2H_5$ | S | K 41.2 | C* 50.5 | A 63.6 | I | |
| $C_{13}H_{27}$—COO— | —COO—$CH_2$—CHMe—$C_2H_5$ | S | K 52.9 | C* 51.1 | A 64.8 | I | |
| $C_{15}H_{31}$—COO— | —COO—$CH_2$—CHMe—$C_2H_5$ | S | K 60.9 | A 64.2 | I | | |
| $C_6H_{13}$—COO— | —COO—$CH_2$—CHCl—$CH_2$—CHMe—$CH_3$ | 1 | K 34 | C* 4 | A 38 | I | |
| $C_8H_{17}$—COO— | —COO—$CH_2$—CHCl—$CH_2$—CHMe—$CH_3$ | 1 | K 35 | S 0 | C* 30 | A 40 | I |
| $C_{10}H_{21}$—COO— | —COO—$CH_2$—CHCl—$CH_2$—CHMe—$CH_3$ | 1 | K 28 | C* 40 | A 46 | I | |
| $C_8H_{17}$—COO— | —COO—$CH_2$—CH(OMe)—$CH_2$—CHMe—$CH_3$ | 1 | K 31.7 | A 31.7 | I | | |
| $C_4H_{19}$—COO— | —COO—$CH_2$—CH(OMe)—$CH_2$—CHMe—$CH_3$ | 1 | K 38.2 | A 37.2 | I | | |
| $C_{10}H_{21}$—COO— | —COO—$CH_2$—CH(OMe)—$CH_2$—CHMe—$CH_3$ | 1 | K 41.5 | A 43.4 | I | | |
| $C_{12}H_{25}$—COO— | —COO—$CH_2$—CH(OMe)—$CH_2$—CHMe—$CH_3$ | 1 | K 51.7 | A 39.8 | E | | |
| $C_8H_{17}$—COO— | —OOC—CHCl—$CH_2$—CHMe—$CH_3$ | 1 | K 55 | S 55 | C* 68 | A 70 | I |

TABLE 47

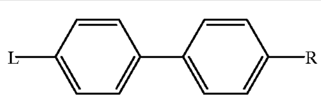

| LCReg | L | R | | | Phases | |
|---|---|---|---|---|---|---|
| 41228 | $C_6H_{13}$—O— | —OOC—CHMe—CHMe—O—$CH_3$ | Cr 40.0 | C* 46.0 | N* 47.0 | |
| 41229 | $C_7H_{15}$—O— | —OOC—CHMe—CHMe—O—$CH_3$ | Cr 39.0 | C* 43.0 | N* 44.0 | |
| 1923 | $C_8H_{17}$—O— | —OOC—CHMe—CHMe—O—$CH_3$ | Cr 41.0 | S <2 | C* 46.0 | N* 49.0 |
| 41230 | $C_8H_{17}$—O— | —OOC—CHMe—CHMe—O—$C_3H_7$ | Cr 37.0 | C* 46.0 | N* 50.0 | |
| 1924 | $C_8H_{17}$—O— | —OOC—CHMe—CHMe—O—$C_4H_9$ | Cr 30.0 | C* 36.0 | N* 41.0 | |
| 2020 | $C_2H_5$—NH | —NH—$C_2H_5$ | Cr 116.0 | N 120.5 | | |

TABLE 47-continued

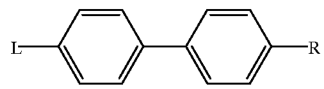

| LCReg | L | R | Phases | | |
|---|---|---|---|---|---|
| 2021 | $C_3H_7$—NH— | —NH—$C_3H_7$ | Cr 77.0 | N 70.5 | |
| 2022 | $C_4H_9$—NH— | —NH—$C_4H_9$ | CrX 58.5 | Cr 72.2 | N 96.5 |
| 2023 | $C_4H_9$—NH— | —NH—$C_7H_{15}$ | Cr 74.0 | N 96.5 | |
| 2024 | $C_5H_{11}$—NH— | —NH—$C_5H_{11}$ | Cr 84.0 | N 89.9 | |
| 2025 | $C_6H_{13}$—NH— | —NH—$C_6H_{13}$ | CrX 65.8 | CrX 69.2 | Cr 93.6 |
| | | | N 103.0 | | |
| 58373 | $C_4H_9$—NHCOO—$C_2H_4$—O— | —O—$C_2H_4$—OOCNH—$C_4H_9$ | Cr 147.0 | X 186.0 | |
| 68209 | $C_{14}H_{29}$—COO— | —OOC—$C_{14}H_{29}$ | Cr ? | B ? | |
| 68774 | $C_7H_{15}$—O— | —OOC—CHCl—CHMe—$C_2H_5$ | Cr 40.8 | C 53.8 | A 62.6 |
| 65200 | $C_5H_{11}$—COO— | —OOC—CHCl—$CH_2$—CHMe—$CH_3$ | Cr ? | X ? | |

TABLE 48

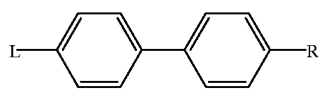

| L | R | | Cr | | LC | | |
|---|---|---|---|---|---|---|---|
| $C_9H_{19}$—COO— | —OOC—CHCl—$CH_2$—CHMe—$CH_3$ | 1 | K 54 | S 55 | C* 68 | A 71 | I |
| $C_8H_{17}$—OCOO— | —$CH_2$—CHMe—$C_2H_5$ | S | K 36.8 | C* 24.5 | N* 27 | I | |
| $C_6H_{13}$—OCOO— | —O—$CH_2$—CHMe—$C_2H_5$ | S | K 49 | C* 46 | I | | |
| $C_8H_{17}$—OCOO— | —O—$CH_2$—CHMe—$C_2H_5$ | S | K 55 | C* 47 | N* 49.5 | I | |
| $C_9H_{19}$—OCOO— | —O—$CH_2$—CHMe—$C_2H_5$ | S | K 59 | C* 46 | N* 49 | I | |
| $C_8H_{17}$—OCOO— | —OOC—CHCl—$CH_2$—CHMe—$CH_3$ | 1 | K 20 | I* 22 | C* 34 | I | |
| $C_9H_{19}$—OCOO— | —OOC—CHCl—$CH_2$—CHMe—$CH_3$ | 1 | K 0 | I* 21 | C* 35 | I | |
| $C_7H_{15}$—O— | —$C_2H_4$—CHMe—$C_2H_5$ | S | K 14.1 | S 54 | S 64.9 | I | |
| $C_8H_{17}$—O— | —$C_2H_4$—CHMe—$C_2H_5$ | S | K 43 | S 57.9 | H 62.5 | C* 85.1 | I |
| $C_9H_{19}$—O— | —$C_2H_4$—CHMe—$C_2H_5$ | S | K 58.4 | S 49.9 | H 59 | C* 62.7 | |
| | | | | A 63.5 | I | | |
| $C_{10}H_{21}$—O— | —$C_2H_4$—CHMe—$C_2H_5$ | S | K 47.3 | S 51 | H 53.6 | C* 58.9 | |
| | | | | A 62.9 | I | | |
| $C_{12}H_{25}$—O— | —CO—$C_2H_4$—CHMe—$CH_3$ | | K 98 | A 113 | I | | |
| $C_8H_{17}$—O— | —COO—$C_2H_4$—CHMe—$C_2H_5$ | S | K 59 | C* 58 | A 72 | I | |
| $C_9H_{19}$—O— | —COO—$C_2H_4$—CHMe—$C_2H_5$ | 1 | K 41 | S 45 | C* 53 | A 67 | U |
| $C_{10}H_{21}$—O— | —COO—$C_2H_4$—CHMe—$C_2H_5$ | 1 | K 45 | S 53 | C* 67 | A 74 | I |
| $C_8H_{17}$—O— | —OOC—$C_2H_4$—CHMe—$C_2H_5$ | 1 | K ? | G* 92.5 | A 93 | I | |
| $C_8H_{17}$—CO— | —OOC—$C_2H_4$—CHMe—$C_2H_5$ | 1 | K 74.2 | A 112 | U | | |
| $C_9H_{19}$—CO— | —OOC—$C_2H_4$—CHMe—$C_2H_5$ | 1 | K ? | S 68 | C* 99.8 | A 114.2 | U |
| $C_8H_{17}$—O— | —COO—$C_3H_8$—CHMe—$C_2H_5$ | 1 | K 38 | G* 62.2 | A 68 | I | |
| $C_8H_{17}$—O— | —COO—$C_2H_4$—CHMe—$C_3H_6$—CHMe—$CH_3$ | 1 | K 45 | C* 48 | A 58 | I | |
| $C_9H_{19}$—O— | —COO—$C_2H_4$—CHMe—$C_3H_6$—CHMe—$CH_3$ | 1 | K 53 | A 54 | I | | |
| $C_{12}H_{25}$—O— | —COO—$C_2H_4$—CHMe—$C_3H_6$—CHMe—$CH_3$ | S | K 50 | C* 47 | A 53 | I | |
| $C_7H_{17}$—COO— | —COO—$C_2H_4$—CHMe—$C_3H_6$—CHMe—$CH_3$ | S | K 24.2 | B 41.3 | A 55.7 | I | |
| $C_8H_{19}$—COO— | —COO—$C_2H_4$—CHMe—$C_3H_6$—CHMe—$CH_3$ | S | K 36.6 | G* 38.5 | C* 43.9 | A 55 | I |
| $C_9H_{19}$—COO— | —COO—$C_2H_4$—CHMe—$C_3H_6$—CHMe—$CH_3$ | S | K 40.9 | G* 39.8 | C* 51.5 | | |
| | | | | A 56.4 | I | | |
| $C_{10}H_{21}$—COO— | —COO—$C_2H_4$—CHMe—$C_3H_6$—CHMe—$CH_3$ | S | K 45.3 | G 42.9 | C* 53.6 | | |
| | | | | A 56.9 | I | | |
| $C_{11}H_{23}$—COO— | —COO—$C_2H_4$—CHMe—$C_3H_6$—CHMe—$CH_3$ | S | K 51.2 | G* 46.6 | C* 55.9 | | |
| | | | | A 56.5 | I | | |
| $C_{12}H_{25}$—COO— | —COO—$C_2H_4$—CHMe—$C_3H_6$—CHMe—$CH_3$ | S | K 57.8 | A 55.5 | I | | |
| $C_{10}H_{21}$— | —O—$C_4H_9$—CHMe—$C_3H_7$ | 2 | K 22 | C 60.5 | I | | |
| $C_{10}H_{21}$— | —O—$C_5H_{10}$—CHMe—$C_2H_5$ | 2 | K 28.5 | C 69.5 | I | | |

TABLE 49

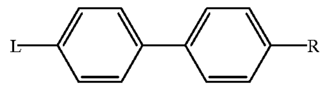

| L | R | | Cr | | | LC | | |
|---|---|---|---|---|---|---|---|---|
| $C_8H_{17}$—O— | —OOC—CHF—$C_6H_{13}$ | 1 | K ? | C* ? | I | | | |
| $C_5H_{11}$—O— | —OOC—CHCl—$C_2H_5$ | 1 | K 103.5 | G* 107 | I | | | |
| $C_6H_{13}$—O— | —OOC—CHCl—$C_2H_5$ | 1 | K 96 | H 87 | G* 103 | A 107 | I | |
| $C_7H_{15}$—O— | —OOC—CHCl—$C_2H_5$ | 1 | K 91.5 | H 80 | G* 93 | F* 96 | A 104 | I |
| $C_8H_{17}$—O— | —OOC—CHCl—$C_2H_5$ | 1 | K 98 | H 71 | G* 91 | F* 95 | A 104 | I |
| $C_9H_{19}$—O— | —OOC—CHCl—$CH_3$ | S | K ? | G* <? | I | | | |
| $C_9H_{19}$—O— | —OOC—CHCl—$C_2H_5$ | 1 | K 100 | G* 85 | F* 96 | A 102.5 | I | |
| $C_{10}H_{21}$—O— | —OOC—CHCl—$C_2H_5$ | 1 | K 100 | G* 82 | F* 95 | A 101 | I | |
| $C_{12}H_{25}$—O— | —OOC—CHCl—$C_2H_5$ | 1 | K 96 | G* 74 | F* 95 | A 100 | I | |
| $C_9H_{19}$—COO— | —OOC—CHCl—$C_2H_5$ | 1 | K 123 | S 132 | I | | | |
| $C_8H_{17}$—OCOO— | —OOC—CHCl—$C_2H_5$ | 1 | K 62 | I* 70 | C* 80 | I | | |
| $C_8H_{17}$— | —COO—$CH_2$—CHCl—$CH_3$ | 1 | K 38.5 | A 34 | I | | | |
| $C_5H_{11}$—O— | —COO—$CH_2$—CHCl—$CH_3$ | R | K 80 | A 92.5 | I | | | |
| $C_6H_{13}$—O— | —COO—$CH_2$—CHCl—$CH_3$ | R | K 73 | A 86.4 | I | | | |
| $C_7H_{15}$—O— | —COO—$CH_2$—CHCl—$CH_3$ | R | K 79 | A 86.7 | I | | | |
| $C_8H_{17}$—O— | —COO—$CH_2$—CHCl—$CH_3$ | R | K 77.5 | A 86.2 | I | | | |
| $C_9H_{19}$—O— | —COO—$CH_2$—CHCl—$CH_3$ | R | K 84 | A 86.7 | I | | | |
| $C_{10}H_{21}$—O— | —COO—$CH_2$—CHCl—$CH_3$ | R | K 82.8 | A 87 | I | | | |
| $C_{12}H_{25}$—O— | —COO—$CH_2$—CHCl—$CH_3$ | R | K 85.5 | A 86.1 | I | | | |
| $C_{10}H_{21}$—O— | —COO—$CH_2$—CHCl—$CH_3$ | 1 | K 96 | S 95 | S 108 | I | | |
| $C_8H_{17}$—COO— | —COO—$CH_2$—CHCl—$CH_3$ | 1 | K 61.3 | E 30.5 | B 69.7 | A 90.2 | I | |
| $C_8H_{17}$—COO— | —COO—$CH_2$—CHCl—$C_2H_5$ | S | K 25 | C* 22 | A 56 | I | | |
| $C_9H_{19}$—COO— | —COO—$CH_2$—CHCl—$CH_3$ | 1 | K 48.4 | A 80 | I | | | |
| $C_8H_{17}$—COO— | —COO—$C_2H_4$—CHCl—$CH_3$ | S | K 50.4 | J* 53.2 | I* 53.2 | A 65 | I | |
| $C_9H_{19}$—COO— | —COO—$C_2H_4$—CHCl—$CH_3$ | S | K 53.8 | J 57.4 | A 67.5 | I | | |
| $C_{10}H_{21}$—COO— | —COO—$C_2H_4$—CHCl—$CH_3$ | S | K 58.4 | J* 60.3 | A 68.2 | I | | |
| $C_{11}H_{23}$—COO— | —COO—$C_2H_4$—CHCl—$CH_3$ | S | K 66.2 | J 63.7 | A 69.3 | I | | |
| $C_{13}H_{27}$—COO— | —COO—$C_2H_4$—CHCl—$CH_3$ | S | K 70.6 | A 69.6 | I | | | |
| $C_4H_9$—O— | —CO—CHBr—$CH_3$ | 2 | K 97 | A 103 | I | | | |
| $C_5H_{11}$—O— | —CO—CHBr—$CH_3$ | 2 | K 91 | A 99 | I | | | |

TABLE 50

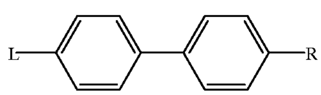

| L | R | | Cr | | LC | |
|---|---|---|---|---|---|---|
| $C_6H_{13}$—O— | —CO—CHBr—$CH_3$ | 2 | K 85 | A 99 | I | |
| $C_7H_{15}$—O— | —CO—CHBr—$CH_3$ | 2 | K 78 | A 103 | I | |
| $C_8H_{17}$—O— | —CO—CHBr—$CH_3$ | 2 | K 84 | A 103 | I | |
| $C_9H_{19}$—O— | —CO—CHBr—$CH_3$ | 2 | K 80 | A 103 | I | |
| $C_{10}H_{21}$—O— | —CO—CHBr—$CH_3$ | 2 | K 71 | A 103 | I | |
| $C_{12}H_{25}$—O— | —CO—CHBr—$C_3H_7$ | 2 | K 95 | A 78 | I | |
| $C_3H_7$— | —$CF_3$ | | K 97 | N −80 | E | |
| $C_3H_7$— | —O—$CF_3$ | | K 92 | N −60 | E | |
| $C_5H_{11}$— | —S—$CF_3$ | | K 31 | N −80 | E | |
| $C_5H_{11}$— | —O—$CH_2$—$CF_3$ | | K 107 | N −30 | E | |
| $C_5H_{11}$— | —CO—$CF_3$ | | K 13 | N −40 | E | |
| $C_4H_9$—O— | —$C_6F_{13}$ | | K 86 | S 104 | I | |
| $C_7H_{15}$—O— | —$CF_3$ | | K 69 | B 114.5 | I | |
| $C_8H_{17}$—O— | —$CF_3$ | | K 115 | N −20 | E | |
| $C_4H_9$—O— | —S—$CF_3$ | | K 82 | N −40 | E | |
| $C_8H_{17}$—O— | —COO—$CH_2$—$C_7F_{13}$ | | K 85 | C 109 | A 119 | I |
| $C_8H_{17}$—O— | —COO—$C_2H_4$—$C_4F_9$ | | K 108 | C 112 | I | |
| $C_8H_{17}$—O— | —COO—$C_2H_4$—$C_6F_{13}$ | | K 114 | C 125 | A 127 | I |
| $C_8H_{17}$—O— | —COO—$C_2H_4$—$C_8F_{17}$ | | K 122 | C 132 | A 141 | I |
| $C_8H_{17}$—O— | —COO—$C_2H_4$—$C_{10}F_{21}$ | | K 141 | A 152 | I | |
| $CH_3$—NH— | —$C_6F_{13}$ | | K 142 | S 168 | I | |
| $C_2H_5$—NH— | —$C_6F_{13}$ | | K 122 | S 174 | I | |
| $C_3H_7$—NH— | —$C_6F_{13}$ | | K 110 | S 134 | I | |
| $C_4H_9$—NH— | —$C_3F_7$ | | K 117 | S 123 | I | |
| $C_4H_9$—NH— | —$C_6F_{13}$ | | K 107 | S 145 | I | |

TABLE 50-continued

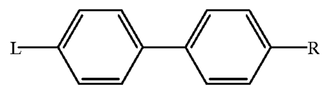

| L | R | Cr | | LC | |
|---|---|---|---|---|---|
| $C_5H_{11}$—NH— | —$C_3F_7$ | K 108 | S 111 | I | |
| $C_5H_{11}$—NH— | —$C_6F_{13}$ | K 108 | S 133 | I | |
| $C_8H_{17}$—NH— | —$C_6F_{13}$ | K 115 | S 113 | I | |
| $C_8H_{17}$—OOC— | —O—$C_2H_4$—$C_6F_{13}$ | K ? | C ? | A ? | I |
| $C_9H_{19}$—COO— | —$CF_3$ | K 63.3 | E 74 | B 108.3 | I |

TABLE 51

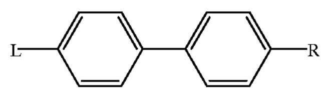

| L | R | | Cr | | CL | | |
|---|---|---|---|---|---|---|---|
| $C_3H_7$— | —O—$CF_2$—H | | K 84 | N −30 | E | | |
| $C_3H_7$— | —S—$CF_2$—H | | K 58 | N −70 | E | | |
| $C_7H_{15}$— | —SO—$CF_2$—H | 2 | K 72 | N −70 | E | | |
| $C_7H_{15}$— | —$SO_2$—$CF_2$—H | | K 50 | N −110 | E | | |
| $C_8H_{17}$—O— | —O—$CF_2$—H | | K 104 | N 21 | E | | |
| $C_8H_{17}$—O— | —COO—$CHCF_3$—$C_6H_{13}$ | 1 | K 45.5 | E 69 | A 74 | I | |
| $C_8H_{17}$—OCOO— | —OOC—$CH_2$—$CHCF_3$—$C_4H_9$ | 1 | K ? | S 5 | S 25 | I | |
| $C_8H_{17}$—O— | —COO—$C_2H_4$—$CHCF_3$—$C_4H_9$ | 1 | K 42 | A 35 | I | | |
| $C_5H_{11}$— | —CH═$CH_2$ | | K 122 | N 51.5 | U | | |
| $C_8H_{17}$— | —OOC—CH═CH—$C_5H_{11}$ | | K 36 | E 59 | B 66 | N 75 | I |
| $CH_3$—O— | —O—$C_{11}H_{22}$—O—CH═$CH_2$ | | K 95 | I | | | |
| $C_4H_9$—O— | —COO—$C_4H_8$—OOC—CH═$CH_2$ | | K ? | S 55 | I | | |
| $C_8H_{17}$—O— | —COO—$C_4H_8$—OOC—CH═$CH_2$ | | K 84.1 | S 91.7 | I | | |
| $C_8H_{17}$—O— | —OOC—$C_2H_4$—CHMe—$CH_2$—OOC—CH═$CH_2$ | 1 | K 48.7 | S 73.9 | I | | |
| $C_8H_{17}$— | —O—$CH_2$—CH═CH—$C_5H_{11}$ | | K 75 | E 93 | I | | |
| $CH_3$—O— | —O—$C_6H_{12}$—O—$CH_2$—CH═$CH_2$ | | K 101 | N 98 | I | | |
| $C_6H_{13}$—O— | —O—$C_6H_{12}$—O—$CH_2$—CH═$CH_2$ | | K 100 | S 99 | I | | |
| $CH_3$—O— | —O—$C_2H_4$—O—$C_2H_4$—O—$C_2H_4$—O—$CH_2$—CH═$CH_2$ | | K 73 | X 83 | I | | |
| $C_4H_9$—OOC—CHMe—OOC— | —O—$C_8H_{16}$—O—$CH_2$—CH═$CH_2$ | 1 | K 10 | A 20 | I | | |
| $CH_3$—O— | —OOC—$C_3H_6$—CH═$CH_2$ | | K 70 | N 76 | I | | |
| $C_2H_5$— | —$C_4H_8$—CH═$CH_2$ | | K ? | B 26.3 | I | | |
| $C_4H_9$— | —$C_4H_8$—CH═$CH_2$ | | K 24.4 | B 38.5 | I | | |
| $C_2H_5$— | —$C_6H_{12}$—CH═$CH_2$ | | K 9.4 | B 28.2 | I | | |
| $C_4H_9$— | —$C_6H_{12}$—CH═$CH_2$ | | K −24.6 | B 42.4 | I | | |
| $CH_3$—O— | —O—$C_6H_{12}$—CH═$CH_2$ | | K 96 | E 108 | I | | |
| $C_6H_{13}$—O— | —O—$C_6H_{12}$—CH═$CH_2$ | | K 113 | S 112 | I | | |
| $CH_3$—OOC— | —O—$C_6H_{12}$—CH═$CH_2$ | | K 103 | E 123 | S 127 | I | |
| $CH_3$—O— | —O—$C_8H_{16}$—CH═$CH_2$ | | K 81 | E 108 | I | | |
| $CH_3$—O— | —OOC—$C_8H_{16}$—CH═$CH_2$ | | K 75 | N 79 | I | | |

TABLE 52

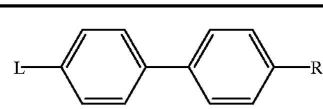

| L | R | | Cr | | LC | |
|---|---|---|---|---|---|---|
| $CH_3$—OOC— | —O—$C_8H_{16}$—CH═$CH_2$ | | K 95 | E 116 | I | |
| $CH_3$—OOC— | —OOC—$C_8H_{16}$—CH═$CH_2$ | | K 82 | I | | |
| $C_2H_5$—OOC—CHMe—OOC— | —O—$C_8H_{16}$—CH═$CH_2$ | 1 | K 48 | A 39 | U | |
| $C_6H_{13}$—O— | —O—$C_9H_{18}$—CH═$CH_2$ | | K 102 | S 102 | S 105 | I |

TABLE 52-continued

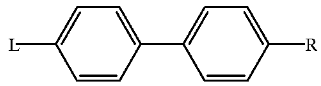

| L | R | | Cr | | LC | |
|---|---|---|---|---|---|---|
| $C_5H_{11}$— | —C≡C—H | | K 56.4 | S 82.7 | I | |
| $C_5H_{11}$— | —C≡C—$CH_3$ | | K 60.5 | S 83.4 | I | |
| $CH_3$—O— | —OOC—C≡C—C≡C—$C_{10}H_{21}$ | | K 54 | N 86 | I | |
| $CH_3$—O— | —O—$C_6H_{12}$—OOC—CH(—CH2—C≡C—H)$_2$ | | K 75 | S 106 | I | |
| $CH_3$—O— | —OOC—$C_3H_6$—C≡C—H | | K 92 | N 66.1 | I | |
| $CH_3$—O— | —OOC—$C_8H_{16}$—C≡C—H | | K 76.7 | N 65.6 | I | |
| $C_2H_5$—CHMe—CHF—$CH_2$—OOC— | —O—$C_{11}H_{22}$—O—CH═$CH_2$ | 3 | K 48.5 | S 32 | C* 34.7 | |
| | | | | A 54.3 | I | |
| $C_2H_5$—CHMe—Cl—$CH_2$—OOC— | —O—$C_2H_4$—O—CH═$CH_2$ | 3 | K 56.2 | I | | |
| $C_2H_5$—CHMe—Cl—$CH_2$—OOC— | —O—$C_6H_{12}$—O—CH═$CH_2$ | 3 | K 40 | C* 26.5 | A 55 | I |
| $C_2H_5$—CHMe—Cl—$CH_2$—OOC— | —O—$C_8H_{16}$—O—CH═$CH_2$ | 3 | K 39 | C* ? | A 51.3 | I |
| $C_2H_5$—CHMe—Cl—$CH_2$—OOC— | —O—$C_{11}H_{22}$—O—CH═$CH_2$ | 3 | K 41.9 | C* 21 | A 38.3 | I |
| $C_6H_{13}$—CHMe—O— | —O—$CH_2$—CH═$CH_2$ | 1 | K 77 | S 66 | I | |
| $C_2H_5$—CHMe—CHCl—COO— | —O—$CH_2$—CH═$CH_2$ | 3 | K 91 | I | | |
| $C_2H_5$—CHMe—CHCl—COO— | —O—$C_6H_{12}$—CH═$CH_2$ | 3 | K 41 | C* 35 | A 51 | I |
| $C_2H_5$—CHMe—CHCl—COO— | —O—$C_8H_{16}$—CH═$CH_2$ | 3 | K 49 | C* 33 | A 52 | I |
| $C_2H_5$—CHMe—CHCl—COO— | —O—$C_9H_{18}$—CH═$CH_2$ | 3 | K 36 | C* 46 | A 59 | I |
| $C_2H_5$—CHMe—$CH_2$— | —COO—$CH_2$—CHMe—$C_2H_5$ | 6 | K −4 | N* −70 | E | |
| $C_2H_5$—CHMe—$CH_2$— | —COO—$CH_2$—$C_7F_{15}$ | 1 | K 72 | A 101 | I | |
| $C_2H_5$—CHMe—$CH_2$—O— | —COO—$CH_2$—$C_7F_{15}$ | 1 | K ? | H 96 | A 115 | I |

TABLE 53

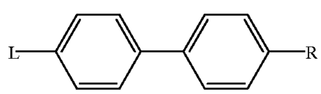

| L | | | | | | | | | | |
|---|---|---|---|---|---|---|---|---|---|---|
| $CH_3$—CHMe—$CH_2$—CHCl—COO— | —O—$CH_2$—$C_7F_{15}$ | 1 | K 88 | A 98 | I | | | | | |
| $C_2H_5$—CHMe—$CH_2$—O— | —O—$C_{11}H_{22}$—OOC—CH═$CH_2$ | S | K 62 | A 69 | I | | | | | |
| $C_2H_5$—CHMe—$CH_2$—OOC— | —O—$C_8H_{16}$—O—CH═$CH_2$ | S | K 37.6 | C* 30.2 | A 53.3 | I | | | | |
| $C_2H_5$—CHMe—$CH_2$—OOC— | —O—$C_2H_4$—OOC—CH═$CH_2$ | S | K 53 | A 49 | I | | | | | |
| $C_2H_5$—CHMe—$CH_2$—OOC— | —O—$C_6H_{12}$—OOC—CH═$CH_2$ | S | K 28 | C* 13 | A 36 | I | | | | |
| $C_2H_5$—CHMe—$CH_2$—OOC— | —O—$C_{10}H_{20}$—OOC—CH═$CH_2$ | S | K 48 | C* 42 | A 64 | I | | | | |
| $C_2H_5$—CHMe—$CH_2$—OOC— | —O—$C_{12}H_{24}$—OOC—CH═$CH_2$ | S | K 54.8 | A 43.7 | I | | | | | |
| $C_2H_5$—CHMe—$CH_2$—OOC— | —O—$C_8H_{12}$—CH═$CH_2$ | S | K 20 | C* 29 | A 53 | I | | | | |
| $C_2H_5$—CHMe—CHF—COO— | —OOC—$C_8H_{16}$—CH═$CH_2$ | S | K 44.5 | C* 41.7 | A ? | I | | | | |
| $C_2H_5$—CHMe—CHF—COO— | —OOC—CHF—$C_2H_5$ | 3 | K ? | S 162.1 | S 167 | I | | | | |
| $C_3H_7$—CHF—COO— | —OOC—CHF—$C_3H_7$ | 3 | K 102.4 | S 131.5 | I | | | | | |
| $C_6H_{13}$—CHF—$CH_2$—O— | —O—$C_4H_8$—$C_4F_9$ | 1 | K ? | S 47 | S 87 | S 91 | S 97 | C* 112 | A 130 I | |
| $CH_3$—CHCl—COO— | —OOC—CHCl—$CH_3$ | 3 | K 132.7 | S 162.4 | S 163.3 | I | | | | |
| $C_2H_5$—CHCl—COO— | —OOC—CHCl—$C_2H_5$ | 3 | K 82.8 | S 83 | S 102.2 | I | | | | |
| $CH_3$—CHCl—COO— | —O—$C_4H_8$—CH═$CH_2$ | 1 | K 99 | E 112.5 | B 118 | I | | | | |
| $CH_3$—CHCl—COO— | —O—$C_9H_{18}$—CH═$CH_2$ | 1 | K 112 | A 108 | I | | | | | |
| $C_8F_{17}$—$C_{11}H_{22}$—O— | —COO—$CH_2$—$CF_3$ | | K 95 | S 82 | A 113 | I | | | | |
| $C_8F_{17}$—$C_{11}H_{22}$—O— | —COO—$H_2$—$C_7F_{15}$ | | K 103 | C 115 | I | | | | | |
| $H_2C$═CH—$CH_2$—OOC—$C_5H_{10}$—O— | —COO—$C_3H_{10}$—O—$CH_2$—CH═$CH_2$ | | K 78 | I | | | | | | |
| $H_2C$═CH—$C_4H_9$—O— | —O—$C_4H_8$—CH═$CH_2$ | | K 51.2 | S 119.5 | I | | | | | |
| $C_5H_{11}$—C≡C— | —C≡C—$C_5H_{11}$ | | K 67.5 | S 86 | I | | | | | |
| $C_7H_{15}$—C≡C— | —C≡C—$C_7H_{15}$ | | K ? | S 73 | I | | | | | |

TABLE 54

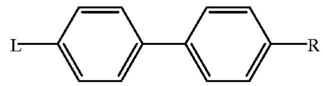

| LCReg | L | R | Phases | | | |
|---|---|---|---|---|---|---|
| 2392 | $C_2H_5$—O— | —O—$C_2H_4$—O—CH═$CH_2$ | (118.0) | Cr 132.0 | S 1380.0 | |
| 2435 | $C_6H_{13}$—O— | —O—$C_9H_{18}$—CH═$CH_2$ | CrX 77.0 | Cr 102.0 | S 102.0 | S 105 |
| 2499 | $C_8H_{17}$—O— | —COO—$CH_2$—CH/O¥CH(c)—$CH_3$ | (56.0) | Cr ? | A 97.0 | |
| 2500 | $C_8H_{17}$—O— | —COO—$CH_2$—CH/O¥CH(c)—$C_2H_5$ | (90.0) | Cr ? | A 96.5 | |
| 2501 | $C_8H_{17}$—O— | —COO—$CH_2$—CH/O¥CH(c)—$C_3H_7$ | (94.0) | Cr ? | A 98.0 | |
| 2502 | $C_{10}H_{21}$—O— | —COO—$CH_2$—CH/O¥CH(c)—$CH_3$ | (60.0) | Cr ? | A 91.4 | |
| 69160 | $CH_3$—CHMe—CHCl—COO— | —O—$C_9H_{18}$—CH═$CH_2$ | Cr 68.0 | A 70.0 | | |
| 69159 | $C_2H_5$—CHMe—$CH_2$—O— | —O—$C_8H_{16}$—O—CH═$CH_2$ | Cr 72.0 | E 71.0 | A 75.0 | |
| 2533 | $C_2H_5$—CHMe—$CH_2$—O— | —O—$C_6H_{12}$—OOC—CH═$CH_2$ | Cr 68.0 | S 61.0 | | |
| 63624 | $CH_3$—CHMe—$CH_2$—CHF—$CH_2$—OOC— | —O—$C_8H_{16}$—O—CH═$CH_2$ | CrX 28.7 | Cr 38.2 | C* 47.2 | A 60.5 |
| 62925 | $C_2H_5$—CHMe—$CH_2$—OOC— | —O—$C_6H_{12}$—CH═$CH_2$ | Cr 20.0 | C* 29.0 | A 53.0 | |
| 2539 | $C_2H_5$—CHMe—$CH_2$—OOC— | —OCO—$C_8H_{16}$—O—CH═$CH_2$ | (25.0) | Cr 44.5 | C* 41.7 | A |
| 69158 | $C_2H_5$—CHMe—$CH_2$—O— | —O—$C_9H_{18}$—CH═$CH_2$ | Cr 73.0 | G 72.0 | C* 74.0 | A 76.0 |
| 2555 | $H_2C$═CH—COO—$C_3H_6$—O— | —O—$C_3H_6$—OOC—CH═$CH_2$ | Cr 59.0 | X 68.0 | X 77.0 | |
| 65090 | $H_2C$/O¥CH—$CH_2$—O— | —O—$CH_2$—CH/O¥$CH_2$ | Cr 153.0 | N 160.0 | | |

TABLE

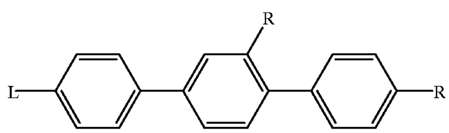

| LCReg | L | R | Phases | |
|---|---|---|---|---|
| 69766 | $C_{10}H_{21}$—O— | —$CH_2$—O—H | Cr 82.0 | A 128.0 |
| 69124 | $C_{10}H_{21}$—O— | —CONH—$C_2H_4$—O—H | Cr 115.0 | A 129.0 |
| 69121 | $C_{10}H_{21}$—O— | —CO—Cl | Cr 58.0 | N 40.0 |
| 69767 | $C_{10}H_{21}$—O— | —$CH_2$—Br | Cr 64.0 | N 66.0 |
| 69120 | $C_{10}H_{21}$—O— | —$CH_2$—O—$C_3H_7$ | Cr 68.0 | N 51.0 |
| 69122 | $C_{10}H_{21}$—O— | —COO—$CH_3$ | Cr 68.0 | N 73.0 |

TABLE 56

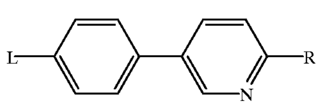

| LCReg | L | R | Phases | | |
|---|---|---|---|---|---|
| 4839 | NC— | —$C_9H_{19}$ | Cr 42.0 | S 54.0 | |
| 4840 | $C_3H_9$— | —CONH—H | Cr 174.0 | S 196.0 | |
| 4841 | $C_5H_{11}$— | —CONH—H | Cr 160.0 | S 183.0 | |
| 4842 | $C_6H_{13}$— | —CONH—H | Cr 176.0 | S 180.0 | |
| 4843 | $C_7H_{15}$— | —CONH—H | Cr 164.0 | S 180.0 | |
| 4844 | $C_8H_{17}$— | —CONH—H | Cr 172.0 | S 180.0 | |
| 4845 | $C_4H_9$—O— | —CONH—H | Cr 190.0 | S 212.0 | |
| 4846 | $C_5H_{11}$—O— | —CONH—H | Cr 190.0 | S 204.0 | |
| 4848 | $C_7H_{15}$—O— | —CONH—H | Cr 134.0 | S 192.0 | |
| 4849 | $C_8H_{17}$—O— | —CONH—H | Cr 148.0 | S 192.0 | |
| 4856 | $C_5H_{11}$—O— | —CN | Cr 69.0 | N 82.0 | |
| 4857 | $C_6H_{13}$—O— | —CN | Cr 80.0 | N 90.0 | |
| 4858 | $C_7H_{15}$—O— | —CN | Cr 62.0 | A 86.0 | N 91.0 |
| 4859 | $C_8H_{17}$—O— | —CN | Cr 84.0 | A 97.0 | |
| 4861 | $C_4H_9$— | —$C_9H_{19}$ | Cr 22.0 | S 39.5 | |

TABLE 57

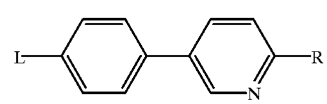

| LCReg | L | R | Phases | | |
|---|---|---|---|---|---|
| 4862 | $C_6H_{13}$— | —$C_4H_9$ | Cr 14.0 | S 48.0 | |
| 4863 | $C_6H_{13}$— | —$C_6H_{13}$ | Cr 25.0 | S 52.5 | is |
| 4864 | $C_5H_{11}$— | —O—$C_8H_{17}$ | Cr 35.0 | B 43.0 | N =0.0 |
| 4865 | $C_4H_9$—O— | —$C_4H_9$ | Cr 48.0 | S 88.0 | |
| 4866 | $C_4H_9$—O— | —$C_6H_{13}$ | Cr 48.0 | S 85.0 | |
| 4867 | $C_4H_9$—O— | —$C_9H_{19}$ | Cr 36.0 | S 81.0 | |
| 4868 | $C_6H_{13}$—O— | —$C_4H_9$ | Cr 38.0 | S 84.0 | |
| 4869 | $C_8H_{17}$—O— | —O—$C_8H_{17}$ | Cr 50.0 | B 69.0 | A 80.0 |
| 3636 | $C_3H_7$— | —NMe—$CF_3$ | Cr 54.0 | A 65.0 | |
| 63637 | $C_3H_7$—O— | —NMe—$CF_3$ | Cr 68.0 | A 95.0 | |
| 63638 | $C_6H_{13}$—O— | —NMe—$CF_3$ | Cr 48.0 | A 72.0 | |
| 63639 | $C_8H_{17}$—O— | —NMe—$CF_3$ | Cr 38.0 | A 65.0 | |

TABLE 58

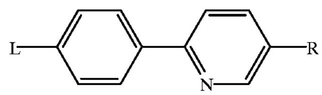

| L | R | Cr | | | LC | | | |
|---|---|---|---|---|---|---|---|---|
| $C_6H_{13}$— | —O—$C_4H_9$ | K 26 | S 44.5 | I | | | | |
| $C_8H_{17}$— | —O—$C_6H_{13}$ | K 57 | I 37 | C 58 | A 79 | I | | |
| $C_8H_{17}$— | —O—$C_8H_{17}$ | K 22 | S 37 | G 51 | F 62 | C 77 | A 85 | I |
| $C_8H_{17}$— | —OOC—$C_5H_{11}$ | K 64 | C 67 | N 70 | I | | | |
| $C_8H_{17}$— | —OOC—$C_6H_{13}$ | K 61 | C 77 | I | | | | |
| $C_8H_{17}$— | —OOC—$C_7H_{15}$ | K 41 | F 77 | C 85 | I | | | |
| $C_8H_{17}$— | —OOC—$C_8H_{17}$ | K 58 | G 46 | F 85 | C 88 | I | | |
| $C_8H_{17}$— | —OOC—$C_9H_{19}$ | K 36 | G 60 | F 92 | I | | | |
| $C_8H_{17}$— | —OOC—$C_{10}H_{21}$ | K 13 | G 66 | F 93 | I | | | |
| $C_8H_{17}$— | —OOC—$C_{11}H_{23}$ | K 26 | G 43 | F 96 | I | | | |
| $C_4H_9$—O— | —$C_4H_9$ | K 43 | S 62 | I | | | | |
| $C_4H_9$—O— | —$C_6H_{13}$ | K 50 | S 54 | N 61 | I | | | |
| $C_4H_9$—O— | —$C_8H_{17}$ | K 33 | B 57.3 | C 66.8 | A 69.4 | I | | |
| $C_5H_{11}$—O— | —$C_6H_{13}$ | K 20.5 | H 31.5 | G 45 | F 48.5 | C 58 | N 60.8 | I |
| $C_5H_{11}$—O— | —$C_7H_{15}$ | K 26.5 | G 35 | F 48 | C 67.5 | N 68.7 | I | |
| $C_5H_{11}$—O— | —$C_8H_{17}$ | K 37.4 | B 52 | C 70.1 | I | | | |
| $C_5H_{11}$—O— | —$C_9H_{19}$ | K 42.5 | B 65 | C 72.4 | A 74.5 | I | | |
| $C_5H_{11}$—O— | —$C_{10}H_{21}$ | K 44.4 | B 66.7 | C 70.4 | A 74.7 | I | | |
| $C_6H_{13}$—O— | —$C_3H_7$ | K 50 | S 72 | I | | | | |
| $C_6H_{13}$—O— | —$C_6H_{13}$ | K 22 | C 66 | N 69 | B | | | |
| $C_6H_{13}$—O— | —$C_7H_{15}$ | K 34 | H 31.2 | G 44.4 | F 53 | C 74.4 | N 75.2 | I |
| $C_6H_{13}$—O— | —$C_8H_{17}$ | K 30 | G 23 | I 58 | C 77 | I | | |
| $C_6H_{13}$—O— | —$C_9H_{19}$ | K 36 | B 64.4 | C 80.5 | I | | | |
| $C_6H_{13}$—O— | —$C_{10}H_{21}$ | K 30 | B 67.6 | C 80 | I | | | |
| $C_7H_{15}$—O— | —$C_5H_{11}$ | K 56.9 | S 61.8 | N 68.2 | I | | | |
| $C_7H_{15}$—O— | —$C_6H_{13}$ | K 40 | C 68 | B | | | | |
| $C_7H_{15}$—O— | —$C_7H_{15}$ | K 31 | G 40 | I 52 | C 77 | I | | |
| $C_7H_{15}$—O— | —$C_8H_{17}$ | K 38.5 | F 56 | C 76.5 | I | | | |
| $C_7H_{15}$—O— | —$C_9H_{19}$ | K 33 | B 64 | C 81.5 | I | | | |
| $C_7H_{15}$—O— | —$C_{10}H_{21}$ | K 41 | B 67.8 | C 80.8 | I | | | |

TABLE 59

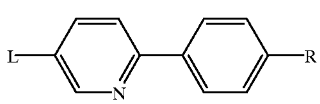

| LCReg | L | R | | Phases | |
|---|---|---|---|---|---|
| 5201 | $C_7H_{15}$— | —O—$C_{10}H_{20}$—CH═$CH_2$ | Cr 42.0 | G 47.0 | B 63.0 |
| | | | C 73.0 | A 76.0 | |
| 5202 | $C_8H_{17}$— | —O—$C_{10}H_{20}$—CH═$CH_2$ | Cr 38.0 | SmI 66.0 | C 77.0 |
| 5203 | $C_9H_{19}$— | —O—$C_{10}H_{20}$—CH═$CH_2$ | Cr 37.0 | B 72.0 | C 80.0 |
| 61268 | $C_8H_{17}$— | —OOC—$C_3H_6$—CH%CH—$C_2H_5$ | Cr 44.0 | S 59.0 | |
| 5180 | $C_7H_{15}$— | —O—$C_4H_8$—CH%CH—$C_2H_5$ | Cr 38.0 | G 49.0 | SmI 60.0 |
| | | | C 66.0 | | |
| 5217 | $C_5H_{11}$— | —C≡C—$C_5H_{11}$ | Cr 35.0 | S 44.6 | |
| 5218 | $C_7H_{15}$— | —C≡C—$C_5H_{11}$ | Cr 27.0 | S 66.5 | |
| 5220 | $C_8H_{17}$— | —O—$C_7H_{14}$—CH/$CH_2$¥$CH_2$ | Cr 49.0 | S 63.0 | C 72.0 |
| 5221 | $C_8H_{17}$— | —O—$C_{11}H_{22}$—CH/$CH_2$¥$CH_2$ | Cr 57.0 | S 63.0 | C 72.0 |

TABLE 60

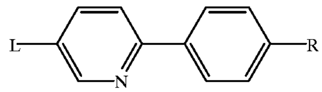

| LCReg | L | R | Phases |
|---|---|---|---|
| 5188 | $C_9H_{19}$— | —O—$C_5H_{10}$—CH=CH—$CH_3$ | Cr 35.0 B 74.0 C 84.0 |
| 61273 | $C_7H_{15}$— | —OOC—$C_5H_{10}$—CH=$CH_2$ | Cr 42.0 F 67.0 |
| 61274 | $C_8H_{17}$— | —OOC—$C_5H_{10}$—CH=$CH_2$ | Cr 49.0 F 70.0 |
| 61275 | $C_9H_{19}$— | —OOC—$C_5H_{10}$—CH=$CH_2$ | Cr 49.0 B 76.0 |
| 5190 | $C_8H_{17}$— | —O—$C_6H_{12}$—CH=$CH_2$ | Cr 23.0 Sml 53.0 C 75.0 |
| 5191 | $C_9H_{19}$— | —O—$C_6H_{12}$—CH=$CH_2$ | Cr 33.0 B 62.0 C 77.0 A 78.0 |
| 5192 | $C_7H_{15}$— | —O—$C_7H_{14}$—CH=$CH_2$ | Cr 36.0 B 52.0 C 75.0 A 78.0 |
| 5193 | $C_8H_{17}$— | —O—$C_7H_{14}$—CH=$CH_2$ | Cr 33.0 Sml 61.0 C 78.0 |
| 5194 | $C_9H_{19}$— | —O—$C_7H_{14}$—CH=$CH_2$ | Cr 32.0 B 69.0 C 80.0 A 82.0 |
| 5195 | $C_7H_{15}$— | —O—$C_8H_{16}$—CH=$CH_2$ | Cr 37.0 Sml 55.0 C 74.0 A 76.0 |
| 5196 | $C_8H_{17}$— | —O—$C_8H_{16}$—CH=$CH_2$ | Cr 32.0 Sml 60.0 C 77.0 |
| 5197 | $C_9H_{19}$— | —O—$C_8H_{16}$—CH=$CH_2$ | Cr 37.0 B 67.0 C 80.0 |
| 5198 | $C_7H_{15}$— | —O—$C_9H_{18}$—CH=$CH_2$ | Cr 31.0 B 62.0 C 75.0 A 78.0 |
| 5199 | $C_8H_{17}$— | —O—$C_9H_{18}$—CH=$CH_2$ | Cr 31.0 Sml 65.0 C 79.0 |
| 5200 | $C_9H_{19}$— | —O—$C_9H_{18}$—CH=$CH_2$ | Cr 36.0 B 73.0 C 82.0 |

TABLE 61

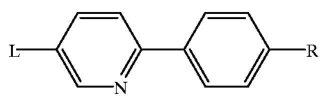

| LCReg | L | R | Phases |
|---|---|---|---|
| 5174 | $C_7H_{15}$— | —O—$C_3H_6$—CH=CH—$C_3H_7$ | Cr 81.0 Sml 82.0 C 84.0 |
| 5175 | $C_8H_{17}$— | —O—$C_3H_6$—CH=CH—$C_3H_7$ | Cr 61.0 G 72.0 Sml 84.0 |
| 5176 | $C_9H_{19}$— | —O—$C_3H_6$—CH=CH—$C_3H_7$ | Cr 37.0 G 49.0 Sml 85.0 C 86.0 |
| 65395 | $C_8H_{17}$— | —OOC—$C_3H_6$—CH=$CH_2$ | Cr 51.0 B 69.0 |
| 5177 | $C_7H_{15}$— | —O—$C_4H_8$—CH=$CH_2$ | Cr 23.0 G 32.0 Sml 49.0 C 66.0 |
| 5178 | $C_8H_{17}$— | —O—$C_4H_8$—CH=$CH_2$ | Cr 31.0 G 44.0 Sml 54.0 C 68.0 |
| 5179 | $C_9H_{19}$— | —O—$C_4H_8$—CH=$CH_2$ | Cr 41.0 B 64.0 C 70.0 A 73.0 |
| 61270 | $C_7H_{15}$— | —OOC—$C_4H_8$—CH=CH—$CH_3$ | Cr 52.0 G 59.0 F 67.0 C 69.0 N 70.0 |
| 61271 | $C_8H_{17}$— | —OOC—$C_4H_8$—CH=CH—$CH_3$ | Cr 48.0 F 51.0 B 73.0 |
| 61272 | $C_9H_{19}$— | —OOC—$C_4H_8$—CH=CH—$CH_3$ | Cr 55.0 B 80.0 |
| 5183 | $C_7H_{15}$— | —O—$C_5H_{10}$—CH=$CH_2$ | Cr 21.0 G 34.0 Sml 52.0 C 75.0 A 77.0 |
| 5184 | $C_8H_{17}$— | —O—$C_5H_{10}$—CH=$CH_2$ | Cr 26.0 G 53.0 Sml 59.0 C 76.0 A 77.0 |
| 5185 | $C_9H_{19}$— | —O—$C_5H_{10}$—CH=$CH_2$ | Cr 34.0 B 68.0 C 75.0 A 82.0 |
| 5186 | $C_7H_{15}$— | —O—$C_5H_{10}$—CH=CH—$CH_3$ | Cr 48.0 G 51.0 Sml 58.0 C 80.0 |
| 5187 | $C_8H_{17}$— | —O—$C_5H_{10}$—CH=CH—$CH_3$ | Cr 36.0 Sml 66.0 C 80.0 |

TABLE 62

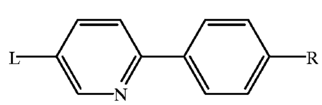

| LCReg | L | R | Phases |
|---|---|---|---|
| 5159 | $C_9H_{19}$— | —O—$CH_2$—CH=CH—$C_8H_{17}$ | Cr 32.0 Sml 85.0 C 89.0 |
| 5160 | $C_7H_{15}$— | —O—$CH_2$—CH=CH—$C_9H_{19}$ | Cr 38.0 G 68.0 Sml 78.0 C 85.0 |
| 5161 | $C_8H_{17}$— | —O—$CH_2$—CH=CH—$C_9H_{19}$ | Cr 35.0 G 62.0 Sml 82.0 C 86.0 |
| 5162 | $C_9H_{19}$— | —O—$CH_2$—CH=CH—$C_9H_{19}$ | Cr 44.0 Sml 87.0 C 90.0 |

TABLE 62-continued

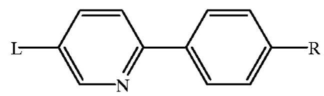

| LCReg | L | R | Phases | | | |
|---|---|---|---|---|---|---|
| 5164 | $C_7H_{15}$— | —O—$C_2H_4$—CH=$CH_2$ | Cr 41.0 | B 50.0 | A 55.0 | |
| 5165 | $C_8H_{17}$— | —O—$C_2H_4$—CH=$CH_2$ | Cr 37.0 | B 56.0 | A 58.0 | |
| 5166 | $C_9H_{19}$— | —O—$C_2H_4$—CH=$CH_2$ | Cr 46.0 | B 63.0 | A 64.0 | |
| 66823 | $C_8H_{17}$— | —O—$C_2H_4$—CH=CH—$C_2H_5$ | Cr 33.0 | A 42.0 | | |
| 5394 | $C_8H_{17}$— | —OOC—$C_2H_4$—CH=CH—$CH_3$ | Cr 69.0 | B 74.0 | | |
| 61265 | $C_8H_{17}$— | —OOC—$C_2H_4$—CH=CH—$C_3H_7$ | Cr 52.0 | B 76.0 | | |
| 61266 | $C_9H_{19}$— | —OOC—$C_2H_4$—CH=CH—$C_3H_7$ | Cr 65.0 | N 84.0 | | |
| 5171 | $C_7H_{15}$— | —O—$C_3H_6$—CH=$CH_2$ | Cr 54.0 | G 45.0 | Sml 59.0 | C 72.0 |
| | | | A 73.0 | | | |
| 5172 | $C_8H_{17}$— | —O—$C_3H_6$—CH=$CH_2$ | Cr 43.0 | B 65.0 | C 70.0 | A 75.0 |
| 5173 | $C_9H_{19}$— | —O—$C_3H_6$—CH=$CH_2$ | Cr 46.0 | B 72.0 | A 78.0 | |
| 66824 | $C_8H_{17}$— | —O—$C_3H_6$—CH=CH—$CH_3$ | Cr 58.0 | C 81.0 | | |

TABLE 63

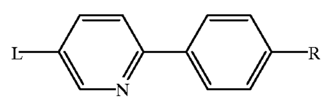

| LCReg | L | R | Phases | | | |
|---|---|---|---|---|---|---|
| 5144 | $C_9H_{19}$— | —O—$CH_2$—CH=CH—$C_3H_7$ | Cr 57.0 | B 76.0 | C 87.0 | |
| 5145 | $C_7H_{15}$— | —O—$CH_2$—CH=CH—$C_4H_9$ | Cr 36.0 | G 66.0 | Sml 72.0 | C 81.0 |
| 5146 | $C_8H_{17}$— | —O—$CH_2$—CH=CH—$C_4H_9$ | Cr 48.0 | G 52.0 | Sml 73.0 | C 82.0 |
| 5147 | $C_9H_{19}$— | —O—$CH_2$—CH=CH—$C_4H_9$ | Cr 39.0 | G 73.0 | Sml 76.0 | C 85.0 |
| 5148 | $C_7H_{15}$— | —O—$CH_2$—CH=CH—$C_5H_{11}$ | Cr 53.0 | G 68.0 | Sml 86.0 | C 84.0 |
| 5149 | $C_8H_{17}$— | —O—$CH_2$—CH=CH—$C_5H_{11}$ | Cr 43.0 | G 57.0 | Sml 75.0 | C 85.0 |
| 5150 | $C_9H_{19}$— | —O—$CH_2$—CH=CH—$C_5H_{11}$ | Cr 36.0 | G 53.0 | Sml 77.0 | C 88.0 |
| 5151 | $C_7H_{15}$— | —O—$CH_2$—CH=CH—$C_6H_{13}$ | Cr 40.0 | G 66.0 | Sml 75.0 | C 85.0 |
| 5152 | $C_8H_{17}$— | —O—$CH_2$—CH=CH—$C_6H_{13}$ | Cr 39.0 | G 54.0 | Sml 77.0 | C 84.0 |
| 5153 | $C_9H_{19}$— | —O—$CH_2$—CH=CH—$C_6H_{13}$ | Cr 27.0 | Sml 79.0 | C 87.0 | |
| 5154 | $C_7H_{15}$— | —O—$CH_2$—CH=CH—$C_7H_{15}$ | Cr 14.0 | G 67.0 | Sml 77.0 | C 85.0 |
| 5155 | $C_8H_{17}$— | —O—$CH_2$—CH=CH—$C_7H_{15}$ | Cr 43.0 | G 59.0 | Sml 78.0 | C 86.0 |
| 5156 | $C_9H_{19}$— | —O—$CH_2$—CH=CH—$C_7H_{15}$ | Cr 36.0 | Sml 83.0 | C 89.0 | |
| 5157 | $C_7H_{15}$— | —O—$CH_2$—CH=CH—$C_8H_{17}$ | Cr 9.0 | G 65.0 | Sml 75.0 | C 84.0 |
| 5158 | $C_8H_{17}$— | —O—$CH_2$—CH=CH—$C_8H_{17}$ | Cr 41.0 | G 58.0 | Sml 81.0 | C 86.0 |

TABLE 64

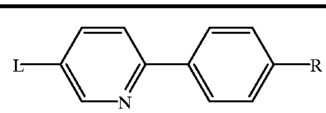

| LCReg | L | R | Phases | | | |
|---|---|---|---|---|---|---|
| 61289 | $C_8H_{17}$— | —OOC—CH=CH—$C_7H_{15}$ | Cr 50.0 | G 51.0 | F 53.0 | C 63.0 |
| | | | N 85.0 | | | |
| 61297 | $C_9H_{19}$— | —OOC—CH=CH—$C_{17}H_{15}$ | Cr 52.0 | F 56.0 | C 73.0 | N 88.0 |
| 61282 | $C_7H_{15}$— | —OOC—CH=CH—$C_8H_{17}$ | Cr 46.0 | F 56.0 | C 61.0 | N 85.0 |
| 61290 | $C_8H_{17}$— | —OOC—CH=CH—$C_8H_{17}$ | Cr 34.0 | G 48.0 | F 53.0 | C 68.0 |
| | | | N 83.0 | | | |
| 61298 | $C_9H_{19}$— | —OOC—CH=CH—$C_8H_{17}$ | Cr 50.0 | F 59.0 | C 77.0 | N 87.0 |
| 61283 | $C_7H_{15}$— | —OOC—CH=CH—$C_9H_{19}$ | Cr 49.0 | G 54.0 | F 57.0 | C 66.0 |
| | | | N 87.0 | | | |
| 61291 | $C_8H_{17}$— | —OOC—CH=CH—$C_9H_{19}$ | Cr 39.0 | G 53.0 | F 56.0 | C 74.0 |
| | | | N 86.0 | | | |
| 61299 | $C_9H_{19}$— | —OOC—CH=CH—$C_9H_{19}$ | Cr 55.0 | F 60.0 | C 82.0 | N 90.0 |

TABLE 64-continued

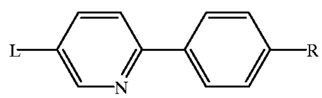

| LCReg | L | R | Phases | | | |
|---|---|---|---|---|---|---|
| 5137 | $C_8H_{17}$— | —O—$CH_2$—CH═CH—$CH_3$ | Cr 53.0 | B 57.0 | C 70.0 | N 82.0 |
| 5138 | $C_9H_{19}$— | —O—$CH_2$—CH═CH—$CH_3$ | Cr 53.0 | B 69.0 | C 76.0 | A 79.0 |
| | | | N 86.0 | | | |
| 5139 | $C_7H_{15}$— | —O—$CH_2$—CH═CH—$C_2H_5$ | Cr 47.0 | G 63.0 | Sml 67.0 | C 75.0 |
| | | | N 76.0 | | | |
| 5140 | $C_8H_{17}$— | —O—$CH_2$—CH═CH—$C_2H_5$ | Cr 48.0 | G 63.0 | Sml 69.0 | C 79.0 |
| 5141 | $C_9H_{19}$— | —O—$CH_2$—CH═CH—$C_2H_5$ | Cr 60.0 | B 78.0 | C 81.0 | |
| 5142 | $C_7H_{15}$— | —O—$CH_2$—CH═CH—$C_3H_7$ | Cr 43.0 | G 73.0 | C 82.0 | |
| 5143 | $C_8H_{17}$— | —O—$CH_2$—CH═CH—$C_3H_7$ | Cr 55.0 | G 58.0 | Sml 70.0 | C 83.0 |

TABLE 65

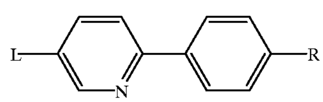

| LCReg | L | R | Phases | | |
|---|---|---|---|---|---|
| 5206 | $C_7H_{15}$— | —O—$CF_3$ | Cr 24.0 | S 44.3 | N =−17.0 |
| 5207 | $C_7H_{15}$— | —O—$C_7F_{15}$ | Cr 53.1 | A 111.7 | |
| 5209 | $H_2C$═CH—$C_2H_4$— | —O—$CF_3$ | Cr 14.3 | S 42.9 | |
| 5210 | $C_3H_7$— | —O—$CF_2$—H | Cr 14.2 | S 37.5 | N =4.0 |
| 5211 | $C_5H_{11}$— | —O—$CF_2$—H | Cr 26.0 | S 43.7 | N =−9.0 |
| 5212 | $C_7H_{15}$— | —O—$CF_2$—H | Cr 22.1 | S 46.1 | |
| 5216 | $H_2C$═CH—$C_2H_4$— | —O—$CF_2$—H | Cr 32.2 | S 42.9 | |
| 5153 | $C_5H_{11}$— | —CH═$CH_2$ | Cr 6.0 | S 54.7 | |
| 1276 | $C_7H_{15}$— | —OOC—CH═CH—$CH_3$ | Cr 72.0 | N 93.0 | |
| 61284 | $C_8H_{17}$— | —OOC—CH═CH—$CH_3$ | Cr 59.0 | N 89.0 | |
| 61292 | $C_9H_{19}$— | —OOC—CH═CH—$CH_3$ | Cr 60.0 | N 94.0 | |
| 61277 | $C_7H_{15}$— | —OOC—CH═CH—$C_2H_5$ | Cr 70.0 | N 75.0 | |
| 61278 | $C_7H_{15}$— | —OOC—CH═CH—$C_3H_7$ | Cr 67.0 | N 87.0 | |
| 61286 | $C_8H_{17}$— | —OOC—CH═CH—$C_3H_7$ | Cr 72.0 | N 83.0 | |
| 61279 | $C_7H_{15}$— | —OOC—CH═CH—$C_4H_9$ | Cr 67.0 | N 79.0 | |

TABLE 66

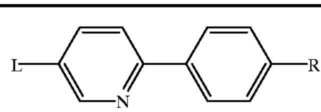

| LCReg | L | R | * | Phases | | | | |
|---|---|---|---|---|---|---|---|---|
| 5119 | $C_8H_{17}$— | —OOC—$C_3H_6$—CHMe—$C_4H_9$ | 1 | (−27.0) | Cr 0.5 | A 27.2 | | |
| 5121 | $C_7H_{15}$— | —O—$C_4H_8$—CHMe—$C_2H_5$ | 1 | Cr 12.5 | G 23.2 | F* 37.5 | C* 58.4 | |
| 5122 | $C_8H_{17}$— | —O—$C_4H_8$—CHMe—$C_2H_5$ | 1 | Cr 21.5 | G 9.7 | F* 38.5 | C* 59.1 | |
| 5123 | $C_9H_{19}$— | —O—$C_4H_8$—CHMe—$C_2H_5$ | 1 | Cr 35.5 | F* 45.4 | C* 63.0 | is | |
| 5124 | $C_6H_{13}$— | —O—$C_5H_{10}$—CHMe—$C_2H_5$ | 1 | Cr 45.2 | H 44.2 | G 48.5 | P* 53.8 | C* 63.0 |
| 5126 | $C_7H_{15}$— | —O—$C_5H_{10}$—CHMe—$C_3H_7$ | 1 | (1.0) | Cr 30.5 | S 42.5 | C* 56.0 | |
| 5127 | $C_9H_{19}$— | —O—$C_5H_{10}$—CHMe—$C_3H_7$ | 1 | (8.0) | Cr 33.0 | S 52.2 | C* 68.1 | |
| 5129 | $C_7H_{15}$— | —O—$C_5H_{10}$—CHMe—$C_4H_9$ | 1 | (28.0) | Cr 43.4 | S 59.8 | C* 73.5 | |
| 5130 | $C_9H_{19}$— | —O—$C_5H_{10}$—CHMe—$C_4H_9$ | 1 | (12.0) | Cr 37.2 | S 56.8 | C* 63.7 | |
| 5131 | $C_{11}H_{23}$— | —O—$C_5H_{10}$—CHMe—$C_4H_9$ | 1 | (11.0) | Cr 26.6 | S 45.1 | C* 58.9 | A 71.2 |
| 60093 | $C_7H_{15}$— | —O—$C_5H_{10}$—CHMe—$C_2H_5$ | 2 | Cr 43.0 | G 55.0 | C 70.5 | | |
| 5133 | $C_8H_{17}$— | —O—$CH_2$—CHF—$C_6H_{13}$ | S | Cr 62.8 | S 73.7 | C* 81.0 | | |
| 5134 | $C_{10}H_{21}$— | —O—$CH_2$—CHF—$C_6H_{13}$ | S | Cr 61.2 | S 76.5 | C* 83.6 | | |
| 5204 | $C_3H_7$— | —O—$CF_3$ | | Cr 22.0 | S 65.1 | N =−45.0 | | |
| 5205 | $C_5H_{11}$— | —O—$CF_3$ | | Cr 18.0 | B 38.5 | A 52.4 | N =−24.0 | |

TABLE 67

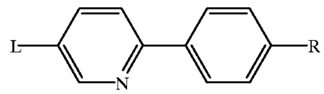

| LCReg | L | R | * | Phases | | | |
|---|---|---|---|---|---|---|---|
| 66801 | $CH_3$—CH═CH—$C_5H_{10}$—O— | —$C_8H_{17}$ | | Cr 25.0 | G 67.0 | C 70.0 | A 86.0 |
| 65375 | $H_2C$═CH—$C_5H_{10}$—COO— | —$C_8H_{17}$ | | Cr 43.0 | F 69.0 | C 75.0 | |
| 66802 | $H_2C$═CH—$C_6H_{12}$—O— | —$C_8H_{17}$ | | Cr 34.0 | Sml 51.0 | C 68.0 | A 79.0 |
| 5098 | $C_9H_{19}$— | —O—$CH_2$—CHMe—$C_2H_5$ | 1 | (−25.0) | Cr 18.9 | S 58.9 | |
| 5099 | $C_{10}H_{21}$— | —O—$CH_2$—CHMe—$C_2H_5$ | 1 | Cr 35.0 | F* 48.1 | C* 49.8 | A 54.2 |
| 5103 | $C_7H_{15}$— | —O—$C_2H_4$—CHMe—$C_2H_5$ | 1 | Cr 41.7 | C* 43.0 | | |
| 5104 | $C_8H_{17}$— | —O—$C_3H_6$—CHMe—$C_2H_5$ | 1 | Cr 30.5 | G 34.8 | F* 51.0 | C* 62.7 |
| 5105 | $C_9H_{19}$— | —O—$C_3H_6$—CHMe—$C_2H_5$ | 1 | Cr 41.3 | F* 53.3 | C* 64.8 | |
| 106 | $C_{10}H_{21}$— | —O—$C_3H_6$—CHMe—$C_2H_5$ | 1 | Cr 35.5 | F* 53.0 | C* 64.0 | |
| 5107 | $C_9H_{19}$— | —O—$C_3H_6$—CHMe—$C_3H_7$ | 1 | (33.0) | Cr 42.3 | S 58.0 | C* 64.4 |
| 5108 | $C_{11}H_{23}$— | —O—$C_3H_6$—CHMe—$C_3H_7$ | 1 | (20.0) | Cr 36.2 | S 55.6 | C* 58.7 |
| 5110 | $C_8H_{17}$— | —O—$C_3H_6$—CHMe—$C_5H_{11}$ | 1 | (11.0) | Cr 35.0 | S 47.1 | C* 62.4 |
| 5111 | $C_9H_{19}$— | —O—$C_3H_6$—CHMe—$C_5H_{11}$ | 1 | (1.0) | Cr 26.6 | S 39.9 | C* 55.1 |
| 5112 | $C_{10}H_{21}$— | —O—$C_3H_6$—CHMe—$C_5H_{11}$ | 1 | (−3.0) | Cr 35.3 | S 54.7 | |
| 5118 | $C_{10}H_{21}$— | —OOC—$C_3H_6$—CHMe—$C_2H_5$ | 1 | (35.0) | Cr 46.5 | S 52.7 | |

TABLE 68

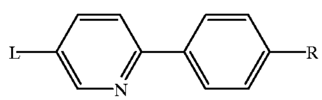

| LCReg | L | R | Phases | | | |
|---|---|---|---|---|---|---|
| 5098 | $H_2C$═CH—$CH_2$— | —$C_5H_{11}$ | Cr 40.0 | N 42.0 | | |
| 66803 | $C_3H_7$—CH═CH—$CH_2$—O— | —$C_8H_{17}$ | Cr 33.0 | Sml 57.0 | C 77.0 | A 81.0 |
| 66804 | $C_4H_9$—CH═CH—$CH_2$—O— | —$C_8H_{17}$ | Cr 50.0 | Sml 57.0 | C 76.0 | |
| 65400 | $C_5H_{11}$—CH═CH—$CH_2$—O— | —$C_8H_{17}$ | Cr 25.0 | Sml 72.0 | C 84.0 | |
| 66805 | $C_6H_{13}$—CH═CH—$CH_2$—O— | —$C_8H_{17}$ | Cr 39.0 | Sml 76.0 | C 85.0 | |
| 66806 | $C_7H_{15}$—CH═CH—$CH_2$—O— | —$C_8H_{17}$ | Cr 26.0 | G 35.0 | C 85.0 | C 88.0 |
| 66807 | $C_8H_{17}$—CH═CH—$CH_2$—O— | —$C_8H_{17}$ | Cr 27.0 | G 77.0 | Sml 88.0 | |
| 66808 | $C_9H_{19}$—CH═CH—$CH_2$—O— | —$C_8H_{17}$ | Cr 25.0 | G 90.0 | | |
| 66390 | $CH_3$—CH═CH—$C_2H_4$—COO— | —$C_8H_{17}$ | Cr 66.0 | C 61.0 | N 74.0 | |
| 65371 | $C_3H_7$—CH═CH—$C_2H_4$—COO— | —$C_8H_{17}$ | Cr 43.0 | F 69.0 | C 76.0 | |
| 66832 | $CH_3$—CH═CH—$C_3H_6$—O— | —$C_8H_{17}$ | Cr 66.0 | A 86.0 | | |
| 66799 | $C_3H_7$—CH═CH—$C_3H_6$—O— | —$C_8H_{17}$ | Cr <20.0 | Sml 78.0 | C 86.0 | |
| 65388 | $H_2C$═CH—$C_3H_6$—COO— | —$C_8H_{17}$ | Cr 42.0 | F 54.0 | C 58.0 | |
| 66833 | $H_2C$═CH—$C_4H_8$—O— | —$C_8H_{17}$ | Cr 39.0 | Sml 37.0 | C 48.0 | A 69.0 |
| 65372 | $CH_3$—CH═CH—$C_4H_8$—COO— | —$C_8H_{17}$ | Cr 62.0 | C 77.0 | | |

TABLE 69

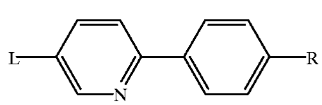

| LCReg | L | R | * | Phases | | | |
|---|---|---|---|---|---|---|---|
| 5080 | $C_9H_{19}$— | —OCOO—$C_8H_{17}$ | | Cr 50.0 | B 50.8 | C 58.5 | N 60.5 |
| 5081 | $C_7H_{15}$— | —OCOO—$C_9H_{19}$ | | Cr 36.3 | G 37.8 | A 39.0 | N 54.7 |
| 5082 | $C_{10}H_{21}$— | —OCOO—$C_9H_{19}$ | | Cr 44.6 | B 58.9 | C 63.5 | |
| 5083 | $C_6H_{13}$—CHF—$CH_2$—O— | —$C_8H_{17}$ | 1 | Cr 67.0 | C* 81.0 | A 88.0 | |
| 5084 | $C_6H_{13}$—CHF—$CH_2$—O— | —O—$C_8H_{17}$ | 1 | Cr 79.0 | C* 98.0 | A 110.0 | |
| 5085 | $C_6H_{13}$—CHF—$C_2H_4$— | —O—$C_7H_{15}$ | 1 | Cr 67.0 | B 71.0 | C* 80.0 | A 87.0 |
| 5086 | $C_6H_{13}$—CHF—$C_2H_4$— | —O—$C_8H_{17}$ | 1 | Cr 66.0 | Sml* 73.0 | C* 86.0 | A 90.0 |
| 5087 | $C_6H_{13}$—CHF—$C_2H_4$— | —O—$C_9H_{19}$ | 1 | Cr 73.0 | Sml* 74.0 | C* 87.0 | A 89.0 |
| 5382 | $C_3H_7$—CH═CH—COO— | —$C_8H_{17}$ | | Cr 46.0 | N 77.0 | | |

TABLE 69-continued

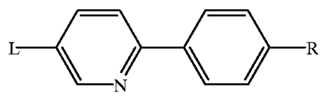

| LCReg | L | R | * | Phases | | | |
|---|---|---|---|---|---|---|---|
| 65383 | $C_4H_9$—CH═CH—COO— | —$C_8H_{17}$ | | Cr 49.0 | N 71.0 | | |
| 65370 | $C_5H_{11}$—CH═CH—COO— | —$C_8H_{17}$ | | Cr 89.0 | C 51.0 | N 82.0 | |
| 65384 | $C_6H_{13}$—CH═CH—COO— | —$C_8H_{17}$ | | Cr 31.0 | C 59.0 | N 78.0 | |
| 65385 | $C_7H_{15}$—CH═CH—COO— | —$C_8H_{17}$ | | Cr 58.0 | C 72.0 | N 86.0 | |
| 65386 | $C_8H_{17}$—CH═CH—COO— | —$C_8H_{17}$ | | Cr 16.0 | F 53.0 | C 83.0 | N 87.0 |
| 65387 | $C_9H_{19}$—CH═CH—COO— | —$C_8H_{17}$ | | Cr 23.0 | F 64.0 | C 91.0 | |

TABLE 70

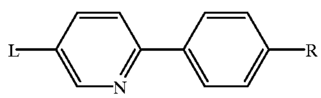

| LCReg | L | R | Phases | | | |
|---|---|---|---|---|---|---|
| 5050 | $C_7H_{15}$— | —OOC—$C_9H_{19}$ | Cr 56.0 | G 69.0 | F 79.0 | C 81.0 |
| 5051 | $C_8H_{17}$— | —OOC—$C_9H_{19}$ | Cr 61.0 | F 83.0 | | |
| 5052 | $C_9H_{19}$— | —OOC—$C_9H_{19}$ | Cr 71.0 | F 89.0 | | |
| 5053 | $C_7H_{15}$— | —OOC—$C_{10}H_{21}$ | Cr 52.0 | G 66.0 | F 79.0 | C 81.0 |
| 5054 | $C_8H_{17}$— | —OOC—$C_{10}H_{21}$ | Cr 42.0 | F 83.0 | | |
| 5055 | $C_9H_{19}$— | —OOC—$C_{10}H_{21}$ | Cr 66.0 | F 89.0 | | |
| 5056 | $C_7H_{15}$— | —OOC—$C_{11}H_{23}$ | Cr 54.0 | G 68.0 | F 79.0 | C 82.0 |
| 5057 | $C_8H_{17}$— | —OOC—$C_{11}H_{23}$ | Cr 51.0 | F 83.0 | | |
| 5058 | $C_9H_{19}$— | —OOC—$C_{11}H_{23}$ | Cr 65.0 | F 90.0 | | |
| 5072 | $C_9H_{19}$— | —OCOO—$C_2H_5$ | Cr 37.0 | B 37.8 | A 52.4 | |
| 5073 | $C_8H_{17}$— | —OCOO—$C_3H_7$ | Cr 20.5 | B 42.4 | A 45.0 | |
| 5074 | $C_9H_{19}$— | —OCOO—$C_4H_9$ | Cr 34.7 | B 49.1 | C 54.8 | |
| 5076 | $C_{10}H_{21}$— | —OCOO—$C_5H_{11}$ | Cr 43.1 | E 52.7 | A 55.2 | |
| 5078 | $C_7H_{15}$— | —OCOO—$C_7H_{15}$ | Cr 47.1 | N 51.4 | | |
| 5079 | $C_{10}H_{21}$— | —OCOO—$C_7H_{15}$ | Cr 49.5 | B 55.4 | C 58.4 | |

TABLE 71

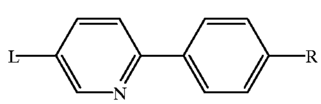

| LCReg | L | R | Phases | | | |
|---|---|---|---|---|---|---|
| 5034 | $C_8H_{17}$— | —OOC—$C_4H_9$ | Cr 65.0 | B 75.0 | | |
| 5035 | $C_9H_{19}$— | —OOC—$C_4H_9$ | Cr 73.0 | B 80.0 | | |
| 5038 | $C_7H_{15}$— | —OOC—$C_5H_{11}$ | Cr 48.0 | F 72.0 | | |
| 5039 | $C_8H_{17}$— | —OOC—$C_5H_{11}$ | Cr 57.0 | B 76.0 | | |
| 5040 | $C_9H_{19}$— | —OOC—$C_5H_{11}$ | Cr 68.0 | B 82.0 | | |
| 5037 | $C_6H_{13}$— | —OOC—$C_6H_{13}$ | Cr 43.0 | S 62.0 | | |
| 5041 | $C_7H_{15}$— | —OOC—$C_6H_{13}$ | Cr 48.0 | G 68.0 | F 74.0 | |
| 5042 | $C_8H_{17}$— | —OOC—$C_6H_{13}$ | Cr 57.0 | F 77.0 | | |
| 5043 | $C_9H_{19}$— | —OOC—$C_6H_{13}$ | Cr 60.0 | F 83.0 | | |
| 5044 | $C_7H_{15}$— | —OOC—$C_7H_{15}$ | Cr 50.0 | G 68.0 | F 76.0 | C 77.0 |
| 5045 | $C_8H_{17}$— | —OOC—$C_7H_{15}$ | Cr 60.0 | F 80.0 | | |
| 5046 | $C_9H_{19}$— | —OOC—$C_7H_{15}$ | Cr 66.0 | F 86.0 | | |
| 5047 | $C_7H_{15}$— | —OOC—$C_8H_{17}$ | Cr 52.0 | G 68.0 | F 78.0 | C 79.0 |
| 5048 | $C_8H_{17}$— | —OOC—$C_8H_{17}$ | Cr 61.0 | F 81.0 | | |
| 5049 | $C_9H_{19}$— | —OOC—$C_8H_{17}$ | Cr 70.0 | F 87.0 | | |

TABLE 72

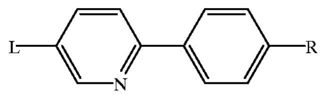

| LCReg | L | R | Phases | | |
|---|---|---|---|---|---|
| 5010 | $C_8H_{17}$— | —O—$C_{11}H_{23}$ | Cr 47.3 | F 68.0 | C 82.0 |
| 5011 | $C_9H_{19}$— | —O—$C_{11}H_{23}$ | Cr 40.7 | B 75.4 | C 86.0 |
| 5012 | $C_{10}H_{21}$— | —O—$C_{11}H_{23}$ | Cr 47.6 | F 77.1 | C 85.2 |
| 5013 | $C_7H_{15}$— | —O—$C_{12}H_{25}$ | Cr 49.0 | F 67.0 | C 82.1 |
| 5014 | $C_8H_{17}$— | —O—$C_{12}H_{25}$ | Cr 46.0 | F 70.2 | C 82.4 |
| 5015 | $C_9H_{19}$— | —O—$C_{12}H_{25}$ | Cr 43.5 | B 77.8 | C 85.2 |
| 5016 | $C_{10}H_{21}$— | —O—$C_{12}H_{25}$ | Cr 48.0 | F 79.9 | C 86.1 |
| 5017 | $C_8H_{17}$—O— | —O—$C_6H_{13}$ | Cr 89.0 | C 104.0 | N 105.0 |

TABLE 72-continued

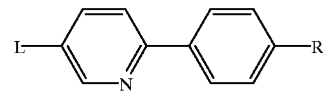

| LCReg | L | R | Phases | | |
|---|---|---|---|---|---|
| 5018 | $C_8H_{17}$—O— | —O—$C_8H_{17}$ | Cr 76.0 | S 75.0 | C 110.0 |
| 5019 | $C_8H_{17}$—O— | —O—$C_{10}H_{21}$ | Cr 70.0 | S 68.0 | C 111.0 |
| 5030 | $C_7H_{15}$— | —OOC—$C_3H$ | Cr 57.0 | B 71.0 | |
| 5031 | $C_8H_{17}$— | —OOC—$C_3H$ | Cr 64.0 | B 75.0 | |
| 5032 | $C_9H_{19}$— | —OOC—$C_3H$ | Cr 71.0 | B 80.0 | |
| 5029 | $C_6H_{13}$— | —OOC—$C_4H$ | Cr 45.0 | S 57.0 | |
| 5033 | $C_7H_{15}$— | —OOC—$C_4H$ | Cr 48.0 | B 71.0 | |

TABLE 73

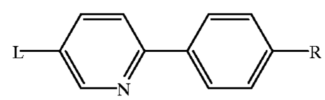

| LCReg | L | R | Phases | | | |
|---|---|---|---|---|---|---|
| 4978 | $C_5H_{11}$— | —O—$C_5H_{11}$ | Cr 55.5 | N 62.0 | | |
| 4985 | $C_5H_{11}$— | —O—$C_6H_{13}$ | Cr 64.5 | N 72.0 | | |
| 4997 | $C_7H_{15}$— | —O—$C_8H_{17}$ | Cr 45.0 | G 45.4 | F 56.5 | C 80.4 |
| 4998 | $C_8H_{17}$— | —O—$C_8H_{17}$ | Cr 38.0 | F 62.0 | C 82.0 | |
| 4999 | $C_9H_{19}$— | —O—$C_8H_{17}$ | Cr 37.0 | G 66.0 | Sml 69.0 | C 85.0 |
| 5000 | $C_{10}H_{21}$— | —O—$C_8H_{17}$ | Cr 34.5 | B 71.2 | C 84.1 | |
| 5001 | $C_7H_{15}$— | —O—$C_9H_{19}$ | Cr 42.5 | F 58.5 | C 80.7 | |
| 5002 | $C_8H_{17}$— | —O—$C_9H_{19}$ | Cr 37.5 | F 61.5 | C 81.4 | |
| 5003 | $C_9H_{19}$— | —O—$C_9H_{19}$ | Cr 37.4 | B 69.6 | C 84.9 | |
| 5004 | $C_{10}H_{21}$— | —O—$C_9H_{19}$ | Cr 40.7 | F 72.4 | C 84.0 | |
| 5005 | $C_7H_{15}$— | —O—$C_{10}H_{21}$ | Cr 39.5 | F 62.0 | C 82.1 | |
| 5006 | $C_8H_{17}$— | —O—$C_{10}H_{21}$ | Cr 40.8 | F 65.5 | C 82.1 | |
| 5007 | $C_9H_{19}$— | —O—$C_{10}H_{21}$ | Cr 38.6 | B 69.2 | C 86.3 | |
| 5008 | $C_{10}H_{21}$— | —O—$C_{10}H_{21}$ | Cr 41.3 | F 75.8 | C 85.4 | |
| 5009 | $C_7H_{15}$— | —O—$C_{11}H_{23}$ | Cr 48.8 | F 63.7 | C 81.4 | |

TABLE 74

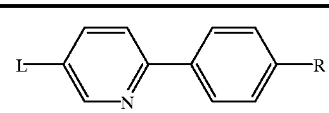

| LCReg | L | R | Phases | | |
|---|---|---|---|---|---|
| 4943 | NC— | —O—$C_3H_7$ | Cr 94.0 | N 97.0 | |
| 4944 | NC— | —O—$C_4H_9$ | Cr 91.3 | N 104.0 | |
| 4945 | NC— | —O—$C_5H_{11}$ | Cr 59.3 | N 94.6 | |
| 4946 | NC— | —O—$C_6H_{13}$ | Cr 62.8 | N 98.7 | |
| 4947 | NC— | —O—$C_7H_{15}$ | Cr 60.2 | A 89.2 | N 99.0 |
| 4948 | NC— | —O—$C_8H_{17}$ | Cr 66.8 | A 100.4 | N 101.5 |
| 4949 | NC— | —O—$C_{11}H_{22}$—$C_8F_{17}$ | Cr 102.0 | C 113.0 | A 161.0 |
| 4954 | $C_4H_9$— | —$C_5H_{11}$ | Cr 17.4 | N 21.8 | |
| 4955 | $C_5H_{11}$— | —$C_5H_{11}$ | (9.0) | Cr 33.0 | S 32.0 |
| 4956 | $C_7H_{15}$— | —$C_5H_{11}$ | Cr 31.0 | S 46.5 | |
| 4958 | $C_4H_9$— | —$C_7H_{15}$ | Cr 38.9 | N 44.5 | |
| 4959 | $C_5H_{11}$— | —$C_7H_{15}$ | Cr 10.0 | S 38.5 | |
| 4962 | $C_6H_{13}$— | —$C_8H_{17}$ | Cr 38.0 | S 60.5 | |
| 4974 | $C_5H_{11}$— | —O—$C_2H_5$ | (47.0) | Cr 60.5 | N 62.0 |
| 4976 | $C_5H_{11}$— | —O—$C_4H_9$ | Cr 60.0 | N 65.0 | |

TABLE 75

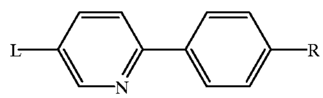

| LCReg | L | R | Phases | | |
|---|---|---|---|---|---|
| 4924 | $C_3H_7$— | —NCS | Cr 64.0 | A 99.0 | |
| 4925 | $C_4H_9$— | —NCS | Cr 37.6 | S 100.0 | |
| 4926 | $C_5H_{11}$— | —NCS | Cr 34.0 | A 98.5 | |
| 4927 | $C_6H_{13}$— | —NCS | Cr 27.0 | S 99.0 | |
| 4928 | $C_7H_{15}$— | —NCS | Cr 26.1 | A 99.2 | |
| 4929 | $C_8H_{17}$— | —O—$C_6H_{12}$—$SiMe_3$ | Cr 28.3 | S 37.8 | C 60.2 |
| 4930 | $C_8H_{17}$— | —O—$C_{11}H_{22}$—$SiMe_3$ | Cr 48.3 | S 60.0 | C 76.1 |
| 4931 | $C_8H_{17}$— | —O—$C_{11}H_{22}$—SiMe2Et | Cr 41.0 | S 57.0 | C 71.0 |
| 4936 | NC— | —$C_3H_7$ | Cr 58.7 | N 69.0 | |
| 4937 | NC— | —$C_4H_9$ | Cr 39.3 | N 55.0 | |
| 4938 | NC— | —$C_5H_{11}$ | Cr 47.4 | N 68.0 | |
| 4939 | NC— | —$C_6H_{13}$ | Cr 42.2 | A 51.7 | N 62.3 |
| 4940 | NC— | —$C_7H_{15}$ | Cr 47.2 | A 66.8 | N 70.3 |
| 4941 | NC— | —$C_8H_{17}$ | Cr 51.1 | A 72.0 | |
| 4942 | NC— | —O—$C_2H_5$ | Cr 104.0 | N 115.0 | |

TABLE 76

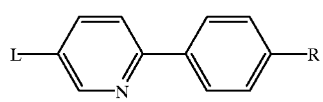

| LCReg | L | R | Phases | | |
|---|---|---|---|---|---|
| 66491 | $C_4H_9$—C  C— | —F | Cr 20.7 | A 37.0 | |
| 66493 | $C_4H_9$—C  C— | —Cl | Cr 26.0 | A 87.5 | |
| 4897 | $C_6H_{13}$— | —Br | Cr 66.0 | X 70.0 | |
| 4899 | $C_8H_{17}$— | —Br | Cr 49.0 | X 70.0 | |
| 4900 | $H_2C$═CH—$CH_2$— | —Br | Cr 53.0 | S 64.0 | |
| 4903 | $H_2C$═CH—$CH_2$— | —I | Cr 62.0 | S 85.1 | |
| 4907 | $C_5H_{11}$— | —CN | Cr 33.6 | N 43.5 | |
| 4908 | $C_6H_{13}$— | —CN | Cr 29.0 | N 32.5 | |
| 4909 | $C_7H_{15}$— | —CN | Cr 30.9 | N 47.0 | |
| 4910 | $C_8H_{17}$— | —CN | Cr 39.5 | N 43.0 | |
| 4911 | $C_3H_7$— | —CH═CH—CN | Cr 84.2 | S 110.0 | N 162.0 |
| 4912 | $C_4H_9$— | —CH═CH—CN | Cr 73.5 | N 150.2 | |
| 4913 | $C_5H_{11}$— | —CH═CH—CN | Cr 65.7 | N 155.1 | |
| 4914 | $C_6H_{13}$— | —CH═CH—CN | Cr 32.1 | A 123.1 | N 146.2 |
| 4915 | $C_7H_{15}$— | —CH═CH—CN | Cr 48.0 | A 133.0 | N 143.0 |

TABLE 77

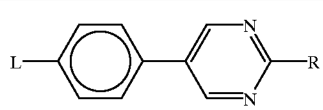

| No | L | R | Cr | LC | |
|---|---|---|---|---|---|
| 3978 | $C_6H_{13}$—O— | —S—$C_5H_{11}$ | K 24 | A 71.5 | I |
| 3979 | $C_6H_{13}$—O— | —S—$C_6H_{13}$ | K 30 | A 74.5 | I |
| 3980 | $C_6H_{13}$—O— | —S—$C_7H_{15}$ | K 39.5 | A 72.5 | I |
| 3981 | $C_6H_{13}$—O— | —S—$C_8H_{17}$ | K 27 | A 73 | I |
| 3982 | $C_6H_{13}$—O— | —S—$C_9H_{19}$ | K 42.5 | A 72 | I |
| 3983 | $C_6H_{13}$—O— | —S—$C_{10}H_{21}$ | K 31.5 | A 71.5 | I |
| 3984 | $C_7H_{15}$—O— | —S—$CH_3$ | K 62.5 | A 73 | I |
| 3985 | $C_7H_{15}$—O— | —S—$C_6H_{13}$ | K 40 | A 74.5 | I |

TABLE 77-continued

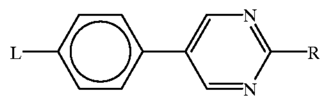

| No | L | R | Cr | LC | | | |
|---|---|---|---|---|---|---|---|
| 3986 | $C_7H_{15}$—O— | —S—$C_7H_{15}$ | K 41 | C 42 | A 73 | I | |
| 3987 | $C_7H_{15}$—O— | —S—$C_{10}H_{21}$ | K 53 | A 71 | I | | |
| 3988 | $C_7H_{15}$—O— | —S—$C_{11}H_{23}$ | K 61 | A 69.5 | I | | |
| 3989 | $C_8H_{17}$—O— | —S—$C_6H_{13}$ | K 47 | A 76 | I | | |
| 3990 | $C_8H_{17}$—O— | —S—$C_7H_5$ | K 39 | G 34 | C 51 | A 75 | I |
| 3991 | $C_8H_{17}$—O— | —S—$C_8H_{17}$ | K 51 | G 40 | C 55 | A 75 | I |
| 3992 | $C_8H_{17}$—O— | —S—$C_9H_{19}$ | K 47.6 | G 40.5 | C 54.5 | A 74.1 | I |
| 3993 | $C_8H_{17}$—O— | —S—$C_{10}H_{21}$ | K 54.8 | G 42.2 | C 59.7 | A 74 | I |
| 3994 | $C_8H_{17}$—O— | —S—$C_{11}H_{23}$ | K 61.4 | C 53.4 | A 74.5 | I | |
| 3995 | $C_9H_{19}$—O— | —S—$CH_3$ | K 73 | A 77.5 | I | | |
| 3996 | $C_9H_{19}$—O— | —S—$C_6H_{13}$ | K 48 | A 76 | I | | |
| 3997 | $C_9H_{19}$—O— | —S—$C_8H_{17}$ | K 52 | G 38.1 | C 58 | A 75.8 | I |
| 3998 | $C_9H_{19}$—O— | —S—$C_9H_{19}$ | K 48.5 | G 38.5 | C 57 | A 74.8 | I |
| 3999 | $C_9H_{19}$—O— | —S—$C_{10}H_{21}$ | K 54.7 | G 42.2 | C 59.7 | A 73.9 | I |
| 4000 | $C_9H_{19}$—O— | —S—$C_{11}H_{23}$ | K 60 | C 54.7 | A 73.4 | I | |
| 4001 | $C_{10}H_{21}$—O— | —S—$C_6H_{13}$ | K 56 | A 76.5 | I | | |
| 4002 | $C_{10}H_{21}$—O— | —S—$C_9H_{19}$ | K 58.8 | G 54 | C 69.3 | A 75.7 | I |
| 4003 | $C_{10}H_{21}$—O— | —S—$C_{10}H_{21}$ | K 62.1 | G 57.8 | C 71 | A 75 | I |
| 4004 | $C_{10}H_{21}$—O— | —S—$C_{11}H_{23}$ | K 62 | S 58.6 | C 70.9 | A 74.8 | I |
| 4005 | $C_{11}H_{23}$—O— | —S—$C_{10}H_{21}$ | K 64.5 | G 61.8 | C 73.9 | A 75 | I |
| 4006 | $C_{11}H_{23}$—O— | —S—$C_{11}H_{23}$ | K 65 | S 63 | C 74.2 | A 74.7 | I |
| 4016 | $C_8H_{13}$—S— | —$C_6H_{13}$ | K 50 | A 57.5 | I | | |

TABLE 78

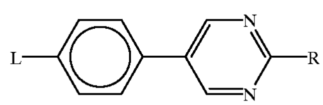

| No | | | | | | | | |
|---|---|---|---|---|---|---|---|---|
| 4017 | $C_4H_9$—S— | —S—$C_6H_{13}$ | | K 42.5 | A 42 | I | | |
| 4018 | $C_6H_{13}$—S— | —S—$C_6H_{13}$ | | K 40 | A 48.5 | I | | |
| 4019 | $CH_3$—$CMe_2$—$C_5H_{10}$—O— | —$C_8H_{17}$ | | K 73 | C 64 | A 71 | W | |
| 4020 | $CH_3$—$CMe_2$—$C_5H_{10}$—O— | —O—$C_9H_{19}$ | | K 86 | C 80 | A 82 | W | |
| 4021 | $CH_3$—$CMe_2$—$C_5H_{10}$—O— | —S—$C_{10}H_{21}$ | | K 60 | C 53 | A 55 | W | |
| 4023 | $C_6H_{13}$—O—$C_2H_4$—O—$C_2H_4$—O— | —O—$C_9H_{19}$ | | K 48 | A 44 | I | | |
| 4028 | $C_5H_{11}$—COO— | —$C_6H_{13}$ | | K 79 | B 85.5 | A 95 | I | |
| 4030 | $C_{10}H_{21}$—O— | —O—$CH_2$—CHMe—$C_2H_5$ | S | K 63 | A 69 | I | | |
| 4031 | $C_8H_{17}$— | —O—$C_3H_6$—CHMe—$C_2H_5$ | 1 | K 51.8 | A 55 | I | | |
| 4032 | $C_{10}H_{21}$—O— | —O—$C_3H_6$—CHMe—$C_2H_5$ | 1 | K 63 | C* 57.5 | A 82 | I | |
| 4033 | $C_{10}H_{21}$—O— | —O—$C_2H_4$—CHMe—$C_3H_6$—CHMe—$CH_3$ | 1 | K 45 | C* 37 | A 58 | I | |
| 4034 | $C_8H_{17}$— | —O—$C_5H_{10}$—CHMe—$C_2H_5$ | 1 | K 46 | C* 35 | A 60 | I | |
| 4035 | $C_8H_{17}$—O— | —$C_5H_{10}$—CHMe—$C_2H_5$ | S | K 36 | S 46 | C* 55 | A 71 | I |
| 4036 | $C_{10}H_{21}$—O— | —O—$C_5H_{10}$—CHMe—$C_2H_5$ | 1 | K 77 | C* 76 | A 88 | I | |
| 4037 | $C_8H_7$—O— | —S—$C_5H_{10}$—CHMe—$C_2H_5$ | S | K 55.8 | S 24 | C* 55.6 | A 64.3 | I |
| 4041 | $C_5H_{11}$— | —S—$CF_2$—H | | K 50.8 | N −17 | E | | |
| 4042 | $C_{10}H_{21}$—O— | —O—$C_9H_{18}$—CH/$CH_2$\$CH_2$ | | K 88 | S 70.6 | C 84 | A 87.6 | I |
| 4049 | $CH_3$—CHMe—CHF—COO— | —O—$C_9H_{18}$—CH/$CH_2$\$CH_2$ | S | K 78 | A 64 | I | | |
| 4051 | $C_2H_5$—CHMe—$CH_2$—O— | —$C_8H_{17}$ | 1 | K 51 | A 66 | I | | |
| 4053 | $C_2H_5$—CHMe—$CH_2$—O— | —O—$C_{10}H_{21}$ | 1 | K 82 | A 63 | I | | |
| 4055 | $C_2H_5$—CHMe—$C_3H_6$—O— | —$C_{12}H_{25}$ | 1 | K 46 | A 62 | I | | |
| 4056 | $C_2H_5$—CHMe—$C_3H_6$—O— | —S—$C_8H_{17}$ | 2 | K 24 | C 36 | A 49.8 | I | |
| 4058 | $C_2H_5$—CHMe—$C_5H_{10}$—O— | —$C_8H_{17}$ | S | K 40.2 | G* 43.4 | C* 57.8 | A 72.3 | I |
| 4059 | $C_2H_5$—CHMe—$C_5H_{10}$—O— | —$C_{12}H_{25}$ | 1 | K 57.1 | C* 58 | A 68 | I | |
| 4060 | $C_2H_5$—CHMe—$C_5H_{10}$—O— | —O—$C_8H_{17}$ | 1 | K 73 | C* 78 | A 86 | I | |
| 4061 | $C_2H_5$—CHMe—$C_5H_{10}$—O— | —O—$C_9H_{19}$ | S | K 77.7 | C* 79.2 | A 84.7 | I | |
| 4062 | $C_2H_5$—CHMe—$C_5H_{10}$—O— | —S—$C_8H_{13}$ | S | K 46 | C* 51.5 | A 63 | I | |
| 4063 | $C_2H_5$—CHMe—$C_5H_{10}$—O— | —S—$C_7H_{15}$ | S | K 44.6 | C* 52.5 | A 59.8 | I | |
| 4064 | $C_2H_5$—CHMe—$C_5H_{10}$—O— | —S—$C_8H_{17}$ | 1 | K 43 | C* 55 | A 60 | I | |
| 4065 | $C_2H_5$—CHMe—$C_5H_{10}$—O— | —S—$C_9H_{19}$ | S | K 28.1 | C* 53.5 | A 60.5 | I | |

TABLE 79

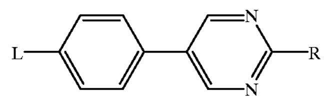

| LCReg | L | R | * | Phases | | | |
|---|---|---|---|---|---|---|---|
| 2681 | $C_4H_9$—O— | —S—$C_4H_9$ | | Cr 44.5 | A 66.0 | | |
| 2682 | $C_4H_9$—O— | —S—$C_6H_{13}$ | | Cr 41.0 | A 69.0 | | |
| 2683 | $C_5H_{10}$—O— | —S—$CH_3$ | | Cr 59.0 | A 63.5 | | |
| 2684 | $C_5H_{11}$—O— | —S—$C_2H_5$ | | Cr 62.0 | A 71.5 | | |
| 2685 | $C_5H_{11}$—O— | —S—$C_4H_9$ | | Cr 38.0 | A 66.5 | | |
| 2686 | $C_5H_{11}$—O— | —S—$C_6H_{13}$ | | Cr 24.5 | A 69.0 | | |
| 2687 | $C_6H_{13}$—O— | —S—$CH_3$ | | Cr 62.0 | A 71.0 | | |
| 2688 | $C_6H_{13}$—O— | —S—$C_2H_5$ | | Cr 53.0 | A 76.5 | | |
| 2689 | $C_6H_{13}$—O— | —S—$C_3H_7$ | | Cr 40.0 | A 61.0 | | |
| 2690 | $C_6H_{13}$—O— | —S—$C_4H_9$ | | Cr 35.0 | A 72.0 | | |
| 2773 | $C_2H_5$—CHMe—$C_5H_{10}$—O— | —S—$C_{10}H_{21}$ | S | Cr 35.7 | C* 54.6 | A 59.9 | |
| 2774 | $C_2H_5$—CHMe—$C_5H_{10}$—O— | —$C_5H_{11}$—CHMe—$C_2H_5$ | 3 | Cr 41.0 | C* 43.0 | A 51.0 | |
| 2777 | $CH_3$—CHMe—$C_6H_{12}$—O— | —O—$C_9H_{19}$ | | Cr 79.0 | C 83.0 | A 89.0 | |
| 2779 | $H_2C$=CH—$C_9H_{18}$—O— | —S—$C_{11}H_{23}$ | | Cr 56.0 | S 56.3 | C 66.3 | A 68.0 |
| 2793 | $H_2C/CH_2$¥CH—$C_9H_{18}$—O— | —O—$C_9H_{18}$—CH/$CH_2$¥$CH_2$ | | (79.0) | Cr 89.4 | C 79.5 | |

TABLE 80

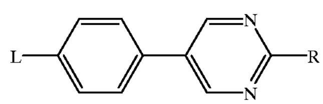

| LCReg | L | R | Phases | | | |
|---|---|---|---|---|---|---|
| 2654 | $C_{10}H_{21}$— | —S—$C_6H_{13}$ | Cr 32.5 | A 43.0 | | |
| 2658 | $C_2H_5$—O— | —$C_6H_{13}$ | Cr 54.0 | A 69.0 | | |
| 2659 | $C_3H_7$—O— | —$C_6H_{13}$ | Cr 57.0 | A 74.0 | | |
| 2660 | $C_4H_9$—O— | —$C_6H_{13}$ | Cr 48.0 | A 88.0 | | |
| 2661 | $C_5H_{11}$—O— | —$C_6H_{13}$ | Cr 48.0 | B 45.0 | A 86.5 | |
| 2662 | $C_6H_{13}$—O— | —$C_6H_{13}$ | Cr 44.0 | B 59.0 | A 89.0 | |
| 2663 | $C_7H_{15}$—O— | —$C_6H_{13}$ | Cr 51.0 | B 59.0 | A 87.0 | |
| 2664 | $C_8H_{17}$—O— | —$C_6H_{13}$ | Cr 51.0 | B 63.0 | A 87.0 | |
| 2665 | $C_8H_{17}$—O— | —$C_8H_{17}$ | Cr 52.0 | S 70.0 | A 88.0 | |
| 2668 | $C_4H_9$—O— | —O—$C_6H_{13}$ | Cr 68.0 | A 104.0 | | |
| 2669 | $C_5H_{11}$—O— | —O—$C_6H_{13}$ | Cr 71.5 | A 102.5 | | |
| 2670 | $C_6H_{13}$—O— | —O—$C_6H_{13}$ | Cr 71.0 | A 104.5 | | |
| 2672 | $C_9H_{19}$—O— | —O—$C_8H_{17}$ | (57.0) | Cr 75.8 | C 71.0 | A 100.0 |
| 2676 | $CH_3$—O— | —S—$C_7H_{15}$ | Cr 50.0 | A 68.0 | | |
| 2680 | $C_4H_9$—O— | —S—$C_2H_5$ | Cr 54.5 | A 70.5 | | |

TABLE 81

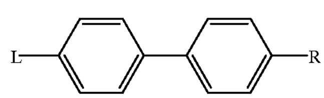

| LCReg | L | R | Phases |
|---|---|---|---|
| 2597 | Me3Si—$C_6H_{12}$—O— | —$C_8H_{17}$ | Cr 47.6 C 52.0 A 56.3 |
| 2598 | Me3Si—$C_6H_{12}$—O— | —O—$C_8H_{17}$ | Cr 68.1 C 70.6 |
| 2606 | EtMe2Si—$C_6H_{12}$—O— | —O—$_8H_{17}$ | Cr 58.6 C 62.5 |
| 2636 | $C_7H_{15}$—O— | —CN | Cr 93.0 A 94.0 |
| 2637 | $C_9H_{19}$—O— | —CN | Cr 97.0 A 104.4 |
| 2642 | $C_3H_7$— | —$C_6H_{13}$ | Cr 23.0 A 32.0 |
| 2643 | $C_4H_9$— | —$C_6H_{13}$ | Cr 24.5 A 44.0 |
| 2644 | $C_5H_{11}$— | —$C_6H_{13}$ | Cr 45.0 A 53.5 |
| 2645 | $C_6H_{13}$— | —$C_6H_{13}$ | Cr 30.0 B 42.5 A 53.0 |

TABLE 81-continued

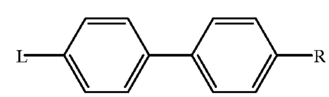

| LCReg | L | R | Phases |
|---|---|---|---|
| 2646 | $C_7H_{15}$— | —$C_6H_{13}$ | Cr 31.5 B 51.0 A 56.0 |
| 2647 | $C_8H_{17}$— | —$C_6H_{13}$ | Cr 18.5 B 52.0 A 55.5 |
| 2648 | $C_9H_{19}$— | —$C_6H_{13}$ | Cr 34.0 B 54.0 A 55.0 |
| 2649 | $C_{10}H_{21}$— | —$C_6H_{13}$ | Cr 41.0 B 54.5 |
| 2650 | $C_6H_{13}$— | —O—$C_6H_{13}$ | Cr 45.0 A 71.0 |
| 2652 | $C_6H_{13}$— | —S—$C_6H_{13}$ | Cr 31.0 A 33.0 |

TABLE 82

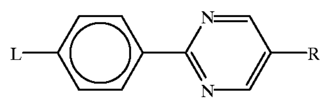

| No | L | R | Cr | LC |
|---|---|---|---|---|
| 4178 | Me$_3$Sl—C$_5$H$_{10}$—O— | —O—C$_8$H$_7$ | K 69 | C 88 A 93 E |
| 4179 | Me$_3$Sl—C$_6$H$_{12}$—O— | —C$_8$H$_{17}$ | L 25 | C 47 A 56.6 I |
| 4180 | Me$_3$Sl—C$_{10}$H$_{20}$—O— | —O—C$_8$H$_{17}$ | K 41 | C 84 A 92 E |
| 4181 | Me$_3$Sl—C$_{11}$H$_{22}$—O— | —C$_8$H$_{17}$ | K 56.7 | C 63.8 I |
| 4182 | Me$_3$Sl—C$_{11}$H$_{22}$—O— | —O—C$_8$H$_{17}$ | K 70 | C 92 E |
| 4183 | C$_4$H$_9$SlMe$_2$—C$_3$H$_6$—O— | —O—C$_8$H$_{17}$ | K 45 | C 65 A 68 E |
| 4184 | C$_4$H$_9$SlMe$_2$—C$_4$H$_8$—O— | —C$_8$H$_{17}$ | K 16.7 | C 22.3 A 25.9 I |
| 4185 | C$_4$H$_9$SlMe$_2$—C$_4$H$_8$—O— | —O—C$_8$H$_{17}$ | K 18.5 | C 63.1 A 84 I |
| 4186 | C$_4$H$_9$SlMe$_2$—C$_5$H$_{10}$—O— | —O—C$_8$H$_{17}$ | K 38 | C 74 A 82 E |
| 4187 | C$_4$H$_9$SlMe$_2$—C$_6$H$_{12}$—O— | —O—C$_8$H$_{17}$ | K 22 | C 72 A 78.5 E |
| 4188 | ElMe$_2$Sl—C$_4$H$_8$—O— | —C$_8$H$_{17}$ | K 35.2 | C 30.8 A 32.3 I |
| 4189 | ElMe$_2$Sl—C$_4$H$_8$—O— | —O—C$_8$H$_{17}$ | K 49.4 | C 71 A 71.3 I |
| 4190 | ElMe$_2$Sl—C$_6$H$_{12}$—O— | —C$_8$H$_{17}$ | K 22.6 | C 41.6 A 50.4 I |
| 4191 | ElMe$_2$Sl—C$_6$H$_{12}$—O— | —O—C$_8$H$_{17}$ | K 38.6 | C 78 A 84 I |
| 4192 | ElMe$_2$Sl—C$_{11}$H$_{22}$—O— | —C$_8$H$_{17}$ | K 45.7 | C 58.6 A 58.9 I |
| 4211 | C$_5$H$_{11}$— | —CN | K 94 | C 93.5 N 109 I |
| 4212 | C$_6$H$_{13}$— | —CN | K 86.5 | A 101.5 N 103 I |
| 4213 | C$_7$H$_{15}$— | —CN | K 96.5 | A 109 I |
| 4214 | C$_9$H$_{18}$— | —CN | K 90 | A 107 I |
| 4219 | C$_5$H$_{11}$—O— | —CN | K 97 | A 102.5 N 133 I |
| 4220 | C$_6$H$_{13}$—O— | —CN | K 93.5 | A 121 N 134 I |
| 4221 | C$_7$H$_{15}$—O— | —CN | K 102.5 | A 127 N 129.5 I |
| 4222 | C$_8$H$_{17}$—O— | —CN | K 102 | A 133 I |
| 4223 | C$_9$H$_{19}$—O— | —CN | K ? | X 71 |

TABLE 83

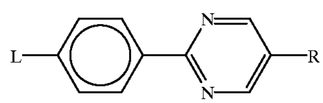

| No | L | R | Cr | LC |
|---|---|---|---|---|
| 4229 | C$_6$H$_{13}$ —OCOO— | —CN | K 83 | A 96 N 121 I |
| 4230 | C$_8$H$_{17}$—O— | —O—C$_6$H$_{12}$—SlMe$_3$ | K 38.7 | C 64.5 I |
| 4231 | C$_8$H$_{17}$—O— | —O—C$_{11}$H$_{22}$—SlMe$_3$ | K 69.4 | C 92 I |
| 4232 | C$_{12}$H$_{25}$—O— | —O—C$_{11}$H$_{22}$—SlMe$_3$ | K 81.6 | C 89.9 I |
| 4233 | C$_8$H$_{17}$—O— | —O—C$_4$H$_8$—SlMe$_2$C$_4$H$_9$ | K 36.4 | A 30.6 N 30.7 I |
| 4234 | C$_8$H$_{17}$—O— | —O—C$_6$H$_{12}$—SlMe$_2$El | K 28.7 | C 56 |
| 4235 | C$_{12}$H$_{25}$—O— | —O—C$_{11}$H$_{22}$—SlMe$_2$El | K 75.4 | C 84.9 I |
| 4236 | C$_5$H$_{11}$— | —C$_6$H$_{13}$ | K 10 | A 26.5 I |
| 4237 | C$_5$H$_{11}$— | —C$_7$H$_{15}$ | K 30.6 | S 47.7 I |
| 4239 | C$_6$H$_{13}$— | —C$_7$H$_{15}$ | K 21.1 | S 47.3 I |
| 4240 | C$_6$H$_{13}$— | —C$_8$H$_{17}$ | K 20.5 | A 48.4 I |
| 4241 | C$_7$H$_{15}$— | —C$_6$H$_{13}$ | K 15 | A 29 I |
| 4242 | C$_7$H$_{15}$— | —C$_8$H$_{17}$ | K 23.4 | A 50.3 I |
| 4243 | C$_7$H$_{15}$— | —C$_9$H$_{19}$ | K 41.1 | F 24 A 59.7 I |
| 4244 | C$_7$H$_{15}$— | —C$_{10}$H$_{21}$ | K 29.8 | F 33.8 C 43.3 A 60.6 I |
| 4245 | C$_7$H$_{15}$— | —C$_{11}$H$_{23}$ | K 39.2 | F 48.4 C 53.5 A 64.7 I |
| 4246 | C$_7$H$_{15}$— | —C$_{12}$H$_{25}$ | K 41.4 | F 53.8 C 58 A 65.2 I |
| 4247 | C$_7$H$_{15}$— | —C$_{14}$H$_{29}$ | K 38.5 | F 62.7 A 67.2 I |
| 4248 | C$_8$H$_{17}$— | —C$_6$H$_{13}$ | K 18 | A 29.5 I |
| 4249 | C$_8$H$_{17}$— | —C$_7$H$_{15}$ | K 18.5 | A 48.1 I |
| 4250 | C$_8$H$_{17}$— | —C$_8$H$_{17}$ | K 31.5 | A 50.2 I |
| 4251 | C$_8$H$_{17}$— | —C$_9$H$_{19}$ | K 29 | F 24.6 A 59.8 I |
| 4252 | C$_8$H$_{17}$— | —C$_{10}$H$_{21}$ | K 33.6 | F 36.7 C 46.2 A 59.8 I |
| 4253 | C$_8$H$_{17}$— | —C$_{11}$H$_{23}$ | K 41 | F 50.8 C 55.4 A 64.2 I |
| 4254 | C$_8$H$_{17}$— | —C$_{12}$H$_{25}$ | K 47.5 | F 55.6 C 62.2 A 64.2 I |
| 4255 | C$_8$H$_{17}$— | —C$_{14}$H$_{29}$ | K 57.7 | F 64.5 C 66.3 I |

TABLE 84

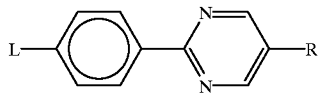

| No | L | R | Cr | LC |
|---|---|---|---|---|
| 4256 | $C_8H_{17}$— | —$C_{16}H_{33}$ | K 56 | F 67 I |
| 4257 | $C_9H_{19}$— | —$C_6H_{13}$ | K 23.5 | A 30.5 N 33 I |
| 4258 | $C_9H_{19}$— | —$C_8H_{17}$ | K 27.3 | A 51.2 I |
| 4259 | $C_9H_{19}$— | —$C_{10}H_{21}$ | K 32.5 | F 36.5 C 44 A 60.7 I |
| 4260 | $C_9H_{19}$— | —$C_{12}H_{25}$ | K 41 | F 56.8 C 63.2 A 65.6 I |
| 4261 | $C_{10}H_{21}$— | —$C_6H_{13}$ | K 31 | A 29.3 N 31 I |
| 4262 | $C_{10}H_{21}$— | —$C_8H_{17}$ | K 35.5 | A 49.7 I |
| 4263 | $C_{10}H_{21}$— | —$C_{10}H_{21}$ | K 46.3 | C 45 A 59.8 I |
| 4264 | $C_{10}H_{21}$— | —$C_{11}H_{23}$ | K 41.2 | F 52.6 C 54.6 A 64.6 I |
| 4265 | $C_{10}H_{21}$— | —$C_{12}H_{25}$ | K 46.8 | F 58 C 64 A 65 I |
| 4266 | $C_{12}H_{25}$— | —$C_8H_{17}$ | K 46.8 | A 48.3 I |
| 4267 | $C_{12}H_{25}$— | —$C_{11}H_{23}$ | K 52.9 | F 52.2 A 63.6 I |
| 4268 | $C_{12}H_{25}$— | —$C_{12}H_{25}$ | K 59.9 | F 59.7 C 64 A 64.7 I |
| 4269 | $C_4H_9$— | —O—$C_6H_{13}$ | K 42 | A 72 I |
| 4271 | $C_6H_{13}$— | —O—$C_4H_9$ | K 40 | A 56.6 N 60.5 I |

TABLE 84-continued

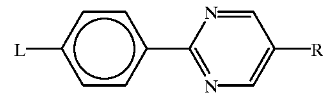

| No | L | R | Cr | LC |
|---|---|---|---|---|
| 4272 | $C_6H_{13}$— | —O—$C_5H_{11}$ | K 48 | A 62 I |
| 4273 | $C_6H_{13}$— | —O—$C_6H_{13}$ | K 49 | A 77 I |
| 4274 | $C_6H_{13}$— | —O—$C_7H_{15}$ | K 32.5 | C 50.6 A 76.6 I |
| 4275 | $C_6H_{13}$— | —O—$C_8H_{17}$ | K 29 | C 68 A 85 I |
| 4276 | $C_6H_{13}$— | —O—$C_9H_{19}$ | K 47.7 | C 77.2 A 83.6 I |
| 4277 | $C_6H_{13}$— | —O—$C_{10}H_{21}$ | K 38 | S 35 C 82 A 87 I |
| 4278 | $C_6H_{13}$— | —O—$C_{11}H_{23}$ | K 38.8 | S 42.3 C 84.3 A 86.4 I |
| 4279 | $C_6H_{13}$— | —O—$C_{12}H_{25}$ | K 35 | S 47.4 C 85.6 A 87.1 I |
| 4280 | $C_6H_{13}$— | —O—$C_{14}H_{29}$ | K 34.4 | S 54.9 C 85.2 A 86.6 I |
| 4281 | $C_6H_{13}$— | —O—$C_{15}H_{31}$ | K 49.9 | S 56.7 C 83.3 A 85.2 I |
| 4283 | $C_7H_{15}$— | —O—$C_5H_{11}$ | K 46 | A 64 N 66 I |
| 4284 | $C_7H_{15}$— | —O—$C_6H_{13}$ | K 51 | A 78 I |
| 4285 | $C_7H_{15}$— | —O—$C_7H_{15}$ | K 32.2 | C 45 A 77.5 I |

TABLE 85

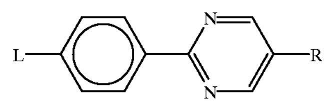

| No | L | R | Cr | LC |
|---|---|---|---|---|
| 4286 | $C_7H_{15}$— | —O—$C_8H_{17}$ | K 32 | C 64 A 87 I |
| 4287 | $C_7H_{15}$— | —O—$C_9H_{19}$ | K 34.2 | C 76.3 A 85.1 I |
| 4288 | $C_7H_{15}$— | —O—$C_{10}H_{21}$ | K 32 | S 33 C 83 A 88 I |
| 4289 | $C_7H_{15}$— | —O—$C_{11}H_{23}$ | K 38.7 | S 45.2 C 86.8 A 88.6 I |
| 4290 | $C_7H_{15}$— | —O—$C_{12}H_{25}$ | K 48 | S 54 C 88 A 89 I |
| 4292 | $C_8H_{17}$— | —O—$C_5H_{11}$ | K 47 | A 61 I |
| 4293 | $C_8H_{17}$— | —O—$C_6H_{13}$ | K 46 | A 76 I |
| 4294 | $C_8H_{17}$— | —O—$C_7H_{15}$ | K 46.5 | C 39 A 77.5 I |
| 4295 | $C_8H_{17}$— | —O—$C_8H_{17}$ | K 39 | C 58 A 84 I |
| 4296 | $C_8H_{17}$— | —O—$C_9H_{19}$ | K 40.5 | C 76 A 84.6 I |
| 4297 | $C_8H_{17}$— | —O—$C_{10}H_{21}$ | K 42 | C 84 A 88 I |
| 4298 | $C_8H_{17}$— | —O—$C_{11}H_{23}$ | K 54.3 | C 87.2 I |
| 4299 | $C_8H_{17}$— | —O—$C_{12}H_{25}$ | K 57 | S 58 C 89 I |
| 4300 | $C_8H_{17}$— | —O—$C_{14}H_{29}$ | K 59.8 | S 67.2 C 88.3 I |
| 4301 | $C_8H_{17}$— | —O—$C_{15}H_{31}$ | K 57.9 | S 69.6 C 87.5 I |
| 4303 | $C_9H_{19}$— | —O—$C_5H_{11}$ | K 49 | A 62 N 63 I |
| 4304 | $C_9H_{19}$— | —O—$C_6H_{13}$ | K 48 | A 77 I |
| 4305 | $C_9H_{19}$— | —O—$C_7H_{15}$ | K 40 | A 78 I |
| 4306 | $C_9H_{19}$— | —O—$C_8H_{17}$ | K 36 | C 53 A 85 I |
| 4307 | $C_9H_{19}$— | —O—$C_9H_{19}$ | K 39 | C 73.9 A 84.9 I |
| 4308 | $C_9H_{19}$— | —O—$C_{10}H_{21}$ | K 37 | S 32 C 83 A 87 I |
| 4309 | $C_9H_{19}$— | —O—$C_{11}H_{23}$ | K 45 | S 46 C 87 I |
| 4310 | $C_9H_{19}$— | —O—$C_{12}H_{25}$ | K 47 | S 59 C 89 I |
| 4311 | $C_{10}H_{21}$— | —O—$C_9H_{19}$ | K 46.6 | C 71.4 A 83.8 I |
| 4312 | $C_{10}H_{21}$— | —O—$C_{11}H_{23}$ | K 51.4 | S 47 C 86.5 I |
| 4326 | $C_8H_{17}$— | —O—C—$C_7H_{15}$ | K 79.4 | A 74.4 I |
| 4334 | $C_3H_7$—O—$C_5H_{10}$— | —O—$C_8H_{17}$ | K 8 | C 47 A 69 I |
| 4335 | $C_3H_7$—O—$C_5H_{10}$— | —OOC—$C_7H_{15}$ | K 70 | I |

TABLE 86

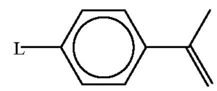

| No | L | R | | Cr | LC |
|---|---|---|---|---|---|
| 4336 | $C_6H_{13}$—O—CHMe— | —O—$C_{10}H_{21}$ | 1 | K <−40 | C* −40 A −23 I |
| 4337 | $C_2H_5$—O—CHMe—$C_5H_{10}$— | —O—$C_6H_{13}$ | 1 | K −22 | C* −21 A 48 I |
| 4338 | $C_2H_5$—O—CHMe—$C_5H_{10}$— | —O—$C_8H_{17}$ | 1 | K ? | S 8 C* 49 A 55 I |
| 4339 | $C_2H_5$—O—CHMe—$C_5H_{10}$— | —O—$C_{10}H_{21}$ | 1 | K ? | S 10 C* 55 I |
| 4340 | $C_2H_5$—O—CHMe—$C_5H_{10}$— | —O—$C_{11}H_{23}$ | 1 | K 27 | C* 56 I |
| 4341 | $C_2H_5$—O—CHMe—$C_5H_{10}$— | —O—$C_{12}H_{25}$ | 1 | K 13 | C* 56 I |
| 4342 | $C_3H_7$—O—CHMe—$C_5H_{10}$— | —O—$C_8H_{17}$ | 1 | K ? | C −6 C* 46 A 52 I |
| 4343 | $C_5H_{11}$—O—CHMe—$C_5H_{10}$— | —O—$C_8H_{17}$ | 1 | K ? | S −4 C* 37 A 44 I |
| 4346 | $CH_3$—O— | —$C_9H_{19}$ | | K 40 | S 31 N 41 I |
| 4349 | $C_2H_5$—O— | —$C_8H_{17}$ | | K 42.5 | A 43.5 N 56.5 I |
| 4353 | $C_3H_7$—O— | —$C_7H_{15}$ | | K 42 | A 43.5 N 52 I |
| 4354 | $C_3H_7$—O— | —$C_8H_{17}$ | | K 45 | A 49.5 I |
| 4358 | $C_4H_9$—O— | —$C_7H_{15}$ | | K 40.5 | A 42 N 64 I |
| 4359 | $C_4H_9$—O— | —$C_8H_{17}$ | | K 35 | A 53.5 N 60 I |
| 4363 | $C_5H_{11}$—O— | —$C_7H_{15}$ | | K 49 | C 48.5 A 52 N 66 I |
| 4364 | $C_5H_{11}$—O— | —$C_8H_{17}$ | | K 38 | A 54 N 58 I |
| 4365 | $C_5H_{11}$—O— | —$C_9H_{19}$ | | K 41 | A 65.5 I |
| 4366 | $C_5H_{11}$—O— | —$C_{10}H_{21}$ | | K 47.5 | A 67 I |

TABLE 87

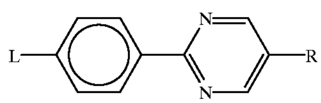

| No | L | R | Cr | LC |
|---|---|---|---|---|
| 4370 | $C_6H_{13}$—O— | —$C_7H_{15}$ | K 45.5 | A 33 N 69.5 I |
| 4371 | $C_6H_{13}$—O— | —$C_8H_{17}$ | K 27.5 | C 44.5 A 57.5 N 65 I |
| 4372 | $C_6H_{13}$—O— | —$C_9H_{19}$ | K 33.5 | C 49.5 A 71 N 71.5 I |
| 4373 | $C_6H_{13}$—O— | —$C_{10}H_{21}$ | K 32.5 | C 62 A 74.5 I |
| 4377 | $C_7H_{15}$—O— | —$C_7H_{15}$ | K 44 | C 44 A 49 N 68 I |
| 4378 | $C_7H_{15}$—O— | —$C_8H_{17}$ | K 46 | C 49 A 61 N 66 I |
| 4379 | $C_7H_{15}$—O— | —$C_9H_{19}$ | K 35 | C 51.5 A 71.5 I |
| 4380 | $C_7H_{15}$—O— | —$C_{10}H_{21}$ | K 46 | C 62.5 A 72 I |
| 4384 | $C_8H_{17}$—O— | —$C_7H_{15}$ | K 49 | A 44 N 69.5 I |

TABLE 87-continued

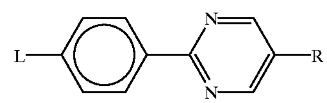

| No | L | R | Cr | LC |
|---|---|---|---|---|
| 4385 | $C_8H_{17}$—O— | —$C_8H_{17}$ | K 35 | C 57 A 64 N 70 I |
| 4386 | $C_8H_{17}$—O— | —$C_9H_{19}$ | K 33 | C 60 A 74.5 I |
| 4387 | $C_8H_{17}$—O— | —$C_{10}H_{21}$ | K 37 | C 68.5 A 73.5 I |
| 4391 | $C_9H_{19}$—O— | —$C_7H_{15}$ | K 48 | C 51 A 57 N 70 I |
| 4392 | $C_9H_{19}$—O— | —$C_8H_{17}$ | K 33 | C 58 A 65 N 68.5 I |
| 4393 | $C_9H_{19}$—O— | —$C_9H_{19}$ | K 34 | C 61 A 75 I |
| 4394 | $C_9H_{19}$—O— | —$C_{11}H_{23}$ | K 45 | C 78 A 80 I |
| 4397 | $C_{10}H_{21}$—O— | —$C_7H_{15}$ | K 53 | A 54.5 N 71.5 I |

TABLE 88

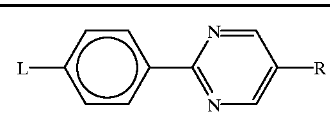

| No | L | R | | Cr | LC |
|---|---|---|---|---|---|
| 4398 | $C_{10}H_{21}$—O— | —$C_8H_{17}$ | | K 32 | C 59.5 A 65.5 N 69.5 I |
| 4399 | $C_{10}H_{21}$—O— | —$C_{10}H_{21}$ | | K 41 | C 74 A 77 I |
| 4401 | $C_{11}H_{23}$—O— | —$C_7H_{15}$ | | K 55 | C 54.5 A 62.5 N 70 I |
| 4402 | $C_{11}H_{23}$—O— | —$C_8H_{17}$ | | K 44.5 | C 60 A 67 N 69 I |
| 4405 | $C_{12}H_{25}$—O— | —$C_7H_{15}$ | | K 59.5 | C 57.5 A 63 N 71 I |
| 4406 | $C_{12}H_{25}$—O— | —$C_8H_{17}$ | | K 42 | C 61.5 A 68.5 N 70 I |
| 4408 | $C_{10}H_{21}$—O— | —$C_5H_{10}$—CHMe—O—$C_2H_5$ | 1 | K 43 | C* 13 N* 27 I |
| 4409 | $C_3H_7$—O— | —O—$C_7H_{15}$ | | K 68.6 | C 65 A 78.7 N 83.6 I |
| 4410 | $C_3H_7$—O— | —O—$C_8H_{17}$ | | K 49.8 | C 70.5 A 88.2 N 88.7 I |
| 4411 | $C_3H_7$—O— | —O—$C_9H_{19}$ | | K 43.7 | C 72 A 89.4 I |
| 4412 | $C_3H_7$—O— | —O—$C_{10}H_{21}$ | | K 45.6 | C 71 A 92.6 I |
| 4413 | $C_3H_7$—O— | —O—$C_{11}H_{23}$ | | K 41.9 | C 68 A 93 I |
| 4414 | $C_3H_7$—O— | —O—$C_{12}H_{25}$ | | K 43.4 | C 61.6 A 94.1 I |
| 4415 | $C_4H_9$—O— | —O—$C_7H_{15}$ | | K 53.4 | C 75.1 A 82.4 N 92.1 I |

TABLE 88-continued

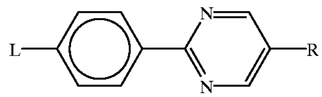

| No | L | R | Cr | LC |
|---|---|---|---|---|
| 4416 | $C_4H_9$—O— | —O—$C_8H_{17}$ | K 54.4 | C 84 A 94.7 N 96.6 I |
| 4417 | $C_4H_9$—O— | —O—$C_9H_{19}$ | K 44.4 | C 87.7 A 96.6 I |
| 4418 | $C_4H_9$—O— | —O—$C_{10}H_{21}$ | K 41.8 | C 90 A 99.4 I |
| 4419 | $C_4H_9$—O— | —O—$C_{11}H_{23}$ | K 42.3 | C 89 A 99.8 I |
| 4420 | $C_4H_9$—O— | —O—$C_{12}H_{25}$ | K 41.8 | C 88.4 A 101 I |
| 4422 | $C_5H_{11}$—O— | —O—$C_6H_{13}$ | K 62 | C 65.9 A 76.6 N 92.7 I |
| 4423 | $C_5H_{11}$—O— | —O—$C_7H_{15}$ | K 64.4 | C 77.4 A 84.2 N 91.3 I |
| 4424 | $C_5H_{11}$—O— | —O—$C_8H_{17}$ | K 50.2 | C 85.9 A 93.9 N 94.8 I |
| 4425 | $C_5H_{11}$—O— | —O—$C_9H_{19}$ | K 66.7 | C 90 A 95 I |
| 4426 | $C_5H_{11}$—O— | —O—$C_{10}H_{21}$ | K 41.4 | C 93.9 A 97.2 I |
| 4427 | $C_5H_{11}$—O— | —O—$C_{11}H_{23}$ | K 51.4 | C 95.9 A 98.2 I |
| 4428 | $C_5H_{11}$—O— | —O—$C_{12}H_{25}$ | K 41.7 | C 96.2 A 98.6 I |

TABLE 89

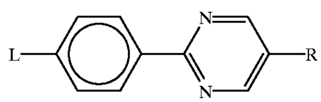

| No. | L | R | Cr | LC |
|---|---|---|---|---|
| 4429 | $C_6H_{13}$—O— | —O—$C_6H_{13}$ | K 62 | A 68 N 89 I |
| 4430 | $C_6H_{13}$—O— | —O—$C_7H_{15}$ | K 45.8 | C 80.8 A 84.7 N 94.9 I |
| 4431 | $C_6H_{13}$—O— | —O—$C_8H_{17}$ | K 42.8 | C 89.8 A 96.6 N 88.7 I |
| 4432 | $C_6H_{13}$—O— | —O—$C_8H_{19}$ | K 49.9 | C 94.4 A 97.8 I |
| 4433 | $C_6H_{13}$—O— | —O—$C_{10}H_{21}$ | K 43.8 | C 98.7 A 100.3 I |
| 4434 | $C_6H_{13}$—O— | —O—$C_{11}H_{23}$ | K 55.4 | C 100.4 A 101 I |
| 4435 | $C_6H_{13}$—O— | —O—$C_{12}H_{25}$ | K 52.2 | C 100.2 I |
| 4436 | $C_7H_{15}$—O— | —O—$C_6H_{13}$ | K 60.8 | C 68.2 A 79.4 N 94.6 I |
| 4437 | $C_7H_{15}$—O— | —O—$C_7H_{15}$ | K 59.2 | C 79.8 A 87.6 N 93.6 I |
| 4438 | $C_7H_{15}$—O— | —O—$C_8H_{17}$ | K 51.6 | C 87.2 A 96.4 N 97.1 I |
| 4439 | $C_7H_{15}$—O— | —O—$C_8H_{19}$ | K 56 | C 94.9 A 97.8 I |
| 4440 | $C_7H_{15}$—O— | —O—$C_{10}H_{21}$ | K 55.6 | C 99.86 A 100.3 I |
| 4441 | $C_7H_{15}$—O— | —O—$C_{11}H_{23}$ | K 67.4 | C 100.1 I |
| 4442 | $C_7H_{15}$—O— | —O—$C_{12}H_{25}$ | K 54.8 | C 100.3 I |
| 4444 | $C_8H_{17}$—O— | —O—$C_6H_{13}$ | K 59.3 | C 73 A 80 N 96.2 I |

TABLE 89-continued

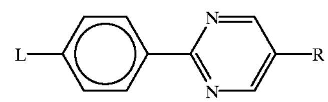

| No. | L | R | Cr | LC |
|---|---|---|---|---|
| 4445 | $C_8H_{17}$—O— | —O—$C_7H_{15}$ | K 63.4 | C 81.5 A 88.3 N 85.4 I |
| 4446 | $C_8H_{17}$—O— | —O—$C_8H_{17}$ | K 51 | C 82.3 A 99.5 N 100.3 I |
| 4447 | $C_8H_{17}$—O— | —O—$C_8H_{19}$ | K 48.2 | C 86.4 A 99 I |
| 4448 | $C_8H_{17}$—O— | —O—$C_{10}H_{21}$ | K 51.7 | C 100.7 A 102.1 I |
| 4449 | $C_8H_{17}$—O— | —O—$C_{11}H_{23}$ | K 59.9 | C 101.7 I |
| 4450 | $C_8H_{17}$—O— | —O—$C_{12}H_{25}$ | K 57.1 | C 102.9 I |
| 4451 | $C_9H_{19}$—O— | —O—$C_6H_{13}$ | K 61.6 | C 68.9 A 83.2 N 93.7 I |
| 4452 | $C_9H_{19}$—O— | —O—$C_7H_{15}$ | K 55.2 | C 78.7 A 89.6 N 93.6 I |
| 4453 | $C_9H_{19}$—O— | —O—$C_8H_{17}$ | K 55.1 | C 87.5 A 95.2 I |
| 4454 | $C_9H_{19}$—O— | —O—$C_8H_{19}$ | K 65 | C 97 A 101 I |
| 4455 | $C_9H_{19}$—O— | —O—$C_{10}H_{21}$ | K 52.5 | C 101.1 I |
| 4456 | $C_9H_{19}$—O— | —O—$C_{11}H_{23}$ | K 62 | C 101 I |
| 4457 | $C_9H_{19}$—O— | —O—$C_{12}H_{25}$ | K 60.3 | C 100.3 I |
| 4458 | $C_{10}H_{21}$—O— | —O—$C_6H_{13}$ | K 62.3 | C 71.6 A 83.8 N 93.6 I |

TABLE 90

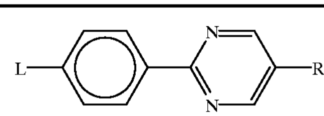

| No | L | R | Cr | LC |
|---|---|---|---|---|
| 4459 | $C_{10}H_{21}$—O— | —O—$C_7H_{15}$ | K 50.4 | C 79.7 A 90.1 N 93.6 I |
| 4460 | $C_{10}H_{21}$—O— | —O—$C_8H_{17}$ | K 50 | C 89 A 99.6 I |
| 4461 | $C_{10}H_{21}$—O— | —O—$C_9H_{19}$ | K 52.3 | C 96.2 A 99 I |
| 4462 | $C_{10}H_{21}$—O— | —O—$C_{10}H_{21}$ | K 52.7 | C 101.4 I |
| 4463 | $C_{10}H_{21}$—O— | —O—$C_{11}H_{23}$ | K 62.9 | C 101.2 I |
| 4464 | $C_{10}H_{21}$—O— | —O—$C_{12}H_{25}$ | K 65.4 | C 102.8 I |
| 4465 | $C_{10}H_{21}$—O— | —O—$C_{14}H_{29}$ | K 67 | C 103 I |
| 4466 | $C_{10}H_{21}$—O— | —O—$C_6H_{13}$ | K 69.3 | C 69 A 86.2 N 91.8 I |

TABLE 90-continued

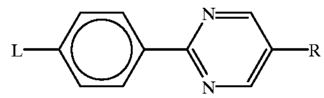

| No | L | R | Cr | LC |
|---|---|---|---|---|
| 4467 | $C_{11}H_{23}$—O— | —O—$C_7H_{15}$ | K 58.2 | C 77 A 90.1 N 91.9 I |
| 4468 | $C_{11}H_{23}$—O— | —O—$C_8H_{17}$ | K 56 | C 84.9 A 97.1 I |
| 4469 | $C_{11}H_{23}$—O— | —O—$C_9H_{19}$ | K 56.2 | C 92.7 A 96.1 I |
| 4470 | $C_{11}H_{23}$—O— | —O—$C_{10}H_{21}$ | K 53.1 | C 100.6 I |
| 4471 | $C_{11}H_{23}$—O— | —O—$C_{11}H_{23}$ | K 69.8 | C 99.8 I |
| 4472 | $C_{11}H_{23}$—O— | —O—$C_{12}H_{25}$ | K 65.6 | C 101 I |
| 4473 | $C_{11}H_{23}$—O— | —O—$C_{16}H_{33}$ | K 71.3 | S 75.6 C 100.9 I |
| 4474 | $C_{12}H_{25}$—O— | —O—$C_6H_{13}$ | K 70.3 | C 70.7 A 96.2 N 91.4 I |
| 4475 | $C_{12}H_{25}$—O— | —O—$C_7H_{15}$ | K 57.1 | C 77.2 A 89.4 N 90.9 I |
| 4476 | $C_{12}H_{25}$—O— | —O—$C_8H_{17}$ | K 50 | C 86 A 98 I |
| 4477 | $C_{12}H_{25}$—O— | —O—$C_9H_{19}$ | K 53.8 | C 93.5 A 96.9 I |
| 4478 | $C_{12}H_{25}$—O— | —O—$C_{10}H_{21}$ | K 54.6 | C 100.3 I |
| 4479 | $C_{12}H_{25}$—O— | —O—$C_{11}H_{23}$ | K 59.5 | C 100.7 I |
| 4480 | $C_{12}H_{25}$—O— | —O—$C_{12}H_{25}$ | K 63.7 | C 104.3 I |
| 4481 | $C_{12}H_{25}$—O— | —O—$C_{16}H_{33}$ | K 71.2 | S 73.7 C 99 I |
| 4484 | $C_8H_{17}$—O— | —O—$C_4H_8$—$CMe_2$—$C_4H_9$ | K 54 | C 34 N 37 I |
| 4485 | $C_8H_{17}$—O— | —O—$C_6H_{12}$—$CMe_2$—$C_4H_9$ | K 43 | C 55 I |
| 4498 | $C_7H_{15}$—O— | —OOC—$C_6H_{13}$ | K 64.9 | C 66.2 N 85.8 I |
| 4499 | $C_7H_{15}$—O— | —OOC—$C_6H_{19}$ | K 74.8 | C 96.5 I |
| 4500 | $C_7H_{15}$—O— | —OOC—$C_{13}H_{27}$ | K 81 | S 73 C 101 I |
| 4501 | $C_8H_{17}$—O— | —OOC—$C_6H_{13}$ | K 63.4 | C 69.7 N 89.7 I |
| 4502 | $C_8H_{17}$—O— | —OOC—$C_7H_{15}$ | K 75 | C 74.4 N 91.3 I |

TABLE 91

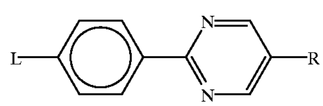

| No | L | R | | Cr | LC |
|---|---|---|---|---|---|
| 4614 | $C_7H_{15}$—O— | —$C_7H_{15}$ | | K 54 | A 40 N 57 I |
| 4615 | $C_7H_{15}$—O— | —$C_8H_{17}$ | | K 51 | C 52 A 54 N 56 I |
| 4616 | $C_7H_{15}$—O— | —$C_9H_{19}$ | | K 53 | C 64 A 65 I |
| 4619 | $C_8H_{17}$—O— | —$C_8H_{17}$ | | K 49 | C 53.5 A 54.8 N 56.5 I |
| 4620 | $C_8H_{17}$—O— | —$C_{10}H_{21}$ | | K 53 | S 50 C 70 I |
| 4623 | $C_9H_{19}$—O— | —$C_8H_{17}$ | | K 42 | C 55.5 N 59.8 I |
| 4626 | $C_{10}H_{21}$—O— | —$C_8H_{17}$ | | K 57 | C 56.5 A 56.7 N 59 I |
| 4629 | $C_{11}H_{23}$—O— | —$C_8H_{17}$ | | K 56 | C 57.5 N 60.8 I |
| 4630 | $C_7H_{15}$—O— | —O—$C_8H_{17}$ | | K 73 | C 89 A 92 N 93 I |
| 4636 | $C_4H_9$—$CMe_2$ —$CH_2$—COO— | —O—$C_8H_{17}$ | | K 53 | C 49 N 50 I |
| 4637 | $C_6H_{13}$—$CMe_2$ —$CH_2$—COO— | —O—$C_8H_{17}$ | | K 45 | C 42 N 46 I |
| 4643 | $C_5H_{11}$—OCOO— | —$C_{12}H_{25}$ | | K 48 | A 52 I |
| 4645 | $C_9H_{19}$—OCOO— | —$C_{12}H_{25}$ | | K 46 | C 59 I |
| 4647 | $C_{12}H_{25}$—OCOO— | —$C_{12}H_{25}$ | | K 57 | C 60 I |
| 4661 | $C_8H_{17}$—O— | —$C_3H_6$—CHMe —$C_2H_5$ | 1 | K 33.5 | N* 19 U |
| 4662 | $C_9H_{19}$—O— | —$C_3H_6$—CHMe —$C_2H_5$ | 1 | K 35 | N* 20 U |
| 4663 | $C_{10}H_{21}$—O— | —$C_3H_6$—CHMe —$C_2H_5$ | 1 | K 38 | N* 21.5 U |
| 4664 | $C_{12}H_{25}$—O— | —$C_3H_6$—CHMe —$C_2H_5$ | 1 | K 43.5 | N* 40.5 U |
| 4665 | $C_8H_{17}$— | —O—$C_5H_{10}$—CHMe —$C_2H_5$ | 1 | K-13 | S 10 S 18 C* 51 A 51.4 I |
| 4666 | $C_8H_{17}$— | —O—$C_5H_{10}$— —$C_2H_5$ | 2 | K 16 | C 57.5 A 59 I |

TABLE 92

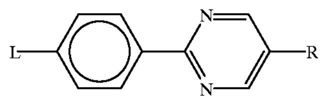

| No | L | R | Cr | | LC |
|---|---|---|---|---|---|
| 4697 | $C_6H_{17}$—O— | —O—$CH_2$—CHF—$C_8H_{17}$ | 1 | K 62.5 | C* 92 A 97 I |
| 4698 | $C_9H_{19}$—O— | —O—$CH_2$—CHF—$C_6H_{13}$ | 1 | K 61 | C* 90.3 A 96.2 I |
| 4699 | $C_{10}H_{21}$—O— | —O—$CH_2$—CHF—$C_6H_{13}$ | 1 | K 47 | C* 90 A 97 I |
| 4700 | $C_{12}H_{25}$—O— | —O—$CH_2$—CHF—$C_6H_{13}$ | 1 | K 65 | C* 89 A 96 I |
| 4701 | $C_6H_{17}$— | —$C_2H_4$—CHF—$C_6H_{13}$ | 1 | K 31 | C* 25 A 62 I |
| 4702 | $C_6H_{17}$—O— | —$C_2H_4$—CHF—$C_6H_{13}$ | S | K 74 | A 82 I |
| 4703 | $C_{10}H_{21}$—O— | —$C_2H_4$—CHF—$C_6H_{13}$ | 1 | K 71 | C* 69 A 82 I |
| 4704 | $C_{10}H_{21}$—O— | —$C_2H_4$—CHF—$C_8H_{17}$ | S | K 86 | C* 84 A 65 I |
| 4705 | $C_{12}H_{25}$—O— | —$C_2H_4$—CHF—$C_6H_{13}$ | S | K 74 | A 52 I |
| 4706 | $C_{10}H_{21}$—O— | —O—$C_2H_4$—CHF—$C_6H_{13}$ | 1 | K 50 | C* 96 N* 97 I |
| 4707 | $C_{10}H_{21}$—O— | —O—$C_2H_4$—CHF—$C_6H_{13}$ | 1 | K 61 | C* 102 A 103 I |
| 4715 | $C_3H_7$—O—$C_5H_{11}$— | —OOC—CH=CH—$C_7H_{15}$ | | K 63 | C 61 N 69 I |
| 4716 | $C_3H_7$—O—$C_5H_{11}$— | —OOC—CH=CH—$C_8H_{17}$ | | K 53 | C 62 A 64 N 55 I |
| 4717 | $C_3H_7$—O—$C_5H_{11}$— | —OOC—CH=CH—$C_9H_{19}$ | | K 63 | C 73 I |
| 4718 | $C_6H_{13}$— | —O—$CH_2$—CH=CH—$C_2H_4$ | | K 57 | A 63 I |
| 4719 | $C_6H_{13}$— | —O—$CH_2$—CH=CH—$C_3H_7$ | | K 67 | A 75 I |
| 4720 | $C_6H_{13}$— | —O—$CH_2$—CH=CH—$C_4H_9$ | | K 62 | C 65 A 71 I |
| 4721 | $C_6H_{13}$— | —O—$CH_2$—CH=CH—$C_5H_{11}$ | | K 61 | C 76 A 80 I |
| 4722 | $C_6H_{13}$— | —O—$CH_2$—CH=CH—$C_6H_{13}$ | | K 74 | C 75 I |
| 4723 | $C_6H_{13}$— | —O—$CH_2$—CH=CH—$C_3H_7$ | | K 65 | C 82 I |
| 4724 | $C_6H_{13}$— | —O—$CH_2$—CH=CH—$C_8H_{17}$ | | K 73 | C 82 I |
| 4725 | $C_6H_{13}$— | —O—$CH_2$—CH=CH—$C_9H_{19}$ | | K 56 | S 72 C 84 I |
| 4726 | $C_7H_{15}$— | —O—$CH_2$—CH=CH—$C_2H_4$ | | K 53 | A 55 I |
| 4727 | $C_7H_{15}$— | —O—$CH_2$—CH=CH—$C_3H_7$ | | K 69 | A 78 I |
| 4728 | $C_7H_{15}$— | —O—$CH_2$—CH=CH—$C_4H_9$ | | K 50 | C 61 A 73 I |
| 4729 | $C_7H_{15}$— | —O—$CH_2$—CH=CH—$C_5H_{11}$ | | K 59 | C 75 A 82 I |
| 4730 | $C_7H_{15}$— | —O—$CH_2$—CH=CH—$C_6H_{13}$ | | K 67 | C 80 I |

TABLE 93

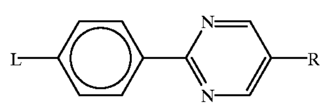

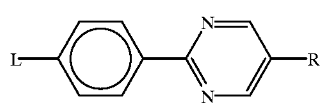

| No | L | R | Cr | LC |
|---|---|---|---|---|
| 4731 | $C_7H_{15}$— | —O—$CH_2$—CH=CH—$C_7H_{15}$ | K 64 | C 86 I |
| 4732 | $C_7H_{15}$— | —O—$CH_2$—CH=CH—$C_8H_{17}$ | K 72 | C 85 I |
| 4733 | $C_7H_{15}$— | —O—$CH_2$—CH=CH—$C_8H_{19}$ | K 67 | S 74 C 87 I |
| 4734 | $C_8H_{17}$— | —O—$CH_2$—CH=CH—$C_2H_6$ | K 53 | A 65 I |
| 4735 | $C_8H_{17}$— | —O—$CH_2$—CH=CH—$C_2H_7$ | K 68 | A 77 I |
| 4736 | $C_8H_{17}$— | —O—$CH_2$—CH=CH—$C_4H_9$ | K 57 | A 73 I |
| 4737 | $C_8H_{17}$— | —O—$CH_2$—CH=CH—$C_5H_{11}$ | K 56 | C 69.5 A 81 I |
| 4738 | $C_8H_{17}$— | —O—$CH_2$—CH=CH—$C_6H_{13}$ | K 67 | C 79 I |
| 4739 | $C_8H_{17}$— | —O—$CH_2$—CH=CH—$C_7H_{15}$ | K 39 | S 62 C 84 I |
| 4740 | $C_8H_{17}$— | —O—$CH_2$—CH=CH—$C_8H_{17}$ | K 51 | S 67 C 85 I |
| 4741 | $C_8H_{17}$— | —O—$CH_2$—CH=CH—$C_9H_{19}$ | K 66 | S 74 C 96 I |
| 4742 | $C_9H_{19}$— | —O—$CH_2$—CH=CH—$C_2H_6$ | K 57 | A 66 I |
| 4743 | $C_9H_{19}$— | —O—$CH_2$—CH=CH—$C_3H_7$ | K 70 | A 77 I |
| 4744 | $C_9H_{19}$— | —O—$CH_2$—CH=CH—$C_4H_9$ | K 57 | C 48 A 73 I |
| 4745 | $C_9H_{19}$— | —O—$CH_2$—CH=CH—$C_5H_{11}$ | K 58 | C 65 A 82 I |
| 4746 | $C_9H_{19}$— | —O—$CH_2$—CH=CH—$C_6H_{13}$ | K 62 | C 78 A 80 I |
| 4747 | $C_9H_{19}$— | —O—$CH_2$—CH=CH—$C_7H_{15}$ | K 60 | S 56 C 84 I |
| 4748 | $C_9H_{19}$— | —O—$CH_2$—CH=CH—$C_8H_{17}$ | K 50 | S 63 C 86 I |
| 4749 | $C_9H_{19}$— | —O—$CH_2$—CH=CH—$C_9H_{19}$ | K 61 | S 74 I |
| 4750 | $C_3H_7$—O—$C_5H_{10}$— | —O—$CH_2$—CH=CH—$C_3H_7$ | K 47 | A 56 I |
| 4751 | $C_3H_7$—O—$C_5H_{10}$— | —O—$CH_2$—CH=CH—$C_4H_9$ | K 20 | A 41 I |
| 4752 | $C_3H_7$—O—$C_5H_{10}$— | —O—$CH_2$—CH=CH—$C_5H_{11}$ | K 36 | C 58 A 63 I |

TABLE 93-continued

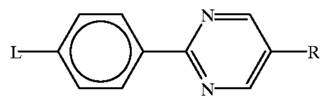

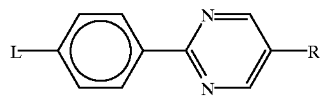

| No | L | R | Cr | LC |
|---|---|---|---|---|
| 4753 | $C_3H_7$—O—$C_5H_{10}$— | —O—$CH_2$—CH═CH—$C_6H_{13}$ | K 51 | C 68 I |
| 4754 | $C_3H_7$—O—$C_5H_{10}$— | —O—$CH_2$—CH═CH—$C_7H_{15}$ | K 44 | C 65 I |
| 4755 | $C_3H_7$—O—$C_5H_{10}$— | —O—$CH_2$—CH═CH—$C_8H_{17}$ | K 50 | S 49 C 69 I |
| 4756 | $C_3H_7$—O—$C_5H_{10}$— | —O—$CH_2$—CH═CH—$C_9H_{19}$ | K 53 | S 59 C 71 I |
| 4760 | $C_6H_{13}$— | —O—$C_3H_8$—CH═$CH_2$ | K 39 | A 69 I |
| 4761 | $C_6H_{13}$— | —O—$CH_2$—CH═CH—$C_3H_7$ | K 57 | C 68 A 80 I |
| 4762 | $C_7H_{15}$— | —O—$C_3H_8$—CH═$CH_2$ | K 48 | A 72 I |

TABLE 94

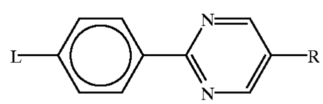

| No | L | R | Cr | LC |
|---|---|---|---|---|
| 4763 | $C_7H_{15}$— | —O—$C_3H_6$—CH═CH—$C_3H_7$ | K 57 | C 66 A 82 I |
| 4764 | $C_8H_{17}$— | —$OC_3H_6$—CH═$CH_2$ | K 43 | A 69 I |
| 4765 | $C_8H_{17}$— | —O—$C_3H_6$—CH═CH—$C_3H_7$ | K 55 | A 82 I |
| 4766 | $C_9H_{19}$— | —$OC_3H_6$—CH═$CH_2$ | K 50 | A 70 I |
| 4767 | $C_9H_{19}$— | —O—$C_3H_9$—CH═CH—$C_3H_7$ | K 47 | C 52 A 82 I |
| 4769 | $C_6H_{13}$— | —O—$C_4H_9$—CH═$CH_2$ | K 35 | A 64 I |
| 4770 | $C_7H_{15}$— | —O—$C_4H_9$—CH═$CH_2$ | K 37 | A 67 I |
| 4771 | $C_8H_{17}$— | —O—$C_4H_9$—CH═$CH_2$ | K 33 | A 64 I |
| 4772 | $C_9H_{19}$— | —O—$C_4H_9$—CH═$CH_2$ | K 33 | A 65 I |
| 4774 | $C_3H_7$—O—$C_5H_{10}$— | —O—$C_3H_6$—CH═$CH_2$ | K 18 | A 55 I |
| 4776 | $C_6H_{13}$— | —O—$C_5H_{10}$—CH═$CH_2$ | K 34 | A 79 I |
| 4777 | $C_6H_{13}$— | —O—$C_5H_{10}$—CH═$CHCH_3$ | K 45 | C 50 A 85 I |
| 4778 | $C_7H_{15}$— | —O—$C_5H_{10}$—CH═$CH_2$ | K 35 | A 81 I |
| 4779 | $C_7H_{15}$— | —O—$C_5H_{10}$—CH═$CHCH_3$ | K 48 | A 87 I |
| 4780 | $C_8H_{17}$— | —O—$C_5H_{10}$—CH═$CH_2$ | K 37 | A 80 I |
| 4781 | $C_8H_{17}$— | —O—$C_5H_{10}$—CH═$CHCH_3$ | K 44 | A 85 I |
| 4782 | $C_9H_{19}$— | —O—$C_5H_{10}$—CH═$CH_2$ | K 38 | A 81 I |
| 4783 | $C_9H_{19}$— | —O—$C_5H_{10}$—CH═$CHCH_3$ | K 51 | A 86 I |
| 4785 | $C_3H_7$—O—$C_5H_{10}$— | —O—$C_5H_{10}$—CH═$CHCH_3$ | K 10 | A 59 I |
| 4786 | $C_3H_7$—O—$C_5H_{10}$— | —O—$C_5H_{10}$—$CHCH_3$ | K 21 | A 70 I |
| 4788 | $C_6H_{13}$— | —O—$C_6H_{12}$—CH═$CH_2$ | K 26 | C 54 A 75 I |
| 4789 | $C_7H_{15}$— | —O—$C_6H_{12}$—CH═$CH_2$ | K 24 | C 50 A 78 I |
| 4790 | $C_8H_{17}$— | —O—$C_6H_{12}$—CH═$CH_2$ | K 42 | C 43 A 76 I |
| 4791 | $C_9H_{19}$— | —O—$C_6H_{12}$—CH═$CH_2$ | K 34 | C 38 A 77 I |
| 4792 | $C_3H_7$—O—$C_5H_{10}$— | —O—$C_6H_{12}$—CH═$CH_2$ | K 15 | C 35 A 60 I |
| 4793 | $C_6H_{13}$— | —O—$C_7H_{14}$—CH═$CH_2$ | K 20 | C 65 A 81 I |
| 4794 | $C_7H_{15}$— | —O—$C_7H_{14}$—CH═$CH_2$ | K 16 | S 23 C 62 A 84 I |
| 4795 | $C_8H_{17}$— | —O—$C_7H_{14}$—CH═$CH_2$ | K 20 | C 60 A 83 I |
| 4796 | $C_9H_{19}$— | —O—$C_7H_{14}$—CH═$CH_2$ | K 30 | C 53 A 84 I |
| 4797 | $C_3H_7$—O—$C_5H_{10}$— | —O—$C_7H_{14}$—CH═$CH_2$ | K-30 | C 30 A 61 I |

TABLE 95

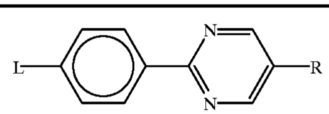

| No | L | R | Cr | LC |
|---|---|---|---|---|
| 4798 | $C_5H_{13}$— | —O—$C_8H_{16}$—CH═$CH_2$ | K 33 | S 35 C 73 A 80 I |
| 4799 | $C_7H_{15}$— | —O—$C_8H_{16}$—CH═$CH_2$ | K 32 | S 33 C 72 A 82 I |

TABLE 95-continued

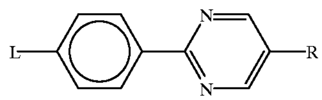

| No | L | R | Cr | LC |
|---|---|---|---|---|
| 4800 | $C_8H_{17}$— | —O—$C_8H_{16}$—CH═$CH_2$ | K 36 | C 72 A 81 I |
| 4801 | $C_9H_{19}$— | —O—$C_8H_{16}$—CH═$CH_2$ | K 35 | C 71 A 82 I |
| 4802 | $C_3H_7$—O—$C_5H_{10}$— | —O—$C_8H_{16}$—CH═$CH_2$ | K-3 | C 57 A 64 I |
| 4803 | $C_5H_{13}$— | —O—$C_8H_{16}$—CH═$CH_2$ | K 29 | S 28 C 76 A 82 I |
| 4804 | $C_5H_{13}$— | —O—$C_{10}H_{20}$—CH═$CH_2$ | K 33 | S 35 C 76 A 81 I |
| 4805 | $C_7H_{15}$— | —O—$C_8H_{16}$—CH═$CH_2$ | K 28 | S 29 C 77 A 85 I |
| 4806 | $C_7H_{15}$— | —O—$C_{10}H_{20}$—CH═$CH_2$ | K 38 | S 40 C 79 A 84 I |
| 4807 | $C_8H_{17}$— | —O—$C_8H_{16}$—CH═$CH_2$ | K 38 | C 78 A 84 I |
| 4808 | $C_8H_{17}$— | —O—$C_{10}H_{20}$—CH═$CH_2$ | K 43 | C 80 A 82 I |
| 4809 | $C_9H_{19}$— | —O—$C_8H_{16}$—CH═$CH_2$ | K 38 | C 78 A 85 I |
| 4810 | $C_9H_{19}$— | —O—$C_{10}H_{20}$—CH═$CH_2$ | K 43 | C 82 A 83 I |
| 4811 | $C_3H_7$—O—$C_5H_{10}$— | —O—$C_8H_{16}$—CH═$CH_2$ | K 0 | C 55 A 65 I |
| 4812 | $C_3H_7$—O—$C_5H_{10}$— | —O—$C_{10}H_{20}$—CH═$CH_2$ | K 19 | S 36 S 59 C 70 I |
| 4817 | $C_8H_{17}$— | —O—$C_2H_4$—CH%CH—$C_4H_9$ | K 52 | A 43 I |
| 4818 | $C_9H_{19}$— | —O—$C_2H_4$—CH%CH—$C_4H_9$ | K 52 | A 44 I |
| 4822 | $C_8H_{17}$— | —O—$C_4H_8$—CH%CH—$C_2H_5$ | K 45 | C 52 A 55 I |
| 4823 | $C_7H_{15}$— | —O—$C_4H_8$—CH%CH—$C_2H_5$ | K 42 | C 52 A 55 I |
| 4824 | $C_8H_{17}$— | —O—$C_4H_8$—CH%CH—$C_2H_5$ | K 38 | C 46 A 57 I |
| 4825 | $C_9H_{19}$— | —O—$C_4H_8$—CH%CH—$C_2H_5$ | K 38 | C 44 A 58 I |
| 4826 | $C_3H_7$—O—$C_5H_{10}$— | —O—$C_4H_8$—CH%CH—$C_2H_5$ | K 10 | C 33 A 37 I |
| 4828 | $C_9H_{19}$—O— | —O—$C_4H_8$—O—$CH_2$ —CH/$CH_2$\$CH_2$ | K 72.4 | C 58.4 N 72 I |
| 4829 | $C_6H_{13}$—O— | —O—$C_4H_8$—CH/$CH_2$\$CH_2$ | K 64 | C 48 N 88 U |
| 4830 | $C_4H_9$—O—$C_4H_8$—O— | —O—$C_4H_8$—CH/$CH_2$\$CH_2$ | K 42 | C 45 A 47 N 64 I |
| 4831 | $C_6H_{13}$—O— | —O—$C_5H_{10}$—CH/$CH_2$\$CH_2$ | K 53 | C 73 A 75 N 86 I |
| 4832 | $C_6H_{13}$—O— | —O—$C_5H_{10}$—CH/$CH_2$\$CH_2$ | K 39 | C 63 A 65 N 67 I |
| 4833 | $C_8H_{17}$—O— | —O—$C_8H_{12}$—CH/$CH_2$\$CH_2$ | K 56 | C 78 A 84 N 89 I |
| 4834 | $C_9H_{13}$—O— | —O—$C_8H_{12}$—CH/$CH_2$\$CH_2$ | K 58.5 | C 79 A 85 N 89.5 I |

TABLE 96

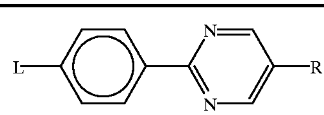

| No | L | R | Cr | LC |
|---|---|---|---|---|
| 4798 | $C_5H_{13}$— | —O—$C_8H_{16}$—CH═$CH_2$ | K 33 | S 35 C 73 A 80 I |
| 4799 | $C_7H_{15}$— | —O—$C_8H_{16}$—CH═$CH_2$ | K 32 | S 33 C 72 A 82 I |
| 4800 | $C_8H_{17}$— | —O—$C_8H_{16}$—CH═$CH_2$ | K 36 | C 72 A 81 I |
| 4801 | $C_9H_{19}$— | —O—$C_8H_{16}$—CH═$CH_2$ | K 35 | C 71 A 82 I |
| 4802 | $C_3H_7$—O—$C_5H_{10}$— | —O—$C_8H_{16}$—CH═$CH_2$ | K-3 | C 57 A 64 I |
| 4803 | $C_5H_{13}$— | —O—$C_8H_{16}$—CH═$CH_2$ | K 29 | S 28 C 76 A 82 I |
| 4804 | $C_5H_{13}$— | —O—$C_{10}H_{20}$—CH═$CH_2$ | K 33 | A 35 S 76 A 81 I |
| 4805 | $C_7H_{15}$— | —O—$C_8H_{16}$—CH═$CH_2$ | K 28 | S 29 C 77 A 85 I |
| 4806 | $C_7H_{15}$— | —O—$C_{10}H_{20}$—CH═$CH_2$ | K 38 | S 40 C 79 A 84 I |
| 4807 | $C_8H_{17}$— | —O—$C_8H_{16}$—CH═$CH_2$ | K 38 | C 78 A 84 I |
| 4808 | $C_8H_{17}$— | —O—$C_{10}H_{20}$—CH═$CH_2$ | K 43 | C 80 A 82 I |
| 4809 | $C_9H_{19}$— | —O—$C_8H_{16}$—CH═$CH_2$ | K 38 | C 78 A 85 I |
| 4810 | $C_9H_{19}$— | —O—$C_{10}H_{20}$—CH═$CH_2$ | K 43 | C 82 A 83 I |
| 4811 | $C_3H_7$—O—$C_5H_{10}$— | —O—$C_8H_{16}$—CH═$CH_2$ | K 0 | C 55 A 65 I |
| 4812 | $C_3H_7$—O—$C_5H_{10}$— | —O—$C_{10}H_{20}$—CH═$CH_2$ | K 19 | S 36 S 59 C 70 I |
| 4817 | $C_8H_{17}$— | —O—$C_2H_4$—CH%CH—$C_4H_9$ | K 52 | A 43 I |
| 4818 | $C_9H_{19}$— | —O—$C_2H_4$—CH%CH—$C_4H_9$ | K 45 | A 44 I |
| 4822 | $C_8H_{17}$— | —O—$C_4H_8$—CH%CH—$C_2H_5$ | K 52 | C 52 A 55 I |
| 4823 | $C_7H_{15}$— | —O—$C_4H_8$—CH%CH—$C_2H_5$ | K 45 | C 52 A 55 I |
| 4824 | $C_8H_{17}$— | —O—$C_4H_8$—CH%CH—$C_2H_5$ | K 42 | C 46 A 57 I |
| 4825 | $C_9H_{19}$— | —O—$C_4H_8$—CH%CH—$C_2H_5$ | K 38 | C 44 A 58 I |
| 4826 | $C_3H_7$—O—$C_5H_{10}$— | —O—$C_4H_8$—$C_2H_5$ | K 10 | C 33 A 37 I |
| 4828 | $C_9H_{19}$—O— | —O—$C_4H_8$—O—$CH_2$ —CH/$CH_2$\$CH_2$ | K 72.4 | C 58.4 N 72 I |
| 4829 | $C_6H_{13}$—O— | —O—$C_4H_8$—CH/$CH_2$\$CH_2$ | K 64 | C 48 N 88 U |
| 4830 | $C_4H_9$—O—$C_4H_8$—O— | —O—$C_4H_8$—CH/$CH_2$\$CH_2$ | K 42 | C 45 A 47 N 64 I |
| 4831 | $C_6H_{13}$—O— | —O—$C_5H_{10}$—CH/$CH_2$\$CH_2$ | K 53 | C 73 A 75 N 86 I |

TABLE 96-continued

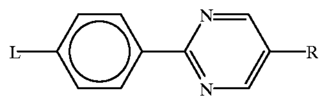

| No | L | R | Cr | LC |
|---|---|---|---|---|
| 4832 | $C_6H_{13}$—O— | —O—$C_5H_{10}$—$CH/CH_2\backslash CH_2$ | K 39 | C 63 A 65 N 67 I |
| 4833 | $C_8H_{17}$—O— | —O—$C_8H_{12}$—$CH/CH_2\backslash CH_2$ | K 56 | C 78 A 84 N 89 I |
| 4834 | $C_9H_{19}$—O— | —O—$C_8H_{12}$—$CH/CH_2\backslash CH_2$ | K 58.5 | C 79 A 85 N 89.5 I |

TABLE 97

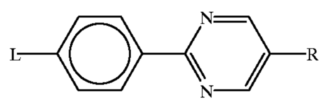

| No | L | R | | Cr | LC |
|---|---|---|---|---|---|
| 4835 | $C_{11}H_{23}$—O— | —O—$C_6H_{12}$—$CH/CH_2\backslash CH_2$ | | K 57.5 | C 76.5 A 86.7 N 87 I |
| 4836 | $C_{12}H_{25}$—O— | —O—$C_6H_{12}$—$CH/CH_2\backslash CH_2$ | | K 61 | C >70 A 87 I |
| 4837 | $C_4H_9$—O—$C_4H_8$—O— | —O—$C_6H_{12}$—$CH/CH_2\backslash CH_2$ | | K 46 | C 66 A 67 N 69 I |
| 4838 | $C_6H_{13}$—O— | —O—$C_7H_{14}$—$CH/CH_2\backslash CH_2$ | | K 51.8 | C 86.5 A 89.6 N 89.8 I |
| 4839 | $C_9H_{19}$—O— | —O—$C_7H_{14}$—$CH/CH_2\backslash CH_2$ | | K 60 | C 87.9 A 90.4 I |
| 4840 | $C_{10}H_{21}$—O— | —O—$C_7H_{14}$—$CH/CH_2\backslash CH_2$ | | K 55.7 | C 90 A 92.5 I |
| 4841 | $C_{11}H_{23}$—O— | —O—$C_7H_{14}$—$CH/CH_2\backslash CH_2$ | | K 53.4 | C 87.6 A 90.5 I |
| 4842 | $C_{12}H_{25}$—O— | —O—$C_7H_{14}$—$CH/CH_2\backslash CH_2$ | | K 67.4 | C 88.1 A 90.5 I |
| 4843 | $C_4H_9$—O—$C_4H_8$—O— | —O—$C_7H_{14}$—$CH/CH_2\backslash CH_2$ | | K 43 | C 73 I |
| 4844 | $C_4H_9$—O— | —O—$C_8H_{16}$—$CH/CH_2\backslash CH_2$ | | K 55.4 | C 81 A 87.8 I |
| 4845 | $C_6H_{13}$—O— | —O—$C_8H_{16}$—$CH/CH_2\backslash CH_2$ | | K 54.1 | C 88.2 A 90.8 I |
| 4846 | $C_8H_{17}$—O— | —O—$C_8H_{16}$—$CH/CH_2\backslash CH_2$ | | K 56.4 | C 91.7 A 92.9 I |
| 4847 | $C_9H_{19}$—O— | —O—$C_9H_{18}$—$CH/CH_2\backslash CH_2$ | | K 56.2 | C 91.8 A 93 I |
| 4848 | $C_{10}H_{21}$—O— | —O—$C_6H_{16}$—$CH/CH_2\backslash CH_2$ | | K 58.5 | C 91.6 A 92 I |
| 4849 | $C_{11}H_{23}$—O— | —O—$C_8H_{18}$—$CH/CH_2\backslash CH_2$ | | K 53.6 | C 92.3 A 93.1 I |
| 4850 | $C_{12}H_{25}$—O— | —O—$C_8H_{18}$—$CH/CH_2\backslash CH_2$ | | K 54.9 | C 92.3 A 93 I |
| 4851 | $C_7H_{15}$—O— | —O—$C_9H_{18}$—$CH/CH_2\backslash CH_2$ | | K 64.7 | C 91 I |
| 4852 | $C_8H_{17}$—O— | —O—$C_9H_{18}$—$CH/CH_2\backslash CH_2$ | | K 63.7 | C 93.2 I |
| 4853 | $C_{12}H_{25}$—O— | —O—$C_{11}H_{22}$—$CH/CH_2\backslash CH_2$ | | K 54.6 | C 73.8 I |
| 4854 | $C_8H_{17}$—O— | —O—$CH_2$—$CH/O\backslash CH(t)$ —$C_3H_7$ | 1 | K 55 | B 90 A 102 I |
| 4855 | $C_8H_{17}$—O— | —O—$CH_2$—$CH/O\backslash CH(t)$ —$C_5H_{11}$ | 1 | K 70 | F* 101 A 104 I |
| 4857 | $C_2H_5$—$CMe_2$—$C_4H_8$—O— | —O—$CH_2$—$CH/O\backslash CH(t)$ —$C_4H_9$ | 1 | K 83 | S 87 A 92 I |
| 4858 | $C_2H_5$—$CMe_2$—$C_8H_{17}$—O— | —O—$CH_2$—$CH/O\backslash CH(t)$ —$C_4H_9$ | 1 | K 90 | C* 96 A 106 I |
| 4859 | $C_2H_5$—$CMe_2$—O—$CH_2$ | —$C_{10}H_{21}$ | 1 | K 15.6 | S 15.2 I |
| 4861 | $C_6H_{13}$—$CMe_2$—O—$CH_2$ | —$C_{10}H_{21}$ | 2 | K 16.9 | A-8.5 I |
| 4869 | $C_2H_5$—$CMe_2$—COO— | —$C_{11}H_{23}$ | S | K 52.2 | S 40.7 I |
| 4871 | $C_2H_5$—$CMe_2$—COO— | —O—$C_8H_{17}$ | S | K 66 | C* 62.2 I |
| 4872 | $C_2H_5$—$CMe_2$—COO— | —O—$C_{11}H_{23}$ | S | K 43 | C* 64.1 S 67.2 I |
| 4873 | $CH_3$—CHMe—CHCl—COO— | —$C_7H_{15}$ | S | K 64 | X-10 I |
| 4875 | $C_2H_5$—CHMe—CHCl—COO— | —$C_7H_{15}$ | 3 | K 59 | X-20 I |

TABLE 98

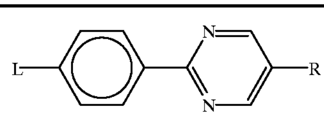

| No | L | R | | Cr | LC |
|---|---|---|---|---|---|
| 4919 | $C_2H_5$—CHMe—$C_3H_8$—O— | —$C_8H_{17}$ | S | K 31.2 | B 16.8 C* 46.8 A 50.8 I |
| 4920 | $C_2H_5$—CHMe—$C_3H_8$—O— | —$C_9H_{19}$ | S | K 23 | S 28 C* 30 A 51.5 |

TABLE 98-continued

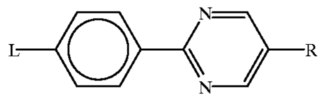

| No | L | R | | Cr | LC |
|---|---|---|---|---|---|
| | | | | | N* 52 I |
| 4921 | $C_2H_5$—CHMe—$C_3H_8$—O— | —$C_{10}H_{21}$ | S | K 33 | S 38.5 C* 58 I |
| 4922 | $C_2H_5$—CHMe—$C_3H_8$—O— | —$C_{11}H_{23}$ | S | K 35.9 | C* 60 I |
| 4923 | $C_2H_5$—CHMe—$C_3H_8$—O— | —$C_{12}H_{25}$ | S | K 41 | S 23.8 C*62.2 I |
| 4924 | $C_2H_5$—CHMe—$C_3H_8$—O— | —$C_{14}H_{29}$ | S | K 32 | B 45 C* 59.8 I |
| 4925 | $C_3H_7$—CHMe—$C_3H_8$—O— | —$C_9H_{19}$ | 2 | K 15.5 | C 44.5 A 54.4 I |
| 4926 | $C_5H_{11}$—CHMe—$C_3H_8$—O— | —$C_8H_{17}$ | 2 | K 15 | C 9 A 42.5 I |
| 4927 | $C_2H_5$—CHMe—$C_3H_8$ —CHMe—$CH_2$—O— | —$C_8H_{17}$ | 7 | K 37 | A 34 I |
| 4928 | $CH_3$—CHMe—$C_3H_8$ —CHMe—$C_2H_4$—O— | —$C_9H_{19}$ | S | K 27 | A 40 I |
| 4931 | $CH_3$—CHMe—$C_3H_6$—CHMe —$CH_2$—COO— | —$C_9H_{19}$ | S | K 44 | C* <? I |
| 4932 | $C_2H_5$—CHMe—$C_4H_8$—O— | —$C_6H_{13}$ | S | K-5 | A 27 N 42 I |
| 4933 | $C_2H_5$—CHMe—$C_4H_8$—O— | —$C_7H_{15}$ | S | K-6 | A 46.3 N* 49 I |
| 4934 | $C_2H_5$—CHMe—$C_4H_8$—O— | —$C_8H_{17}$ | S | K 12 | C* 34.7 A 49.5 I |
| 4935 | $C_2H_5$—CHMe—$C_4H_8$—O— | —$C_9H_{19}$ | S | K 10 | C*46 A59 I |
| 4938 | $C_2H_5$—CHMe—$C_4H_8$—O— | —$C_{10}H_{21}$ | S | K 17 | C* 53.8 A 63 I |
| 4937 | $C_2H_5$—CHMe—$C_4H_8$—O— | —$C_{11}H_{23}$ | S | K 20 | C* 59 I |
| 4938 | $C_2H_5$—CHMe—$C_4H_8$—O— | —$C_{12}H_{25}$ | S | K 23 | S 16 C* 61.5 I |
| 4939 | $C_2H_5$—CHMe—$C_4H_8$—O— | —$C_8H_{17}$ | 2 | K 3.5 | C 31.5 A 47.5 I |
| 4940 | $C_2H_5$—CHMe—$C_4H_8$—CO— | —$C_8H_{17}$ | S | K 67 | C* 69 A 79.3 I |
| 4941 | $C_2H_5$—CHMe—$C_4H_8$—COO— | —$C_8H_{17}$ | S | K 38.5 | S 24 C*44.8 I |
| 4942 | $C_2H_5$—CHMe—$C_4H_8$—COO— | —$C_{11}H_{23}$ | S | K 62.3 | S 46.5 C* 60 I |
| 4943 | $C_2H_5$—CHMe—$C_4H_8$—COO— | —$C_{14}H_{29}$ | S | K 46 | S 50 C* 62.8 I |
| 4944 | $C_2H_5$—CHMe—$C_4H_8$—COO— | —O—$C_8H_{17}$ | S | K 76 | C* 79.5 I |
| 4945 | $C_2H_5$—CHMe—$C_5H_{10}$—O— | —$C_6H_{13}$ | S | K 12 | C* 23.8 N* 45.6 I |
| 4946 | $C_2H_5$—CHMe—$C_5H_{10}$—O— | —$C_7H_{15}$ | S | K 10 | S 16 C* 39 A 54 N* 61 I |
| 4947 | $C_2H_5$—CHMe—$C_5H_{10}$—O— | —$C_8H_{17}$ | S | K 3 | B 14.2 C* 48.6 A 58.3 I |
| 4948 | $C_2H_5$—CHMe—$C_5H_{10}$—O— | —$C_9H_{19}$ | S | K 16 | C* 49.1 A 61 I |
| 4949 | $C_2H_5$—CHMe—$C_5H_{10}$—O— | —$C_{10}H_{21}$ | S | K 41 | S <? C* 61 I |
| 4950 | $C_2H_5$—CHMe—$C_5H_{10}$—O— | —$C_{11}H_{23}$ | S | K ? | B 36.7 C* 68 I |

TABLE 99

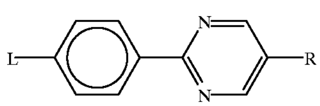

| No | L | R | | Cr | LC |
|---|---|---|---|---|---|
| 4951 | $C_2H_5$—CHMe—C5$H_{10}$—O— | —$C_{12}H_{25}$ | S | K 40.5 | C* 70 I |
| 4952 | $C_2H_5$—CHMe—C5$H_{10}$—O— | —$C_{14}H_{29}$ | S | K 43 | B 45 C* 65 I |
| 4953 | $C_2H_5$—CHMe—C5$H_{10}$—O— | —$C_8H_{17}$ | 2 | K 3 | C 47.5 A A 58 I |
| 4954 | $C_2H_5$—CHMe—C5$H_{10}$—O— | —O—$C_8H_{17}$ | S | K 40.7 | C* 82.6 A 99.1 I |
| 4955 | $C_2H_5$—CHMe—C5$H_{10}$—O— | —COO—$C_8H_{17}$— | S | K 78.5 | C* 79.7 I |
| 4956 | $CH_3$—CHMe—$C_6H_{12}$— | —$C_9H_{18}$ | | K 29.5 | F 31 A 58.2 I |
| 4957 | $CH_3$—CHMe—$C_6H$ | —$C_{10}H_{21}$ | | K 38.6 | F 41.3 C 51.4 A 58.4 I |
| 4962 | $C_2H_5$—CHF—COO— | —$C_9H_{18}$ | 1 | K 70 | S 58 I |
| 4964 | $C_2H_5$—CHF—COO— | —$C_{12}H_{25}$ | 1 | K 69 | A 59 I |
| 4965 | $C_4H_9$—CHF—COO— | —$C_{10}H_{21}$ | S | K 46 | S 30. A 49 I |
| 4966 | $C_4H_9$—CHF—COO— | —$C_{12}H_{25}$ | S | K 59 | C* 45 A 52 I |
| 4968 | $C_5H_{11}$—CHF—COO— | —$C_{12}H_{25}$ | S | K 14 | S ? A 50 I |
| 4969 | $C_6H_{13}$—CHF—COO— | —$C_8H_{17}$ | 1 | K 56 | A 38 I |
| 4970 | $C_6H_{13}$—CHF—COO— | —$C_9H_{18}$ | 1 | K 53 | A 46 I |
| 4971 | $C_6H_{13}$—CHF—COO— | —$C_{10}H_{21}$ | 1 | K 47 | S 32 C* 45 I |
| 4972 | $C_6H_{13}$—CHF—COO— | —$C_{12}H_{25}$ | 1 | K 62 | C* 52 I |
| 4973 | $C_7H_{15}$—CHF—COO— | —$C_{10}H_{21}$ | S | K 59 | A 46 I |
| 4974 | $C_7H_{15}$—CHF—COO— | —$C_{12}H_{25}$ | S | K 22 | S ? A 61 I |
| 4976 | $C_8H_{17}$—CHF—COO— | —$C_9H_{18}$ | 1 | K 64 | A 48 I |
| 4977 | $C_8H_{17}$—CHF—COO— | —$C_{10}H_{21}$ | 1 | K 59 | C* 43 A 46 N* 46 I |
| 4978 | $C_8H_{17}$—CHF—COO— | —$C_{12}H_{25}$ | S | K 23 | S 87 I |
| 4979 | $C_4H_9$—CHF—$CH_2$—O— | —$C_{10}H_{21}$ | S | K 48 | C* 43 A 68 I |
| 4980 | $C_4H_9$—CHF—$CH_2$—O— | —$C_{12}H_{25}$ | S | K 59 | S 37 S 39 C* 43 A 71 I |

TABLE 99-continued

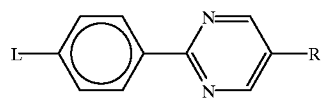

| No | L | R | | Cr | LC |
|---|---|---|---|---|---|
| 4981 | $C_5H_{11}$—CHF—$CH_2$—O— | —$C_8H_{17}$ | S | K 24 | A 35 I |
| 4982 | $C_5H_{11}$—CHF—$CH_2$—O— | —$C_{10}H_{21}$ | S | K 49 | C* 60 A 66 I |
| 4983 | $C_5H_{11}$—CHF—$CH_2$—O— | —$C_{12}H_{25}$ | S | K 60 | S 49 C* 61 A 72 I |
| 4984 | $C_6H_{13}$—CHF—$CH_2$—O— | —$C_8H_{17}$ | S | K 62 | A 69 I |
| 4985 | $C_6H_{13}$—CHF—$CH_2$—O— | —$C_9H_{18}$ | S | K 63 | A 67 I |
| 4986 | $C_6H_{13}$—CHF—$CH_2$—O— | —$C_{10}H_{21}$ | S | K 61 | S 43 C* 62 A 71 I |
| 4987 | $C_6H_{13}$—CHF—$CH_2$—O— | —$C_{12}H_{25}$ | S | K 56 | C* 70 A 74 I |

TABLE 100

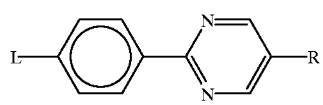

| No | L | R | | Cr | LC |
|---|---|---|---|---|---|
| 5039 | $CF_3$—O— | —$C_3H_7$ | | K 43.1 | S 45.2 N-17 E |
| 5040 | $CF_3$—O— | —$C_5H_{11}$ | | K 32 | A 45.2 N-6 E |
| 5041 | $CF_3$—O— | —$C_7H_{15}$ | | K 25 | A 34 N-20 E |
| 5042 | $C_9F_{19}$— | —$C_8H_{17}$ | | K 65.1 | A 115.1 I |
| 5043 | $C_3F_7$—$CH_2$—O— | —$C_{10}H_{21}$ | | K 36 | C 52 A 64 I |
| 5044 | $C_5F_{11}$—$CH_2$—O— | —$C_{10}H_{21}$ | | K 47 | C 73 A 64 I |
| 5045 | $C_6F_{13}$—$CH_2$—O— | —$C_7H_{15}$ | | K 7 | C 7 A ? I |
| 5046 | $C_7F_{15}$—$CH_2$—O— | —$C_6H_{13}$ | | K 50 | C 55 A 133 I |
| 5047 | $C_7F_{15}$—$CH_2$—O— | —$C_7H_{15}$ | | K 54 | C 67 A 125 I |
| 5048 | $C_7F_{15}$—$CH_2$—O— | —$C_9H_{19}$ | | K 71 | C 80 A 117 I |
| 5049 | $C_7F_{15}$—$CH_2$—O— | —$C_9H_{19}$ | | K 71 | C 85 A 112 I |
| 5050 | $C_7F_{15}$—$CH_2$—O— | —$C_{10}H_{21}$ | | K 76 | C 87 A 104 I |
| 5051 | $C_8F_{17}$—$CH_2$—O— | —$C_7H_{15}$ | | K ? | C ? A ? I |
| 5052 | $C_9F_{19}$—$CH_2$—O— | —$C_3H_7$ | | K ? | C ? A ? I |
| 5053 | $C_{10}F_{21}$—$CH_2$—O— | —$C_5H_{11}$ | | K ? | C ? A ? I |
| 5054 | $C_{10}F_{21}$—$CH_2$—O— | —$C_8H_{17}$ | | K ? | C ? A ? I |
| 5055 | $C_6F_{13}$—$C_2H_4$—O— | —$C_8H_{17}$ | | K 63 | C 95 A 132 I |
| 5056 | $C_4F_9$—$C_2H_4$—O— | —$C_{10}H_{21}$ | | K 56 | A 114 I |
| 5057 | $C_4F_9$—$C_2H_4$—O— | —$C_3H_7$ | | K 58 | C 80 A 106 I |
| 5061 | H—$CF_2$—O— | —$C_5H_{11}$ | | K 41 | N 0 E |
| 5062 | H—$CF_2$—O— | —$C_7H_{15}$ | | K 21 | A 26 N 0 E |
| 5063 | H—$CF_2$—O— | —$C_8H_{17}$ | | K 26.5 | A 32 N 0 E |
| 5064 | H—$CF_2$—O— | —$C_7H_{15}$ | | K 26 | S 31.6 N-3 E |
| 5065 | H—$CF_2$—O— | —$C_3H_7$ | | K 46.2 | X 43 I |
| 5066 | H—$CF_2$—O— | —$C_5H_{11}$ | | K 53.1 | N-16 E |
| 5067 | H—$CF_2$—O— | —$C_{10}H_{21}$ | | K 43.8 | N-16 E |
| 5068 | $C_6H_{13}$—$CHCF_3$—O—$CH_2$— | —$C_{10}H_{21}$ | 1 | K 56 | S 18.4 I |
| 5070 | $C_4H_9$—$CHCF_3$—$CH_2$—COO— | —$C_8H_{17}$ | 1 | K 28 | S 187 I |
| 5072 | $H_2C$═CH—COO—$C_6H_{12}$—O— | —$C_8H_{17}$ | | K 50 | S 52.5 N 53 I |

TABLE 101

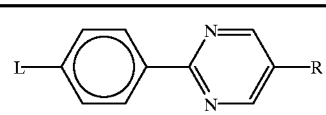

| No | L | R | Cr | LC |
|---|---|---|---|---|
| 5106 | $CH_3$—CH═CH—$CH_2$—O— | —$C_9H_{19}$ | K 59 | A 65 N 75 I |
| 5107 | $C_2H_5$—CH═CH—$CH_2$—O— | —$C_7H_{15}$ | K 31 | C 30 N 62 I |
| 5108 | $C_2H_5$—CH═CH—$CH_2$—O— | —$C_8H_{17}$ | K 53 | C 49 A 55 N 61 I |

TABLE 101-continued

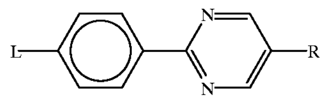

| No | L | R | Cr | LC |
|---|---|---|---|---|
| 5109 | $C_2H_5$—CH═CH—$CH_2$—O— | —$C_9H_{19}$ | K 56 | C 42 A 68 I |
| 5111 | $C_3H_7$—CH═CH—$CH_2$—O— | —$C_8H_{17}$ | K 43 | C 51 N 66 I |
| 5112 | $C_3H_7$—CH═CH—$CH_2$—O— | —$C_9H_{19}$ | K 49 | C 63 A 70 N 72 I |
| 5113 | $C_3H_7$—CH═CH—$CH_2$—O— | —$C_{10}H_{21}$ | K 30 | C 53 A 65.5 I |
| 5114 | $C_4H_9$—CH═CH—$CH_2$—O— | —$C_7H_{15}$ | K 22 | C 33 N 63 I |
| 5115 | $C_4H_9$—CH═CH—$CH_2$—O— | —$C_8H_{17}$ | K 30 | C 55 N 64 I |
| 5116 | $C_4H_9$—CH═CH—$CH_2$—O— | —$C_9H_{19}$ | K 46 | C 66 A 70 I |
| 5117 | $C_5H_{11}$—CH═CH—$CH_2$—O— | —$C_7H_{15}$ | K 38 | C 35 N 68 I |
| 5118 | $C_5H_{11}$—CH═CH—$CH_2$—O— | —$C_8H_{17}$ | K 24 | C 56 N 68 I |
| 5119 | $C_5H_{11}$—CH═CH—$CH_2$—O— | —$C_9H_{19}$ | K 42 | C 70 A 72 N 73 I |
| 5120 | $C_6H_{13}$—CH═CH—$CH_2$—O— | —$C_7H_{15}$ | K 40 | C 41 N 66 I |
| 5121 | $C_6H_{13}$—CH═CH—$CH_2$—O— | —$C_8H_{17}$ | K 29 | C 58 N 66 I |
| 5122 | $C_6H_{13}$—CH═CH—$CH_2$—O— | —$C_9H_{19}$ | K 20 | C 70 A 71 N 72 I |
| 5123 | $C_7H_{15}$—CH═CH—$CH_2$—O— | —$C_7H_{15}$ | K 49 | C 42 N 68 I |
| 5124 | $C_7H_{15}$—CH═CH—$CH_2$—O— | —$C_8H_{17}$ | K 31 | C 59 N 68 I |
| 5125 | $C_7H_{15}$—CH═CH—$CH_2$—O— | —$C_9H_{19}$ | K 37 | C 72 A 73 N 74 I |
| 5126 | $C_8H_{17}$—CH═CH—$CH_2$—O— | —$C_7H_{15}$ | K 43 | C 47 N 66 I |
| 5127 | $C_8H_{17}$—CH═CH—$CH_2$—O— | —$C_8H_{17}$ | K 40 | C 80 N 66 I |
| 5128 | $C_8H_{17}$—CH═CH—$CH_2$—O— | —$C_9H_{19}$ | K 36 | C 72 A 73 I |
| 5129 | $C_9H_{19}$—CH═CH—$CH_2$—O— | —$C_7H_{15}$ | K 55 | C 49 N 68 I |
| 5130 | $C_9H_{19}$—CH═CH—$CH_2$—O— | —$C_8H_{17}$ | K 44 | C 62 N 68 I |
| 5131 | $C_9H_{19}$—CH═CH—$CH_2$—O— | —$C_9H_{19}$ | K 42 | C 74 I |
| 5132 | $H_2C$═CH—$C_2H_4$—O— | —$C_4H_7$ | K 37.3 | N 12.5 U |
| 5133 | $H_2C$═CH—$C_2H_4$—O— | —$C_7H_{15}$ | K 38 | A 41 N 49 I |
| 5134 | $H_2C$═CH—$C_2H_4$—O— | —$C_8H_{17}$ | K 34 | A 46 I |
| 5135 | $H_2C$═CH—$C_2H_4$—O— | —$C_9H_{19}$ | K 55 | A 56 I |

TABLE 102

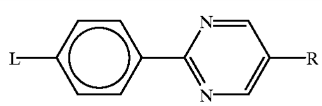

| No | L | R | | Cr | LC |
|---|---|---|---|---|---|
| 5139 | $C_3H_7$—CH═CH—$C_2H_4$—COO— | —$C_8H_{17}$ | | K 54 | A 45 N 50 I |
| 5140 | $C_3H_7$—CH═CH—$C_2H_4$—COO— | —$C_9H_{19}$ | | K 67 | A 61 I |
| 5142 | $H_2O$═CH—$C_3H_6$—O— | —$C_7H_{15}$ | | K 46 | A 45 N 63 I |
| 5143 | $H_2O$═CH—$C_3H_6$—O— | —$C_8H_{17}$ | | K 38 | A 54 N 58 I |
| 5144 | $H_2O$═CH—$C_3H_6$—O— | —$C_9H_{19}$ | | K 40 | A 65 I |
| 5145 | $CH_3$—CH═CH—$C_3H_6$—O— | —$C_9H_{19}$ | | K 48 | C 35 A 70 N 72 I |
| 5146 | $C_3H_7$—CH═CH—$C_3H_6$—O— | —$C_7H_{15}$ | | K 39 | C 45 A 65 I |
| 5147 | $C_3H_7$—CH═CH—$C_3H_6$—O— | —$C_8H_{17}$ | | K 32 | C 56 A 50 N 63 I |
| 5148 | $C_3H_7$—CH═CH—$C_3H_6$—O— | —$C_9H_{19}$ | | K 42 | C 64 A 73 I |
| 5151 | $H_2C$═CH—$C_4H_8$—O— | —$C_7H_{15}$ | | K 27 | A 43 N 57 I |
| 5152 | $H_2C$═CH—$C_4H_8$—O— | —$C_8H_{17}$ | | K 44 | A 51 N 55 I |
| 5153 | $H_2C$═CH—$C_4H_8$—O— | —$C_9H_{19}$ | | K 48 | A 62 I |
| 5154 | $H_2C$═CH—$C_4H_8$—O— | —$C_{10}H_{21}$ | | K 55.5 | C 33 A 62 I |
| 5155 | $CH_3$—CH═CH—$C_4H_8$—COO— | —$C_7H_{15}$ | | K 51 | A 34 N 55 I |
| 5156 | $CH_3$—CH═CH—$C_4H_8$—COO— | —$C_8H_{17}$ | | K 48 | C 39 A 46 N 52 I |
| 5157 | $CH_3$—CH═CH—$C_4H_8$—COO— | —$C_9H_{19}$ | | K 56 | C 48 A 60 I |
| 5160 | $H_2C$═CH—$C_5H_{10}$—O— | —$C_7H_{15}$ | | K 56 | C 34 A 47 N 67 I |
| 5161 | $H_2C$═CH—$C_5H_{10}$—O— | —$C_8H_{17}$ | | K 37 | C 30 A 58 N 64 I |
| 5162 | $H_2C$═CH—$C_5H_{10}$—O— | —$C_9H_{19}$ | | K 31 | C 30 A 58 N 64 I |
| 5163 | $CH_3$—CH═CH—$C_5H_{10}$—O— | —$C_7H_{15}$ | | K 39 | C 45 N 65 I |
| 5164 | $CH_3$—CH═CH—$C_5H_{10}$—O— | —$C_8H_{17}$ | | K 40 | C 52 A 57 N 67 I |
| 5165 | $CH_3$—CH═CH—$C_5H_{10}$—O— | —$C_9H_{19}$ | | K 39 | C 53 A 71 N 72 I |
| 5166 | $H_2C$═CH—$C_5H_{10}$—COO— | —$C_7H_{15}$ | | K 43 | A 36 N 46 I |
| 5167 | $H_2C$═CH—$C_5H_{10}$—COO— | —$C_8H_{17}$ | | K 37 | A 34 A 43 N 44 I |
| 5168 | $H_2C$═CH—$C_5H_{10}$—COO— | —$C_9H_{19}$ | | K 48 | A 42 A 56 I |
| 5169 | $H_2C$═CH—$C_5H_{10}$—O— | —$C_4H_8$—CHMe—$C_2H_5$ | S | K 35 | C* 29 N*46 I |
| 5170 | $H_2C$═CH—$C_5H_{10}$—O— | —$C_5H_{10}$—CHMe—$C_2H_5$ | S | K 7 | C* 19 N* 39 I |

TABLE 103

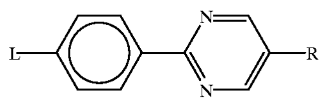

| No | L | R | | Cr | LC |
|---|---|---|---|---|---|
| 5171 | $H_2C{=}CH{-}C_6H_{12}{-}O{-}$ | $-C_7H_{15}$ | | K 36 | C 33 A 48 N 62 I |
| 5172 | $H_2C{=}CH{-}C_6H_{12}{-}O{-}$ | $-C_8H_{17}$ | | K 19.2 | C 33.3 A 56.1 N 60.2 I |
| 5173 | $H_2C{=}CH{-}C_6H_{12}{-}O{-}$ | $-C_9H_{19}$ | | K 37 | A 67 I |
| 5174 | $H_2C{=}CH{-}C_6H_{12}{-}O{-}$ | $-C_{10}H_{21}$ | | K 38.2 | C 49.6 A 67.9 I |
| 5175 | $H_2C{=}CH{-}C_6H_{12}{-}O{-}$ | $-O-C_8H_{17}$ | | K 48.5 | C 76.3 A 92 N 92.6 I |
| 5176 | $H_2C{=}CH{-}C_6H_{12}{-}O{-}$ | $-C_4H_8-CHMe-C_2H_5$ | S | K 29 | C* 28 N* 40 I |
| 5177 | $H_2C{=}CH{-}C_6H_{12}{-}O{-}$ | $-C_5H_{10}-CHMe-C_2H_5$ | S | K 4 | C* 15 N* 32 I |
| 5178 | $H_2C{=}CH{-}C_7H_{14}{-}O{-}$ | $-C_7H_{15}$ | | K 52 | C 43 A 54 N 67 I |
| 5179 | $H_2C{=}CH{-}C_7H_{14}{-}O{-}$ | $-C_8H_{17}$ | | K 27 | C 45 A 62 N 66 I |
| 5180 | $H_2C{=}CH{-}C_7H_{14}{-}O{-}$ | $-C_9H_{19}$ | | K 19 | C 39 A 71 I |
| 5181 | $H_2C{=}CH{-}C_7H_{14}{-}O{-}$ | $-C_{10}H_{21}$ | | K 32.5 | C 55 A 72 I |
| 5182 | $H_2C{=}CH{-}C_7H_{14}{-}O{-}$ | $-C_4H_8-CHMe-C_2H_5$ | S | K 16 | C* 35 N* 48 I |
| 5183 | $H_2C{=}CH{-}C_7H_{14}{-}O{-}$ | $-C_5H_{10}-CHMe-C_2H_5$ | S | K-1 | C* 28 N* 48 I |
| 5184 | $H_2C{=}CH{-}C_8H_{15}{-}O{-}$ | $-C_7H_{15}$ | | K 43 | C 42 A 55 N 64 I |
| 5185 | $H_2C{=}CH{-}C_8H_{15}{-}O{-}$ | $-C_8H_{17}$ | | K 24 | C 46 A 60 N 63 I |
| 5186 | $H_2C{=}CH{-}C_8H_{15}{-}O{-}$ | $-C_9H_{19}$ | | K 35 | C 45 A 70 I |
| 5187 | $H_2C{=}CH{-}C_8H_{15}{-}O{-}$ | $-C_{10}H_{21}$ | | K 33 | C 57 A 70 I |
| 5188 | $H_2C{=}CH{-}C_8H_{15}{-}O{-}$ | $-C_4H_8-CHMe-C_2H_5$ | S | K 17 | C* 34 N* 44 I |
| 5189 | $H_2C{=}CH{-}C_8H_{15}{-}O{-}$ | $-C_5H_{10}-CHMe-C_2H_5$ | S | K 12 | C* 27 N* 38 I |
| 5191 | $H_2C{=}CH{-}C_9H_{19}{-}O{-}$ | $-C_7H_{15}$ | | K 49 | C 46 A 59 N 67 I |
| 5192 | $H_2C{=}CH{-}C_9H_{19}{-}O{-}$ | $-C_8H_{17}$ | | K 33.9 | C 53 A 64.4 N 66.2 I |
| 5193 | $H_2C{=}CH{-}C_9H_{19}{-}O{-}$ | $-C_9H_{19}$ | | K 31.3 | C 52.8 A 71.7 I |
| 5194 | $H_2C{=}CH{-}C_9H_{19}{-}O{-}$ | $-C_{10}H_{21}$ | | K 39.9 | C 65.2 A 72.5 I |
| 5195 | $H_2C{=}CH{-}C_9H_{19}{-}O{-}$ | $-C_{12}H_{25}$ | | K 45.9 | C 75.5 A 76.5 I |
| 5196 | $H_2C{=}CH{-}C_{10}H_{20}{-}O{-}$ | $-C_7H_{15}$ | | K 50 | C 45 A 60 N 65 I |
| 5197 | $H_2C{=}CH{-}C_{10}H_{20}{-}O{-}$ | $-C_8H_{17}$ | | K 36 | C 50 A 63 N 64 I |
| 5198 | $H_2C{=}CH{-}C_{10}H_{20}{-}O{-}$ | $-C_9H_{19}$ | | K 46 | C 50 A 70 I |
| 5199 | $H_2C{=}CH{-}C_8H_{15}{-}O{-}$ | $-O-C_8H_{17}$ | | K 44.1 | C 78.5 A 94.5 I |
| 5200 | $H_2C{=}CH{-}C_9H_{19}{-}O{-}$ | $-C_4H_8-CHMe-C_2H_5$ | S | K 20 | C* 40 N* 49 I |
| 5201 | $H_2C{=}CH{-}C_{10}H_{20}{-}O{-}$ | $-C_4H_8-CHMe-C_2H_5$ | S | K 35 | C* 40 N* 47 I |

TABLE 104

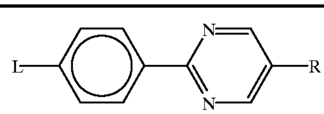

| No | L | R | | Cr | LC |
|---|---|---|---|---|---|
| 5202 | $H_2C{=}CH{-}C_8H_{18}O{-}$ | $-C_5H_{10}CHMe-C_2H_5$ | S | K 17 | C* 36 N* 445 I |
| 5203 | $H_2C{=}CH{-}C_{10}H_{20}O{-}$ | $-C_5H_{10}CHMe-C_2H_5$ | S | K 33 | C* 37 N* 43 I |
| 5204 | $C_3H_7$—CH%CH—$CH_2$—O— | $-C_9H_{19}$ | | K 32 | A 17 I |
| 5208 | $CH_3$—CH%CH—$C_2H_4$—O— | $-C_7H_{15}$ | | K 45 | A 41 N 47 I |
| 5209 | $CH_3$—CH%CH—$C_2H_4$—O— | $-C_8H_{17}$ | | K 34 | A 45 I |
| 5210 | $CH_3$—CH%CH—$C_2H_4$—O— | $-C_9H_{19}$ | | K 38 | C 25 A 55 I |
| 5211 | $C_2H_5$—CH%CH—$C_2H_4$—O— | $-C_7H_{15}$ | | K 43 | A 45 N 48 I |
| 5212 | $C_2H_5$—CH%CH—$C_2H_4$—O— | $-C_8H_{17}$ | | K 42 | C 32 A 47 I |
| 5213 | $C_3H_5$—CH%CH—$C_2H_4$—O— | $-C_9H_{19}$ | | K 58 | C 41 A 56 I |
| 5214 | $C_3H_7$—CH%CH—$C_2H_4$—O— | $-C_7H_{15}$ | | K 20 | A 44 I |
| 5215 | $C_3H_7$—CH%CH—$C_2H_4$—O— | $-C_8H_{17}$ | | K 33 | C 35 A 46 I |
| 5216 | $C_3H_7$—CH%CH—$C_2H_4$—O— | $-C_9H_{19}$ | | K 34 | C 45 A 54 I |
| 5217 | $C_4H_9$—CH%CH—$C_2H_4$—O— | $-C_7H_{15}$ | | K 28 | A 43 N 44 I |
| 5218 | $C_4H_9$—CH%CH—$C_2H_4$—O— | $-C_8H_{17}$ | | K 25 | C 34 A 46 I |
| 5219 | $C_4H_9$—CH%CH—$C_2H_4$—O— | $-C_9H_{19}$ | | K 24 | C 43 A 54 I |
| 5220 | $C_5H_{11}$—CH%CH—$C_2H_4$—O— | $-C_7H_{15}$ | | K 25 | A 40 I |
| 5221 | $C_5H_{11}$—CH%CH—$C_2H_4$—O— | $-C_8H_{17}$ | | K 12 | C 30 A 42 I |
| 5222 | $C_5H_{11}$—CH%CH—$C_2H_4$—O— | $-C_9H_{19}$ | | K 6 | C 38 A 51 I |
| 5223 | $C_6H_{13}$—CH%CH—$C_2H_4$—O— | $-C_7H_{15}$ | | K 33 | A 39 I |
| 5224 | $C_6H_{13}$—CH%CH—$C_2H_4$—O— | $-C_8H_{17}$ | | K 22 | C 25 A 41 I |
| 5225 | $C_6H_{13}$—CH%CH—$C_2H_4$—O— | $-C_9H_{19}$ | | K 19 | C 34 A 49 I |
| 5226 | $C_7H_{15}$—CH%CH—$C_2H_4$—O— | $-C_7H_{15}$ | | K 40 | A 37 I |
| 5227 | $C_7H_{15}$—CH%CH—$C_2H_4$—O— | $-C_8H_{17}$ | | K 30 | C 20 A 39 I |
| 5228 | $C_7H_{15}$—CH%CH—$C_2H_4$—O— | $-C_9H_{19}$ | | K 26 | C 24 A 47 I |
| 5229 | $C_8H_{17}$—CH%CH—$C_2H_4$—O— | $-C_7H_{15}$ | | K 31 | A 35 I |

TABLE 104-continued

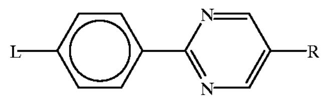

| No | L | R | Cr | LC |
|---|---|---|---|---|
| 5230 | $C_8H_{17}$—CH%CH—$C_2H_4$—O— | —$C_8H_{17}$ | K 32 | C 14 A 41 I |
| 5131 | $C_8H_{17}$—CH%CH—$C_2H_4$—O— | —$C_9H_{19}$ | K 29 | C 14 A 50 I |
| 5232 | $CH_3$—CH%CH—$C_3H_6$—O— | —$C_9H_{19}$ | K 22 | A 46 I |
| 5233 | $C_2H_5$—CH%CH—$C_4H_6$—O— | —$C_7H_{15}$ | K 28 | A 31 I |

TABLE 105

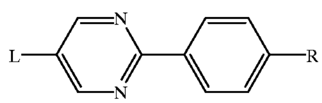

| LCReg | L | R | Phases |
|---|---|---|---|
| 2817 | $C_8H_{17}$— | —O—$C_6H_{12}$—OOC—CMe═CH—H | (−14.) Cr −9.0 S 42.0 N 52.0 |
| 66511 | $C_4H_9$—C: : :C— | —Cl | Cr 76.3 A 82.6 |
| 66512 | $C_5H_{11}$—C: : :C— | —Cl | Cr 79.8 A 80.8 |
| 2856 | $C_4H_9$— | —CN | Cr 61.0 N 45.0 |
| 2857 | $C_5H_{11}$— | —CN | Cr 71.0 N 52.0 |
| 2858 | $C_6H_{13}$— | —CN | Cr 54.5 N 38.5 |
| 2859 | $C_7H_{15}$— | —CN | Cr 45.0 N 51.0 |
| 2860 | $C_8H_{17}$— | —CN | Cr 66.5 N 47.0 |
| 2861 | $C_4H_9$— | —CN | Cr 85.0 N 110.0 |
| 2862 | $C_5H_{11}$— | —CN | Cr 74.0 N 85.0 |
| 2863 | $C_6H_{13}$— | —CN | Cr 72.0 N 96.0 |
| 2864 | $C_7H_{15}$— | —CN | Cr 58.0 A 74.0 N 89.0 |
| 2865 | $C_8H_{17}$— | —CN | Cr 72.0 A 92.0 N 99.0 |
| 2866 | $C_5H_{11}$— | —C: : :C—CN | Cr 76.2 N 128.5 |
| 2868 | $C_6H_{13}$— | —NO2 | Cr 111.5 S 100.05 |

TABLE 106

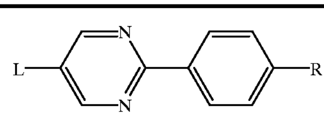

| LCReg | L | R | Phases |
|---|---|---|---|
| 2871 | $C_5H_{11}$— | —NCS | Cr 46.0 A 86.0 |
| 2875 | $C_8H_{17}$—O— | —O—$C_4H_8$—$SiMe_3$ | Cr 68.5 C 77.6 A 78.3 |
| 66463 | $C_6H_{13}$— | —O—$C_4H_8$—$SiMe_2$—$CH_2$—$SiMe_3$ | Cr 25.0 N 48.0 |
| 2901 | NC— | —$C_3H_7$ | Cr 126.0 N 106.5 |
| 2902 | NC— | —$C_4H_9$ | Cr 109.0 N 101.5 |
| 2908 | NC— | —I—$C_2H_5$ | Cr 153.0 N 149.5 |
| 2909 | NC— | —I—$C_3H_7$ | Cr 146.5 N 137.0 |
| 2910 | NC— | —I—$C_4H_9$ | Cr 120.0 N 139.0 |
| 2917 | NC— | —OOC—$C_4H_9$ | Cr 114.0 N 119.5 |
| 2918 | NC— | —OOC—$C_5H_{11}$ | Cr 108.5 N 123.0 |
| 2919 | NC— | —OOC—$C_6H_{13}$ | Cr 109.0 N 119.0 |
| 2920 | NC— | —OCOO—$C_4H_9$ | Cr 121.0 N 129.0 |
| 2962 | C2H5—O— | —$C_6H_{13}$ | Cr 76.0 N 61.0 |
| 60496 | $C_8H_{17}$—O— | —$C_5H_{11}$—O— —$C_3H_7$ | Cr 8.0 C 47.0 A 69.0 |
| 3024 | $C_7H_{15}$— | —O—$C_2H_5$ | Cr 59.0 N 62.0 |

TABLE 107

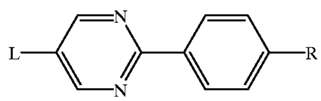

| LCReg | L | R | Phases |
|---|---|---|---|
| 3033 | $C_6H_9$— | —O—$C_4H_9$ | Cr 40.0 N 53.0 |
| 3037 | $C_5H_{11}$— | —O—$C_5H_{11}$ | Cr 37.0 N 55.5 |
| 3038 | $C_6H_{13}$— | —O—$C_5H_{11}$ | Cr 43.0 N 53.0 |
| 3043 | $C_4H_9$— | —O—$C_6H_{13}$ | Cr 43.0 N 44.5 |
| 3044 | $C_5H_{11}$— | —O—$C_6H_{13}$ | Cr 36.0 N 61.0 |
| 3045 | $C_6H_{13}$— | —O—$C_6H_{13}$ | Cr 30.5 N 60.8 |
| 3050 | $C_4H_9$— | —O—$C_7H_{15}$ | Cr 28.0 N 42.0 |
| 3051 | $C_5H_{11}$— | —O—$C_7H_{15}$ | Cr 37.5 N 59.7 |
| 3052 | $C_6H_{13}$— | —O—$C_7H_{15}$ | Cr 35.5 N 58.3 |
| 3057 | $C_4H_9$— | —O—$C_8H_{17}$ | Cr 44.5 N 48.5 |
| 3058 | $C_5H_{11}$— | —O—$C_8H_{17}$ | Cr 43.0 N 64.5 |
| 3059 | $C_6H_{13}$— | —O—$C_8H_{17}$ | Cr 38.0 N 61.5 |
| 3064 | $C_4H_9$— | —O—$C_9H_{19}$ | Cr 40.5 N 47.0 |
| 3065 | $C_5H_{11}$— | —O—$C_9H_{19}$ | Cr 42.0 N 62.0 |
| 3066 | $C_6H_{13}$— | —O—$C_9H_{19}$ | Cr 35.0 N 61.0 |

TABLE 108

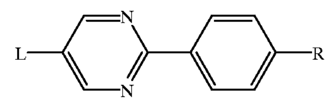

| LCReg | L | R | Phases |
|---|---|---|---|
| 3070 | $C_4H_9$— | —O—$C_{10}H_{21}$ | Cr 45.5 N 51.0 |
| 3071 | $C_6H_{13}$— | —O—$C_{10}H_{21}$ | Cr 37.0 N 62.0 |
| 3078 | $C_5H_{11}$— | —O—$C_{12}H_{25}$ | Cr 52.0 N 65.0 |
| 3079 | $C_6H_{13}$— | —O—$C_{12}H_{25}$ | Cr 47.2 N 62.2 |
| 3094 | $C_4H_9$— | —O—$C_5H_{11}$ | CrX 61.0 Cr 81.5 N 87.5 |
| 3116 | $C_2H_5$—O— | —O—$C_8H_{17}$ | Cr 86.3 N 93.0 |
| 3162 | $C_8H_{17}$—COO— | —O—$C_8H_{17}$ | (53.0) Cr 65.0 C 92.0 N 96.0 |
| 3163 | $C_9H_{19}$—COO— | —O—$C_8H_{17}$ | (49.0) Cr 69.0 C 98.0 |
| 3164 | $C_{10}H_{21}$—COO— | —O—$C_8H_{17}$ | (53.0) Cr 75.0 C 100.0 |
| 3165 | $C_7H_{15}$—COO— | —O—$C_9H_{19}$ | Cr 66.2 C 84.7 N 93.5 |
| 3166 | $C_8H_{17}$—COO— | —O—$C_{10}H_{21}$ | Cr 62.3 C 93.6 N 95.3 |
| 3167 | $C_9H_{19}$—COO— | —O—$C_{10}H_{21}$ | (50.0) Cr 61.0 C 99.0 |
| 3168 | $C_{10}H_{21}$—COO— | —O—$C_{10}H_{21}$ | (43.0) Cr 68.0 C 102.0 |
| 3187 | $C_{11}H_{23}$—OCOO— | —O—$C_7H_{15}$ | Cr 77.0 C 85.0 |
| 3188 | $C_{12}H_{25}$—OCOO— | —O—$C_7H_{15}$ | Cr 78.0 C 85.0 |

TABLE 109

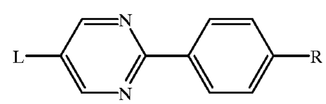

| LCReg | L | R | Phases |
|---|---|---|---|
| 3189 | $C_6H_{13}$—OCOO— | —O—$C_8H_{17}$ | Cr 66.0 N 77.0 |
| 3190 | $C_7H_{15}$—OCOO— | —O—$C_8H_{17}$ | Cr 74.0 N 80.0 |
| 3191 | $C_8H_{17}$—OCOO— | —O—$C_8H_{17}$ | Cr 71.0 C 72.0 N 83.0 |
| 3192 | $C_9H_{19}$—OCOO— | —O—$C_8H_{17}$ | Cr 67.0 C 79.0 N 84.0 |
| 3193 | $C_{12}H_{25}$—OCOO— | —O—$C_8H_{17}$ | Cr 80.0 N 89.0 |
| 3194 | $C_5H_{11}$—OCOO— | —O—$C_{10}H_{21}$ | Cr 56.0 N 73.0 |
| 3195 | $C_6H_{13}$—OCOO— | —O—$C_{10}H_{21}$ | Cr 72.0 N 73.0 |
| 3196 | $C_7H_{15}$—OCOO— | —O—$C_{10}H_{21}$ | Cr 72.0 N 80.0 |
| 3197 | $C_8H_{17}$—OCOO— | —O—$C_{10}H_{21}$ | Cr 68.0 C 75.0 N 84.0 |
| 3198 | $C_{12}H_{25}$—OCOO— | —O—$C_{10}H_{21}$ | Cr 74.0 C 90.0 |
| 3249 | $C_8H_{17}$— | —O—$C_4H_8$—CMe2—$C_4H_9$ | Cr-1.0 C 19.0 A 29.0 |
| 3250 | $C_8H_{17}$—O— | —O—$C_4H_8$—CMe2—$C_4H_9$ | CrX 17.0 Cr 35.0 C 64.0 A 67.0 |
| 3251 | $C_8H_{17}$— | —O—$C_6H_{12}$—CMe2—$C_2H_5$ | Cr 18.0 C 36.0 A 51.0 |
| 3252 | $C_8H_{17}$— | —O—$C_6H_{12}$—CMe2—$C_4H_9$ | Cr 9.0 C 29.0 A 46.0 |
| 3253 | $C_8H_{17}$—O— | —O—$C_6H_{12}$—CMe2—$C_2H_5$ | CrX 22.0 Cr 36.0 C 74.0 A 82.0 |

TABLE 110

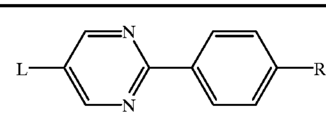

| LCReg | L | R | * | Phases |
|---|---|---|---|---|
| 3254 | $C_5H_{11}$—O— | —O—$C_6H_{12}$—CMe2—$C_4H_9$ | | Cr 62.0 C 35.0 A 63.0 |
| 3255 | $C_6H_{13}$—O— | —O—$C_6H_{12}$—CMe2—$C_4H_9$ | | Cr 31.0 C 34.0 A 61.0 |

TABLE 110-continued

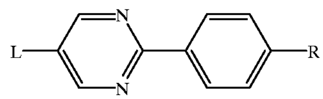

| LCReg | L | R | * | Phases |
|---|---|---|---|---|
| 3261 | $C_7H_{15}$— | —O—$CH_2$—CHMe—O—$C_4H_9$ | 1 | Cr 8.5 A 16.0 |
| 3269 | $C_8H_{17}$— | —O—$C_3H_6$—CMe2—$C_5H_{11}$ | 1 | (1.0) Cr 16.1 A 24.2 |
| 60088 | $C_{10}H_{21}$—O— | —O—$C_3H_6$—CMe2—$C_3H_7$ | 1 | Cr 37.8 C* 64.6 |
| 3273 | $C_{10}H_{21}$— | —O—$C_4H_8$—CMe2—$CH_3$ | 1 | Cr 35 C* 27.9 A 40.3 |
| 3274 | $C_{10}H_{21}$— | —O—$C_5H_{10}$—CMe2—$C_5H_{11}$ | 1 | (23.0) Cr 30.4 S 35.5 C* 41.4 |
| 3199 | $C_9H_{25}$— | —COO—$CH_3$ | | Cr 61.7 X 65.0 |
| 3202 | $C_9H_{25}$— | —COO—$C_2H_5$ | | Cr 62.0 X 65.0 |
| 3216 | $C_8H_{17}$— | —COO—$C_5H_{11}$ | | (35.0) Cr ? C 43.0 A 49.0 N 50.0 |
| 3220 | $C_8H_{17}$— | —COO—$C_6H_{13}$ | | Cr 43.0 C 48.0 A 51.5 |
| 3222 | $C_6H_{13}$— | —COO—$C_7H_{15}$ | | Cr 38.5 N 44.0 |
| 3226 | $C_7H_{15}$— | —COO—$C_8H_{17}$ | | Cr 53.0 N 57.5 |
| 3229 | $C_6H_{13}$— | —COO—$C_9H_{25}$ | | Cr 45.0 N 48.5 |
| 3230 | $C_7H_{15}$— | —COO—$C_9H_{25}$ | | Cr 53.0 N 60.5 |

TABLE 111

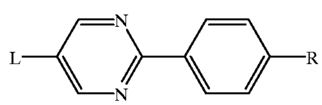

| LCReg | L | R | * | Phases |
|---|---|---|---|---|
| 3233 | $C_7H_{15}$— | —OOC—$C_{10}H_{21}$ | | Cr 56.5 N 59.5 |
| 3235 | $C_6H_{13}$— | —OOC—$C_{11}H_{23}$ | | Cr 49.0 N 51.0 |
| 3236 | $C_7H_{15}$— | —OOC—$C_{11}H_{23}$ | | Cr 60.0 N 61.5 |
| 3316 | $C_9H_{19}$— | —OCOO—$C_{11}H_{23}$ | | Cr 53.0 N 55.0 |
| 60108 | $C_3H_7$—CHMe—$C_5H_{10}$—O— | —$C_8H_{17}$ | 2 | Cr 2.5 C 46.00 |
| 3336 | $C_2H_5$—CHMe—$C_5H_{10}$— | —O—$C_8H_{17}$ | S | (6.0) Cr 14.0 C* 29.4 N* 44.0 |
| 3337 | $C_2H_5$—CHMe—$C_5H_{10}$—OOC— | —O—$C_8H_{17}$ | S | Cr 79.9 C* 80.7 |
| 3338 | $C_2H_5$—CHMe—$C_6H_{12}$— | —$C_9H_{19}$ | 2 | Cr 26.2 C 36.5 |
| 3340 | $C_2H_5$—CHMe—$C_7H_{14}$—O— | | 1 | Cr 40.3 C* 87.2 |
| 59973 | $C_5H_{11}$—CHF—$CH_2$—O— | —$C_6H_{13}$ | 1 | Cr ? A 65.9 is |
| 3342 | $C_6H_{13}$—CHF—$CH_2$—O— | —$C_6H_{13}$ | 1 | Cr 48.6 C* 53.0 A 78.4 |
| 59979 | $C_7H_{15}$—CHF—$CH_2$—O— | —$C_6H_{13}$ | 1 | Cr 61.7 C* 68.0 A 79.0 |
| 59984 | $C_8H_{17}$—CHF—$CH_2$—O— | —$C_6H_{13}$ | 1 | Cr 74.3 C* 77.0 A 83.6 |
| 59974 | $C_5H_{11}$—CHF—$CH_2$—O— | —$C_7H_{15}$ | 1 | Cr ? A 65.8 |
| 3343 | $C_6H_{13}$—CHF—$CH_2$—O— | —$C_7H_{15}$ | 1 | Cr 52.0 C* 54.5 A 80.5 |

TABLE 112

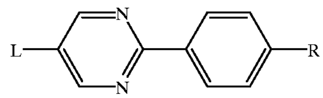

| LCReg | L | R | * | Phases |
|---|---|---|---|---|
| 59980 | $C_7H_{15}$—CHF—$CH_2$—O— | —$C_7H_{15}$ | 1 | Cr 55.0 C* 69.2 A 81.6 |
| 59985 | $C_8H_{17}$—CHF—$CH_2$—O— | —$C_7H_{15}$ | 1 | Cr 70.5 S 61.0 C* 79.4 A 85.4 |
| 59975 | $C_5H_{11}$—CHF—$CH_2$—O— | —$C_8H_{17}$ | 1 | Cr 45.0 A 74.4 |
| 3344 | $C_6H_{13}$—CHF—$CH_2$—O— | —$C_8H_{17}$ | 1 | Cr 46.2 S 25.0 C* 45.0 A 80.0 |
| 59981 | $C_7H_{15}$—CHF—$CH_2$—O— | —$C_8H_{17}$ | 1 | Cr 55.5 C* 68.7 A 81.9 |
| 59986 | $C_8H_{17}$—CHF—$CH_2$—O— | —$C_8H_{17}$ | 1 | Cr 62.5 S 59.0 C* 76.3 A 84.0 |
| 59976 | $C_5H_{11}$—CHF—$CH_2$—O— | —$C_9H_{19}$ | 1 | Cr 54.5 A 74.2 |
| 3345 | $C_6H_{13}$—CHF—$CH_2$—O— | —$C_9H_{19}$ | S | Cr 48.5 C* 45.0 A 84.3 |

TABLE 112-continued

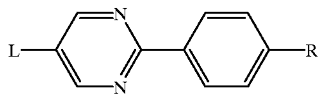

| LCReg | L | R | * | Phases |
|---|---|---|---|---|
| 3982 | $C_7H_{15}$—CHF—$CH_2$—O— | —$C_9H_{19}$ | 1 | Cr 52.7 C* 66.5 A 81.6 |
| 59987 | $C_8H_{17}$—CHF—$CH_2$—O— | —$C_9H_{19}$ | 1 | Cr 60.8 S 58.0 C* 79.2 A 85.2 |
| 59977 | $C_5H_{11}$—CHF—$CH_2$—O— | —$C_{10}H_{21}$ | 1 | Cr 41.5 A 75.0 |
| 59978 | $C_6H_{13}$—CHF—$CH_2$—O— | —$C_{10}H_{21}$ | 1 | Cr 48.0 A 80.0 |
| 59983 | $C_7H_{15}$—CHF—$CH_2$—O— | —$C_{10}H_{21}$ | 1 | Cr 55.3 C* 63.7 A 81.9 |
| 60047 | $C_9H_{19}$—CHF—$CH_2$—O— | —O—$C_{10}H_{21}$ | 1 | Cr 60.0 S 83.0 |
| 3346 | $C_6H_{13}$—CHF—$CH_2$—O— | —O—$C_6H_{13}$ | 1 | Cr 67.0 C* 99.0 A 93.1 N* 94.1 |

TABLE 113

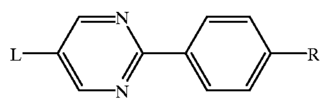

| LCReg | L | R | Phases |
|---|---|---|---|
| 3347 | $C_6H_{13}$—CHF—$CH_2$—O— | —O—$C_7H_{15}$ | Cr 65.0 C* 90.0 A 94.8 |
| 3348 | $C_6H_{13}$—CHF—$CH_2$—O— | —O—$C_8H_{17}$ | Cr 67.0 C* 90.0 A 93.1 N* 94.1 |
| 66258 | $C_5H_{11}$—CHF—$CH_2$—O— | —$C_7H_{15}$ | Cr 80.0 N 86.0 |
| 65403 | $C_5H_{11}$—CHF—$CH_2$—O— | —$C_8H_{17}$ | Cr 74.0 N 81.0 |
| 60524 | $C_5H_{11}$—CHF—$CH_2$—O— | —$C_9H_{19}$ | Cr 78.0 N 84.0 |
| 60498 | $C_3H_7$—CH═CH —$C_3H_6$—O— | —$C_5H_{10}$—O—$C_3H_7$ | Cr 32.0 C 43.0 A 62.0 |
| 3500 | $C_{11}H_{23}$—O— | —O—$CH_2$—CHMe—$C_2H_5$ | (44.0) Cr 58.0 C* 72.7 A 76.7 |
| 3507 | $C_6H_{13}$— | —O—$C_2H_4$—O—$CH_2$—CHMe —$C_2H_5$ | Cr-8.0 X 28.0 |
| 3508 | $C_8H_{17}$— | —O—$C_2H_4$—O—$CH_2$—CHMe —$C_2H_5$ | Cr 1.0 X 42.0 |
| 3509 | $C_{10}H_{21}$— | —O—$C_2H_4$—O—$CH_2$—CHMe —$C_2H_5$ | Cr 16.0 X 52.0 |
| 3514 | $C_6H_{13}$— | —O—$C_2H_4$—CHMe—$C_2H_5$ | (8.0) Cr 13.0 N* 32.0 |
| 3517 | $C_9H_{19}$— | —O—$C_2H_4$—CHMe—$C_2H_5$ | Cr 23.0 S 31.0 C* 38.7 A 46.5 |
| 3518 | $C_{10}H_{21}$— | —O—$C_2H_4$—CHMe—$C_2H_5$ | (6.0) Cr 22.0 C* 41.4 A 41.5 |
| 3519 | $C_{11}H_{23}$— | —O—$C_2H_4$—CHMe—$C_2H_5$ | (18.0) Cr 24.7 S 33.9 C* 45.5 A 50.0 |
| 3520 | $C12_{H25}$— | —O—$C_2H_4$—CHMe—$C_2H_5$ | (19.0) Cr 28.5 C* 47.0 A 51.2 |

TABLE 114

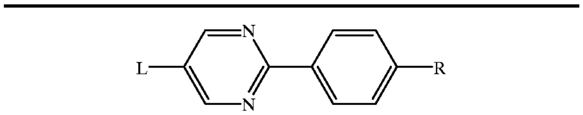

| LCReg | L | R | Phases |
|---|---|---|---|
| 61311 | $C_8H_{17}$— | —OOC—CH═CH—$C_4H_9$ | Cr 54.0 N 66.0 |
| 61319 | $C_9H_{19}$— | —OOC—CH═CH—$C_4H_9$ | Cr 47.0 N 70.0 |
| 61240 | $C_7H_{15}$— | —OOC—CH═CH—$C_5H_{11}$ | Cr 50.0 N 80.0 |
| 61241 | $C_8H_{17}$— | —OOC—CH═CH—$C_5H_{11}$ | Cr 46.0 N 75.0 |
| 61242 | $C_9H_{19}$— | —OOC—CH═CH—$C_5H_{11}$ | Cr 49.0 N 79.0 |
| 61304 | $C_7H_{15}$— | —OOC—CH═CH—$C_6H_{13}$ | Cr 36.0 N 76.0 |
| 61312 | $C_8H_{17}$— | —OOC—CH═CH—$C_6H_{13}$ | Cr 35.0 N 70.0 |
| 61320 | $C_9H_{19}$— | —OOC—CH═CH—$C_6H_{13}$ | Cr 43.0 N 76.0 |
| 61305 | $C_7H_{15}$— | —OOC—CH═CH—$C_7H_{15}$ | Cr 59.0 N 80.0 |
| 61313 | $C_8H_{17}$— | —OOC—CH═CH—$C_7H_{15}$ | Cr 41.0 N 76.0 |

TABLE 114-continued

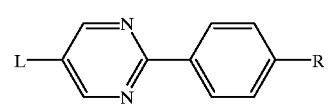

| LCReg | L | R | Phases |
|---|---|---|---|
| 61321 | $C_9H_{19}$— | —OOC—CH═CH—$C_7H_{15}$ | Cr 50.0 N 81.0 |
| 61306 | $C_7H_{15}$— | —OOC—CH═CH—$C_8H_{17}$ | Cr 36.0 N 74.0 |
| 61314 | $C_8H_{17}$— | —OOC—CH═CH—$C_8H_{17}$ | Cr 49.0 N 74.0 |
| 61322 | $C_9H_{19}$— | —OOC—CH═CH—$C_8H_{17}$ | Cr 43.0 N 78.0 |
| 61307 | $C_7H_{15}$— | —OOC—CH═CH—$C_9H_{19}$ | Cr 52.0 N 80.0 |

TABLE 115

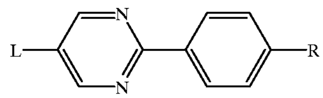

| LCReg | L | R | * | Phases |
|---|---|---|---|---|
| 61315 | $C_8H_{17}$— | —OOC—CH═CH—$C_9H_{19}$ | | Cr 52.0 N 78.0 |
| 61323 | $C_9H_{19}$— | —OOC—CH═CH—$C_9H_{19}$ | | Cr 60.0 N 82.0 |
| 3639 | $C_6H_{13}$— | —O—CH2_CH═CH—$CH_3$ | | Cr 54.0 N 61.0 |
| 3630 | $C_7H_{15}$— | —O—CH2_CH═CH—$CH_3$ | | Cr 52.0 N 72.0 |
| 3631 | $C_8H_{17}$— | —O—CH2_CH═CH—$CH_3$ | | Cr 48.0 C 45.0 N 68.0 |
| 3636 | $C_7H_{15}$— | —O—CH2_CH═CH—$C_3H_7$ | | Cr 52.0 N 68.0 |
| 60854 | $C_9H_{19}$— | —O—$C_2H_4$—CH═CH—$C_2H_5$ | | Cr 26.0 A 42.0 |
| 3675 | $C_2H_5$—CHMe—$C_4H_8$— | —O—$C_4H_8$—CH═$CH_2$ | S | Cr 30.0 N* 31.0 |
| 3676 | $C_2H_5$—CHMe—$C_5H_{10}$— | —O—$C_4H_8$—CH═$CH_2$ | S | Cr 13.0 N* 21.0 |
| 66707 | $C_6H_{13}$— | —O—$C_6H_{12}$—CH═$CH_2$ | | Cr 23.0 N 43.0 |
| 66708 | $C_6H_{13}$— | —O—$C_8H_{16}$—CH═$CH_2$ | | Cr 46.0 N 56.0 |
| 66710 | $C_6H_{13}$— | —OOC—O—$C_8H_{16}$—CH═$CH_2$ | | Cr 37.0 X 43.0 X 50.0 |
| 66709 | $C_6H_{13}$— | —O—$C_9H_{18}$—CH═$CH_2$ | | Cr 38.0 N 56.0 |
| 3742 | $C_7H_{15}$— | —O—$C_4H_8$—CH%CH—$C_2H_5$ | | Cr 2.0 C 24.0 A 47.0 N 53.0 |
| 3743 | $C_8H_{17}$— | —O—$C_4H_8$—CH%CH—$C_2H_5$ | | Cr 10.0 C 38.0 A 53.0 |

TABLE 116

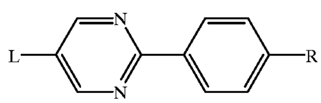

| LCReg | L | R | Phases |
|---|---|---|---|
| 3744 | $C_9H_{19}$— | —O—$C_4H_8$—CH%CH—$C_2H_5$ | Cr 24.0 C 45.0 A 61.0 |
| 3788 | $C_8H_{17}$—O— | —O—$CH_2$—CH/$CH_2$¥$CH_2$ | Cr 59.0 C 62.9 A 72.9 N 73.6 |
| 3792 | $C_{10}H_{21}$— | —O—$C_5H_{10}$—CH/$CH_2$¥$CH_2$ | Cr 48.0 C 53.0 A 62.0 |
| 3793 | $C_8H_{17}$— | —O—$C_6H_{12}$—CH/$CH_2$¥$CH_2$ | Cr 37.0 C 46.0 A 50.0 N 59.0 |
| 3794 | $C_8H_{17}$—O— | —O—$C_6H_{12}$—CH/$CH_2$¥$CH_2$ | Cr 56.0 C 80.0 A 88.0 N 91.0 |
| 3796 | $C_{10}H_{21}$— | —OOC—$C_6H_{12}$—CH/$CH_2$¥$CH_2$ | Cr 48.0 C 57.0 |
| 3797 | $C_8H_{17}$—O— | —OOC—$C_6H_{12}$—CH/$CH_2$¥$CH_2$ | Cr 62.0 C 77.0 A 84.0 N 84.3 |
| 3799 | $C_8H_{17}$— | —O—$C_7H_{14}$—CH/$CH_2$¥$CH_2$ | Cr 33.0 C 45.5 A 54.6 N 58.4 |
| 3800 | $C_8H_{17}$—O— | —O—$C_7H_{14}$—CH/$CH_2$¥$CH_2$ | Cr 60.0 C 78.2 A 90.0 N 90.2 |
| 3801 | $C_8H_{17}$— | —O—$C_8H_{16}$—CH/$CH_2$¥$CH_2$ | Cr 35.0 C 51.5 A 55.5 N 61.2 |
| 3802 | $C_{10}H_{21}$— | —O—$C_8H_{16}$—CH/$CH_2$¥$CH_2$ | Cr 42.3 C 62.5 A 67.2 |
| 3803 | $C_8H_{17}$—O— | —O—$C_8H_{16}$—CH/$CH_2$¥$CH_2$ | Cr 51.0 C 79.2 A 91.0 N 91.6 |
| 3804 | $C_6H_{13}$— | —O—$C_9H_{18}$—CH/$CH_2$¥$CH_2$ | Cr 44.0 N 53.0 |
| 3805 | $C_8H_{17}$— | —O—$C_9H_{18}$—CH/$CH_2$¥$CH_2$ | Cr 41.3 C 51.0 A 57.6 N 60.2 |
| 3806 | $C_9H_{19}$— | —O—$C_9H_{18}$—CH/$CH_2$¥$CH_2$ | Cr 52.8 C 56.8 A 67.2 |

TABLE 117

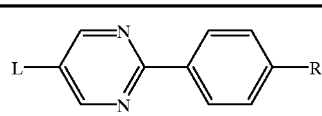

| LCReg | L | R | * | Phases |
|---|---|---|---|---|
| 3807 | $C_{10}H_{21}$— | —O—$C_9H_{18}$—CH/$CH_2$¥$CH_2$ | | Cr 44.0 C 64.9 A 67.7 |
| 3808 | $C_{11}H_{23}$— | —O—$C_9H_{18}$—CH/$CH_2$¥$CH_2$ | | Cr 48.0 C 70.2 A 71.8 |
| 3809 | $C_{12}H_{25}$— | —O—$C_9H_{18}$—CH/$CH_2$¥$CH_2$ | | Cr 52.0 C 72.3 |
| 3810 | $C_{10}H_{21}$— | —O—$C_{11}H_{22}$—CH/$CH_2$¥$CH_2$ | | Cr 51.7 C 65.6 A 67.3 |
| 3811 | $C_{12}H_{25}$— | —O—$C_{11}H_{22}$—CH/$CH_2$¥$CH_2$ | | Cr 72.0 C 95.3 |
| 3812 | $C_7H_{15}$—O— | —O—$C_9H_{18}$—CH/$CH_2$¥$CH_2$ | | Cr 56.4 C 71.3 A 83.4 N 85.1 |
| 3813 | $C_8H_{17}$—O— | —O—$C_9H_{18}$—CH/$CH_2$¥$CH_2$ | | Cr 69.2 C 75.8 A 90.2 |
| 3814 | $C_{11}H_{23}$—O— | —O—$C_9H_{18}$—CH/$CH_2$¥$CH_2$ | | Cr 68.0 C 95.0 |
| 3779 | $H_2C$═CH—$C_4H_8$—O— | —O—$CH_2$—CH/O¥CH(t)—$C_4H_9$ | S | (73.0) Cr 78.0 N* 87.0 |

TABLE 117-continued

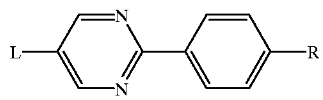

| LCReg | L | R | * | Phases |
|---|---|---|---|---|
| 3780 | $H_2C{=}CH—C_6H_{12}—O—$ | $—O—CH_2—CH/O¥CH(t)—C_4H_9$ | S | (51.0) Cr 73.0 C* 85.0 A 89.0 |
| 3781 | $H_2C{=}CH—C_8H_{16}—O—$ | $—O—CH_2—CH/O¥CH(t)—C_4H_9$ | S | (33.0) Cr 59.0 C* 93.0 A 96.0 |

TABLE 118

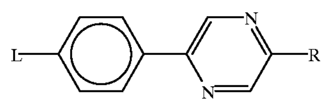

| No | L | R | | Cr | LC |
|---|---|---|---|---|---|
| 5352 | $C_{12}H_{25}—$ | —CN | | K 87 | A 81 I |
| 5353 | $C_{13}H_{27}—$ | —CN | | K 87 | S 80 B |
| 5355 | $C_8H_{17}—O—$ | —CN | | K 84 | A 112 I |
| 5356 | $C_{10}H_{21}—O—$ | —CN | | K 70 | A 111 I |
| 5357 | $C_{12}H_{25}—O—$ | —CN | | K 85 | A 111 I |
| 5358 | $C_{12}H_{25}—$ | $—O—C_4H_9$ | | K 48 | S 43 I |
| 5380 | $CH_3—O—$ | $—C_8H_{17}$ | | K 68 | A 63 I |
| 5361 | $CH_3—O—$ | $—C_{12}H_{25}$ | | K 90 | A 83 I |
| 5362 | $C_8H_{17}—O—$ | $—C_8H_{17}$ | | K 65 | C 64 A 79 I |
| 5367 | $C_{12}H_{25}—O—$ | $—O—CH_2—CHMe—C_2H_5$ | S | K 63 | A 45 I |
| 5369 | $C_8H_{17}—O—$ | $—COO—CH_2—CHMe—C_2H_5$ | S | K 41 | S 52 A 60 I |
| 5370 | $C_{12}H_{25}—O—$ | $—COO—CH_2—CHMe—C_2H_5$ | S | K 42 | A 60 I |
| 5371 | $C_8H_{17}—O—$ | $—O—C_3H_6—CHMe—C_2H_5$ | S | K 42 | C* 61 A 66 I |
| 5372 | $C_{12}H_{25}—O—$ | $—O—C_3H_6—CHMe—C_2H_5$ | S | K 50 | C* 63 A 72 I |
| 5374 | $C_2H_5—CHMe—CH_2—O—$ | $—O—C_{12}H_{25}$ | S | K 56 | A 46 I |
| 5376 | $C_2H_5—CHMe—CH_2—OOC—$ | $—O—C_{12}H_{25}$ | S | K 58 | C* 45 A 49 I |
| 5377 | $C_2H_5—CHMe—C_3H_6—OOC—$ | $—O—C_{12}H_{25}$ | 1 | K ? | A <? I |
| 5378 | $C_3H_7—CHMe—C_4H_8—O—$ | $—C_8H_{17}$ | 2 | K 48 | C 56.5 I |
| 5379 | $C_2H_5—CHMe—C_5H_{10}—O—$ | $—C_8H_{17}$ | 2 | K 49 | C 62 I |
| 5381 | $C_3H_{11}—CH{=}CH—CH_2—O—$ | $—C_8H_{17}$ | | K 48 | C 77 I |

TABLE 119

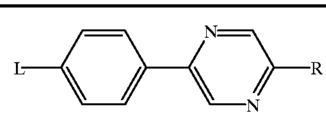

| LCReg | L | R | * | Phases |
|---|---|---|---|---|
| 5338 | NC— | $—O—C_8H_{17}$ | | Cr 68.0 A 79.0 N 86.0 |
| 67002 | NC— | $—O—C_9H_{19}$ | | Cr ? A ? |
| 5339 | NC— | $—O—C_{10}H_{21}$ | | Cr 84.0 A 95.0 |
| 67003 | NC— | $—O—C_{11}H_{23}$ | | Cr ? A ? |
| 5340 | NC— | $—O—C_{12}H_{25}$ | | Cr 83.0 A 92.0 |
| 66994 | $C_4H_9—O—$ | —CN | | Cr ? N ? |
| 5354 | $C_5H_{11}—O—$ | —CN | | Cr 71.0 N 91.0 |
| 66995 | $C_6H_{13}—O—$ | —CN | | Cr ? A ? N ? |
| 66996 | $C_7H_{15}—O—$ | —CN | | Cr ? A ? |
| 66997 | $C_9H_{19}—O—$ | —CN | | Cr ? A ? |
| 66998 | $C_{11}H_{23}—O—$ | —CN | | Cr ? A ? |
| 67020 | $C_{10}H_{21}—$ | $—O—C_8H_{17}$ | | Cr 40.0 A 56.0 |
| 62760 | $C_{12}H_{25}—O—$ | $—O—C_4H_9$ | | Cr 48.0 S 43.0 |
| 67019 | $C_8H_{17}—O—$ | $—O—C_8H_{17}$ | | Cr 41.0 C 71.0 A 82.0 |
| 67018 | $C_{10}H_{21}—O—$ | $—COO—CH_2—CHMe—C_2H_5$ | S | Cr 45.0 A 74.0 |

TABLE 120

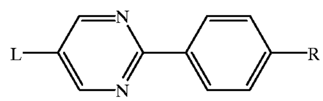

| LCReg | L | R | * | Phases |
|---|---|---|---|---|
| 3622 | $C_7H_{15}$—O— | —O—$C_2H_4$—CHF—$C_5H_{11}$ | R | Cr 64.9 C* 75.1 N* 89.7 |
| 3623 | $C_{12}H_{25}$—O— | —O—$C_2H_4$—CHF—$C_5H_{11}$ | R | Cr 74.2 C* 97.7 |
| 3624 | $C_8H_{17}$—O— | —O—$C_2H_4$—CHF—$C_8H_{17}$ | R | Cr 74.5 C* 88.5 N* 91.8 |
| 3570 | $C_8H_{17}$— | —O—$C_2H_4$—CHCl—$C_3H_5$ | 1 | (13.0) Cr 15.0 A 42.6 |
| 3816 | $C_8H_{17}$—O— | —O—$CH_2$—CHF—CHF—$C_3H_7$ | R | (90.0) Cr 92.0 B 99.0 |
| 3755 | $C_3H_7$— | —$C_2H_4$—$C_6F_{13}$ | | Cr 69.0 X 137.0 |
| 62107 | $C_7H_{15}$— | —$C_2H_4$—$C_6F_{13}$ | | Cr 72.0 C 81.0 A 124.0 |
| 3756 | $C_3H_7$— | —CH═CH—$C_6F_{13}$ | | Cr 105.0 X 140.0 |
| 3757 | $C_7H_{15}$— | —CH═CH—$C_6F_{13}$ | | Cr 77.0 X 113.0 |
| 61308 | $C_8H_{17}$— | —OOC—CH═CH—$CH_3$ | | Cr 65.0 N 80.0 |
| 61316 | $C_9H_{19}$— | —OOC—CH═CH—$CH_3$ | | Cr 80.0 N 89.0 |
| 61302 | $C_7H_{15}$— | —OOC—CH═CH—$C_3H_7$ | | Cr 70.0 N 82.0 |
| 61310 | $C_8H_{17}$— | —OOC—CH═CH—$C_3H_7$ | | Cr 70.0 N 76.0 |
| 61318 | $C_9H_{19}$— | —OOC—CH═CH—$C_3H_7$ | | Cr 68.0 N 81.0 |
| 61303 | $C_7H_{15}$— | —OOC—CH═CH—$C_4H_9$ | | Cr 48.0 N 72.0 |

TABLE 121

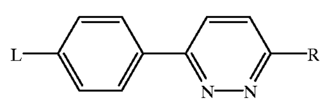

| LCReg | L | R | * | Phases |
|---|---|---|---|---|
| 5437 | $C_5H_{11}$—O— | —O—$C_{10}H_{21}$ | | Cr 97.0 C 100.0 |
| 5439 | $C_6H_{13}$—O— | —O—$C_4H_9$ | | Cr 102.0 C 108.0 |
| 5440 | $C_6H_{13}$—O— | —O—$C_5H_{11}$ | | Cr 91.0 C 104.0 |
| 5441 | $C_6H_{13}$—O— | —O—$C_6H_{13}$ | | Cr 87.0 C 106.0 |
| 5442 | $C_6H_{13}$—O— | —O—$C_7H_{15}$ | | Cr 88.0 C 105.0 |
| 5443 | $C_6H_{13}$—O— | —O—$C_8H_{17}$ | | Cr 84.0 C 105.5 |
| 5444 | $C_6H_{13}$—O— | —O—$C_9H_{19}$ | | Cr 91.5 C 105.0 |
| 5445 | $C_6H_{13}$—O— | —O—$C_{10}H_{21}$ | | Cr 90.5 C 104.5 |
| 5446 | $C_8H_{17}$—O— | —O—$C_4H_9$ | | Cr 100.0 S 111.0 |
| 5447 | $C_8H_{17}$—O— | —O—$C_6H_{13}$ | | Cr 91.0 S 108.0 |
| 5448 | $C_8H_{17}$—O— | —O—$C_{10}H_{21}$ | | Cr 89.0 S 11.0 |
| 5460 | $C_4H_9$—O—CHMe—COO— | —$C_8H_{17}$ | 1 | (50.0) Cr 68.0 S 79.0 |
| 5467 | $C_8H_{17}$—O— | —O—CHMe—$C_6H11_3$ | R | Cr 74.0 S 82.0 |
| 5493 | $C_2H_5$—CHMe—$CH_2$—O—$C_2H_4$—O— | —$C_8H_{17}$ | S | (42.0) Cr 54.0 C* 69.0 |
| 5495 | $C_2H_5$—CHMe—$CH_2$—O—$C_4H_8$—O— | —$C_6H_{13}$ | S | (63.0) Cr 77.5 C* 82.7 |

TABLE 122

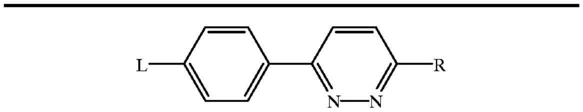

| LCReg | L | R | Phases |
|---|---|---|---|
| 5375 | Cl— | —O—$C_5H_{11}$ | Cr 111.0 A 124.0 |
| 5376 | Cl— | —O—$C_6H_{13}$ | Cr 100.0 A 122.0 |
| 63684 | Br— | —$C_6H_{13}$ | CrX 56.3 CrX 67.5 Cr 99.5 A 126.0 |
| 5377 | Br— | —O—$C_5H_{11}$ | Cr 113.5 A 132.5 |
| 5378 | Br— | —O—$C_6H_{13}$ | Cr 103.0 A 131.5 |
| 5397 | Br— | —Cl | Cr 136.0 A 148.0 |
| 5398 | $C_5H_{11}$—O— | —Cl | Cr 127.0 A 148.5 |
| 5399 | $C_6H_{13}$ | —Cl | Cr 126.0 A 150.0 |

TABLE 122-continued

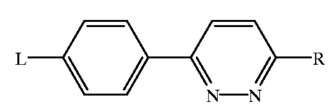

| LCReg | L | R | Phases |
|---|---|---|---|
| 5401 | $C_8H_{17}$ | —Br | Cr 146.5 A 153.0 |
| 5431 | $C_6H_{13}$ | —O—$C_4H_9$ | Cr 102.5 C 104.0 |
| 5432 | $C_5H_{11}$—O— | —O—$C_5H_{11}$ | Cr 93.5 C 100.5 |
| 5433 | $C_5H_{11}$—O— | —O—$C_6H_{13}$ | Cr 86.5 C 101.5 |
| 5434 | $C_5H_{11}$—O— | —O—$C_7H_{15}$ | Cr 93.0 C 100.0 |
| 5435 | $C_5H_{11}$—O— | —O—$C_8H_{17}$ | Cr 88.5 C 101.0 |
| 5436 | $C_5H_{11}$—O— | —O—$C_9H_{19}$ | Cr 98.5 C 101.0 |

TABLE 123

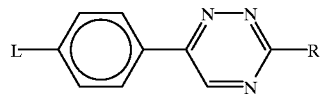

| No | L | R | Cr | LC |
|---|---|---|---|---|
| 5543 | $C_4H_9$— | —$C_6H_{13}$ | K 57.5 | A 56.5 I |
| 5544 | $C_6H_{13}$— | —$C_4H_9$ | K 45 | A 61.5 I |
| 5545 | $C_6H_{13}$— | —$C_5H_{11}$ | K 31 | A 68 I |
| 5546 | $C_6H_{13}$— | —$C_6H_{13}$ | K 44 | A 68 I |
| 5547 | $C_6H_{13}$— | —$C_7H_{15}$ | K 43 | A 69.5 I |
| 5548 | $C_7H_{15}$— | —$C_7H_{15}$ | K 41 | A 72 I |
| 5549 | $C_8H_{17}$— | —$C_4H_9$ | K 38.5 | A 64.5 I |
| 5550 | $C_8H_{17}$— | —$C_5H_{11}$ | K 37 | B 46 A 71 I |
| 5551 | $C_8H_{17}$— | —$C_6H_{13}$ | K 44 | B 49 A 72 I |
| 5552 | $C_8H_{17}$— | —$C_7H_{15}$ | K 50 | B 51.5 A 73.5 I |

TABLE 123-continued

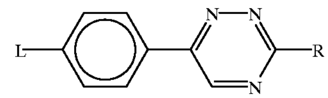

| No | L | R | Cr | LC |
|---|---|---|---|---|
| 5553 | $C_9H_{19}$— | —$C_4H_9$ | K 37 | A 63.5 I |
| 5554 | $C_9H_{19}$— | —$C_5H_{11}$ | K 42 | A 78 I |
| 5555 | $C_9H_{19}$— | —$C_6H_{13}$ | K 34 | A 73 1 |
| 5556 | $C_9H_{19}$— | —$C_7H_{15}$ | K 44 | A 73 I |
| 5560 | $C_5H_{11}$—O— | —$C_4H_9$ | K 55 | A 101 I |
| 5561 | $C_5H_{11}$—O— | —$C_6H_{13}$ | K 58 | A 103 I |
| 5562 | $C_6H_{13}$—O— | —$CH_3$ | K 99 | A 101 I |
| 5563 | $C_6H_{13}$—O— | —$C_4H_9$ | K 57 | A 100 I |
| 5564 | $C_6H_{13}$—O— | —$C_6H_{13}$ | K 55 | A 103 I |

TABLE 124

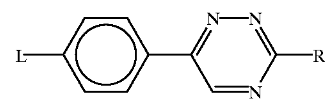

| No | L | R | | Cr | LC |
|---|---|---|---|---|---|
| 5567 | $C_2H_5$—CHMe—$CH_2$—O— | —$C_8H_{17}$ | S | K 57.8 | A 53.9 I |
| 5568 | $C_2H_5$—CHMe—$C_3H_6$—O— | —$C_4H_9$ | S | K 42.5 | C* 66.2 A 77.3 I |
| 5569 | $C_2H_5$—CHMe—$C_3H_6$—O— | —$C_5H_{11}$ | S | K 50.5 | C* 76.5 A 82 I |
| 5570 | $C_2H_5$—CHMe—$C_3H_6$—O— | —$C_6H_{13}$ | S | K 49 | C* 75.1 A 80.1 I |
| 5571 | $C_2H_5$—CHMe—$C_3H_6$—O— | —$C_7H_{15}$ | S | K 55 | C* 77.1 A 82 I |
| 5572 | $C_2H_5$—CHMe—$C_3H_6$—O— | —$C_8H_{17}$ | S | K 48 | C* 72.1 A 76.9 I |
| 5573 | $C_2H_5$—CHMe—$C_4H_8$—O— | —$C_6H_{13}$ | S | K 34.5 | C* 70.7 A 78.1 I |
| 5574 | $C_2H_5$—CHMe—$C_4H_8$—O— | —$C_8H_{17}$ | S | K 52.5 | C* 70 A 73 I |
| 5575 | $C_2H_5$—CHMe—$C_4H_8$—COO— | —$C_8H_{17}$ | S | K 68 | C* 79.6 A 80.8 I |
| 5576 | $C_2H_5$—CHMe—$C_5H_{10}$—O— | —$C_2H_5$ | S | K 33 | A 85.4 I |
| 5577 | $C_2H_5$—CHMe—$C_5H_{10}$—O— | —$C_3H_7$ | S | K 34.5 | A 93.4 I |
| 5578 | $C_2H_5$—CHMe—$C_5H_{10}$—O— | —$C_4H_9$ | S | K 29.8 | C* 57.1 A 85 I |
| 5579 | $C_2H_5$—CHMe—$C_5H_{10}$—O— | —$C_5H_{11}$ | S | K 44 | C* 76.5 A 89.5 I |
| 5580 | $C_2H_5$—CHMe—$C_5H_{10}$—O— | —$C_6H_{13}$ | S | K 37 | C* 79.3 A 85.7 I |
| 5581 | $C_2H_5$—CHMe—$C_5H_{10}$—O— | —$C_7H_{15}$ | S | K 50.5 | C* 88.9 A 88.8 I |
| 5582 | $C_2H_5$—CHMe—$C_5H_{10}$—O— | —$C_8H_{17}$ | S | K 44.5 | C* 81.2 A 84.6 I |
| 5583 | $C_2H_5$—CHMe—$C_5H_{10}$—O— | —$C_9H_{19}$ | S | K 59.5 | C* 86 I |
| 5584 | $C_2H_5$—CHMe—$C_5H_{10}$—O— | —$C_{10}H_{21}$ | S | K 51.5 | C* 81.2 I |

TABLE 125

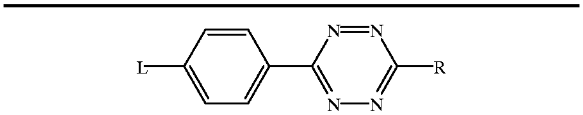

| LCReg | L | R | Phases |
|---|---|---|---|
| 65205 | $C_7H_{15}$— | —Br | (37.0) Cr 50.2 A 76.8 |
| 65212 | $C_4H_9$—O— | —Br | (98.0) Cr 108.9 A 137.8 |
| 65206 | $C_7H_{15}$— | —CN | (31.0) Cr 55.6 A 102.3 |
| 65213 | $C_4H_9$—O— | —CN | (104.0) Cr 107.7 A 150.6 |
| 5591 | $C_6H_{13}$— | —O—$C_6H_{13}$ | Cr 37.0 S 37.5 N 47.5 |
| 65209 | $C_7H_{15}$— | —O—$C_4H_9$ | (29.0) Cr 41.0 N 44.3 |
| 5598 | $C_4H_9$—O— | —$C_5H_{11}$ | Cr 55.0 N 59.0 |

TABLE 126

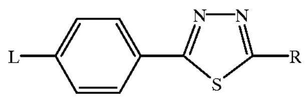

| L | R | | Cr | LC |
|---|---|---|---|---|
| $C_5H_{11}$—O— | —$C_7H_{15}$ | | K 78 | A 73 I |
| $C_6H_{13}$—O— | —$C_6H_{13}$ | | K 79 | A 74 I |
| $C_6H_{13}$—O— | —$C_7H_{15}$ | | K 83 | A 82 I |
| $C_7H_{15}$—O— | —$C_5H_{11}$ | | K 72 | C 74 A 79 I |
| $C_7H_{15}$—O— | —$C_6H_{13}$ | | K 74 | C 81 I |
| $C_7H_{15}$—O— | —$C_7H_{15}$ | | K 79 | C 89 I |
| $C_7H_{15}$—O— | —$C_8H_{17}$ | | K 70 | C 85 I |
| $C_7H_{15}$—O— | —$C_9H_{19}$ | | K 77 | C 89 I |
| $C_7H_{15}$—O— | —$C_{10}H_{21}$ | | K 75 | C 86 I |
| $C_8H_{17}$—O— | —$C_5H_{11}$ | | K 73 | C 69 A 81 I |
| $C_8H_{17}$—O— | —$C_6H_{13}$ | | K 73 | C 80 A 83 I |
| $C_8H_{17}$—O— | —$C_7H_{15}$ | | K 80 | C 87 I |
| $C_8H_{17}$—O— | —$C_8H_{17}$ | | K 80 | C 90 I |
| $C_8H_{17}$—O— | —$C_9H_{19}$ | | K 77 | C 90 I |
| $C_8H_{17}$—O— | —$C_{10}H_{21}$ | | K 78 | G 70 C 90 I |
| $C_9H_{19}$—O— | —$C_5H_{11}$ | | K 69 | G 53 C 66 A 82 I |
| $C_9H_{19}$—O— | —$C_6H_{13}$ | | K 62 | G 61 C 81 A 83 I |
| $C_9H_{19}$—O— | —$C_7H_{15}$ | | K 72 | C 87 I |
| $C_9H_{19}$—O— | —$C_9H_{19}$ | | K 76 | C 90 I |
| $C_{10}H_{21}$—O— | —$C_5H_{11}$ | | K 73 | F 55 C 57 A 84 I |
| $C_{10}H_{21}$—O— | —$C_6H_{13}$ | | K 50.6 | S 65.4 C 81.1 A 85.4 I |
| $C_{10}H_{21}$—O— | —$C_7H_{15}$ | | K 70 | C 89 I |
| $C_{10}H_{21}$—O— | —$C_9H_{19}$ | | K 79 | C 92 I |
| $C_4H_9$—CHMe—$C_4H_8$—O— | —$C_7H_{15}$ | | K 49 | C 33 I |
| $C_4H_9$—CHMe—$C_6H_{12}$—O— | —$C_7H_{15}$ | | K 54 | C 55 I |
| $C_7H_{15}$—COO— | —$C_7H_{15}$ | | K 79 | B 77 A 73 I |
| $C_8H_{17}$—COO— | —$C_9H_{19}$ | | K 85 | C 84.5 I |
| $C_{11}H_{23}$—COO— | —$C_{11}H_{23}$ | | K 88 | B 85 I |
| $C_8H_{17}$—O— | —CHMe—$C_2H_5$ | 1 | K 52 | A 19 I |
| $C_7H_{15}$— | —$C_4H_8$—CHMe—$C_2H_5$ | S | K 2.6 | C* 27.5 A 34 I |

TABLE 127

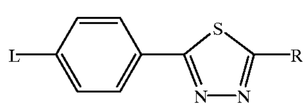

| LCReg | L | R | * | Phases |
|---|---|---|---|---|
| 62825 | $C_9H_{19}$— | —$C_4H_8$—CHMe—$C_2H_5$ | S | Cr 34.2 S 22.5 C* 32 A 39.0 |
| 62811 | $C_2H_5$—CHMe—$C_3H_6$—O— | —$C_7H_{15}$ | S | Cr 65.5 C* 67.4 |
| 62812 | $C_2H_5$—CHMe—$C_3H_6$—O— | —$C_8H_{17}$ | S | Cr 59.0 C* 66.6 |
| 62813 | $C_2H_5$—CHMe—$C_3H_6$—O— | —$C_9H_{19}$ | S | Cr 58.5 C* 69.0 |
| 62814 | $C_2H_5$—CHMe—$C_3H_6$—O— | —$C_{10}H_{21}$ | S | Cr 58.0 C* 68.8 |
| 62819 | $C_2H_5$—CHMe—$C_4H_8$—O— | —$C_8H_{17}$ | S | Cr 47.5 C* 63.6 |
| 62816 | $C_2H_5$—CHMe—$C_5H_{10}$—O— | —$C_7H_{15}$ | S | Cr 70.0 C* 75.0 |
| 62815 | $C_2H_5$—CHMe—$C_5H_{10}$—O— | —$C_8H_{17}$ | S | Cr 61.8 C* 75.5 |
| 62817 | $C_2H_5$—CHMe—$C_5H_{10}$—O— | —$C_9H_{19}$ | S | Cr 59.0 S 57.0 C* 78.3 |
| 62818 | $C_2H_5$—CHMe—$C_5H_{10}$—O— | —$C_{10}H_{21}$ | S | Cr 55.0 S 54.4 C* 77.5 |

TABLE 128

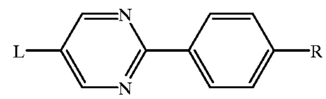

| LCReg | L | R | Phases |
|---|---|---|---|
| 3521 | $C_8H_{17}$—O— | —O—$C_2H_4$—CHMe—$C_2H_5$ | Cr 52.4 C* 73.1 A 76.5 |
| 3522 | $C_{11}H_{23}$—O— | —O—$C_2H_4$—CHMe—$C_2H_5$ | (32.0) Cr 48.5 C* 78.0 |
| 3525 | $C_{14}H_{29}$— | —OOC—$C_2H_4$—CHMe—$C_2H_5$ | (14.0) Cr ? S 23.0 S 41.2 C* 53.1 |
| 3528 | $C_7H_{15}$— | —O—$C_3H_6$—CHMe—$C_2H_5$ | (13.0) Cr 28.5 C* 53.5 A 60.0 |
| 3602 | $C_{12}H_{25}$— | —O—$CH_2$—CHF—$C_7H_{15}$ | Cr 62.0 C* 74.0 |
| 3604 | $C_{10}H_{21}$— | —O—$CH_2$—CHF—$C_8H_{17}$ | Cr 69.0 C* 73.0 |
| 3607 | $C_{11}H_{23}$—O— | —O—$CH_2$—CHF—$C_6H_{13}$ | (54.0) Cr 69.0 C* 99.0 |
| 68303 | $C_5H_{11}$—CHF—$CH_2$—O— | —O—$CH_2$—CHF—$C_5H_{11}$ | (63.0) Cr 73.0 S 76.0 C* 79.0 A 86.0 |
| 60051 | $C_6H_{13}$—CHF—$C_2H_4$— | —O—$CH_2$—CHF—$C_6H_{13}$ | Cr 72.0 A 78.0 |
| 3611 | $H_2C$═CH—$C_9H_{18}$—O— | —O—$CH_2$—CHF—$C_6H_{13}$ | (31.0) Cr 52.0 C* 83.0 A 93.0 |
| 60045 | $C_8H_{17}$— | —$C_2H_4$—CHF—$C_8H_{17}$ | Cr 37.0 A 47.0 |
| 60046 | $C_8H_{17}$—O— | —$C_2H_4$—CHF—$C_6H_{13}$ | Cr 35.0 A 82.0 |
| 3618 | $C_{10}H_{21}$— | —O—$C_2H_4$—CHF—$C_7H_{15}$ | Cr 56.0 C* 60.0 A 70.0 |
| 3620 | $C_8H_{17}$—O— | —O—$C_2H_4$—CHF—C4$H_7$ | Cr 57.4 C* 83.7 N* 93.1 |
| 3621 | $C_{10}H_{21}$—O — | —O—$C_2H_4$—CHF—$C_4H_9$ | Cr 69.5 C* 94.2 |

TABLE 129

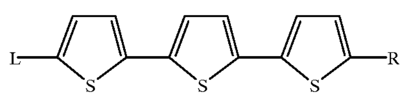

| No | L | R | Cr | LC |
|---|---|---|---|---|
| 29065 | $C_3H_7$— | —$C_3H_7$ | K 50 | S 74 I |
| 29966 | $C_4H_9$— | —$C_4H_9$ | K 50 | S 75 I |
| 29067 | $C_5H_{11}$— | —$C_5H_{11}$ | K 53 | S 77 I |
| 29088 | $C_6H_{13}$— | —$C_6H_{13}$ | K 51 | S 82 I |
| 29089 | $C_7H_{15}$— | —$C_7H_{15}$ | K 55 | G 78 F 83 C 89 I |
| 29070 | $C_8H_{17}$— | —$C_8H_{17}$ | K 65 | G 72 F 87 C 91 I |
| 29071 | $C_9H_{19}$— | —$C_9H_{19}$ | K 64 | G 62 F 91 C 95 I |
| 29072 | $C_{10}H_{21}$— | —$C_{10}H_{21}$ | K 71 | F 95 C 96 I |

TABLE 129-continued

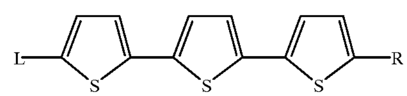

| No | L | R | Cr | LC |
|---|---|---|---|---|
| 29074 | $C_4H_9$— | —CO—$C_3H_7$ | K 148.3 | A 155.7 I |
| 29075 | $C_5H_{11}$— | —CO—$C_4H_9$ | K 137.2 | A 163 I |
| 29076 | $C_6H_{13}$— | —CO—$C_5H_{11}$ | K 138.4 | A 162 I |
| 29077 | $C_7H_{15}$— | —CO—$C_6H_{13}$ | K 132 | C 138.9 A 161.8 I |
| 29078 | $C_8H_{17}$— | —CO—$C_7H_{15}$ | K 133 | C 151 A 159.7 I |
| 29079 | $C_9H_{19}$— | —CO—$C_8H_{17}$ | K 129.4 | C 154.2 A 158.7 I |
| 29080 | $C_{10}H_{21}$— | —CO—$C_9H_{19}$ | K 127 | C 152 I |

TABLE 130

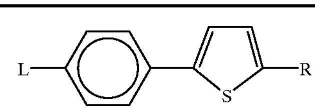

| No. | L | R | Cr | LC |
|---|---|---|---|---|
| 5713 | Br— | —CO—$C_7H_{15}$ | K 116.1 | A 123.8 I |
| 5719 | NC— | —$C_8H_{17}$ | K 49.9 | A 20.8 N 22.2 I |
| 5723 | NC— | —S—$C_4H_9$ | K 32.6 | N-52 E |
| 5727 | $C_4H_9$—S1$Me_2$—$C_3H_6$—O — | —$C_{10}H_{21}$ | K 57 | S 43 I |
| 5730 | $C_4H_9$—S— | —CN | K 55.7 | N 5 E |
| 5732 | $C_2H_5$—O— | —CO—$C_7H_{15}$ | K 120.8 | A 123.1 I |
| 5733 | $C_3H_7$—O— | —CO—$C_7H_{15}$ | K 124.4 | A 122.8 I |
| 5734 | $C_4H_9$—O— | —CO—$C_7H_{15}$ | K 127.6 | A 130.9 I |
| 5735 | $C_5H_{11}$—O— | —CO—$C_7H_{15}$ | K 120.5 | A 127.4 I |
| 5736 | $C_6H_{13}$—O— | —CO—$C_7H_{15}$ | K 120 | A 129.8 I |
| 5737 | $C_7H_{15}$—O— | —CO—$C_7H_{15}$ | K 113 | A 127.4 I |
| 5738 | $C_8H_{17}$—O— | —CO—$C_7H_{15}$ | K 109.5 | A 126.2 I |
| 5739 | $C_9H_{19}$—O— | —CO—$C_7H_{15}$ | K 107.5 | A 123.8 I |
| 5740 | $C_{12}H_{25}$—O— | —CO—$C_7H_{15}$ | K 100.6 | S 93.8 A 122.2 I |

TABLE 131

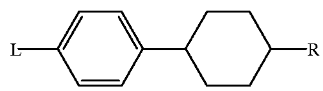

| L | R | | Cr | LC |
|---|---|---|---|---|
| $C_6H_{13}$—O— | —CH═CH—$CH_2$—O—$CH_3$ | | K 16 | B 30 N 38 I |
| $C_7H_{15}$—O— | —CH═CH—$CH_2$—O—$CH_3$ | | K 14 | B 38 S 54 I |
| $CH_3$—CO— | —$C_3H_7$ | | K 45 | S 54 I |
| $C_4H_9$—CO— | —$C_5H_{11}$ | | K 60.7 | B 52.5 N 58 I |
| $C_4H_9$—CO— | —$C_7H_{15}$ | | K 56.5 | A 50.5 N 64.3 I |
| $C_6H_{13}$—CO— | —$C_7H_{15}$ | | K 70 | B 71.5 I |
| $C_8H_{17}$—CO— | —$C_7H_{15}$ | | K 70.2 | E 43 B 80.1 I |
| $C_3H_7$—$CF_2$—CO— | —$C_5H_{11}$ | | K 20 | B 33 N 53.9 I |
| $CH_3$—NH—CH % CH—CO— | —$C_6H_{13}$ | | K 107.8 | A 114.3 N153 I |
| $C_2H_5$—NH—CH % CH—CO— | —$C_6H_{13}$ | | K 88.4 | A 76.8 N 120 I |
| $C_6H_{13}$—NH—CH % CH—CO— | —$C_6H_{13}$ | | K 61 | C 35 N 104.2 I |
| $C_7H_{15}$—NH—CH % CH—CO— | —$C_6H_{13}$ | | K 55.2 | H 40 C 88.9 N 107.8 I |
| $C_8H_{17}$—NH—CH % CH—CO— | —$C_6H_{13}$ | | K 50.8 | H 57.8 C 80.3 N 104 I |
| $C_9H_{19}$—NH—CH % CH—CO— | —$C_6H_{13}$ | | K 54 | H 74.6 C 94.1 N 107.3 I |
| $C_{10}H_{21}$—NH—CH % CH—CO— | —$C_6H_{13}$ | | K 61.3 | H 83.3 C 100.1 N 105.2 I |
| $C_{11}H_{23}$—NH—CH % CH—CO— | —$C_6H_{13}$ | | K 66.7 | H 94.3 C 106.6 N 109.3 I |
| $C_{12}H_{25}$—NH—CH % CH—CO— | —$C_6H_{13}$ | | K 64.1 | H 97.8 C 109 N 109.4 I |
| $C_{13}H_{27}$—NH—CH % CH—CO— | —$C_6H_{13}$ | | K 65 | N 103.2 C 111.4 I |
| $C_{14}H_{29}$—NH—CH % CH—CO— | —$C_6H_{13}$ | | K 55 | H 102.1 C 109.8 I |
| $C_{15}H_{31}$—NH—CH % CH—CO— | —$C_6H_{13}$ | | K 54.2 | H 106.1 C 110.6 I |
| $C_{16}H_{37}$—NH—CH % CH—CO— | —$C_6H_{13}$ | | K 54.1 | H 107.4 I |
| $C_4H_9$—OOC— | —$C_5H_{11}$ | | K 11 | A-4 N-3.2 I |
| $C_3H_7$—COO— | —$C_3H_7$ | | K 11 | B 26.1 N 30.3 I |
| $C_4H_9$—COO— | —$C_3H_7$ | | K 32.3 | B 42.7 I |
| $C_5H_{11}$—COO— | —$C_7H_{15}$ | | K 34.2 | B 64.5 I |
| $C_8H_{17}$—O— | —OOC—$CH_2$—CHMe<br>—$C_3H_8$—CHMe—$CH_3$ | S | K 53 | B 39 I |
| $C_{10}H_{21}$—O— | | S | K 42.5 | B 41 I |
| $C_5H_{11}$—COO— | | R | K 42 | B 59 I |
| $C_6H_{13}$—COO— | | R | K 52 | B 59 I |
| $C_7H_{15}$—COO— | | R | K 42 | B 64 I |

TABLE 132

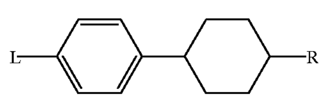

| LCReg | L | R | Phases |
|---|---|---|---|
| 3836 | NC— | —$C_4H_8$—O—H | Cr 79.1 N 89.6 |
| 3837 | NC— | —$C_5H_{10}$—O—H | Cr 91.1 N 103.9 |
| 3841 | NC— | —$C_4H_8$—CO—H | Cr 36.0 N 53.0 |
| 3855 | NC— | —$C_2H_4$—CH═$CF_2$ | Cr 11.6 N 27.9 |
| 3857 | NC— | —$C_4H_8$—CH═$CF_2$ | Cr 28.0 N 35.0 |
| 66223 | NC— | —CH═CH—CH═C(Me)2 | Cr 80.5 N 69.3 |
| 3878 | H—O—$C_2H_4$— | —$C_5H_{11}$ | Cr 29.0 S 59.2 S 73.4 |
| 3882 | H—NH—$CH_2$— | —$C_7H_{15}$ | Cr 15.0 B 20.0 A 26.0 |
| 3889 | H—O—$C_2H_4$—O— | —$C_3H_7$ | Cr 71.5 S 81.4 |
| 3891 | H—O—$C_3H_6$—O— | —$C_3H_7$ | Cr 65.8 S 77.8 |
| 60222 | H—O—$C_6H_{12}$—NH—CH % CH—CO— | —$C_{10}H_{21}$ | Cr 66.2 B 83.2 C 112.4 A 143.3 |
| 3918 | F—CH═CH— | —$C_3H_7$ | Cr 24.0 N 70.0 |
| 3931 | Cl—C:::C— | —$C_5H_{11}$ | Cr 66.0 N 70.0 |
| 3949 | NC— | —$C_3H_7$ | Cr 42.0 N 46.0 |
| 3951 | NC— | —$C_5H_{11}$ | Cr 31.0 N 55.0 |

TABLE 133

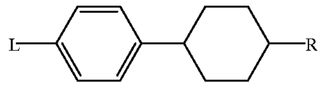

| LCReg | L | R | Phases |
|---|---|---|---|
| 3952 | NC— | —$C_6H_{13}$ | Cr 42.0 N 47.0 |
| 3953 | NC— | —$C_7H_{15}$ | Cr 30.0 N 59.0 |
| 3954 | NC— | —$C_8H_{17}$ | Cr 37.0 N 55.0 |
| 3955 | NC— | —$C_9H_{19}$ | Cr 44.0 N 59.0 |
| 3967 | NC— | —$C_3H_6$—O—$CH_3$ | Cr 53.0 N 56.0 |
| 3960 | NC— | —OOC—$C_4H_9$ | Cr 41.0 X 62.0 |
| 3975 | NC—CH═CH— | —$C_2H_5$ | Cr 49.0 N 116.0 |
| 3976 | NC—CH═CH— | —$C_3H_7$ | Cr 49.5 N 150.0 |
| 3978 | NC—CH═CH— | —$C_5H_{11}$ | Cr 49.0 A 61.0 N 149.5 |
| 3979 | NC—CH═CH— | —$C_6H_{13}$ | Cr 54.0 A 106.0 N 144.0 |
| 3980 | NC—CH═CH— | —$C_7H_{15}$ | Cr 39.0 A 120.0 N 143.5 |
| 3981 | NC—CH═CH— | —$C_8H_{17}$ | Cr 48.0 A 128.0 N 137.5 |
| 3982 | NC—C:::C— | —$C_5H_{11}$ | Cr 49.7 N 128.9 |
| 3984 | NC—S— | —$C_3H_7$ | Cr ? N 45.6 |
| 3985 | NC—S— | —$C_4H_9$ | Cr ? N 33.1 |

TABLE 134

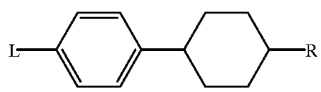

| LCReg | L | R | Phases |
|---|---|---|---|
| 3986 | NC—S— | —$C_5H_{11}$ | Cr ? N 50.6 |
| 3987 | NC—S— | —$C_6H_{13}$ | Cr ? N 42.9 |
| 3988 | NC—S— | —$C_7H_{15}$ | Cr ? N 52.3 |
| 3989 | NC—S— | —$C_8H_{17}$ | Cr ? N 47.2 |
| 3990 | NC—S— | —$C_9H_{19}$ | Cr ? N 52.5 |
| 3991 | NC—S— | —$C_{10}H_{21}$ | Cr ? N 50.4 |
| 62931 | NC— | —$C_4H_8$—$CF_2$—H | Cr 29.0 N 34.0 |
| 3996 | NC— | —CH═CH—$CH_3$ | Cr 66.3 N 73.0 |
| 3997 | NC— | —CH═CH—$C_2H_5$ | Cr 45.0 N 51.8 |
| 3998 | NC— | —CH═CH—$C_3H_7$ | Cr 15.6 N 58.5 |
| 3999 | NC— | —CH═CH—$C_4H_9$ | Cr 14.4 N 39.2 |
| 4000 | NC— | —CH═CH—$C_5H_{11}$ | Cr 17.9 N 49.2 |
| 66216 | NC— | —CH═CH—CH═$CH_2$ | Cr 94.5 N 117.0 |
| 66224 | NC— | —CH═CH—CH═CH—$CH_3$ | Cr 74.4 N 147.2 |
| 66222 | NC— | —$C_2H_4$—CH═CH—CH═$CH_2$ | Cr 68.0 N 96.5 |

TABLE 135

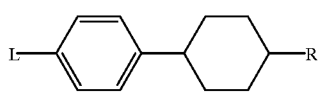

| LCReg | L | R | Phases |
|---|---|---|---|
| 4012 | NC— | —$C_2H_4$—CH═$CH_2$ | Cr 49.5 N 52.5 |
| 4013 | NC— | —$C_2H_4$—CH═CH—$CH_3$ | Cr 59.8 N 73.7 |
| 4014 | NC— | —$C_2H_4$—CH═CH—$C_2H_5$ | Cr 31.1 N 50.2 |
| 4015 | NC— | —$C_2H_4$—CH═CH—$C_3H_7$ | Cr 15.4 N 48.3 |
| 4018 | NC— | —$C_4H_8$—CH═$CH_2$ | Cr 45.5 N 52.5 |
| 4019 | NC— | —$C_5H_{10}$—CH═$CH_2$ | Cr 19.2 N 32.3 |
| 4020 | NC— | —$C_6H_{12}$—CH═$CH_2$ | Cr 38.0 N 53.2 |
| 4036 | SCN— | —$C_3H_7$ | Cr 38.5 N 41.5 |
| 4039 | SCN— | —$C_6H_{13}$ | Cr 13.0 N 42.8 |
| 4040 | SCN— | —$C_7H_{15}$ | Cr 37.0 N 52.0 |
| 4041 | SCN— | —$C_8H_{17}$ | Cr 28.0 N 48.0 |
| 4042 | SCN— | —$C_9H_{19}$ | Cr 38.5 N 54.0 |

TABLE 135-continued

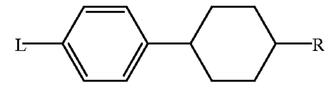

| LCReg | L | R | Phases |
|---|---|---|---|
| 4043 | SCN— | —$C_{10}H_{21}$ | Cr 42.0 N 50.0 |
| 4044 | SCN— | —$C_2H_4$—CH═$CH_2$ | Cr 25.0 N 43.1 |
| 4045 | SCN— | —$C_2H_4$—CH═CH—$C_2H_5$ | Cr 24.0 N 35.9 |

TABLE 136

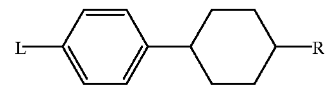

| LCReg | L | R | Phases |
|---|---|---|---|
| 4047 | SCN— | —$C_4H_8$—CH═$CH_2$ | Cr 15.2 N 46.1 |
| 4048 | SCN— | —$C_5H_{10}$—CH═$CH_2$ | Cr 1.6 N 19.0 |
| 4049 | SCN— | —$C_6H_{12}$—CH═$CH_2$ | Cr 24.6 N 45.5 |
| 4051 | $F_2C$═CH— | —$C_2H_5$ | Cr 0.0 N 13.0 |
| 4052 | $F_2C$═CH— | —$C_3H_7$ | Cr 7.0 N 48.0 |
| 4053 | $F_2C$═CH— | —$C_4H_9$ | Cr 20.0 N 47.0 |
| 4054 | $F_2C$═CH— | —$C_5H_{11}$ | Cr 10.0 N 60.0 |
| 4094 | $C_7H_{15}$— | —$C_5H_{11}$ | Cr 16.0 S 31.0 |
| 4096 | $C_5H_{11}$— | —O—$C_4H_9$ | Cr 32.0 X 45.0 |
| 4122 | $C_4H_9$—O— | —$C_5H_{11}$ | Cr 34.0 N 46.0 |
| 4123 | $C_4H_9$—O— | —$C_7H_{15}$ | Cr 46.0 X 50.0 |
| 4127 | $C_5H_{11}$—O— | —$C_5H_{11}$ | Cr 33.5 N 37.5 |
| 4128 | $C_5H_{11}$—O— | —$C_7H_{15}$ | Cr 34.0 X 46.0 |
| 4130 | $C_6H_{13}$—O— | —$C_3H_7$ | Cr 36.0 X 37.0 |
| 4131 | $C_6H_{13}$—O— | —$C_4H_9$ | Cr 28.0 X 34.0 |

TABLE 137

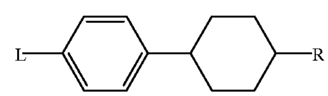

| LCReg | L | R | Phases |
|---|---|---|---|
| 4132 | $C_6H_{13}$—O— | —$C_5H_{11}$ | Cr 33.0 X 45.0 |
| 4133 | $C_6H_{13}$—O— | —$C_7H_{15}$ | Cr 38.0 X 52.0 |
| 4138 | $C_8H_{17}$—O— | —$C_7H_{15}$ | Cr 42.0 X 53.0 |
| 4139 | $C_9H_{19}$—O— | —$C_7H_{15}$ | Cr 44.0 X 52.0 |
| 4140 | $C_{10}H_{21}$—O— | —$C_4H_9$ | Cr 29.0 X 40.0 |
| 4144 | $C_2H_5$—O— | —$C_3H_6$—O—$CH_3$ | Cr 18.0 N 38.0 |
| 4146 | $C_2H_5$—O— | —CH═CH—$CH_2$—O—$CH_3$ | Cr 19.0 N 46.0 |
| 4148 | $C_4H_9$—O— | —CH═CH—$CH_2$—O—$CH_3$ | Cr 23.0 N 40.0 |
| 4149 | $C_5H_{11}$—O— | —CH═CH—$CH_2$—O—$CH_3$ | Cr 30.0 N 31.0 |
| 4141 | $C_4H_9$—O— | —O—$C_4H_9$ | Cr 42.0 X 51.0 |
| 4219 | $C_4H_9$—NH— | —$C_5H_{11}$ | Cr 35.1 N 40.4 |
| 4220 | $C_6H_{13}$—NH— | —$C_3H_7$ | Cr 28.7 N 31.6 |
| 4229 | $CH_3$—CO— | —$C_3H_7$ | Cr 45.0 S 54.0 |
| 4237 | $C_2H_5$—CO— | —$C_3H_7$ | (25.0) Cr 49.2 N 56.5 |
| 4238 | $C_2H_5$—CO— | —$C_5H_{11}$ | (40.0) Cr 56.6 N 68.8 |

TABLE 138

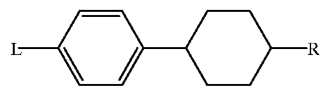

| LCReg | L | R | Phases |
|---|---|---|---|
| 4239 | $C_2H_5$—CO— | —$C_7H_{15}$ | (25.0) Cr 52.2 N 73.0 |
| 4248 | $CH_3$—$CF_2$—CO— | —$C_7H_{15}$ | Cr 28.0 N 43.6 |
| 4250 | $C_3H_7$—NH—CH % CH—CO— | —$C_2H_5$ | Cr 56.1 N 101.7 |
| 4251 | $C_4H_9$—NH—CH % CH—CO— | —$C_2H_5$ | Cr 59.0 N 78.6 |
| 4252 | $C_5H_{11}$—NH—CH % CH—CO— | —$C_2H_5$ | Cr 64.0 N 89.4 |
| 4253 | $C_6H_{13}$—NH—CH % CH—CO— | —$C_2H_5$ | Cr 67.9 N 80.7 |
| 4254 | $C_7H_{15}$—NH—CH % CH—CO— | —$C_2H_5$ | Cr 64.1 N 86.1 |
| 4257 | $CH_3$—CO—$CH_2$—CO— | —$C_5H_{11}$ | Cr 81.0 X 97.0 |
| 4258 | $CH_3$—CO—$CH_2$—CO— | —$C_7H_{15}$ | Cr 68.0 N 97.0 |
| 4259 | $C_2H_5$—CO—$CH_2$—CO— | —$C_3H_7$ | Cr 78.0 X 84.0 |
| 4260 | $C_2H_5$—CO—$CH_2$—CO— | —$C_5H_{11}$ | Cr 59.0 X 91.0 |
| 4261 | $C_3H_7$—CO—$CH_2$—CO— | —$C_3H_7$ | Cr 99.0 X 100.0 |
| 4263 | $C_2H_5$—OOC—$CH_2$—CO— | —$C_5H_{11}$ | Cr 30.0 X 43.0 |
| 4155 | $CH_3$—OOC— | —$C_7H_{15}$ | Cr 42.5 N 52.2 |
| 4160 | $C_3H_7$—OOC— | —$C_5H_{11}$ | Cr 2.1 X 19.8 |

TABLE 139

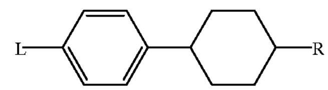

| LCReg | L | R | * | Phases |
|---|---|---|---|---|
| 4161 | $C_3H_7$—OOC— | —$C_7H_{15}$ | | Cr 13.8 X 33.0 |
| 4162 | $C_5H_{11}$—OOC— | —$C_3H_7$ | | Cr ? N 23.0 |
| 4163 | $C_5H_{11}$—OOC— | —$C_5H_{11}$ | | Cr 8.0 X 9.2 |
| 4164 | $C_5H_{11}$—OOC— | —$C_7H_{15}$ | | Cr 14.0 X 22.4 |
| 4172 | $C_3H_7$—COO— | —$C_4H_9$ | | Cr 27.0 X 36.0 |
| 4173 | $C_3H_7$—COO— | —$C_7H_{15}$ | | Cr 24.0 X 55.0 |
| 4176 | $C_4H_9$—COO— | —$C_5H_{11}$ | | Cr 22.0 X 53.0 |
| 4177 | $C_5H_{11}$—COO— | —$C_4H_9$ | | Cr 21.0 X 59.0 |
| 4270 | $CH_3$—OCOO— | —$C_3H_7$ | | Cr 50.0 X 69.0 |
| 4271 | $C_2H_5$—OCOO— | —$C_3H_7$ | | Cr 37.0 X 30.0 |
| 4273 | $C_4H_9$—OCOO— | —$C_5H_{11}$ | | Cr 27.0 X 45.0 |
| 61463 | $C_4H_9$—COO— | —OOC—CHF—$C_4H_9$ | R | Cr 25.0 B 51.0 |
| 61467 | $C_8H_{17}$—COO— | —OOC—CHF—$C_4H_9$ | R | Cr 41.0 B 67.0 |
| 61468 | $C_9H_{19}$—COO— | —OOC—CHF—$C_4H_9$ | R | Cr 45.0 B 68.0 |
| 61469 | $C_{10}H_{21}$—COO— | —OOC—CHF—$C_4H_9$ | R | Cr 52.0 B 71.0 |

TABLE 140

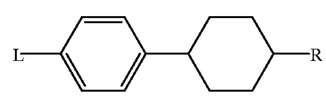

| LCReg | L | R | * | Phases |
|---|---|---|---|---|
| 61470 | $C_{11}H_{23}$—COO— | —OOC—CHF—$C_4H_9$ | R | Cr 50.0 B 72.0 |
| 4282 | $C_2H_5$—O— | —CH═CH—$C_3H_7$ | | Cr 32.0 N 56.5 |
| 63447 | $CH_3$—O— | —OOC—CH═CH—$CH_3$ | | Cr 74.0 N 89.0 |
| 63448 | $C_2H_5$—O— | —OOC—CH═CH—$CH_3$ | | Cr 78.0 N 110.0 |
| 63455 | $C_2H_5$—O— | —OOC—CH═CH—$C_3H_7$ | | Cr 53.0 N 86.0 |
| 63456 | $C_2H_5$—O— | —OOC—CH═CH—$C_4H_9$ | | Cr 46.0 N 68.0 |
| 63457 | $C_2H_5$—O— | —OOC—CH═CH—$C_5H_{11}$ | | Cr 55.0 N 72.0 |
| 63449 | $C_3H_7$—O— | —OOC—CH═CH—$CH_3$ | | Cr 65.0 N 87.0 |
| 63450 | $C_4H_9$—O— | —OOC—CH═CH—$CH_3$ | | Cr 71.0 N 92.0 |
| 63451 | $C_5H_{11}$—O— | —OOC—CH═CH—$CH_3$ | | Cr 75.0 N 79.0 |
| 63452 | $C_6H_{13}$—O— | —OOC—CH═CH—$CH_3$ | | Cr 67.0 N 80.0 |
| 63453 | $C_7H_{15}$—O— | —OOC—CH═CH—$CH_3$ | | Cr 61.0 N 74.0 |
| 4284 | $C_2H_5$—CO— | —CH═CH—$C_3H_7$ | | Cr 60.5 N 75.0 |
| 4287 | $C_2H_5$—O— | —$C_2H_4$—CH═CH—$CH_3$ | | Cr 49.4 N 61.8 |
| 4295 | $C_6H_{13}$—CHF—$CH_2$—O— | —$C_5H_{11}$ | S | Cr 52.0 B 54.4 |

TABLE 141

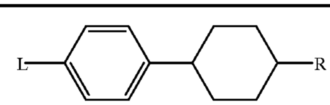

| LCReg | L | R | * | Phases |
|---|---|---|---|---|
| 4296 | $CH_3$—CH═CH— | —$C_2H_5$ | | Cr 34.0 N 51.0 |
| 4297 | $CH_3$—CH═CH— | —$C_3H_7$ | | Cr 37.0 N 85.0 |

TABLE 141-continued

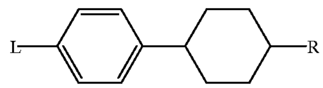

| LCReg | L | R | * | Phases |
|---|---|---|---|---|
| 4298 | $CH_3$—CH═CH— | —$C_4H_9$ | | Cr 34.0 N 78.0 |
| 4299 | $CH_3$—CH═CH— | —$C_5H_{11}$ | | Cr 27.0 N 92.0 |
| 61472 | $C_2H_5$—CH═CH—COO— | —OOC—CHF—$C_4H_9$ | R | Cr 76.0 B 78.0 |
| 61474 | $C_4H_9$—CH═CH—COO— | —OOC—CHF—$C_4H_9$ | R | Cr ? B 74.0 |
| 61475 | $C_5H_{11}$—CH═CH—COO— | —OOC—CHF—$C_4H_9$ | R | Cr 66.0 B 77.0 |
| 61476 | $C_6H_{13}$—CH═CH—COO— | —OOC—CHF—$C_4H_9$ | R | Cr 57.0 B 77.0 |
| 61477 | $C_7H_{15}$—CH═CH—COO— | —OOC—CHF—$C_4H_9$ | R | Cr 75.0 B 78.0 |
| 63440 | $CH_3$—CH═CH—COO— | —OOC—CH═CH—$CH_3$ | | Cr 117.0 N 185.0 |
| 63441 | $C_2H_5$—CH═CH—COO— | —OOC—CH═CH—$C_2H_5$ | | Cr 123.0 N 129.0 |
| 63442 | $C_3H_7$—CH═CH—COO— | —OOC—CH═CH—$C_3H_7$ | | Cr 136.0 N 135.0 |
| 63443 | $C_4H_9$—CH═CH—COO— | —OOC—CH═CH—$C_4H_9$ | | Cr 96.0 N 105.0 |
| 63444 | $C_5H_{11}$—CH═CH—COO— | —OOC—CH═CH—$C_5H_{11}$ | | Cr 105.0 N 113.0 |
| 63445 | $C_6H_{13}$—CH═CH—COO— | —OOC—CH═CH—$C_6H_{13}$ | | Cr 80.0 N 90.0 |

TABLE 142

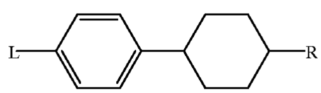

| LCReg | L | R | Phases |
|---|---|---|---|
| 63446 | $C_7H_{15}$—CH═CH—COO— | —OOC—CH═CH—$C_7H_{15}$ | Cr 98.0 N 100.0 |
| 4302 | $H_2C$═CH—$CH_2$—O— | —$C_5H_{11}$ | Cr 31.9 N 40.9 |
| 4303 | $CH_3$—CH═CH—$CH_2$—O— | —$C_3H_7$ | Cr 42.0 N 57.5 |
| 4304 | $CH_3$—CH═CH—$CH_2$—O— | —$C_5H_{11}$ | Cr 38.4 N 66.8 |
| 4307 | $CH_3$—CH═CH—$CH_2$—O— | —CH═CH—$CH_3$ | Cr 52.0 N 72.8 |
| 4353 | H—C:::C— | —$C_5H_{11}$ | Cr 39.4 N 42.1 |
| 4354 | H—C:::C— | —$C_7H_{15}$ | Cr 37.6 N 47.5 |
| 4355 | $CH_3$—C:::C— | —$C_3H_7$ | Cr 45.1 N 53.7 |
| 4356 | $CH_3$—C:::C— | —$C_5H_{11}$ | Cr 41.6 N 64.9 |
| 4357 | $CH_3$—C:::C— | —$C_7H_5$ | Cr 43.5 N 66.8 |
| 4358 | $C_2H_5$—C:::C— | —$C_5H_{11}$ | Cr 29.5 N 31.4 |
| 4360 | $C_3H_7$—C:::C— | —$C_5H_{11}$ | Cr 20.0 N 31.3 |
| 4361 | H—C:::C—COO—$CH_2$—CO— | —$C_3H_7$ | Cr 123.8 N 139.4 |
| 4362 | $CH_3$—C:::C— | —CH═CH—$CH_3$ | Cr 69.4 N 90.7 |
| 4363 | $CH_3$—C:::C— | —$C_2H_4$—CH═CH—$CH_3$ | Cr 48.6 N 82.5 |

TABLE 143

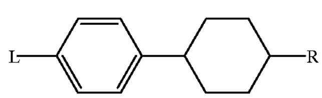

| LCReg | L | R | Phases |
|---|---|---|---|
| 4364 | $CH_3$—C:::C— | —$C_3H_6$—CH—$CH_2$ | Cr 13.9 N 31.2 |

TABLE 144

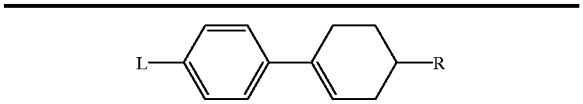

| LCReg | L | R | * | Phases |
|---|---|---|---|---|
| 5754 | NC— | —$C_3H_7$ | 2 | Cr 31.0 N 44.0 |
| 5755 | NC— | —$C_4H_9$ | 2 | Cr 32.5 N 41.5 |

TABLE 144-continued

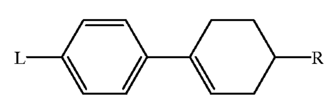

| LCReg | L | R | * | Phases |
|---|---|---|---|---|
| 5756 | NC— | —$C_5H_{11}$ | 2 | Cr 42.0 N 57.0 |
| 5757 | NC— | —$C_6H_{13}$ | 2 | Cr 46.0 N 53.0 |
| 5758 | NC— | —$C_7H_{15}$ | 2 | Cr 47.5 N 61.0 |
| 5759 | NC— | —$C_8H_{17}$ | 2 | Cr 32.5 A 46.0 N 60.0 |
| 5763 | $C_4H_9$—O— | —$C_3H_7$ | 2 | Cr 47.7 X 64.0 |
| 5764 | $C_4H_9$—O— | —$C_5H_{11}$ | 2 | Cr 36.4 X 76.4 |
| 5765 | $C_8H_{17}$—O— | —$C_5H_{11}$ | 2 | Cr 50.0 B 70.0 A 82.0 |

TABLE 145

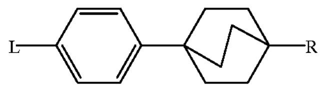

| LCReg | L | R | Phases |
|---|---|---|---|
| 5855 | NC— | —$C_3H_7$ | Cr 66.5 N 88.0 |
| 5856 | NC— | —$C_4H_9$ | Cr 75.5 N 85.0 |
| 5857 | NC— | —$C_5H_{11}$ | Cr 62.0 N 100.0 |
| 5858 | NC— | —$C_6H_{13}$ | Cr 72.0 N 86.0 |
| 5859 | NC— | —$C_7H_{15}$ | Cr 61.0 N 95.0 |
| 5860 | NC— | —$C_8H_{17}$ | Cr 52.0 N 90.0 |
| 5861 | NC— | —$C_9H_{19}$ | Cr 56.0 N 90.0 |
| 5868 | SCN— | —$C_5H_{11}$ | CrX 64.5 Cr 74.0 N 99.5 |
| 5869 | SCN— | —$C_6H_{13}$ | Cr 50.5 N 89.0 |
| 5870 | SCN— | —$C_7H_{15}$ | CrX 48.0 Cr 57.0 N 95.0 |
| 5871 | SCN— | —$C_8H_{17}$ | Cr 50.5 N 87.5 |
| 5883 | $CH_3$—O— | —$C_5H_{11}$ | Cr 64.0 N 70.0 |
| 5885 | $C_2H_5$—O— | —$C_5H_{11}$ | Cr 73.0 N 86.0 |
| 5888 | $C_4H_9$—O— | —$C_5H_{11}$ | Cr 65.0 N 77.0 |
| 5896 | $CH_3$—COO— | —$C_3H_7$ | Cr 75.5 N 80.0 |

TABLE 146

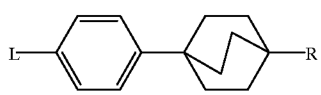

| LCReg | L | R | Phases |
|---|---|---|---|
| 5897 | $CH_3$—COO— | —$C_7H_{15}$ | Cr 76.0 N 87.5 |
| 5898 | $C_2H_5$—COO— | —$C_6H_{13}$ | Cr 46.0 N 50.0 |
| 5899 | $C_3H_7$—COO— | —$C_5H_{11}$ | Cr 31.0 N 78.0 |
| 5900 | $C_3H_7$—COO— | —$C_6H_{13}$ | CrX 54.0 Cr 58.0 N 71.0 |
| 5901 | $C_4H_9$—COO— | —$C_3H_7$ | Cr 43.0 N 69.0 |
| 5902 | $C_4H_9$—COO— | —$C_5H_{11}$ | Cr 36.0 S 25.0 S 66.0 N 81.0 |
| 5903 | $C_4H_9$—COO— | —$C_6H_{13}$ | Cr 32.0 S 74.0 N 76.0 |
| 5904 | $C_4H_9$—COO— | —$C_7H_{15}$ | Cr 29.0 S 74.0 N 84.0 |
| 5905 | $C_5H_{11}$—COO— | —$C_3H_7$ | Cr 63.0 N 73.0 |
| 5907 | $C_5H_{11}$—COO— | —$C_7H_{15}$ | Cr 39.0 S 84.0 N 87.0 |
| 5908 | $C_6H_{13}$—COO— | —$C_2H_5$ | Cr 45.6 N 49.6 |
| 5909 | $C_6H_{13}$—COO— | —$C_3H_7$ | CrX 53.8 Cr 57.5 N 70.8 |
| 5910 | $C_6H_{13}$—COO— | —$C_4H_9$ | CrX 32.0 Cr 74.0 N 76.0 |
| 5912 | $C_7H_{15}$—COO— | —$C_4H_9$ | CrX 28.8 Cr 74.2 N 84.3 |
| 5913 | $C_7H_{15}$—COO— | —$C_5H_{11}$ | Cr 49.0 S 85.0 |

TABLE 147

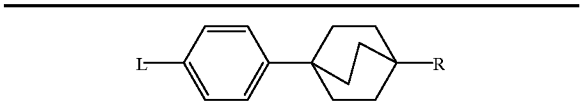

| LCReg | L | R | Phases |
|---|---|---|---|
| 5914 | $C_8H_{17}$—COO— | —$C_5H_{11}$ | Cr <20.0 S 84.0 |
| 5915 | $C_8H_{17}$—COO— | —$C_6H_{13}$ | Cr <20.0 S 79.0 |
| 5921 | H—$CF_2$—O— | —$C_7H_{15}$ | Cr 10.8 N 31.6 |

TABLE 148

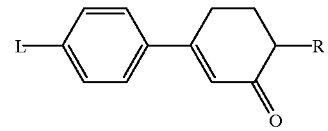

| LCReg | L | R | * | Phases |
|---|---|---|---|---|
| 65936 | $C_6H_{13}$— | —$C_3H_7$ | 2 | Cr 27.8 A 37.8 |
| 65937 | $C_6H_{13}$— | —$C_5H_{11}$ | 2 | Cr 24.3 A 64.5 |
| 65938 | $C_7H_{15}$— | —$C_5H_{11}$ | 2 | Cr 24.7 A 63.0 |
| 65939 | $C_7H_{15}$— | —$C_6H_{13}$ | 2 | Cr 48.2 A 65.4 |
| 65941 | $C_{10}H_{21}$— | —$C_5H_{11}$ | 2 | Cr 48.3 A 63.1 |
| 59593 | $C_4H_9$— | —OOC—$C_4H_9$ | 1 | Cr 79.0 A 81.0 |
| 59594 | $C_4H_9$— | —OOC—$C_6H_{13}$ | 1 | Cr 73.0 A 83.0 |
| 59595 | $C_4H_9$— | —OOC—$C_8H_{17}$ | 1 | Cr 76.0 A 84.0 |
| 68803 | $C_4H_9$— | —OOC—$C_4H_9$ | 2 | Cr 53.0 A 72.5 |
| 68804 | $C_4H_9$— | —OOC—$C_6H_{13}$ | 2 | Cr 66.5 A 84.2 |
| 68805 | $C_4H_9$— | —OOC—$C_8H_{17}$ | 2 | Cr 66.0 A 82.1 |
| 68074 | $C_2H_5$—O— | —$C_5H_{11}$ | 2 | Cr 70.0 A 86.0 |
| 61783 | $C_4H_9$—O— | —$C_3H_7$ | 2 | CrX 60.0 Cr 68.0 A 97.0 |
| 61784 | $C_4H_9$—O— | —$C_5H_{11}$ | 2 | Cr 41.0 A 111.0 |
| 61785 | $C_6H_{13}$—O— | —$C_3H_7$ | 2 | Cr 45.0 A 96.0 |

TABLE 149

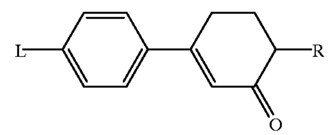

| LCReg | L | R | * | Phases |
|---|---|---|---|---|
| 61787 | $C_6H_{13}$—O— | —$C_5H_{11}$ | 2 | Cr 52.4 A 109.0 |
| 59596 | $C_9H_{19}$—O— | —OOC—$C_8H_{17}$ | 1 | Cr 74.0 A 120.0 |
| 61786 | $C_6H_{13}$—O— | —$CH_2$—CH═$CH_2$ | 2 | Cr 48.9 A 63.0 |

TABLE 150

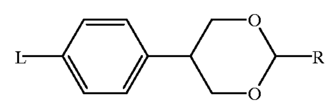

| LCReg | L | R | Phases |
|---|---|---|---|
| 4370 | $C_4H_9$—O— | —$C_6H_{13}$ | Cr 44.0 B 50.0 |
| 57405 | $C_6H_{13}$—O— | —$C_6H_{13}$ | Cr <20.0 B 64.0 |
| 4371 | $CH_3$—O— | —$C_8H_{16}$—CH═$CH_2$ | Cr 35.0 N 36.1 |

TABLE 151

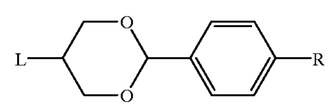

| LCReg | L | R | Phases |
|---|---|---|---|
| 4407 | $C_4H_9$— | —C:::C—CN | Cr 54.3 N 108.7 |
| 4408 | $C_5H_{11}$— | —C:::C—CN | Cr 60.3 N 111.0 |
| 4424 | $C_4H_9$— | —NCS | Cr 61.0 A 76.5 |
| 4425 | $C_5H_{11}$— | —NCS | Cr 60.0 A 79.0 |
| 4426 | $C_6H_{13}$— | —NCS | Cr 35.0 A 79.0 |
| 4427 | $C_7H_{15}$— | —NCS | Cr 52.0 A 82.5 |
| 4428 | $C_8H_{17}$— | —NCS | Cr 47.0 A 81.5 |
| 4429 | $C_9H_{19}$— | —NCS | Cr 57.0 A 81.0 |
| 4430 | $C_{10}H_{21}$— | —NCS | CrX 52.5 Cr 61.0 A 79.5 |

TABLE 151-continued

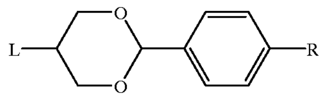

| LCReg | L | R | Phases |
| --- | --- | --- | --- |
| 4431 | $C_{12}H_{25}$— | —NCS | CrX 31.0 Cr 70.5 A 78.0 |
| 4437 | $C_6H_{13}$— | —$C_3H_7$ | Cr 35.0 B 44.0 |
| 4438 | $C_3H_7$— | —$C_4H_9$ | Cr ? B 26.0 |
| 4439 | $C_6H_{13}$— | —$C_4H_9$ | Cr 33.0 B 40.5 |
| 4440 | $C_8H_{17}$— | —$C_4H_9$ | Cr 43.0 B 63.0 |
| 4441 | $C_6H_{13}$— | —$C_6H_{13}$ | Cr 36.5 B 38.5 |

TABLE 152

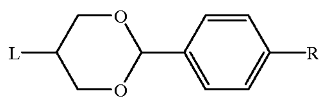

| LCReg | L | R | Phases |
| --- | --- | --- | --- |
| 4442 | $C_7H_{15}$— | —$C_6H_{13}$ | Cr 34.0 B 38.0 |
| 4443 | $C_8H_{17}$— | —$C_6H_{13}$ | Cr 38.0 B 60.0 |
| 4444 | $C_7H_{15}$— | —$C_7H_{15}$ | Cr 47.0 B 50.0 |

TABLE 152-continued

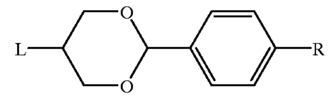

| LCReg | L | R | Phases |
| --- | --- | --- | --- |
| 65045 | $C_5H_{11}$— | —CH═CH—COO—$C_{10}H_{21}$ | (25.0) Cr 57.0 N 86.0 |
| 4445 | $C_4H_9$— | —O—$CH_3$ | Cr 34.0 S 39.0 |
| 4449 | $C_5H_{11}$— | —O—$C_3H_7$ | Cr 37.5 A 28.5 N 40.5 |
| 4450 | $C_6H_{13}$— | —O—$C_3H_7$ | Cr 40.0 A 45.0 |
| 4452 | $C_5H_{11}$— | —O—$C_4H_9$ | Cr 40.0 N 53.0 |
| 4453 | $C_6H_{13}$— | —O—$C_4H_9$ | Cr 35.5 A 44.0 N 50.0 |
| 4454 | $C_8H_{17}$— | —O—$C_4H_9$ | Cr 43.0 A 62.0 |
| 4457 | $C_6H_{13}$— | —O—$C_5H_{11}$ | Cr 37.0 A 46.0 N 49.0 |
| 4458 | $C_8H_{17}$— | —O—$C_5H_{11}$ | Cr 38.0 A 60.0 |
| 4459 | $C_4H_9$— | —O—$C_6H_{13}$ | Cr 31.0 N 43.0 |
| 4461 | $C_6H_{13}$— | —O—$C_6H_{13}$ | Cr 34.0 A 45.0 N 53.0 |
| 4462 | $C_7H_{15}$— | —O—$C_6H_{13}$ | Cr 37.5 A 62.0 |

TABLE 153

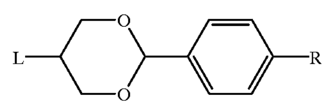

| LCReg | L | R | * | Phases |
| --- | --- | --- | --- | --- |
| 4463 | $C_8H_{17}$— | —O—$C_6H_{13}$ | | Cr 39.3 A 64.2 |
| 4466 | $C_6H_{13}$— | —O—$C_7H_{15}$ | | Cr 45.0 A 50.5 N 55.0 |
| 4468 | $C_6H_{13}$— | —O—$C_8H_{17}$ | | Cr 46.0 A 52.5 N 58.0 |
| 4471 | $C_6H_{13}$— | —O—$C_9H_{19}$ | | Cr 48.0 A 53.5 N 56.5 |
| 4472 | $C_7H_{15}$— | —O—$C_9H_{19}$ | | Cr 49.0 A 59.5 |
| 4473 | $C_{16}H_{33}$—O— | —O—$C_7H_{15}$ | | Cr 51.0 B 68.5 |
| 57388 | $C_5H_{11}$—O— | —O—$C_8H_{17}$ | | Cr 35.0 A 39.0 N 43.0 |
| 4475 | $C_6H_{13}$— | —COO—$C_2H_5$ | | Cr 42.0 B 70.0 |
| 4476 | $C_7H_{15}$— | —OOC—$C_4H_9$ | | Cr 34.0 B 68.0 |
| 4480 | $C_7H_{15}$— | —OCOO—$C_5H_{11}$ | | Cr 27.0 A 30.0 N 42.0 |
| 4485 | $CH_3$—CH═CH— | —O—$C_4H_9$ | | Cr 59.5 N 61.2 |
| 4486 | $C_3H_7$—CH═CH— | —O—$C_4H_9$ | | Cr 60.0 N 62.0 |
| 4488 | $H_2C$═CH—$C_2H_4$— | —O—$C_4H_9$ | | Cr 36.0 N 36.7 |
| 63061 | $C_8H_{17}$— | —CH═CH—COO—$CH_2$—CHMe—$C_2H_5$ | S | (57.0) Cr 67.0 A 82.0 |
| 4490 | $C_{10}H_{21}$— | —CH═CH—COO—$CH_2$—CHMe—$C_2H_5$ | S | (21.0) Cr 45.0 A 77.0 |

TABLE 154

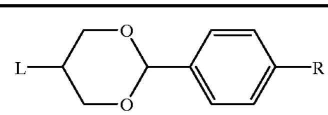

| LCReg | L | R | * | Phases |
| --- | --- | --- | --- | --- |
| 4491 | $C_{11}H_{23}$— | —CH═CH—COO—$CH_2$—CHMe—$C_2H_5$ | S | (28.0) Cr 58.0 A 76.0 |
| 63064 | $C_{12}H_{25}$— | —CH═CH—COO—$CH_2$—CHMe—$C_2H_5$ | S | (53.0) Cr 67.0 A 80.0 |
| 4500 | $C_4H_9$— | —O—$CH_2$—$C_5F_{11}$ | | (55.0) Cr ? A 100.0 |

TABLE 154-continued

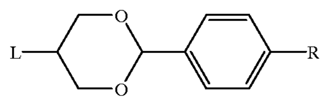

| LCReg | L | R | * | Phases |
|---|---|---|---|---|
| 4494 | $C_5H_{11}$— | —O—$CH_2$—CH═$CH_2$ | | Cr 41.6 N 42.5 |
| 4495 | $C_5H_{11}$— | —O—$C_2H_4$—CH═$CH_2$ | | Cr 31.0 N 35.2 |

TABLE 155

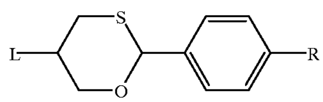

| LCReg | L | R | * | Phases |
|---|---|---|---|---|
| 6006 | $C_6H_{13}$— | —$C_5H_{11}$ | 2 | Cr 75.0 B 99.0 |
| 65044 | $C_5H_{11}$— | —CH═CH—COO—$C_{10}H_{21}$ | 2 | (24.0) Cr 49.0 N 70.0 |
| 6023 | $C_4H_9$— | —O—$C_4H_9$ | 2 | Cr 37.0 N 45.0 |
| 6034 | $C_{10}H_{21}$— | —CH═CH—COO—$CH_2$—CHMe—$C_2H_5$ | 6 | (−50.0) Cr 35.0 A 71.0 |
| 6035 | $C_{11}H_{23}$— | —CH═CH—COO—$CH_2$—CHMe—$C_2H_5$ | 6 | (−19.0) Cr 50.0 A 74.0 |

TABLE 156

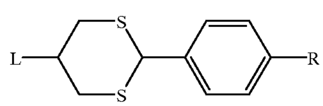

| LCReg | L | R | * | Phases |
|---|---|---|---|---|
| 65043 | $C_5H_{11}$— | —CH═CH—COO—$C_{10}H_{21}$ | | (52.0) Cr 58.0 N 77.0 |
| 5998 | $C_{10}H_{21}$— | —CH═CH—COO—$CH_2$—CHMe—$C_2H_5$ | S | (16.0) Cr 53.0 A 88.0 |
| 5999 | $C_{11}H_{23}$— | —CH═CH—COO—$CH_2$—CHMe—$C_2H_5$ | S | (18.0) Cr 54.0 A 82.0 |

TABLE 157

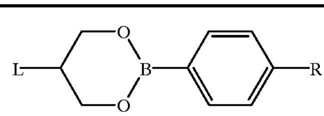

| LCReg | L | R | * | Phases |
|---|---|---|---|---|
| 6044 | $C_5H_{11}$— | —C:::C—CN | | Cr 59.0 X 75.5 |
| 65047 | H—O—$C_6H_{12}$— | —COO—$CH_3$ | | Cr 96.8 N 104.7 |
| 65048 | H—O—$C_8H_{16}$— | —COO—$CH_3$ | | Cr 84.4 A 97.5 |
| 6056 | $C_{12}H_{25}$— | —O—$C_5H_{11}$ | | Cr 64.2 X 64.9 |
| 6062 | $H_2$C═CH—COO—$C_{12}H_{24}$— | —O—$C_8H_{17}$ | | Cr 45.7 A 52.4 |
| 6070 | $C_{10}H_{21}$— | —O—$C_2H_4$—CHMe—$C_2H_5$ | S | Cr 37.7 C* 38.6 A 39.9 |
| 6073 | $C_{10}H_{21}$— | —O—$C_3H_6$—CHMe—$C_2H_5$ | S | Cr 45.0 A 51.9 |
| 6074 | $C_{11}H_{23}$ | —O—$C_3H_6$—CHMe—$C_2H_5$ | S | Cr 42.5 A 52.5 |
| 6078 | $C_{11}H_{23}$— | —O—$C_4H_8$—CHMe—$C_2H_5$ | S | Cr 40.0 C* 41.4 A 51.0 |
| 6079 | $C_{12}H_{25}$— | —O—$C_4H_8$—CHMe—$C_2H_5$ | S | Cr 42.5 C* 45.2 A 51.2 |
| 6085 | $C_{12}H_{25}$— | —O—$C_5H_{10}$—CHMe—$C_2H_5$ | S | Cr 53.9 A 59.1 |

TABLE 158

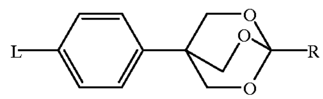

| LCReg | L | R | Phases |
|---|---|---|---|
| 6090 | $C_5H_{11}$— | —$C_7H_{15}$ | Cr 40.0 B 87.0 |

TABLE 159

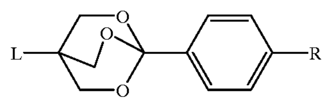

| LCReg | L | R | Phases |
|---|---|---|---|
| 6094 | $C_7H_{15}$— | —$C_5H_{11}$ | Cr 46.0 B 74.0 |
| 6096 | $C_6H_{13}$— | —$C_6H_{13}$ | Cr 45.0 B 64.0 |
| 6097 | $C_8H_{17}$— | —$C_6H_{13}$ | Cr 35.0 B 87.0 |
| 6100 | $C_7H_{15}$— | —O—$C_6H_{13}$ | Cr 43.0 B 85.0 |

TABLE 160

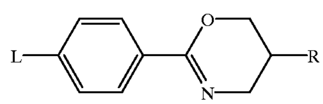

| LCReg | L | R | * | Phases |
|---|---|---|---|---|
| 6120 | $O_2N$— | —$C_5H_{11}$ | 2 | Cr 55.0 X 68.0 |

TABLE 161

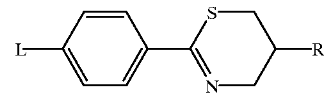

| LCReg | L | R | * | Phases |
|---|---|---|---|---|
| 6122 | $C_6H_{13}$—O— | —$C_5H_{11}$ | 2 | Cr 37.0 X 51.0 |

TABLE 162

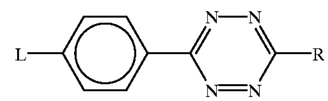

| No | L | R | Cr | LC |
|---|---|---|---|---|
| 5654 | $C_5H_{11}$—O— | —$C_6H_{13}$ | K65 | C58.5 I |
| 5655 | $C_5H_{11}$—O— | —$C_7H_{15}$ | K49 | C52.5 N63 I |
| 5656 | $C_6H_{13}$—O— | —$C_5H_{11}$ | K55 | A68 I |
| 5657 | $C_6H_{13}$—O— | —$C_7H_{15}$ | K58 | C68 A74 N76 I |
| 5658 | $C_4H_9$—O— | —O—$C_4H_9$ | K75.5 | S 57.5 N74 I |
| 5659 | $C_4H_9$—O— | —O—$C_6H_{13}$ | K70 | S 68.5 N80 I |
| 5660 | $C_5H_{11}$—O— | —O—$C_4H_9$ | K53.5 | S 61 N71 I |
| 5661 | $C_5H_{11}$—O— | —O—$C_6H_{13}$ | K55.5 | S 70 S 72.5 N 82 I |
| 5676 | C7H15—COO— | —$C_6H_{13}$ | K58 | C50.5 A65 I |

TABLE 163

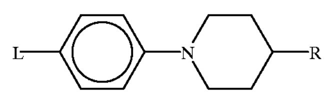

| No | L | R | Cr | LC |
|---|---|---|---|---|
| 7081 | $O_2N$— | —OOC—$C_{10}H_{20}$—$Sl_4O_4Me_7$—Cy | K? | A50 I |
| 7083 | F— | —$C_2H_5$ | K < 20 | N-36.2 I |
| 7084 | F— | —$C_3H_7$ | K < 20 | N-14.6 I |
| 7089 | NC— | —$C_6H_{13}$ | K29.7 | N14.5 I |
| 7097 | $C_4H_9$— | —$C_6H_{13}$ | K20 | B44 I |
| 7098 | $C_4H_9$—O— | —$C_6H_{13}$ | K40 | B78 I |
| 7099 | $CH_3$—OOC— | —$C_5H_{11}$ | K86.5 | A90.5 I |
| 7100 | $C_3H_7$—OOC— | —$C_5H_{11}$ | K37.8 | A68 I |
| 7101 | $C_4H_9$—OOC— | —$C_5H_{11}$ | K42 | A57.8 I |
| 7102 | $C_5H_{11}$—OOC— | —$C_5H_{11}$ | K45.5 | A59 I |

TABLE 164

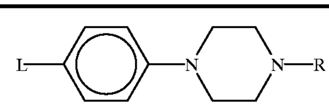

| No | L | R | Cr | LC |
|---|---|---|---|---|
| 7109 | $O_2N$— | —CO—$C_{10}H_{20}$—$Sl_4$O4$Me_7$—cy | K? | A58 I |
| 7122 | NC—CH═CH— | —$C_4H_9$ | K61.1 | A57.1 N113.8 I |

TABLE 164-continued

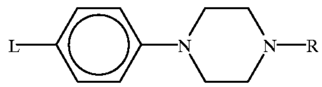

| No | L | R | Cr | LC |
|---|---|---|---|---|
| 7123 | NC—CH═CH— | —$C_5H_{11}$ | K61.8 | A93.3 N122.2 I |
| 7124 | NC—CH═CH— | —$C_6H_{13}$ | K79.7 | A113 N120.6 I |
| 7125 | NC—CH═CH— | —$C_7H_{15}$ | K70.2 | A125 I |
| 7126 | NC—CH═CH— | —$C_8H_{17}$ | K59.3 | A127.4 I |
| 7127 | NC—CH═CH— | —$C_9H_{19}$ | K55 | A131 I |
| 7130 | $C_6H_{13}$— | —$C_9H_{19}$ | K42.5 | B65.5 I |
| 7131 | $C_7H_{15}$— | —$C_7H_{15}$ | K52.5 | B68 I |
| 7132 | $C_2H_5$—OOC—CH═CH— | —$C_4H_9$ | K96.3 | S104 S153.9 I |
| 7133 | $C_2H_5$—OOC—CH═CH— | —$C_5H_{11}$ | K88.8 | S88.5 S149.1 I |
| 7134 | $C_2H_5$—OOC—CH═CH— | —$C_6H_{13}$ | K74.2 | S81 S146.2 I |
| 7135 | $C_2H_5$—OOC—CH═CH— | —$C_7H_{15}$ | K61 | S74 S142.5 I |
| 7136 | $C_2H_5$—OOC—CH═CH— | —$C_8H_{17}$ | K62 | S75 S143 I |
| 7137 | $C_2H_5$—OOC—CH═CH— | —$C_9H_{19}$ | K60 | S73 S141.4 I |
| 7138 | $CH_3$— | —$C_3H_7$ | K51.9 | S27.9 A33.6 I |
| 7139 | $CH_3$— | —$C_4H_9$ | K38.7 | S26.2 A36.7 I |
| 7140 | $CH_3$— | —$C_5H_{11}$ | K38 | S23.5 A31.2 I |
| 7141 | $CH_3$— | —$C_6H_{13}$ | K31.6 | S14 A28.7 I |
| 7142 | $CH_3$— | —$C_7H_{15}$ | K36.1 | S23.8 A27.7 N33.6 I |
| 7148 | $C_2H_5$—O— | —$C_4H_9$ | K49.3 | A67.1 I |
| 7149 | $C_4H_9$—O— | —$C_4H_9$ | K7.4 | S76 A95.2 I |
| 7150 | $C_4H_9$—O— | —$C_5H_{11}$ | K11.3 | S53.4 I |
| 7151 | $C_4H_9$—O— | —$C_6H_{13}$ | K20.8 | S54.5 A83.4 I |
| 7152 | $C_5H_{11}$—O— | —$C_3H_7$ | K36.5 | S74 S76.5 I |
| 7153 | $C_5H_{11}$—O— | —$C_4H_9$ | K59.5 | S61.5 S81.2 I |
| 7154 | $C_5H_{11}$—O— | —$C_5H_{11}$ | K39.5 | S54.5 A83.4 I |
| 7155 | $C_5H_{11}$—O— | —$C_6H_{13}$ | K40.5 | S46.5 S85.5 I |

TABLE 165

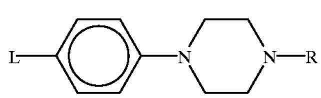

| No | L | R | Cr | LC |
|---|---|---|---|---|
| 7156 | $C_5H_{11}$—O— | —$C_7H_{15}$ | K35.4 | S84.8 I |
| 7157 | $C_5H_{11}$—O— | —$C_7H_{15}$ | K39.5 | S84 I |
| 7158 | $C_5H_{11}$—O— | —$C_9H_{19}$ | K42.5 | S82.5 I |
| 7159 | $C_6H_{13}$—O— | —$C_4H_9$ | K18.2 | S43.4 A74.1 I |
| 7160 | $C_6H_{13}$—O— | —$C_9H_{19}$ | K35 | B87 I |
| 7161 | $C_7H_{15}$—O— | —$C_3H_7$ | K47 | B72 I |
| 7162 | $C_7H_{15}$—O— | —$C_7H_{15}$ | K53.5 | B85.5 I |
| 7163 | $C_5H_{11}$—CO— | —$C_5H_{11}$ | K75.5 | S104.5 I |
| 7164 | $C_5H_{11}$—CO— | —$C_6H_{13}$ | K80.5 | S102 S103 I |
| 7165 | $C_5H_{11}$—CO— | —$C_7H_{15}$ | K71 | S95 S101 I |
| 7166 | $C_5H_{11}$—CO— | —$C_8H_{17}$ | K87 | S95.3 S98 I |
| 7167 | $C_5H_{11}$—CO— | —$C_9H_{19}$ | K84.5 | S93.8 S99.6 I |
| 7168 | $C_6H_{13}$—CO— | —$C_8H_{17}$ | K72 | S101.8 S105.8 I |
| 7169 | $C_7H_{15}$—CO— | —$C_8H_{17}$ | K86.6 | S97 S104.5 I |

TABLE 166

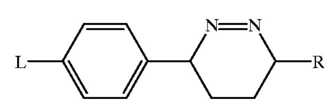

| LCReg | L | R | * | Phases |
|---|---|---|---|---|
| 6190 | $C_3H_7$— | —$C_9H_{19}$ | 2 | Cr 61.0 C 81.0 N = 58.0 |

TABLE 167

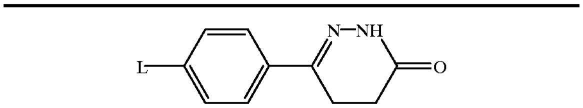

| LCReg | L | R | Phases |
|---|---|---|---|
| 6197 | $C_7H_{15}$— | —H | Cr 92.0 A 106.0 |
| 6198 | $C_8H_{17}$— | —H | Cr 96.0 A 112.0 |
| 6199 | $C_9H_{19}$— | —H | Cr 94.4 A 115.7 |
| 6202 | $C_8H_{17}$—O— | —H | Cr 99.5 A 116.5 |

TABLE 168

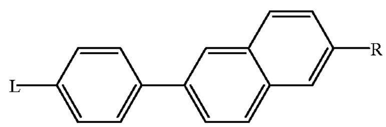

| LCReg | L | R | Phases |
|---|---|---|---|
| 6226 | NC— | —$C_2H_5$ | Cr 119.5 N 135.3 |
| 6227 | NC— | —$C_3H_7$ | Cr 107.5 N 144.5 |
| 6228 | NC— | —$C_4H_9$ | Cr 74.5 N 129.3 |
| 6229 | NC— | —$C_5H_{11}$ | Cr 85.5 N 128.0 |
| 6230 | NC— | —$C_6H_{13}$ | Cr 59.0 N 117.0 |
| 6231 | NC— | —$C_7H_{15}$ | Cr 57.0 N 121.0 |
| 6232 | NC— | —$C_8H_{17}$ | Cr 48.0 A 91.5 N 113.0 |
| 6233 | NC— | —$C_9H_{19}$ | Cr 44.0 A 95.0 N 104.0 |
| 6234 | NC— | —O—$CH_3$ | Cr 138.0 N 184.0 |
| 6235 | NC— | —O—$C_2H_5$ | Cr 129.0 N 185.0 |
| 6236 | NC— | —O—$C_3H_7$ | Cr 114.0 N 157.0 |
| 6237 | NC— | —O—$C_4H_9$ | Cr 125.0 N 159.0 |
| 6238 | NC— | —O—$C_5H_{11}$ | Cr 96.0 N 148.0 |
| 6239 | NC— | —O—$C_6H_{13}$ | Cr 100.0 N 148.0 |
| 6240 | NC— | —O—$C_7H_{15}$ | Cr 84.0 N 140.0 |

TABLE 169

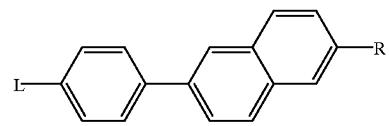

| LCReg | L | R | Phases |
|---|---|---|---|
| 6241 | NC— | —O—$C_8H_{17}$ | Cr 85.0 A 94.0 N 140.0 |
| 6242 | NC— | —OOC—$CH_3$ | Cr 170.0 N 198.0 |
| 6243 | NC— | —OOC—$C_2H_5$ | Cr 172.0 N 197.5 |
| 6244 | NC— | —OOC—$O_3H_7$ | Cr 122.0 N 184.0 |
| 6245 | NC— | —OOC—$C_4H_9$ | Cr 87.0 N 167.0 |
| 6246 | NC— | —OOC—$C_5H_{11}$ | Cr 75.0 N 163.0 |
| 6247 | NC— | —OOC—$C_6H_{13}$ | Cr 64.0 N 155.0 |
| 6248 | NC— | —OOC—$C_7H_{15}$ | Cr 65.0 N 154.0 |
| 6249 | NC— | —OOC—CH═CH—$CH_3$ | Cr 139.0 N 259.0 |
| 6250 | NC— | —OOC—CH═CH—$C_2H_5$ | Cr 113.0 N 229.0 |
| 6251 | NC— | —OOC—CH═CH—$C_3H_7$ | Cr 90.0 N 230.0 |
| 6252 | NC— | —OOC—CH═CH—$C_4H_9$ | Cr 82.0 N 212.0 |
| 6253 | NC— | —OOC—CH═CH—$C_5H_{11}$ | Cr 76.0 N 210.0 |
| 63486 | NC— | —C:::C—$C_3H_7$ | Cr 109.0 N 166.0 |
| 6254 | $O_2N$— | —O—$C_4H_9$ | Cr 106.0 N 120.0 |

TABLE 170

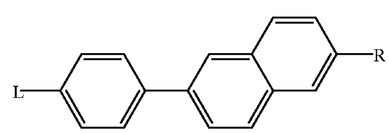

| LCReg | L | | | |
|---|---|---|---|---|
| 6255 | $C_5H_{11}$— | —CN | | Cr68.0 N130.0 |
| 6256 | $C_4H_9$—O— | —CN | | Cr98.5 N167.5 |
| 6257 | $C_3H_7$—C:::C | —CN | | Cr113.0 N193.0 |
| 6258 | $C_5H_{11}$— | —O—$CH_3$ | | Cr131.0 N150.0 |
| 6259 | $C_6H_{13}$—O— | —OOCCFMe—$C_5H_{11}$ | 1 | Cr87.0 A110.0 |
| 6260 | $C_5H_{11}$—CFMe—COO— | —O—$C_6H_{13}$ | 1 | Cr? S80.0 A110.0 |
| 6261 | $C_5H_{11}$—CFMe—COO— | —O—$C_{10}H_{21}$ | 1 | Cr81.6 C*85.4 A96.3 |
| | $C_8H_{17}$— | —O—$C_{12}H_{25}$ | | Cr79 B100 A121 is |
| | $C_{10}H_{21}$— | —O—$C_5H_{10}$—CHMe—$C_2H_5$ | | Cr24 E41 B77 A90 is |
| | $C_2H_5$—CHMe—$C_5H_{10}$—O— | —$C_{10}H_{21}$ | | Cr56 X83 C103 A111 is |
| | $C_3H_{17}$— | —O—$C_4H_9$ | | Cr55 E126 A131 is |

TABLE 171

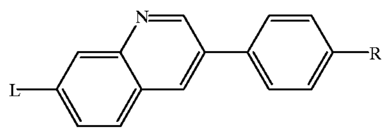

| LCReg | L | R | Phases |
|---|---|---|---|
| 6265 | $C_8H_{17}$—O— | —$C_5H_{11}$ | Cr 72.0 A 114.0 |
| 6266 | $C_4H_9$— | —O—$C_4H_9$ | Cr 79.0 C 96.0 N 108.0 |
| 6267 | $C_4H_9$— | —O—$C_5H_{11}$ | Cr 86.0 C 101.0 N 106.5 |
| 6268 | $C_8H_{17}$—O— | —O—$CH_3$ | Cr 93.0 N 125.0 |
| 6269 | $C_4H_9$—O— | —O—$C_4H_9$ | Cr 104.0 C 112.0 A 142.0 N 150.0 |
| 6270 | $C_8H_{17}$—O— | —O—$C_4H_9$ | Cr 92.0 C 95.0 A 140.0 N 142.5 |
| 6271 | $CH_3$—O— | —O—$C_9H_{19}$ | Cr 99.0 A 116.0 N 127.0 |
| 6272 | $C_8H_{17}$—O— | —O—$C_9H_{19}$ | Cr 74.5 C 135.5 A 144.0 |
| 6273 | $C_8H_{17}$—O— | —S—$C_4H_9$ | CrX 66.7 Cr 71.8 A 119.0 |

TABLE 172

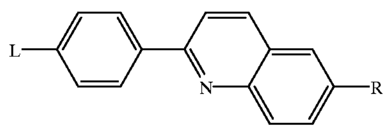

| L | R | Cr | LC |
|---|---|---|---|
| $C_2H_5$—O— | —CN | K150 | S 144 N 189 I |
| $C_8H_{17}$— | —$C_6H_{13}$ | K68 | C 106 N 116 I |
| $C_5H_{11}$— | —O—$C_4H_9$ | K77 | S 76 N 118 I |
| $C_5H_{11}$—O— | —$C_5H_{11}$ | K73 | C 77 N 118 I |
| $C_5H_{11}$—O— | —$C_6H_{13}$ | K73 | C 88 N 114 I |
| $C_5H_{11}$—O— | —$C_7H_{15}$ | K71 | C 96 A 98 N 118 I |
| $C_5H_{11}$—O— | —$C_8H_{17}$ | K73 | C 92 A 105 N 112 I |
| $C_6H_{13}$—O— | —$C_5H_{11}$ | K68 | C 93 N 125 I |
| $C_6H_{13}$—O— | —$C_6H_{13}$ | K66 | C 98 N 117 I |
| $C_6H_{13}$—O— | —$C_7H_{15}$ | K65 | C 104 A 106 N 121 I |
| $C_6H_{13}$—O— | —$C_8H_{17}$ | K69 | C 104 A 113 N 117 I |
| $C_7H_{15}$—O— | —$C_5H_{11}$ | K73 | C 98 N 121 I |
| $C_7H_{15}$—O— | —$C_6H_{13}$ | K70 | C 105 N 116 I |
| $C_7H_{15}$—O— | —$C_7H_{15}$ | K70 | C 109 A 113 N 120 I |
| $C_7H_{15}$—O— | —$C_8H_{17}$ | K71 | C 109 A 115 N 116 I |
| $C_8H_{17}$—O— | —$C_5H_{11}$ | K72 | C 104 N 120 I |
| $C_8H_{17}$—O— | —$C_6H_{13}$ | K68 | C 106 N 116 I |
| $C_8H_{17}$—O— | —$C_7H_{15}$ | K70 | C 109 A 117 N 120 I |
| $C_8H_{17}$—O— | —$C_8H_{17}$ | K69 | C 113 A 118 I |
| $C_9H_{19}$—O— | —$C_5H_{11}$ | K76 | C 107 A 109 N 118 I |
| $C_9H_{19}$—O— | —$C_6H_{13}$ | K76 | C 111 A 113 N 116 I |
| $C_9H_{19}$—O— | —$C_7H_{15}$ | K76 | C 113 A 119 I |
| $C_9H_{19}$—O— | —$C_8H_{17}$ | K75 | C 114 A 117 I |
| $C_{10}H_{21}$—O— | —$C_5H_{11}$ | K77 | C 107 A 113 N 118 I |
| $C_{10}H_{21}$—O— | —$C_6H_{13}$ | K75 | C 110 A 114 A 116 I |
| $C_{10}H_{21}$—O— | —$C_7H_{15}$ | K74 | C 114 A 119 I |
| $C_{10}H_{21}$—O— | —$C_8H_{17}$ | K68 | C 114 A 116 I |
| $C_{11}H_{23}$—O— | —$C_5H_{11}$ | K83 | C 105 A 114 N 116 I |
| $C_{11}H_{23}$—O— | —$C_6H_{13}$ | K82 | C 110 A 115 I |
| $C_{11}H_{23}$—O— | —$C_7H_{15}$ | K81 | C 113 A 118 I |

TABLE 173

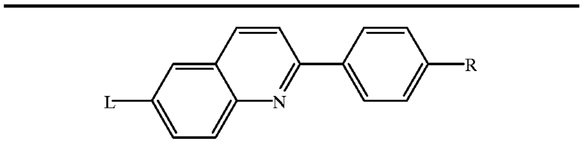

| LCReg | L | R | Phases |
|---|---|---|---|
| 6275 | NC— | —$C_2H_5$ | Cr 124.5 N 138.0 |
| 6276 | NC— | —$C_3H_7$ | Cr 107.0 N 146.5 |

TABLE 173-continued

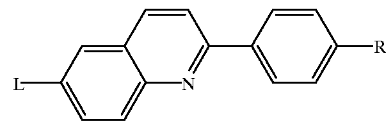

| LCReg | L | R | Phases |
|---|---|---|---|
| 6277 | NC— | —$C_4H_9$ | Cr 97.0 N 110.0 |
| 6278 | NC— | —$C_5H_{11}$ | Cr 91.8 N 135.5 |
| 6279 | NC— | —$C_6H_{13}$ | Cr 86.3 N 124.0 |
| 6280 | NC— | —O—$CH_3$ | Cr 187.0 N 188.0 |
| 6282 | $C_2H_5$—O— | —$C_2H_5$ | Cr 139.0 N 109.0 |
| 6283 | $C_4H_9$—O— | —$C_2H_5$ | Cr 94.0 N 100.0 |
| 6284 | $C_4H_9$—O— | —$C_4H_9$ | Cr 77.0 N 112.0 |
| 6286 | $C_4H_9$— | —O—$CH_3$ | Cr 96.0 N 100.0 |
| 6287 | $C_4H_9$— | —O—$C_2H_5$ | Cr 93.0 N 124.0 |
| 6288 | $C_4H_9$— | —O—$C_4H_9$ | Cr 89.0 N 118.0 |
| 41322 | $C_8H_{17}$— | —O—$C_{11}H_{23}$ | Cr 80.0 C 115.0 A 117.0 |
| 60029 | $C_5H_{11}$— | —O—$C_{12}H_{25}$ | Cr 83.0 C 104.0 A 114.0 N 116.0 |
| 60036 | $C_6H_{13}$— | —O—$C_{12}H_{25}$ | Cr 103.0 C 108.0 A 113.0 |

TABLE 174

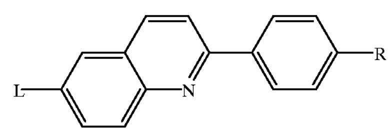

| LCReg | L | R | Phases |
|---|---|---|---|
| 60044 | $C_7H_{15}$— | —O—$C_{12}H_{25}$ | Cr 79.0 C 112.0 A 118.0 |
| 41323 | $C_8H_{17}$— | —O—$C_{12}H_{25}$ | Cr 79.0 C 113.0 A 115.0 |

TABLE 175

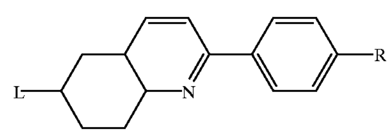

| LCReg | L | R | * | Phases |
|---|---|---|---|---|
| 6299 | $C_4H_9$— | —CN | 2 | Cr 84.0 N 89.0 |
| 6300 | $C_5H_{11}$— | —CN | 2 | Cr 96.2 N 98.0 |
| 6301 | $C_6H_{13}$— | —CN | 2 | Cr 69.0 N 97.3 |
| 6302 | $C_7H_{15}$— | —CN | 2 | Cr 67.0 N 98.1 |
| 6303 | $C_8H_{17}$— | —CN | 2 | Cr 65.9 N 93.8 |
| 6305 | $C_5H_{11}$— | —NCS | 2 | Cr 92.0 S 104.0 N 115.3 |
| 6308 | $C_3H_7$— | —$C_5H_{11}$ | 2 | Cr 55.4 N 66.0 |
| 6309 | $C_5H_{11}$— | —$C_5H_{11}$ | 2 | Cr 43.0 S 72.7 N 73.6 |
| 6310 | $C_7H_{15}$— | —$C_5H_{11}$ | 2 | Cr 24.0 S 82.0 |
| 6311 | $C_5H_{11}$— | —$C_7H_{15}$ | 2 | Cr 37.0 S 76.0 |
| 6312 | $C_7H_{15}$— | —$C_7H_{15}$ | 2 | Cr 22.0 S 84.0 |
| 6313 | $C_5H_{11}$— | —$C_9H_{19}$ | 2 | Cr 21.0 S 73.5 |
| 6314 | $C_7H_{15}$— | —$C_9H_{19}$ | 2 | Cr 33.0 S 83.0 |
| 6316 | $C_3H_7$— | —O—$C_5H_{11}$ | 2 | Cr 59.0 N 90.0 |
| 6317 | $C_5H_{11}$— | —O—$C_5H_{11}$ | 2 | Cr 87.2 N 99.0 |

TABLE 176

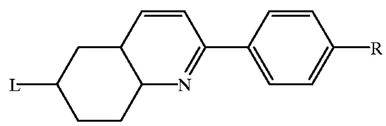

| LCReg | L | R | * | Phases |
|---|---|---|---|---|
| 6318 | $C_6H_{13}$— | —O—$C_5H_{11}$ | 2 | Cr 85.0 S 87.0 N 99.0 |
| 6319 | $C_3H_7$— | —O—$C_6H_{13}$ | 2 | Cr 82.0 N 95.0 |
| 6320 | $C_5H_{11}$— | —O—$C_6H_{13}$ | 2 | Cr 66.0 S 84.0 N 102.4 |
| 6322 | $C_7H_{15}$— | —O—$C_{10}H_{21}$ | 2 | Cr 85.0 S 102.0 |

TABLE 177

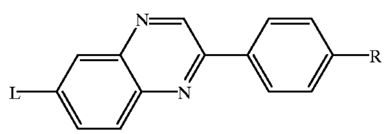

| LCReg | L | R | Phases |
|---|---|---|---|
| 66598 | $C_8H_{17}$— | —$C_5H_{11}$ | (28.0) Cr 57.6 A 63.8 N 80.6 |
| 66599 | $C_8H_{17}$— | —$C_7H_{15}$ | (29.0) Cr 57.6 A 82.8 N 83.9 |
| 66597 | $C_8H_{17}$— | —$C_8H_{17}$ | (41.0) Cr 63.8 A 83.8 |
| 66600 | $C_8H_{17}$— | —$C_{10}H_{21}$ | (45.0) Cr 66.9 A 87.4 |
| 66593 | $C_8H_{17}$— | —O—$C_4H_9$ | (33.0) Cr 55.2 C 58.7 A 110.8 |
| 66594 | $C_8H_{17}$— | —O—$C_6H_{13}$ | (21.0) Cr 65.1C89.0A102.2N111.4 |
| 66588 | $C_4H_9$— | —O—$C_{10}H_{21}$ | (26.0) Cr 66.8 C 87.0 A 107.0 |
| 66592 | $C_6H_{13}$— | —O—$C_{10}H_{21}$ | (34.0) Cr 75.9 C 106.0 A 113.4 |
| 66595 | $C_8H_{17}$— | —O—$C_{10}H_{21}$ | (47.0) Cr 69.5 C 107.0 A 115.4 |
| 66591 | $C_4H_9$— | —O—$C_{12}H_{25}$ | (33.0) Cr 71.1 C 78.0 A 107.6 |
| 66589 | $C_6H_{13}$— | —O—$C_{12}H_{25}$ | (25.0) Cr 68.8 C 103.2 A 111.5 |
| 66590 | $C_8H_{17}$— | —O—$C_{12}H_{25}$ | (42.0) Cr 71.2 C 108.0 A 114.5 |
| 66596 | $C_5H_{11}$—CO— | —O—$C_{12}H_{25}$ | (67.0) Cr 103.8 A 172.0 |
| 66602 | $C_8H_{17}$— | —OOC—$C_6H_{13}$ | (28.0) Cr 30.3S74.4C97.7N105.5 |
| 66601 | $C_8H_{17}$— | —OOC—$C_8H_{17}$ | (19.0) Cr 25.0 S 78.4 C 109.1 |

TABLE 178

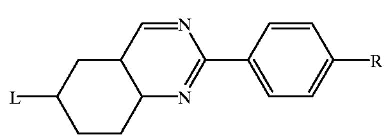

| LCReg | L | R | * | Phases |
|---|---|---|---|---|
| 6333 | $C_5H_{11}$— | —CN | 2 | Cr 98.0 X 114.0 |
| 6334 | $C_6H_{13}$— | —CN | 2 | Cr 90.0 X 108.0 |
| 6335 | $C_5H_{11}$— | —NCS | 2 | Cr 92.0 S 104.0 N 115.1 |
| 6336 | $C_6H_{13}$— | —O—$C_4H_9$ | 2 | Cr 73.0 X 105.0 |

TABLE 179

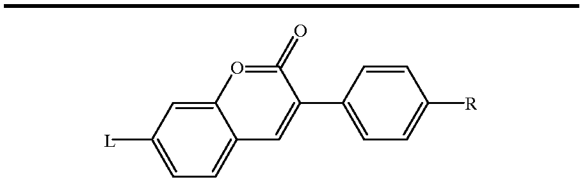

| LCReg | L | R | Phases |
|---|---|---|---|
| 6344 | $C_8H_{17}$—O— | —O—$C_2H_5$ | Cr 120.6 A < ? N 123.6 |
| 6345 | $C_9H_{19}$—O— | —O—$C_2H_5$ | Cr 108.4 A 114.0 N 122.2 |

TABLE 179-continued

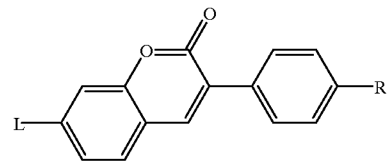

| LCReg | L | R | Phases |
|---|---|---|---|
| 6346 | $C_{10}H_{21}$—O— | —O—$C_2H_5$ | Cr 107.8 A 117.6 N 122.5 |
| 6347 | $C_{11}H_{23}$—O— | —O—$C_2H_5$ | Cr 108.0 A 120.0 N 121.8 |

TABLE 180

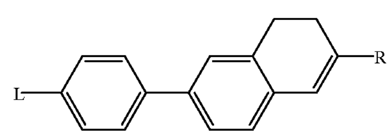

| LCReg | L | R | Phases |
|---|---|---|---|
| 6351 | $C_4H_9$—CO— | —O—$C_4H_9$ | Cr 123.4 S ? S 151.7 |
| 6352 | $C_4H_9$—CO— | —O—$C_5H_{11}$ | Cr 91.7 S ? S 115.7 S 152.7 |
| 6353 | $C_4H_9$—CO— | —OOC—$CH_3$ | Cr 106.8 S 120.6 N 144.1 |
| 6350 | $C_4H_9$—OOC— | —O—$C_4H_9$ | Cr 76.8 S 88.7 |

TABLE 181

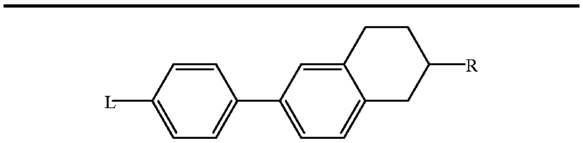

| LCReg | L | R | * | Phases |
|---|---|---|---|---|
| 6356 | NC— | —$C_4H_9$ | 2 | Cr 72.0 N 98.6 |
| 6357 | NC— | —$C_5H_{11}$ | 2 | Cr 79.5 N 108.6 |

TABLE 181-continued

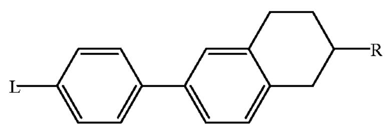

| LCReg | L | R | * | Phases |
|---|---|---|---|---|
| 6358 | NC— | —$C_6H_{13}$ | 2 | Cr 75.5 N 102.4 |
| 6360 | $C_2H_5$— | —$C_4H_9$ | 2 | Cr ? S ? S 33.7 N 49.0 |
| 6362 | $C_2H_5$— | —$C_6H_{13}$ | 2 | Cr 30.9 S 41.0 N 57.5 |
| 6368 | $CH_3$—CO— | —$C_4H_9$ | 2 | Cr 74.3 N 95.9 |
| 6369 | $CH_3$—CO— | —$C_5H_{11}$ | 2 | Cr 76.9 N 105.1 |
| 6370 | $CH_3$—CO— | —$C_6H_{13}$ | 2 | Cr 82.6 N 101.5 |
| 6371 | $C_5H_{11}$—CO— | —$C_4H_9$ | 2 | Cr 90.9 N 122.0 |
| 6372 | $C_5H_{11}$—CO— | —O—$C_2H_5$ | 2 | Cr 59.8 S 72.5 N 79.0 |
| 6367 | $C_4H_9$—OOC— | —O—$C_4H_9$ | 2 | Cr 28.0 N 43.4 |

TABLE 182

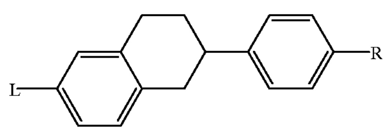

| LCReg | L | R | * | Phases |
|---|---|---|---|---|
| 6382 | $C_3H_7$—O— | —O—$C_4H_9$ | 2 | Cr 59.3 N 71.2 |

TABLE 183

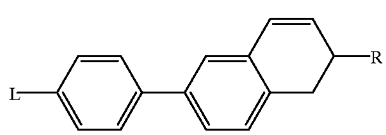

| LCReg | L | R | * | Phases |
|---|---|---|---|---|
| 6384 | NC— | —$C_3H_7$ | 2 | Cr 72.0 N 82.5 |
| 6385 | NC— | —$C_4H_9$ | 2 | Cr 39.0 N 74.6 |
| 6387 | NC— | —$C_6H_{13}$ | 2 | Cr 49.5 N 79.7 |

TABLE 184

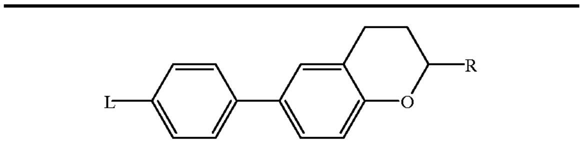

| LCReg | L | R | * | Phases |
|---|---|---|---|---|
| 6396 | NC— | —$C_5H_{11}$ | 2 | Cr 69.0 N 76.0 |

TABLE 185

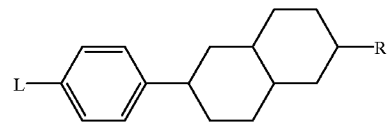

| LCReg | L | R | * | Phases |
|---|---|---|---|---|
| 6411 | H—CO— | —$C_3H_7$ | 2 | Cr 61.3 N 94.0 |
| 6412 | H—CO— | —$C_5H_{11}$ | 2 | Cr 55.0 N 98.8 |
| 6420 | NC— | —$C_2H_5$ | 2 | Cr 74.5 N 95.5 |
| 6421 | NC— | —$C_3H_7$ | 2 | Cr 77.3 N 126.5 |
| 6422 | NC— | —$C_4H_9$ | 2 | Cr 61.3 N 116.0 |
| 6423 | NC— | —$C_5H_{11}$ | 2 | Cr 72.8 N 125.1 |
| 6424 | NC— | —$C_7H_{15}$ | 2 | Cr 78.6 N 117.5 |
| 6428 | $CH_3$— | —$C_5H_{11}$ | 2 | Cr 49.5 N 61.0 |
| 6430 | $C_2H_5$ | —$C_5H_{11}$ | 2 | Cr 27.9 N 46.0 |
| 6431 | $C_3H_7$— | —$C_3H_7$ | 2 | Cr 31.8 N 44.0 |
| 6432 | $C_3H_7$— | —$C_5H_{11}$ | 2 | Cr 39.6 N 56.9 |
| 6433 | $C_3H_7$— | —$C_7H_{15}$ | 2 | Cr 44.6 N 65.3 |
| 6434 | $C_4H_9$— | —$C_3H_7$ | 2 | Cr 26.3 N 30.8 |
| 6435 | $C_4H_9$— | —$C_5H_{11}$ | 2 | Cr 34.4 N 48.4 |
| 6436 | $C_5H_{11}$— | —$C_3H_7$ | 2 | Cr 35.0 N 45.2 |

TABLE 186

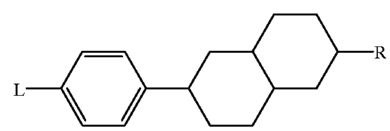

| LCReg | L | R | * | Phases |
|---|---|---|---|---|
| 6437 | $C_5H_{11}$— | —$C_5H_{11}$ | 2 | Cr 39.9 N 59.7 |
| 6438 | $C_6H_{13}$— | —$C_3H_7$ | 2 | Cr 22.6 N 38.7 |
| 6441 | $C_3H_7$—O— | —$C_5H_{11}$ | 2 | Cr 62.9 N 89.9 |
| 6442 | $C_4H_9$—O— | —$C_5H_{11}$ | 2 | Cr 70.2 N 96.0 |
| 6447 | $CH_3$—CO— | —$C_3H_7$ | 2 | Cr 70.5 N 92.5 |
| 6448 | $CH_3$—CO— | —$C_5H_{11}$ | | Cr 68.3 N 97.1 |
| 6450 | $C_2H_5$—CO— | —$C_3H_7$ | 2 | Cr 69.7 N 122.5 |
| 6451 | $C_2H_5$—CO— | —$C_5H_{11}$ | 2 | Cr 75.2 N 125.0 |
| 6452 | $C_2H_5$—CO— | —$C_7H_{15}$ | 2 | Cr 60.1 N 122.0 |
| 6453 | $C_3H_7$—CO— | —$C_3H_7$ | 2 | Cr 64.3 N 88.9 |
| 6454 | $C_3H_7$—CO— | —$C_5H_{11}$ | 2 | Cr 59.8 N 95.7 |
| 6455 | $C_4H_9$—CO— | —$CH_3$ | 2 | Cr 58.8 N 62.0 |
| 6456 | $C_4H_9$—CO— | —$C_2H_5$ | 2 | Cr 61.6 N 76.0 |
| 6457 | $C_4H_9$—CO— | —$C_3H_7$ | 2 | Cr 58.0 N 98.7 |
| 6458 | $C_4H_9$—CO— | —$C_4H_9$ | 2 | Cr 60.2 N 97.2 |

TABLE 187

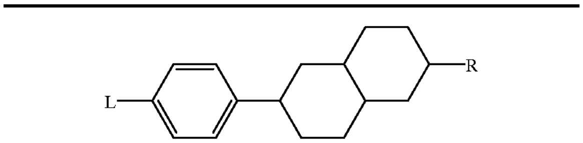

| LCReg | L | R | * | Phases |
|---|---|---|---|---|
| 6459 | $C_4H_9$—CO— | —$C_5H_{11}$ | 2 | Cr 63.4 N 104.0 |
| 6460 | $C_5H_{11}$—CO— | —$C_3H_7$ | 2 | Cr 62.9 N 95.2 |
| 6461 | $C_6H_{13}$—CO— | —$C_3H_7$ | 2 | Cr 62.4 N 99.2 |
| 6443 | $CH_3$—OOC— | —$C_5H_{11}$ | 2 | Cr 60.4 N 111.5 |
| 6444 | $C_3H_7$—OOC— | —$C_5H_{11}$ | 2 | Cr 52.0 N 73.9 |
| 6445 | $CH_3$—COO— | —$C_5H_{11}$ | 2 | Cr 56.1 N 102.1 |
| 6446 | $C_2H_5$—COO— | —$C_5H_{11}$ | 2 | Cr 57.7 N 110.0 |

TABLE 188

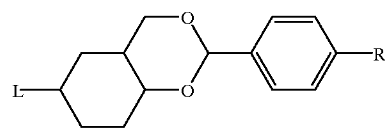

| LCReg | L | R | * | Phases |
|---|---|---|---|---|
| 6474 | $C_5H_{11}$— | —O—$C_5H_{11}$ | 2 | Cr 61.0 N 70.0 |
| 6477 | $C_5H_{11}$— | —OOC—$C_5H_{11}$ | 2 | Cr 79.0 N 79.2 |

TABLE 189

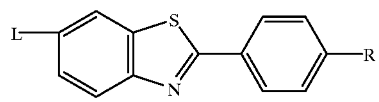

| LCReg | L | R | Phases |
|---|---|---|---|
| 6508 | F— | —O—$C_8H_{17}$ | Cr 71.5 A 128.5 |
| 6509 | Cl— | —O—$C_8H_{17}$ | Cr 72.0 E 94.5 A 164.0 |
| 6524 | Br— | —O—$C_8H_{17}$ | Cr 75.5 E 107.5 A 149.5 |
| 6513 | $C_6H_{13}$— | —$C_8H_{17}$ | (32.0) Cr 62.0 A 69.0 |
| 6514 | $C_6H_{13}$— | —O—$C_8H_{17}$ | (41.0) Cr 55.0 C 106.0 |
| 6516 | $CH_3$—O— | —O—$C_6H_{13}$ | (79.0) Cr 95.7 N 118.3 |
| 6517 | $CH_3$—O— | —O—$C_8H_{17}$ | (73.0) Cr 100.4 N 119.0 |
| 6520 | $C_2H_5$—O— | —O—$C_8H_{17}$ | (83.0) Cr 94.2 N 125.3 |
| 6522 | $C_3H_7$—O— | —O—$C_8H_{17}$ | (65.0) Cr 73.0 N 114.4 |
| 6523 | $C_4H_9$—O— | —O—$C_8H_{17}$ | (66.0) Cr 70.8 S 99.8 N 123.1 |
| 6518 | $CH_3$—O— | —O—$C_{10}H_{21}$ | (74.0) Cr 89.1 N 112.2 |
| 6519 | $CH_3$—O— | —O—$C_{12}H_{25}$ | (76.0) Cr 90.7 S 96.9 N 113.4 |
| 68949 | $C_{12}H_{25}$—S— | —O—$C_7H_{15}$ | Cr 90.0 A 100.0 |
| 66603 | $C_8H_{17}$— | —$C_8H_{17}$ | (115.0) Cr 126.0 A 129.0 |

TABLE 190

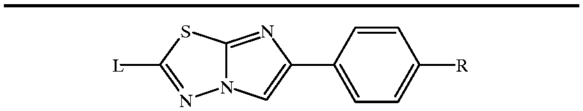

| LCReg | L | R | Phases |
|---|---|---|---|
| 6532 | $C_9H_{19}$— | —$C_4H_9$ | Cr 98.1 A 100.8 |

TABLE 191

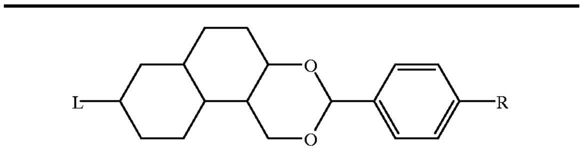

| LCReg | L | R | * | Phases |
|---|---|---|---|---|
| 6540 | $C_6H_{13}$— | —CN | 2 | Cr 111.5 N 187.5 |
| 6541 | $C_6H_{13}$— | —$C_4H_9$ | 2 | Cr 80.0 A 111.0 N 127.0 |
| 6542 | $C_6H_{13}$— | —O—$C_4H_9$ | 2 | Cr 87.0 N 154.0 |

TABLE 192

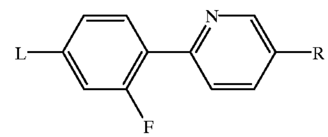

| LCReg | L | R | * | Phases |
|---|---|---|---|---|
| 7325 | $C_6H_{13}$—O— | —$C_6H_{13}$ | | Cr 16.0 N 21.5 |
| 7326 | $C_8H_{17}$—O— | —O—$C_9H_{19}$ | | Cr 47.0 C 48.0 N 69.0 |
| 68069 | $C_6H_{13}$—CHF—$CH_2$—O— | —O—$C_8H_{17}$ | 1 | Cr 43.2 C* 45.9 N* 63.0 |

TABLE 193

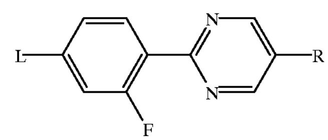

| LCReg | L | R | Phases |
|---|---|---|---|
| 6737 | $C_7H_{15}$—O— | —O—$C_9H_{19}$ | Cr 39.0 C 60.0 N 73.0 |
| 57567 | $C_8H_{17}$—O— | —O—$C_8H_{17}$ | Cr 41.0 C 52.0 N 76.0 |
| 57568 | $C_8H_{17}$—O— | —O—$C_9H_{19}$ | Cr 39.0 C 62.0 N 74.0 |
| 57570 | $C_8H_{17}$—O— | —O—$C_{12}H_{25}$ | Cr 50.0 C 84.0 |
| 57566 | $C_9H_{19}$—O— | —O—$C_7H_{15}$ | Cr 44.0 N 70.0 |
| 6738 | $C_9H_{19}$—O— | —O—$C_9H_{19}$ | Cr 45.0 C 62.0 N 73.0 |
| 57569 | $C_9H_{19}$—O— | —O—$C_{11}H_{23}$ | Cr 52.0 C 75.0 N 77.0 |
| 6740 | $C_8H_{17}$—O— | —O—$CH_2$—$C_4F_9$ | Cr 67.0 C 104.0 |
| 6741 | $C_8H_{17}$—O— | —O—$CH_2$—$C_6F_{13}$ | Cr 65 0 C 127.0 |
| 6742 | $C_8H_{17}$—O— | —O—$CH_2$—$C_8F_{17}$ | Cr 89.0 C 141.0 A 145.0 |
| 6743 | $C_{12}H_{25}$—O— | —O—$CH_2$—$C_4F_9$ | Cr 65.0 C 96.0 |
| 6744 | $C_{12}H_{25}$—O— | —O—$CH_2$—$C_6F_{13}$ | Cr 64.0 C 119.0 |
| 6745 | $C_8H_{17}$—O— | —O—$C_2H_4$—$C_4F_9$ | Cr 68.0 C 104.3 |
| 6746 | $C_8H_{17}$—O— | —O—$C_2H_4$—$C_6F_{13}$ | Cr 65.0 C 127.3 |
| 62089 | $C_8H_{17}$—O— | —O—$C_2H_4$—$C_8F_{17}$ | Cr 89.0 C 141.0 A 145.0 |

TABLE 194

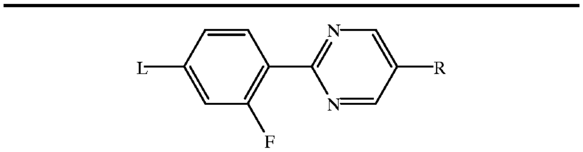

| LCReg | L | R | Phases |
|---|---|---|---|
| 62091 | $C_9H_{19}$—O— | —O—$C_2H_4$—$C_4F_9$ | Cr 60.0 C 101.0 |
| 62088 | $C_{12}H_{25}$—O— | —O—$C_2H_4$—$C_4F_9$ | Cr 65.0 C 96.0 |
| 62090 | $C_{12}H_{25}$—O— | —O—$C_2H_4$—$C_6F_{13}$ | Cr 64.0 C 119.0 |
| 62092 | $C_{12}H_{25}$—O— | —O—$C_2H_4$—$C_8F_{17}$ | Cr 70.0 S 96.0 S 134.0 C 137.0 A 139.0 |

TABLE 195

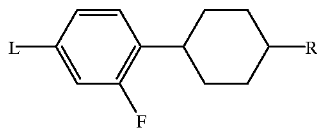

| LCReg | L | R | Phases |
|---|---|---|---|
| 7093 | NC— | —$C_7H_{15}$ | Cr 39.7 N 58.6 |
| 7096 | $C_4H_9$—CO— | —$C_7H_{17}$ | Cr 41.4 N 44.5 |

TABLE 196

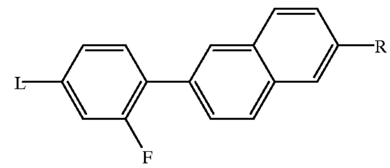

| LCReg | L | R | Phases |
|---|---|---|---|
| 7329 | F— | —O—$C_4H_9$ | Cr 72.0 N 63.0 |
| 7330 | $C_4H_9$—O— | —CN | Cr 64.5 N 129.5 |
| 7331 | $C_4H_9$—O— | —C:::C—$C_3H_7$ | Cr 68.5 N 106.5 |
| 7332 | $CF_3$— | —O—$C_4H_9$ | Cr 73.5 A 105.5 |

TABLE 197

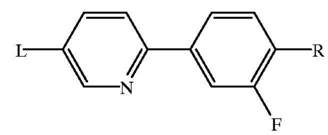

| LCReg | L | R | Phases |
|---|---|---|---|
| 66669 | $C_7H_{15}$— | —O—$C_6H_{13}$ | Cr 25.0 C 40.6 A 50.5 |
| 7351 | $C_7H_{15}$— | —O—$C_7H_{15}$ | Cr 33.0 C 40.1 A 50.4 |
| 66675 | $C_9H_{19}$— | —O—$C_7H_{15}$ | Cr 35.0 C 45.6 A 57.6 |
| 57591 | $C_7H_{15}$— | —O—$C_8H_{17}$ | Cr 29.7 C 48.5 A 53.2 |
| 66672 | $C_8H_{17}$— | —O—$C_8H_{17}$ | Cr 35.0 C 49.9 A 54.8 |
| 66671 | $C_7H_{15}$— | —O—$C_9H_{19}$ | Cr 38.0 C 45.2 A 63.6 |
| 66673 | $C_8H_{17}$— | —O—$C_9H_{19}$ | Cr 47.0 C 50.3 A 55.4 |
| 6677 | $C_{10}H_{21}$ | —O—$C_9H_{19}$ | Cr 47.0 C 57.8 A 61.4 |
| 66674 | $C_8H_{17}$— | —O—$C_{10}H_{21}$ | Cr 44.0 C 53.2 A 56.5 |
| 57592 | $C_9H_{19}$— | —O—$C_{10}H_{21}$ | Cr 37.4 C 54.0 A 62.8 |
| 66676 | $C_9H_{19}$— | —O—$C_{12}H_{25}$ | Cr 46.0 C 57.8 A 62.1 |
| 7360 | $C_{10}H_{21}$— | —OCOO—$C_8H_{17}$ | Cr 21.2 C 29.1 A 32.1 N 33.7 |
| 62773 | $C_7H_{15}$— | —O—$C_3H_6$—CHMe—$C_2H_5$ | Cr 21.0 C* 35.1 A 40.4 |
| 62774 | $C_8H_{17}$— | —O—$C_3H_6$—CHMe—$C_2H_5$ | Cr 35.5 C* 39.9 A 40.4 |
| 62775 | $C_{10}H_{21}$— | —O—$C_3H_6$—CHMe—$C_2H_5$ | Cr 38.0 C* 42.8 A 43.4 |

TABLE 198

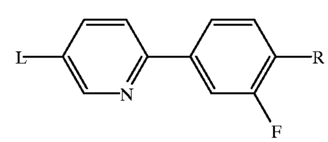

| LCReg | L | R | * | Phases |
|---|---|---|---|---|
| 62776 | $C_6H_{13}$— | —O—$C_4H_8$—CHMe—$C_2H_5$ | 1 | Cr 15.5 C* 21.5 A 26.3 |
| 62777 | $C_8H_{17}$— | —O—$C_4H_8$—CHMe—$C_2H_5$ | 1 | Cr 32.1 C* 33.9 A 38.8 |
| 62778 | $C_9H_{19}$— | —O—$C_4H_8$—CHMe—$C_2H_5$ | 1 | Cr 22.7 C* 51.0 A 54.5 |
| 62779 | $C_6H_{13}$— | —O—$C_5H_{10}$—CHMe—$C_2H_5$ | 1 | Cr 7.0 C* 30.8 A 32.8 |
| 62780 | $C_8H_{17}$— | —O—$C_5H_{10}$—CHMe—$C_2H_5$ | 1 | Cr 21.5 C* 43.2 A 45.8 |
| 62781 | $C_9H_{19}$— | —O—$C_7H_{14}$—CHMe—$C_2H_5$ | | Cr 24.0 A 32.3 |
| 7364 | $C_7H_{15}$— | —O—$C_7F_{15}$ | | Cr 32.5 A. 86.1 N = 37.0 |

TABLE 199

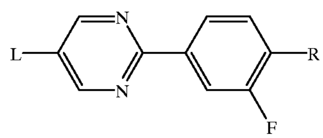

| LCReg | L | R | * | Phases |
|---|---|---|---|---|
| 66506 | C4H9—C:::C— | —F | 1 | Cr 55.5 A 61.5 |
| 6707 | $C_8H_{23}$— | —OOC—$C_4H_9$ | 1 | (10.0) Cr 40.1 C 40.6 A 54.5 |
| 6708 | $C_{10}H_{21}$— | —OOC—$C_6H_{13}$ | 1 | (19.0) Cr 45.4 C 48.5 A 50.4 |
| 62787 | $C_8H_{17}$— | —O—$C_3H_6$—CHMe—$C_2H_5$ | 1 | Cr 35.2 C* 36.9 A 41.0 |
| 62788 | $C_9H_{19}$— | —O—$C_3H_6$—CHMe—$C_2H_5$ | 1 | Cr 40.4 C* 44.4 A 47.1 |
| 67789 | $C_{12}H_{25}$— | —O—$C_3H_6$—CHMe—$C_2H_5$ | 1 | Cr 38.8 C* 48.7 A 49.0 |
| 62790 | $C_7H_{15}$— | —O—$C_4H_8$—CHMe—$C_2H_5$ | 1 | Cr 30.0 A 38.7 |
| 62792 | $C_9H_{19}$— | —O—$C_4H_8$—CHMe—$C_2H_5$ | 1 | Cr 36.0 C* 37.5 |
| 62793 | $C_{12}H_{25}$— | —O—$C_4H_8$—CHMe—$C_2H_5$ | 1 | Cr 37.3 C* 46.7 |
| 62795 | $C_8H_{17}$— | —O—$C_5H_{10}$—CHMe—$C_2H_5$ | 1 | Cr 10.0 C* 33.2 A 43.2 |
| 62796 | $C_9H_{19}$— | —O—$C_5H_{10}$—CHMe—$C_2H_5$ | 1 | Cr 26.0 C* 42.3 |
| 62797 | $C_{12}H_{25}$— | —O—$C_5H_{10}$—CHMe—$C_2H_5$ | 1 | Cr 46.0 C* 53.7 |
| 62798 | $C_8H_{17}$— | —O—$C_6H_{12}$—CHMe—$C_2H_5$ | 1 | Cr 2.0 C* 24.3 A 42.3 |
| 62799 | $C_8H_{17}$— | —O—$C_7H_{14}$—CHMe—$C_2H_5$ | 1 | Cr 16.0 C* 34.8 A 45.2 |
| 6731 | $C_{10}H_{21}$— | —O—$C_2H_4$—CMF—$C_8H_{17}$ | R | Cr 50.6 C* 51.9 N* 53.4 |

TABLE 200

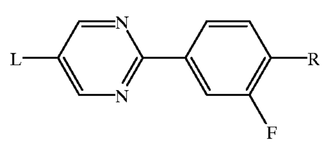

| LCReg | L | R | * | Phases |
|---|---|---|---|---|
| 6733 | $C_{10}H_{21}$—O— | —O—$C_2H_4$—CHF—$C_4H_9$ | S | Cr 49.1 C* 81.5 A 82.0 |
| 6736 | $C_8H_{17}$—O— | —O—$CH_2$—CHF—CHF—$C_3H_7$ | R | (23.0) Cr 40.0 C* 54.0 A 76.0 |

TABLE 201

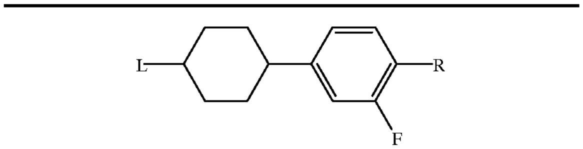

| LCReg | L | R | Phases |
|---|---|---|---|
| 7080 | $C_7H_{15}$— | —CN | Cr 19.0 N 21.0 |
| 7085 | $C_5H_{11}$— | —CH=$CF_2$ | Cr 0.0 N 30.8 |

TABLE 202

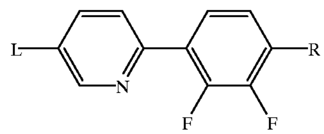

| LCReg | L | R | * | Phases |
|---|---|---|---|---|
| 7408 | $C_8H_{17}$— | —O—$C_8H_{17}$ | | Cr 20.0 C 26.0 N 37.9 |
| 7409 | $C_6H_{13}$—CHF—$CH_2$—O— | —O—$C_{11}H_{23}$ | 1 | Cr 66.0 S 71.0 A 78.0 |

TABLE 203

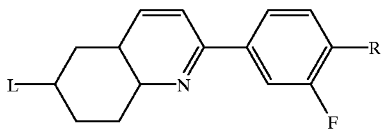

| LCReg | L | R | * | Phases |
|---|---|---|---|---|
| 7381 | $C_7H_{15}$— | —O—$C_{10}H_{21}$ | 2 | Cr 49.0 A 80.0 |

TABLE 204

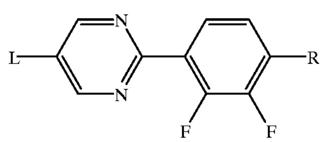

| LCReg | L | R | Phases |
|---|---|---|---|
| 57559 | $C_8H_{17}$— | —O—$C_8H_{17}$ | Cr 33.0 C 37.0 A 57.0 |
| 6755 | $C_9H_{19}$— | —O—$C_7H_{15}$ | Cr 47.0 C 52.0 |
| 57561 | $C_9H_{19}$— | —O—$C_8H_{17}$ | Cr 43.0 C 53.0 |
| 6756 | $C_9H_{19}$— | —O—$C_9H_{19}$ | Cr 41.0 C 54.0 |
| 57563 | $C_{11}H_{23}$— | —O—$C_9H_{19}$ | Cr 55.0 C 60.0 |
| 57560 | $C_8H_{17}$—O— | —O—$C_8H_{17}$ | Cr 48.0 C 75.0 N 76.0 |
| 57562 | $C_9H_{19}$—O— | —O—$C_8H_{17}$ | Cr 45.0 C 78.0 |
| 6758 | $C_9H_{19}$—O— | —O—$C_9H_{19}$ | Cr 48.0 C 78.0 |
| 57564 | $C_{11}H_{23}$—O— | —O—$C_9H_{19}$ | Cr 56.0 C 82.0 |
| 6766 | $C_6F_{13}$—$CH_2$—O— | —O—$C_8H_{17}$ | Cr 77.0 C 127.0 |

TABLE 205

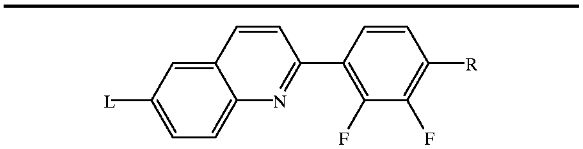

| LCReg | L | R | Phases |
|---|---|---|---|
| 7416 | $C_8H_{17}$—O— | —$C_5H_{11}$ | Cr 36.0 C 44.5 A 75.0 N 83.5 |

TABLE 206

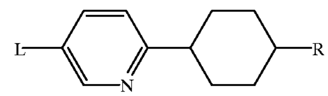

| LCReg | L | R | Phases |
|---|---|---|---|
| 7124 | NC— | —$C_3H_7$ | Cr 47.6 N 51.9 |
| 7125 | NC— | —$C_4H_9$ | Cr 35.0 N 52.0 |
| 7126 | NC— | —$C_5H_{11}$ | Cr 48.2 N 64.1 |
| 7127 | NC— | —$C_6H_{13}$ | Cr 33.2 S 42.3 N 61.2 |
| 7128 | NC— | —$C_7H_{15}$ | Cr 50.7 S 53.3 N 67.2 |

TABLE 207

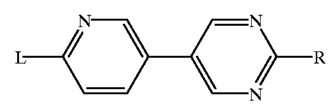

| LCReg | L | R | Phases |
|---|---|---|---|
| 61909 | $C_8H_{17}$—O— | —O—$C_8H_{17}$ | Cr 64.0 C 67.0 A 91.0 |
| 61912 | $C_{10}H_{21}$—O— | —O—$C_8H_{17}$ | Cr 67.0 C 74.0 A 89.0 |
| 61911 | $C_6H_{13}$—O— | —O—$C_8H_{16}$—CH═$CH_2$ | Cr 56.0 A 80.0 |
| 61910 | $C_8H_{17}$—O— | —O—$C_8H_{16}$—CH═$CH_2$ | Cr 59.0 C 66.0 A 80.0 |

TABLE 208

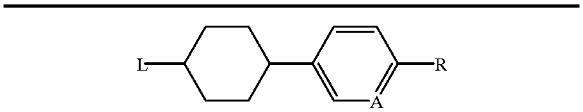

| LCReg | L | R | Phases |
|---|---|---|---|
| 7118 | $C_5H_{11}$— | —CN | Cr 45.4 N 55.4 |
| 7119 | $C_6H_{13}$— | —CN | Cr 35.3 N 49.4 |
| 7120 | $C_7H_{15}$— | —CN | Cr 50.1 N 60.2 |
| 7121 | $C_8H_{17}$— | —CN | Cr 49.0 N 57.9 |

TABLE 209

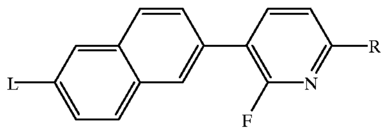

| LCReg | L | R | Phases |
|---|---|---|---|
| 61936 | $C_8H_{17}$—O— | —O—$C_8H_{17}$ | Cr 58.0 A 86.0 |

TABLE 210

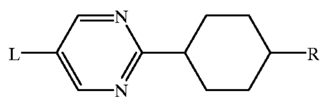

| LCReg | L | R | Phases |
|---|---|---|---|
| 6683 | NC— | —$C_4H_9$ | Cr 60.0 S 85.0 N 91.0 |
| 6684 | NC— | —$C_5H_{11}$ | Cr 70.0 S 94.0 N 98.0 |
| 6689 | $C_7H_{15}$— | —$C_5H_{11}$ | Cr 22.0 S 40.5 |
| 6690 | $C_7H_{15}$— | —$C_7H_{15}$ | Cr 19.0 S 45.0 |

TABLE 211

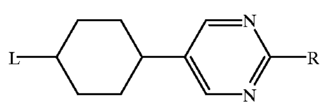

| LCReg | L | R | Phases |
|---|---|---|---|
| 6788 | $C_3H_7$— | —$C_4H_9$ | Cr 29.5 S 31.5 |
| 6789 | $C_3H_7$— | —$C_5H_{11}$ | Cr 33.0 S 48.0 |
| 6791 | $C_5H_{11}$— | —$C_4H_9$ | Cr 19.0 S 40.5 |
| 6792 | $C_5H_{11}$— | —$C_5H_{11}$ | Cr 33.5 S 60.0 |
| 6794 | $C_7H_{15}$— | —$C_4H_9$ | Cr 32.5 S 40.5 |
| 6795 | $C_7H_{15}$— | —$C_5H_{11}$ | Cr 34.0 S 60.0 |

TABLE 212

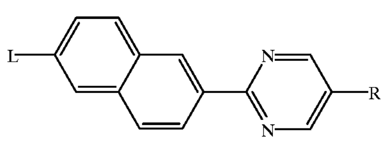

| L | R | | Cr | LC |
|---|---|---|---|---|
| $C_7H_{15}$— | —CN | | K 125.6 | S 154.1 N 163.7 I |
| $C_8H_{17}$—O— | —O—$C_8H_{17}$ | | K 93 | C 105 A 111 N 129 I |
| $C_8H_{17}$—O— | —O—$CH_2$—CH/O\CH(t) —$C_4H_9$ | S | K 85 | C* 128.4 A 130.5 N* 141 I |

TABLE 213

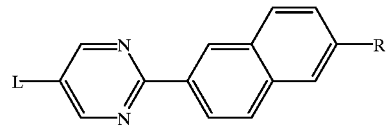

| LCReg | L | R | Phases |
|---|---|---|---|
| 6772 | NC— | —O—$C_5H_{11}$ | Cr 135.5 N 191.1 |
| 6775 | $C_5H_{11}$— | —$C_7H_{15}$ | Cr 46.8 N 77.4 |
| 6776 | $C_6H_{13}$— | —$C_7H_{15}$ | Cr 40.4 N 73.5 |
| 6781 | $C_3H_7$—C≡C— | —O—$C_4H_9$ | Cr 136.5 N 146.5 |

TABLE 214

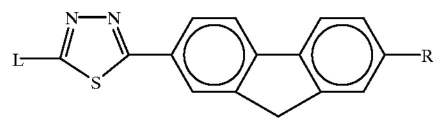

| No | L | R | Cr | LC |
|---|---|---|---|---|
| 8292 | $C_6H_{13}$— | —$C_8H_{17}$ | K 67.3 | S 118.6 A 186.4 I |
| 8293 | $C_8H_{17}$— | —$C_8H_{17}$ | K 82.4 | S 92.7 C 149 A 181 2 I |

TABLE 215

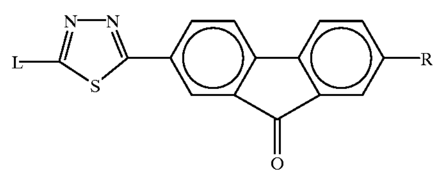

| No | L | R | Cr | LC |
|---|---|---|---|---|
| 8294 | $C_6H_{13}$— | —$C_8H_{17}$ | K 84.6 | S 119.5 A 147.5 I |
| 8295 | $C_8H_{17}$— | —$C_8H_{17}$ | K 34.8 | S 117.5 A 155.2 I |

TABLE 216

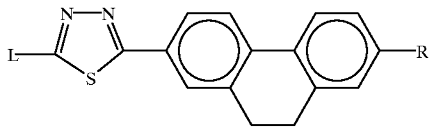

| No | L | R | | Cr | LC |
|---|---|---|---|---|---|
| 8296 | $C_6H_{13}$— | —$C_8H_{17}$ | | K 50.9 | A 126.6 1 |
| 8297 | $C_{10}H_{21}$— | —$C_8H_{17}$ | | K 37.1 | A 128.7 I |
| 8299 | $C_6H_{13}$—CHF— | —$C_8H_{17}$ | 1 | K 63.4 | A 132.9 I |

TABLE 217

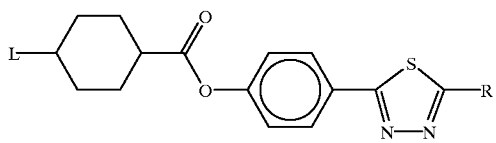

| No | L | R | | Cr | LC |
|---|---|---|---|---|---|
| 37286 | $C_3H_7$— | —$C_7H_{15}$ | | K 95.5 | S 88 G 99.5 C 118 A 154 N 174.5 I |
| 37287 | $C_3H_7$— | —$C_{10}H_{21}$ | | K 76.5 | 94.5 S 95.5 C 120.9 A 159.7N 164.4 I |
| 37288 | $C_4H_9$— | —$C_9H_{19}$ | | K 81 | S 87 S 98 C 102 A 103 N 164 I |
| 37289 | $C_5H_{11}$— | —$C_7H_{15}$ | | K 50 | G 101 C 105 A 173 N 176 I |
| 37290 | $C_5H_{11}$— | —$C_{10}H_{21}$ | | K 69.2 | S98.4 S 107.3 S 119.9 N 170.6 I |
| 37291 | $C_6H_{13}$— | —$C_7H_{15}$ | | K 52 | G 83 C 126 A 159 N 166 I |
| 37292 | $C_7H_{15}$— | —$C_7H_{15}$ | | K 50 | G 101 B 133 A 173 I |
| 37293 | $C_8H_{17}$— | —$C_7H_{15}$ | | K 62 | G 94 B 134 A 172 I |
| 37294 | $C_5H_{11}$— | —CHMe—$C_2H_5$ | 2 | K 55.1 | S 103.8 A 114.7 N 120.6 I |

TABLE 218

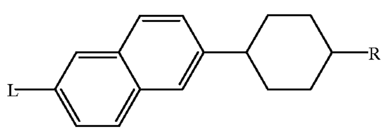

| LCReg | L | R | Phases |
|---|---|---|---|
| 7231 | $CH_3$—O— | —$C_5H_{11}$ | Cr 97.0 N 112.0 |

TABLE 219

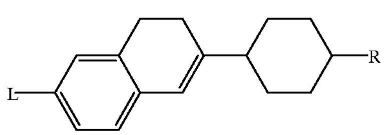

| LCReg | L | R | Phases |
|---|---|---|---|
| 7233 | $CH_3$—O— | —$C_5H_{11}$ | Cr 65.0 N 106.0 |

TABLE 220

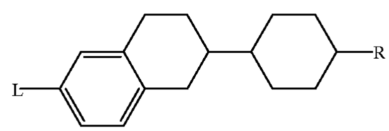

| LCReg | L | R | * | Phases |
|---|---|---|---|---|
| 7234 | $C_4H_9$— | —$C_3H_7$ | 2 | Cr 2.1 N 25.1 |
| 7235 | $C_5H_{11}$— | —$C_3H_7$ | 2 | Cr 26.2 N 44.2 |
| 7236 | $C_3H_7$— | —$C_5H_{11}$ | 2 | Cr 39.4 N 55.0 |
| 7237 | $C_4H_9$— | —$C_5H_{11}$ | 2 | Cr 31.0 N 44.8 |
| 7238 | $CH_3$—O— | —$C_5H_{11}$ | 2 | Cr 42.0 N 91.0 |
| 7239 | $C_3H_7$—O— | —$C_5H_{11}$ | 2 | Cr 45.9 N 90.3 |

TABLE 221

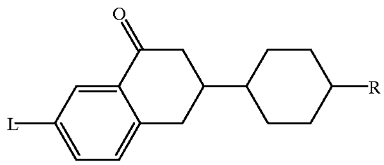

| LCReg | L | R | * | Phases |
|---|---|---|---|---|
| 7242 | $C_3H_7$— | —$C_5H_{11}$ | 2 | Cr 48.5 N 64.5 |
| 7244 | $C_3H_7$—O— | —$C_5H_{11}$ | 2 | Cr 76.7 N 80.9 |

TABLE 222

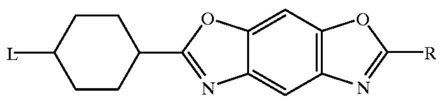

| LCReg | L | R | Phases |
|---|---|---|---|
| 7292 | $C_4H_9$— | —$C_3H_7$ | Cr 99.0 N 118.0 |
| 7293 | $C_4H_9$— | —$C_6H_{13}$ | Cr 90.0 A 96.0 N 106.0 |

TABLE 223

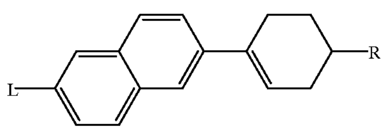

| LCReg | L | R | * | Phases |
|---|---|---|---|---|
| 7471 | $CH_3$—O— | —$C_5H_{11}$ | 2 | Cr 99.0 N 120.0 |

TABLE 224

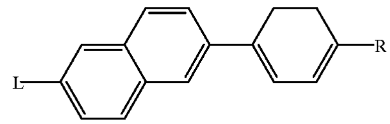

| LCReg | L | R | Phases |
|---|---|---|---|
| 7472 | $CH_3$—O— | —$C_5H_{11}$ | Cr 116.0 N 134.0 |

TABLE 225

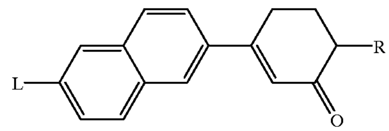

| LCReg | L | R | * | Phases |
|---|---|---|---|---|
| 7486 | $CH_3$—O— | —$C_5H_{11}$ | 2 | Cr 89.0 N 110.0 |

TABLE 226

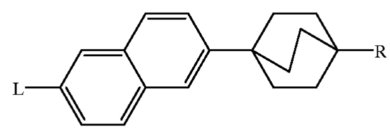

| LCReg | L | R | Phases |
|---|---|---|---|
| 7497 | NC— | —$C_5H_{11}$ | Cr 115.0 N 159.0 |

TABLE 227

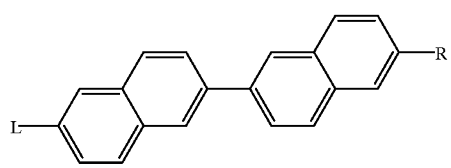

| LCReg | L | R | * | Phases |
|---|---|---|---|---|
| 7504 | $C_3H_7$— | —$C_3H_7$ | | Cr 164.0 N 189.0 |
| 7505 | $C_4H_9$— | —$C_4H_9$ | | Cr 163.0 N 167.0 |
| 7506 | $C_5H_{11}$— | —$C_5H_{11}$ | | Cr 146.5 E 145.5 A 163.5 N 171.5 |
| 7507 | $C_6H_{13}$— | —$C_6H_{13}$ | | Cr 138.0 E 135.5 A 156.5 |
| 7508 | $C_7H_{15}$— | —$C_7H_{15}$ | | Cr 125.5 E 135.5 A 163.0 |
| 7509 | $C_8H_{17}$— | —$C_8H_{17}$ | | Cr 123.0 E 129.0 A 156.5 |
| 7510 | $C_9H_{19}$— | —$C_9H_{19}$ | | Cr 113.5 E 110.0 A 148.0 |

TABLE 227-continued

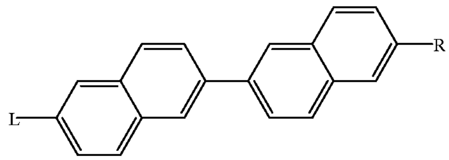

| LCReg | L | R | * | Phases |
|---|---|---|---|---|
| 7511 | $CH_3$—O— | —O—$CH_3$ | | Cr 246.0 N 304.0 |
| 7512 | $C_2H_5$—O— | —O—$C_2H_5$ | | Cr 242.0 N 292.0 |
| 7513 | $C_3H_7$—O— | —O—$C_3H_7$ | | Cr 194.0 A 237.0 N 278.0 |
| 7514 | $C_4H_9$—O— | —O—$C_4H_9$ | | Cr 136.0 E 190.0 A 241.0 N 256.0 |
| 7515 | $C_5H_{11}$—O— | —O—$C_5H_{11}$ | | Cr 136.0 E 178.0 A 236.0 N 244.0 |
| 7516 | $C_6H_{13}$—O— | —O—$C_6H_{13}$ | | Cr 141.0 E 170.0 A 229.0 |
| 7517 | $C_7H_{15}$—O— | —O—$C_7H_{15}$ | | Cr 130.0 E 163.0 N 225.0 |
| 65092 | $H_2C$/O¥CH —$CH_2$—O— | —O—$CH_2$—CH /O¥$CH_2$ | 7 | Cr 240.0 N 270.0 |

TABLE 228

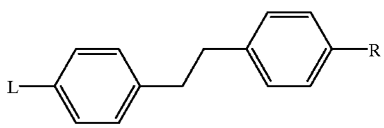

| LCReg | L | R | Phases |
|---|---|---|---|
| 10001 | $C_5H_{11}$— | —O—$C_8H_{17}$ | Cr 30.0 B 44.5 |

TABLE 229

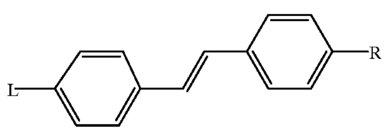

| L | R | | Cr | LC |
|---|---|---|---|---|
| NC— | —O—$C_5H_{10}$— $SiMeCl_2$ | | K 119.4 | S 191.4 I |
| $C_{10}H_{21}$—O— | —H | | K 106.8 | B 94 I |
| $C_7H_{15}$— | —CN | | K 61.5 | S 73.5 N 98 I |
| $C_8H_{17}$— | —CN | | K 52 | S 57.5 A 80 N 89 B |
| $C_9H_{19}$— | —CN | | K 56.2 | S 94.4 N 96.7 I |
| $C_{10}H_2$— | —CN | | K 47.2 | A 95.1 I |
| $C_{11}H_{23}$— | —CN | | K 65.5 | A 100.2 I |
| $C_7H_{15}$—O— | —CN | | K 80 | A 80.5 N 126 B |
| $C_8H_{17}$—O— | —CN | | K 103 | A 110 N 128 B |
| $C_{10}H_{21}$—O— | —CN | | K 87 | A 129 B |
| $C_{17}H_{35}$—CONH— | —CN | | K 144 | S 159 I |
| $C_2H_5$—CHMe—$C_4H_9$— | —CN | 1 | K 59.4 | S 67.2 I |
| $C_2H_5$—CHMe—$C_5H_{10}$— | —CN | 1 | K 44.7 | S 68.3 I |
| $C_7H_{15}$—O— | —$NO_2$ | | K 77.5 | A 94 N 106.5 B |
| $C_8H_{17}$—O— | —$NO_2$ | | K 111 | A 111 N 114 I |
| $C_{10}H_{21}$—O— | —$NO_2$ | | K 97 | A116 I |
| $C_{12}H_{25}$—O— | —$NO_2$ | | K 85 | A115 I |
| $C_{12}H_{25}$—NH— | —$NO_2$ | | K 109 | E 141 I |
| $C_{18}H_{37}$—NH— | —$NO_2$ | | K 112. | E 132 I |
| $C_{17}H_{35}$—CONH— | —$NO_2$ | | K 139 | A 160 B |
| $C_8H_{17}$— | —$C_8H_{17}$ | | K 46 | H 106 G 108 I |
| $C_9H_{19}$— | —$C_9H_{19}$ | | K 41 | H 93 G 109 I |
| $C_{10}H_{21}$— | —$C_{10}H_{21}$ | | K 64 | H 92 G 106 I |

TABLE 229-continued

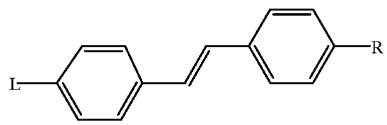

| L | R | Cr | LC |
|---|---|---|---|
| $C_{11}H_{23}$— | —$C_{11}H_{23}$ | K 61 | S 70 H 85 G 106 I |
| $C_{12}H_{25}$— | —$C_{12}H_{25}$ | K 75 | S 77 H 81 G 103 I |
| $C_5H_{11}$— | —O—$CH_3$ | K 118 | B 109.8 N 124.7 I |
| $C_5H_{11}$— | —O—$C_8H_{17}$ | K 121.3 | S 121.1 S125.5 S131 I |
| $CH_3$—O— | —O—$C_9H_{19}$ | K 149 | S 142.5 N 142.6 I |
| $CH_3$—O— | —O—$C_{12}H_{25}$ | K 142 | S 136 I |
| $CH_3$—O— | —O—$C_{14}H_{29}$ | K 139 | S 132 I |

TABLE 230

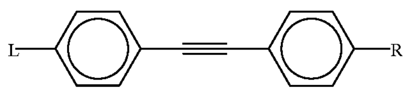

| No | L | R | | Cr | LC |
|---|---|---|---|---|---|
| 9165 | $C_2H_5$—CHMe—$CH_2$ —OOC— | —O—$C_{11}H_{22}$—O—H | S | K 80 | C* 58.9 A 72.8 I |
| 9179 | $C_5H_{11}$— | —Cl | | K 69 | N 37 E |
| 9182 | $C_{10}H_{21}$—O— | —Cl | | K 85.5 | C 86.5 I |
| 9200 | $CH_3$— | —CN | | K 160 | N 65 E |
| 9201 | $C_2H_5$— | —CN | | K 110 | N 62 E |
| 9209 | $C_{10}H_{21}$— | —CN | | K 64.4 | A 47.9 N 62.1 B |
| 9210 | $C_{11}H_{23}$— | —CN | | K 64 | A 61.4 N 66.7 I |
| 9211 | $C_{12}H_{25}$— | —CN | | K 72 | A 64.7 N 66 I |
| 9221 | $C_{14}H_{29}$—O— | —CN | | K 96 | A 91 I |
| 9226 | $C_7H_{15}$— | —O—$C_3H_6$—CN | | K 85.5 | A 70 N 77 I |

TABLE 231

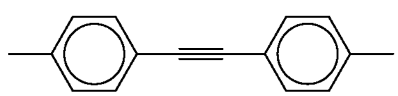

| No | L | R | | Cr | LC |
|---|---|---|---|---|---|
| 9227 | $C_7H_{15}$—O— | —O—$C_3H_6$—CN | | K 105.5 | N 102.5 U |
| 9228 | $C_5H_{11}$— | —O—$C_5H_{10}$—CN | | K 63.4 | A 53 N 701 |
| 9230 | $C_2H_5$—CHMe—$C_2H_4$— | —CN | S | K 81 | N* 23.5 B |
| 9237 | $H_2C$═CH—$CH_2$—O— | —CN | | K 115.2 | N 104.1 I |
| 9243 | CH3—NMe— | —$NO_2$ | | K 217 | X 220 Z |
| 9256 | $C_4H_9$— | —$C_7H_{15}$ | | K 6.2 | S −2.59 N 17.5 I |
| 9257 | $C_4H_9$— | —$C_8H_{17}$ | | K 14.2 | S 10.3 N 16.5 I |
| 9258 | $C_4H_9$— | —$C_9H_{19}$ | | K 30 | S 20.5 N 27 I |
| 9259 | $C_5H_{11}$— | —$C_6H_{13}$ | | K 31.2 | S21 I |
| 9260 | $C_5H_{11}$— | —$C_7H_{15}$ | | K 27.3 | S 17.5 N 39.1 I |
| 9261 | $C_5H_{11}$— | —$C_8H_{17}$ | | K 8.6 | S 30.5 N 33.7 I |
| 9262 | $C_5H_{11}$— | —$C_9H_{19}$ | | K 28 | S 37 N 44.9 I |
| 9263 | $C_6H_{13}$— | —$C_7H_{15}$ | | K 19.3 | S 20 N 30 I |
| 9264 | $C_6H_{13}$— | —$C_8H_{17}$ | | K 22.2 | S 27.8 I |
| 9265 | $C_6H_{13}$— | —$C_9H_{19}$ | | K 23.7 | S 31.7 I |
| 9266 | $C_7H_{15}$— | —$C_7H_{15}$ | | K 41.6 | S 35.2 N 40.8 I |
| 9267 | $C_7H_{15}$— | —$C_9H_{19}$ | | K 20 | S 43.8 I |
| 9271 | $CH_3$— | —O—$CH_3$ | | K 124.8 | N 32.1 E |

TABLE 232

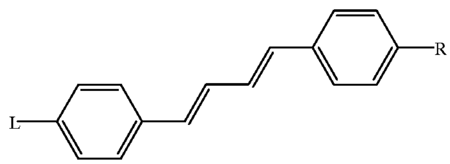

| LCReg | L | R | Phases |
|---|---|---|---|
| 10228 | $C_6H_{13}$—O— | —F | Cr 127.0 B 160.0 A 166.0 N 174.0 |
| 10229 | $C_6H_{13}$—O— | —Cl | Cr 147.0 B 185.0 A 189.0 |
| 10230 | $C_6H_{13}$—O— | —Br | Cr 153.0 B 189.0 A 194.0 N 198.0 |
| 10231 | $C_4H_9$—O— | —CN | Cr 137.0 N 186.0 |
| 10232 | $C_6H_{13}$—O— | —CN | Cr 107.0 N 190.0 |
| 10233 | $C_7H_{15}$—O— | —CN | Cr 110.0 A 119.0 N 186.0 |
| 10234 | $C_8H_{17}$—O— | —CN | Cr 106.0 A 147.0 N 180.0 |
| 10235 | $C_9H_{19}$—O— | —CN | Cr 94.0 A 167.0 N 180.0 |
| 10236 | $C_{10}H_{21}$—O— | —CN | Cr 95.0 A 175.0 N 180.0 |
| 10239 | $CH_3$—O— | —O—$CH_3$ | Cr 225.0 X 238.0 |
| 10242 | $C_6H_{13}$—O— | —O—$C_6H_{13}$ | Cr 187.0 N 194.0 |

TABLE 233

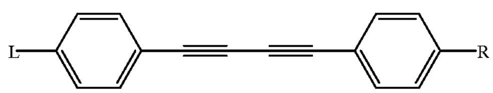

| LCReg | L | R | Phases |
|---|---|---|---|
| 10488 | $C_3H_7$— | —F | Cr 94.4 N 102.2 |
| 70165 | $C_8H_{17}$— | —F | Cr 67.1 N 73.2 |
| 10493 | $C_4H_9$—O— | —F | Cr 106.7 N 133.5 |
| 10494 | $C_6H_{13}$—O— | —F | Cr 98.4 N 122.8 |
| 10495 | $H_2C$═CH—$CH_2$—O— | —F | Cr 88.7 N 102.4 |
| 10496 | $C_2H_5$—CH═CH—$C_2H_4$—O— | —F | Cr 88.5 N 103.6 |
| 10497 | $CH_3$—CH═CH—$C_3H_6$—O— | —F | Cr 73.8 N 86.7 |
| 10498 | $H_2C$═CH—$C_4H_8$—O— | —F | Cr 96.8 N 123.8 |
| 63419 | $C_2H_5$—CH%CH—$C_2H_2$—O— | —F | Cr 88.1 N 103.6 |
| 63418 | $CH_3$—CH%CH—$C_3H_6$—O— | —F | Cr 73.8 N 86.7 |
| 10504 | $C_3H_7$— | —CN | Cr 164.0 N 174.0 |
| 67054 | $C_8H_{17}$—O— | —$NO_2$ | (142.0) Cr 149.3 A 153.8 |
| 67055 | $C_{10}H_{21}$—O— | —$NO_2$ | (127.0) Cr 138.5 S 153.6 |
| 67056 | $C_{12}H_{25}$—O— | —$NO_2$ | Cr 105.7 S 124.3 C 145.1 |
| 10511 | $C_6H_{13}$—O— | —$NO_2$ | Cr 127.5 N 146.0 |

TABLE 234

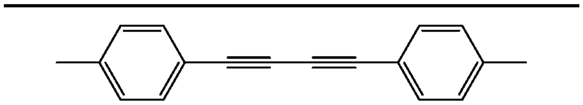

| LCReg | L | R | Phases |
|---|---|---|---|
| 10512 | $C_7H_{15}$—NH— | —$NO_2$ | CrX 100.0 Cr 115.5 N 132.0 |
| 10513 | $C_8H_{17}$—NH— | —$NO_2$ | Cr 124.0 N 136.0 |
| 10516 | $C_{11}H_{23}$—NH— | —$NO_2$ | Cr 112.0 A 125.0 N 129.0 |
| 10522 | $H_2C$═CH—$C_3H_6$—NH— | —$NO_2$ | CrX 128.0 Cr 143.0 N 149.5 |
| 10523 | $H_2C$═CH—$C_6H_{12}$—NH— | —$NO_2$ | Cr 111.0 N 128.0 |
| 10525 | $CH_3$— | —$C_3H_7$ | Cr 102.5 N 112.4 |
| 10526 | $CH_3$— | —$C_4H_9$ | Cr 75.8 N 99.2 |
| 10527 | $CH_3$— | —$C_5H_{11}$ | Cr 81.0 N 104.7 |

TABLE 234-continued

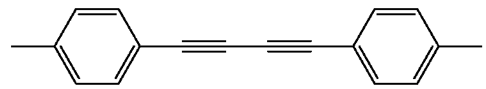

| LCReg | L | R | Phases |
|---|---|---|---|
| 10528 | $CH_3$— | —$C_6H_{13}$ | Cr 77.5 N 87.5 |
| 10529 | $CH_3$— | —$C_8H_{17}$ | Cr 78.8 N 82.5 |
| 10531 | $C_2H_5$— | —$C_3H_7$ | Cr 79.2 N 113.5 |
| 10532 | $C_2H_5$— | —$C_4H_9$ | Cr 43.6 N 97.7 |
| 10533 | $C_2H_5$— | —$C_5H_{11}$ | Cr 44.7 N 101.7 |
| 10534 | $C_2H_5$— | —$C_6H_{13}$ | Cr 50.7 N 84.2 |
| 10535 | $C_2H_5$— | —$C_8H_{17}$ | Cr 41.7 N 77.9 |

TABLE 235

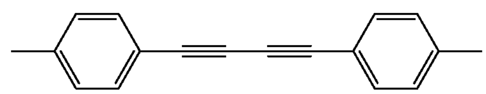

| LCReg | L | R | Phases |
|---|---|---|---|
| 10536 | $C_3H_7$— | —$C_3H_7$ | Cr 107.6 N 132.0 |
| 10537 | $C_3H_7$— | —$C_4H_9$ | Cr 83.7 N 115.0 |
| 10538 | $C_3H_7$— | —$C_5H_{11}$ | Cr 62.0 N 115.3 |
| 10539 | $C_3H_7$— | —$C_6H_{13}$ | Cr 41.5 N 97.5 |
| 10540 | $C_3H_7$— | —$C_8H_{17}$ | Cr 44.6 N 87.5 |
| 10541 | $C_4H_9$— | —$C_4H_9$ | Cr 75.5 N 100.1 |
| 10542 | $C_4H_9$— | —$C_5H_{11}$ | Cr 63.5 N 104.2 |
| 10543 | $C_4H_9$— | —$C_6H_{13}$ | Cr 30.0 N 90.4 |
| 10544 | $C_4H_9$— | —$C_8H_{17}$ | Cr 25.1 N 78.9 |
| 10545 | $C_5H_{11}$— | —$C_5H_{11}$ | Cr 86.0 N 111.3 |
| 10546 | $C_5H_{11}$— | —$C_6H_{13}$ | Cr 60.0 N 97.8 |
| 10547 | $C_5H_{11}$— | —$C_8H_{17}$ | Cr 40.7 N 88.5 |
| 10548 | $C_6H_{13}$— | —$C_6H_{13}$ | Cr 58.6 N 85.3 |
| 10549 | $C_6H_{13}$— | —$C_8H_{17}$ | Cr 34.1 N 77.5 |
| 10550 | $C_8H_{17}$— | —$C_8H_{17}$ | Cr 66.3 N 79.8 |

TABLE 236

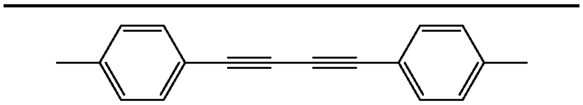

| LCReg | L | R | Phases |
|---|---|---|---|
| 67049 | $CH_3$— | —O—$C_8H_{17}$ | (75.0) Cr 108.0 S 110.8 C 137.4 |
| 67050 | $CH_3$— | —O—$C_{10}H_{21}$ | (75.0) Cr 80.9 S 85.7 N 116.6 |
| 67051 | $CH_3$— | —O—$C_{12}H_{25}$ | Cr 83.7 S 87.1 N 115.7 |
| 67052 | $CH_3$— | —O—$C_{14}H_{29}$ | Cr 85.0 S 107.6 |
| 10551 | $C_2H_5$— | —O—$C_2H_5$ | Cr 104.4 N 162.5 |
| 10552 | $C_3H_7$— | —O—$C_2H_5$ | Cr 88.0 N 187.7 |
| 10553 | $C_4H_9$— | —O—$CH_3$ | Cr 81.5 N 137.9 |
| 10554 | $C_4H_9$— | —O—$C_2H_5$ | Cr 98.4 N 142.1 |
| 10555 | $C_5H_{11}$— | —O—$C_2H_5$ | Cr 68.5 N 123.7 |
| 10556 | $C_6H_{13}$— | —O—$CH_3$ | Cr 55.8 N 122.9 |
| 10557 | $C_6H_{13}$— | —O—$C_2H_5$ | Cr 84.7 N 108.3 |
| 10558 | $CH_3$—O— | —O—$CH_3$ | Cr 139.4 N 188.2 |
| 10559 | $CH_3$—O— | —O—$C_2H_5$ | Cr 133.3 N 199.7 |
| 10560 | $CH_3$—O— | —O—$C_3H_7$ | Cr 109.4 N 177.3 |
| 10561 | $CH_3$—O— | —O—$C_4H_9$ | Cr 117.0 N 176.2 |

TABLE 237

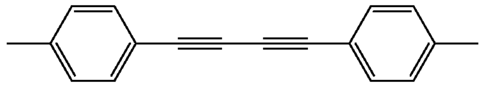

| LCReg | L | R | Phases |
|---|---|---|---|
| 10562 | $CH_3$—O— | —O—$C_5H_{11}$ | Cr 84.1 N 160.7 |
| 10563 | $CH_3$—O— | —O—$C_7H_{15}$ | Cr 88.9 N 146.3 |
| 67046 | $CH_3$—O— | —O—$C_8H_{17}$ | (77.0) Cr 99.0 S 108.5 C 137.2 |
| 67048 | $CH_3$—O— | —O—$C_{12}H_{25}$ | Cr 78.0 S 96.2 N 125.5 |
| 67053 | $CH_3$—O— | —O—$C_{14}H_{29}$ | Cr 78.3 C 82.5 N 121.8 |
| 10564 | $C_2H_5$—O— | —O—$C_2H_5$ | Cr 190.4 N 210.0 |
| 10565 | $C_2H_5$—O— | —O—$C_3H_7$ | Cr 136.6 N 194.4 |
| 10566 | $C_2H_5$—O— | —O—$C_4H_9$ | Cr 142.9 N 193.0 |
| 10567 | $C_2H_5$—O— | —O—$C_5H_{11}$ | Cr 116.1 N 177.9 |
| 10568 | $C_3H_7$—O— | —O—$C_3H_7$ | Cr 141.8 N 177.8 |
| 10569 | $C_4H_9$—O— | —O—$C_4H_9$ | Cr 153.5 N 176.1 |
| 10570 | $C_6H_{13}$—O— | —O—$C_6H_{13}$ | Cr 122.5 N 149.2 |
| 10571 | $C_8H_{17}$—O— | —O—$C_8H_{17}$ | CrX 72.3 Cr 108.9 N 135.1 |
| 10572 | $C_{10}H_{21}$—O— | —O—$C_{10}H_{21}$ | CrX 92.5 Cr 100.3 N 127.5 |
| 10573 | $C_{14}H_{29}$—O— | —O—$C_{14}H_{29}$ | CrX 83.4 C 97.0 S 104.1 S 109.0 N 115.7 |

TABLE 238

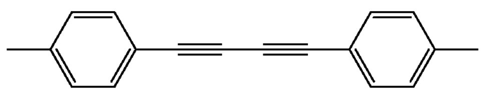

| LCReg | L | R | Phases |
|---|---|---|---|
| 10574 | $C_{15}H_{31}$—O— | —O—$C_{15}H_{31}$ | CrX 92.2 Cr 93.4 S 105.0 S 108.1 N 111.3 |
| 10576 | $C_2H_5$—COO— | —OOC—$C_2H_5$ | CrX 78.0 CrX 86.0 Cr 157.0 N 197.0 |
| 10577 | $C_3H_7$—COO— | —OOC—$C_3H_7$ | CrX 127.0 CrX 135.0 Cr 143.0 N 180.0 |
| 10578 | $C_4H_9$—COO— | —OOC—$C_4H_9$ | CrX −1.0 CrX 17.0 Cr 132.0 N 161.0 |
| 10579 | $C_5H_{11}$—COO— | —OOC—$C_5H_{11}$ | CrX 70.0 CrX 123.0 Cr 134.0 N 157.0 |
| 10580 | $C_6H_{13}$—COO— | —OOC—$C_6H_{13}$ | CrX 32.0 CrX 45.0 Cr 129.0 N 138.0 |
| 10581 | $C_7H_{15}$—COO— | —OOC—$C_7H_{15}$ | CrX 86.0 Cr 133.0 N 139.0 |
| 10582 | $C_8H_{17}$—COO— | —OOC—$C_8H_{17}$ | CrX 53.0 Cr 127.0 N 128.0 |
| 70175 | $C_3H_7$— | —CH═$CH_2$ | Cr 87.0 N 147.5 |
| 70176 | $C_4H_9$— | —CH═$CH_2$ | Cr 72.2 N 131.5 |
| 70177 | $C_5H_{11}$— | —CH═$CH_2$ | Cr 67.6 N 133.9 |
| 70178 | $C_6H_{13}$— | —CH═$CH_2$ | Cr 68.1 N 120.3 |

TABLE 239

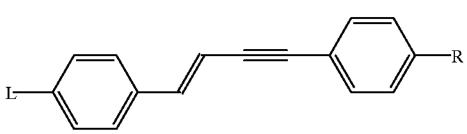

| LCReg | L | R | Phases |
|---|---|---|---|
| 59937 | $C_3H_7$— | —$C_5H_{11}$ | Cr 62.5 N 112.4 |

TABLE 240

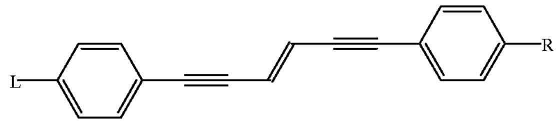

| LCReg | L | R | Phases |
|---|---|---|---|
| 60399 | $C_2H_5$— | —$C_3H_7$ | Cr 81.2 N 150.0 |
| 60400 | $C_3H_7$— | —$C_3H_7$ | Cr 95.3 N 162.3 |
| 60401 | $C_3H_7$— | —$C_4H_9$ | Cr 56.3 N 143.8 |
| 60402 | $C_3H_7$— | —$C_5H_{11}$ | Cr 64.1 N 146.0 |
| 60403 | $C_3H_7$— | —O—$CH_3$ | Cr 87.5 N 188.0 |
| 60404 | $C_3H_7$— | —O—$C_2H_5$ | Cr 111.0 N 200.0 |

TABLE 241

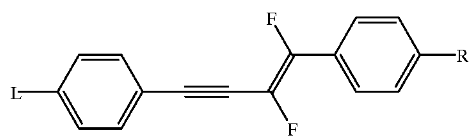

| LCReg | L | R | Phases |
|---|---|---|---|
| 10596 | $CH_3$— | —$CH_3$ | Cr 89.0 N 99.0 |

TABLE 242

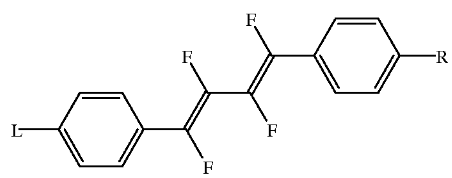

| LCReg | L | R | Phases |
|---|---|---|---|
| 57671 | $CH_3$— | —$CH_3$ | Cr 80.0 S 94.0 S 108.0 N 128.0 |
| 57672 | $CH_3$—O— | —O—$CH_3$ | Cr 84.0 S 95.0 N 196.0 |

TABLE 243

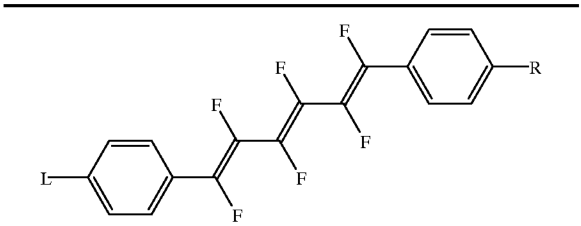

| LCReg | L | R | Phases |
|---|---|---|---|
| 10597 | $CH_3$— | —$CH_3$ | CrX 85.0 Cr 120.0 S 145.0 N 176.0 |
| 57673 | $CH_3$—O— | —O—$CH_3$ | Cr 101.0 N 204.0 |

TABLE 244

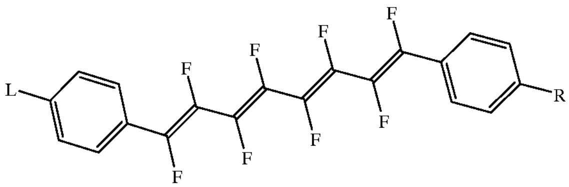

| LCReg | L | R | Phases |
|---|---|---|---|
| 57674 | $CH_3$— | —$CH_3$ | Cr 84.0 S 132.0 S 136.0 N 181.0 |
| 57675 | $CH_3$—O— | —O—$CH_3$ | Cr 95.0 S 102.0 N 195.0 |

TABLE 245

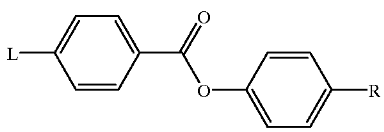

| L | R | Cr | LC |
|---|---|---|---|
| $C_9H_{19}$— | —O—$C_7H_{15}$ | K 46 | C 41 N 61 I |
| $C_9H_{19}$— | —O—$C_8H_{17}$ | K 53 | C 48 N 64 I |
| $C_9H_{19}$— | —O—$C_9H_{19}$ | K 54 | C 52 N 63 I |
| $C_9H_{19}$— | —O—$C_{10}H_{21}$ | K 58.7 | C 57.9 N 65.8 I |
| $C_9H_{19}$— | —O—$C_{12}H_{25}$ | K 62.1 | B 47.5 C 63.1 A 63.8 N 66.5 I |
| $C_9H_{19}$— | —O—$C_{14}H_{29}$ | K 63.7 | B 55.7 C 65.4 A 66.8 I |
| $C_9H_{19}$— | —O—$C_{16}H_{33}$ | K 69.4 | B 61.3 C 66.4 A 67.6 I |
| $C_{10}H_{21}$— | —O—$C_5H_{11}$ | K 52.5 | A 42.4 N 52.5 I |
| $C_{10}H_{21}$— | —O—$C_6H_{13}$ | K 44.1 | B 33.6 A 47.7 N 59 I |
| $C_{10}H_{21}$— | —O—$C_7H_{15}$ | K 52.8 | B 38.2 C 40.6 A 51.7 N 58.7 I |
| $C_{10}H_{21}$— | —O—$C_8H_{17}$ | K 55.2 | B 40.5 C 52.4 A 55.9 N 62.5 I |
| $C_{10}H_{21}$— | —O—$C_{10}H_{21}$ | K 61.4 | B 45.9 C 60.5 A 62.1 N 64.5 I |
| $C_{10}H_{21}$— | —O—$C_{12}H_{25}$ | K 64.5 | B 51 C 64.1 A 65.7 I |
| $C_{10}H_{21}$— | —O—$C_{14}H_{29}$ | K 65.2 | B 58.1 C 66.7 I |
| $C_{10}H_{21}$— | —O—$C_{16}H_{33}$ | K 67.2 | B 64.2 C 69.6 I |
| $C_{12}H_{25}$— | —O—$C_{16}H_{33}$ | K 73.7 | B 68.9 C 71 I |
| $C_6H_{13}$— | —CO—$C_4H_9$ | K 80 | A 76 I |
| $C_6H_{13}$— | —CO—$C_5H_{11}$ | K 91.6 | A 80.4 I |
| $C_6H_{13}$— | —CO—$C_7H_{15}$ | K 91.4 | A 85.8 I |
| $C_9H_{19}$— | —CO—$C_5H_{11}$ | K 86.7 | A 88.5 I |
| $C_{10}H_{21}$— | —CO—$C_4H_9$ | K 81.4 | A 87.3 I |
| $C_{10}H_{21}$— | —CO—$C_5H_{11}$ | K 87.8 | A 93.3 I |
| $C_{10}H_{21}$— | —CO—$C_7H_{15}$ | K 97.1 | A 93 I |
| $C_4H_9$— | —CO—$CH_2$—OOC —$C_3H_7$ | K 80.2 | S 90.4 N 95.6 I |
| $C_{10}H_{21}$— | —OOC—$C_7H_{15}$ | K 69 | C 61.7 N 70.4 I |
| $C_6H_{13}$—O— | —$C_6H_{13}$ | K 43.7 | A 36.7 N 59.6 I |
| $C_6H_{13}$—O— | —$C_8H_{17}$ | K 43.6 | A 42.1 N 61.6 I |
| $C_6H_{13}$—O— | —$C_9H_{19}$ | K 38.3 | C 26.1 A 40 N 65.2 I |

TABLE 245-continued

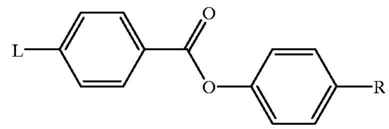

| L | R | Cr | LC |
|---|---|---|---|
| $C_6H_{13}$—O— | —$C_{10}H_{21}$ | K 51 | A 49 N 62 I |
| $C_6H_{13}$—O— | —$C_{12}H_{25}$ | K 61.2 | A 51.4 N 62.2 I |

TABLE 246

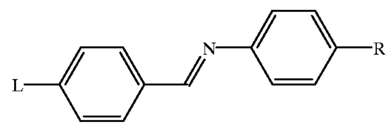

| L | R | Cr | LC |
|---|---|---|---|
| $C_4H_9$—O— | —$CH_3$ | K 65 | G 45 N 72 I |
| $C_4H_9$—O— | —$C_2H_5$ | K 40.5 | G 51 N 65.5 I |
| $C_4H_9$—O— | —$C_4H_9$ | K 8 | G 41 B 45 A 45.5 N 75 I |
| $C_4H_9$—O— | —$C_5H_{11}$ | K 28 | S 30 S 41.5 A 44.4 N 84.6 I |
| $C_4H_9$—O— | —$C_6H_{13}$ | K 26 | B 47.9 A 54.7 N 76.9 I |
| $C_4H_9$—O— | —$C_7H_{15}$ | K 20 | S 29 B 48.8 A 56.6 N 83.3 I |
| $C_4H_9$—O— | —$C_8H_{17}$ | K 33 | B 49.5 A 64.5 N 79 I |
| $C_4H_9$—O— | —$C_9H_{19}$ | K ? | B 48 A 64.7 N 80.2 I |
| $C_4H_9$—O— | —$C_{10}H_{21}$ | K 44.3 | B 46.8 A 64.7 N 76.7 I |
| $C_4H_9$—O— | —$C_{12}H_{25}$ | K 37.5 | G 45.6 B 52.5 A 69.4 N 76.7 I |
| $C_5H_{11}$—O— | —$CH_3$ | K 55 | G 44 N 70.5 I |
| $C_5H_{11}$—O— | —$C_2H_5$ | K 49.2 | G 54.2 N 59 I |
| $C_5H_{11}$—O— | —$C_3H_7$ | K 24 | A 58 N 77.7 B |
| $C_5H_{11}$—O— | —$C_4H_9$ | K 20 | G 51.9 A 52.4 N 69.2 I |
| $C_5H_{11}$—O— | —$C_5H_{11}$ | K 28 | G 46.1 B 48 C 52 A 53 N 77.5 I |
| $C_5H_{11}$—O— | —$C_6H_{13}$ | K 34.5 | B 41 F 44.3 B 51.6 C 53 A 61.1 N 72.9 I |
| $C_5H_{11}$—O— | —$C_7H_{15}$ | K 29.5 | G 33.9 B 51 C 53.1 A 62.8 N 78 I |
| $C_5H_{11}$—O— | —$C_8H_{17}$ | K 43.2 | G 26.2 B 53.7 A 67.8 N 75.1 I |
| $C_5H_{11}$—O— | —$C_9H_{19}$ | K ? | B 52.9 A 68.7 N 76.7 I |
| $C_5H_{11}$—O— | —$C_{10}H_{21}$ | K 41 | B 54 A 67 N 76.2 I |
| $C_5H_{11}$—O— | —$C_{11}H_{23}$ | K ? | B 53 A 70.4 N 75.1 I |
| $C_5H_{11}$—O— | —$C_{12}H_{25}$ | K 37 | B 53.3 A 71 N 73.9 I |
| $C_5H_{11}$—O— | —$C_{13}H_{27}$ | K ? | B 52.9 A 70.2 N 73.2 I |
| $C_5H_{11}$—O— | —$C_{14}H_{29}$ | K ? | B 52.7 A 69.5 N 71.2 I |
| $C_6H_{13}$—O— | —$CH_3$ | K 58 | G 44 B 53 N 76 I |
| $C_6H_{13}$—O— | —$C_2H_5$ | K 47 | G 58 N 70 I |
| $C_6H_{13}$—O— | —$C_3H_7$ | K 29 | G 65.7 A 68 N 85.6 I |
| $C_6H_{13}$—O— | —$C_4H_9$ | K 33.5 | G 58.5 B 59.8 A 70.1 N 77.8 I |
| $C_6H_{13}$—O— | —$C_5H_{11}$ | K 41.9 | G 45.6 B 62 A 75.1 N 85 I |
| $C_6H_{13}$—O— | —$C_6H_{13}$ | K 15 | G 35 B 63 A 77 N 82 I |

TABLE 247

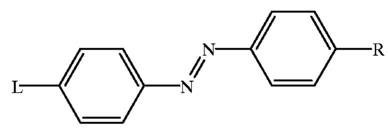

| L | R | Cr | LC |
|---|---|---|---|
| $C_8H_{17}$— | —$C_8H_{17}$ | K 47.9 | A 36.4 N 41.8 I |
| $C_9H_{19}$— | —$C_9H_{19}$ | K 37 | B 40.5 A 53.2 I |
| $C_{10}H_{21}$— | —$C_{10}H_{21}$ | K 42.3 | B 44.6 A 53.7 I |
| $CH_3$— | —O—$C_5H_{11}$ | K 61 | S 48 N 63 I |
| $C_4H_9$— | —O—$C_7H_{15}$ | K 53.7 | C 40.3 N 70.2 I |
| $C_4H_9$— | —O—$C_8H_{17}$ | K 55.2 | B 35 C 54.2 A 57.6 N 75.2 I |
| $C_4H_9$— | —O—$C_9H_{19}$ | K 62.1 | C 58.9 A 63.8 N 73.2 I |
| $C_4H_9$— | —O—$C_{10}H_{21}$ | K 54.4 | B 50.3 C 61.5 A 69.4 N 75.8 I |
| $C_4H_9$— | —O—$C_{12}H_{25}$ | K 62 | I 60 C 64 A 76 N 76.2 I |
| $C_4H_9$— | —O—$C_{14}H_{29}$ | K 64 | S 66 C 69 A 77 I |
| $C_4H_9$— | —O—$C_{18}H_{37}$ | K 72.5 | S 72 A 77 I |
| $C_8H_{17}$— | —O—$C_7H_{15}$ | K 53.2 | C 56.6 A 60.2 N 77.5 I |
| $C_9H_{19}$— | —O—$C_8H_{17}$ | K 49.2 | I 44.8 C 66 A 77.8 N 84.7 I |
| $C_9H_{19}$— | —O—$C_9H_{19}$ | K 51 | I 51.5 C 72.5 A 80.5 N 84.7 I |
| $C_9H_{19}$— | —O—$C_{10}H_{21}$ | K 42.5 | I 62.3 C 77.2 A 87.3 I |
| $C_9H_{19}$— | —O—$C_{12}H_{25}$ | K 41.5 | G 52 I 72.2 C 83 A 88.3 I |
| $C_9H_{19}$— | —O—$C_{14}H_{29}$ | K 51 | B 68 I 81.1 C 88.2 I |
| $C_9H_{19}$— | —O—$C_{16}H_{33}$ | K 57.5 | G 77.7 I 86.2 C 88.6 I |
| $C_9H_{19}$— | —O—$C_{18}H_{37}$ | K 63 | G 81.8 I 89 I |
| $CH_3$—OOC —CH═CH— | —CH═CH—COO—$CH_3$ | K 237 | S 246 S 249 I |
| $CH_3$—OOC —CH═CH— | —CH═CH—COO—$C_2H_5$ | K 237 | S 246 S 249 I |
| $C_2H_5$—OOC —CH═CH— | —CH═CH—COO—$C_2H_5$ | K 156 | A 240 I |
| $C_3H_7$—OOC —CH═CH— | —CH═CH—COO—$C_3H_7$ | K 120 | S 209 I |
| $CH_3$—O— | —CH═CH—COO—$C_2H_5$ | K 117.7 | A 124.2 N 142.8 I |
| $C_2H_5$—O— | —CH═CH—COO—$C_2H_5$ | K 110 | S 137 S 147 N 160 I |
| $C_5H_{11}$—O— | —CH═CH—COO—$C_5H_{11}$ | K 87 | E 91 A 133 I |
| $C_5H_{11}$—O— | —CH═CH—COO—$C_{10}H_{21}$ | K 50.5 | E 64 A 119 I |
| $C_{10}H_{21}$—O— | —CH═CH—COO—$C_5H_{11}$ | K 54 | E 94.5 C 95 A 127.5 I |
| $C_{10}H_{21}$—O— | —CH═CH—COO—$C_{10}H_{21}$ | K 59 | E 60 B 72 C 95 A 116.5 I |
| $CH_3$—COO— | —CH═CH—COO—$C_2H_5$ | K 138.3 | A 153.2 N 162.2 I |

TABLE 248

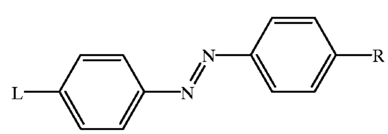

| LCReg | L | R | Phases |
|---|---|---|---|
| 13453 | Br—$C_6H_{12}$—O— | —CN | Cr 93.0 N 104.0 |
| 13454 | Br—$C_8H_{16}$—O— | —CN | Cr 84.4 A 98.3 N 102.8 |
| 40827 | OCN— | —NCO | Cr 169.0 N 176.0 |
| 41123 | $C_2H_5$—O— | —O—$C_6H_{12}$—O—H | Cr 123.0 N 135.0 |
| 57931 | $CH_3$—CO— | —O—$C_6H_{12}$—O—H | Cr 121.0 A 148.0 |
| 57926 | $C_2H_5$—CO— | —O—$C_6H_{12}$—O—H | Cr 93.0 A 148.0 |
| 27927 | $C_3H_7$—C— | —O—$C_6H_{12}$—O—H | Cr 118.0 A 136.0 |
| 57928 | $C_4H_9$—CO— | —O—$C_6H_{12}$—O—H | Cr 115.0 A 137.0 |
| 57929 | $C_5H_{11}$—CO— | —O—$C_6H_{12}$—O—H | Cr 114.0 A 120.0 |
| 57930 | $C_6H_{13}$—CO— | —O—$C_6H_{12}$—O—H | Cr 117.0 A 128.0 |
| 13547 | $C_{10}H_{21}$—O— | —O—$C_6H_{12}$—OOC—CMe ═CH—H | Cr 76.0 S 90.0 |
| 60744 | $C_6H_{13}$—O— | —Cl | Cr 85.1 A 91.0 |
| 60745 | $C_7H_{15}$—O— | —Cl | Cr 84.4 S 69.0 A 92.0 |
| 60746 | $C_8H_{17}$—O— | —Cl | Cr 79.6 A 94.6 |
| 60747 | $C_9H_{19}$—O— | —Cl | Cr 84.0 A 95.0 |

TABLE 249

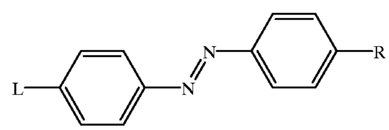

| LCReg | L | R | Phases |
|---|---|---|---|
| 60748 | $C_{10}H_{21}$—O— | —Cl | Cr 83.6 A 96.0 |
| 60749 | $C_{11}H_{23}$—O— | —Cl | Cr 93.5 A 94.7 |
| 60750 | $C_{12}H_{25}$—O— | —Cl | Cr 85.0 A 93.3 |
| 67299 | $C_8H_{17}$—O— | —Br | Cr 85.5 S 86.6 A 103.0 |
| 67302 | $C_{11}H_{23}$—O— | —Br | Cr 99.5 A 101.5 |
| 13608 | $CH_3$—O— | —OOC—$C_2H_4$—Br | (82.0) CrX 88.0 Cr 105.0 N 92.0 |
| 13626 | $C_4H_9$—O— | —CN | Cr 120.0 N 128.0 |
| 13627 | $C_5H_{11}$—O— | —CN | Cr 107.5 N 117.0 |
| 13628 | $C_6H_{13}$—O— | —CN | Cr 101.5 N 116.3 |
| 13629 | $C_7H_{15}$—O— | —CN | Cr 97.2 N 110.7 |
| 13630 | $C_8H_{17}$—O— | —CN | Cr 104.5 N 113.0 |
| 13631 | $C_9H_{19}$—O— | —CN | Cr 105.0 N 108.5 |
| 13632 | $C_{10}H_{21}$—O— | —CN | Cr 103.0 N 106.5 |
| 13640 | $C_7H_{15}$—COO— | —CN | Cr 109.0 N 104.6 |
| 13641 | $C_8H_{17}$—COO— | —CN | Cr 102.0 N 107.5 |

TABLE 250

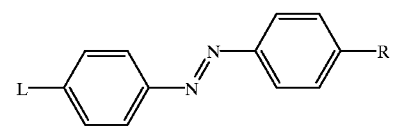

| LCReg | L | R | Phases |
|---|---|---|---|
| 13642 | $C_{17}H_{35}$—COO— | —CN | Cr 97.0 S 104.0 |
| 13644 | $CH_3$—OCOO— | —CN | Cr 157.0 N 168.5 |
| 13645 | $C_2H_5$—OCOO— | —CN | Cr 128.5 N 148.0 |
| 13646 | $C_3H_7$—OCOO— | —CN | Cr 105.0 N 124.5 |
| 13647 | $C_4H_9$—OCOO— | —CN | Cr 89.0 N 119.0 |
| 13648 | $C_5H_{11}$—OCOO— | —CN | Cr 82.0 N 111.0 |
| 13649 | $C_6H_{13}$—OCOO— | —CN | Cr 84.0 N 105.5 |
| 13650 | $C_7H_{15}$—OCOO— | —CN | Cr 83.0 N 102.5 |
| 13651 | $C_8H_{17}$—OCOO— | —CN | Cr 98.0 N 101.5 |
| 13652 | $C_9H_{19}$—OCOO— | —CN | Cr 75.0 A 78.0 N 98.0 |
| 13653 | $C_{10}H_{21}$—OCOO— | —CN | Cr 84.5 A 88.0 N 97.0 |
| 13654 | $C_{11}H_{23}$—OCOO— | —CN | Cr 87.0 A 93.5 N 96.0 |
| 13655 | $C_{12}H_{25}$—OCOO— | —CN | Cr 89.0 A 97.0 |
| 13665 | $C_7H_{15}$—OCOO— | —O—$C_4H_8$—CN | Cr 67.0 Are 77.0 A 86.0 |
| 57660 | $C_7H_{15}$—OCOO— | —O—$C_5H_{10}$—CN | Cr 67.0 A 87.0 |

TABLE 251

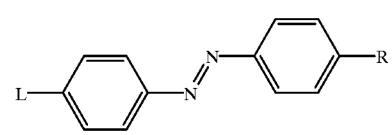

| LCReg | L | R | * | Phases |
|---|---|---|---|---|
| 41540 | $C_7H_{15}$—O— | —$NO_2$ | | Cr 85.0 94.0 N 97.0 |
| 13678 | $C_8H_{17}$—O— | —$NO_2$ | | Cr 91.0 A 99.0 N 100.4 |
| 41541 | $C_9H_{19}$—O— | —$NO_2$ | | Cr 82.0 A 100.0 |
| 13679 | $C_{10}H_{21}$—O— | —$NO_2$ | | Cr 89.0 A 99.0 |
| 41542 | $C_{11}H_{23}$—O— | —$NO_2$ | | Cr 83.0 A 100.0 |
| 41543 | $C_{12}H_{25}$—O— | —$NO_2$ | | Cr 85.0 A 101.0 |
| 60635 | $C_7H_{15}$—NH— | —$NO_2$ | | (70.0) Cr ? A 79.4 N 86.1 |
| 60636 | $C_8H_{17}$—NH— | —$NO_2$ | | (68.0) Cr ? A 81.9 N 85.4 |
| 60637 | $C_9H_{19}$—NH— | —$NO_2$ | | Cr 76.0 A 85.6 N 86.9 |
| 60638 | $C_{10}H_{21}$—NH— | —$NO_2$ | | Cr 84.3 A 89.0 |
| 60639 | $C_{11}H_{23}$—NH— | —$NO_2$ | | Cr 90.7 A 93.3 |
| 60641 | $C_{14}H_{29}$—NH— | —$NO_2$ | | (93.0) Cr ? A 98.8 |
| 13692 | $C_{17}H_{35}$—COO— | —$NO_2$ | | Cr 76.0 S 93.0 |
| 13730 | $C_2H_5$—O— | —NCO | | Cr 117.0 N 141.0 |
| 58270 | $C_{12}H_{25}$—O— | —O—$C_2H_4$—CHMe —$C_2H_4$—CH═C(Me)2 | 1 | (52.0) Cr 63.2 A 69.4 |

TABLE 252

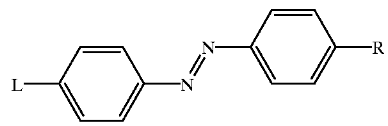

| LCReg | L | R | * | Phases |
|---|---|---|---|---|
| 58271 | $C_{14}H_{29}$—O— | —O—$C_2H_4$—CHMe—$C_2H_4$ —CH═C(Me)2 | 1 | (46.0) Cr 57.7 A 64.4 |
| 60467 | $C_2H_5$—CHMe —$CH_2$—OOC— | —O—$C_{10}H_{20}$—SiMe2—O —SiMe3 | S | Cr 31.6 A 49.9 |
| 60468 | $C_2H_5$—CHMe —$CH_2$—OOC— | —O—$C_{10}H_{20}$—SiMe2—O —SiMe3 | 2 | Cr 31.5 A 48.0 |
| 13754 | $C_3H_7$— | —$C_5H_{11}$ | | Cr −7.0 N 44.5 |
| 13756 | $C_3H_7$— | —$C_7H_{15}$ | | Cr 4.0 N 35.5 |
| 13757 | $C_3H_7$— | —$C_8H_{17}$ | | Cr 17.5 N 29.5 |
| 13758 | $C_3H_7$— | —$C_9H_{19}$ | | Cr 25.5 N 42.0 |
| 13759 | $C_3H_7$— | —$C_{10}H_{21}$ | | Cr 22.0 N 39.0 |
| 13776 | $C_2H_5$— | —O—$C_6H_{13}$ | | Cr 67.0 N 69.0 |
| 40681 | $C_2H_5$— | —O—$C_8H_{17}$ | | Cr 65.0 N 70.0 |
| 40682 | $C_2H_5$— | —O—$C_9H_{19}$ | | Cr 62.0 N 68.0 |
| 13777 | $C_3H_7$— | —O—$CH_3$ | | Cr 60.0 N 69.0 |
| 13778 | $C_3H_7$— | —O—$C_2H_5$ | | Cr 88.0 N 100.0 |
| 13780 | $C_3H_7$— | —O—$C_4H_9$ | | Cr 74.0 N 85.0 |
| 13781 | $C_3H_7$— | —O—$C_6H_{13}$ | | Cr 65.0 N 81.0 |

TABLE 253

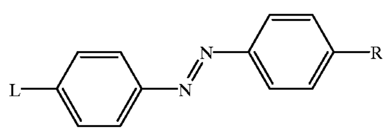

| LCReg | L | R | Phases |
|---|---|---|---|
| 13782 | $C_4H_9$— | —O—$CH_3$ | (18.0) Cr 32.5 N 48.6 |
| 13783 | $C_4H_9$— | —O—$C_2H_5$ | (37.0) Cr 43.3 N 78.1 |
| 13784 | $C_4H_9$— | —O—$C_3H_7$ | (55.0) Cr 65.5 N 57.1 |
| 13785 | $C_4H_9$— | —O—$C_4H_9$ | (57.0) Cr 64.9 N 74.5 |
| 13786 | $C_4H_9$— | —O—$C_5H_{11}$ | (39.0) Cr 42.5 N 65.4 |
| 13795 | $C_5H_{11}$ | —O—$CH_3$ | (33.0) Cr 40.0 N 67.1 |
| 13796 | $C_5H_{11}$— | —O—$C_2H_5$ | (57.0) Cr 71.5 N 91.7 |
| 13797 | $C_5H_{11}$— | —O—$C_3H_7$ | (50.0) Cr 56.7 N 74.9 |
| 13798 | $C_5H_{11}$— | —O—$C_4H_9$ | (62.0) Cr 67.8 N 87.6 |
| 70100 | $C_5H_{11}$— | —O—$C_5H_{11}$ | (50.0) Cr 54.9 N 79.3 |

TABLE 253-continued

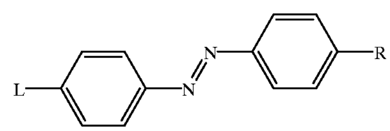

| LCReg | L | R | Phases |
|---|---|---|---|
| 70101 | $C_5H_{11}$— | —O—$C_6H_{13}$ | (37.0) Cr 47.0 N 85.8 |
| 70102 | $C_5H_{11}$— | —O—$C_7H_{15}$ | (31.0) Cr 47.0 A 46.4 N 81.8 |
| 70103 | $C_5H_{11}$— | —O—$C_8H_{17}$ | (30.0) Cr 59.0 Sml 38.6 C 61.6 A 64.1 N 85.8 |
| 70104 | $C_5H_{11}$— | —O—$C_9H_{19}$ | (41.0) Cr 51.3 Sml 46.8 C 65.1 A 72.4 N 84.0 |
| 70105 | $C_5H_{11}$— | —O—$C_{10}H_{21}$ | (31.0) Cr 51.9 Sml 56.6 C 69.8 A 79.4 N 85.8 |

TABLE 254

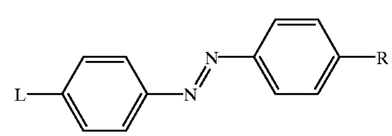

| LCReg | L | R | Phases | | | |
|---|---|---|---|---|---|---|
| 70106 | $C_5H_{11}$— | —O—$C_{11}H_{23}$ | (43.0) | Cr 58.7 | Sml 61.9 | C 72.0 |
| | | | A 81.8 | N 84.2 | | |
| 70107 | $C_5H_{11}$— | —O—$C_{12}H_{25}$ | (37.0) | Cr 60.4 | Sml 67.8 | C 73.3 |
| | | | A 84.2 | N 84.8 | | |
| 70108 | $C_5H_{11}$— | —O—$C_{14}H_{29}$ | (40.0) | Cr 62.0 | Sml 72.8 | C 84.4 |
| 70109 | $C_5H_{11}$— | —O—$C_{16}H_{33}$ | (35.0) | Cr 65.8 | Sml 77.2 | C 84.9 |
| 70110 | $C_5H_{11}$— | —O—$C_{18}H_{37}$ | (52.0) | Cr 66.1 | Sml 80.6 | |
| 13799 | $C_6H_{13}$— | —O—$CH_3$ | Cr 40.0 | N 51.0 | | |
| 13800 | $C_6H_{13}$— | —O—$C_2H_5$ | Cr 41.0 | N 55.0 | | |

TABLE 254-continued

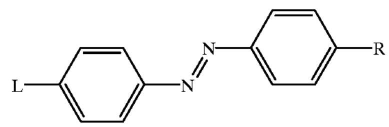

| LCReg | L | R | Phases | | |
|---|---|---|---|---|---|
| 13801 | $C_6H_{13}$— | —O—$C_3H_7$ | Cr 42.0 | N 56.0 | |
| 13802 | $C_6H_{13}$— | —O—$C_4H_9$ | Cr 44.0 | N 67.0 | |
| 59700 | $C_6H_{13}$— | —O—$C_5H_{11}$ | Cr 39.9 | N 69.2 | |
| 59701 | $C_7H_{15}$— | —O—$C_6H_{13}$ | CrX 37.0 | Cr 50.1 | N 83.1 |
| 13848 | $CH_3$—O— | —O—$C_8H_{17}$ | Cr 98.0 | N 101.0 | |
| 13855 | $C_6H_{13}$—O— | —O—$C_6H_{13}$ | Cr 104.0 | N 115.0 | |
| 57657 | $C_6H_{13}$—O— | —O—$C_{12}H_{25}$ | Cr 88.5 | C 96.0 | N 106.8 |
| 13856 | $C_7H_{15}$—O— | —O—$C_7H_{15}$ | Cr 101.3 | N 109.1 | |

TABLE 255

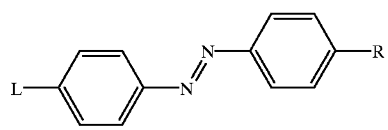

| LCReg | L | R | Phases | | |
|---|---|---|---|---|---|
| 65895 | $C_6H_{13}$—O— | —NH—CH%CH—CO—$C_{11}H_{23}$ | Cr 136.0 | G 127.8 | |
| | | | F 145.0 | C 187.3 | |
| 14007 | $C_6H_{13}$—O— | —CO—$CH_3$ | CrX −3000.0 | Cr 102.4 | |
| | | | A 119.4 | N 120.4 | |
| 14008 | $C_{12}H_{25}$—O— | —CO—$CH_3$ | Cr 106.0 | A 116.0 | |
| 65863 | $C_6H_{13}$—O— | —CO—CH%CH—NH—$C_3H_7$ | Cr 135.8 | N 182.1 | |
| 65870 | $C_6H_{13}$—O— | —CO—CH%CH—NH—$C_{10}H_{21}$ | Cr 112.5 | C 121.6 | N 148.8 |
| 65871 | $C_6H_{13}$—O— | —CO—CH%CH—NH—$C_{11}H_{23}$ | Cr 107.0 | C 126.0 | N 148.3 |
| 65872 | $C_6H_{13}$—O— | —CO—CH%CH—NH—$C_{12}H_{25}$ | Cr 102.0 | C 128.0 | N 145.0 |
| 65873 | $C_6H_{13}$—O— | —CO—CH%CH—NH—$C_{13}H_{27}$ | Cr 97.6 | C 131.7 | N 145.2 |
| 65874 | $C_6H_{13}$—O— | —CO—CH%CH—NH—$C_{15}H_{31}$ | Cr 91.2 | C 133.3 | N 140.7 |
| 65875 | $C_6H_{13}$—O— | —CO—CH%CH—NH—$C_{18}H_{37}$ | Cr 97.1 | C 131.9 | N 134.8 |
| 13874 | $C_4H_9$—O— | —COO—$C_3H_7$ | Cr 74.0 | S 91.0 | |
| 13879 | $C_5H_{11}$—O— | —COO—$C_3H_7$ | Cr 72.0 | S 86.0 | |
| 13880 | $C_5H_{11}$—O— | —COO—$C_5H_{11}$ | Cr 77.0 | A 80.5 | |
| 13884 | $C_6H_{13}$—O— | —COO—$C_3H_7$ | Cr 64.0 | S 95.0 | |
| 13889 | $C_7H_{15}$—O— | —COO—$C_3H_7$ | Cr 68.0 | S 96.0 | |

TABLE 256

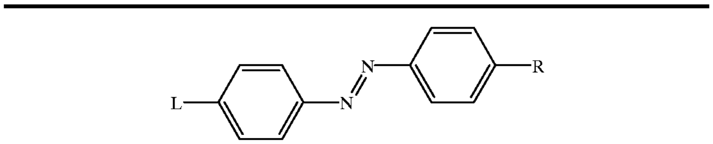

| LCReg | L | R | Phases | | |
|---|---|---|---|---|---|
| 13891 | $C_8H_{17}$—O— | —COO—$C_2H_5$ | Cr 85.0 | S 105.5 | |
| 13892 | $C_8H_{17}$—O— | —COO—$C_3H_7$ | Cr 70.0 | S 101.0 | |
| 13893 | $C_8H_{17}$—O— | —COO—$C_4H_9$ | (63.0) | Cr 71.0 | S 85.0 |
| 13894 | $C_8H_{17}$—O— | —COO—$C_6H_{13}$ | (36.0) | Cr 54.0 | S 88.0 |
| 13896 | $C_9H_{19}$—O— | —COO—$C_4H_9$ | (37.0) | Cr 43.0 | S 57.0 |
| 13897 | $C_9H_{19}$—O— | —COO—$C_6H_{13}$ | (32.0) | Cr 60.0 | S 88.0 |
| 13900 | $C_{10}H_{21}$—O— | —COO—$C_3H_7$ | Cr 78.0 | S 99.0 | |
| 13901 | $C_{10}H_{21}$—O— | —COO—$C_4H_9$ | (58.0) | Cr 62.0 | S 74.0 |
| 13902 | $C_{10}H_{21}$—O— | —COO—$C_5H_{11}$ | Cr 73.0 | A 95.5 | |
| 13903 | $C_{10}H_{21}$—O— | —COO—$C_6H_{13}$ | (69.0) | Cr 77.0 | S 89.0 |

TABLE 256-continued

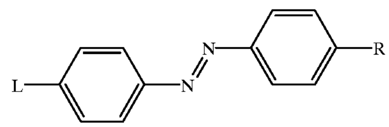

| LCReg | L | R | Phases | | | |
|---|---|---|---|---|---|---|
| 13906 | $C_{12}H_{25}$—O— | —COO—$C_2H_5$ | Cr 92.0 | S 102.0 | | |
| 13907 | $C_{12}H_{25}$—O— | —COO—$C_3H_7$ | Cr 73.0 | S 95.0 | | |
| 13909 | $C_{14}H_{29}$—O— | —COO—$C_2H_5$ | Cr 88.0 | S 99.0 | | |
| 14045 | $CH_3$—CO— | —COO—$C_3H_7$ | Cr 111.0 | A 110.0 | N 122.0 | |
| 14047 | $CH_3$—CO— | —COO—$C_5H_{11}$ | CrX 89.0 | Cr 106.0 | A 110.0 | N 118.0 |

TABLE 257

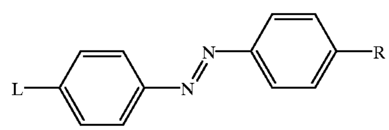

| LCReg | L | R | Phases | | | |
|---|---|---|---|---|---|---|
| 14048 | $CH_3$—CO— | —OOC—$C_6H_{13}$ | CrX 60.0 | Cr 100.5 | A 114.0 | |
| | | | N 115.0 | | | |
| 14049 | $CH_3$—CO— | —OOC—$C_7H_{15}$ | CrX 53.0 | CrX 68.0 | Cr 102.5 | |
| | | | A 116.5 | N 117.0 | | |
| 14050 | $CH_3$—CO— | —OOC—$C_8H_{17}$ | CrX 77.0 | Cr 102.5 | A 117.5 | |
| 14051 | $CH_3$—CO— | —OOC—$C_9H_{19}$ | CrX 76.0 | Cr 105.0 | A 119.5 | |
| 14052 | $CH_3$—CO— | —OOC—$C_{10}H_{21}$ | CrX 89.0 | Cr 104.0 | A 119.0 | |
| 14056 | $CH_3$—CO— | —OOC—$C_{14}H_{29}$ | CrX 102.0 | Cr 108.0 | A 117.5 | |
| 14057 | $CH_3$—CO— | —OOC—$C_{15}H_{31}$ | CrX 101.0 | Cr 108.5 | A 117.0 | |
| 14058 | $CH_3$—CO— | —OOC—$C_{16}H_{33}$ | CrX 107.0 | Cr 109.5 | A 116.0 | |
| 14059 | $CH_3$—CO— | —OOC—$C_{17}H_{35}$ | CrX 105.0 | Cr 111.0 | A 115.5 | |
| 14060 | $C_2H_5$—CO— | —OOC—$CH_3$ | Cr 105.0 | B 129.0 | N 152.5 | |
| 14061 | $C_2H_5$—CO— | —OOC—$C_2H_5$ | Cr 124.0 | B 135.0 | A 136.5 | N 158.5 |
| 14062 | $C_2H_5$—CO— | —OOC—$C_3H_7$ | Cr 93.0 | S 119.5 | A 136.5 | N 155.5 |
| 14063 | $C_2H_5$—CO— | —OOC—$C_4H_9$ | Cr 84.5 | S 94.0 | B 98.0 | C 99.0 |
| | | | A 140.0 | N 147.0 | | |
| 4064 | $C_2H_5$—CO— | —OOC—$C_5H_{11}$ | Cr 99.0 | B 88.5 | A 138.5 | N 147.5 |
| 14065 | $C_2H_5$—CO— | —OOC—$C_6H_{13}$ | Cr 92.0 | Bcr 85.4 | B 88.7 | A 141.5 |
| | | | N 143.5 | | | |

TABLE 258

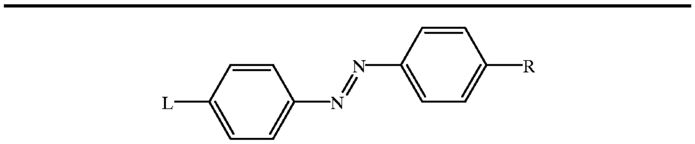

| LCReg | L | R | Phases | | | |
|---|---|---|---|---|---|---|
| 14066 | $C_2H_5$—CO— | —OOC—$C_7H_{15}$ | Cr 96.5 | Bcr 80.6 | B 86.7 | A 143.0 |
| | | | N 143.5 | | | |
| 14067 | $C_2H_5$—CO— | —OOC—$C_8H_{17}$ | Cr 94.0 | Bcr 80.1 | B 87.9 | A 144.0 |
| 14069 | $C_2H_5$—CO— | —OOC—$C_{10}H_{21}$ | Cr 97.5 | A 143.5 | | |
| 14070 | $C_2H_5$—CO— | —OOC—$C_{11}H_{23}$ | Cr 100.5 | A 143.0 | | |
| 14071 | $C_2H_5$—CO— | —OOC—$C_{12}H_{25}$ | Cr 101.0 | A 143.5 | | |
| 14072 | $C_2H_5$—CO— | —OOC—$C_{13}H_{27}$ | Cr 102.5 | A 140.5 | | |
| 14073 | $C_2H_5$—CO— | —OOC—$C_{14}H_{29}$ | Cr 103.5 | A 139.0 | | |
| 14074 | $C_2H_5$—CO— | —OOC—$C_{15}H_{31}$ | Cr 105.0 | A 137.5 | | |
| 14075 | $C_2H_5$—CO— | —OOC—$C_{16}H_{33}$ | Cr 106.5 | A 136.5 | | |
| 14076 | $C_2H_5$—CO— | —OOC—$C_{17}H_{35}$ | Cr 107.5 | A 134.5 | | |

TABLE 258-continued

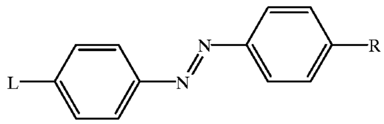

| LCReg | L | R | Phases | | | |
|---|---|---|---|---|---|---|
| 14079 | $C_3H_7$—CO— | —OOC—$C_3H_7$ | (87.0) A 119.5 | Cr 110.0 N 123.5 | S 99.5 | S 106.5 |
| 14080 | $C_3H_7$—CO— | —OOC—$C_4H_9$ | Cr 90.0 | S 104.0 | A 119.5 | |
| 14081 | $C_3H_7$—CO— | —OOC—$C_5H_{11}$ | (75.0) N 119.5 | Cr 100.0 | S 94.0 | A 118.5 |
| 14082 | $C_3H_7$—CO— | —OOC—$C_6H_{13}$ | (76.0) A 119.5 | Cr 95.0 | S 80.0 | S 88.5 |
| 14083 | $C_3H_7$—CO— | —OOC—$C_7H_{15}$ | (80.0) | Cr 95.5 | S 84.0 | A 122.0 |

TABLE 259

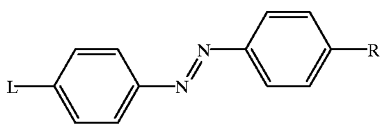

| LCReg | L | R | Phases | | | |
|---|---|---|---|---|---|---|
| 14084 | $C_3H_7$—CO— | —OOC—$C_8H_{17}$ | (82.0) | Cr 94.5 | S 83.5 | A 123.0 |
| 14085 | $C_3H_7$—CO— | —OOC—$C_9H_{19}$ | (85.0) | Cr 96.5 | S 86.0 | A 124.0 |
| 14086 | $C_3H_7$—CO— | —OOC—$C_{10}H_{21}$ | (84.0) | Cr 98.0 | A 124.0 | |
| 14087 | $C_3H_7$—CO— | —OOC—$C_{11}H_{23}$ | (86.0) | Cr 99.0 | A 124.0 | |
| 14088 | $C_3H_7$—CO— | —OOC—$C_{12}H_{25}$ | (93.0) | Cr 100.5 | A 123.0 | |
| 14089 | $C_3H_7$—CO— | —OOC—$C_{13}H_{27}$ | (91.0) | Cr 101.5 | A 122.0 | |
| 14090 | $C_3H_7$—CO— | —OOC—$C_{14}H_{29}$ | (97.0) | Cr 103.5 | A 121.0 | |
| 14091 | $C_3H_7$—CO— | —OOC—$C_{15}H_{31}$ | (96.0) | Cr 104.5 | A 120.0 | |
| 14092 | $C_3H_7$—CO— | —OOC—$C_{16}H_{33}$ | (101.0) | Cr 106.5 | A 118.5 | |
| 14093 | $C_3H_7$—CO— | —OOC—$C_{17}H_{35}$ | (101.0) | Cr 106.4 | A 117.5 | |
| 14094 | $C_4H_9$—CO— | —OOC—$CH_3$ | (113.0) | CrX 94.3 | Cr 114.2 | N 126.9 |
| 14095 | $C_4H_9$—CO— | —OOC—$C_2H_5$ | (114.0) N 132.9 | CrX 71.9 | Cr 118.3 | A 120.9 |
| 14096 | $C_4H_9$—CO— | —OOC—$C_3H_7$ | (90.0) N 131.5 | Cr 100.1 | H 104.9 | A 125.2 |
| 14097 | $C_4H_9$—CO— | —OOC—$C_4H_9$ | Cr 81.9 | H 103.9 | E 104.3 | A 126.3 |
| 14098 | $C_4H_9$—CO— | —OOC—$C_5H_{11}$ | CrX 50.6 A 128.0 | Cr 91.9 | H 102.0 | E 104.3 |

TABLE 260

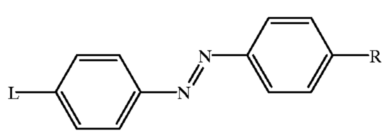

| LCReg | L | R | Phases | | |
|---|---|---|---|---|---|
| 14099 | $C_4H_9$—CO— | —OOC—$C_6H_{13}$ | (53.0) H 97.9 | CrX 73.9 E 102.4 | Cr 98.2 A 128.5 |
| 14100 | $C_4H_9$—CO— | —OOC—$C_7H_{15}$ | (79.0) H 86.2 | CrX 60.0 E 96.9 | Cr 93.0 A 130.6 |
| 14101 | $C_4H_9$—CO— | —OOC—$C_8H_{17}$ | (76.0) E 93.6 | CrX 79.0 A 131.1 | Cr 94.0 |
| 14102 | $C_4H_9$—CO— | —OOC—$C_9H_{19}$ | (84.0) S 91.5 | CrX 65.0 A 132.0 | Cr 95.4 |

TABLE 260-continued

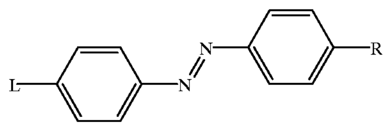

| LCReg | L | R | Phases | | |
|---|---|---|---|---|---|
| 14103 | $C_4H_9$—CO— | —OOC—$C_{10}H_{21}$ | (86.0)<br>S 90.7 | CrX 81.2<br>A 131.4 | Cr 95.5 |
| 14104 | $C_4H_9$—CO— | —OOC—$C_{11}H_{23}$ | (88.0)<br>Cr 97.8 | CrX 42.4<br>S 89.9 | CrX 74.3<br>A 131.2 |
| 14105 | $C_4H_9$—CO— | —OOC—$C_{12}H_{25}$ | (87.0)<br>S 88.7 | CrX 88.3<br>A 129.7 | Cr 98.4 |
| 14106 | $C_4H_9$—CO— | —OOC—$C_{13}H_{27}$ | (90.0)<br>Cr 100.3 | CrX 51.9<br>A 129.4 | CrX 81.2 |
| 14107 | $C_4H_9$—CO— | —OOC—$C_{14}H_{29}$ | (95.0)<br>A 128.0 | CrX 95.7 | Cr 101.6 |
| 14108 | $C_4H_9$—CO— | —OOC—$C_{15}H_{31}$ | (97.0)<br>Cr 104.2 | CrX 60.7<br>A 126.4 | CrX 88.6 |
| 14109 | $C_4H_9$—CO— | —OOC—$C_{16}H_{33}$ | (100.0)<br>A 123.8 | CrX 98.3 | Cr 104.2 |
| 14110 | $C_4H_9$—CO— | —OOC—$C_{17}H_{35}$ | (101.0)<br>Cr 106.1 | CrX 66.4<br>A 124.1 | CrX 94.3 |
| 14129 | $CH_3$—CO— | —OOC—$C_2H_5$ | CrX −3000.0<br>S 108.0 | Cr 119.0<br>N 126.0 | S 95.0 |
| 14157 | $C_{10}H_{21}$—O— | —CH═CH—COO—$CH_2$—CHMe—$C_2H_5$ | Cr 79.0 | C 87.0 | A 119.0 |
| 14158 | $C_{10}H_{21}$—O— | —CH═CMe—COO—$CH_2$—CHMe—$C_2H_5$ | Cr 68.0 | C 88.0 | A 97.0 |

TABLE 261

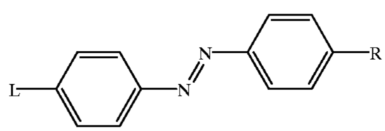

| LCReg | L | R | * | Phases | | |
|---|---|---|---|---|---|---|
| 14149 | $C_2H_5$—O— | —COO—$CH_2$—CHMe—$CH_3$ | | Cr 90.0 | S <? | N 91.0 |
| 14162 | $C_6H_{13}$—CO— | —COO—$CH_2$—CHMe—$CH_3$ | | (69.0)<br>A 96.0 | Cr 83.9<br>N 99.8 | C 82.7 |
| 59970 | $C_4H_9$—CO— | —OOC—$CH_2$—CHMe—$C_2H_5$ | 1 | (69.0)<br>A 96.0 | Cr ?<br>N* 99.8 | C* 82.7 |
| 63549 | $C_2H_5$—CO— | —OOC—$CH_2$—CHMe—$C_2H_5$ | 2 | (80.0)<br>N 121.5 | Cr 92.8 | A 113.5 |
| 63550 | $C_4H_9$—CO— | —OOC—$CH_2$—CHMe—$C_2H_5$ | 2 | (78.0)<br>N 98.4 | Cr 84.4 | A 92.3 |
| 63551 | $C_5H_{11}$—CO— | —OOC—$CH_2$—CHMe—$C_2H_5$ | 2 | Cr 81.0<br>N 96.7 | S 81.1 | A 92.7 |
| 63552 | $C_6H_{13}$—CO— | —OOC—$CH_2$—CHMe—$C_2H_5$ | 2 | (65.0)<br>A 96.0 | Cr 83.9<br>N 99.8 | C 82.7 |
| 14159 | $CH_3$—COO— | —CH═CH—COO—$CH_2$<br>—CHMe—$C_2H_5$ | 1 | Cr 103.5<br>N* 112.0 | S 108.0 | |
| 63548 | $C_2H_5$—CO— | —OOC—$C_2H_4$—CHMe—$CH_3$ | | (78.0) | Cr 87.7 | A 94.6 |
| 63553 | $C_4H_9$—CO— | —OOC—$C_2H_4$—CHMe—$CH_3$ | | (53.0) | Cr 68.8 | A 60.4 |
| 63554 | $C_5H_{11}$—CO— | —OOC—$C_2H_4$—CHMe—$CH_3$ | | (53.0) | Cr 68.7 | A 60.9 |
| 63555 | $C_6H_{13}$—CO— | —OOC—$C_2H_4$—CHMe—$CH_3$ | | (57.0) | Cr 69.0 | A 71.5 |
| 63556 | $C_2H_5$—CO— | —OOC—CHCl—$CH_3$ | 2 | (139.0)<br>A 148.4 | Cr 140.6 | |
| 14203 | $C_4H_9$—O— | —O—$CF_3$ | | Cr 79.0 | S 106.0 | |
| 14209 | $C_4H_9$—O— | —O—$CF_2$—H | | Cr 79.0 | S 91.0 | |

TABLE 262

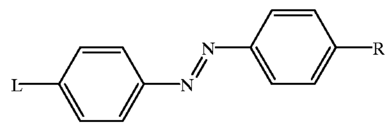

| LCReg | L | R | Phases | | |
|---|---|---|---|---|---|
| 14179 | $C_{10}H_{21}$—O— | —O—$C_5H_{10}$—OOC—CH═$CH_2$ | Cr 66.0 | S 88.0 | N 94.0 |
| 41135 | $C_6H_{13}$—O— | —O—$C_6H_{12}$—OOC—CH═$CH_2$ | Cr 85.0 | S 85.0 | N 95.0 |
| 14181 | $C_{10}H_{21}$—O— | —O—$C_6H_{12}$—OOC—CH═$CH_2$ | Cr 74.0 | S 95.0 | |
| 14171 | $CH_3$—O— | —OOC—CH═CH—$CH_3$ | Cr 131.0 | X 183.0 | |

TABLE 263

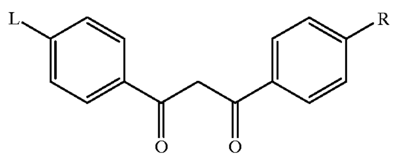

| LCReg | L | R | Phases | | | |
|---|---|---|---|---|---|---|
| 14767 | $C_8H_{17}$— | —$C_8H_{17}$ | Cr 28.5 | S 60.7 | | |
| 14769 | $C_9H_{19}$— | —$C_9H_{19}$ | Cr 41.7 | S 65.4 | | |
| 14770 | $C_{10}H_{21}$— | —$C_{10}H_{21}$ | CrX −22.0 | Cr 41.0 | S 50.0 | E 66.0 |
| 14771 | $C_{11}H_{23}$— | —$C_{11}H_{23}$ | Cr 44.3 | S 50.4 | S 68.0 | |
| 14778 | $C_9H_{19}$— | —O—$C_9H_{19}$ | Cr 50.0 | S 77.0 | | |
| 14779 | $C_{10}H_{21}$— | —O—$C_{10}H_{21}$ | Cr 53.0 | S 78.0 | | |
| 14780 | $C_{11}H_{23}$— | —O—$C_{11}H_{23}$ | Cr 61.5 | S 77.0 | | |
| 14781 | $C_{12}H_{25}$— | —O—$C_{12}H_{25}$ | Cr 62.5 | S 76.5 | | |
| 14789 | $C_8H_{17}$—O— | —O—$C_8H_{17}$ | Cr 84.1 | S 86.8 | | |
| 14790 | $C_9H_{19}$—O— | —O—$C_9H_{19}$ | Cr 71.7 | S 91.2 | | |
| 14791 | $C_{10}H_{21}$—O— | —O—$C_{10}H_{21}$ | Cr 61.1 | S 94.8 | | |
| 14792 | $C_{11}H_{23}$—O— | —O—$C_{11}H_{23}$ | Cr 81.3 | S 93.4 | | |
| 14793 | $C_{12}H_{25}$—O— | —O—$C_{12}H_{25}$ | Cr 73.1 | S 94.0 | | |

TABLE 264

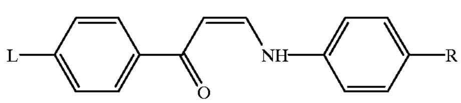

| LCReg | L | R | Phases | | | | |
|---|---|---|---|---|---|---|---|
| 60228 | H— | —O—$C_5H_{11}$ | Cr ? | E 93.6 | E 96.3 | Bcr 105.4 | A ? |
| 60212 | H— | —O—$C_6H_{13}$ | Cr 85.0 | Bcr 107.3 | B 107.8 | A 123.3 | |
| 60213 | F— | —O—$C_6H_{13}$ | Cr 84.0 | Bcr 128.2 | B 131.3 | A 184.5 | |
| 63261 | F— | —O—$C_7H_{15}$ | Cr ? | Bcr 127.7 | B 132.3 | A ? | |
| 63262 | F— | —O—$C_8H_{17}$ | Cr ? | Bcr 125.7 | B 131.8 | A ? | |
| 63266 | Cl— | —O—$C_3H_7$ | Cr ? | Bcr 164.1 | A ? | | |
| 63268 | Cl— | —O—$C_5H_{11}$ | Cr ? | Bcr 161.0 | B 162.2 | A ? | |
| 60214 | Cl— | —O—$C_6H_{13}$ | Cr 83.3 | Bcr 157.9 | B 159.9 | A 217.4 | |
| 63269 | Cl— | —O—$C_7H_{15}$ | Cr ? | Bcr 157.3 | B 160.9 | A ? | |
| 63270 | Cl— | —O—$C_8H_{17}$ | Cr ? | Bcr 156.6 | B 161.1 | A ? | |
| 63276 | Br— | —O—$C_5H_{11}$ | Cr ? | Bcr 174.2 | B 174.7 | A ? | |
| 60215 | Br— | —O—$C_6H_{13}$ | Cr 104.4 | Bcr 173.3 | B 178.3 | A 223.6 | |
| 63277 | Br— | —O—$C_7H_{15}$ | Cr ? | Bcr 171.9 | B 174.3 | A ? | |
| 63278 | Br— | —O—$C_8H_{17}$ | Cr ? | Bcr 170.9 | B 174.1 | A ? | |
| 62294 | NC— | —O—$CH_3$ | Cr 150.4 | N 232.9 | | | |

TABLE 265

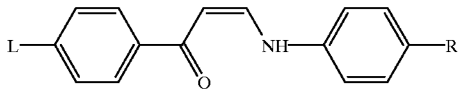

| LCReg | L | R | Phases | |
|---|---|---|---|---|
| 62295 | NC— | —O—$C_2H_5$ | Cr 157.6 | N 236.8 |
| 62296 | NC— | —O—$C_3H_7$ | Cr 144.0 | N 220.9 |
| 62297 | NC— | —O—$C_4H_9$ | Cr 97.6 | N 193.9 |
| 62298 | NC— | —O—$C_5H_{11}$ | Cr 93.3 | N 210.6 |
| 62302 | NC— | —O—$C_9H_{19}$ | Cr 86.0 | A 208.2 |
| 62303 | NC— | —O—$C_{10}H_{21}$ | Cr 77.0 | A 206.7 |
| 62304 | NC— | —O—$C_{12}H_{25}$ | Cr 77.6 | A 207.0 |
| 62305 | NC— | —O—$C_{16}H_{33}$ | Cr 89.3 | A 198.1 |

TABLE 265-continued

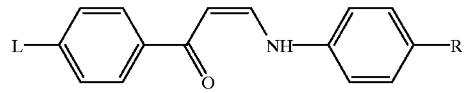

| LCReg | L | R | Phases | | |
|---|---|---|---|---|---|
| 62283 | $O_2N$— | —O—$CH_3$ | Cr 170.3 | N 206.0 | |
| 62284 | $O_2N$— | —O—$C_2H_5$ | Cr 190.4 | N 208.0 | |
| 62285 | $O_2N$— | —O—$C_3H_7$ | Cr 150.9 | A 159.3 | N 198.7 |
| 62286 | $O_2N$— | —O—$C_4H_9$ | Cr 134.8 | A 186.1 | N 202.8 |
| 62287 | $O_2N$— | —O—$C_5H_{11}$ | Cr 91.3 | A 201.9 | N 204.4 |
| 62288 | $O_2N$— | —O—$C_6H_{13}$ | Cr 93.8 | A 207.7 | |
| 62289 | $O_2N$— | —O—$C_7H_{15}$ | Cr 93.6 | A 211.3 | |

TABLE 266

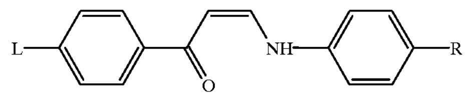

| LCReg | L | R | Phases | | | |
|---|---|---|---|---|---|---|
| 62290 | $C_2N$— | —O—$C_8H_{17}$ | Cr 93.0 | A 212.5 | | |
| 62291 | $C_2N$— | —O—$C_9H_{19}$ | Cr 93.4 | A 211.1 | | |
| 62292 | $C_2N$— | —O—$C_{10}H_{21}$ | Cr 85.7 | A 213.9 | | |
| 62293 | $C_2N$— | —O—$C_{16}H_{33}$ | Cr 96.7 | A 198.7 | | |
| 60207 | $C_6H_{13}$—O— | —F | Cr 90.5 | Bcr 101.5 | B 112.5 | A 174.5 |
| 60208 | $C_6H_{13}$—O— | —Cl | Cr 88.4 | Bcr 149.5 | B 158.5 | A 223.9 |
| 60209 | $C_6H_{13}$—O— | —Br | Cr 93.0 | Bcr 167.2 | B 174.6 | A 231.3 |
| 66885 | $C_5H_{11}$—O— | —l | Cr 145.6 | S 185.4 | S 209.4 | S 227.5 |
| | | | S 231.3 | N 232.3 | | |
| 60210 | $C_6H_{13}$— | —l | Cr 133.6 | Bcr 185.2 | B 189.6 | A 230.7 |
| 62127 | $C_6H_{13}$— | —$NO_2$ | Cr 112.7 | A 157.5 | N 166.5 | |
| 66884 | $C_5H_{11}$—O— | —$NO_2$ | Cr 127.6 | A 190.4 | N 202.4 | |
| 66881 | $C_5H_{11}$— | —$C_6H_{13}$ | Cr 128.0 | B 152.0 | A 157.7 | |
| 62130 | $C_6H_{13}$— | —$CH_3$ | Cr 105.0 | N 154.0 | | |
| 62131 | $C_6H_{13}$— | —O—$CH_3$ | Cr 100.0 | N 177.0 | | |
| 66880 | $C_6H_{13}$— | —O—$C_6H_{13}$ | Cr 128.6 | E 143.6 | B 173.0 | A 175.5 |

TABLE 267

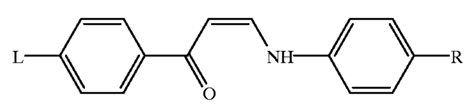

| LCReg | L | R | Phases | | | |
|---|---|---|---|---|---|---|
| 62132 | $C_6H_{13}$— | —NMe—$CH_3$ | Cr 113.0 | N 175.0 | | |
| 66883 | $C_5H_{11}$—O— | $C_6H_{13}$ | Cr 102.7 | S 126.6 | S 137.6 | B 164.5 |
| | | | N 175.5 | | | |
| 66882 | $C_5H_{11}$—O— | —O—$C_6H_{13}$ | Cr 117.6 | S 124.0 | B 147.6 | S 156.5 |
| | | | A 185.4 | N 195.4 | | |
| 40552 | $C_6H_{13}$—O— | —O—$C_6H_{13}$ | Cr 125.7 | X 132.0 | X 142.3 | X 155.4 |
| | | | X 186.7 | X 189.5 | X 196.3 | |
| 40553 | $C_6H_{13}$—O— | —O—$C_8H_{17}$ | Cr 100.8 | X 128.3 | X 137.4 | X 156.7 |
| | | | X 172.8 | X 184.5 | X 192.2 | |
| 40554 | $C_6H_{13}$—O— | —O—$C_9H_{19}$ | Cr 99.0 | X 131.2 | X 156.0 | X 191.6 |
| 15809 | $C_7H_{15}$—O— | —O—$C_8H_{17}$ | Cr 128.1 | S 192.0 | | |
| 60211 | $C_6H_{13}$—O— | —$CF_3$ | Cr 101.6 | Bcr 169.1 | B 172.6 | A 220.5 |
| 68125 | $CF_3$—O— | —O—$C_3H_7$ | Cr ? | G ? | A ? | |
| 68126 | $CF_3$—O— | —O—$C_4H_9$ | Cr ? | G ? | A ? | |
| 68127 | $CF_3$—O— | —O—$C_5H_{11}$ | Cr ? | G ? | F ? | A ? |
| 68128 | $CF_3$—O— | —O—$C_6H_{13}$ | Cr ? | G ? | F ? | A ? |

TABLE 267-continued

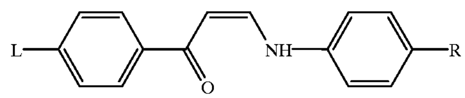

| LCReg | L | R | Phases | | | | |
|---|---|---|---|---|---|---|---|
| 68129 | $CF_3$—O— | —O—$C_7H_{15}$ | Cr ? | G ? | F ? | A ? | |
| 68130 | $CF_3$—O— | —O—$C_8H_{17}$ | Cr ? | G ? | F ? | S ? | Bcr ? |
| 68131 | $CF_3$—O— | —O—$C_9H_{19}$ | Cr ? | G ? | F ? | S ? | Bcr ? |

TABLE 268

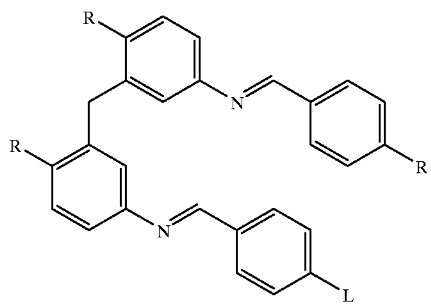

| LCReg | L | R | Phases | |
|---|---|---|---|---|
| 17075 | F— | —O—$C_9H_{19}$ | Cr 97.8 | A 107.2 |
| 17076 | F— | —O—$C_{10}H_{21}$ | Cr 103.3 | A 109.8 |
| 17077 | F— | —O—$C_{11}H_{23}$ | Cr 99.2 | A 109.5 |
| 17078 | F— | —O—$C_{12}H_{25}$ | Cr 94.0 | A 110.4 |
| 17079 | F— | —O—$C_{13}H_{27}$ | Cr 87.8 | A 110.1 |
| 17080 | F— | —O—$C_{14}H_{29}$ | Cr 89.4 | A 110.6 |
| 17081 | F— | —O—$C_{15}H_{31}$ | Cr 87.5 | A 109.6 |

TABLE 268-continued

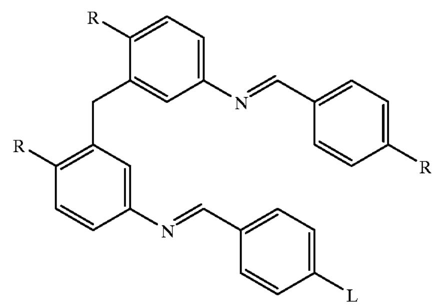

| LCReg | L | R | Phases | |
|---|---|---|---|---|
| 17084 | $C_8H_{17}$—O— | —O—$C_8H_{17}$ | Cr 121.0 | C 125.1 |
| 17085 | $C_8H_{17}$—O— | —O—$C_9H_{19}$ | Cr 121.1 | C 130.1 |
| 17086 | $C_8H_{17}$—O— | —O—$C_{10}H_{21}$ | Cr 117.6 | C 133.3 |
| 17089 | $C_{10}H_{21}$—O— | —O—$C_8H_{17}$ | Cr 110.2 | C 123.8 |
| 17090 | $C_{10}H_{21}$—O— | —O—$C_9H_{19}$ | Cr 112.1 | C 127.9 |
| 17091 | $C_{10}H_{21}$—O— | —O—$C_{10}H_{21}$ | Cr 113.5 | C 131.5 |

TABLE 269

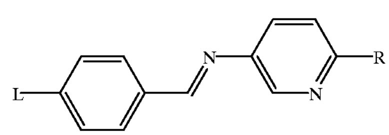

| LCReg | L | R | Phases | | | |
|---|---|---|---|---|---|---|
| 18399 | $CH_3$—O— | —$C_8H_{17}$ | Cr 29.5 | S 33.0 | N 38.0 | |
| 18400 | $CH_3$—O— | —$C_{10}H_{21}$ | Cr 39.4 | S 40.1 | S 46.6 | |
| 18402 | $C_2H_5$—O— | —$C_4H_9$ | Cr 28.0 | S 39.0 | A 50.0 | N 57.6 |
| 18403 | $C_2H_5$—O— | —$C_5H_{11}$ | Cr 52.0 | S 58.0 | N 69.0 | |
| 18404 | $C_2H_5$—O— | —$C_6H_{13}$ | Cr 36.0 | S 62.0 | N 65.4 | |
| 18412 | $C_2H_5$—O— | —O—$C_2H_5$ | Cr 84.0 | N 87.0 | | |
| 18415 | $C_2H_5$—O— | —O—$C_5H_{11}$ | Cr 60.0 | S 67.0 | N 78.5 | |
| 18416 | $C_2H_5$—O— | —O—$C_6H_{13}$ | Cr 56.0 | S 48.0 | S 69.0 | N 82.0 |
| 18420 | $C_3H_7$—O— | —O—$C_4H_9$ | Cr 69.0 | S 65.0 | S 77.0 | |
| 18421 | $C_3H_7$—O— | —O—$C_5H_{11}$ | Cr 45.0 | S 68.0 | S 77.0 | |
| 18422 | $C_3H_7$—O— | —O—$C_6H_{13}$ | Cr 58.2 | S 64.0 | S 78.0 | |
| 18423 | $C_4H_9$—O— | —O—$CH_3$ | Cr 68.5 | B 76.0 | | |
| 18424 | $C_4H_9$—O— | —O—$C_2H_5$ | Cr 81.7 | S 86.0 | S 91.5 | |
| 18425 | $C_4H_9$—O— | —O—$C_3H_7$ | Cr 75.2 | S 90.5 | S 93.0 | |
| 18426 | $C_4H_9$—O— | —O—$C_4H_9$ | Cr 62.0 | S 82.0 | S 96.0 | |

TABLE 270

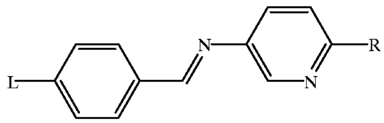

| LCReg | L | R | Phases | | | |
|---|---|---|---|---|---|---|
| 18427 | $C_4H_9$—O— | —O—$C_5H_{11}$ | Cr 60.5 | S 81.0 | S 94.0 | |
| 18428 | $C_4H_9$—O— | —O—$C_6H_{13}$ | Cr 47.7 | S 77.0 | S 95.0 | |
| 18429 | $C_5H_{11}$—O— | —O—$CH_3$ | Cr 69.0 | S 72.5 | A 75.5 | |
| 18430 | $C_5H_{11}$—O— | —O—$C_2H_5$ | Cr 62.8 | S 84.0 | S 91.0 | |
| 18431 | $C_5H_{11}$—O— | —O—$C_3H_7$ | Cr 52.5 | S 84.5 | S 93.0 | |
| 18432 | $C_5H_{11}$—O— | —O—$C_4H_9$ | Cr 55.8 | S 79.0 | S 93.0 | |
| 18433 | $C_5H_{11}$—O— | —O—$C_5H_{11}$ | Cr 65.0 | S 76.0 | S 91.0 | |
| 18434 | $C_5H_{11}$—O— | —O—$C_6H_{13}$ | Cr 57.2 | S 72.5 | S 91.0 | |
| 18435 | $C_6H_{13}$—O— | —O—$CH_3$ | Cr 65.5 | S 69.5 | A 80.0 | |
| 18436 | $C_6H_{13}$—O— | —O—$C_2H_5$ | Cr 83.0 | S 85.0 | S 97.0 | |
| 18437 | $C_6H_{13}$—O— | —O—$C_3H_7$ | Cr 51.3 | S 86.0 | S 96.0 | |
| 18438 | $C_6H_{13}$—O— | —O—$C_4H_9$ | Cr 65.0 | S 81.0 | S 85.0 | S 100.0 |
| 18439 | $C_6H_{13}$—O— | —O—$C_5H_{11}$ | Cr 52.4 | S 78.0 | S 96.0 | |
| 18440 | $C_6H_{13}$—O— | —O—$C_6H_{13}$ | Cr 57.0 | S 77.0 | S 97.0 | |
| 18441 | $C_7H_{15}$—O— | —O—$CH_3$ | Cr 61.0 | S 70.0 | A 82.5 | |

TABLE 271

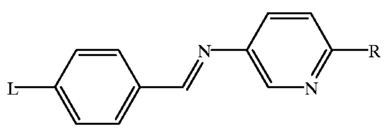

| LCReg | L | R | Phases | | |
|---|---|---|---|---|---|
| 18442 | $C_7H_{15}$—O— | —O—$C_2H_5$ | Cr 70.8 | S 84.0 | S 97.0 |
| 18443 | $C_7H_{15}$—O— | —O—$C_3H_7$ | Cr 78.2 | S 83.0 | S 94.0 |
| 18444 | $C_7H_{15}$—O— | —O—$C_4H_9$ | Cr 72.5 | S 83.0 | S 98.0 |
| 18445 | $C_7H_{15}$—O— | —O—$C_5H_{11}$ | Cr 62.5 | S 79.0 | S 95.0 |
| 18446 | $C_7H_{15}$—O— | —O—$C_6H_{13}$ | Cr 69.2 | S 75.0 | S 96.0 |
| 18447 | $C_8H_{17}$—O— | —O—$CH_3$ | Cr 53.0 | S 67.5 | A 85.0 |
| 18448 | $C_9H_{19}$—O— | —O—$CH_3$ | Cr 66.5 | S 69.0 | A 87.5 |
| 18449 | $C_{10}H_{21}$—O— | —O—$CH_3$ | Cr 69.0 | S 66.5 | A 88.0 |

TABLE 271-continued

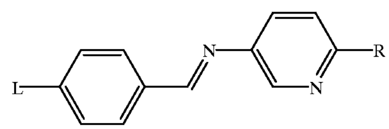

| LCReg | L | R | Phases | | |
|---|---|---|---|---|---|
| 18450 | $C_{12}H_{25}$—O— | —O—$CH_3$ | Cr 73.5 | S 63.5 | A 87.5 |
| 18451 | $C_{14}H_{29}$—O— | —O—$CH_3$ | Cr 79.5 | S 86.5 | |
| 18452 | $C_{16}H_{33}$—O— | —O—$CH_3$ | Cr 84.5 | S 84.0 | |
| 18453 | $C_{18}H_{37}$—O— | —O—$CH_3$ | Cr 87.5 | S 80.5 | |
| 18461 | $C_8H_{17}$—COO— | —O—$CH_3$ | Cr 79.5 | S 92.5 | |
| 18462 | $C_9H_{19}$—COO— | —O—$CH_3$ | Cr 79.5 | S 95.0 | |

TABLE 272

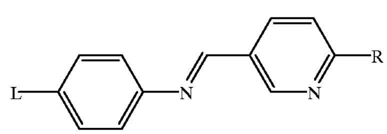

| LCReg | L | R | * | Phases | | | |
|---|---|---|---|---|---|---|---|
| 18467 | $C_2H_5$—O— | —O—$C_4H_9$ | | CrX 79.2 | Cr 87.9 | N 84.4 | |
| 18468 | $C_8H_{17}$—O— | —O—$C_4H_9$ | | Cr 79.3 | A 92.6 | | |
| 18469 | $C_{14}H_{29}$—O— | —O—$C_4H_9$ | | Cr 88.6 | B 78.8 | A 91.0 | |
| 18471 | $C_8H_{17}$—O— | —O—$C_6H_{13}$ | | Cr 61.0 | B 68.8 | C 80.5 | A 93.0 |
| 18472 | $C_{14}H_{29}$—O— | —O—$C_6H_{13}$ | | Cr 82.2 | B 79.4 | C 81.9 | A 91.5 |
| 18473 | $C_2H_5$—O— | —O—$C_8H_{17}$ | | Cr 76.5 | N 83.1 | | |
| 18474 | $C_8H_{17}$—O— | —O—$C_8H_{17}$ | | Cr 63.7 | B 68.4 | C 84.0 | A 93.0 |
| 18475 | $C_{14}H_{29}$—O— | —O—$C_8H_{17}$ | | Cr 85.2 | B 83.4 | C 92.6 | |
| 18476 | $C_2H_5$—O— | —O—$C_{10}H_{21}$ | | Cr 80.3 | N 81.9 | | |
| 18477 | $C_8H_{17}$—O— | —O—$C_{10}H_{21}$ | | Cr 69.0 | B 69.3 | C 84.0 | A 92.4 |
| 18478 | $C_{14}H_{29}$—O— | —O—$C_{10}H_{21}$ | | Cr 86.3 | B 86.2 | C 92.4 | |
| 18482 | $C_2H_5$—CHMe—$CH_2$—OOC—CH═CH— | —O—$C_{10}H_{21}$ | 1 | Cr 86.6 | A 79.5 | | |
| 18486 | $CH_3$—CHCl—$CH_2$—OOC—CH═CH— | —O—$C_{10}H_{21}$ | 1 | Cr 97.9 | A 101.9 | | |

TABLE 273

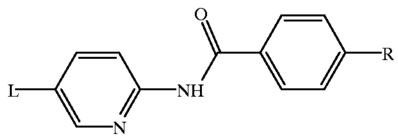

| LCReg | L | R | Phases | | |
|---|---|---|---|---|---|
| 42324 | Br— | —O—$C_6H_{13}$ | Cr 114.0 | A 103.0 | |
| 40327 | NC— | —$C_7H_{15}$ | Cr 114.0 | A 140.0 | |
| 40328 | NC— | —O—$C_6H_{13}$ | Cr 126.0 | A 124.5 | N 128.0 |
| 40325 | $O_2N$— | —$C_7H_{15}$ | Cr 92.0 | A 123.0 | |
| 40326 | $O_2N$— | —O—$C_6H_{13}$ | Cr 138.0 | A 163.0 | |

TABLE 274

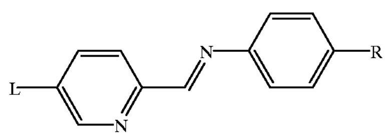

| LCReg | L | R | Phases | |
|---|---|---|---|---|
| 18644 | $C_2H_5$—O— | —O—$C_2H_5$ | Cr 132.6 | N 139.2 |
| 18645 | $C_2H_5$—O— | —O—$C_8H_{17}$ | Cr 65.1 | N 108.9 |

TABLE 274-continued

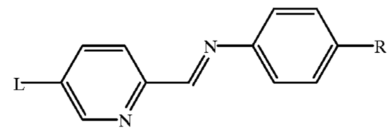

| LCReg | L | R | Phases | | |
|---|---|---|---|---|---|
| 18646 | $C_2H_5$—O— | —O—$C_{14}H_{29}$ | Cr 83.5 | N 99.6 | |
| 18647 | $C_4H_9$—O— | —O—$C_2H_5$ | CrX 78.4 | Cr 89.5 | N 117.2 |
| 18648 | $C_4H_9$—O— | —O—$C_8H_{17}$ | Cr 62.8 | N 103.6 | |
| 18649 | $C_4H_9$—O— | —O—$C_{14}H_{29}$ | Cr 61.8 | N 94.4 | |
| 18650 | $C_6H_{13}$—O— | —O—$C_2H_5$ | Cr 73.9 | N 112.2 | |
| 18651 | $C_6H_{13}$—O— | —O—$C_8H_{17}$ | Cr 48.6 | C 61.5 | N 104.9 |
| 18652 | $C_6H_{13}$—O— | —O—$C_{14}H_{29}$ | Cr 63.2 | C 76.6 | N 96.7 |
| 18653 | $C_8H_{17}$—O— | —O—$C_2H_5$ | Cr 53.6 | N 110.1 | |
| 18654 | $C_8H_{17}$—O— | —O—$C_8H_{17}$ | Cr 51.2 | C 87.7 | N 106.4 |
| 18655 | $C_8H_{17}$—O— | —O—$C_{14}H_{29}$ | Cr 65.9 | C 94.2 | N 99.7 |
| 18656 | $C_{10}H_{21}$—O— | —O—$C_2H_5$ | Cr 63.6 | A 79.4 | N 108.2 |
| 18657 | $C_{10}H_{21}$—O— | —O—$C_8H_{17}$ | Cr 52.9 | C 99.5 | N 105.5 |
| 18658 | $C_{10}H_{21}$—O— | —O—$C_{14}H_{29}$ | Cr 66.2 | C 102.7 | |

TABLE 275

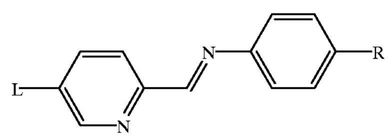

| LCReg | L | R | * | Phases | | |
|---|---|---|---|---|---|---|
| 18662 | $C_{10}H_{21}$—O— | —CH═CH—COO—$CH_2$—CHMe—$C_2H_5$ | 1 | Cr 87.4 | C* 105.0 | A 119.3 |
| 18660 | $C_{10}H_{21}$—O— | —O—$CH_2$—CHMe—$C_2H_5$ | S | CrX 50.5 | Cr 65.0 | A 75.2 |
| 18661 | $C_{10}H_{21}$—O— | —COO—$CH_2$—CHMe—$C_2H_5$ | 1 | Cr 47.4 | C* 47.0 | A 69.4 |
| 18663 | $C_{10}H_{21}$—O— | —OOC—CHCl—$CH_3$ | R | Cr 61.4 | Cr 60.4 | A 87.4 |
| 18666 | $C_{10}H_{21}$—O— | —CH═CH—COO—$CH_2$—CHCl—$CH_3$ | 1 | Cr 72.0 | C* 64.3 | A 137.5 |
| 18664 | $C_{10}H_{21}$—O— | —O—$CH_2$—CHCl—$CH_3$ | R | Cr 57.3 | A 80.5 | |
| 18665 | $C_{10}H_{21}$—O— | —COO—$CH_2$—CHCl—$CH_3$ | R | Cr 72.4 | A 85.8 | |

TABLE 276

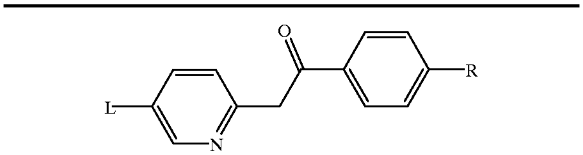

| LCReg | L | R | Phases | | |
|---|---|---|---|---|---|
| 66889 | $C_6H_{13}$— | —$C_7H_{15}$ | Cr 30.0 | A 70.2 | |
| 66888 | $C_6H_{13}$— | —O—$C_7H_{15}$ | Cr 48.0 | S 55.0 | S 65.5 |

TABLE 277

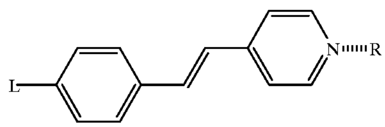

| LCReg | L | R | Phases | | | |
|---|---|---|---|---|---|---|
| 18684 | $C_3H_7$—O— | —H | (95.0) | Cr 112.0 | B 94.9 | |
| 18685 | $C_4H_9$—O— | —H | Cr 95.5 | E 89.4 | B 90.5 | |
| 18686 | $C_5H_{11}$—O— | —H | Cr 85.2 | E 85.7 | B 86.8 | |
| 18687 | $C_6H_{13}$—O— | —H | Cr 73.2 | E 87.1 | B 88.5 | |
| 18688 | $C_7H_{15}$—O— | —H | Cr 85.6 | E 88.4 | B 89.5 | |
| 18689 | $C_8H_{17}$—O— | —H | Cr 75.2 | E 85.2 | B 88.9 | |
| 18690 | $C_9H_{19}$—O— | —H | Cr 86.1 | E 87.0 | B 87.9 | |
| 18691 | $C_{10}H_{21}$—O— | —H | Cr 84.5 | E 86.2 | B 87.5 | |
| 18692 | $C_{11}H_{23}$—O— | —H | Cr 86.3 | E 87.0 | B 89.8 | |
| 18693 | $C_{12}H_{25}$—O— | —H | CrX 84.4 | Cr 85.4 | E 86.4 | B 87.9 |
| 18694 | $C_{16}H_{33}$—NH— | —H | Cr 92.5 | C 103.5 | | |

TABLE 278

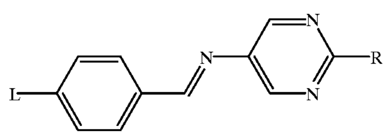

| LCReg | L | R | Phases | | |
|---|---|---|---|---|---|
| 16120 | $C_4H_9$—O— | —CN | Cr 98.7 | N 109.5 | |
| 16121 | $C_6H_{13}$—O— | —CN | Cr 102.0 | S 110.0 | N 115.0 |
| 16122 | $C_9H_{19}$—O— | —CN | Cr 89.0 | S 126.0 | |
| 16129 | $C_4H_9$—O— | —O—$C_4H_9$ | Cr 89.0 | S 112.0 | |
| 16130 | $C_6H_{13}$—O— | —O—$CH_3$ | Cr 71.7 | S 72.7 | N 92.3 |
| 16131 | $C_6H_{13}$—O— | —O—$C_4H_9$ | Cr 90.6 | S 115.5 | |
| 16132 | $C_8H_{17}$—O— | —O—$C_4H_9$ | Cr 85.0 | S 115.5 | |
| 16133 | $C_9H_{19}$—O— | —O—$CH_3$ | Cr 77.3 | S 96.4 | |

TABLE 279

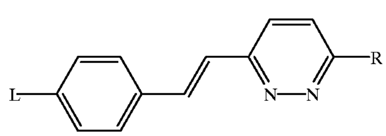

| LCReg | L | R | Phases | |
|---|---|---|---|---|
| 18804 | $C_6H_{13}$—O— | —O—$C_6H_{13}$ | Cr 87.0 | S 137.0 |

TABLE 280

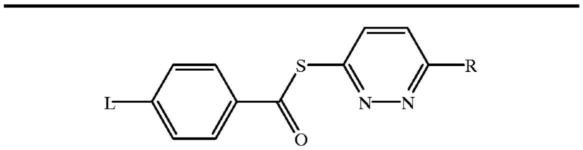

| LCReg | L | R | Phases | | |
|---|---|---|---|---|---|
| 18806 | NC— | —O—$C_6H_{13}$ | Cr 137.0 | N 134.4 | |
| 18807 | $O_2N$— | —O—$C_6H_{13}$ | Cr 123.0 | C 127.5 | N 131.5 |
| 18808 | $C_4H_9$— | —O—$C_8H_{17}$ | Cr 54.0 | N 69.0 | |
| 18809 | $C_6H_{13}$— | —O—$C_4H_9$ | Cr 89.0 | N 72.0 | |

TABLE 280-continued

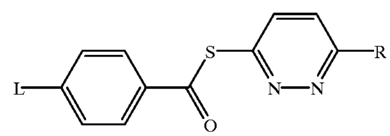

| LCReg | L | R | Phases | | |
|---|---|---|---|---|---|
| 18810 | $H_6H_{13}$— | —O—$C_5H_{11}$ | Cr 76.0 | N 70.5 | |
| 18811 | $C_6H_{13}$— | —O—$C_6H_{13}$ | Cr 72.0 | N 76.5 | |
| 18812 | $C_6H_{13}$— | —O—$C_7H_{15}$ | Cr 71.5 | N 75.5 | |
| 18813 | $C_6H_{13}$— | —O—$C_8H_{17}$ | Cr 75.5 | N 78.5 | |
| 18815 | $C_5H_{11}$—O— | —O—$C_4H_9$ | Cr 86.5 | N 104.5 | |
| 18816 | $C_5H_{11}$—O— | —O—$C_5H_{11}$ | Cr 77.0 | N 98.0 | |
| 18817 | $C_5H_{11}$—O— | —O—$C_6H_{13}$ | Cr 75.0 | N 104.5 | |
| 18819 | $C_5H_{11}$—O— | —O—$C_8H_{17}$ | Cr 72.0 | C 72.5 | N 105.0 |
| 18820 | $C_5H_{11}$—O— | —O—$C_9H_{19}$ | Cr 79.0 | C 80.5 | N 106.0 |
| 18822 | $C_6H_{13}$—O— | —O—$C_5H_{11}$ | Cr 84.5 | C 91.5 | N 109.5 |
| 18823 | $C_6H_{13}$—O— | —O—$C_6H_{13}$ | Cr 80.5 | C 93.5 | N 112.0 |

TABLE 281

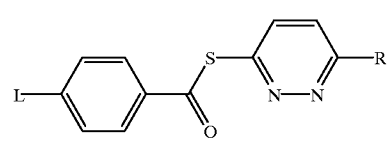

| LCReg | L | R | Phases | | |
|---|---|---|---|---|---|
| 18824 | $C_6H_{13}$— | —O—$C_7H_{15}$ | Cr 73.0 | C 96.0 | N 111.5 |
| 18825 | $C_6H_{13}$—O— | —O—$C_8H_{17}$ | Cr 73.0 | C 99.0 | N 113.5 |
| 18826 | $C_6H_{13}$—O— | —O—$C_9H_{19}$ | Cr 71.0 | C 101.0 | N 112.0 |
| 18827 | $C_7H_{15}$—O— | —O—$C_5H_{11}$ | Cr 80.0 | C 100.0 | N 106.5 |
| 18829 | $C_6H_{13}$—OCOO— | —O—$C_4H_9$ | Cr 74.0 | N 88.0 | |
| 18834 | $C_6H_{13}$—OCOO— | —O—$C_9H_{19}$ | Cr 68.5 | C 69.5 | N 89.0 |

TABLE 282

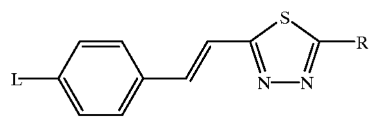

| LCReg | L | R | Phases | |
|---|---|---|---|---|
| 19012 | $C_9H_{19}$—O— | —$C_5H_{11}$ | Cr 103.0 | S 117.0 |

TABLE 283

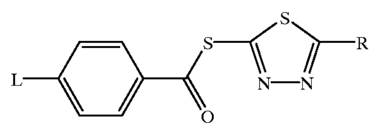

| LCReg | L | R | Phases | |
|---|---|---|---|---|
| 19013 | $O_2N$— | —S—$C_8H_{17}$ | Cr 123.0 | S 141.0 |
| 19015 | $C_4H_9$—O— | —S—$C_4H_9$ | Cr 114.0 | S 101.0 |
| 19016 | $C_5H_{11}$—O— | —S—$C_6H_{13}$ | Cr 94.0 | S 107.0 |
| 19017 | $C_6H_{13}$—O— | —S—$C_8H_{17}$ | Cr 86.0 | S 117.0 |
| 19018 | $C_8H_{17}$—O— | —S—$C_5H_{11}$ | Cr 85.0 | S 122.5 |
| 19019 | $C_8H_{17}$—O— | —S—$C_9H_{19}$ | Cr 71.0 | S 124.0 |

TABLE 284

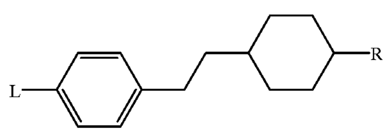

| LCReg | L | R | Phases | | |
|---|---|---|---|---|---|
| 16529 | NC— | —$C_3H_7$ | Cr 38.0 | N 44.5 | |
| 16530 | NC— | —$C_4H_9$ | Cr 27.0 | N 38.5 | |
| 16531 | NC— | —$C_5H_{11}$ | Cr 31.0 | N 52.5 | |
| 16532 | NC— | —$C_6H_{13}$ | Cr 35.0 | N 47.0 | |
| 16533 | NC— | —$C_7H_{15}$ | Cr 45.0 | N 54.5 | |
| 16534 | NC—$C_2H_4$— | —$C_5H_{11}$ | Cr 25.2 | S 53.2 | |
| 16535 | NC—CH=CH— | —$C_5H_{11}$ | Cr 64.4 | S 101.0 | N 129.0 |
| 16536 | NC—C≡C— | —$C_5H_{11}$ | Cr 36.7 | N 105.5 | |
| 16541 | NC— | —CH=CH—$C_3H_7$ | Cr 25.1 | N 47.5 | |
| 16542 | NC— | —CH=CH—$C_4H_9$ | Cr 19.7 | N 34.6 | |
| 16543 | NC— | —CH=CH—$C_5H_{11}$ | Cr 31.6 | N 43.6 | |
| 16545 | NC— | —$C_2H_4$—CH=$CH_2$ | Cr 41.0 | N 47.5 | |
| 16546 | NC— | —$C_2H_4$—CH=CH—$CH_3$ | Cr 44.0 | N 65.6 | |
| 16554 | SCN— | —$C_4H_9$ | Cr 23.0 | N 33.5 | |
| 16555 | SCN— | —$C_5H_{11}$ | Cr 38.5 | N 47.0 | |

TABLE 285

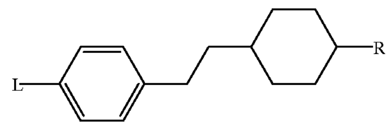

| LCReg | L | R | Phases | | |
|---|---|---|---|---|---|
| 16566 | $C_5H_{11}$— | —C:::C—CN | Cr 36.5 | N 43.0 | |
| 16567 | $C_4H_9$—O— | —C:::C—CN | Cr 66.6 | N 76.7 | |
| 16571 | $C_3H_7$— | —$C_5H_{11}$ | Cr 4.0 | B 18.0 | |
| 16572 | $C_3H_7$— | —$C_7H_{15}$ | Cr 9.5 | S 30.5 | |
| 16573 | $C_4H_9$— | —$C_7H_{15}$ | Cr 3.5 | B 30.5 | |
| 16574 | $C_5H_{11}$— | —$C_3H_7$ | Cr 3.0 | B 6.0 | |
| 16575 | $C_5H_{11}$— | —$C_5H_{11}$ | Cr 9.5 | B 30.0 | |
| 16576 | $C_6H_{13}$— | —$C_5H_{11}$ | Cr 11.0 | B 34.0 | |
| 16577 | $C_9H_{19}$— | —$C_7H_{15}$ | Cr 33.0 | B 52.0 | |
| 16579 | $CH_3$—O— | —$C_5H_{11}$ | Cr 31.0 | N 33.0 | |
| 16582 | $C_2H_5$—O— | —$C_3H_7$ | Cr 21.0 | N 34.0 | |
| 16583 | $C_2H_5$—O— | —$C_4H_9$ | Cr 10.0 | B 11.0 | N 32.0 |
| 16587 | $C_3H_7$—O— | —$C_5H_{11}$ | Cr 24.5 | B 32.5 | N 33.5 |
| 16590 | $C_4H_9$—O— | —$C_4H_9$ | Cr 11.0 | B 37.0 | |
| 16591 | $C_4H_9$—O— | —$C_5H_{11}$ | Cr 25.5 | B 44.0 | N 45.0 |

TABLE 286

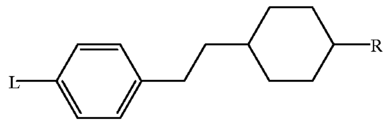

| LCReg | L | R | Phases | | |
|---|---|---|---|---|---|
| 16592 | $C_5H_{11}O$— | —$C_5H_{11}$ | Cr 16.0 | B 44.0 | |
| 16594 | $C_6H_{13}$—O— | —$C_5H_{11}$ | Cr 18.0 | B 49.5 | |
| 16595 | $C_8H_{17}$—O— | —$C_7H_{15}$ | Cr 37.0 | B 61.0 | |
| 16596 | $C_{10}H_{21}$—O— | —$C_7H_{15}$ | Cr 27.0 | B 64.0 | |
| 16597 | $C_{12}H_{25}$—O— | —$C_7H_{15}$ | Cr 34.0 | B 65.0 | |
| 16611 | $C_2H_5$—CO— | —$C_3H_7$ | Cr 40.0 | N 56.0 | |
| 16601 | $CH_3$—OOC— | —$C_5H_{11}$ | Cr 36.7 | N 48.7 | |
| 16602 | $CH_3$—OOC— | —$C_7H_{15}$ | Cr 33.5 | N 53.0 | |
| 16605 | $C_3H_7$—COO— | —$C_4H_9$ | Cr 4.0 | B 45.0 | |
| 16606 | $C_3H_7$—COO— | —$C_5H_{11}$ | Cr 31.0 | B 52.0 | |
| 16617 | $C_2H_5$—O— | —CH═CH—$C_3H_7$ | Cr 25.0 | N 43.9 | |
| 16620 | $C_4H_9$—O— | —C:::C—$C_3H_7$ | Cr 21.6 | S 25.3 | |
| 16622 | $H_2C$═CH—$CH_2$—O— | —$C_5H_{11}$ | Cr 15.7 | B 23.8 | N 40.7 |
| 16623 | $H_2C$═CH—$C_2H_4$—O— | —$C_3H_7$ | Cr 6.0 | S 16.3 | N 16.5 |
| 16624 | $H_2C$═CH—$C_2H_4$—O— | —$C_5H_{11}$ | Cr 5.0 | B 33.0 | |

TABLE 287

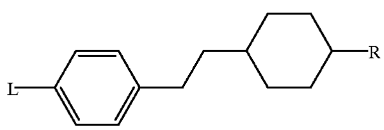

| LCReg | L | R | Phases | |
|---|---|---|---|---|
| 16626 | $H_2C$═CH—$C_3H_6$—O— | —$C_5H_{11}$ | Cr 29.7 | B 42.3 |
| 16440 | H—C:::C— | —$C_4H_9$ | Cr 10.0 | N 25.2 |
| 16441 | H—C:::C— | —$C_5H_{11}$ | Cr 25.5 | N 42.5 |
| 16442 | H—C:::C— | —$C_7H_{15}$ | Cr 29.9 | N 49.3 |
| 16443 | $CH_3$—C:::C— | —$C_4H_9$ | Cr 33.1 | N 38.6 |
| 16444 | $CH_3$—C:::C— | —$C_5H_{11}$ | Cr 46.8 | N 55.3 |
| 16445 | $CH_3$—C:::C— | —$C_7H_{15}$ | Cr 44.4 | N 58.0 |
| 16446 | $C_2H_5$—C:::C— | —$C_4H_9$ | Cr 6.1 | N 9.5 |
| 16447 | $C_3H_7$—C:::C— | —$C_4H_9$ | Cr 14.3 | S 22.6 |

TABLE 288

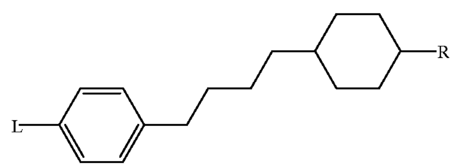

| LCReg | L | R | Phases | |
|---|---|---|---|---|
| 16655 | $C_2H_5$—O— | —$C_5H_{11}$ | Cr 18.0 | B 31.0 |
| 16657 | $C_4H_9$—O— | —$C_5H_{11}$ | Cr 29.0 | B 43.0 |
| 16658 | $C_5H_{11}$—O— | —$C_5H_{11}$ | Cr 31.0 | B 39.0 |
| 16659 | $C_6H_{13}$—O— | —$C_5H_{11}$ | Cr 33.0 | B 46.0 |

TABLE 289

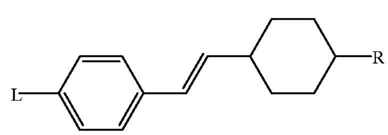

| LCReg | L | R | Phases | |
|---|---|---|---|---|
| 16664 | NC— | —$C_2H_5$ | Cr 66.0 | N 71.0 |
| 16665 | NC— | —$C_3H_7$ | Cr 63.0 | N 105.0 |
| 16666 | NC— | —$C_4H_9$ | Cr 57.0 | N 98.0 |
| 16667 | NC— | —$C_5H_{11}$ | Cr 53.5 | N 107.2 |
| 16668 | $CH_3$—O— | —$C_2H_5$ | Cr 44.0 | N 61.0 |
| 16669 | $CH_3$—O— | —$C_3H_7$ | Cr 34.0 | N 92.0 |
| 16670 | $CH_3$—O— | —$C_5H_{11}$ | Cr 49.0 | N 97.0 |
| 16671 | $C_2H_5$—O— | —$C_2H_5$ | Cr 49.0 | N 73.0 |
| 16672 | $C_2H_5$—O— | —$C_3H_7$ | Cr 79.0 | N 106.0 |

TABLE 289-continued

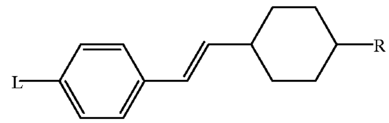

| LCReg | L | R | Phases | | | |
|---|---|---|---|---|---|---|
| 16673 | $C_2H_5$—O— | —$C_4H_9$ | Cr 44.0 | N 101.0 | | |
| 16674 | $C_2H_5$—O— | —$C_5H_{11}$ | Cr 64.0 | N 109.0 | | |
| 16675 | $C_4H_9$—O— | —$C_3H_7$ | Cr 38.0 | N 98.0 | | |
| 16676 | $C_8H_{17}$—O— | —$CH_2$—O—$CH_3$ | Cr 47.0 | N 69.0 | | |
| 16677 | $C_{12}H_{25}$—O— | —$CH_2$—O—$CH_3$ | Cr 61.0 | S 53.0 | S 59.0 | N 68.0 |

TABLE 290

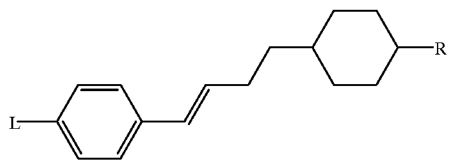

| LCReg | L | R | Phases | | | |
|---|---|---|---|---|---|---|
| 16679 | $C_4H_9$—O— | —$C_5H_{11}$ | Cr 46.0 | B 74.0 | A 76.0 | N 91.0 |

TABLE 291

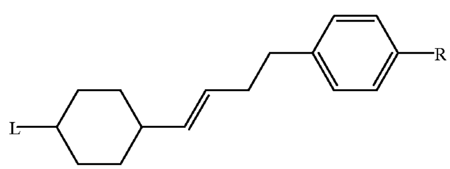

| LCReg | L | R | Phases | | |
|---|---|---|---|---|---|
| 16681 | $C_5H_{11}$— | —F | Cr −5.0 | N −11.0 | |
| 16682 | $C_5H_{11}$— | —CN | Cr 40.0 | N 39.0 | |
| 16683 | $C_3H_7$— | —O—$C_6H_{13}$ | Cr 28.0 | B 36.0 | N 40.0 |
| 16684 | $C_5H_{11}$— | —O—$CH_3$ | Cr 25.0 | N 34.0 | |
| 16685 | $C_5H_{11}$— | —O—$C_2H_5$ | Cr 34.0 | N 51.0 | |
| 16686 | $C_5H_{11}$— | —O—$C_3H_7$ | Cr 32.0 | B 42.0 | |
| 16687 | $C_5H_{11}$— | —O—$C_4H_9$ | Cr 24.0 | B 53.0 | |
| 16688 | $C_5H_{11}$— | —O—$C_5H_{11}$ | Cr 28.0 | B 52.0 | |
| 16689 | $C_5H_{11}$— | —O—$C_6H_{13}$ | Cr 32.0 | B 56.0 | |
| 16690 | $C_5H_{11}$— | —O—$CF_3$ | Cr 5.0 | N −17.0 | |

TABLE 292

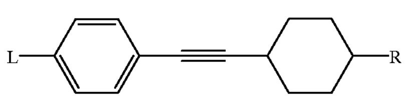

| LCReg | L | R | Phases | |
|---|---|---|---|---|
| 16693 | NC— | —$C_5H_{11}$ | Cr 41.4 | N 72.5 |
| 16695 | $C_5H_{11}$— | —$C_5H_{11}$ | Cr 30.1 | N 25.0 |
| 16696 | $CH_3$—O— | —$C_5H_{11}$ | Cr 30.9 | N 45.7 |
| 16697 | $C_2H_5$—O— | —$C_5H_{11}$ | Cr 70.4 | N 75.3 |
| 16698 | $C_3H_7$—O— | —$C_5H_{11}$ | Cr 65.1 | N 60.8 |
| 16699 | $C_4H_9$—O— | —$C_5H_{11}$ | Cr 44.3 | N 70.0 |

TABLE 292-continued

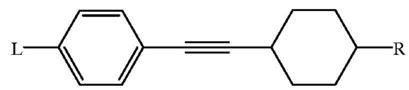

| LCReg | L | R | Phases | |
|---|---|---|---|---|
| 16700 | $CH_3$—OOC— | —$C_5H_{11}$ | Cr 67.0 | N 74.3 |
| 16701 | $CH_3$—COO— | —$C_5H_{11}$ | Cr 66.3 | N 46.2 |

TABLE 293

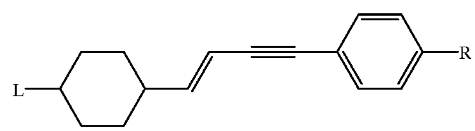

| LCReg | L | R | Phases | |
|---|---|---|---|---|
| 62445 | $C_2H_5$— | —$CH_3$ | Cr 58.4 | N 39.7 |
| 62446 | $C_2H_5$— | —$C_2H_5$ | Cr 19.7 | N 44.0 |
| 62449 | $C_2H_5$— | —$C_3H_7$ | Cr 27.8 | N 56.2 |
| 62452 | $C_2H_5$— | —$C_4H_9$ | Cr 21.0 | N 45.5 |
| 62454 | $C_2H_5$— | —$C_5H_{11}$ | Cr 31.1 | N 55.0 |
| 62447 | $C_3H_7$— | —$C_2H_5$ | Cr 31.3 | N 82.4 |
| 62450 | $C_3H_7$— | —$C_3H_7$ | Cr 51.6 | N 93.8 |
| 62453 | $C_3H_7$— | —$C_4H_9$ | Cr 33.6 | N 84.5 |
| 62455 | $C_3H_7$— | —$C_5H_{11}$ | Cr 47.5 | N 90.7 |
| 62448 | $C_5H_{11}$— | —$C_2H_5$ | Cr 20.7 | N 81.7 |
| 62451 | $C_5H_{11}$— | —$C_3H_7$ | Cr 31.7 | N 92.2 |
| 62456 | $C_5H_{11}$— | —$C_5H_{11}$ | Cr 36.5 | N 79.0 |
| 62457 | $C_2H_5$— | —O—$CH_3$ | Cr 29.3 | N 80.9 |
| 62460 | $C_2H_5$— | —O—$C_2H_5$ | Cr 62.3 | N 104.2 |
| 62463 | $C_2H_5$— | —O—$C_3H_7$ | Cr 60.9 | N 98.7 |

TABLE 294

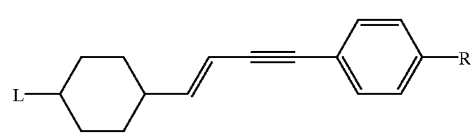

| LCReg | L | R | Phases | |
|---|---|---|---|---|
| 62466 | $C_2H_5$— | —O—$C_4H_9$ | Cr 55.5 | N 98.5 |
| 62458 | $C_3H_7$— | —O—$CH_3$ | Cr 45.9 | N 113.3 |
| 62461 | $C_3H_7$— | —O—$C_2H_5$ | Cr 79.8 | N 135.8 |
| 62464 | $C_3H_7$— | —O—$C_3H_7$ | Cr 72.1 | N 127.2 |

TABLE 294-continued

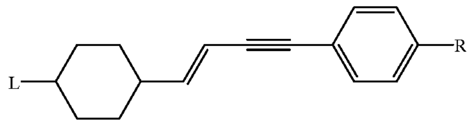

| LCReg | L | R | Phases | |
|---|---|---|---|---|
| 62467 | $C_3H_7$— | —O—$C_4H_9$ | Cr 63.9 | N 126.1 |
| 62459 | $C_5H_{11}$— | —O—$CH_3$ | Cr 35.3 | N 117.3 |
| 62462 | $C_5H_{11}$— | —O—$C_2H_5$ | Cr 68.9 | N 126.9 |
| 62465 | $C_5H_{11}$— | —O—$C_3H_7$ | Cr 57.9 | N 118.9 |
| 62468 | $C_5H_{11}$— | —O—$C_4H_9$ | Cr 60.4 | N 126.8 |

TABLE 295

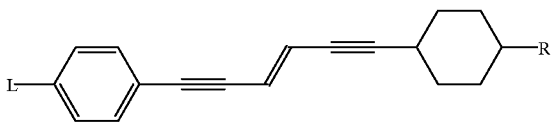

| LCReg | L | R | Phases |
|---|---|---|---|
| 59941 | $C_3H_7$— | —$C_3H_7$ | Cr 94.2 N 147.6 |

TABLE 296

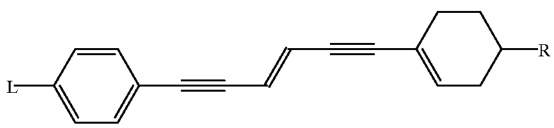

| LCReg | L | R | * | Phases |
|---|---|---|---|---|
| 68098 | $C_2H_5$—O— | —$C_2H_{11}$ | 2 | Cr 81.0 A 102.0 N 125.0 |

TABLE 297

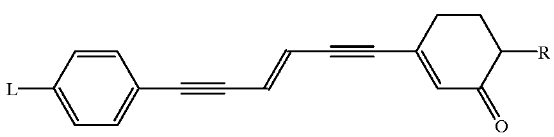

| LCReg | L | R | * | Phases |
|---|---|---|---|---|
| 68076 | $C_2H_5$—O— | —$C_5H_{11}$ | 2 | Cr 99.0 A 128.0 |
| 68077 | $C_2H_5$—O— | —$C_6H_{13}$ | 2 | Cr 65.0 A 128.0 |

TABLE 298

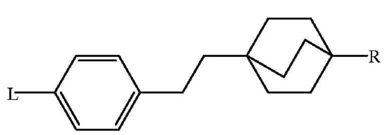

| LCReg | L | R | Phases |
|---|---|---|---|
| 19264 | NC— | —$C_5H_{11}$ | Cr 76.0 N 113.0 |
| 19265 | SCN— | —$C_4H_9$ | Cr 64.0 N 105.5 |
| 19266 | SCN— | —$C_6H_{13}$ | Cr 61.0 N 105.5 |

TABLE 298-continued

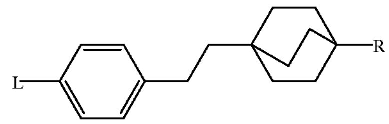

| LCReg | L | R | Phases |
|---|---|---|---|
| 19267 | $C_3H_7$— | —$C_5H_{11}$ | Cr 60.0 N 62.0 |
| 19268 | $C_5H_{11}$— | —$C_5H_{11}$ | Cr 45.0 B 58.0 N 62.0 |
| 19269 | $C_2H_5$—O— | —$C_4H_9$ | Cr 57.0 N 87.0 |
| 68208 | $C_2H_5$—O— | —$C_6H_{13}$ | Cr 42.3 N 95.9 |

TABLE 299

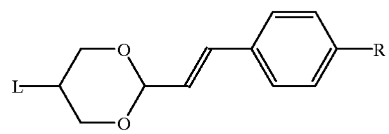

| LCReg | L | R | Phases |
|---|---|---|---|
| 16916 | $C_3H_7$— | —CN | Cr 89.0 N 98.5 |
| 16917 | $C_5H_{11}$— | —CN | Cr 64.0 N 102.0 |
| 16918 | $C_7H_{15}$— | —CN | Cr 62.0 A 74.0 N 100.0 |

TABLE 300

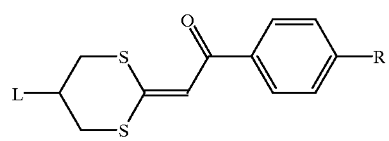

| LCReg | L | R | Phases |
|---|---|---|---|
| 19317 | $C_8H_{17}$— | —CN | Cr 68.0 N 96.0 |
| 19319 | $C_8H_{17}$— | —$C_5H_{11}$ | Cr 73.5 A 81.0 |
| 19322 | $C_8H_{17}$— | —$C_6H_{13}$ | Cr 65.0 A 84.5 |

TABLE 301

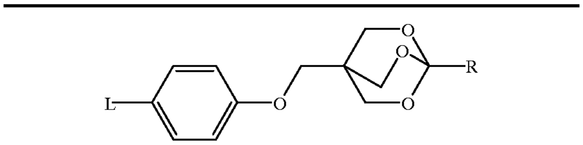

| LCReg | L | R | Phases |
|---|---|---|---|
| 19328 | $C_6H_{13}$— | —$C_7H_{15}$ | Cr 44.0 B 72.0 |
| 19330 | $C_5H_{11}$—O— | —$C_7H_{15}$ | Cr 68.0 B 86.0 |
| 19331 | $C_6H_{13}$—O— | —$C_7H_{15}$ | Cr 42.0 B 90.0 |
| 19332 | $C_7H_{15}$—O— | —$C_7H_{15}$ | Cr 48.0 B 93.0 |
| 19333 | $C_8H_{17}$—O— | —$C_7H_{15}$ | Cr 45.0 B 94.0 |

TABLE 302

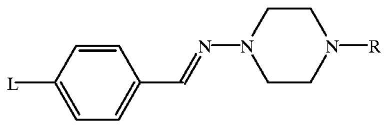

| LCReg | L | R | Phases |
|---|---|---|---|
| 19345 | $CH_3$—O— | —$C_6$H13 | Cr 51.4 S 59.8 |
| 19347 | $C_2H_5$—O— | —$C_5$H11 | Cr 70.6 S 72.9 N 79.8 |
| 19348 | $C_2H_5$—O— | —$C_6$H13 | Cr 55.1 S 81.4 |
| 19350 | C4H9—O— | —$C_5$H11 | Cr 64.0 S 89.6 |

TABLE 303

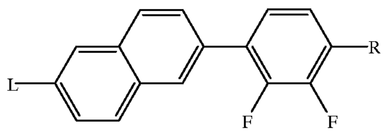

| LCReg | L | R | Phases |
|---|---|---|---|
| 7416 | $C_8H_{17}$—O— | —$C_5H_{11}$ | Cr 36.0 C 44.5 A 75.0 N 83.5 |

TABLE 304

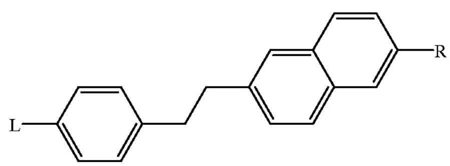

| LCReg | L | R | * | Phases |
|---|---|---|---|---|
| 19588 | $C_6H_{13}$—CHMe—OOC— | —O—$C_{10}H_{21}$ | 1 | Cr ? A ? |
| 19589 | $C_2H_5$—CHMe—$CH_2$—OOC— | —O—$C_{10}H_{21}$ | 1 | Cr 22.0 A 48.0 |
| 19590 | $C_6H_{13}$—$CHCF_3$—OOC— | —O—$C_{10}H_{21}$ | 1 | Cr −13.0 A −6.0 |

TABLE 305

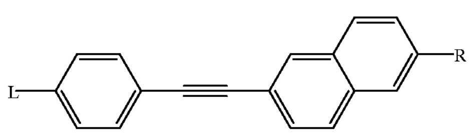

| LCReg | L | R | Phases |
|---|---|---|---|
| 60645 | F— | —O—$C_3H_7$ | Cr 122.0 N 129.5 |
| 60646 | F— | —O—$C_4H_9$ | Cr 110.7 N 134.0 |
| 60647 | F— | —O—$C_5H_{11}$ | Cr 104.9 N 123.0 |
| 60648 | F— | —O—$C_6H_{13}$ | Cr 97.2 N 124.3 |
| 60653 | F— | —O—$C_8H_{17}$ | Cr 93.8 N 117.5 |
| 63483 | NC— | —O—$CH_3$ | Cr 144.0 N 210.0 |
| 19593 | NC— | —O—$C_4H_9$ | Cr 111.5 N 186.0 |
| 19594 | NC— | —O:::C—$C_3H_7$ | Cr 113.0 N 193.0 |
| 19596 | $C_5H_{11}$— | —Br | Cr 106.5 N 145.0 |
| 63485 | $C_5H_{11}$— | —CN | Cr 79.5 N 164.0 |
| 19597 | $C_4H_9$—O— | —CN | Cr 120.5 N 195.5 |

TABLE 305-continued

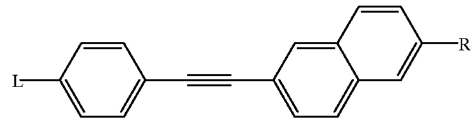

| LCReg | L | R | Phases |
|---|---|---|---|
| 19598 | $C_5H_{11}$— | —O—$C_2H_5$ | Cr 110.0 X 157.3 |
| 60865 | $C_5H_{11}$— | —O—$C_4H_9$ | Cr 92.0 N 143.0 |
| 60866 | $C_4H_9$—O— | —O—$CH_3$ | Cr 131.0 N 185.0 |
| 60864 | $C_4H_9$—O— | —O—$C_4H_9$ | Cr 149.0 N 178.5 |

TABLE 306

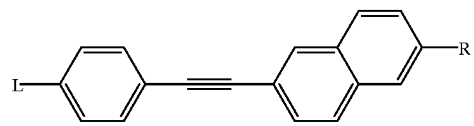

| LCReg | L | R | Phases |
|---|---|---|---|
| 60868 | $C_5H_{11}$— | —C:::C—$C_3H_7$ | Cr 106.5 N 129.0 |
| 60867 | $C_4H_9$—O— | —C:::C—$C_3H_7$ | Cr 124.0 N 172.0 |
| 19599 | $C_3H_7$—C:::C— | —O—$C_4H_9$ | Cr 126.5 N 171.0 |

TABLE 307

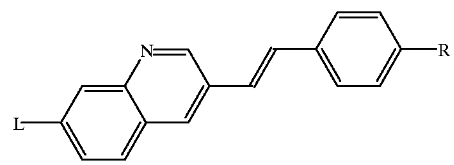

| LCReg | L | R | Phases |
|---|---|---|---|
| 19723 | $C_5H_{11}$—O— | —O—$CH_3$ | CrX 81.4 Cr 128.4 N 182.2 |
| 19724 | $C_5H_{11}$—O— | —O—$C_2H_5$ | CrX 101.6 Cr 123.5 N 192.7 |
| 19725 | $C_5H_{11}$—O— | —O—$C_3H_7$ | Cr 120.7 N 176.1 |
| 19726 | $C_5H_{11}$—O— | —O—$C_4H_9$ | Cr 112.5 N 180.1 |
| 19727 | $C_5H_{11}$—O— | —O—$C_5H_{11}$ | CrX 93.9 Cr 116.6 N 172.1 |
| 19728 | $C_5H_{11}$—O— | —O—$C_6H_{13}$ | Cr 109.8 G 101.7 C 119.1 N 170.9 |
| 19729 | $C_5H_{11}$—O— | —O—$C_7H_{15}$ | CrX 94.3 Cr 96.4 G 100.7 C 125.2 N 165.4 |
| 19730 | $C_5H_{11}$—O— | —O—$C_8H_{17}$ | CrX 97.0 Cr 101.8 G 93.7 C 129.2 N 163.7 |
| 19731 | $C_5H_{11}$—O— | —O—$C_9H_{19}$ | Cr 97.0 G 86.4 C 131.9 N 160.5 |
| 19732 | $C_5H_{11}$—O— | —O—$C_{10}H_{21}$ | CrX 94.4 Cr 101.8 G 75.1 C 132.4 N 157.9 |

TABLE 308

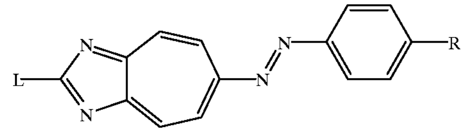

| LCReg | L | R | Phases |
|---|---|---|---|
| 19943 | $C_8H_{17}$—S— | —O—$C_6H_{13}$ | Cr 125.0 A 170.0 |

TABLE 309

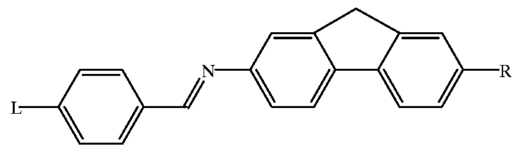

| LCReg | L | R | Phases |
|---|---|---|---|
| 19997 | $C_7H_{15}$— | —H | Cr 107.0 S 90.0 A 137.0 N 162.5 |
| 19998 | $CH_3$—O— | —H | Cr 169.5 N 211.5 |
| 19999 | $C_2H_5$—O— | —H | Cr 154.0 N 221.5 |
| 20000 | $C_3H_7$—O— | —H | Cr 156.0 N 204.5 |
| 20001 | $C_4H_9$—O— | —H | Cr 140.0 N 208.5 |
| 20002 | $C_5H_{11}$—O— | —H | Cr 132.0 A 137.0 N 197.0 |
| 20003 | $C_6H_{13}$—O— | —H | Cr 125.0 A 149.5 N 198.5 |
| 20004 | $C_7H_{15}$—O— | —H | Cr 121.5 A 159.0 N 191.0 |
| 20005 | $C_8H_{17}$—O— | —H | Cr 117.5 A 165.5 N 189.5 |
| 20006 | $C_9H_{19}$—O— | —H | Cr 116.5 A 169.0 N 184.0 |
| 20007 | $C_{10}H_{21}$—O— | —H | Cr 115.0 A 170.5 N 181.0 |
| 20008 | $C_{12}H_{25}$—O— | —H | Cr 112.5 A 171.0 N 174.0 |
| 20009 | $C_{16}H_{33}$—O— | —H | Cr 113.0 A 164.5 |
| 20010 | $C_{18}H_{37}$—O— | —H | Cr 118.0 S 160.5 |

TABLE 310

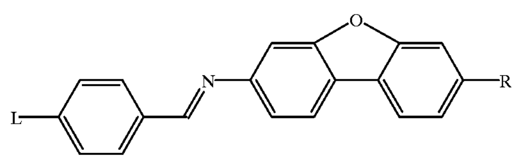

| LCReg | L | R | Phases |
|---|---|---|---|
| 20090 | $C_3H_7$— | —H | Cr 104.6 N 114.7 |
| 20091 | $C_4H_9$— | —H | Cr 92.7 N 102.3 |
| 20092 | $C_5H_{11}$— | —H | Cr 97.0 N 121.0 |
| 20093 | $C_6H_{13}$— | —H | Cr 88.5 A 77.0 N 110.7 |
| 20094 | $C_7H_{15}$— | —H | Cr 84.3 G 58.7 A 91.3 N 120.6 |
| 20095 | $C_8H_{17}$— | —H | Cr 90.2 A 97.2 N 115.2 |
| 20096 | $C_9H_{19}$— | —H | Cr 83.3 A 104.0 N 119.0 |
| 20097 | $C_{10}H_{21}$— | —H | Cr 92.6 A 105.9 N 114.9 |
| 20098 | $C_{12}H_{25}$— | —H | Cr 96.0 A 109.2 N 113.3 |
| 20099 | $C_{13}H_{27}$— | —H | Cr 87.0 A 108.7 N 111.8 |
| 20100 | $C_{16}H_{33}$— | —H | Cr 102.1 A 109.1 |
| 20102 | $C_2H_5$—O— | —H | Cr 129.5 N 167.5 |
| 20103 | $C_3H_7$—O— | —H | Cr 133.5 N 146.5 |

TABLE 310-continued

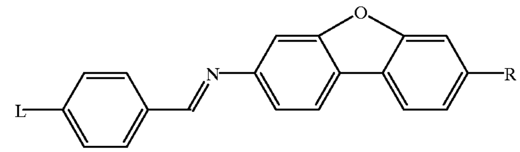

| LCReg | L | R | Phases |
|---|---|---|---|
| 20104 | $C_4H_9$—O— | —H | Cr 124.5 N 158.5 |
| 20105 | $C_5H_{11}$—O— | —H | Cr 115.5 N 148.5 |

TABLE 311

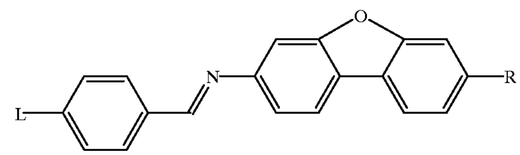

| LCReg | L | R | Phases |
|---|---|---|---|
| 20106 | $C_6H_{13}$—O— | —H | Cr 112.5 N 154.5 |
| 20107 | $C_7H_{15}$—O— | —H | Cr 113.5 A 115.5 N 150.5 |
| 20108 | $C_8H_{17}$—O— | —H | Cr 118.5 A 128.5 N 152.5 |
| 20109 | $C_9H_{19}$—O— | —H | Cr 116.2 A 132.5 N 149.6 |
| 20110 | $C_{10}H_{21}$—O— | —H | Cr 113.5 A 136.5 N 148.6 |
| 20111 | $C_{11}H_{23}$—O— | —H | Cr 117.4 A 139.0 N 146.3 |
| 20112 | $C_{12}H_{25}$—O— | —H | Cr 120.4 A 140.6 N 145.0 |
| 20113 | $C_{14}H_{29}$—O— | —H | Cr 116.2 A 136.7 N 140.5 |

TABLE 312

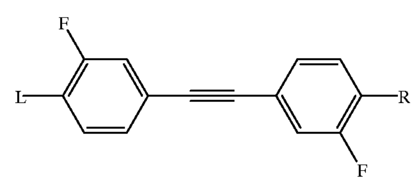

| LCReg | L | R | Phases |
|---|---|---|---|
| 21101 | $C_4H_9$—O— | —O—$C_4H_9$ | (54.0) CrX 58.6 CrX 64.9 Cr 67.1 N 57.4 |
| 21103 | $C_6H_{13}$—O— | —O—$C_6H_{13}$ | (45.0) CrX 46.2 Cr 60.0 N 56.0 |
| 21105 | $C_8H_{17}$—O— | —O—$C_8H_{17}$ | (50.0) CrX 47.7 Cr 69.3 N 59.8 |
| 21107 | $C_{10}H_{21}$—O— | —O—$C_{10}H_{21}$ | (54.0) CrX 50.9 CrX 69.5 Cr 72.5 C 54.1 N 62.9 |
| 21108 | $C_{11}H_{23}$—O— | —O—$C_{11}H_{23}$ | (72.0) CrX 48.5 CrX 54.3 Cr 83.6 C 75.6 N 77.6 |
| 21109 | $C_{12}H_{25}$—O— | —O—$C_{12}H_{25}$ | (55.0) CrX 65.4 CrX 71.4 Cr 73.1 C 61.4 N 66.7 |

TABLE 313

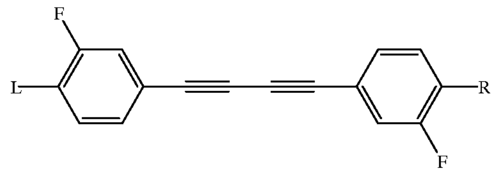

| LCReg | L | R | * | Phases |
|---|---|---|---|---|
| 62247 | Me3Si—$C_{10}H_{20}$—O— | —O—$C_{10}H_{20}$—Me3Si | | (39.0) Cr 51.0 C 63.0 |
| 62248 | EtMe2sI—$C_{10}H_{20}$—O— | —O—$C_{10}H_{20}$—SiMe2Et | | (28.0) Cr 42.0 C 54.0 |
| 62228 | $C_6H_{13}$—O— | —O—$C_6H_{13}$ | | (56.0) Cr 71.0 N 97.0 |
| 62231 | $C_{10}H_{21}$—O— | —O—$C_{10}H_{21}$ | | (39.0) Cr 54.0 C 64.0 N 88.0 |
| 62232 | $C_{11}H_{23}$—O— | —O—$C_{11}H_{23}$ | | (41.0) Cr 58.0 C 69.0 N 86.0 |
| 62233 | $C_{14}H_{29}$—O— | —O—$C_{14}H_{29}$ | | (50.0) Cr 59.0 C 79.0 N 84.0 |
| 62234 | $C_{15}H_{31}$—O— | —O—$C_{15}H_{31}$ | | (58.0) Cr 64.0 C 82.0 N 85.0 |
| 62235 | $C_{16}H_{33}$—O— | —O—$C_{16}H_{33}$ | | (56.0) Cr 61.0 C 82.0 N 84.0 |
| 62236 | $C_{17}H_{35}$—O— | —O—$C_{17}H_{35}$ | | (57.0) Cr 62.0 C 84.0 |
| 62237 | $C_{18}H_{37}$—O— | —O—$C_{18}H_{37}$ | | (62.0) Cr 65.0 S 85.0 |
| 62238 | $C_{22}H_{45}$—O— | —O—$C_{22}H_{45}$ | | (77.0) Cr 80.0 S 95.0 |
| 62240 | $C_2H_5$—CHMe—$C_7H_{14}$—O— | —O—$C_7H_{14}$—CHMe—$C_2H_5$ | 7 | (45.0) Cr 60.0 N 62.0 |
| 62239 | $H_2C$═CH—$C_8H_{16}$—O— | —O—$C_8H_{16}$—CH═$CH_2$ | | (35.0) Cr 40.0 C 45.0 N 77.0 |

TABLE 314

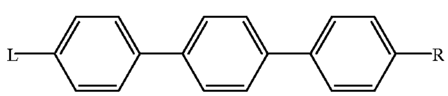

| L | R | | Cr | LC |
|---|---|---|---|---|
| $C_7H_{15}$—O—CHMe —$CH_2$—OOC— | —COO—$CH_2$ —CHMe—O—$C_7H_{15}$ | 3 | K 57.8 | A 80.1 I |
| $C_8H_{17}$—O—CHMe —$CH_2$—OOC— | —COO—$CH_2$ —CHMe—O—$C_8N_{17}$ | 3 | K 63 | A 84.1 I |
| $CH_3$—OOC— | —OOC—$CH_3$ | | K 229 | S 282.5 X 284.5 I |
| $CH_3$—OCOO— | —OCOO—$CH_3$ | | K 229 | S 267 N 277 I |
| $C_2H_5$—OCOO— | —OCOO—$C_2H_5$ | | K 213 | S 225.5 X 242.5 I |
| $C_5H_{11}$— | —CHCN—OOC —CHMe—$C_2H_5$ | 5 | K 124 | A <71 |
| $C_{10}H_{21}$— | —O—CHMe —$C_5H_{11}$ | R | K 76.5 | S 101.5 S 118 $C^+$ 122.5 A 126 I |
| $C_8H_{17}$— | —COO—CHMe —$C_6H_{13}$ | 1 | K 116.5 | A 123.4 I |
| $C_8H_{17}$— | —COO—$CH_2$ —CHMe—$C_2H_5$ | 1 | K 104.7 | S 125.1 $G^+$ 126.9 B 147.6 A 173.5 I |
| $C_8H_{17}$— | —COO—$C_2$—CHCl —$CH_2$—CHMe—$CH_3$ | 1 | K 114.2 | $G^+$ $1061^+$ 114.2 A 153.5 I |
| $C_8H_{17}$— | —COO—$CH_2$—CHCN —$CH_2$—CHMe—$CH_3$ | 1 | K 81.8 | B 83.8 A 96.7 I |
| $C_5H_{11}$— | —O—$C_3H_6$ —CHMe—$C_2H_5$ | S | K ? | B 196 A 215.5 I |
| $C_{10}H_{21}$— | —O—$C_3H_6$ —CHMe—$C_2H_5$ | S | K 65 | S 181.5 $C^+$ 188.5 A 191 I |
| $C_8H_{17}$— | —COO—$CH_2$ —CHCl—$CH_3$ | 1 | K 54.9 | S 111.7 $G^+$ 148.5 $C^+$ 149.1 A 195.4 I |
| $C_8H_{17}$— | —COO—$CH_2$ —CHCl—$C_4H_9$ | 1 | K 123.6 | $C^+$ 130.6 $C^+$ 139.7 A 169.5 I |
| $C_8H_{17}$— | —COO—$CH_2$ —CHCN—$CH_3$ | 1 | K 138 | $C^+$ 151.4 A 168.5 I |

TABLE 314-continued

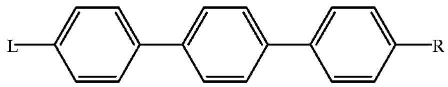

| L | R | | Cr | LC |
|---|---|---|---|---|
| $C_8H_{17}$— | —COO—$CH_2$ —CHCN—$C_2H_5$ | 1 | K 77.8 | $G^+$ 99.71$^+$ 118.6 A 139.6 I |
| $C_8H_{17}$— | —COO—$CH_2$ —CHCN—$C_3H_7$ | 1 | K 97 | B 92.8 A 112.7 I |
| $C_8H_{17}$— | —COO—$CH_2$ —CHCN—$C_4H_9$ | 1 | K 78.8 | B 88.7 A 101.2 I |
| $C_5H_{11}$— | —O—$CH_3$ | | K 211 | B 221 A 239 I |
| $C_5H_{11}$— | —O—$CH_2$—H | | K 223 | A 241 I |
| $C_3$H7—O—$CH_2$ | —O—$CH_2$—CH/O\ CH(1)—$C_3H_7$ | S | K 210 | E 227.8 A 257.3 I |
| $C_6H_{13}$—CHMe —OOC— | —COO—$CH_2$—CHCl —CHMe—$C_2H_5$ | | K 55.2 | $C^+$ 57.9 A 79.1 I |
| $C_6H_{13}$—CHMe —OOC— | —COO—$CH_2$—CHCl —$CH_2$—CHMe—$CH_3$ | 3 | K 58.9 | $C^+$ 54.8 A 61.9 I |
| $C_6H_{13}$—CHMe —OOC— | —COO—$CH_2$ —CHCl—$CH_3$ | 3 | K 79.8 | $C^+$ 90.4 A 120.2 I |
| $C_6H_{13}$—CHMe —OOC— | —COO—$CH_2$ —CHCl—$C_3H_7$ | 3 | K 84.9 | $C^+$ 78.3 A 84.3 I |
| $C_6H_{13}$—CHMe —OOC— | —COO—$CH_2$ —CHCl—$C_4H_9$ | 3 | K 91.8 | $C^+$ 83.8 I |
| $C_2H_5$—CHMe —$CH_2$—OOC— | —COO—$CH_2$ —CHMe—$C_2H_5$ | 3 | K 132 | A 143 $N^+$ 145 I |
| $CH_3$—CHCl —$CH_2$—OOC— | —COO—$CH_2$ —CHCl—$CH_3$ | 3 | K 123 | A 135 $N^+$ 138 I |
| $C_2H_5$—CHCl —$CH_2$—OOC— | —COO—$CH_2$ —CHCl—$C_2H_5$ | 3 | K 137.3 | A 138.3 $H^+$ 151.5 BP 152.2 I |

TABLE 315

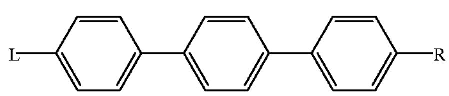

| LCReg | L | R | Phases |
|---|---|---|---|
| 21623 | Cl—CO—$CH_2$— | —$CH_2$CO—Cl | Cr 201.0 S 226.0 |
| 21624 | Cl—CO—$C_3H_6$— | —$C_3H_6$—CO—Cl | Cr 165.0 S 203.0 |
| 21625 | Cl—CO—$C_5H_{10}$— | —$C_5H_{10}$—CO—Cl | Cr 171.0 S 212.0 |
| 21629 | NC— | —$NO_2$ | Cr 232.0 N 275.0 |
| 21646 | $C_5H_{11}$—CO— | —H | Cr 194.5 E 193.0 A 200.0 |
| 21647 | $C_5H_{11}$—CO— | —H | Cr 191.5 E 191.5 A 197.0 |
| 21648 | $C_7H_{15}$—CO— | —H | Cr 170.0 E 192.0 A 198.5 |
| 21660 | $C_5H_{11}$— | —Cl | Cr 105.0 B 245.0 |
| 61965 | $CF_3$—O— | —Cl | Cr 180.0 N 197.0 |
| 21670 | $C_6H_{13}$—CO— | —Br | Cr 175.0 E 204.0 B 211.5 N 239.0 |
| 21671 | $C_7H_{15}$—CO— | —Br | Cr 175.0 E 204.0 B 211.5 N 233.5 |
| 21677 | $C_3H_7$— | —CN | CrX 179.0 Cr 182.2 N 257.5 |
| 21678 | $C_4H_9$— | —CN | Cr 154.0 N 242.0 |
| 21679 | $C_5H_{11}$— | —CN | CrX 80.0 CrX 115.0 Cr 131.0 N 240.0 |
| 21680 | $C_6H_{13}$— | —CN | Cr 125.0 N 228.0 |

TABLE 316

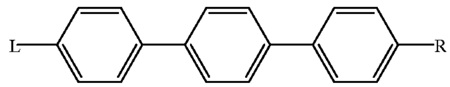

| LCReg | L | R | Phases |
| --- | --- | --- | --- |
| 21682 | $C_8H_{17}$— | —CN | CrX 79.8 Cr 86.0 S 117.6 S 120.2 A 197.0 N 213.9 |
| 21683 | $C_9H_{19}$— | —CN | Cr 87.4 E 110.3 S 118.3 A 205.8 N 211.7 |
| 21684 | $C_{10}H_{21}$— | —CN | CrX 77.7 Cr 87.2 E 108.0 S 117.6 A 205.9 |
| 21685 | $C_2H_5$—O—$C_2H_4$— | —CN | Cr 120.0 N 215.0 |
| 21686 | $C_3H_7$—O—$C_2H_4$— | —CN | Cr 99.5 N 193.5 |
| 21687 | $C_4H_9$—O—$C_2H_4$— | —CN | Cr 89.0 N 184.5 |
| 21688 | $C_2H_5$—CO— | —CN | Cr 224.0 N 282.5 |
| 21691 | $C_6H_{13}$—CO— | —CN | Cr 178.0 E 203.5 A 212.0 N 239.0 |
| 21692 | $C_7H_{15}$—CO— | —CN | Cr 175.0 E 204.0 B 211.5 A 218.0 N 233.5 |
| 21693 | $CH_3$—CHMe—$CH_2$— | —CN | Cr 154.5 N 226.0 |
| 21695 | $CH_3$—CHMe—$C_2H_4$— | —CN | Cr 150.0 N 216.0 |
| 21696 | $C_2H_5$–CHMe—$C_3H_6$— | —CN | Cr 126.0 B 132.0 A 168.0 N* 197.0 |
| 68100 | $CH_3$— | —$C_5H_{11}$ | Cr 171.0 N 202.0 |
| 59968 | $C_2H_5$— | —$C_9H_{19}$ | Cr 85.0 B 206.0 |
| 21702 | $C_3H_7$— | —$C_5H_{11}$ | Cr 180.0 E 200.0 B 214.0 A 218.0 |

TABLE 317

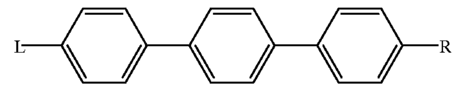

| LCReg | L | R | Phases |
| --- | --- | --- | --- |
| 21703 | $C_4H_9$— | —$C_4H_9$ | Cr 208.0 S 218.0 |
| 21704 | $C_5H_{11}$— | —$C_5H_{11}$ | Cr 192.0 A 213.0 |
| 21705 | $C_6H_{13}$— | —$C_6H_{13}$ | Cr 193.0 S 218.0 |
| 21706 | $C_7H_{15}$— | —$C_7H_{15}$ | Cr 181.0 S 205.0 |
| 21707 | $C_8H_{17}$— | —$C_8H_{17}$ | Cr 176.0 S 191.0 |
| 21708 | $C_9H_{19}$— | —$C_9H_{19}$ | Cr 166.0 S 185.0 |
| 21709 | $C_{10}H_{21}$— | —$C_{10}H_{21}$ | Cr 161.0 S 181.0 |
| 21710 | $C_{12}H_{25}$— | —$C_{12}H_{25}$ | Cr 145.0 S 168.0 |
| 21711 | $C_{16}H_{33}$— | —$C_{16}H_{33}$ | Cr 127.0 S 152.0 |
| 21712 | $C_{18}H_{37}$— | —$C_{18}H_{37}$ | Cr 126.0 S 149.0 |
| 21717 | $C_5H_{11}$— | —$CH_2$—O—$CH_3$ | Cr 233.0 S 240.0 N 245.0 |
| 21713 | $C_3H_7$— | —O—$C_4H_9$ | Cr 239.0 E 241.0 A 249.5 |
| 21714 | $C_5H_{11}$— | —O—$C_2H_5$ | Cr 234.0 E 237.0 A 242.0 N 248.0 |
| 21715 | $C_5H_{11}$— | —O—$C_6H_{13}$ | Cr 205.0 B 216.0 A 228.5 |
| 21716 | $C_5H_{11}$— | —O—$C_8H_{17}$ | Cr 194.5 B 211.0 A 221.5 |

TABLE 318

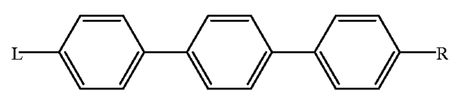

| LCReg | L | R | Phases |
| --- | --- | --- | --- |
| 61140 | $C_5H_{11}$— | —O—CHMe—$CH_2$—O—$CH_3$ | CrX 131.1 Cr 139.5 B 157.3 A 164.6 |
| 21720 | $C_5H_{11}$— | —CO—$CH_3$ | Cr 231.5 S 258.5 |
| 21725 | $C_5H_{11}$— | —COO—CHMe—COO—$C_2H_5$ | Cr 130.0 E 129.0 B 147.0 A 180.0 |
| 21726 | $C_9H_{19}$— | —COO—CHMe—COO—$C_2H_5$ | Cr 68.0 S 68.5 S 99.0 C* 120.0 A 150.5 |
| 21742 | $CH_3$—OOC—$CH_2$— | —$CH_2$—OOC—$CH_3$ | Cr 195.0 C 203.0 |
| 21743 | $C_2H_5$—OOC—$CH_2$— | —$CH_2$—OOC—$C_2H_5$ | Cr 173.0 C 184.0 |
| 21744 | $C_3H_7$—OOC—$CH_2$— | —$CH_2$—OOC—$C_3H_7$ | Cr 131.0 C 145.0 |
| 21745 | $C_4H_9$—OOC—$CH_2$— | —$CH_2$—OOC—$C_4H_9$ | Cr 112.0 C 134.0 |
| 21746 | $C_5H_{11}$—OOC—$CH_2$— | —$CH_2$—OOC—$C_5H_{11}$ | Cr 109.0 C 123.0 |
| 21747 | $C_6H_{13}$—OOC—$CH_2$— | —$CH_2$—OOC—$C_6H_{13}$ | Cr 110.0 C 126.0 |
| 21748 | $C_7H_{15}$—OOC—$CH_2$— | —$CH_2$—OOC—$C_7H_{15}$ | Cr 119.0 C 124.0 |
| 21749 | $C_8H_{17}$—OOC—$CH_2$— | —$CH_2$—OOC—$C_8H_{17}$ | Cr 116.0 C 123.0 |
| 21750 | $C_9H_{19}$—OOC—$CH_2$— | —$CH_2$—OOC—$C_9H_{19}$ | Cr 109.0 C 127.0 |
| 21753 | $C_3H_7$—OOC—$C_3H_6$— | —$C_3H_6$—OOC—$C_3H_7$ | Cr 65.0 S 82.0 E 152.0 |
| 20754 | $C_4H_9$—OOC—$C_3H_6$— | —$C_3H_6$—OOC—$C_4H_9$ | Cr 65.0 S 87.0 E 134.0 |

TABLE 319

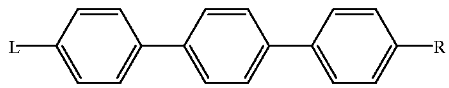

| LCReg | L | R | Phases |
|---|---|---|---|
| 21755 | $C_5H_{11}$—OOC—$C_3H_6$— | —$C_3H_6$—COO—$C_5H_{11}$ | Cr 64.0 S 80.0 E 127.0 |
| 21756 | $C_6H_{13}$—OOC—$C_3H_6$— | —$C_3H_6$—COO—$C_6H_{13}$ | Cr 66.0 S 85.0 E 118.0 |
| 21757 | $C_7H_{15}$—OOC—$C_3H_6$— | —$C_3H_6$—COO—$C_7H_{15}$ | Cr 68.0 S 93.0 E 114.0 |
| 21758 | $C_8H_{17}$—OOC—$C_3H_6$— | —$C_3H_6$—COO—$C_8H_{17}$ | Cr 71.0 S 96.0 E 116.0 |
| 21759 | $C_9H_{19}$—OOC—$C_3H_6$— | —$C_3H_6$—COO—$C_9H_{19}$ | Cr 71.0 S 99.0 E 113.0 |
| 21760 | $CH_3$—OOC—$C_5H_{10}$— | —$C_5H_{10}$—OOC—$CH_3$ | Cr 132.0 S 207.0 |
| 21769 | $CH_3$—OOC—$C_6H_{12}$— | —$C_6H_{12}$—OOC—$CH_3$ | Cr 132.0 S 202.0 |
| 21770 | $CH_3$—OOC—$C_7H_{14}$— | —$C_7H_{14}$—OOC—$CH_3$ | Cr 148.0 S 245.0 |
| 21771 | $CH_3$—OOC—$C_8H_{16}$— | —$C_8H_{16}$—OOC—$CH_3$ | Cr 125.0 S 181.0 |
| 21772 | $CH_3$—OOC—$C_9H_{18}$— | —$C_9H_{18}$—OOC—$CH_3$ | Cr 128.0 S 186.0 |
| 21773 | $CH_3$—OOC—$C_{10}H_{20}$— | —$C_{10}H_{20}$—OOC—$CH_3$ | Cr 110.0 S 171.0 |
| 21774 | $CH_3$—OOC—$C_{11}H_{22}$— | —$C_{11}H_{22}$—OOC—$CH_3$ | Cr 117.0 S 177.0 |
| 21775 | $CH_3$—OOC—$C_2H_4$— | —$C_2H_4$—OOC—$CH_3$ | Cr 160.0 E 198.0 A 208.0 |
| 21776 | $C_2H_5$—OOC—$C_2H_4$— | —$C_2H_4$—OOC—$C_2H_5$ | Cr 173.0 E 194.0 A 203.0 |
| 21777 | $CH_3$—OOC—$C_2H_4$— | —$C_4H_8$—OOC—$CH_3$ | Cr 151.0 E 160.0 A 182.0 |

TABLE 320

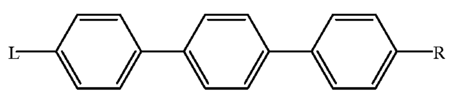

| LCReg | L | R | Phases |
|---|---|---|---|
| 21778 | $C_2H_5$—COO—$C_2H_4$— | —$C_4H_8$—COO —$C_2H_5$ | Cr 143.0 E 154.0 B 166.0 |
| 21727 | $CH_3$—O— | —O—$CH_3$ | CrX 238.0 Cr 259.0 A 265.5 N 267.5 |
| 21728 | $C_2H_5$—O— | —O—$C_4H_9$ | Cr 270.0 A 268.5 N 280.0 |
| 69761 | $C_{10}H_{21}$—O— | —O—$C_{10}H_{21}$ | Cr 129.0 S 172.0 S 196.0 S 201.0 C 214.0 |
| 21729 | $C_4H_9$—O— | —COO—CHMe—COO —$C_2H_5$ | Cr 185.0 E 186.5 A 225.0 |
| 21730 | $C_8H_{17}$—O— | —COO—CHMe—COO —$C_2H_5$ | Cr 127.0 C* 158.5 A 180.2 |
| 21731 | $C_6H_{13}$—O— | —COO—CHMe —$C_5H_{11}$ | Cr 172.0 C* 174.0 A 191.0 |
| 507 | $C_8H_{17}$—O— | —COO—CHMe —O—$C_4H_9$ | Cr 148.5 C* 167.0 N* 195.5 |
| 21779 | $CH_3$—CO— | —CO—$CH_3$ | Cr 291.0 N 285.0 |
| 21780 | $CH_3$—CO— | —CO—$C_7H_{15}$ | Cr 230.0 C 238.5 N 250.5 |
| 21781 | $C_2H_5$—CO— | —CO—$C_2H_5$ | Cr 268.0 N 314.0 |
| 21782 | $C_2H_5$—CO— | —CO—$C_6H_{13}$ | Cr 238.5 C 266.0 N 271.0 |
| 21783 | $C_3H_5$—CO— | —CO—$C_3H_7$ | Cr 272.0 N 240.0 |
| 21733 | $C_2H_5$—OOC— | —COO—$C_2H_5$ | CrX 154.0 Cr 177.0 E 191.0 A 263.0 |
| 21734 | $C_3H_7$—OOC— | —COO—$C_3H_7$ | Cr 122.0 E 142.0 A 242.0 |

TABLE 321

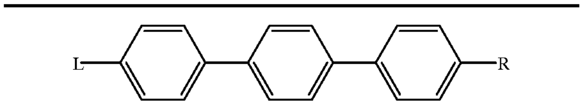

| LCReg | L | R | Phases |
|---|---|---|---|
| 21735 | $C_4H_9$—OOC— | —COO—$C_4H_9$ | Cr 136.0 A 212.0 |
| 21736 | $C_5H_{11}$—OOC— | —COO—$C_5H_{11}$ | Cr 141.0 A 203.0 |
| 21737 | $C_6H_{13}$—OOC— | —COO—$C_6H_{13}$ | Cr 140.0 C 144.0 A 187.0 |

TABLE 321-continued

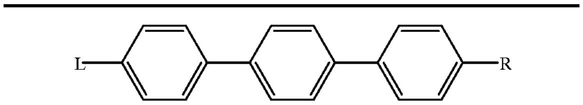

| LCReg | L | R | Phases |
|---|---|---|---|
| 21738 | $C_7H_{15}$—OOC— | —COO—$C_7H_{15}$ | Cr 136.0 C 147.0 A 178.0 |
| 21739 | $C_8H_{17}$—OOC— | —COO—$C_8H_{17}$ | Cr 140.0 C 153.0 A 171.0 |

TABLE 321-continued

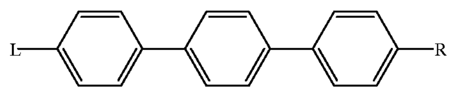

| LCReg | L | R | Phases |
|---|---|---|---|
| 21740 | $C_{16}H_{33}$—OOC— | —COO—$C_{16}H_{33}$ | Cr 135.0 S 133.0 |
| 60610 | $C_2H_5$—O—CHMe | —COO—$CH_2$ | Cr 61.5 C* 104.2 |
| | —$CH_2$—OOC— | —CHMe—O—$C_2H_5$ | N* 120.4 |
| 60611 | $C_3H_7$—O—CHMe | —COO—$CH_2$ | Cr 64.8 C* 84.3 |
| | —$CH_2$—OOC— | —CHMe—O—$C_3H_7$ | A 87.2 N* 102.8 |
| 60612 | $C_4H_9$—O—CHMe | —COO—$CH_2$ | Cr 65.8 C* 77.5 |
| | —$CH_2$—OOC— | —CHMe—O—$C_4H_9$ | A 87.8 N* 94.7 |
| 60613 | $C_5H_{11}$—O—CHMe | —COO—$CH_2$ | Cr 60.3 C* 65.2 |
| | —$CH_2$—OOC— | —CHMe—O—$C_5H_{11}$ | A 85.7 N* 86.3 |
| 60614 | $C_6H_{13}$—O—CHMe | —COO—$CH_2$ | Cr 58.3 C* 63.6 |
| | —$CH_2$—OOC— | —CHMe—O—$C_6H_{13}$ | A 84.1 |
| 57589 | $C_4H_9$—CHCl | —COO—$CH_2$ | Cr 97.2 c: 104.7 |
| | —$CH_2$—OOC— | —CHCl—$C_4H_9$ | A 121.7 |
| 21833 | $H_2C$═CH | —COO—$CH_2$ | CrX 82.0 |
| | | | Cr 152.0 |
| | —$CH_2$—OOC— | —CH═$CH_2$ | A 233.0 |
| 21835 | $H_2C$═CH | —COO—$C_2H_4$ | CrX 126.0 |
| | —$C_2H_4$—OOC— | —CH═$CH_2$ | Cr 146.0 A 227.0 |
| 21837 | $H_2C$═CH | —COO—$C_3H_6$ | Cr 124.0 C 149.0 |
| | —$C_3H_6$—OOC— | —CH═$CH_2$ | A 192.0 |

TABLE 322

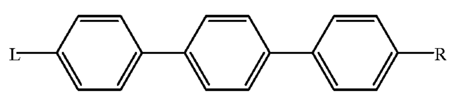

| LCReg | L | R | Phases |
|---|---|---|---|
| 21839 | $H_2C$═CH | —COO—$C_4H_8$ | Cr 124.0 C 143.0 |
| | —$C_4H_8$—OOC— | —CH═$CH_2$ | A 180.0 |
| 21841 | $H_2C$═CH | —COO—$C_9H_{18}$ | Cr 124.0 C 132.0 |
| | —$C_9H_{18}$—OOC— | —CH═$CH_2$ | A 142.0 |
| | $C_8H_{17}$ | OC7H15 | Cr 68.4 S 193.3 |
| | | | X 200.6 X 209.5 |

TABLE 323

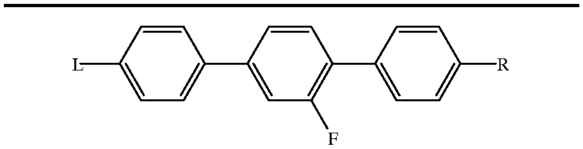

| LCReg | L | R | Phases |
|---|---|---|---|
| 22131 | H— | —$C_5H_{11}$ | Cr 71.0 N 47.0 |
| 22132 | F— | —$C_2H_5$ | Cr 108.0 N 113.6 |
| 22133 | F— | —$C_3H_7$ | Cr 99.0 N 124.5 |
| 22134 | Cl— | —$C_3H_7$ | Cr 126.5 A 125.7 N 162.5 |
| 22135 | Cl— | —$C_5H_{11}$ | Cr 96.3 A 134.2 N 157.6 |
| 22136 | NC— | —$C_2H_5$ | Cr 109.0 N 201.5 |
| 22137 | NC— | —$C_3H_7$ | Cr 86.2 N 206.0 |
| 22138 | NC— | —$C_5H_{11}$ | Cr 97.0 N 189.0 |
| 22139 | NC— | —O—$C_4H_9$ | Cr 88.0 N 228.0 |
| 22140 | NC— | —O—$C_7H_{15}$ | CrX 78.0 CrX 87.0 Cr 89.5 N 203.0 |
| 22141 | NC— | —O—$C_8H_{17}$ | CrX 73.0 Cr 90.0 A 157.5 N 198.5 |
| 22144 | $C_3H_7$— | —O—H | Cr 165.0 N 174.5 |
| 22145 | $C_3H_7$— | —CN | Cr 88.1 N 205.4 |
| 22146 | $C_5H_{11}$— | —CN | Cr 82.0 N 143.0 |
| 22147 | $CH_3$— | —$C_2H_5$ | Cr 115.0 N 138.2 |

TABLE 324

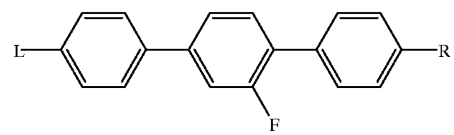

| LCReg | L | R | Phases |
|---|---|---|---|
| 22148 | $CH_3$— | —$C_3H_7$ | Cr 114.0 N 150.5 |
| 22149 | $C_2H_5$— | —$C_3H_7$ | Cr 73.5 N 133.3 |
| 22150 | $C_2H_5$— | —$C_5H_{11}$ | Cr 54.5 N 127.5 |
| 22151 | $C_3H_7$— | —$C_2H_5$ | Cr 78.0 N 133.0 |
| 22152 | $C_3H_7$— | —$C_3H_7$ | Cr 88.0 N 145.7 |
| 22153 | $C_3H_7$— | —$C_4H_9$ | (28.0) Cr 56.5 C 25.0 A 52.5 N 133.5 |
| 22154 | $C_3H_7$— | —$C_5H_{11}$ | (20.0) Cr 50.0 C 13.0 A 16.0 N 140.6 |
| 22155 | $C_3H_7$— | —$C_6H_{13}$ | CrX 39.0 Cr 44.5 B 37.5 C 42.0 A 71.5 N 132.0 |
| 22156 | $C_3H_7$— | —$C_7H_{15}$ | Cr 40.5 S 18.0 B 29.5 C 42.5 A 42.5 N 133.5 |
| 22157 | $C_3H_7$— | —$C_8H_{17}$ | Cr 49.0 B 39.2 C 40.5 A 86.8 N 127.0 |
| 22158 | $C_3H_7$— | —$C_9H_{19}$ | Cr 46.0 B 35.0 C 52.2 A 89.0 N 126.5 |
| 22159 | $C_3H_7$— | —$C_{10}H_{21}$ | Cr 58.0 B 40.5 A 95.5 N 121.7 |
| 22160 | $C_3H_7$— | —$C_{11}H_{23}$ | Cr 54.5 B 42.5 A 97.2 N 120.6 |
| 22162 | $C_5H_{11}$— | —$C_2H_5$ | Cr 47.0 B 64.0 A 90.0 N 128.7 |
| 22163 | $C_5H_{11}$— | —$C_3H_7$ | Cr 55.0 B 61.0 A 99.5 N 141.5 |

TABLE 325

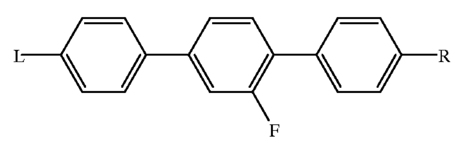

| LCReg | L | R | Phases |
|---|---|---|---|
| 22164 | $C_5H_{11}$— | —$C_4H_9$ | Cr 68.0 B 67.0 A 106.8 N 131.2 |
| 22165 | $C_5H_{11}$— | —$C_5H_{11}$ | Cr 51.5 B 62.0 A 109.5 N 136.5 |
| 58119 | $C_5H_{11}$— | —$C_7H_{15}$ | Cr 64.5 A 113.0 N 128.5 |
| 58128 | $C_7H_{15}$— | —$C_5H_{11}$ | Cr <−20.0 B 87.5 A 123.5 N 129.4 |
| 58130 | $C_7H_{15}$— | —$CH_2$—O—$C_3H_7$ | Cr 40.2 B 60.1 A 100.8 N 104.8 |
| 58131 | $C_7H_{15}$— | —$C_2H_4$—O—$C_2H_5$ | Cr <−20.0 B 72.9 A 104.6 N 105.3 |
| 58132 | $C_7H_{15}$— | —$C_3H_6$—O—$CH_3$ | Cr <−20.0 B 71.2 A 99.3 N 118.9 |
| 22166 | $C_3H_7$— | —O—$C_4H_9$ | Cr 92.0 N 180.0 |
| 22167 | $C_5H_{11}$— | —O—$CH_3$ | Cr 60.5 N 177.5 |
| 22168 | $C_5H_{11}$— | —O—$C_2H_5$ | Cr 88.0 N 186.0 |
| 22169 | $C_5H_{11}$— | —O—$C_4H_9$ | Cr 65.5 C 96.5 N 172.5 |
| 22170 | $C_5H_{11}$— | —O—$C_6H_{13}$ | Cr 62.5 J 47.5 Sm1 50.0 C 113.5 N 162.5 |
| 58171 | $C_5H_{11}$— | —O—$C_8H_{17}$ | Cr 47.0 J 40.0 Sm1 53.5 C 116.5 A 130.0 N 155.0 |
| 58129 | $C_7H_{15}$— | —O—$C_4H_9$ | Cr 50.0 B 88.8 C 107.7 A 135.9 N 155.0 |
| 22174 | $C_3H_7$— | —O—CHMe—COO —$C_2H_5$ | (49.0) Cr 72.5 A 51.0 * 53.0 |

TABLE 326

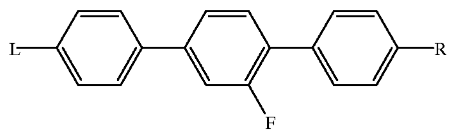

| LCReg | L | R | Phases |
|---|---|---|---|
| 22175 | $C_3H_7$— | —CO—$CH_3$ | Cr 130.0 A 145.0 N 187.0 |
| 22176 | $C_3H_7$— | —CO—$C_2H_5$ | Cr 114.0 A 182.5 N 212.8 |
| 22177 | $C_3H_7$— | —CO—$C_3H_7$ | Cr 98.0 B 118.0 A 182.0 N 186.0 |
| 22178 | $C_3H_7$— | —CO—$C_4H_9$ | Cr 85.0 B 87.0 A 186.0 N 189.0 |
| 22179 | $C_3H_7$— | —CO—$C_5H_{11}$ | Cr 91.0 A 186.5 |
| 22180 | $C_3H_7$— | —CO—$C_6H_{13}$ | Cr 85.0 A 188.0 |
| 22181 | $C_3H_7$— | —CO—$C_7H_{15}$ | Cr 94.0 A 183.5 |
| 22182 | $C_3H_7$— | —CO—$C_8H_{17}$ | Cr 92.0 A 184.0 |

TABLE 326-continued

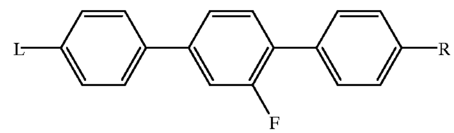

| LCReg | L | R | Phases |
|---|---|---|---|
| 22183 | $C_3H_7$— | —CO—$C_9H_{19}$ | Cr 98.5 A 180.5 |
| 22184 | $C_3H_7$— | —CO—$C_{10}H_{21}$ | Cr 97.0 A 179.0 |
| 22185 | $C_5H_{11}$— | —CO—$CH_3$ | Cr 80.0 A 155.2 N 181.1 |
| 22186 | $C_5H_{11}$— | —CO—$C_2H_5$ | Cr 63.0 B 88.0 A 195.0 N 206.0 |
| 22187 | $C_5H_{11}$— | —CO—$C_3H_7$ | Cr 71.5 B 98.0 A 184.4 |
| 22188 | $C_5H_{11}$— | —CO—$C_4H_9$ | Cr 84.0 B 98.5 A 191.0 |
| 22172 | $C_3H_7$— | —OOC—$CH_3$ | Cr 120.0 N 201.5 |

TABLE 327

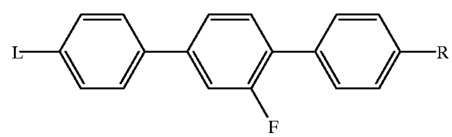

| LCReg | L | R | * | Phases |
|---|---|---|---|---|
| 22173 | $C_3H_7$— | —OOC—$C_5H_{11}$ | | Cr 90.5 N 182.0 |
| 22189 | $C_5H_{11}$— | —OOC—CHMe—$CH_3$ | 1 | CrX 53.5 Cr 56.0 B 98.0 A 145.0 |
| 58121 | $C_3H_7$—O—$CH_2$— | —$C_3H_7$ | | Cr 38.0 C 35.2 N 106.6 |
| 58122 | $C_3H_7$—O—$CH_2$— | —$C_5H_{11}$ | | Cr 35.1 C 48.4 N 108.9 |
| 58123 | $C_3H_7$—O—$CH_2$— | —$C_7H_{15}$ | | Cr 22.0 C 54.0 N 100.0 |
| 58124 | $C_3H_7$—O—$CH_2$— | —$C_9H_{19}$ | | Cr 34.0 C 63.6 N 96.0 |
| 58125 | $C_2H_5$—O—$C_2H_4$— | —$C_7H_{15}$ | | Cr 23.4 B 50.1 A 90.5 N 105.1 |
| 58126 | $CH_3$—O—$C_3H_6$— | —$C_7H_{15}$ | | Cr 43.7 B 44.3 C 71.6 A 77.2 N 124.0 |
| 58127 | $CH_3$—O—$C_3H_6$— | —$C_9H_{19}$ | | Cr 41.7 B 45.4 C 68.2 A 94.6 N 118.0 |
| 60674 | $CH_3$—O— | —$C_3H_7$ | | Cr 85.0 N 185.0 |
| 60675 | $CH_3$—O— | —$C_5H_{11}$ | | Cr 72.0 N 177.0 |
| 22190 | $C_2H_5$—O— | —$C_5H_{11}$ | | Cr 98.0 N 191.5 |
| 22191 | $C_2H_5$—O— | —$C_8H_{17}$ | | Cr 107.0 N 170.5 |
| 22192 | $C_2H_5$—O— | —$C_9H_{19}$ | | Cr 92.0 N 167.5 |
| 22193 | $C_4H_9$—O— | —$C_3H_7$ | | CrX 78.0 Cr 103.0 C 112.5 A 135.0 N 183.0 |

TABLE 328

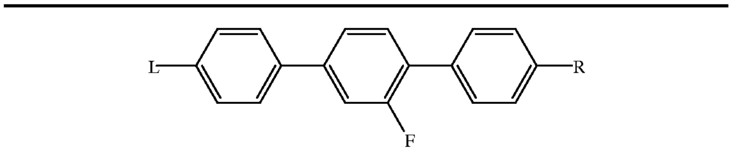

| LCReg | L | R | Phases |
|---|---|---|---|
| 22194 | $C_4H_9$—O— | —$C_5H_{11}$ | Cr 59.5 E 85.5 B 86.5 C 99.5 A 144.0 N 176.0 |
| 58120 | $C_4H_9$—O— | —$C_7H_{15}$ | Cr 67.5 E 79.2 B 87.0 A 148.0 N 166.4 |
| 22195 | $C_6H_{13}$—O— | —$C_5H_{11}$ | Cr 70.0 G 78.0 B 92.0 Sm1 93.0 C 118.0 A 155.0 N 166.5 |

TABLE 328-continued

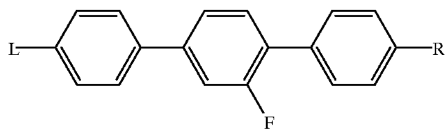

| LCReg | L | R | Phases |
|---|---|---|---|
| 22196 | $C_8H_{17}$—O— | —$C_5H_{11}$ | Cr 69.0 G 83.0 B 100.5 C 124.0 A 158.0 N 161.0 |
| 22197 | $C_2H_5$—O— | —O—$CH_3$ | Cr 165.0 N 244.3 |
| 22198 | $C_2H_5$—O— | —O—$C_4H_9$ | Cr 136.0 N 226.0 |
| 22199 | $C_2H_5$—O— | —O—$C_7H_{15}$ | Cr 125.0 N 201.5 |
| 22200 | $C_4H_9$—O— | —$C_2H_5$ | Cr 140.0 N 225.5 |
| 22201 | $C_4H_9$—O— | —O—$C_4H_9$ | CrX 118.0 Cr 139.0 C 144.5 N 222.5 |
| 60676 | $CH_3$—S— | —$C_3H_7$ | Cr 100.0 B 108.0 A 112.0 N 168.0 |
| 60677 | $CH_3$—S— | —$C_5H_{11}$ | Cr 94.0 A 116.0 N 165.0 |
| 22202 | $CH_3$—OOC —$C_4H_8$—O— | —$C_6H_{13}$ | Cr 71.0 A 107.0 N 128.0 |
| 22203 | $C_2H_5$—OOC —$C_4H_8$—O— | —$C_6H_{13}$ | CrX 52.0 Cr 69.0 C 105.0 N 124.0 |
| 22204 | $C_2H_5$—OOC —$C_4H_8$—O— | —$C_7H_{15}$ | Cr 77.0 C 111.0 N 129.0 |
| 22205 | $C_2H_5$—OOC —CHMe—OOC— | —O—$C_8H_{17}$ | Cr 40.0 A 116.0 |

TABLE 329

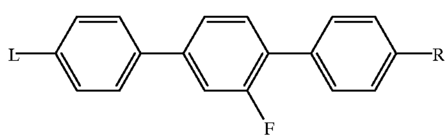

| LCReg | L | R | * | Phases |
|---|---|---|---|---|
| 22216 | $C_5H_{11}$—CHMe—O— | —$C_8H_{17}$ | R | Cr 37.0 C* 17.0 A 28.0 |
| 22217 | $C_5H_{11}$—CHMe—O— | —O—$C_6H_{13}$ | R | Cr 71.0 C* 72.3 A 99.5 |
| 22218 | $C_5H_{11}$—CHMe—O— | —O—$C_{10}H_{21}$ | R | Cr 77.0 C* 83.5 A 96.5 |
| 22219 | $C_2H_5$—CHMe—$CH_2$— | —$C_5H_{11}$ | 1 | Cr 26.0 N* 95.5 BP* 96.0 |
| 22220 | $C_2H_5$—CHMe—$CH_2$— | —O—$C_4H_9$ | 1 | Cr 66.5 N* 139.5 BP* 140.0 |
| 22221 | $C_2H_5$—CHMe—$CH_2$— | —O—$C_6H_{13}$ | 1 | Cr 51.0 C* 71.0 N* 132.5 BP 133.0 |
| 22222 | $C_2H_5$—CHMe—$C_3H_6$—O— | —$C_8H_{17}$ | S | Cr 49.5 S 57.0 C* 122.0 A 127.5 N* 130.5 |
| 22223 | $C_2H_5$—CHMe—$C_3H_6$—O— | —O—$C_8H_{17}$ | 2 | Cr 93.5 C 151.5 N 162.0 |

TABLE 330

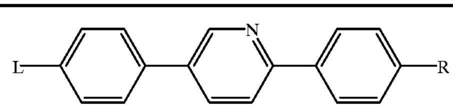

| L | R | | Cr | LC |
|---|---|---|---|---|
| $C_4H_9$—COO—CHMe—$CH_2$—O— | —$C_9H_{19}$ | S | K 82.9 | S 101.2 C* 121.7 I |
| $C_3H_7$—COO—$CH_2$—CHMe —$CH_2$—O— | —$C_6H_{13}$ | P | K ? | S 89 S 114 S 132 C* 145 A 145.5 I |
| $C_3H_7$—O—CHMe—COO —CHMe—$CH_2$—O— | —$C_5H_{11}$ | S | K 76.2 | C* 101 A 113.3 N* 114.9 I |
| $C_3H_7$—O—CHMe—COO —CHMe—$CH_2$—O— | —$C_6H_{13}$ | S | K 75.1 | C* 100.7 A 105.5 N* 108.2 I |
| $C_3H_7$—O—CHMe —COO—CHMe—$CH_2$—O— | —$C_7H_{15}$ | S | K 73.5 | C* 104.2 N* 111.2 I |
| $C_3H_7$—O—CHMe—COO —CHMe—$CH_2$—O— | —$C_9H_{19}$ | S | K 70.1 | C* 102.7 A 107.8 N* 108.5 I |
| $C_4H_9$—O—CHMe—COO —CHMe—$CH_2$—O— | —$C_5H_{11}$ | S | K 76 | C* 93.4 A 111.1 I |

TABLE 330-continued

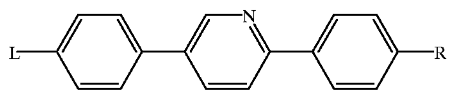

| L | R | | Cr | LC |
|---|---|---|---|---|
| $C_4H_9$—O—CHMe—COO<br>—CHMe—$CH_2$—O— | —$C_6H_{13}$ | S | K 57.6 | C* 84 A 106.1 I |
| $C_4H_9$—O—CHMe—COO<br>—CHMe—$CH_2$—O— | —$C_7H_{15}$ | S | K 63.5 | C* 97.6 A 108.8 I |
| $C_4H_9$—O—CHMe—COO<br>—CHMe—$CH_2$—O— | —$C_9H_{19}$ | S | K 68.9 | C* 107 I |
| $C_2H_5$—O—$CH_2$—COO<br>—$CH_2$—CHMe—$CH_2$—O— | —$C_6H_{13}$ | S | K 63 | S 77.8 C* 122.3<br>C* 132.3 A 138.8 I |
| $C_3H_7$—O—CHMe—COO<br>—$CH_2$—CHMe—$CH_2$—O— | —$C_6H_{13}$ | S | K ? | S 62 S 99 C* 116<br>A 117.4 I |
| $C_3H_7$—O—CHMe—COO— | —$C_6H_{13}$ | S | K 110 | S 116 S 132 C* 161.4 I |
| $C_5H_{11}$— | —O—CHMe<br>—$C_6H_{13}$ | S | K 78 | A 139 I |
| $C_5H_{11}$— | —O—CHMe<br>—$C_{10}H_{21}$ | S | K 70 | A 127 I |
| $C_5H_{11}$—O— | —O—CHMe<br>—$C_6H_{13}$ | S | K 104 | S 117 B 132 C* 142 |
| $C_4H_9$— | —O—$CH_2$<br>—CHMe—$C_2H_5$ | S | K ? | A 165 I<br>H 116.5 G* 139.2 |
| $C_7H_{15}$—O— | —O—$CH_2$<br>—CHME—$C_2H_5$ | S | K 114 | F* 144.4 B 158.7 C* 165.8<br>A 191.4 I<br>E 127 F* 168 C* 213 |
| $C_8H_{17}$—O— | —O—$CH_2$<br>—CHMe—$C_2H_5$ | S | K 110 | A 215 I<br>E 122 F* 164 C* 212 |
| $C_9H_{19}$—O— | —O—$CH_2$<br>—CHMe—$C_2H_5$ | S | K 97 | A 214 I<br>E 117 F* 160 C* 207 |
| $C_{10}H_{21}$—O— | —O—$CH_2$<br>—CHMe—$C_2H_5$ | S | K 85 | A 208 I<br>E 108 F* 146 C* 205 |
| $C_8H_{17}$— | —O—$C_2H_5$<br>—CHMe—$C_3H_7$ | S | K 87 | A 206 I<br>S 109 S 180 C 194 |
| $C_4H_9$— | —OOC—$C_4H_9$<br>—CHMe—$C_2H_5$ | S | K ? | A 215 I<br>G* 111.3 F* 152.4 B 182.8 |
| $C_4H_9$— | —O—$C_5H_{11}$<br>—CHMe—$C_2H_5$ | S | K 51 | A 207 I<br>B 98.8 S 102.5 S 170 |
| $C_8H_{17}$— | —O—$CH_2$—CHF<br>—$C_7H_{15}$ | S | K 75.4 | C* 182.3 A 196.3 I<br>S 106 B 153.7 C* 158.5<br>A 183.3 I |
| $C_6H_{13}$—CHMe—O— | —$C_5H_{11}$ | S | K 58 | C* 115 A 116 N* 117 I |
| $C_2H_5$—CHMe—COO—CHMe—$CH_2$—O— | —$C_6H_{13}$ | S | K 107 | C* 112 I |
| $C_2H_5$—CHMe—COO—CHMe—$CH_2$—O— | —$C_7H_{15}$ | S | K 101 | C* 113.1 I |
| $C_2H_5$—CHMe—COO—CHMe—$CH_2$—O— | —$C_9H_{19}$ | S | K 92.3 | C* 108.6 A 110.6 I |
| $C_6H_{13}$—CHMe—OOC— | —$c_6H_{13}$ | S | K 57.4 | S 60 S 90.3 C* 94<br>A 116.5 I |

TABLE 331

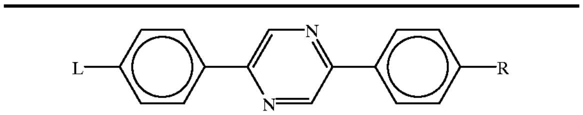

| No | L | R | Cr | LC |
|---|---|---|---|---|
| 25427 | $CH_3$— | —CN | K 196 | A 221 N 296 I |
| 25428 | $C_2H_5$— | —CN | K 190 | A 197 N 278 I |
| 25429 | $C_3H_7$— | —CN | K 169 | A 179 N 277 I |
| 25430 | $C_4H_9$— | —CN | K 129 | A 139 N 256 I |
| 25431 | $C_5H_{11}$— | —CN | K 131 | A 140 N 263 I |
| 25432 | $C_6H_{13}$— | —CN | K 107 | A 125 N 225 U |
| 25433 | $C_7H_{15}$— | —CN | K 110 | A 132 N 242 I |
| 25434 | $C_8H_{17}$— | —CN | K 125 | A 133 N 240 I |
| 25435 | $C_9H_{19}$— | —CN | K 105 | A 107 N 232 I |
| 25436 | $C_{12}H_{25}$— | —CN | K 109 | C 119 A 227 I |
| 25437 | $C_{16}H_{33}$— | —CN | K 106 | C 119 A 221 I |
| 25438 | $CH_3$—O— | —CN | K 182 | S 189 A 321 I |
| 25439 | $C_7H_{15}$—O— | —CN | K 97 | X 267 I |
| 25440 | $C_8H_{17}$—O— | —CN | K 96 | X 270 I |

TABLE 331-continued

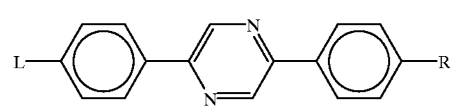

| No | L | R | Cr | LC |
|---|---|---|---|---|
| 25441 | $C_9H_{19}$—O— | —CN | K 102 | X 263 I |
| 25442 | $C_{10}H_{21}$—O— | —CN | K 104 | X 252 I |
| 25443 | $C_{11}H_{23}$—O— | —CN | K 109 | X 263 I |
| 25444 | $C_{12}H_{25}$—O— | —CN | K 105 | X 252 I |
| 25445 | $C_{13}H_{27}$—O— | —CN | K 103 | X 246 I |
| 25450 | $C_4H_9$— | —$C_4H_9$ | K 161.3 | C 166.4 N 181.9 I |
| 25451 | $C_5H_{11}$— | —$C_5H_{11}$ | K 134.3 | C 173.6 A 182.2<br>N 191.3 I |
| 25452 | $C_6H_{13}$— | —$C_6H_{13}$ | K 116.1 | C 172.3 A 179.2 I |

TABLE 332

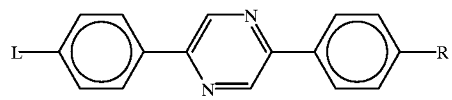

| No | L | R | | Cr | LC |
|---|---|---|---|---|---|
| 25453 | $C_7H_{15}$— | —$C_7H_{15}$ | | K 109.6 | C 175 A 187 I |
| 25454 | $C_8H_{17}$— | —$C_8H_{17}$ | | K 104.6 | C 178 A 187 I |
| 25455 | $C_9H_{19}$— | —$C_9H_{19}$ | | K 108.8 | C 177 I |
| 25456 | $C_{10}H_{21}$— | —$C_{10}H_{21}$ | | K 112 | S 106 C 170.5 I |
| 25458 | $C_2H_5$— | —O—$CH_3$ | | K 162 | A 163 N 229 I |
| 25460 | $C_4H_9$— | —O—$CH_3$ | | K 138 | A 139 N 230 I |
| 25462 | $C_6H_{13}$— | —O—$CH_3$ | | K 137 | A 138 N 206 U |
| 25464 | $C_8H_{17}$— | —O—$CH_3$ | | K 135 | A 136 N 225 U |
| 25466 | $C_{12}H_{25}$— | —O—$CH_3$ | | K 131 | A 169 N 180 I |
| 25467 | $C_{16}H_{33}$— | —O—$CH_3$ | | K 127 | A 175 I |
| 25469 | $C_5H_{11}$— | —OOC—$C_3H_7$ | | K 158 | S 200 N 219 I |
| 25473 | $C_4H_9$—O— | —O—$C_4H_9$ | | K 170.3 | C 218 N 246 I |
| 25474 | $C_5H_{11}$—O— | —O—$C_5H_{11}$ | | K 153.4 | C 211 N 224 I |
| 25475 | $C_6H_{13}$—O— | —O—$C_6H_{13}$ | | K 135.7 | B 139.6 C 212 N 220 I |
| 25476 | $C_7H_{15}$—O— | —O—$C_7H_{15}$ | | K 126 | B 128.5 C 211 N 212 I |
| 25477 | $C_8H_{17}$—O— | —O—$C_8H_{17}$ | | K 118.8 | B 121.1 C 209 I |
| 25478 | $C_9H_{19}$—O— | —O—$C_9H_{19}$ | | K 118.7 | C 204 I |
| 25479 | $C_{10}H_{21}$—O— | —O—$C_{10}H_{21}$ | | K 113 | C 201 I |
| 25481 | $C_8H_{17}$—O— | —COO—CHMe<br>—$C_2H_5$ | 1<br>1 | K 11 | C* 161 A 184 I |
| 25482 | $C_{10}H_{21}$—O— | —COO—CHMe<br>—$C_6H_{13}$ | | K 138 | C* 139 A 162 I |

TABLE 333

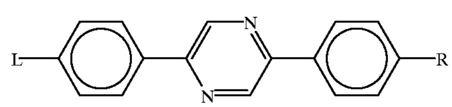

| No | L | R | | Cr | LC |
|---|---|---|---|---|---|
| 25483 | $C_{12}H_{25}$— | —O—$CH_2$—CHMe<br>—$C_2H_5$ | S | K 67 | S 100 C* 155 A 157 I |
| 25484 | $C_{10}H_{21}$— | —COO—$CH_2$—CHMe<br>—$C_2H_5$ | S | K 85 | C* 120 A 166 I |
| 25485 | $C_{12}H_{25}$— | —COO—$CH_2$—CHMe<br>—$C_2H_5$ | S | K 95 | C* 130 A 162 I |
| 25486 | $C_{16}H_{33}$— | —COO—$CH_2$—CHMe<br>—$C_2H_5$ | S | K 95 | C* 100 A 165 I |
| 25487 | $C_7H_{15}$—O— | —COO—$CH_2$—CHMe<br>—$C_2H_5$ | S | K 128 | C* 175 A 200 I |
| 25488 | $C_8H_{17}$—O— | —COO—$CH_2$—CHMe<br>—$C_2H_5$ | S | K 109 | C* 175 A 182 I |
| 25489 | $C_9H_{19}$—O— | —COO—$CH_2$—CHMe<br>—$C_2H_5$ | S | K 113 | C* 171 A 199 I |
| 25490 | $C_{10}H_{21}$—O— | —COO—$CH_2$—CHMe<br>—$C_2H_5$ | S | K 98 | C* 171 A 199 I |
| 25491 | $C_{11}H_{23}$—O— | —COO—$CH_2$—CHMe<br>—$C_2H_5$ | S | K 90 | C* 160 A 193 I |
| 25492 | $C_{12}H_{25}$—O— | —COO—$CH_2$—CHMe<br>—$C_2H_5$ | S | K 110 | C* 166 A 186 I |
| 25493 | $C_{13}H_{27}$—O— | —COO—$CH_2$—CHMe<br>—$C_2H_5$ | S | K 100 | C* 160 A 185 I |
| 25494 | $C_{10}H_{21}$—O— | —COO—$C_3H_6$—<br>—CHMe—$C_2H_5$ | S | K 88 | C* 168 A 199 I |

TABLE 334

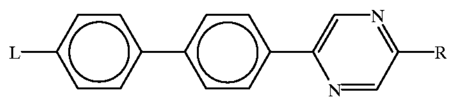

| No | L | R | Cr | LC |
|---|---|---|---|---|
| 26944 | F— | —O—$C_4H_9$ | K 118.7 | A 202.3 I |
| 26945 | F— | —O—$C_5H_{11}$ | K 120 | A 204 I |
| 26946 | F— | —O—$C_6H_{13}$ | K 110.5 | A 195.5 I |
| 26947 | F— | —O—$C_7H_{15}$ | K 117.1 | A 191.1 I |
| 26948 | F— | —O—$C_8H_{17}$ | K 115.6 | A 188 I |
| 26949 | F— | —O—$C_9H_{19}$ | K 116.2 | A 179.4 I |
| 26950 | F— | —O—$C_{10}H_{21}$ | K 117.1 | A 178.6 I |
| 26951 | F— | —O—$C_{12}H_{25}$ | K 121.3 | A 170.5 I |
| 26952 | $C_3H_7$— | —O—$C_4H_9$ | K 91.7 | E 149.2 B 161 A 198.7 N 201.3 I |
| 26953 | $C_3H_7$— | —O—$C_5H_{11}$ | K 92.4 | E 143 B 156 A 191.2 N 192.5 I |
| 26954 | $C_3H_7$— | —O—$C_6H_{13}$ | K 92.6 | E 135.9 B 149.8 A 191.4 N 192.1 I |
| 26955 | $C_3H_7$— | —O—$C_7H_{15}$ | K 77.3 | E 132.7 B 147.8 A 187.9 I |
| 26956 | $C_3H_7$— | —O—$C_8H_{17}$ | K 88.8 | E 130.5 B 149.9 A 198.5 U |
| 26957 | $C_3H_7$— | —O—$C_9H_{19}$ | K 91.8 | E 120.7 B 138.3 N 180.5 I |
| 26958 | $C_3H_7$— | —O—$C_{10}H_{21}$ | K 93.2 | E 118 B 135 N 181 I |
| 26959 | $C_3H_7$— | —O—$C_{12}H_{25}$ | K 105.4 | E 108 B 128.4 N 171.7 I |

TABLE 337

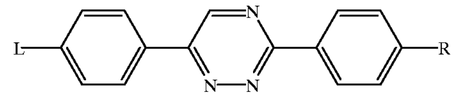

| LCReg | L | R | Phases |
|---|---|---|---|
| 22609 | $C_9H_{19}$—O— | —H | Cr 98.0 A 166.0 |
| 22610 | $C_{10}H_{21}$—O— | —H | Cr 96.5 A 165.5 |
| 22612 | $C_5H_{11}$—COO— | —H | Cr 146.0 A 156.0 |
| 22621 | $C_5H_{11}$— | —$C_5H_{11}$ | Cr 150.0 C 169.0 N 185.0 |
| 22622 | $C_6H_{13}$— | —$C_6H_{13}$ | Cr 128.0 C 179.0 A 183.0 N 188.0 |
| 22623 | $C_7H_{15}$— | —$C_7H_{15}$ | Cr 116.0 C 182.0 A 186.0 |
| 22638 | $C_2H_5$— | —O—$C_5H_{11}$ | Cr 115.0 C 136.0 N 197.0 |
| 22639 | $C_2H_5$— | —O—$C_6H_{13}$ | Cr 111.0 C 137.0 N 198.0 |
| 22640 | $C_2H_5$— | —O—$C_7H_{15}$ | Cr 106.0 C 138.0 N 193.0 |
| 22641 | $C_2H_5$— | —O—$C_8H_{17}$ | Cr 104.0 C 139.0 N 195.0 |
| 22642 | $C_2H_5$— | —O—$C_9H_{19}$ | Cr 100.0 C 141.0 N 190.0 |
| 22643 | $C_2H_5$— | —O—$C_{10}H_{21}$ | Cr 103.0 C 150.0 N 191.0 |
| 22650 | $C_4H_9$— | —O—$C_6H_{13}$ | Cr 126.0 C 168.0 N 206.0 |
| 22651 | $C_4H_9$— | —O—$C_7H_{15}$ | Cr 75.0 C 172.0 N 197.0 |
| 22652 | $C_4H_9$— | —O—$C_8H_{17}$ | Cr 79.0 C 171.0 N 190.0 |

TABLE 335

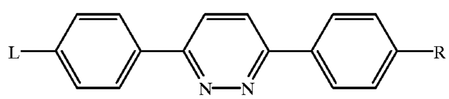

| LCReg | L | R | Phases |
|---|---|---|---|
| 22561 | $C_3H_7$— | —O—CHMe—$C_6H_{13}$ | Cr 116.0 C* 133.6 N* 137.8 |
| 22562 | $C_9H_{19}$— | —O—CHMe—$C_6H_{13}$ | Cr 126.0 C* 154.0 |
| 67241 | $C_{11}H_{23}$—O— | —$CH_2$—CHME—$C_2H_5$ | Cr 85.0 S 139.0 S 145.4 C* 197.9 |
| 67242 | $C_{12}H_{25}$—O— | —$CH_2$—CHMe—$C_2H_5$ | Cr 104.4 S 133.0 S 142.8 C* 196.7 |
| 22566 | $C_3H_7$— | —S—$CH_2$—CHMe—OOC —$C_3H_6$—CHMe—$C_2H_5$ | Cr 148.0 C* 152.3 |

TABLE 346

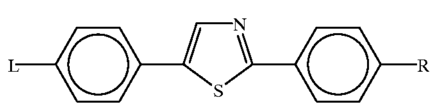

| No | L | R | Cr | LC |
|---|---|---|---|---|
| 25816 | $Me_3Sl$—$C_3H_6$— | —$C_6H_{13}$ | K 96 | C 109 I |
| 25817 | $C_4H_9SlMe_2$ —$C_3H_6$—COO— | —$C_6H_{13}$ | K 51 | C 90 I |
| 25818 | $C_6H_{13}$— | —$C_6H_{13}$ | K 68.8 | A 116.5 N 120.1 I |
| 25819 | $C_9H_{19}$— | —$C_6H_{13}$ | K 61 | C 72.2 A 126.8 I |
| 25828 | $C_3H_7$—O— | —$C_6H_{13}$ | K 79 | C 70 A 101 N 147.5 I |
| 25841 | $C_3H_7$—O— | —O—$C_8H_{17}$ | K 78 | C 98 N 161 I |
| 25842 | $C_4H_9$—COO— | —$C_6H_{13}$ | K 101.9 | C 128.5 N 149.4 I |

TABLE 338

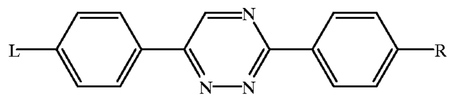

| LCReg | L | R | * | Phases |
|---|---|---|---|---|
| 22653 | $C_4H_9$— | —O—$C_9H_{19}$ | | Cr 78.0 C 173.0 N 196.0 |
| 22654 | $C_4H_9$— | —O—$C_{10}H_{21}$ | | Cr 81.0 C 175.0 N 190.0 |
| 22655 | $C_5H_{11}$— | —O—$C_5H_{11}$ | | Cr 121.0 C 177.0 N 204.0 |
| 22656 | $C_6H_{13}$— | —O—$C_6H_{13}$ | | Cr 91.0 C 186.0 N 200.0 |
| 22657 | $C_7H_{15}$— | —O—$C_7H_{15}$ | | Cr 83.0 C 193.0 N 199.0 |
| 22658 | $C_8H_{17}$— | —O—$C_8H_{17}$ | | Cr 80.0 C 192.0 |
| 22659 | $C_9H_{19}$— | —O—$C_9H_{19}$ | | Cr 85.0 C 192.0 |
| 22660 | $C_{10}H_{21}$— | —O—$C_{10}H_{21}$ | | Cr 84.0 C 190.0 |
| 22670 | $C_9H_{19}$—O— | —$C_9H_{19}$ | | Cr 96.0 C 197.0 |
| 22671 | $C_{10}H_{21}$—O— | —$C_{10}H_{21}$ | | Cr 97.0 C 198.0 |
| 22713 | $C_5H_{11}$—S— | —O—$C_5H_{11}$ | | Cr 111.0 C 181.0 N 189.0 |
| 22719 | $C_8H_{17}$—O— | —OOC—CHCl —CHMe—$CH_3$ | 1 | Cr 126.1 J 146.6 C* 187.9 A 192.3 |
| 22720 | $C_{12}H_{25}$—O— | —OOC—CHCl —CHMe—$CH_3$ | 1 | Cr 94.9 J 137.4 C* 184.6 A 187.9 |
| 22721 | $C_8H_{17}$—O— | —OOC—CHCl —CHMe—$C_2H_5$ | 3 | Cr 76.6 J 144.3 C* 172.6 A 172.8 |
| 22722 | $C_{12}H_{25}$—O— | —OOC—CHCl —CHMe—$C_2H_5$ | 3 | Cr 76.7 J 134.4 C* 169.3 A 169.5 |

TABLE 339

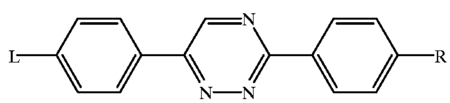

| LCReg | L | R | * | Phases |
|---|---|---|---|---|
| 22724 | $C_8H_{17}$—O— | —OOC—CHCl—$C_3H_7$ | 1 | Cr 111.9 J 127.7 C*190.2 A 195.2 |
| 22725 | $C_{12}H_{25}$—O— | —OOC—CHCl—$C_3H_7$ | 1 | Cr 116.3 J 117.5 C*185.3 A 187.9 |
| 62895 | $C_2H_5$—CHMe —$CH_2$—O— | —$C_8H_{17}$ | S | Cr 81.3 C* 179.9 N* 183.7 |
| 62896 | $C_2H_5$—CHMe —$C_2H_{10}$—O— | —$C_8H_{17}$ | S | Cr 72.6 C* 179.5 |

TABLE 340

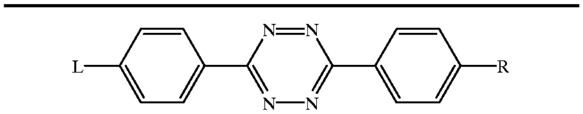

| LCReg | L | R | Phases |
|---|---|---|---|
| 22733 | $C_7H_{15}$—O— | —H | Cr 107.0 N 129.0 |
| 22734 | $C_8H_{17}$—O— | —H | Cr 128.0 N 131.0 |
| 22750 | $C_5H_{11}$— | —$C_5H_{11}$ | Cr 163.0 N 172.5 |
| 22751 | $C_6H_{13}$— | —$C_6H_{13}$ | Cr 156.5 N 157.5 |
| 22752 | $C_7H_{15}$— | —$C_7H_{15}$ | Cr 150.0 N 160.0 |
| 22753 | $C_8H_{17}$— | —$C_8H_{17}$ | Cr 145.0 N 151.0 |
| 22754 | $C_9H_{19}$— | —$C_9H_{19}$ | Cr 139.0 C 145.0 N 150.0 |
| 22755 | $C_{10}H_{21}$— | —$C_{10}H_{21}$ | Cr 136.0 C 146.0 N 146.5 |
| 22756 | $C_8H_{17}$— | —O—$C_4H_9$ | Cr 131.0 C 134.0 N 179.0 |
| 22757 | $C_8H_{17}$— | —O—$C_8H_{17}$ | Cr 127.0 C 162.5 N 172.5 |
| 22758 | $C_9H_{19}$— | —O—$C_6H_{13}$ | Cr 119.0 S 153.5 N 175.0 |
| 22765 | $C_7H_{15}$—O— | —O—$C_7H_{15}$ | Cr 146.0 S 183.0 N 197.0 |
| 22766 | $C_8H_{17}$—O— | —O—$C_8H_{17}$ | Cr 131.0 S 187.5 N 195.0 |
| 22767 | $C_9H_{19}$—O— | —O—$C_9H_{19}$ | Cr 120.0 S 188.0 N 190.0 |
| 22768 | $C_{10}H_{21}$—O— | —O—$C_{10}H_{21}$ | Cr 111.0 S 189.5 |

TABLE 341

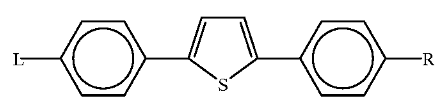

| No | L | R | Cr | LC |
|---|---|---|---|---|
| 25783 | $C_6H_{13}$— | —O—$C_6H_{13}$ | K 148 | A 152 N 155 I |

TABLE 342

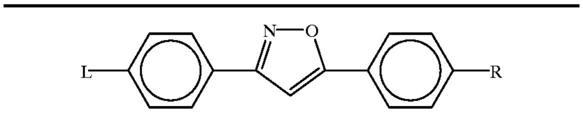

| No | L | R | Cr | LC |
|---|---|---|---|---|
| 25800 | $C_6H_{13}$—O— | —O—$C_6H_{13}$ | K 110.8 | C 130.6 N 161 I |
| 25801 | $C_7H_{15}$—O— | —O—$C_7H_{15}$ | K 109.8 | C 139.4 N 155.8 I |
| 25802 | $C_8H_{17}$—O— | —O—$C_8H_{17}$ | K 107.3 | C 149 N 157.3 I |

TABLE 342-continued

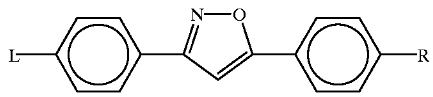

| No | L | R | Cr | LC |
|---|---|---|---|---|
| 25803 | $C_{10}H_{21}$—O— | —O—$C_{10}H_{21}$ | K 98.6 | C 147.4 I |
| 25805 | $H_2C$═CH —$C_4H_8$—O— | —O—$C_4H_8$ —CH═$CH_2$ | K 99 | A 114 N 144 I |
| 25806 | $H_2C$═CH —$C_9H_{18}$—O— | —O—$C_9H_{18}$ —CH═$CH_2$ | K 92 | A 145 I |

TABLE 343

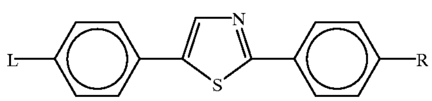

| No | L | R | Cr | LC |
|---|---|---|---|---|
| 25816 | $Me_3$Sl—$C_3H_6$—O— | —$C_6H_{13}$ | K 96 | C 109 I |
| 25817 | $C_4H_9$Sl$Me_2$ —$C_3H_6$—COO— | —$C_6H_{13}$ | K 51 | C 90 I |
| 25818 | $C_6H_{13}$— | —$C_6H_{13}$ | K 68.8 | A 116.5 N 120.1 I |
| 25819 | $C_9H_{19}$— | —$C_6H_{13}$ | K 61 | C 72.2 A 126.8 I |
| 25828 | $C_3H_7$—O— | —$C_6H_{13}$ | K 79 | C 70 A 101 N 147.5 I |
| 25841 | $C_3H_7$—O— | —O—$C_8H_{17}$ | K 78 | C 98 N 161 I |
| 25842 | $C_4H_9$—COO— | —$C_6H_{13}$ | K 101.9 | C 128.5 N 149.4 I |

TABLE 344

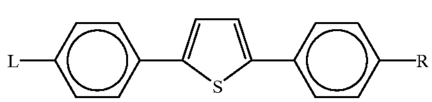

| No | L | R | Cr | LC |
|---|---|---|---|---|
| 25783 | $C_6H_{13}$— | —O—$C_6H_{13}$ | K 148 | A 152 N 155 I |

TABLE 345

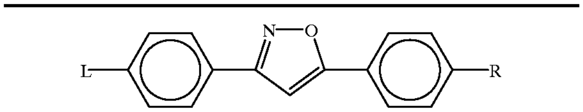

| No | L | R | Cr | LC |
|---|---|---|---|---|
| 25800 | $C_6H_{13}$—O— | —O—$C_6H_{13}$ | K 110.8 | C 130.6 N 161 I |
| 25801 | $C_7H_{15}$—O— | —O—$C_7H_{15}$ | K 109.8 | C 139.4 N 155.8 I |
| 25802 | $C_8H_{17}$—O— | —O—$C_8H_{17}$ | K 107.3 | C 149 N 157.3 I |
| 25803 | $C_{10}H_{21}$—O— | —O—$C_{10}H_{21}$ | K 98.6 | C 147.4 I |
| 25805 | $H_2C$═CH —$C_4H_8$—O— | —O—$C_4H_8$ —CH═$CH_2$ | K 99 | A 114 N 144 I |
| 25806 | $H_2C$═CH —$C_9H_{18}$—O— | —O—$C_9H_{18}$ —CH═$CH_2$ | K 92 | A 145 I |

TABLE 346

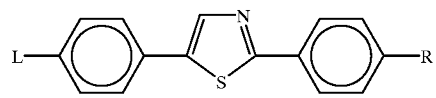

| No | L | R | Cr | LC |
|---|---|---|---|---|
| 25816 | $Me_3$S1—$C_3H_6$—O— | —$C_6H_{13}$ | K 96 | C 109 I |
| 25817 | $C_4H_9$S1$Me_2$ —$C_3H_6$—COO— | —$C_6H_{13}$ | K 51 | C 90 I |
| 25818 | $C_6H_{13}$— | —$C_6H_{13}$ | K 68.8 | A 116.5 N 120.1 I |
| 25819 | $C_9H_{19}$— | —$C_6H_{13}$ | K 61 | C 72.2 A 126.8 I |

TABLE 346-continued

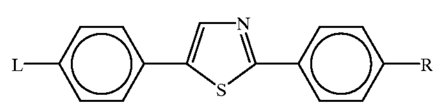

| No | L | R | Cr | LC |
|---|---|---|---|---|
| 25828 | $C_3H_7$—O— | —$C_6H_{13}$ | K 79 | C 70 A 101 N 147.5 I |
| 25841 | $C_3H_7$—O— | —O—$C_8H_{17}$ | K 78 | C 98 N 161 I |
| 25842 | $C_4H_9$—COO— | —$C_6H_{13}$ | K 101.9 | C 128.5 N 149.4 I |

TABLE 347

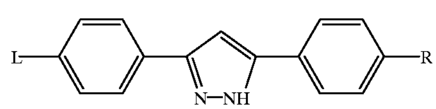

| LCReg | L | R | Phases |
|---|---|---|---|
| 22866 | $C_3H_7$—O— | —O—$C_3H_7$ | Cr 185.6 A 183.8 |
| 22867 | $C_4H_9$—O— | —O—$C_4H_9$ | Cr 181.5 A 204.0 |
| 22868 | $C_5H_{11}$—O— | —O—$C_5H_{11}$ | Cr 170.0 A 198.0 |
| 22869 | $C_6H_{13}$—O— | —O—$C_6H_{13}$ | Cr 159.2 C 169.5 A 200.8 |
| 22870 | $C_7H_{15}$—O— | —O—$C_7H_{15}$ | Cr 151.2 C 178.5 A 194.6 |
| 22871 | $C_8H_{17}$—O— | —O—$C_8H_{17}$ | Cr 141.0 C 183.4 A 192.8 |

TABLE 347-continued

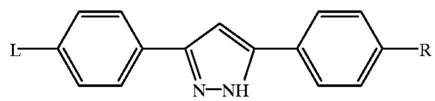

| LCReg | L | R | Phases |
|---|---|---|---|
| 22872 | $C_{10}H_{21}$ —O— | —O—$C_{10}H_{21}$ | CrX 79.3 Cr 130.3 C 180.5 A 182.9 |
| 22874 | $H_2C$=CH —$C_4H_8$—O— | —O—$C_4H_8$ —CH=$CH_2$ | Cr 154.0 A 178.0 |
| 22875 | $H_2C$=CH —$C_9H_{18}$—O— | —O—$C_9H_{18}$ —CH=$CH_2$ | CrX 68.0 Cr 80.0 S 114.0 C 164.0 A 169.0 |

TABLE 348

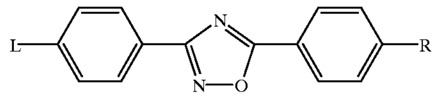

| LCReg | L | R | Phases |
|---|---|---|---|
| 22893 | $C_5H_{11}$—O— | —O—$C_8H_{17}$ | Cr 92.7 N 109.6 |
| 22894 | $C_5H_{11}$—O— | —O—$C_9H_{19}$ | Cr 99.4 N 106.5 |
| 22895 | $C_5H_{11}$—O— | —O—$C_{10}H_{21}$ | Cr 94.5 A 99.8 N 109.2 |
| 60564 | $C_6H_{13}$—O— | —O—$C_9H_{19}$ | Cr 93.0 N 109.0 |
| 22896 | $C_7H_{15}$—O— | —O—$C_4H_9$ | Cr 84.9 N 108.3 |
| 22897 | $C_7H_{15}$—O— | —O—$C_5H_{11}$ | Cr 88.8 N 105.4 |
| 22898 | $C_7H_{15}$—O— | —O—$C_6H_{13}$ | Cr 90.4 N 108.5 |
| 22900 | $C_7H_{15}$—O— | —O—$C_8H_{17}$ | Cr 98.5 N 110.1 |
| 22901 | $C_7H_{15}$—O— | —O—$C_9H_{19}$ | Cr 93.1 N 108.2 |
| 22902 | $C_7H_{15}$—O— | —O—$C_{10}H_{21}$ | Cr 88.7 A 93.7 N 110.0 |

TABLE 349

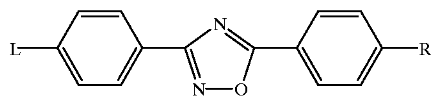

| LCReg | L | R | Phases |
|---|---|---|---|
| 60584 | $O_2N$— | —$C_5H_{11}$ | Cr 100.0 S 114.0 N 117.0 |
| 60585 | $O_2N$— | —O—$C_4H_9$ | Cr 140.0 S 142.0 N 150.0 |
| 60586 | $O_2N$— | —O—$C_7H_{15}$ | Cr 87.0 S 115.0 |
| 69709 | $C_7H_{15}$—O— | —CN | Cr 138.1 N 145.0 |
| 69710 | $C_8H_{17}$—O— | —CN | Cr 135.5 A 136.3 N 147.9 |
| 69711 | $C_9H_{19}$—O— | —CN | Cr 130.0 A 145.1 N 147.3 |
| 60580 | $C_5H_{11}$—O— | —$NO_2$ | Cr 73.0 S 106.0 N 119.0 |
| 60581 | $C_4H_9$—O— | —$NO_2$ | Cr 106.0 N 116.0 |
| 69704 | $C_6H_{13}$—O— | —$NO_2$ | Cr 116.3 A 158.0 |

TABLE 349-continued

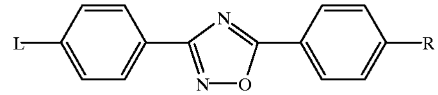

| LCReg | L | R | Phases |
|---|---|---|---|
| 60582 | $C_7H_{15}$—O— | —$NO_2$ | Cr 124.4 A 154.2 |
| 69705 | $C_8H_{17}$—O— | —$NO_2$ | Cr 123.8 A 161.9 |
| 69706 | $C_9H_{19}$—O— | —$NO_2$ | Cr 121.7 A 154.8 |
| 22889 | $C_5H_{11}$—O— | —O—$C_4H_9$ | Cr 95.8 N 110.2 |
| 22891 | $C_5H_{11}$—O— | —O—$C_6H_{13}$ | Cr 90.0 N 108.5 |
| 22892 | $C_5H_{11}$—O— | —O—$C_7H_{15}$ | Cr 93.2 N 106.3 |

TABLE 350

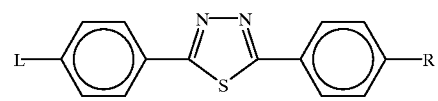

| No | L | R | Cr | LC |
|---|---|---|---|---|
| 25914 | $C_5H_{11}$— | —H | K 76 | N 56 U |
| 25915 | $C_6H_{13}$— | —H | K 75 | S 60 N 80 I |
| 25916 | $C_7H_{15}$— | —H | K 79 | S 64 N 86 I |
| 25917 | $C_{12}H_{25}$— | —H | K 84 | A 95 I |
| 24918 | $C_2H_5$—O— | —H | K 120 | N 165 U |
| 25919 | $C_3H_7$—O— | —H | K 110 | N 101 U |
| 25920 | $C_4H_9$—O— | —H | K 84 | N 140 U |
| 25921 | $C_5H_{11}$—O— | —H | K 80 | N 134 U |
| 25922 | $C_6H_{13}$—O— | —H | K 80.5 | N 134 U |
| 25923 | $C_7H_{15}$—O— | —H | K 73.5 | N 149.5 U |
| 25924 | $C_8H_{17}$—O— | —H | K 83 | N 142.5 U |
| 25925 | $C_9H_{19}$—O— | —H | K 96 | A 126 I |
| 25926 | $C_{10}H_{21}$—O— | —H | K 99 | A 126 I |
| 26931 | $C_6H_{13}$—O— | —F | K 97 | A 198 I |
| 26932 | $C_6H_{13}$—O— | —Cl | K 132 | A 244 I |
| 26933 | $C_6H_{13}$—O— | —Br | K 135 | A 239 I |
| 25934 | $C_6H_{13}$— | —CN | K 118 | A 220 N 233 I |
| 25935 | $C_5H_{11}$—O— | —CN | K 142 | A 246 N 265 I |
| 25936 | $C_6H_{13}$—O— | —CN | K 146 | A 258 N 264 I |
| 25937 | $C_6H_{13}$—O— | —$NO_2$ | K 123 | A 241 I |
| 25938 | $C_{10}H_{21}$—O— | —O—$C_4H_9$ —$SiMe_2C_4H_9$ | K 46 | C 122 E |
| 25943 | $C_5H_{11}$— | —$C_5H_{11}$ | K 93 | C 123 N 164 I |
| 25944 | $C_6H_{13}$— | —$C_6H_{13}$ | K 89 | C 137 N 154 B |
| 25945 | $C_6H_{13}$— | —$C_{10}H_{21}$ | K 66 | C 168 N 172.9 I |
| 25946 | $C_7H_{15}$— | —$C_7H_{15}$ | K 81 | C 149 N 158 I |
| 25947 | $C_8H_{17}$— | —$C_8H_{17}$ | K 78 | C 151 N 152 B |

TABLE 351

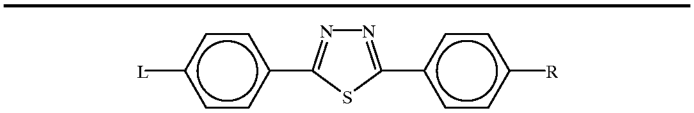

| No | L | R | Cr | LC |
|---|---|---|---|---|
| 25949 | $C_2H_5$— | —O—$C_7H_{15}$ | K 67 | A 142 N 178 I |
| 25952 | $C_5H_{11}$— | —O—$C_6H_{13}$ | K 55 | C 158 N 186 I |

TABLE 351-continued

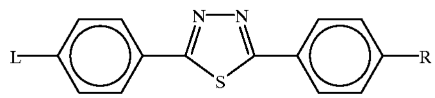

| No | L | R | | Cr | LC |
|---|---|---|---|---|---|
| 25953 | $C_5H_{11}$— | —O—$C_8H_{17}$ | | K 80 | C 167 N 182 I |
| 25954 | $C_6H_{13}$— | —O—$C_4H_9$ | | K 80.6 | C 141 N 183.5 I |
| 25955 | $C_6H_{13}$— | —O—$C_7H_{15}$ | | K 69 | A 166 N 179 I |
| 25956 | $C_6H_{13}$— | —O—$C_9H_{19}$ | | K 77 | C 171 N 175 I |
| 25957 | $C_7H_{15}$— | —O—$C_8H_{17}$ | | K 79 | C 174 N 178 I |
| 25958 | $C_8H_{17}$— | —O—$C_7H_{15}$ | | K 72 | A 170 N 177 I |
| 25960 | $C_{10}H_{21}$— | —O—$C_7H_{15}$ | | K 76 | C 171 N 181 B |
| 25961 | $C_{10}H_{21}$— | —O—$C_8H_{17}$ | | K 79 | C 173 I |
| 25962 | $C_{10}H_{21}$— | —O—$C_{10}H_{21}$ | | K 78 | A 154 I |
| 25963 | $C_{12}H_{25}$— | —O—$C_9H_{19}$ | | K 74 | C 169 I |
| 25965 | $C_{10}H_{21}$— | —COO—$CH_3$ | | K 140 | A 224 I |
| 25966 | $C_6H_{13}$— | —COO—$C_8H_{17}$ | | K 58.2 | S 68.1 C 172.6 N 176.1 I |
| 25967 | $C_{10}H_{21}$— | —COO—$CH_3$ | | K 117 | C 134 N 183 I |
| 25968 | $C_{10}H_{21}$— | —COO—$C_2H_5$ | | K 107 | C 153 N 181 I |
| 25969 | $C_{10}H_{21}$— | —COO—CHMe —O—$CH_3$ | 1 | K 108 | C* 139 N* 140 I |
| 25970 | $C_{10}H_{21}$— | —COO—CHMe —O—$C_6H_{13}$ | 1 | K 110 | C* 121 I |
| 25971 | $C_{10}H_{21}$— | —OCOO—$C_4H_9$ | | K 64 | C 146 A 147 N 166 I |
| 25972 | $C_{10}H_{21}$— | —OCOO—$C_7H_{15}$ | | K 80 | C 153 N 157 I |
| 25974 | $CH_3$—O— | —O—$C_6H_{13}$ | | K 93 | A 109 N 215 I |
| 25977 | $C_4H_9$—O— | —O—$C_4H_9$ | | K 145 | A 156 N 222 I |

TABLE 352

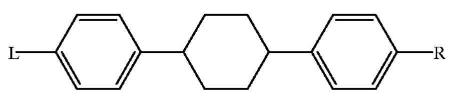

| LCReg | L | R | * | Phases |
|---|---|---|---|---|
| 22060 | $C_3H_7$— | —CN | | Cr 123.0 N 160.0 |
| 22061 | $C_4H_9$— | —CN | | Cr 91.0 N 145.0 |
| 22062 | $C_5H_{11}$ — | —CN | | Cr 84.0 N 154.0 |
| 22063 | $C_7H_{15}$— | —CN | | Cr 65.0 N 141.0 |
| 22064 | $CH_3$—O— | —CN | | Cr 139.0 X 180.0 |
| 22065 | $C_3H_7$—O— | —CN | | Cr 134.0 X 196.0 |
| 22066 | $C_4H_9$—O— | —CN | | Cr 119.0 X 204.0 |
| 22067 | $C_6H_{13}$—O— | —CN | | Cr 101.0 X 204.0 |
| 22068 | $C_2H_5$—CHMe —$CH_2$— | —CN | # | Cr 75.0 X 140.0 |
| 22070 | $C_3H_7$— | —$C_3H_7$ | | Cr 103.5 N 103.0 |
| 22071 | $C_4H_9$— | —$C_4H_9$ | | Cr 89.0 So 107.0 |
| 22072 | $C_5H_{11}$— | —$C_5H_{11}$ | | Cr 86.3 B 113.5 |
| 22073 | $C_6H_{13}$— | —$C_6H_{13}$ | | Cr 70.0 So 112.0 |
| 22074 | $C_7H_{15}$— | —$C_7H_{15}$ | | Cr 60.0 So 114.0 |
| 22075 | $C_9H_{19}$— | —$C_9H_{19}$ | | Cr 13.0 S 114.5 |

TABLE 353

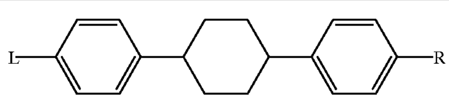

| LCReg | L | R | Phases |
|---|---|---|---|
| 22076 | $C_{12}H_{25}$— | —$C_{12}H_{25}$ | Cr 53.0 So 108.8 |
| 22077 | $C_{16}H_{33}$— | —$C_{16}H_{33}$ | Cr 69.0 So 102.5 |
| 22092 | $CH_3$—CO— | —CO—$CH_3$ | Cr 203.0 N 207.0 |
| 22093 | $C_2H_5$—CO— | —CO—$C_2H_5$ | Cr 180.0 N 237.0 |
| 22094 | $C_3H_7$—CO— | —CO—$C_3H_7$ | Cr 183.0 N 176.0 |
| 22095 | $C_4H_9$—CO— | —CO—$C_4H_9$ | Cr 145.0 N 173.0 |

TABLE 353-continued

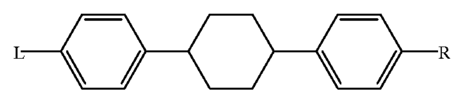

| LCReg | L | R | Phases |
|---|---|---|---|
| 22096 | $C_5H_{11}$—CO— | —CO—$C_5H_{11}$ | Cr 151.0 N 168.0 |
| 22097 | $C_6H_{13}$—CO— | —CO—$C_6H_{13}$ | Cr 143.0 N 163.0 |
| 22098 | $C_8H_{17}$—CO— | —CO—$C_8H_{17}$ | Cr 134.0 C 136.5 N 153.0 |
| 22099 | $C_9H_{19}$—CO— | —CO—$C_9H_{19}$ | Cr 132.0 C 148.0 |
| 22100 | $C_{11}H_{23}$—CO— | —CO—$C_{11}H_{23}$ | Cr 132.0 C 148.0 |
| 22101 | $C_{15}H_{31}$—CO— | —CO—$C_{15}H_{31}$ | Cr 115.0 C 143.0 |
| 22079 | $CH_3$—OOC— | —COO—$CH_3$ | Cr 178.0 N 207.0 |
| 22080 | $C_2H_5$—OOC— | —COO—$C_2H_5$ | Cr 180.0 N < ? |
| 22081 | $C_3H_7$—OOC— | —COO—$C_3H_7$ | Cr 100.0 N 154.0 |

TABLE 354

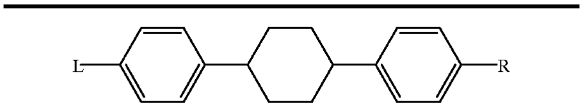

| LCReg | L | R | Phases |
|---|---|---|---|
| 22082 | $C_4H_9$—OOC— | —COO—$C_4H_9$ | Cr 106.0 N < ? |
| 22083 | $C_5H_{11}$—OOC— | —COO—$C_5H_{11}$ | Cr 103.0 N 115.0 |
| 22084 | $C_6H_{13}$—OOC— | —COO—$C_6H_{13}$ | Cr 94.0 S 107.0 |
| 22085 | $C_7H_{15}$—OOC— | —COO—$C_7H_{15}$ | Cr 90.0 S 109.0 |
| 22086 | $C_8H_{17}$—OOC— | —COO—$C_8H_{17}$ | Cr 70.0 S 98.0 |
| 22087 | $C_9H_{19}$—OOC— | —COO—$C_9H_{19}$ | Cr 66.0 S 97.0 |
| 22088 | $C_{10}H_{21}$—OOC— | —COO—$C_{10}H_{21}$ | Cr 65.0 S 93.0 |
| 22089 | $C_{11}H_{23}$—OOC— | —COO—$C_{11}H_{23}$ | Cr 67.0 S 93.0 |
| 22090 | $C_{12}H_{25}$—OOC— | —COO—$C_{12}H_{25}$ | Cr 75.0 S 88.0 |
| 22091 | $C_{18}H_{37}$—OOC— | —COO—$C_{18}H_{37}$ | Cr 82.0 S < ?. |

TABLE 355

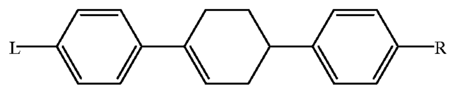

| LCReg | L | R | * | Phases |
|---|---|---|---|---|
| 23036 | $C_3H_7$— | —CN | 2 | Cr 114.0 N 172.0 |

TABLE 356

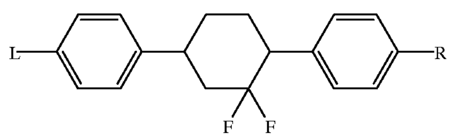

| LCReg | L | R | * | Phases |
|---|---|---|---|---|
| 23039 | $C_8H_{17}$— | —O—$C_8H_{17}$ | 2 | Cr 39.0 B 75.0 A 82.0 |

TABLE 357

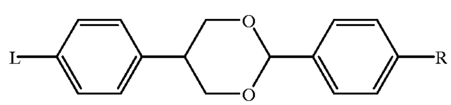

| L | R | Phases |
|---|---|---|
| $C_2H_5$—O— | —O—$C_2H_5$ | (127.0) Cr 127.0 N 174.0 |
| $C_2H_5$—O— | —O—$C_3H_7$ | (135.0) Cr 154.0 S 148.0 |
| $C_2H_5$—O— | —O—$C_4H_9$ | (128.0) Cr 148.0 S 149.0 N 160.0 |
| $C_4H_9$—O— | —O—$C_6H_{13}$ | Cr 136.0 S 124.0 B 166.0 |
| $CH_3$—O— | —O—$C_{11}H_{22}$—OOC —CH═$CH_2$ | Cr 66.0 N 77.0 |
| $CH_3$—O— | —O—$CH_2$—CH═$CH_2$ | (92.0) Cr 114.4 S 124.4 A 130.7 N 165.1 |
| $CH_3$—O— | —O—$C_2H_4$—O—$CH_2$ —CH═$CH_2$ | (53.0) Cr 83.0 S 89.7 A 96.5 N 137.7 |
| $CH_3$—O— | —O—$C_2H_4$—O—$C_2H_4$ —O—$CH_2$—CH═$CH_2$ | (27.0) Cr 45.5 S 67.2 A 76.2 N 94.1 |
| $CH_3O$— | —O—$C_2H_4$—O—$C_2H_4$ —O—$C_2H_4$—O—$CH_2$ —CH═$CH_2$ | Cr −10.0 S 44.2 A 60.6 |
| $CH_3$—O— | —O—$C_9H_{18}$—CH═$CH_2$ | Cr 94.3 B 96.5 N 133.6 |
| $C_2H_5$—CHMe —$CH_2$—O— | —O—$C_9H_{18}$—CH═$CH_2$ | Cr 91.4 B 120.2 |

TABLE 358

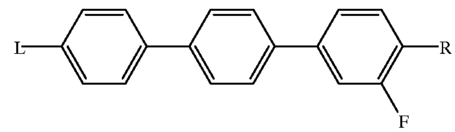

| LCReg | L | R | * | Phases |
|---|---|---|---|---|
| 23780 | $C_5H_{11}$— | —F | | Cr 154.0 A 163.0 |
| 23781 | $C_5H_{11}$— | —Cl | | Cr 171.0 E 178.0 A 194.0 |
| 23783 | $C_5H_{11}$— | —CN | | (47.0) Cr 85.0 N 182.0 |
| 23785 | $C_9H_{19}$— | —CN | | Cr 72.0 A 139.0 N 159.0 |
| 23786 | $C_5H_{11}$— | —$C_5H_{11}$ | | Cr ? G 156.5 A 185.5 |
| 23787 | $C_5H_{11}$— | —O—$C_6H_{13}$ | | Cr ? G 160.0 C 162.0 A 201.0 |
| 23788 | $C_5H_{11}$— | —O—$C_8H_{17}$ | | Cr ? G 146.0 B 158.0 A 195.0 |
| 23789 | $C_6H_{13}$—O— | —$C_5H_{11}$ | | Cr ? G 176.0 A 210.0 |
| 23790 | $C_8H_{17}$—O— | —$C_5H_{11}$ | | Cr ? G 170.5 C 176.5 A 202.5 |
| 23791 | $C_7H_{15}$— | —O—CHMe —$C_5H_{11}$ | R | Cr ? S 66.5 B 90.5 A 122.0 |
| 23792 | $C_8H_{17}$—O— | —O—CHMe —$C_5H_{11}$ | R | Cr 121.5 C* 135.0 A 148.0 |
| 23793 | $C_8H_{17}$—O— | —O—$C_3H_6$ —CHMe—$C_2H_5$ | 2 | Cr 175.5 C 197.0 A 199.5 |

TABLE 359

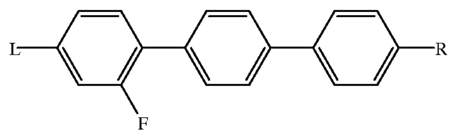

| LCReg | L | R | Phases |
|---|---|---|---|
| 69002 | $C_5H_{11}$— | —F | Cr 72.7 A 83.8 N 127.8 |
| 23794 | $C_3H_7$— | —Cl | Cr 124.9 A 132.0 N 169.2 |
| 23795 | $C_3H_7$— | —CN | Cr 104.0 N 209.4 |
| 23796 | F— | —$C_5H_{11}$ | Cr 82.2 A 122.9 N 133.2 |
| 23797 | Cl— | —$C_5H_{11}$ | Cr 65.0 B 94.0 A 151.0 N 159.0 |
| 23798 | $C_5H_{11}$— | —$C_5H_{11}$ | Cr 72.5 C 80.0 N 136.0 |
| 23799 | $C_6H_{13}$—O— | —$C_5H_{11}$ | Cr 83.5 K 48.5 J 62.0 C 105.0 N 166.0 |
| 23800 | $C_8H_{17}$—O— | —$C_5H_{11}$ | Cr 69.0 K 25.0 J 43.5 C 119.0 N 158.0 |
| 23801 | $C_5H_{11}$— | —O—$C_6H_{13}$ | Cr 115.0 C 131.5 N 166.5 |
| 23802 | $C_5H_{11}$— | —O—$C_8H_{17}$ | Cr 102.0 Sml 99.5 C 137.5 N 160.0 |
| 60339 | $C_3H_7$—CH/O¥ CH (t)—$CH_2$—O— | —$CH_2$—O—$C_3H_7$ | CrX 53.0 Cr 66.5 C* 97.5 N* 150.2 |

TABLE 360

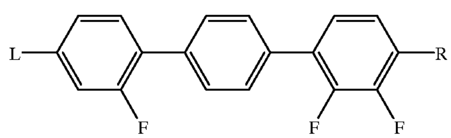

| LCReg | L | R | Phases |
|---|---|---|---|
| 66788 | $C_9H_{19}$— | —H | Cr 63.0 A 102.1 |
| 66789 | $C_8H_{17}$—O— | —H | Cr 82.0 E 98.5 A 139.4 |
| 23818 | $C_3H_7$— | —$C_3H_7$ | Cr 132.0 N 149.0 |
| 23819 | $C_3H_7$— | —$C_9H_{19}$ | Cr 63.0 C 84.5 A 117.0 N 131.5 |
| 23820 | $C_5H_{11}$— | —$C_5H_{11}$ | Cr 81.0 C 115.5 A 131.5 N 142.0 |
| 23821 | $C_5H_{11}$— | —$C_7H_{15}$ | Cr 56.0 C 105.5 A 131.0 N 136.0 |
| 23822 | $C_7H_{15}$— | —$C_5H_{11}$ | Cr 65.5 Sml 74.5 C 118.5 A 135.0 N 137.0 |
| 23823 | $C_7H_{15}$— | —$C_9H_{19}$ | Cr 44.0 Sml 55.0 C 105.0 A 127.0 |
| 63092 | $C_7H_{15}$— | —$CH_2$—O—$C_3H_7$ | Cr ? C 60.0 A 110.0 |
| 63824 | $C_5H_{11}$— | —O—$C_2H_5$ | Cr 105.0 C 135.0 N 185.0 |
| 23825 | $C_5H_{11}$— | —O—$C_6H_{13}$ | Cr 97.5 C 145.5 N 166.0 |
| 23826 | $C_5H_{11}$— | —O—$C_8H_{17}$ | Cr 93.5 C 144.0 A 148.0 N 159.0 |
| 23827 | $C_7H_{15}$— | —O—$C_8H_{17}$ | Cr 89.5 C 148.0 A 151.5 N 154.0 |
| 66797 | $C_9H_{19}$— | —O—$C_6H_{13}$ | Cr 87.0 C 147.7 A 148.8 N 153.9 |
| 23828 | $C_6H_{13}$—O— | —$C_5H_{11}$ | Cr 101.5 C 156.5 A 167.0 N 171.5 |

TABLE 361

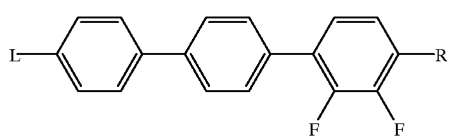

| LCReg | L | R | * | Phases |
|---|---|---|---|---|
| 23829 | $C_8H_{17}$—O— | —$C_5H_{11}$ | | Cr 89.0 C 155.5 A 165.0 N 166.0 |
| 66792 | $C_8H_{17}$—O— | —O—$C_6H_{13}$ | | Cr 117.0 C 180.7 A 181.5 N 184.9 |
| 66796 | $C_9H_{19}$— | —O—$CH_2$—CH═CH —$C_3H_7$ | | Cr 83.0 C 147.4 N 151.4 |
| 66792 | $C_8H_{17}$—O— | —O—$CH_2$—CH═CH —$C_3H_7$ | | Cr 111.0 C 178.8 N 181.5 |

TABLE 361-continued

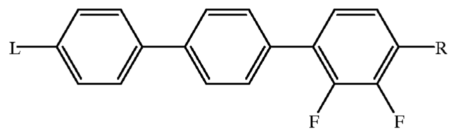

| LCReg | L | R | * | Phases |
|---|---|---|---|---|
| 66795 | $C_9H_{19}$— | —O—$C_2H_4$ —CH%CH—$C_2H_5$ | | Cr 81.0 C 136.9 A 143.1 |
| 66794 | $C_8H_{17}$—O— | —O—$C_2H_4$ —CH%CH—$C_2H_5$ | | Cr 105.0 C 170.3 A 173.0 N 174.2 |
| 65310 | $C_5H_{11}$— | —C:::C—$CH_3$ | | Cr 135.7 B 173.6 N 210.0 |
| 23831 | $C_2H_5$—CHMe —$C_3H_6$— | —$C_5H_{11}$ | 2 | Cr 64.0 C 86.0 N 100.5 |
| 23832 | $C_2H_5$—CHMe —$C_3H_6$— | —O—$C_8H_{17}$ | 2 | Cr 72.0 C 120.0 N 128.0 |
| 65316 | $CH_3$—C:::C— | —$C_5H_{11}$ | | Cr 127.0 N 216.0 |

TABLE 362

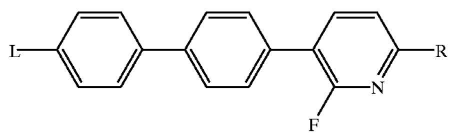

| LCReg | L | R | Phases |
|---|---|---|---|
| 23857 | $C_5H_{11}$— | —O—$C_2H_5$ | Cr 91.0 A 135 0 N 155.0 |
| 61927 | $C_8H_{17}$— | —O—$C_6H_{13}$ | Cr 44.0 S 92.0 S 99.0 C 118.0 A 138.0 |
| 61926 | $C_8H_{17}$— | —O—$C_8H_{17}$ | Cr 62.0 S 96.0 C 116.0 A 133.0 |
| 61925 | $C_8H_{17}$—O— | —O—$C_6H_{13}$ | Cr 85.0 S 93.0 S 119.0 C 161.0 A 169.0 |
| 61924 | $C_8H_{17}$—O— | —O—$C_8H_{17}$ | Cr 87.0 S 116.0 C 158.0 A 163.0 |

TABLE 363

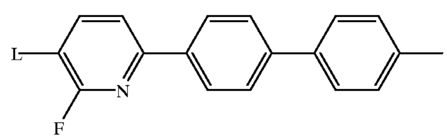

| LCReg | L | R | Phases |
|---|---|---|---|
| 61898 | H— | —O—$C_8H_{17}$ | Cr 95.0 S 111.0 C 116.0 A 132.0 |
| 23858 | $C_2H_5$—O— | —$C_5H_{11}$ | Cr 175.0 C 183.0 N 212.0 |

TABLE 364

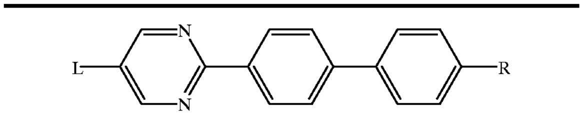

| LCReg | L | R | Phases |
|---|---|---|---|
| 23497 | $C_2H_5$— | —F | Cr 100.0 A 166.0 |
| 23498 | $C_3H_7$— | —F | Cr 97.0 A 177.0 |
| 23499 | $C_4H_9$— | —F | Cr 90.0 A 162.0 |
| 23500 | $C_5H_{11}$— | —F | Cr 88.0 A 103.0 N 160.0 |
| 23501 | $C_6H_{13}$— | —F | Cr 89.0 A 126.0 N 157.0 |
| 23502 | $C_2H_5$— | —Cl | Cr 158.0 A 138.0 N 200.0 |
| 23503 | $C_3H_7$— | —Cl | Cr 155.0 N 214.0 |

TABLE 364-continued

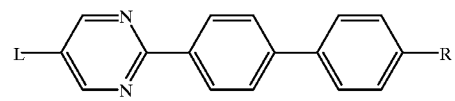

| LCReg | L | R | Phases |
|---|---|---|---|
| 23504 | $C_4H_9$— | —Cl | Cr 96.0 E 81.0 A. 165.0 N 203.0 |
| 23505 | $C_5H_{11}$— | —Cl | Cr 129.0 A 188.0 N 207.0 |
| 23506 | $C_6H_{13}$— | —Cl | Cr 96.0 A 188.0 N 197.0 |
| 23507 | $C_5H_{11}$— | —Br | Cr 137.0 X 197.0 |
| 23508 | $C_3H_7$— | —CN | Cr 125.5 S 214 0 N 275.5 |
| 23509 | $C_4H_9$— | —CN | Cr 125.0 S 212.5 N 262.0 |
| 23510 | $C_5H_{11}$— | —CN | Cr 124.0 S 204.5 N 259.5 |
| 23511 | $C_6H_{13}$— | —CN | CrX 95.0 Cr 108.0 S 215.0 N 246.0 |

TABLE 365

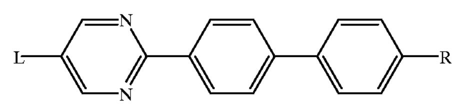

| LCReg | L | R | Phases |
|---|---|---|---|
| 23512 | $C_7H_{15}$— | —CN | CrX 72.0 Cr 78.0 S 109.0 S 221.5 N 241.5 |
| 67195 | H—NHOC— | —$C_5H_{11}$ | Cr 120.0 X 265.0 |
| 23514 | NC— | —$C_2H_5$ | CrX 72.5 Cr 166.5 S 241.0 N 290.0 |
| 23515 | NC— | —$C_3H_7$ | Cr 140.5 S 234.0 N 289.5 |
| 23516 | NC— | —$C_4H_9$ | CrX 99.5 Cr 126.5 S 216.5 N 274.5 |
| 67194 | NC— | —$C_5H_{11}$ | Cr 135.0 N 258.0 |
| 23517 | NC— | —$C_6H_{13}$ | CrX 90.5 Cr 134.5 S 154.0 S 160.5 S 217.5 N 258.0 |
| 59965 | $C_6H_{13}$— | —$C_5H_{11}$ | (44.0) Cr ? C 79.0 N 158.0 |
| 23518 | $C_7H_{15}$— | —$C_5H_{11}$ | Cr 124.0 N 168.0 |
| 23519 | $C_8H_{17}$— | —$C_6H_{13}$ | Cr 65.6 C 98.0 A 141.0 N 156.0 |
| 23520 | $C_6H_{13}$— | —$C_7H_{15}$ | Cr 68.0 C 97.0 N 156.0 |
| 23521 | $C_8H_{17}$— | —$C_7H_{15}$ | Cr 58.0 C 134.0 A 144.0 N 157.0 |
| 23522 | $C_6H_{13}$— | —$C_8H_{17}$ | Cr 74.3 C 105.2 N 149.9 |
| 23523 | $C_7H_{15}$— | —$C_8H_{17}$ | Cr 76.5 C 98.7 A 141.2 N 155.9 |
| 23524 | $C_8H_{17}$— | —$C_8H_{17}$ | Cr 72.3 C 130.2 A 145.2 N 152.5 |

TABLE 366

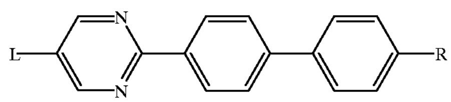

| LCReg | L | R | Phases |
|---|---|---|---|
| 68812 | $C_8H_{17}$—O— | —$C_5H_{11}$ | Cr 98.0 C 159.0 N 187.0 |
| 23527 | $C_4H_9$—O —CHMe—$CH_2$—O— | —$C_5H_{11}$ | Cr 54.9 C* 67.6 N* 92.5 |
| 23528 | $C_6H_{13}$—O— —CHMe—$CH_2$—O— | —$C_5H_{11}$ | Cr 41.0 C* 59.8 N* 88.1 |
| 67193 | $C_2H_5$—OOC— | —$C_5H_{11}$ | Cr 99.0 X 190.0 |
| 23525 | $CH_3$—OOC— | —$C_6H_{13}$ | Cr 129.2 X 181.0 |
| 23546 | $C_5H_{11}$— | —O—$C_3H_7$ | Cr 132.0 N 204.0 |
| 23547 | $C_6H_{13}$— | —O—$C_5H_{11}$ | Cr 98.2 C 116.1 N 184.1 |
| 23548 | $C_8H_{17}$— | —O—$C_5H_{11}$ | Cr 66.3 C 135.7 N 179.5 |
| 23833 | $C_5H_{11}$— | —O—$C_8H_{17}$ | Cr 91.0 C 114.0 N 183.0 |
| 66255 | $C_{10}H_{21}$— | —OOC—$C_5H_{11}$ | Cr 34.0 S 53.0 S 66.0 C 124.0 N 169.0 N180.0 |
| 68891 | $C_5H_{11}$— | —OOC—$C_7H_{15}$ | Cr 73.0 F 112.0 C 122.0 N 188.0 |
| 59508 | $C_8H_{17}$— | —OOC—CHMe —O—$C_4H_9$ | Cr 79.0 C* 118.0 N* 128.5 |
| 23558 | $C_6H_{13}$—CHMe —O— | —$C_3H_7$ | Cr 48.0 N* 73.3 |
| 23559 | $C_6H_{13}$—CHMe —O— | —$C_6H_{13}$ | Cr 31.8 N* 66.5 |
| 23559 | $C_6H_{13}$—CHMe —O— | —O—$C_6H_{13}$ | Cr 31.8 N* 66.5 |

TABLE 367

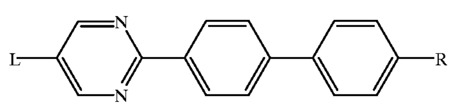

| LCReg | L | R | * | Phases |
|---|---|---|---|---|
| 23561 | $C_2H_5$—CHMe —$CH_2$— | —$C_5H_{11}$ | S | Cr 84.5 G 85.9 N* 133.2 |
| 23567 | $C_2H_5$—CHMe —$C_3H_6$— | —$C_5H_{11}$ | S | Cr 80.0 E 83.0 A 122.6 |
| 23568 | $C_2H_5$—CHMe —$C_3H_6$—O— | —$C_3H_7$ | S | Cr 129.0 N* 166.1 |
| 23569 | $C_2H_5$—CHMe —$C_4H_8$—O— | —$C_3H_7$ | S | Cr 95.6 C* 118.1 N* 160.4 |
| 23574 | $C_2H_5$—CHMe —$C_5H_{10}$—O— | —$C_3H_7$ | S | Cr 85.6 C* 139.8 N* 167.3 |
| 23575 | $C_2H_5$—CHMe —$C_5H_{10}$—O— | —$C_6H_{13}$ | S | Cr 66.0 C* 149.5 N* 161.3 |
| 23576 | $C_2H_5$—CHMe —$C_5H_{10}$—O— | —O—$C_6H_{13}$ | S | Cr 108.1 C* 169.3 N* 182.1 |
| 23577 | $C_2H_5$—CHMe —$C_7H_{14}$—O— | —$C_3H_7$ | S | Cr 123.0 C* 151.2 N* 165.0 |
| 23578 | $C_2H_5$—CHMe —$C_7H_{14}$—O— | —O—$C_6H_{13}$ | S | Cr 92.4 C* 175.1 N* 181.3 |
| 23579 | $C_6H_{13}$—CHF —$CH_2$—O— | —$C_5H_{11}$ | S | Cr 106.3 C* 156.2 N* 180.9 |
| 68941 | $CH_3$—CH═CH —COO— | —$C_5H_{11}$ | | Cr 120.0 N 269.0 |
| 68858 | $C_3H_7$—CH═C —$CH_2$—O— | —$C_5H_{11}$ | | Cr 131.0 C 144.0 N 195.0 |
| 68859 | $C_4H_9$—CH═CH —$CH_2$—O — | —$C_5H_{11}$ | | Cr 100.0 C 151.0 N 187.0 |
| 68813 | $C_5H_{11}$—CH═CH —$CH_2$—O— | —$C_5H_{11}$ | | Cr 99.0 C 161.0 N 185.0 |
| 68860 | $C_6H_{13}$—CH═CH —$CH_2$—O— | —$C_5H_{11}$ | | Cr 100.0 C 164.0 N 179.0 |

TABLE 368

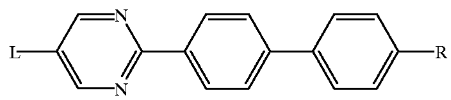

| LCReg | L | R | Phases |
|---|---|---|---|
| 68861 | $C_7H_{15}$—CH=CH —$CH_2$—O— | —$C_5H_{11}$ | Cr 106.0 C 168.0 N 177.0 |
| 68862 | $C_8H_{17}$—CH=CH —$CH_2$—O— | —$C_5H_{11}$ | Cr 109.0 C 169.0 N 173.0 |
| 68863 | $C_9H_{19}$—CH=CH —$CH_2$—O— | —$C_5H_{11}$ | Cr 108.0 C 170.0 N 172.0 |
| 68903 | $CH_3$—CH=CH —$C_4H_8$—COO— | —$C_5H_{11}$ | Cr 105.0 C 143.0 N 199.0 |
| 68815 | $CH_3$—CH=CH —$C_5H_{10}$—O— | —$C_5H_{11}$ | Cr 105.0 C 165.0 N 188.0 |
| 68816 | $H_2C$=CH —$C_6H_{12}$—O— | —$C_5H_{11}$ | Cr 95.0 C 151.0 A 159.0 N 183.0 |
| 68817 | $C_4H_9$—CH%CH —$C_2H_4$—O— | —$C_5H_{11}$ | Cr 87.0 C 137.0 N 166.0 |
| 68818 | $C_2H_5$—CH%CH —$C_4H_8$—O— | —$C_5H_{11}$ | Cr 80.0 C 140.0 N 173.0 |
| 23580 | $C_8H_{17}$— | —O—CHMe —$C_6H_{13}$ | Cr 73.2 A 100.7 |
| 23581 | $C_7H_{15}$— | —O—C7H14 —CHMe—$C_2H_5$ | Cr 85.8 C* 148.2 N* 159.3 |
| 23582 | $C_7H_{15}$— | —O—$CH_2$—CHF $C_6H_{13}$ | Cr 91.8 S 116.0 C* 150.7 N* 169.5 |
| 23583 | $C_2H_5$— | —$CF_3$ | Cr 155.0 A 240.0 |
| 23584 | $C_3H_7$— | —$CF_3$ | Cr 173.0 B 160.0 A 237.0 |
| 23585 | $C_4H_9$— | —$CF_3$ | Cr 104.0 E 106.0 A 227.0 |
| 23586 | $C_5H_{11}$— | —$CF_3$ | Cr 102.0 E 93.0 A 229.0 |

TABLE 369

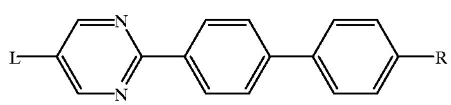

| LCReg | L | R | * | Phases |
|---|---|---|---|---|
| 23587 | $C_6H_{13}$— | —$CF_3$ | | Cr 82.0 E 88.0 A 224.0 |
| 23588 | $C_3H_7$— | —O—$CF_3$ | | Cr 125.0 A 218.0 |
| 23589 | $C_7H_{15}$— | —O—$CF_3$ | | Cr 53.0 A 204.0 |
| 23590 | $C_7H_{15}$— | —O—$CF_2$—H | | Cr 59.0 E 83.0 A 208.0 |
| 62433 | $C_8H_{17}$—O— | —O—$C_2H_4$—$CHCF_3$ —$C_6H_{13}$ | 1 | (49.0) Cr 59.5 S 103.0 C* 111.0 A 144.5 |

TABLE 370

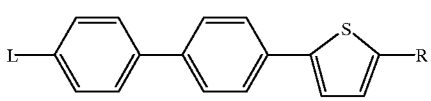

| LCReg | L | R | Phases |
|---|---|---|---|
| 58013 | NC— | —$C_4H_9$ | Cr 163.0 N 206.0 |
| 58014 | NC— | —$C_5H_{11}$ | Cr 154.0 N 204.0 |
| 58015 | NC— | —$C_6H_{13}$ | CrX 63.4 Cr 151.0 N 194.0 |
| 57365 | $C_5H_{11}$— | —$C_5H_{11}$ | (145.0) Cr 158.0 B 173.5 B 174.7 |
| 23865 | $C_6H_{13}$— | —O—$C_2H_5$ | Cr 169.0 S 173.0 |
| 23866 | $C_6H_{13}$— | —O—$C_4H_9$ | Cr 155.0 S 160.0 |
| 23867 | $C_8H_{17}$— | —O—$C_4H_9$ | Cr 159.0 S 162.0 |
| 57362 | $C_5H_{11}$— | —CO—$C_4H_9$ | (188.0) Cr 189.3 E 188.8 A 245.9 |

TABLE 371

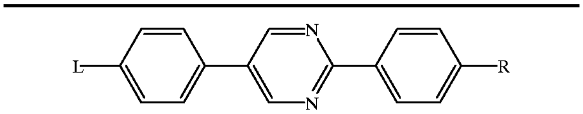

| LCReg | L | R | * | Phases |
|---|---|---|---|---|
| 21851 | H— | —O—$C_5H_{11}$ | | Cr 108.0 N 109.0 |
| 21852 | H— | —O—$C_6H_{13}$ | | Cr 102.5 N 116.0 |
| 21854 | H— | —O—$C_8H_{17}$ | | Cr 100.0 N 113.5 |
| 21855 | H— | —O—$C_9H_{19}$ | | Cr 102.0 N 109.0 |
| 21856 | H— | —O—$C_{10}H_{21}$ | | Cr 102.0 N 111.0 |
| 21857 | H— | —O—$C_{11}H_{23}$ | | Cr 104.5 N 109.0 |
| 21858 | H— | —O—$C_{12}H_{25}$ | | Cr 103.5 N 109.5 |
| 21859 | H— | —$C_9H_{19}$ | | Cr 98.4 A 138.6 |
| 21860 | H—O—CHMe —$CH_2$—O— | —$C_9H_{19}$ | R | Cr 96.8 A 211.1 |

TABLE 371-continued

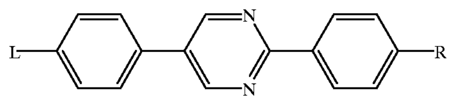

| LCReg | L | R | * | Phases |
|---|---|---|---|---|
| 21862 | NC— | —$C_2H_5$ | | Cr 166.0 S 180.5 N 277.0 |
| 21863 | NC— | —$C_3H_7$ | | CrX 69.5 Cr 166.0 S 180.0 N 276.0 |
| 21864 | NC— | —$C_4H_9$ | | CrX 69.5 Cr 138.0 S 180.0 N 263.0 |
| 21865 | NC— | —$C_5H_{11}$ | | Cr 131.5 S 176.0 N 261.5 |
| 21866 | NC— | —$C_6H_{13}$ | | CrX 91.5 Cr 121.5 S 164.0 N 247.5 |
| 21867 | NC— | —$C_7H_{15}$ | | CrX 103.5 Cr 121.0 S 146.5 S 150.0 N 242.0 |

TABLE 372

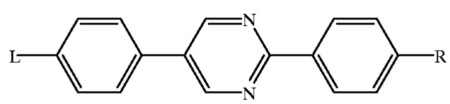

| LCReg | L | R | Phases |
|---|---|---|---|
| 21868 | $O_2N$— | —$C_6H_{13}$ | Cr 147.0 C 174.0 N 230.0 |
| 21869 | $O_2N$— | —O—$C_5H_{11}$ | Cr 148.0 A 232.0 N 270.0 |
| 21872 | $C_3H_7$— | —H | Cr 120.0 A 130.0 |
| 21873 | $C_4H_9$— | —H | Cr 107.5 A 130.5 |
| 21874 | $C_5H_{11}$— | —H | Cr 98.0 A 138.5 |
| 21875 | $C_6H_{13}$— | —H | Cr 96.0 A 137.0 |
| 21877 | $C_2H_5$—O— | —H | Cr 152.0 A 150.0 |
| 21878 | $C_3H_7$—O— | —H | Cr 137.5 A 151.0 |
| 21879 | $C_4H_9$—O— | —H | Cr 111.0 A 161.5 |
| 21880 | $C_5H_{11}$—O— | —H | Cr 98.0 A 161.0 |
| 21881 | $C_6H_{13}$—O— | —H | Cr 87.5 A 163.0 |
| 21882 | $C_7H_{15}$—O— | —H | Cr 80.0 A 163.0 |
| 21883 | $C_8H_{17}$—O— | —H | Cr 84.0 A 161.5 |
| 21884 | $C_9H_{19}$—O— | —H | Cr 83.0 A 160.0 |
| 21885 | $C_{10}H_{21}$—O— | —H | Cr 89.5 A 158.0 |

TABLE 373

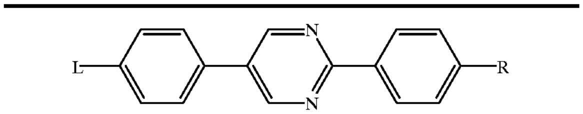

| LCReg | L | R | * | Phases |
|---|---|---|---|---|
| 66125 | $C_{12}H_{25}$—O— | —H | | Cr 93.0 A 156.0 |
| 21888 | $C_4H_9$— | —O—$CH_2$ —CHMe—O—H | S | Cr 135.4 A 189.6 N* 198.3 |
| 21889 | $C_4H_9$— | —$CH_2$—Br | | Cr ? |
| 21890 | $C_2H_5$— | —CN | | Cr 182.0 N 262.5 |
| 21891 | $C_3H_7$— | —CN | | Cr 153.5 N 259.0 |
| 21892 | $C_4H_9$— | —CN | | (87.0) CrX 64.0 Cr 93.5 N 244.7 |
| 21893 | $C_5H_{11}$— | —CN | | Cr 125.5 N 243.0 |
| 21894 | $C_6H_{13}$— | —CN | | CrX 82.5 Cr 92.0 S 193.5 N 230.5 |
| 21895 | $C_7H_{15}$— | —CN | | Cr 103.5 S 208.5 N 226.5 |
| 21896 | $C_3H_7$—O— | —CN | | Cr 132.0 N 279.5 |
| 21897 | $C_4H_9$—O— | —CN | | CrX 110.0 Cr 119.0 N 271.5 |
| 21898 | $C_5H_{11}$—O— | —CN | | CrX 82.0 Cr 91.5 S 199.0 N 261.0 |

TABLE 373-continued

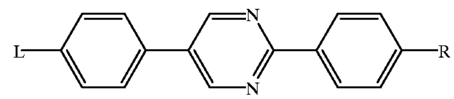

| LCReg | L | R | * | Phases |
|---|---|---|---|---|
| 21899 | $C_6H_{13}$—O— | —CN | | Cr 95.0 S 226.0 N 254.5 |
| 21900 | $C_2H_5$—CHMe —$CH_2$— | —CN | 1 | Cr 105.6 X 206.7 |
| 21901 | $C_2H_5$—CHMe —$CH_2$—O— | —CN | 1 | Cr 149.9 N* 233.8 |

TABLE 374

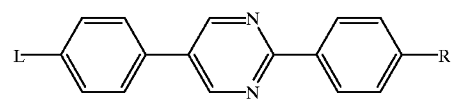

| LCReg | L | R | * | Phases |
|---|---|---|---|---|
| 21902 | $C_2H_5$—CHMe —$C_2H_4$—O— | —CN | 1 | Cr 95.0 X 235.7 |
| 21903 | $C_2H_5$—CHMe —$C_3H_6$—O— | —CN | 1 | Cr 122.0 N* 238.5 |
| 21905 | $C_6H_{13}$— | —$NO_2$ | | Cr 143.0 C 239.0 |
| 21906 | $C_5H_{11}$—O— | —$NO_2$ | | Cr 118.0 A 264.0 N 266.0 |
| 21907 | $C_6H_{13}$—O— | —O—$C_4H_8$ —SiMe2$C_4H_9$ | | Cr 59.0 F 91.0 C 160.0 A 174.0 |
| 21908 | $CH_3$— | —$CH_3$ | | Cr 171.0 N 193.0 |
| 21909 | $C_2H_5$— | —$C_2H_5$ | | Cr 139.0 A 144.0 N 168.0 |
| 21910 | $C_3H_7$— | —$C_3H_7$ | | Cr 120.0 A 192.0 N 197.5 |
| 21911 | $C_4H_9$— | —$C_4H_9$ | | Cr 118.0 A 186.0 |
| 21912 | $C_4H_9$— | —$C_5H_{11}$ | | Cr 106.4 S 185.2 |
| 21913 | $C_5H_{11}$— | —$C_5H_{11}$ | | Cr 106.0 A 195.0 |
| 21914 | $C_6H_{13}$— | —$C_6H_{13}$ | | Cr 104.0 A 185.0 |
| 21915 | $C_2H_5$— | —O—$C_2H_5$ | | Cr 153.0 N 214.5 |
| 40347 | $C_5H_{11}$— | —O—$C_4H_9$ | | Cr 93.0 C 194.0 A 200.0 N 208.0 |
| 21916 | $C_5H_{11}$— | —O—$C_5H_{11}$ | | Cr 87.0 C 111.5 A 197.0 N 201.0 |

TABLE 375

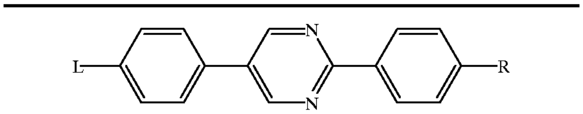

| LCReg | L | R | * | Phases |
|---|---|---|---|---|
| 68870 | $C_5H_{11}$— | —O—$C_6H_{13}$ | | Cr 82.0 C 110.0 A 198.0 N 201.0 |
| 68819 | $C_5H_{11}$— | —O—$C_8H_{17}$ | | Cr 80.0 C 85.0 A 195.0 |
| 21917 | $C_6H_{13}$ | —O—$C_5H_{11}$ | | Cr 87.0 G 84.0 F 110.0 C 153.0 A 193.0 |
| 21918 | $C_6H_{13}$— | —O—$C_6H_{13}$ | | Cr 75.0 C 151.5 A 193.0 |
| 60122 | $C_7H_{15}$— | —O—$C_7H_{15}$ | | Cr 81.0 F 114.5 C 149.5 A 191.0 |
| 21919 | $C_8H_{17}$— | —O—$C_5H_{11}$ | | Cr 73.0 C 114.0 A 203.0 |
| 21921 | $C_4H_9$— | —O—$CH_2$—CHMe —O—$C_6H_{13}$ | R | Cr 83.0 A 136.0 |

TABLE 375-continued

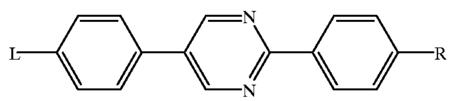

| LCReg | L | R | * | Phases |
|---|---|---|---|---|
| 21922 | $C_9H_{19}$— | —O—$CH_2$—CHMe —O—$C_6H_{13}$ | R | Cr 81.4 C* 109.0 |
| 21923 | $C_4H_9$— | —O—$CH_2$—CHMe —OOC—$C_4H_9$ | S | Cr 121.5 A 136.0 |
| 21926 | $CH_2$—O— | —$CH_3$ | | Cr 179.0 N 219.0 |
| 21927 | $CH_3$—O— | —$C_9H_{19}$ | | Cr 88.9 A 186.0 N 194.4 |
| 21928 | $C_2H_5$—O— | —$C_2H_5$ | | Cr 146.0 A 190.0 N 226.5 |
| 21929 | $C_3H_7$—O— | —$C_3H_7$ | | Cr 132.2 G 124.2 A 205.0 N 216.5 |
| 21930 | $C_4H_9$—O— | —$C_4H_9$ | | Cr 90.3 H 73.0 G 113.7 C 120.7 A 215.0 |
| 21931 | $C_5H_{11}$—O— | —$C_3H_7$ | | Cr 104.5 G 130.3 C 145.3 A 216.0 |

TABLE 376

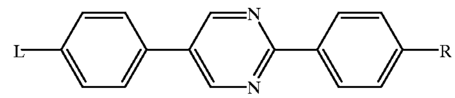

| LCReg | L | R | Phases |
|---|---|---|---|
| 21932 | $C_5H_{11}$—O— | —$C_4H_9$ | Cr 81.0 G 123.8 C 153.0 A 212.0 |
| 21933 | $C_5H_{11}$—O— | —$C_5H_{11}$ | Cr 79.5 H 61.5 G 102.4 F 113.2 C 144.8 A 210.2 |
| 21934 | $C_5H_{11}$—O— | —$C_6H_{13}$ | Cr 79.2 G 80.3 F 107.9 C 136.8 A 207.0 |
| 21935 | $C_5H_{11}$—O— | —$C_7H_{15}$ | Cr 79.5 G 62.0 F 102.9 C 125.8 A 205.0 |
| 21936 | $C_5H_{11}$—O— | —$C_8H_{17}$ | Cr 73.0 F 101.7 C 114.2 A 203.0 |
| 21937 | $C_5H_{11}$—O— | —$C_9H_{19}$ | Cr 74.3 F 98.0 C 107.7 A 200.5 |
| 21938 | $C_5H_{11}$—O— | —$C_{10}H_{21}$ | Cr 75.2 F 96.0 C 98.0 A 197.9 |
| 21939 | $C_6H_{13}$—O— | —$C_5H_{11}$ | Cr 57.0 S 65.0 G 99.0 F 117.0 C 154.0 A 211.0 |
| 21940 | $C_6H_{13}$—O— | —$C_6H_{13}$ | Cr 76.5 G 80.0 F 116.5 C 153.2 A 206.0 |
| 21941 | $C_6H_{13}$—O— | —$C_8H_{17}$ | Cr 77.0 F 114.8 C 135.0 A 202.0 |
| 21942 | $C_7H_{15}$—O— | —$C_7H_{15}$ | Cr 80.5 G 84.5 F 124.7 C 171.8 A 200.0 |
| 68826 | $C_8H_{17}$—O— | —$C_5H_{11}$ | Cr 69.0 F 129.0 C 172.0 A 205.0 |
| 21943 | $C_8H_{17}$—O— | —$C_8H_{17}$ | Cr 76.5 G 89.0 F 129.0 C 177.0 A 195.0 |
| 21944 | $C_9H_{19}$—O— | —$C_9H_{19}$ | Cr 88.5 G 93.0 F 130.6 C 180.2 A 189.0 |
| 21945 | $C_{10}H_{21}$—O— | —$C_{10}H_{21}$ | Cr 86.0 G 117.7 F 132.8 C 179.4 A 183.5 |

TABLE 377

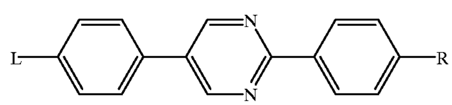

| L | R | Phases |
|---|---|---|
| $CH_3$—O— | —O—$CH_3$ | Cr 210.5 N 262.0 |
| $C_2H_5$—O— | —O—$C_2H_5$ | Cr 196.0 N 270.0 |
| $C_3H_7$—O— | —O—$C_3H_7$ | Cr 182.0 A 205.0 N 234.5 |
| $C_4H_9$—O— | —O—$C_4H_9$ | Cr 160.0 C 179.5 A 225.0 N 235.5 |
| $C_5H_{11}$—O— | —O—$C_4H_9$ | Cr 143.0 C 183.0 A 216.0 N 230.0 |
| $C_5H_{11}$—O— | —O—$C_5H_{11}$ | Cr 136.0 C 182.0 A 216.0 N 218.0 |
| $C_6H_{13}$—O— | —O—$C_6H_{13}$ | Cr 120.0 C 189.0 A 215.5 |
| $C_6H_{13}$—O— | —O—$C_8H_{17}$ | Cr 78.0 F 115.0 C 133.0 A 202.0 |
| $C_8H_{17}$—O— | —O—$OC_2H_4$—$CHCF_3$—O—$C_4H_9$ | Cr 61.0 S 80.0 S 98.0 C* 108.0 A 153.0 |
| $C_5H_{11}$—S— | —$C_6H_{13}$ | Cr 134.0 C 135.0 A 178.0 |
| $C_5H_{11}$—S— | —$C_8H_{17}$ | Cr 113.0 C 126.0 A 175.0 |
| $C_3H_7$—O—CHMe—$C_2H_4$—CHMe—O— | —$C_8H_{17}$ | (−7.0) Cr 20.4 C* 37.0 N* 42.9 |
| $C_8H_{17}$— | —O—$CH_2$—CHMe—$C_2H_5$ | Cr 91.0 C* 155.0 A 169.0 |
| $C_6H_{13}$— | —OOC—CHCl—$CH_2$—CHMe—$CH_3$ | Cr 111.4 C* 125.9 A 165.5 |
| $C_6H_{13}$— | —OOC—CHCl—$CH_2$—CHMe—$CH_3$ | Cr 112.0 C 125.0 A 165.0 |

TABLE 378

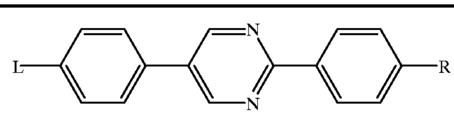

| LCReg | L | R | Phases |
|---|---|---|---|
| 21974 | $C_7H_{15}$—O— | —O—$CH_2$—CHMe—$C_2H_5$ | (76.0) Cr 110.0 G 132.0 C* 185.0 A 201.0 |
| 21975 | $C_8H_{17}$—O— | —O—$CH_2$—CHMe—$C_2H_5$ | (80.0) Cr 104.0 G 113.0 C* 185.0 A 196.0 |

TABLE 378-continued

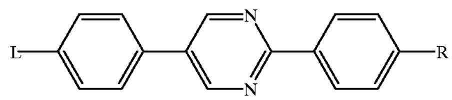

| LCReg | L | R | Phases |
|---|---|---|---|
| 21976 | $C_9H_{19}$—O— | —O—$CH_2$—CHMe—$C_2H_5$ | (68.0) Cr 98.0 G 92.0 C* 184.0 A 194.0 |
| 21977 | $C_{10}H_{21}$—O— | —O—$CH_2$—CHMe—$C_2H_5$ | (61.0) Cr 95.0 G 84.0 C* 183.0 A 195.0 |
| 21978 | $C_6H_{13}$—O— | —OOC—CHCl—$CH_2$—CHMe—$CH_3$ | Cr 100.9 J 94.3 C* 140.9 A 182.7 |
| 60121 | $C_7H_{15}$— | —O—$C_3H_6$—CHMe—$C_3H_7$ | Cr 70.0 C 151.5 A 173.0 |
| 21979 | $C_7H_{15}$—O— | —O—$C_3H_6$—CHMe—$C_2H_5$ | (68.0) Cr 92.0 E 106.0 S 119.0 C* 194.0 A 198.0 |
| 21980 | $C_8H_{17}$—O— | —O—$C_3H_6$—CHMe—$C_2H_5$ | Cr 84.0 E 113.0 S 122.0 C* 195.0 A 198.0 |
| 21981 | $C_9H_{19}$—O— | —O—$C_3H_6$—CHMe—$C_2H_5$ | (66.0) Cr 78.0 E 102.0 S 116.0 C* 188.0 A 192.0 |
| 21982 | $C_{10}H_{21}$—O— | —O—$C_3H_6$—CHMe—$C_2H_5$ | (58.0) Cr 73.0 E 84.0 S 113.0 C* 191.0 A 193.0 |
| 21944 | $C_4H_9$— | —$CH_2$—O—$CHCF_3$—$C_6H_{13}$ | Cr 105.0 |
| 59949 | $C_8H_{17}$—O— | —O—$C_2H_4$—$CHCF_3$—$C_6H_{13}$ | (44.0) Cr 62.0 C* 111.0 A 146.0 |
| 68853 | $C_5H_{11}$— | —O—$CH_2$—CH═CH—$C_4H_9$ | Cr 94.0 C 144.0 A 194.0 N 196.0 |
| 68820 | $C_5H_{11}$— | —O—$CH_2$—CH═CH—$C_5H_{11}$ | Cr 80.0 C 148.0 A 192.0 N 195.0 |
| 68854 | $C_5H_{11}$— | —O—$CH_2$—CH═CH—$C_6H_{13}$ | Cr 80.0 C 144.0 A 192.0 |

TABLE 379

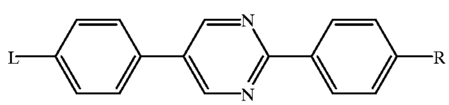

| LCReg | L | R | Phases |
|---|---|---|---|
| 68855 | $C_5H_{11}$— | —O—$CH_2$—CH═CH—$C_7H_{15}$ | Cr 77.0 C 145.0 A 190.0 |
| 68856 | $C_5H_{11}$— | —O—$CH_2$—CH═CH—$C_8H_{17}$ | Cr 72.0 C 140.0 A 187.0 |
| 68857 | $C_5H_{11}$— | —O—$CH_2$—CH═CH—$C_9H_{19}$ | Cr 74.0 C 137.0 A 185.0 |
| 68909 | $C_5H_{11}$— | —OOC—$CH_2$—CH═CH—$C_2H_5$ | Cr 135.0 C 146.0 A 197.0 |
| 68873 | $C_5H_{11}$— | —O—$C_2H_4$—CH═CH—$C_2H_5$ | Cr 83.0 C 63.0 A 176.0 |
| 68906 | $C_5H_{11}$— | —OOC—$C_2H_4$—CH═CH—$CH_3$ | Cr 133.0 C 136.0 A 206.0 N 218.0 |
| 68888 | $C_5H_{11}$— | —OOC—$C_2H_4$—CH═CH—$C_3H_7$ | Cr 125.0 C 126.0 A 204.0 N 205.0 |
| 68874 | $C_5H_{11}$— | —O—$C_3H_6$—CH═CH—$CH_3$ | Cr 92.0 A 195.0 N 204.0 |
| 68821 | $C_5H_{11}$— | —O—$C_3H_6$—CH═CH—$C_3H_7$ | Cr 77.0 C 81.0 A 196.0 |
| 68905 | $C_5H_{11}$— | —OOC—$C_3H_6$—CH═$CH_2$ | Cr 128.0 C 151.0 A 209.0 |
| 68875 | $C_5H_{11}$— | —O—$C_4H_8$—CH═$CH_2$ | Cr 73.0 C 99.0 A 193.0 N 194.0 |
| 61896 | $C_6H_{13}$— | —O—$C_4H_8$—CH═$CH_2$ | Cr 70.0 S 62.0 S 106.0 C 146.0 A 189.0 |
| 68886 | $C_5H_{11}$— | —OOC—$C_4H_8$—CH═CH—$CH_3$ | Cr 108.0 C 134.0 A 201.0 N 203.0 |
| 68822 | $C_5H_{11}$— | —O—$C_5H_{10}$—CH═CH—$CH_3$ | Cr 74.0 A 190.0 N 194.0 |
| 68887 | $C_5H_{11}$— | —OOC—$C_5H_{10}$—CH═$CH_2$ | Cr 100.0 C 124.0 A 198.0 |

TABLE 380

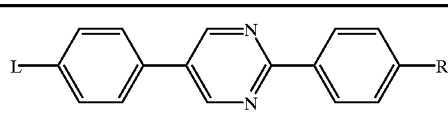

| LCReg | L | R | Phases |
|---|---|---|---|
| 68846 | $C_3H_7$—CH═CH—$CH_2$—O— | —$C_5H_{11}$ | Cr 107.0 C 147.0 A 219.0 |
| 68847 | $C_4H_9$—CH═CH—$CH_2$—O— | —$C_5H_{11}$ | Cr 100.0 C 171.0 A 215.0 |
| 68827 | $C_5H_{11}$—CH═CH—$CH_2$—O— | —$C_5H_{11}$ | Cr 58.0 F 136.0 C 173.0 A 211.0 |
| 68848 | $C_6H_{13}$—CH═CH—$CH_2$—O— | —$C_5H_{11}$ | Cr 48.0 F 140.0 C 180.0 A 206.0 |
| 68849 | $C_7H_{15}$—CH═CH—$CH_2$—O— | —$C_5H_{11}$ | Cr 63.0 F 142.0 C 179.0 A 204.0 |
| 68850 | $C_8H_{17}$—CH═CH—$CH_2$—O— | —$C_5H_{11}$ | Cr 58.0 F 139.0 C 178.0 A 201.0 |
| 68851 | $C_9H_{19}$—CH═CH—$CH_2$—O— | —$C_5H_{11}$ | Cr 62.0 F 139.0 C 179.0 A 198.0 |
| 68864 | $C_2H_5$—CH═CH—$C_2H_4$—O— | —$C_5H_{11}$ | Cr 85.0 C 144.0 A 170.0 |
| 68865 | $CH_3$—CH═CH—$C_3H_6$—O— | —$C_5H_{11}$ | Cr 64.0 S 78.0 G 80.0 F 98.0 C 126.0 A 217.0 |
| 68828 | $C_3H_7$—CH═CH—$C_3H_6$—O— | —$C_5H_{11}$ | Cr 85.0 F 146.0 C 168.0 A 210.0 |
| 68866 | $H_2C$═CH—$C_4H_8$—O— | —$C_5H_{11}$ | Cr 61.0 G 94.0 F 116.0 C 153.0 A 206.0 |

TABLE 380-continued

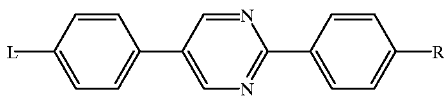

| LCReg | L | R | Phases |
|---|---|---|---|
| 68829 | $CH_3$—CH═CH—$C_5H_{10}$—O— | —$C_5H_{11}$ | Cr 55.0 F 129.0 C 143.0 A 205.0 |
| 68830 | $H_2C$═CH—$C_6H_{12}$—O— | —$C_5H_{11}$ | Cr 60.0 F 123.0 C 162.0 A 200.0 |
| 68869 | $C_3H_7$—CH%CH—$CH_2$—O— | —$C_5H_{11}$ | Cr 96.0 C 116.0 A 128.0 |
| 68868 | $C_2H_5$—CH%CH—$C_2H_4$—O— | —$C_5H_{11}$ | Cr 74.0 G 118.0 F 130.0 C 165.0 A 197.0 |

TABLE 381

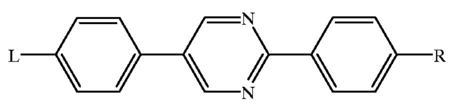

| LCReg | L | R | Phases | | | | | |
|---|---|---|---|---|---|---|---|---|
| 21851 | H— | —O—$C_5H_{11}$ | Cr 108.0 | N 109.0 | | | | |
| 68823 | $C_5H_{11}$— | —O—$C_6H_{12}$—CH═$CH_2$ | Cr 72.0 | A 190.0 | | | | |
| 68871 | $C_5H_{11}$— | —O—$CH_2$—CH%CH—$C_3H_7$ | Cr 76.0 | A 156.0 | | | | |
| 68872 | $C_5H_{11}$— | —O—$C_2H_4$—CH%CH—$C_2H_5$ | Cr 84.0 | C 112.0 | A 190.0 | N 191.0 | | |
| 68824 | $C_5H_{11}$— | —O—$C_2H_4$—CH%CH—$C_4H_9$ | Cr 69.0 | C 80.0 | A 184.0 | | | |
| 68876 | $C_5H_{11}$— | —O—$C_3H_6$—CH%CH—$CH_3$ | Cr 65.0 | C 68.0 | A 180.0 | | | |
| 68825 | $C_5H_{11}$— | —O—$C_4H_8$—CH%CH—$C_2H_5$ | Cr 64.0 | C 82.0 | A 187.0 | | | |
| 22024 | $C_2H_5$—CHMe—$CH_2$—O— | —O—$C_8H_7$ | Cr 86.0 | G 96.0 | E 108.0 | A 140.0 | N* 159.0 | |
| 22025 | $C_2H_5$—CHMe—$CH_2$—O— | —O—$C_9H_{19}$ | Cr 83.0 | G 86.0 | E 107.0 | C* 156.0 | A 170.0 | N* 172. |
| 22026 | $C_2H_5$—CHMe—$CH_2$—O— | —O—$C_{10}H_{21}$ | Cr 78.0 | G 84.0 | E 109.0 | C* 158.0 | A 172.0 | N* 175. |
| 22027 | $C_2H_5$—CHMe—$CH_2$—O— | —O—$C_{12}H_{25}$ | Cr 94.0 | E 106.0 | C* 154.0 | A 169.0 | | |

TABLE 382

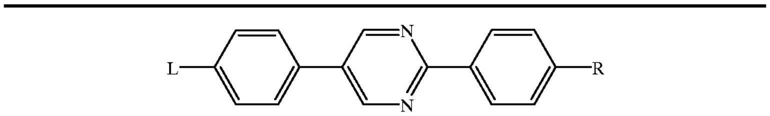

| LCReg | L | R | Phases | | | |
|---|---|---|---|---|---|---|
| 68831 | $C_4H_9$—CH%CH—$C_2H_4$—O— | —$C_5H_{11}$ | Cr 65.0 | F 127.0 | C 169.0 | A 185.0 |
| 68867 | $CH_3$—CH%CH—$C_3H_6$—O— | —$C_5H_{11}$ | Cr 85.0 | G 96.0 | F 114.0 | C 153.0 |
| | | | A 182.0 | | | |
| 68832 | $C_2H_5$—CH%CH—$C_4H_8$—O— | —$C_5H_{11}$ | Cr 52.0 | F 125.0 | C 174.0 | A 192.0 |
| 22057 | $H_2C/CH_2$¥CH—$C_6H_{12}$—O— | —O—$C_6H_{13}$ | (77.0) | Cr 110.0 | S 103.0 | S 129.0 |
| | | | C 189.0 | A 198.0 | | |

TABLE 383

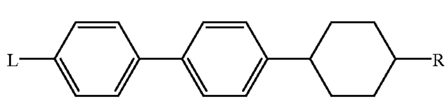

| LCReg | L | R | Phases | |
|---|---|---|---|---|
| 23591 | F— | —CH═CH—$CH_2$—O—H | Cr 187.0 | N 201.0 |
| 23592 | Cl— | —CH═CH—$CH_2$—O—H | Cr 216.0 | N 230.0 |

TABLE 383-continued

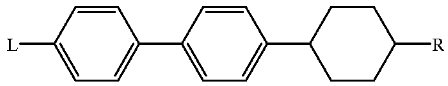

| LCReg | L | R | Phases | | | |
|---|---|---|---|---|---|---|
| 23595 | H— | —$C_3H_7$ | Cr 72.3 | B 93.0 | | |
| 23596 | H— | —$C_5H_{11}$ | CrX −980.0 | Cr 34.0 | B 82.1 | N 97.6 |
| 23597 | H— | —$C_7H_{15}$ | Cr 74.0 | B 78.0 | N 96.0 | |
| 57554 | H— | —$C_8H_{17}$ | Cr 77.0 | B 77.0 | N 92.0 | |
| 57555 | H— | —$C_9H_{19}$ | Cr 74.0 | B 74.0 | N 93.0 | |
| 23602 | H—NH— | —$C_5H_{11}$ | Cr ? | S ? | | |
| 23604 | F— | —$C_5H_{11}$ | Cr 100.0 | N 153.0 | | |
| 23605 | F— | —CH═CH—$CH_2$—O—$CH_3$ | Cr 111.0 | N 174.0 | | |
| 23607 | F—$SO_2$— | —$C_3H_7$ | Cr 156.0 | N 60.0 | | |
| 63298 | F— | —OOC—CH═CH—$CH_3$ | Cr 122.0 | N 216.0 | | |
| 23608 | Cl— | —$C_5H_{11}$ | Cr 135.7 | N 185.0 | | |
| 23609 | Cl— | —CH═CH—$CH_2$—O—$CH_3$ | Cr 140.0 | N 208.0 | | |
| 60688 | Cl—CF2—O— | —$C_3H_7$ | Cr 96.0 | S 112.5 | N 123.0 | |

TABLE 384

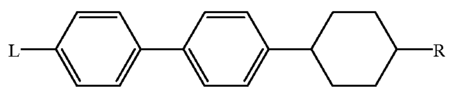

| LCReg | L | R | Phases | | | |
|---|---|---|---|---|---|---|
| 23611 | CI—$CF_2$—CO— | —$C_5H_{11}$ | Cr 52.0 | N 124.0 | | |
| 23612 | CI—$CF_2$—CO— | —$C_7H_{15}$ | Cr 52.0 | N 124.0 | | |
| 23613 | CI— | —CH═$CH_2$ | Cr 165.2 | N 183.4 | | |
| 23614 | CI— | —CH═CH—$CH_3$ | Cr 174.5 | N 223.5 | | |
| 23615 | CI— | —CH═CH—$C_3H_7$ | Cr 166.5 | N 214.0 | | |
| 23616 | Br— | —$C_5H_{11}$ | Cr 153.4 | N 192.7 | | |
| 23618 | I— | —$CH_2$—O—$CH_3$ | Cr 156.2 | N 158.0 | | |
| 23619 | NC— | —$CH_3$ | Cr 152.0 | N 186.0 | | |
| 23620 | NC— | —$C_3H_7$ | Cr 133.0 | N 230.0 | | |
| 23621 | NC— | —$C_4H_9$ | Cr 120.0 | N 202.0 | | |
| 23622 | NC— | —$C_5H_{11}$ | Cr 96.0 | N 222.0 | | |
| 23623 | NC— | —$C_6H_{13}$ | Cr 86.0 | N 210.0 | | |
| 23624 | NC— | —$C_7H_{15}$ | Cr 77.0 | A 124.8 | N 204.8 | |
| 23625 | NC— | —$C_8H_{17}$ | Cr 61.0 | A 147.0 | N 188.0 | |
| 23626 | NC— | —$C_9H_{19}$ | Cr 63.0 | S 70.0 | A 170.0 | N 192.0 |

TABLE 385

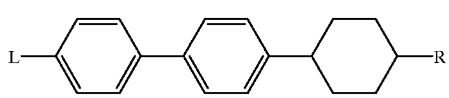

| LCReg | L | R | * | Phases | |
|---|---|---|---|---|---|
| 23627 | NC— | —$CH_2$—O—$CH_3$ | | Cr 156.7 | N 226.8 |
| 23628 | NC— | —$CH_2$—O—$C_2H_5$ | | Cr 106.6 | N 194.4 |
| 23629 | NC— | —$CH_2$—O—$C_3H_7$ | | Cr 92.9 | N 180.0 |
| 23630 | NC— | —$CH_2$—O—$C_5H_{11}$ | | Cr 89.8 | N 171.2 |
| 23631 | NC—$CH_2$— | —$C_5H_{11}$ | | Cr 139.0 | X 172.0 |
| 23632 | NC—$CF_2$— | —$C_5H_{11}$ | | Cr 58.0 | N 47.7 |
| 23633 | NC—CO— | —$C_5H_{11}$ | | Cr 63.0 | X >200.0 |
| 23634 | NC— | —CHMe—$C_6H_{13}$ | # | Cr 71.0 | X 189.0 |
| 23635 | NC— | —$CH_2$—CHMe—$C_2H_5$ | # | Cr 90.0 | X 179.0 |
| 23636 | NC— | —CH═$CH_2$ | | Cr 150.4 | N 234.0 |
| 23637 | NC— | —CH═CH—$CH_3$ | | Cr 144.8 | N 277.0 |
| 23638 | NC— | —CH═CH—$C_3H_7$ | | Cr 125.9 | N 253.9 |

TABLE 385-continued

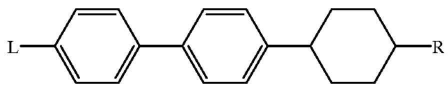

| LCReg | L | R | * | Phases | | |
|---|---|---|---|---|---|---|
| 23639 | NC— | $—CH_2—CH{=}CH_2$ | | Cr 107.7 | N 181.7 | |
| 23640 | NC— | $—CH_2—CH{=}CH—C_2H_5$ | | Cr 85.1 | S 75.4 | N 126.3 |
| 23641 | NC— | $—C_2H_4—CH{=}CH_2$ | | Cr 119.2 | N 232.7 | |

TABLE 386

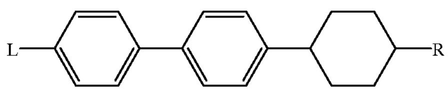

| LCReg | L | R | Phases | | |
|---|---|---|---|---|---|
| 23642 | NC— | $—C_2H_4—CH{=}CH—CH_3$ | Cr 124.1 | N 242.6 | |
| 23643 | NC— | $—C_3H_6—CH{=}CH_2$ | Cr 77.4 | N 200.8 | |
| 23644 | NC— | $—CH_2—CH\%CH—C_2H_5$ | Cr 81.9 | S 62.4 | N 165.0 |
| 23645 | $O_2N—$ | $—C_5H_{11}$ | Cr 115.0 | X 176.0 | |
| 23646 | SCN— | $—C_5H_{11}$ | Cr 125.0 | A 134.0 | N 235.0 |
| 23647 | $F_2C{=}CH—$ | $—C_5H_{11}$ | Cr 57.7 | S 184.0 | N 232.0 |
| 62085 | $F_2C{=}CH—CH_2—O—$ | $—C_5H_{11}$ | Cr 53.0 N 205.2 | B 162.0 | A 203.0 |
| 23648 | $CF_3—O—$ | $—CH{=}CH—CH_2—O—H$ | Cr 149.0 | N 170.0 | |
| 23650 | $CH_3—$ | $—C_5H_{11}$ | Cr 98.0 | S 123.0 | N 178.0 |
| 23651 | $C_2H_5—$ | $—C_3H_7$ | Cr 66.0 | S 134.0 | N 166.0 |
| 23652 | $C_2H_5—$ | $—C_5H_{11}$ | Cr 34.0 | B 146.0 | N 164.0 |
| 23653 | $C_2H_5—$ | $—C_6H_{13}$ | Cr 44.0 | N 156.0 | |
| 23654 | $C_3H_7—$ | $—C_5H_{11}$ | Cr 29.0 | S 160.0 | N 170.0 |
| 23655 | $C_4H_9—$ | $—C_5H_{11}$ | Cr 17.6 | B 159.2 | N 170.7 |
| 68099 | $C_5H_{11}—$ | $—C_3H_7$ | Cr 40.0 | S 156.0 | N 160.0 |

TABLE 387

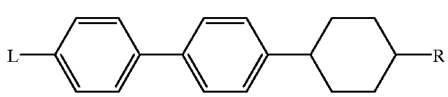

| LCReg | L | R | Phases | | |
|---|---|---|---|---|---|
| 23656 | $C_5H_{11}—$ | $—C_5H_{11}$ | Cr 13.0 | S 164.0 | N 166.0 |
| 23657 | $CH_3—$ | $—CH_2—O—C_2H_5$ | Cr 90.7 | N 139.5 | |
| 23658 | $C_2H_5—$ | $—CH_2—O—C_3H_7$ | Cr <30.0 | S 115.6 | N 124.2 |
| 23659 | $C_3H_7—$ | $—CH_2—O—CH_3$ | Cr 112.4 | N 157.1 | |
| 23660 | $C_4H_9—$ | $—CH_2—O—C_3H_7$ | Cr <30.0 | S 125.1 | |
| 23672 | $CH_3—O—CH_2—$ | $—C_5H_{11}$ | Cr 158.0 | N 177.0 | |
| 23673 | $C_3H_7—O—CH_2—$ | $—C_5H_{11}$ | Cr 152.0 | N 175.0 | |
| 23661 | $CH_3—O—$ | $—C_5H_{11}$ | Cr 80.0 | N 165.0 | |
| 23662 | $C_2H_5—O—$ | $—C_5H_{11}$ | Cr 89.0 | X 148.0 | |
| 23663 | $C_5H_{11}—O—$ | $—C_5H_{11}$ | Cr 42.0 | X 183.0 | |
| 23676 | $CH_3—O—C_2H_4—O—$ | $—C_3H_7$ | Cr 103.0 | S 158.0 | N 199.0 |
| 23677 | $CH_3—CO—$ | $—C_5H_{11}$ | Cr 125.0 | X 200.0 | |
| 23678 | $C_5H_{11}—CO—$ | $—C_5H_{11}$ | Cr 96.0 N 235.0 | S 159.0 | S 207.0 |
| 23679 | $C_3H_7—CO—$ | $—C_5H_{11}$ | Cr 124.0 N 202.0 | S 170.0 | S 192.0 |
| 23680 | $C_4H_9—CO—$ | $—C_5H_{11}$ | Cr 132.0 N 209.0 | S 175.0 | S 208.0 |

TABLE 388

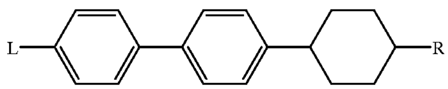

| LCReg | L | R | * | Phases | | |
|---|---|---|---|---|---|---|
| 23681 | $CH_3$—$CF_2$—CO— | —$C_5H_{11}$ | | Cr 52.0 N 190.7 | B 140.0 | A 169.0 |
| 23682 | $C_3H_7$—$CF_2$—CO— | —$C_5H_{11}$ | | Cr 159.0 N 192.8 | B 158.0 | A 189.0 |
| 23692 | $C_3H_7$— | —$CH_2$—O—$CH_2CH$=$CH_2$ | | Cr ? | X 137.0 | |
| 23693 | $C_3H_7$— | —$C_2H_4$—CH=CH—$CH_3$ | | Cr 56.0 | N 187.0 | |
| 23694 | C3H7— | —$C_3H_6$—CH=$CH_2$ | | Cr <0.0 | S ? | |
| 23698 | $C_2H_5$—CHMe—$CH_2$— | —$C_5H_{11}$ | # | Cr 50.0 | X 88.0 | |
| 23699 | $CH_3$—CHF—$CH_2$— | —$C_5H_{11}$ | 2 | Cr 43.0 | B 146.0 | N 160.2 |
| 23703 | $CF_3$— | —$C_5H_{11}$ | | Cr 123.0 | N 124.2 | |
| 23704 | $CF_3$—O— | —$C_3H_7$ | | Cr 90.0 | B 129.0 | N 151.4 |
| 23705 | $CF_3$—O— | —$C_5H_{11}$ | | Cr 45.0 | B 128.0 | N 147.4 |
| 23707 | $CF_3$—O— | —CH=CH—$CH_2$—O—$CH_3$ | | Cr 63.0 | B 113.0 | N 163.0 |
| 23710 | $CF_3$—S— | —$C_5H_{11}$ | | Cr 60.0 | B 78.0 | N 105.2 |
| 23711 | $CF_3$—SO— | —$C_5H_{11}$ | 2 | Cr 123.0 | N 50.0 | |
| 23712 | $CF_3$—$SO_2$— | —$C_5H_{11}$ | | Cr 125.0 | N 20.0 | |
| 62062 | $CF_3$—$CH_2$—O— | —$C_3H_7$ | | Cr 100.0 | B 170.0 | A 194.0 |

TABLE 389

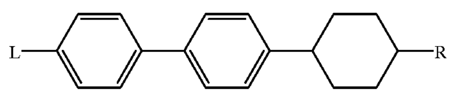

| LCReg | L | R | * | Phases | | |
|---|---|---|---|---|---|---|
| 23713 | $CF_3$—CO— | —$C_5H_{11}$ | | Cr 70.0 | N 141.2 | |
| 23715 | H—$CF_2$— | —$C_5H_{11}$ | | Cr 122.0 | N 161.8 | |
| 23717 | H—$CF_2$—O— | —$C_3H_7$ | | Cr 82.0 N 169.4 | B 116.0 | A 121.0 |
| 23718 | H—$CF_2$—O— | —$C_5H_{11}$ | | Cr 67.0 | B 120.0 | N 161.8 |
| 23719 | H—$CF_2$—S— | —$C_5H_{11}$ | | Cr 56.2 | S 94.7 | N 114.0 |
| 23720 | H—$CF_2$—SO— | —$C_5H_{11}$ | 2 | Cr 102.0 | N 108.5 | |
| 23721 | H—$CF_2$—$SO_2$— | —$C_5H_{11}$ | | Cr 119.0 | N 40.0 | |
| 23722 | H—$CF_2$—CO— | —$C_5H_{11}$ | | Cr 80.0 | N 158.0 | |
| 62086 | $H_2C$=$CHCF_2$—O— | —$C_5H_{11}$ | | Cr 17880.0 | N 177.2 | |
| 23700 | $CH_3$—CH=CH—$CH_2$—O— | —$C_3H_7$ | | Cr 128.0 | S 175.0 | N 212.0 |
| 23702 | $H_2C$=CH—$C_3H_6$— | —CH=CH—$C_3H_7$ | | Cr ? | S 182.5 | |
| 23723 | $CH_3$—C≡C— | —CH=CH—$CH_3$ | | Cr 189.0 | N >300.0 | |
| 23724 | $CH_3$—C≡C— | —$C_2H_4$—CH=CH—$CH_3$ | | Cr 144.8 | A 181.5 | N >266.0 |

TABLE 390

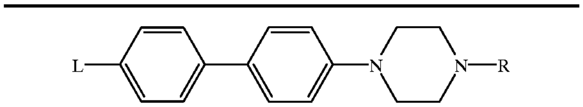

| LCReg | L | R | Phases | | | |
|---|---|---|---|---|---|---|
| 23977 | NC— | —$C_4H_9$ | Cr 145.1 | B 159.9 | N 214.1 | |
| 23978 | NC— | —$C_5H_{11}$ | Cr 114.7 | B 160.7 | N 210.6 | |
| 23979 | NC— | —$C_6H_{13}$ | Cr 116.6 | B 160.5 | A 183.1 | N 203.1 |
| 23980 | $C_2H_5$— | —$C_2H_5$ | Cr 174.3 | B 193.8 | | |
| 23981 | $C_2H_5$— | —$C_4H_9$ | Cr 187.2 | B 202.1 | | |
| 23982 | $C_6H_{13}$— | —$C_4H_9$ | Cr 157.3 | B 199.6 | | |

TABLE 391

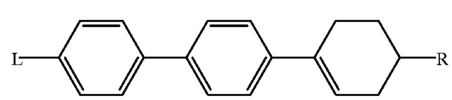

| LCReg | L | R | * | Phases | |
|---|---|---|---|---|---|
| 23879 | Br— | —$C_3H_7$ | 2 | Cr 165.0 | S 235.0 |
| 23880 | NC— | —$CH_3$ | 2 | Cr 157.0 | N 186.0 |
| 23881 | NC— | —$C_3H_7$ | 2 | Cr 110.0 | N 232.0 |
| 23882 | NC— | —$C_4H_9$ | 2 | Cr 113.0 | N 225.0 |
| 23883 | NC— | —$C_5H_{11}$ | 2 | Cr 109.0 | N 225.0 |

TABLE 391-continued

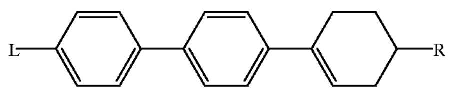

| LCReg | L | R | * | Phases | | |
|---|---|---|---|---|---|---|
| 23884 | $C_5H_{11}$— | —H | | Cr 77.5 | B 113.0 | |
| 65182 | $C_5H_{11}$— | —$C_2H_5$ | 2 | Cr 114.5 | B 156.0 | A 168.5 |
| 23885 | $C_5H_{11}$— | —$C_5H_{11}$ | 2 | Cr 101.5 | B 180.0 | A 194.0 |
| 23887 | $C_8H_{17}$—O— | —$C_5H_{11}$ | 2 | Cr 133.0 | B 182.0 | A 206.0 |

TABLE 392

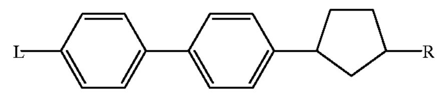

| LCReg | L | R | * | Phases | |
|---|---|---|---|---|---|
| 23990 | H— | —$C_5H_{11}$ | 2 | Cr 65.0 | S 93.0 |
| 23991 | NC— | —$C_5H_{11}$ | 2 | Cr 50.5 | A 61.0 |
| 23992 | $C_2H_5$— | —$C_5H_{11}$ | 2 | Cr <20.0 | A 37.5 |
| 23993 | $CH_3$—CO— | —$C_5H_{11}$ | 2 | Cr 88.0 | A 98.0 |

TABLE 393

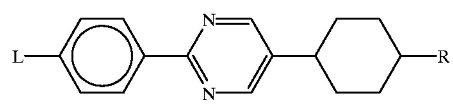

| No | L | R | | Cr | LC | | |
|---|---|---|---|---|---|---|---|
| 27740 | Cl—CF2—O— | —$C_4H_9$ | | K 30 | S 130.6 | N 135.2 | I |
| 27749 | NC— | —$C_7H_{15}$ | | K 82 | A 158 | N 223 | I |
| 27750 | NC— | —O—$C_2H_5$ | | K 144.5 | N 232 | B | |
| 27751 | NC— | —O—$C_3H_7$ | | K 114.5 | N 223.5 | B | |
| 27752 | NC— | —O—$C_5H_{11}$ | | K 93 | N 205 | B | |
| 27753 | NC— | —$CH_2$—CHMe—$C_2H_5$ | 1 | K 76 | S 125 | N* 178 | I |
| 27754 | NC— | —$C_2H_4$—CHMe—$C_2H_5$ | 1 | K 101 | S 159 | N* 189.5 | I |
| 27755 | $C_2H_5$— | —$C_7H_{15}$ | | K 68 | S 179 | N 182 | I |
| 27756 | $C_3H_7$— | —$C_2H_5$ | | K 125.5 | S 128.5 | N 167 | I |
| 27757 | $C_3H_7$— | —$C_3H_7$ | | K 116.5 | S 175 | N 194.5 | I |
| 27758 | $C_3H_7$— | —$C_5H_{11}$ | | K 51 | S 190 | I | |
| 27759 | $C_4H_9$— | —$C_2H_5$ | | K 108.5 | S 140 | N 163.5 | I |
| 27760 | $C_4H_9$— | —$C_5H_{11}$ | | K 37.5 | S 187 | I | |
| 27761 | $C_5H_{11}$— | —$C_2H_5$ | | K 101 | S 139 | N 167 | I |
| 27762 | $C_5H_{11}$— | —$C_3H_7$ | | K 93.5 | S 179 | N 190 | I |
| 27763 | $C_5H_{11}$— | —$C_5H_{11}$ | | K 39.5 | S 189.2 | I | |
| 27764 | $C_5H_{11}$— | —$C_7H_{15}$ | | K 122.5 | S 186.5 | I | |
| 27765 | $C_7H_{15}$— | —$C_2H_5$ | | K 80 | S 138.5 | N 157 | I |
| 27768 | $C_6H_{13}$—CHMe—O—$CH_2$— | —$C_7H_{15}$ | 1 | K 36.5 | A 98.4 | I | |
| 27769 | $C_2H_5$—CHMe—$CH_2$—O— | —O—$C_8H_{17}$ | S | K 64.6 | B 104.9 | A 160.5 | I |
| 27770 | $C_2H_5$—CHMe—$CH_2$—O— | —O—$C_9H_{19}$ | S | K 61.7 | B 108.2 | A 156 | I |
| 27771 | $C_2H_5$—CHMe—$C_3H_6$—O— | —O—$C_8H_{17}$ | S | K 68 | B 101 | A 160.9 | I |
| 27772 | $C_2H_5$—CHMe—$C_3H_6$—O— | —O—$C_9H_{19}$ | S | K 63.5 | B 103 | A 157.4 | I |

TABLE 394

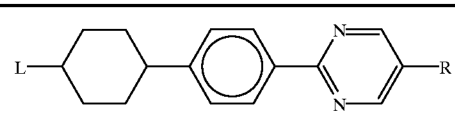

| No | L | R | | Cr | LC | | | |
|---|---|---|---|---|---|---|---|---|
| 28508 | $C_5H_{11}$— | —OOC—$C_{10}H_{21}$ | | K 118 | C 133 | N 172 | I | |
| 28508 | $C_5H_{11}$— | —OOC—$C_{11}H_{23}$ | | K 120 | C 138 | N 169 | I | |
| 28510 | $C_4H_9$—CHF—COO— | —$C_6H_{13}$ | S | K 34 | B 98 | A 137 | I | |
| 28511 | $C_4H_9$—CHF—COO— | —$C_7H_{15}$ | S | K 53 | B 101 | A 143 | I | |
| 28512 | $C_4H_9$—CHF—COO— | —$C_8H_{17}$ | S | K 41 | B 109 | A 143 | I | |
| 28513 | $C_4H_9$—CHF—COO— | —$C_9H_{19}$ | S | K 49 | B 113 | A 145 | I | |
| 28514 | $C_4H_9$—CHF—COO— | —$C_{10}H_{21}$ | S | K 48 | B 116 | A 145 | I | |
| 28515 | $C_4H_9$—CHF—COO— | —O—$C_6H_{13}$ | R | K 58 | C* 81 | A 161 | N* 165 | I |
| 28516 | $C_4H_9$—CHF—COO— | —O—$C_7H_{15}$ | R | K 44 | B 78 | C* 95 | A 162 | N* |

TABLE 394-continued

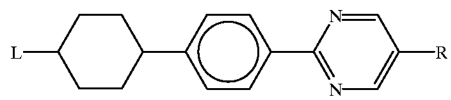

| No | L | R | | Cr | LC | | | |
|---|---|---|---|---|---|---|---|---|
| | | | | | N* 163 | I | | |
| 28517 | $C_4H_9$—CHF—COO— | —O—$C_8H_{17}$ | R | K 53 | B 88 | C* 102 | A 162 | I |
| 28518 | $C_4H_9$—CHF—COO— | —O—$C_9H_{19}$ | R | K 60 | B 92 | C* 106 | A 163 | I |
| 28519 | $C_4H_9$—CHF—COO— | —O—$C_{10}H_{21}$ | R | K 35 | S 70 | B 98 | C* 108 | |
| | | | | | A 165 | I | | |
| 28522 | $C_5H_{11}$— | —O—$CH_2$—CH═CH—$C_5H_{11}$ | | K 97 | C 115 | N 176 | I | |
| 28523 | $C_5H_{11}$— | —O—$CH_2$—CH═CH—$C_6H_{13}$ | | K 94 | C 125 | N 170 | I | |
| 28524 | $C_5H_{11}$— | —O—$CH_2$—CH═CH—$C_7H_{15}$ | | K 86 | C 135 | N 167 | I | |
| 28525 | $C_5H_{11}$— | —O—$CH_2$—CH═CH—$C_8H_{17}$ | | K 93 | C 140 | N 163 | I | |
| 28526 | $C_5H_{11}$— | —O—$CH_2$—CH═CH—$C_3H_7$ | | K 87 | C 93 | N 184 | I | |
| 28528 | $C_5H_{11}$— | —O—$C_5H_{10}$—CH═$CH_2$ | | K 55 | C 65 | A 112 | N 185 | I |
| 28529 | $C_5H_{11}$— | —O—$C_5H_{10}$—CH═CH—$CH_3$ | | K 81 | C 111 | A 130 | N 185 | I |
| 28530 | $C_5H_{11}$— | —O—$C_6H_{12}$—CH═$CH_2$ | | K 67 | C 96 | A 121 | N 176 | I |
| 28531 | $C_5H_{11}$— | —O—$C_7H_{14}$—CH═$CH_2$ | | K 59 | C 91 | A 142 | N 176 | I |
| 28532 | $C_5H_{11}$— | —O—$C_8H_{15}$—CH═$CH_2$ | | K 55 | C 103 | A 145 | N 169 | I |
| 28533 | $C_5H_{11}$— | —O—$C_9H_{15}$—CH═$CH_2$ | | K 57 | C 97 | A 151 | N 168 | I |
| 28535 | $C_5H_{11}$— | —O—$C_4H_9$—CH%CH—$C_2H_5$ | | K 86 | C 85 | N 168 | I | |
| 28536 | $C_5H_{11}$— | —O—$C_4H_8$—CH/$CH_2$\$CH_2$ | | K 81 | S 75 | N 180 | I | |
| 28537 | $C_3H_7$— | —O—$C_6H_{12}$—CH/$CH_2$\$CH_2$ | | K 80 | S 70 | C 84 | N 174 | I |

TABLE 395

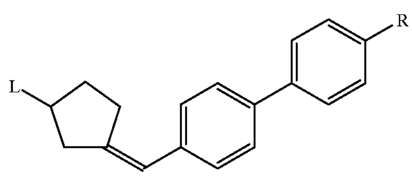

| LCReg | L | R | * | Phases | | |
|---|---|---|---|---|---|---|
| 23994 | $C_4H_9$— | —Br | 2 | Cr 109.0 | C 116.0 | A 136.0 |
| 23995 | $C_4H_9$— | —CN | 2 | Cr 85.0 | N 195.0 | |
| 23996 | $C_4H_9$— | —O—$C_7H_{15}$ | 2 | Cr 52.0 | S 81.0 | A 140.0 |

TABLE 396

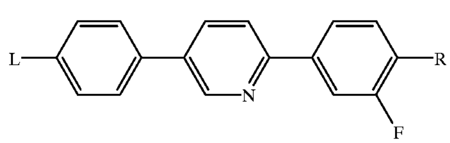

| LCReg | L | R | Phases | | | | | |
|---|---|---|---|---|---|---|---|---|
| 62920 | $C_8H_{17}$— | —O—$C_8H_{17}$ | Cr 76.4 | F 105.2 | C 139.9 | A 188.6 | | |
| 24513 | $C_4H_9$— | —O—$CH_2$—CHMe—OOC—$C_3H_7$ | Cr 71.3 | S 90.8 | A 132.2 | | | |
| 24514 | $C_4H_9$— | —OOC—CHMe—O—$C_4H_9$ | Cr 43.5 | S 89.0 | C* 95.7 | A 160.2 | | |
| 24515 | $C_4H_9$— | —O—CHMe—$C_6H_{13}$ | Cr 84.3 | A 117.3 | | | | |
| 62801 | $C_5H_{11}$— | —O—CHMe—$C_2H_5$ | Cr 147.0 | A 150.0 | | | | |
| 62800 | $C_5H_{11}$— | —O—CHMe—$C_6H_{13}$ | Cr 84.0 | A 124.0 | | | | |
| 24516 | $C_4H_9$— | —O—$C_4H_8$—CHMe—$C_2H_5$ | Cr 69.0 | S 53.0 | S 57.0 | C* 130.0 | A 175.2 | |
| 24517 | $C_4H_9$— | —OOC—$C_4H_8$—CHMe—$C_2H_5$ | Cr ? | F* 117.2 | C* 131.5 | A 182.0 | | |
| 24518 | $C_4H_9$— | —O—$C_5H_{10}$—CHMe—$C_2H_5$ | Cr 52.0 | S 37.0 | S 39.0 | S 105.0 | C* 134.4 | A 197.4 |
| 24519 | $C_4H_9$— | —O—$CH_2$—CHF—$C_6H_{13}$ | Cr 97.1 | A 181.0 | | | | |
| 60128 | $C_8H_{17}$— | —O—$CH_2$—CH═CH—$C_5H_{11}$ | Cr 86.0 | S 112.0 | C 148.5 | A 188.5 | | |

TABLE 397

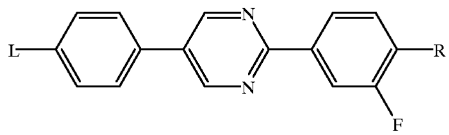

| LCReg | L | R | * | Phases | | |
|---|---|---|---|---|---|---|
| 24489 | $C_7H_{15}$— | —O—$CH_3$ | | Cr 70.0 | A 176.5 | |
| 24490 | $C_7H_{15}$— | —O—$C_6H_{13}$ | | Cr 80.5 | C 143.5 | A 181.0 |
| 24491 | $C_7H_{15}$— | —$C_7H_{15}$ | | Cr 82.0 | C 140.5 | A 178.0 |
| 24492 | $C_7H_{15}$— | —O—$C_8H_{17}$ | | Cr 72.0 | C 134.5 | A 175.5 |
| 24493 | $C_7H_{15}$— | —O—$C_3H_6$—CHMe—$C_2H_5$ | 2 | Cr 69.5 | C 138.5 | A 160.5 |
| 24494 | $C_{10}H_{21}$— | —O—$C_2H_4$—CHF—$C_4H_9$ | R | Cr 78.2 | C* 152.6 | A 161.9 |
| 24495 | $C_{12}H_{25}$— | —$C_2H_4$—CHF—$C_4H_9$ | R | Cr 77.8 | C* 150.7 | A 157.9 |
| 24496 | $C_8H_{17}$—O— | —O—$C_2H_4$—CHF—$C_4H_9$ | R | Cr 83.8 | C* 176.5 | A 189.0 |

TABLE 398

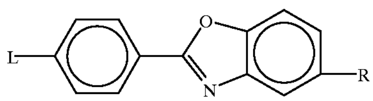

| No | L | R | | Cr | LC | | |
|---|---|---|---|---|---|---|---|
| 7534 | $C_8H_{17}$— | —$C_6H_{13}$ | | K 39.9 | C 23 | A 25.5 | I |
| 7538 | $C_6H_{13}$—O— | —$C_4H_9$ | | K 68.7 | C 45.1 | A 55.8 | I |
| 7539 | $C_{10}H_{21}$—O— | —$C_8H_{17}$ | | K 57.7 | C 71.5 | A 77.3 | I |
| 7542 | $C_{10}H_{21}$—O— | —O—$C_8H_{17}$ | | K 60.1 | C 81.7 | A 89.1 | I |
| 7543 | $C_8H_{17}$—O— | —CO—$C_{10}H_{21}$ | | K 106.9 | C 103.8 | A 120.4 | I |
| 7545 | $C_{10}H_{21}$—O— | —COO—$C_8H_{17}$ | | K 103.6 | A 88.2 | I | |
| 7548 | $C_6H_{13}$—COO— | —$C_8H_{17}$ | | K 51.8 | A 64.3 | N 49.8 | I |
| 7549 | $C_6H_{13}$—CHF—$CH_2$—O— | —$C_8H_{17}$ | 1 | K 77.9 | A 69.6 | I | |

TABLE 399

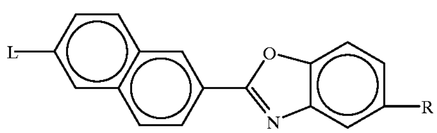

| No | L | R | Cr | LC | |
|---|---|---|---|---|---|
| 8788 | $C_{10}H_{21}$—O— | —$C_4H_9$ | K 90.1 | A 109.9 | I |

TABLE 400

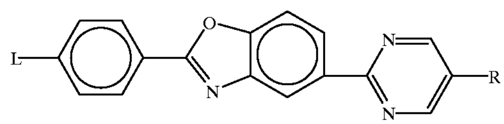

| No | L | R | Cr | LC | | |
|---|---|---|---|---|---|---|
| 27629 | $C_8H_{17}$— | —$C_{12}H_{25}$ | K 76.6 | C 99.4 | N 128.2 | I |

TABLE 401

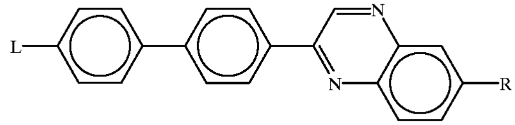

| No | L | R | Cr | LC | | |
|---|---|---|---|---|---|---|
| 27333 | $CH_3$— | —H | K 153 | A 151.5 | N 163.5 | I |
| 27334 | $C_2H_5$— | —H | K 142 | A 164 | I | |
| 27335 | $C_3H_7$— | —H | K 125 | A 175.5 | I | |
| 27336 | $C_4H_9$— | —H | K 120.5 | A 170 | I | |

TABLE 401-continued

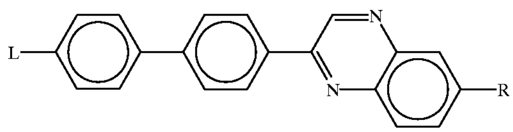

| No | L | R | | Cr | LC | | | |
|---|---|---|---|---|---|---|---|---|
| 27337 | $C_5H_{11}$— | —H | | K 113 | A 175 | I | | |
| 27338 | $C_6H_{13}$— | —H | | K 99.5 | A 176 | I | | |
| 27339 | $C_7H_{15}$— | —H | | K 86 | E 88 | A 170 | I | |
| 27340 | $C_8H_{17}$— | —H | | K 60 | E 82 | A 176 | I | |
| 27341 | $C_9H_{19}$— | —H | | K 61 | S 82 | A 173 | I | |
| 27342 | $C_{10}H_{21}$— | —H | | K 53 | E 83 | A 171 | I | |
| 27343 | $CH_3$—O— | —H | | K 169 | A 163 | N 203 | I | |
| 27344 | $C_2H_5$—O— | —H | | K 175 | A 202 | N 216 | I | |
| 27345 | $C_3H_7$—O— | —H | | K 157 | A 204 | I | | |
| 27346 | $C_5H_{11}$—O— | —H | | K 145 | E 130 | A 206 | I | |
| 27347 | $C_6H_{17}$—O— | —H | | K 96 | E 115 | A 195 | I | |
| 27348 | $C_{10}H_{21}$—O— | —H | | K 98 | E 120 | A 194 | I | |
| 27349 | $C_{16}H_{33}$—O— | —H | | K 109 | E 106 | A 182.5 | I | |
| 27351 | $C_5H_{11}$-Oxazolidinyl-N-oxy-$C_4H_5$—O— | —H | 2 | K 118 | C 101 | A 108 | I | |
| 27352 | $C_5H_{17}$-Oxazolidinyl-N-oxy-$C_7H_{14}$—O— | —H | 2 | K 79 | E 99 | C 119 | A 134 | I |
| 27353 | $CH_3$-Oxazolidinyl-N-oxy-$C_8H_{16}$—O— | —H | 2 | K 113 | C 123 | A 158.5 | I | |

TABLE 402

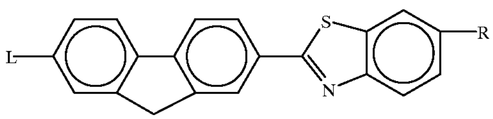

| No | L | R | Cr | LC | | |
|---|---|---|---|---|---|---|
| 8797 | $C_6H_{13}$— | —$C_6H_{13}$ | K 170 | S 172 | A 236 | I |

TABLE 403

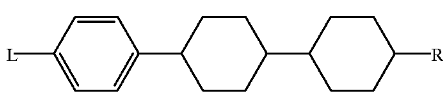

| LCReg | L | R | Phases | | |
|---|---|---|---|---|---|
| 24117 | NC— | —H | Cr 94.6 | N 61.0 | |
| 24119 | H— | —$C_3H_7$ | Cr 76.0 | B 97.0 | N 103.0 |
| 24120 | H— | —$C_4H_9$ | Cr 70.1 | B 109.2 | |

TABLE 403-continued

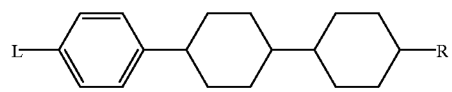

| LCReg | L | R | Phases | | |
|---|---|---|---|---|---|
| 24121 | H— | —$C_5H_{11}$ | Cr 39.0 | B 109.0 | N 110.0 |
| 24124 | F— | —$C_3H_7$ | Cr 88.6 | N 158.5 | |
| 24125 | F— | —$C_4H_9$ | Cr 80.6 | N 152.0 | |
| 24126 | F— | —$C_5H_{11}$ | Cr 68.0 | B 75.0 | N 157.0 |
| 24127 | F— | —$C_6H_{13}$ | Cr 68.0 | B 83.7 | N 145.7 |
| 24128 | F— | —$C_7H_{15}$ | Cr 62.7 | B 65.9 | N 142.0 |
| 24132 | F— | —$C_2H_4$—O—$CH_3$ | Cr 73.0 | N 116.0 | |
| 24133 | F— | —$C_3H_6$—O—$CH_3$ | Cr 75.0 | B 89.0 | N 159.0 |
| 24134 | F— | —$C_4H_8$—O—$CH_3$ | Cr 79.0 | S 66.0 | N 135.0 |
| 24135 | F— | —$C_5H_{10}$—O—$CH_3$ | Cr 57.0 | S 98.0 | N 151.0 |
| 24158 | I— | —$C_3H_7$ | Cr 119.0 | S 139.2 | N 189.2 |
| 24159 | NC— | —$C_2H_5$ | Cr 76.0 | N 195.0 | |

TABLE 404

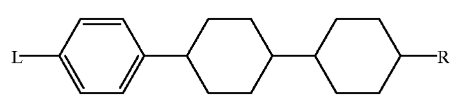

| LCReg | L | R | Phases | | |
|---|---|---|---|---|---|
| 24160 | NC— | —$C_3H_7$ | Cr 73.1 | S 81.1 | N 238.9 |
| 24161 | NC— | —$C_5H_{11}$ | Cr 53.8 | S 60.3 | N 234.4 |
| 24163 | NC— | —$C_3H_6$—O—$CH_3$ | Cr 84.0 | N 237.0 | |
| 24164 | NC— | —$C_5H_{10}$—O—$CH_3$ | Cr 72.0 | N 232.0 | |
| 24166 | NC—$CF_2$— | —$C_5H_{11}$ | Cr 76.0 | B 74.0 | N 81.5 |
| 24167 | NC—CO— | —$C_5H_{11}$ | Cr 92.0 | X 172.0 | |
| 24174 | $C_2H_5$—O— | —H | Cr 87.0 | N 98.7 | |

TABLE 404-continued

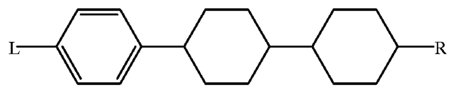

| LCReg | L | R | Phases | | |
|---|---|---|---|---|---|
| 24175 | $C_3H_7$—O— | —H | Cr 90.4 | N 113.0 | |
| 24176 | $C_4H_9$—O— | —H | Cr 85.3 | N 101.0 | |
| 24177 | $C_5H_{11}$—O— | —H | Cr 62.4 | N 87.2 | |
| 24186 | $CH_3$— | —$C_2H_5$ | Cr 62.8 | S 103.7 | N 142.3 |
| 24187 | $CH_3$— | —$C_3H_7$ | Cr 62.0 | B 108.0 | N 177.0 |
| 24188 | $CH_3$— | —$C_4H_9$ | Cr 58.0 | S 135.2 | N 173.9 |
| 24189 | $CH_3$— | —$C_5H_{11}$ | Cr 55.8 | S 138.0 | N 178.6 |
| 24190 | $CH_3$— | —$C_6H_{13}$ | Cr 135.8 | S 142.5 | N 167.8 |

TABLE 405

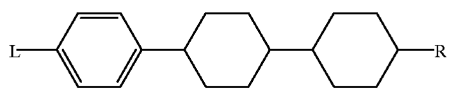

| LCReg | L | R | Phases | | |
|---|---|---|---|---|---|
| 24191 | $C_2H_5$— | —$C_2H_5$ | Cr 55.1 | S 151.9 | |
| 24192 | $C_2H_5$— | —$C_3H_7$ | Cr 31.0 | S 161.3 | N 162.7 |
| 24193 | $C_2H_5$— | —$C_5H_{11}$ | Cr 37.8 | S 173.2 | |
| 24194 | $C_3H_7$— | —$C_2H_5$ | Cr <30.0 | S 160.8 | |
| 24195 | $C_3H_7$— | —$C_3H_7$ | Cr <20.0 | S 177.5 | |
| 24196 | $C_3H_7$— | —$C_5H_{11}$ | Cr 48.6 | S 181.0 | |
| 24197 | $C_4H_9$— | —$C_2H_5$ | Cr <30.0 | S 158.6 | |
| 24198 | $C_4H_9$— | —$C_3H_7$ | Cr <30.0 | S 189.6 | |

TABLE 405-continued

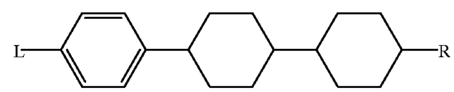

| LCReg | L | R | Phases | |
|---|---|---|---|---|
| 24199 | $C_4H_9$— | —$C_5H_{11}$ | Cr <30.0 | S 190.6 |
| 24200 | $C_5H_{11}$— | —$C_2H_5$ | Cr <30.0 | S 151.0 |
| 24201 | $C_5H_{11}$— | —$C_3H_7$ | Cr <20.0 | S 172.3 |
| 24202 | $C_5H_{11}$— | —$C_5H_{11}$ | Cr <30.0 | S 189.8 |
| 24203 | $C_6H_{13}$— | —$C_2H_5$ | Cr <30.0 | S 148.6 |
| 24204 | $C_6H_{13}$— | —$C_3H_7$ | Cr <30.0 | S 171.0 |
| 24205 | $C_6H_{13}$— | —$C_5H_{11}$ | Cr <30.0 | S 185.9 |

TABLE 406

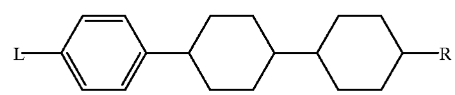

| LCReg | L | R | * | Phases | | |
|---|---|---|---|---|---|---|
| 24237 | $C_3H_7$—$C_2F_4$— | —$C_2H_5$ | | Cr 49.0 | B 168.0 | |
| 24238 | $C_3H_7$—$CF_2$—CHF— | —$C_3H_7$ | 2 | Cr 56.0 | B 166.0 | |
| 24212 | $CH_3$—O— | —$C_3H_7$ | | Cr 79.2 | S 128.4 | N 211.5 |
| 24213 | $CH_3$—O— | —$C_5H_{11}$ | | Cr 66.3 | S 150.1 | N 207.7 |
| 24214 | $CH_3$—O— | —$C_6H_{13}$ | | Cr 70.5 | S 154.5 | N 196.5 |
| 24215 | $CH_3$—O— | —$C_7H_{15}$ | | Cr 68.8 | S 153.0 | N 194.7 |
| 24216 | $C_2H_5$—O— | —$C_3H_7$ | | Cr 84.6 | S 149.1 | N 210.1 |
| 24217 | $C_2H_5$—O— | —$C_4H_9$ | | Cr 84.7 | S 172.5 | N 211.5 |
| 24218 | $C_2H_5$—O— | —$C_5H_{11}$ | | Cr 81.8 | S 176.3 | N 215.2 |
| 24219 | $C_3H_7$—O— | —$C_3H_7$ | | Cr 81.6 | S 179.5 | N 201.4 |
| 24220 | $C_3H_7$—O— | —$C_5H_{11}$ | | Cr 56.3 | S 195.0 | N 201.8 |
| 24221 | $C_3H_7$—O— | —$C_7H_{15}$ | | Cr 62.7 | S 194.6 | |
| 24222 | $C_4H_9$—O— | —$C_3H_7$ | | Cr 65.3 | S 179.1 | N 190.9 |
| 24223 | $C_4H_9$—O— | —$C_5H_{11}$ | | Cr 63.2 | S 199.2 | N 200.6 |
| 24224 | $C_5H_{11}$—O— | —$C_3H_7$ | | Cr 60.8 | s 175.8 | N 185.6 |

TABLE 407

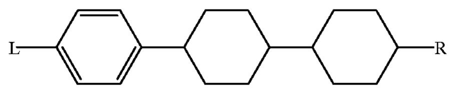

| LCReg | L | R | Phases | | |
|---|---|---|---|---|---|
| 24225 | $C_5H_{11}$—O— | —$C_5H_{11}$ | Cr 61.4 | S 196.7 | |
| 24226 | $C_6H_{13}$—O— | —$C_3H_7$ | Cr 77.0 | S 175.0 | N 185.3 |
| 24227 | $C_6H_{13}$—O— | —$C_4H_9$ | Cr 70.0 | S 186.3 | |
| 24228 | $C_6H_{13}$—O— | —$C_5H_{11}$ | Cr 58.1 | S 192.5 | |
| 24229 | $C_7H_{15}$—O— | —$C_3H_7$ | Cr 72.1 | S 172.0 | N 178.0 |
| 24230 | $C_7H_{15}$—O— | —$C_7H_{15}$ | Cr 58.1 | S 188.0 | |
| 24241 | $CH_3$—O—$CH_2$—O— | —$C_3H_7$ | Cr 33.0 | S 156.0 | |
| 24242 | $CH_3$—O—$CH_2$—O— | —$C_4H_9$ | Cr 45.0 | S 171.0 | |
| 24243 | $CH_3$—O—$CH_2$—O— | —$C_5H_{11}$ | Cr 38.0 | S 173.0 | |
| 24244 | $C_2H_5$—O—$CH_2$—O— | —$C_3H_7$ | Cr <20.0 | S 144.0 | |
| 24245 | $CH_3$—O—$C_2H_4$—O— | —$C_3H_7$ | Cr 65.0 | S 169.0 | N 196.0 |
| 24246 | $CH_3$—O—$C_2H_4$—O— | —$C_5H_{11}$ | Cr 95.0 | S 188.0 | N 197.0 |
| 24247 | $C_2H_5$—O—$C_2H_4$—O— | —$C_3H_7$ | Cr 36.0 | S 166.0 | N 176.0 |
| 24248 | $C_3H_7$—O—$C_2H_4$—O— | —$C_3H_7$ | Cr 85.0 | S 155.0 | N 163.0 |
| 24249 | $CH_3$—CO— | —$C_3H_7$ | Cr 116.0 | N 216.0 | |

TABLE 408

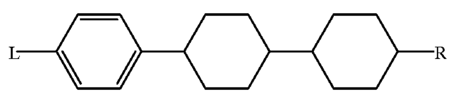

| LCReg | L | R | Phases | | |
|---|---|---|---|---|---|
| 65962 | $CH_3$—CO— | —$C_5H_{11}$ | Cr 108.0 | N 211.0 | |
| 24250 | $CH_3$—$CF_2$—CO— | —$C_3H_7$ | Cr 92.0 | N 197.1 | |
| 24251 | $C_3H_7$—$CF_2$—CO— | —$C_3H_7$ | Cr 73.0 | B 152.0 | N 199.0 |
| 24252 | $CH_3$— | —CH═CH—$CH_3$ | Cr 74.0 | N 214.0 | |
| 24253 | $CH_3$— | —$C_2H_4$—CH═$CH_2$ | Cr 52.0 | S 104.0 | N 177.0 |
| 24255 | $CF_3$— | —$C_3H_7$ | Cr 133.0 | N 100.0 | |
| 24256 | $CF_3$— | —$C_5H_{11}$ | Cr 43.0 | B 109.0 | N 122.9 |
| 24258 | $CF_3$—O— | —$C_3H_7$ | Cr 38.0 | B 69.0 | N 153.7 |
| 24259 | $CF_3$—O— | —$C_5H_{11}$ | Cr 52.0 | B 73.0 | N 156.1 |
| 24261 | $CF_3$—O— | —$C_3H_6$—O—$CH_3$ | Cr 51.0 | B 105.0 | N 158.8 |
| 24260 | $CF_3$—O— | —O—$C_2H_5$ | Cr 64.0 | B 58.0 | N 130.5 |
| 24264 | $CF_3$—S— | —$C_3H_7$ | Cr 51.0 | N 109.5 | |
| 24265 | $CF_3$—S— | —$C_5H_{11}$ | Cr 51.0 | N 109.5 | |
| 24266 | H—$CF_2$— | —$C_5H_{11}$ | Cr 54.0 | B 101.0 | N 157.6 |
| 24267 | H—$CF_2$—O— | —$C_3H_7$ | Cr 52.0 | B 69.0 | N 173.6 |

TABLE 409

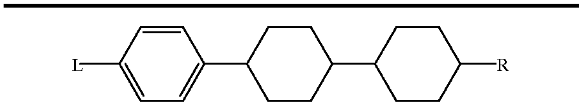

| LCReg | L | R | Phases | | |
|---|---|---|---|---|---|
| 24268 | H—$CF_2$—O— | —$C_5H_{11}$ | Cr 37.0 | B 102.0 | N 170.0 |

TABLE 410

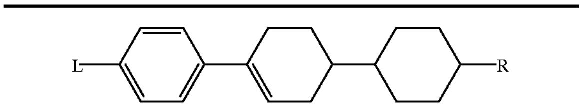

| LCReg | L | R | | Phases | | |
|---|---|---|---|---|---|---|
| 24355 | H— | —$C_3H_7$ | 2 | Cr 68.6 | S 77.1 | N 105.5 |
| 24356 | H— | —$C_4H_9$ | 2 | Cr 75.8 | S 89.0 | N 104.8 |

TABLE 410-continued

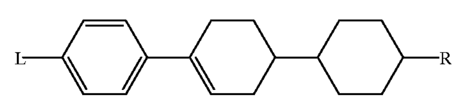

| LCReg | L | R | | Phases | | |
|---|---|---|---|---|---|---|
| 24357 | H— | —$C_5H_{11}$ | 2 | Cr 69.8 | S 83.9 | N 111.8 |
| 24358 | F— | —$C_3H_7$ | 2 | Cr 59.7 | N 150.0 | |
| 24359 | F— | —$C_4H_9$ | 2 | Cr 69.7 | N 148.1 | |
| 24360 | F— | —$C_5H_{11}$ | 2 | Cr 58.9 | N 146.9 | |
| 24361 | F— | —$C_6H_{13}$ | 2 | Cr 88.6 | N 158.5 | |
| 24362 | F— | —$C_7H_{15}$ | 2 | Cr 56.1 | N 143.9 | |
| 24369 | $C_2H_5$—O— | —H | 2 | Cr 109.8 | N 119.1 | |
| 24370 | $C_3H_7$—O— | —H | 2 | Cr 100.3 | N 118.0 | |
| 24371 | $C_4H_9$—O— | —H | 2 | Cr 73.5 | N 112.1 | |
| 24372 | $C_5H_{11}$—O— | —H | 2 | Cr 73.5 | N 108.6 | |
| 24373 | $CH_3$— | —$C_2H_5$ | 2 | Cr 74.8 | S 130.2 | N 151.5 |
| 24374 | $CH_3$— | —$C_3H_7$ | 2 | Cr 80.5 | S 133.3 | N 180.8 |
| 24375 | $CH_3$— | —$C_4H_9$ | 2 | Cr 76.7 | S 130.1 | N 170.4 |

TABLE 411

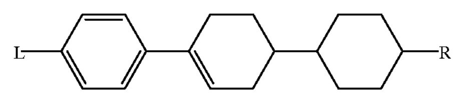

| LCReg | L | R | * | Phases | | |
|---|---|---|---|---|---|---|
| 24376 | $CH_3$— | —$C_5H_{11}$ | 2 | Cr 70.4 | S 141.8 | N 174.4 |
| 24377 | $CH_3$— | —$C_6H_{13}$ | 2 | Cr 66.1 | S 144.1 | N 170.2 |
| 24378 | $CH_3$— | —$C_7H_{15}$ | 2 | Cr 67.4 | S 147.9 | N 174.6 |
| 24379 | $C_2H_5$— | —$C_2H_5$ | 2 | Cr <30.0 | S 155.9 | |
| 24380 | $C_2H_5$— | —$C_4H_9$ | 2 | Cr 37.3 | S 163.9 | |
| 24381 | $C_2H_5$— | —$C_7H_{15}$ | 2 | Cr 42.6 | S 163.3 | N 165.5 |
| 24382 | $C_3H_7$— | —$C_2H_5$ | 2 | Cr <30.0 | S 156.2 | |
| 24383 | $C_3H_7$— | —$C_3H_7$ | 2 | Cr 57.0 | S 163.7 | |
| 24384 | $C_3H_7$— | —$C_4H_9$ | 2 | Cr <30.0 | S 181.6 | |
| 24385 | $C_3H_7$— | —$C_5H_{11}$ | 2 | Cr 54.6 | S 172.3 | N 175.6 |
| 24386 | $C_3H_7$— | —$C_7H_{15}$ | 2 | Cr 40.8 | S 171.8 | |
| 24387 | $C_4H_9$— | —$C_2H_5$ | 2 | Cr <30.0 | S 150.7 | |
| 24388 | $C_4H_9$— | —$C_3H_7$ | 2 | Cr <30.0 | S 176.3 | |
| 24389 | $C_4H_9$— | —$C_5H_{11}$ | 2 | Cr <30.0 | S 182.0 | |
| 24390 | $C_4H_9$— | —$C_7H_{15}$ | 2 | Cr <30.0 | S 179.3 | |

TABLE 412

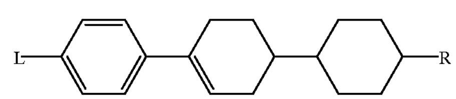

| LCReg | L | R | * | Phases | | |
|---|---|---|---|---|---|---|
| 24391 | $C_5H_{11}$— | —$C_2H_5$ | 2 | Cr <30.0 | S 153.7 | |
| 24392 | $C_5H_{11}$— | —$C_3H_7$ | 2 | Cr <30.0 | S 175.0 | |
| 24393 | $C_5H_{11}$— | —$C_4H_9$ | 2 | Cr <30.0 | S 181.8 | |
| 24394 | $C_5H_{11}$— | —$C_5H_{11}$ | 2 | Cr <30.0 | S 181.0 | |
| 24395 | $C_5H_{11}$— | —$C_7H_{15}$ | 2 | Cr <30.0 | S 182.0 | |
| 24396 | $C_6H_{13}$— | —$C_2H_5$ | 2 | Cr <30.0 | S 150.6 | |
| 24397 | $C_6H_{13}$— | —$C_3H_7$ | 2 | Cr <30.0 | S 173.4 | |
| 24398 | $C_6H_{13}$— | —$C_5H_{11}$ | 2 | Cr <30.0 | S 182.0 | |
| 24399 | $C_6H_{13}$— | —$C_7H_{15}$ | 2 | Cr <30.0 | S 179.8 | |
| 24400 | $C_7H_{15}$— | —$C_2H_5$ | 2 | Cr <30.0 | S 139.6 | |
| 24401 | $C_7H_{15}$— | —$C_3H_7$ | 2 | Cr <30.0 | S 165.9 | |
| 24402 | $C_7H_{15}$— | —$C_5H_{11}$ | 2 | Cr <30.0 | S 174.5 | |
| 24403 | $C_7H_{15}$— | —$C_7H_{15}$ | 2 | Cr 49.9 | S 179.4 | |
| 24404 | $C_8H_{17}$— | —$C_2H_5$ | 2 | Cr <30.0 | S 148.4 | |
| 24405 | $CH_3$—O— | —$C_3H_7$ | 2 | Cr 93.2 | S 139.2 | N 207.4 |

TABLE 413

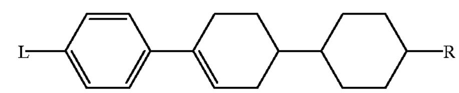

| LCReg | L | R | * | Phases | | |
|---|---|---|---|---|---|---|
| 24406 | $CH_3$—O— | —$C_5H_{11}$ | 2 | Cr 83.0 | S 148.8 | N 199.6 |
| 24407 | $CH_3$—O— | —$C_6H_{13}$ | 2 | Cr 66.0 | S 133.1 | N 180.0 |
| 24408 | $CH_3$—O— | —$C_7H_{15}$ | 2 | Cr 81.1 | S 147.3 | N 182.0 |
| 24409 | $C_2H_5$—O— | —$C_3H_7$ | 2 | Cr 80.0 | S 170.0 | N 208.5 |
| 24410 | $C_2H_5$—O— | —$C_4H_9$ | 2 | Cr 81.8 | S 182.6 | N 202.2 |
| 24411 | $C_2H_5$—O— | —$C_5H_{11}$ | 2 | Cr 84.9 | S 189.4 | N 204.0 |
| 24412 | $C_3H_7$—O— | —$C_3H_7$ | 2 | Cr 87.4 | S 187.9 | N 200.5 |
| 24413 | $C_3H_7$—O— | —$C_5H_{11}$ | 2 | Cr 81.0 | S 196.8 | |
| 24414 | $C_3H_7$—O— | —$C_7H_{15}$ | 2 | Cr 79.3 | S 195.9 | |
| 24415 | $C_4H_9$—O— | —$C_3H_7$ | 2 | Cr 60.2 | S 195.6 | |
| 24416 | $C_4H_9$—O— | —$C_5H_{11}$ | 2 | Cr 65.5 | S 208.3 | |
| 24417 | $C_5H_{11}$—O— | —$C_3H_7$ | 2 | Cr 75.8 | S 181.0 | N 197.2 |
| 24418 | $C_5H_{11}$—O— | —$C_5H_{11}$ | 2 | Cr 75.8 | S 206.0 | |
| 24419 | $C_6H_{13}$—O— | —$C_3H_7$ | 2 | Cr 71.3 | S 192.7 | |
| 24420 | $C_6H_{13}$—O— | —$C_4H_9$ | 2 | Cr 72.6 | S 199.2 | |

TABLE 414

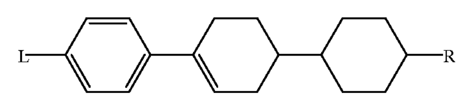

| LCReg | L | R | * | Phases | | |
|---|---|---|---|---|---|---|
| 24421 | $C_6H_{13}$—O— | —$C_5H_{11}$ | 2 | Cr 73.6 | S 203.3 | |
| 24422 | $C_7H_{15}$—O— | —$C_3H_7$ | 2 | Cr 70.1 | S 193.6 | |
| 24423 | $C_7H_{15}$—O— | —$C_5H_{11}$ | 2 | Cr 83.7 | S 196.8 | |
| 24424 | $C_7H_{15}$—O— | —$C_7H_{15}$ | 2 | Cr 79.6 | S 192.0 | |
| 24426 | H—$CF_2$—O— | —$C_3H_7$ | 2 | Cr 36.7 | S 96.4 | N 167.7 |

TABLE 415

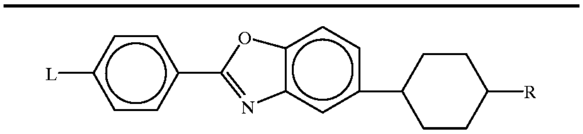

| No | L | R | Cr | LC | | |
|---|---|---|---|---|---|---|
| 28106 | $C_8H_{17}$— | —$C_8H_{17}$ | K 77.8 | C 101.4 | N 121.8 | I |

TABLE 416

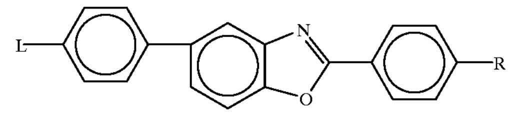

| No | L | R | Cr | LC | | | |
|---|---|---|---|---|---|---|---|
| 26603 | $C_{10}H_{21}$— | —$C_8H_{17}$ | K 77.5 | C 114.9 | N 123.6 | I | |
| 26604 | $C_{10}H_{21}$— | —O—$C_{10}H_{21}$ | K 92.2 | C 132.8 | A 135.9 | N 143.4 | I |

TABLE 417

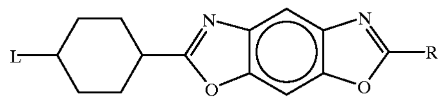

| No | L | R | Cr | | LC | |
|---|---|---|---|---|---|---|
| 8726 | $C_4H_9$— | —$C_6H_{13}$ | K 90 | A 96 | N 106 | I |

TABLE 418

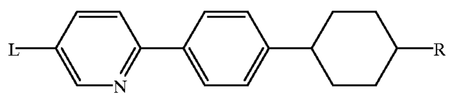

| LCReg | L | R | Phases | | |
|---|---|---|---|---|---|
| 24918 | NC— | —$C_3H_7$ | (85.0) | Cr 117.0 | N 252.0 |
| 24919 | NC— | —$C_4H_9$ | (110.0) | Cr 136.0 | N 206.0 |
| 24920 | NC— | —$C_5H_{11}$ | (92.0) | Cr 108.0 | N 223.0 |
| 24921 | $C_3H_7$— | —$C_2H_5$ | Cr 51.9 | S 92.7 | N 158.8 |
| 24922 | $C_5H_{11}$— | —$C_2H_5$ | Cr 40.2 | S 84.6 | N 153.1 |
| 24923 | $C_2H_5$— | —$C_3H_7$ | Cr 50.8 | S 87.7 | N 174.4 |
| 24924 | $C_5H_{11}$— | —$C_3H_7$ | Cr 48.0 | S 93.8 | N 177.4 |
| 24925 | $C_2H_5$— | —$C_5H_{11}$ | Cr 65.8 | S 78.0 | N 168.0 |
| 24926 | $C_3H_7$— | —$C_5H_{11}$ | Cr 37.0 | S 93.5 | N 179.0 |
| 24927 | $C_2H_5$—O— | —$C_5H_{11}$ | Cr 94.0 | N 222.0 | |
| 24928 | $H_2C$═CH—$CH_2$— | —$C_3H_7$ | Cr 50.0 | S 80.0 | N 162.1 |
| 24929 | $H_2C$═CH—$CH_2$— | —$C_5H_{11}$ | Cr 68.7 | S 107.8 | N 163.6 |
| 24930 | $H_2C$═CH—$CH_2$— | —$C_7H_{15}$ | Cr 47.4 | S 114.3 | N 151.2 |
| 24931 | $H_2C$═CH—$CH_2$— | —$C_9H_{19}$ | Cr 68.8 | S 117.8 | N 144.6 |
| 24932 | $H_2C$═CH—$C_2H_4$— | —$C_2H_5$ | Cr 51.0 | S 87.4 | N 163.2 |

TABLE 419

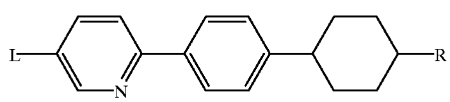

| LCReg | L | R | Phases | | |
|---|---|---|---|---|---|
| 24933 | $H_2C$═CH—$C_2H_4$— | —$C_7H_{15}$ | Cr 38.0 | S 143.0 | N 173.3 |
| 24934 | $H_2C$═CH—$C_3H_6$— | —$C_2H_5$ | Cr 20.0 | S 79.8 | N 134.1 |

TABLE 420

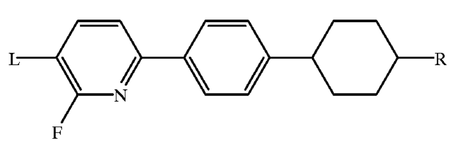

| LCReg | L | R | Phases | | | | |
|---|---|---|---|---|---|---|---|
| 24938 | $C_3H_7$— | —$C_5H_{11}$ | Cr 60.0 | G 86.0 | F 91.0 | A 124.0 | N 150.0 |
| 24939 | $C_2H_5$—O— | —$C_5H_{11}$ | Cr 112.0 | A 105.0 | N 190.0 | | |

TABLE 421

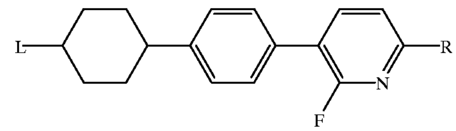

| LCReg | L | R | Phases | | |
|---|---|---|---|---|---|
| 24935 | $C_5H_{11}$— | —F | Cr 58.0 | N 107.0 | |
| 24936 | $C_5H_{11}$— | —$C_3H_7$ | Cr 64.0 | A 63.0 | N 122.0 |
| 24937 | $C_5H_{11}$— | —O—$C_2H_5$ | Cr 72.0 | A 147.0 | |

TABLE 421-continued

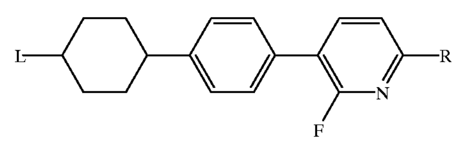

| LCReg | L | R | Phases | | |
|---|---|---|---|---|---|
| 61933 | $C_5H_{11}$— | —O—$C_8H_{17}$ | Cr 78.0 | A 110.0 | N 117.0 |
| 51934 | $C_5H_{11}$— | —O—$C_{10}H_{21}$ | Cr 64.0 | A 108.0 | N 112.0 |
| 61935 | $C_5H_{11}$— | —O—$C_{12}H_{25}$ | Cr 62.0 | A 104.0 | N 107.0 |

TABLE 422

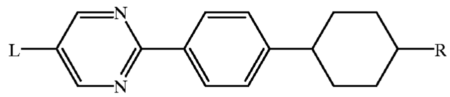

| LCReg | L | R | Phases | | | | |
|---|---|---|---|---|---|---|---|
| 24794 | $C_2H_5$— | —$C_2H_5$ | Cr 115.0 | N 158.0 | | | |
| 24795 | $C_3H_7$— | —$C_2H_5$ | Cr 100.0 | N 173.0 | | | |
| 24796 | $C_5H_{11}$— | —$C_2H_5$ | Cr 91.0 | N 162.0 | | | |
| 24797 | $C_2H_5$— | —$C_3H_7$ | Cr 109.0 | N 184.0 | | | |
| 24798 | $C_3H_7$— | —$C_3H_7$ | Cr 97.0 | N 198.0 | | | |
| 24799 | $C_5H_{11}$— | —$C_3H_7$ | Cr 92.0 | N 184.0 | | | |
| 61401 | $C_7H_{15}$— | —$C_3H_7$ | Cr 106.0 | N 169.0 | | | |
| 61404 | $C_{10}H_{21}$— | —$C_3H_7$ | Cr 72.0 | C 77.0 | A 116.0 | N 151.0 | |
| 24800 | $C_2H_5$— | —$C_5H_{11}$ | Cr 116.0 | N 178.0 | | | |
| 24801 | $C_3H_7$— | —$C_5H_{11}$ | Cr 101.0 | N 187.0 | | | |
| 24802 | $C_5H_{11}$— | —$C_5H_{11}$ | Cr 73.0 | N 177.0 | | | |
| 61402 | $C_7H_{15}$— | —$C_5H_{11}$ | Cr 75.0 | N 162.0 | | | |
| 24803 | $C_8H_{17}$— | —$C_5H_{11}$ | Cr 74.0 | C 88.0 | A 103.0 | N 158.0 | |
| 24804 | $C_{10}H_{21}$— | —$C_5H_{11}$ | Cr 60.0 | B 83.0 | C 93.0 | A 131.0 | N 152.0 |
| 61403 | $C_7H_{15}$— | —$C_7H_{15}$ | Cr 64.0 | C 63.0 | A 102.0 | N 158.0 | |

TABLE 423

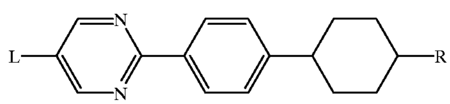

| LCReg | L | R | Phases | | | |
|---|---|---|---|---|---|---|
| 61406 | $C_{10}H_{21}$— | —$C_7H_{15}$ | Cr 50.0 N 149.0 | S 62.0 | B 101.0 | A 136.0 |
| 61407 | $C_7H_{15}$— | —O—$C_4H_9$ | Cr 59.0 | B 92.0 | A 137.0 | N 143.0 |
| 61409 | $C_{10}H_{21}$— | —O—$C_4H_9$ | Cr 59.0 | B 92.0 | A 137.0 | N 143.0 |
| 24805 | $C_8H_{17}$—O— | —$C_5H_{11}$ | Cr 65.0 | F 83.0 | C 119.0 | N 181.0 |
| 61408 | $C_9H_{19}$—O— | —$C_5H_{11}$ | Cr 73.0 | C 128.0 | A 139.0 | N 176.0 |
| 61410 | $C_9H_{19}$—O— | —O—$C_4H_9$ | Cr 88.0 | C 85.0 | A 153.0 | N 167.0 |

TABLE 424

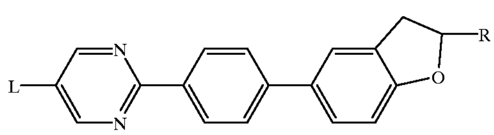

| LCReg | L | R | * | Phases | | | |
|---|---|---|---|---|---|---|---|
| 66583 | $C_8H_{17}$— | —$C_8H_{17}$ | 2 | (53.0) | Cr 81.3 | C 103.6 | N 140.0 |
| 66584 | $C_{10}H_{21}$— | —$CH_3$ | 2 | (62.0) N 120.9 | Cr 94.9 | C 70.0 | A 93.2 |
| 66581 | $C_{10}H_{21}$— | —$C_8H_{17}$ | 2 | (42.0) N 138.4 | Cr 57.9 | C 123.8 | A 126.0 |
| 66587 | $C_{11}H_{23}$— | —$C_{10}H_{21}$ | 2 | (42.0) | Cr 61.4 | A 54.7 | |
| 66582 | $C_{12}H_{25}$— | —$C_8H_{17}$ | 2 | (41.0) N 135.9 | Cr 77.3 | C 130.0 | A 132.6 |

TABLE 425

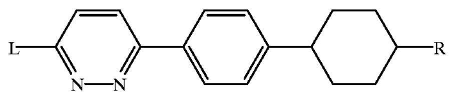

| LCReg | L | R | Phases | | |
|---|---|---|---|---|---|
| 24945 | H—O— | —$C_5H_{11}$ | Cr 210.4 | A 246.0 | |
| 24946 | CI— | —$C_5H_{11}$ | Cr 187.7 | A 240.0 | |
| 24947 | $C_3H_7$— | —$C_5H_{11}$ | CrX 113.0 | Cr 154.0 | B 181.0 |
| | | | A 195.0 | N 201.0 | |
| 24948 | $C_3H_7$— | —$C_7H_{15}$ | CrX 103.0 | CrX 118.0 | Cr 142.0 |
| | | | B 167.0 | A 195.0 | N 197.0 |
| 24949 | $C_5H_{11}$— | —$C_5H_{11}$ | CrX 110.0 | CrX 120.0 | Cr 140.0 |
| | | | B 175.0 | A 205.0 | |
| 24950 | $C_5H_{11}$— | —$C_7H_{15}$ | CrX 68.0 | CrX 109.0 | Cr 133.0 |
| | | | B 176.0 | A 197.0 | N 200.0 |
| 24951 | $C_8H_{17}$— | —$C_5H_{11}$ | CrX 53.0 | CrX 61.0 | Cr 125.0 |
| | | | B 175.0 | A 199.0 | |
| 24952 | $C_8H_{17}$— | —$C_7H_{15}$ | CrX 75.0 | Cr 121.0 | B 175.0 |
| | | | A 195.0 | | |
| 24953 | $C_4H_9$—O—CHMe—$CH_2$—O— | —$C_5H_{11}$ | Cr 114.0 | A 125.0 | |
| 24955 | $C_2H_5$—CHMe—$CH_2$—O— | —$C_5H_{11}$ | Cr 177.2 | A 177.4 | |
| 24956 | $C_2H_5$—CHMe—$C_3H_6$—O— | —$C_5H_{11}$ | Cr 151.0 | A 179.5 | |

TABLE 426

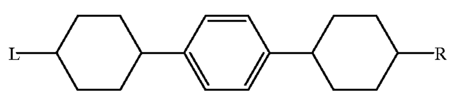

| LCReg | L | R | Phases | | | |
|---|---|---|---|---|---|---|
| 24833 | $C_3H_7$— | —$C_5H_{11}$ | Cr 30.6 | B 143.0 | S 151.8 | N 159.2 |
| 24834 | $C_5H_{11}$— | —$C_5H_{11}$ | Cr 50.0 | S 196.0 | | |
| 24837 | $C_3H_7$— | —OOC—$C_3H_7$ | Cr 171.0 | S 168.0 | | |

TABLE 427

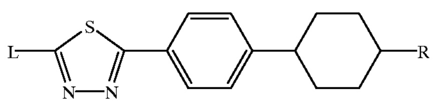

| LCReg | L | R | Phases | | | |
|---|---|---|---|---|---|---|
| 24960 | $C_6H_{13}$— | —$C_5H_{11}$ | (60.0) | Cr 72.1 | S 81.9 | S 102.2 |

TABLE 428

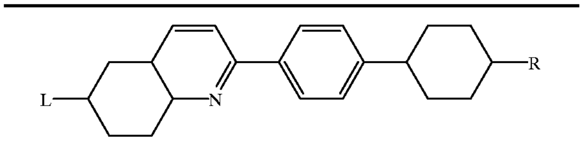

| LCReg | L | R | | Phases | | |
|---|---|---|---|---|---|---|
| 24976 | $C_3H_7$— | —$C_2H_5$ | 2 | Cr 86.0 | S 92.0 | N 201.0 |
| 24977 | $C_3H_7$— | —$C_3H_7$ | 2 | Cr 95.0 | S 108.0 | N 220.0 |
| 24979 | $C_4H_9$— | —$C_3H_7$ | 2 | Cr 82.0 | S 100.0 | N 208.0 |
| 24980 | $C_5H_{11}$— | —$C_3H_7$ | 2 | Cr 96.0 | S 116.0 | N 209.0 |

TABLE 428-continued

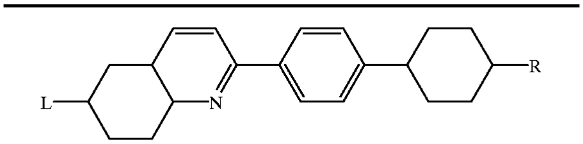

| LCReg | L | R | | Phases | | |
|---|---|---|---|---|---|---|
| 65305 | $CH_3$— | —$C_5H_{11}$ | 2 | Cr 88.0 | S 181.0 | |
| 24978 | $C_3H_7$— | —$C_5H_{11}$ | 2 | Cr 90.0 | S 132.0 | N 196.0 |

TABLE 429

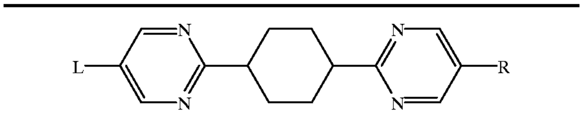

| LCReg | L | R | Phases | | |
|---|---|---|---|---|---|
| 25070 | $C_8H_{17}$—O— | —O—$C_8H_{17}$ | Cr 48.0 | S 114.8 | N 135.0 |

TABLE 430

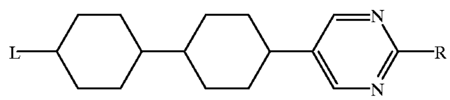

| LCReg | L | R | Phases | |
|---|---|---|---|---|
| 68266 | $C_5H_{11}$— | —F | Cr 72.0 | N 179.0 |

TABLE 431

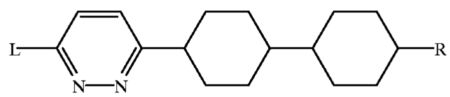

| LCReg | L | R | Phases | |
|---|---|---|---|---|
| 25308 | $C_5H_{11}$— | $C_5H_{11}$ | Cr 66.0 | N 210.0 |

TABLE 432

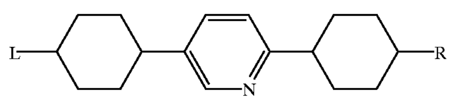

| LCReg | L | R | Phases | |
|---|---|---|---|---|
| 25117 | $C_3H_7$— | $C_5H_{11}$ | Cr <−15.0 | B 157.0 |

TABLE 433

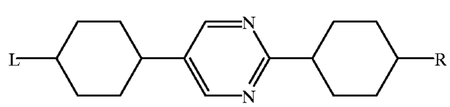

| LCReg | L | R | * | Phases | |
|---|---|---|---|---|---|
| 25075 | $C_2H_5$— | —CN | | Cr 166.5 | N 161.0 |
| 25076 | $C_3H_7$— | —CN | | Cr 132.0 | N 184.0 |
| 25077 | $C_4H_9$— | —CN | | Cr 121.0 | N 172.0 |
| 25078 | $C_5H_{11}$— | —CN | | Cr 109.5 | N 175.0 |
| 25079 | $C_7H_{15}$— | —CN | | Cr 102.5 | N 163.5 |
| 25080 | $C_2H_5$—CHMe—$CH_2$— | —CN | 1 | Cr 124.0 | X 125.0 |
| 25081 | $C_2H_5$—CHMe—$C_2H_4$— | —CN | 1 | Cr 138.0 | X 134.0 |
| 25082 | $C_7H_{15}$— | —$C_5H_{11}$ | | Cr 193.0 | S 190.0 |

TABLE 434

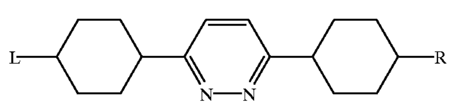

| LCReg | L | R | Phases | | |
|---|---|---|---|---|---|
| 25118 | $C_2H_5$— | —$C_6H_{13}$ | Cr 151.0 | B 182.0 | N = 120.0 |
| 25119 | $C_3H_7$— | —$C_5H_{11}$ | Cr 165.0 | B 204.0 | |
| 25120 | $C_4H_9$— | —$C_5H_{11}$ | Cr 87.0 | B 173.0 | |
| 25121 | $C_5H_{11}$— | —$C_5H_{11}$ | Cr 43.0 | B 179.0 | |

TABLE 435

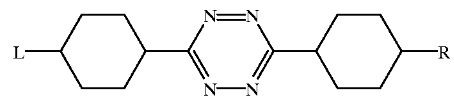

| LCReg | L | R | Phases | | |
|---|---|---|---|---|---|
| 25122 | $C_4H_9$— | —$C_4H_9$ | Cr 56.0 | A 108.0 | N 128.0 |
| 25123 | $C_5H_{11}$— | —$C_5H_{11}$ | Cr ? | N ? | |

TABLE 436

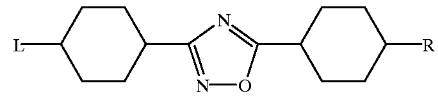

| LCReg | L | R | Phases | |
|---|---|---|---|---|
| 60590 | $C_4H_9$— | —$C_5H_{11}$ | Cr 14.0 | N 29.0 |

TABLE 437

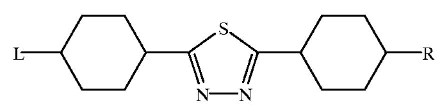

| LCReg | L | R | Phases | | | |
|---|---|---|---|---|---|---|
| 25125 | $C_3H_7$— | —$C_3H_7$ | Cr 126.0 | B 143.0 | N 144.0 | |
| 25126 | $C_3H_7$— | —$C_4H_9$ | Cr ? | B 159.0 | | |
| 25127 | $C_3H_7$— | —$C_8H_{17}$ | Cr ? | B 172.0 | | |
| 25128 | $C_4H_9$— | —$C_4H_9$ | Cr 39.0 | S 55.0 | S 64.0 | B 162.0 |
| 25129 | $C_4H_9$— | —$C_7H_{15}$ | Cr ? | B 174.0 | | |
| 25130 | $C_5H_{11}$— | —$C_5H_{11}$ | Cr 49.0 | B 180.0 | | |

TABLE 437-continued

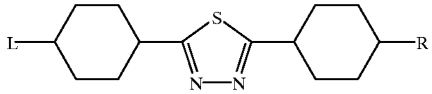

| LCReg | L | R | Phases | |
|---|---|---|---|---|
| 25131 | $C_6H_{13}$— | —$C_6H_{13}$ | Cr 55.0 | B 181.0 |
| 25132 | $C_6H_{13}$— | —$C_8H_{17}$ | Cr ? | B 182.0 |

TABLE 438

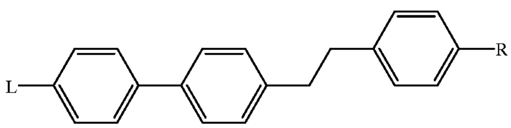

| LCReg | L | R | Phases | |
|---|---|---|---|---|
| 27028 | F— | —O—$C_2H_5$ | Cr 121.0 | N 130.0 |
| 27029 | Cl— | —$C_3H_7$ | Cr 111.0 | N 123.0 |

TABLE 438-continued

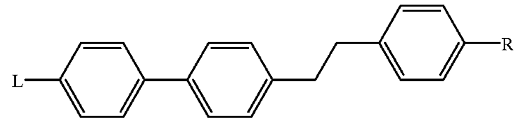

| LCReg | L | R | Phases | | |
|---|---|---|---|---|---|
| 27037 | NC— | —$C_3H_7$ | Cr 85.0 | N 146.1 | |
| 27038 | NC— | —$C_5H_{11}$ | Cr 60.0 | N 136.0 | |
| 27039 | NC— | —O—$C_2H_5$ | CrX −3000.0 | Cr 136.3 | N 183.6 |
| 27040 | NC— | —O—$C_3H_7$ | Cr 127.0 | N 166.4 | |
| 27041 | NC— | —O—$C_4H_9$ | Cr 105.0 | N 166.0 | |
| 27042 | NC— | —O—$C_5H_{11}$ | CrX −3000.0 | Cr 87.5 | N 155.5 |
| 27043 | NC— | —O—$C_6H_{13}$ | Cr 74.5 | N 155.0 | |
| 27044 | NC— | —O—$C_7H_{15}$ | Cr 61.3 | A 125.8 | N 147.8 |
| 27045 | NC— | —O—$C_8H_{17}$ | Cr 72.5 | A 144.0 | N 148.0 |
| 27052 | $C_5H_{11}$— | —F | Cr 60.0 | S 109.0 | |
| 27053 | $C_4H_9$—O— | —F | Cr 102.0 | X 145.0 | |
| 27064 | $C_5H_{11}$— | —CN | Cr 103.0 | N 143.3 | |
| 27065 | $C_7H_{15}$— | —CN | Cr 100.0 | N 136.2 | |

TABLE 439

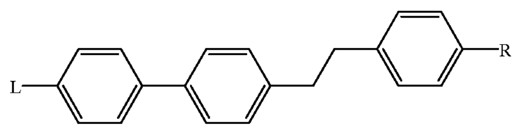

| LCReg | L | R | * | Phases | | | |
|---|---|---|---|---|---|---|---|
| 27066 | $C_3H_7$—O— | —CN | | CrX −3000.0 | Cr 114.7 | A 93.9 | N 173.6 |
| 27067 | $C_4H_9$—O— | —CN | | CrX −3000.0 | Cr 99.5 | A 98.8 | N 175.4 |
| 27068 | $C_5H_{11}$—O— | —CN | | CrX −3000.0 | CrX −3000.0 | Cr 91.0 | |
| | | | | A 93.5 | N 164.7 | | |
| 27069 | $C_6H_{13}$—O— | —CN | | Cr 88.3 | A 91.3 | N 163.2 | |
| 27070 | $C_7H_{15}$—O— | —CN | | CrX −3000.0 | Cr 83.5 | A 85.1 | N 157.4 |
| 27071 | $C_8H_{17}$—O— | —CN | | Cr 91.8 | A <80.0 | N 155.9 | |
| 27072 | $C_2H_5$—CHMe—$CH_2$— | —CN | 1 | Cr 91.7 | N* 103.4 | | |
| 27073 | $C_2H_5$—CHMe—$C_2H_4$— | —CN | 1 | Cr 91.6 | N* 110.8 | | |
| 27074 | $C_2H_5$—CHMe—$C_3H_6$— | —CN | 1 | Cr 95.0 | N* 105.8 | | |
| 27075 | $C_4H_9$— | —NCS | | CrX 82.0 | Cr 87.0 | B 83.0 | N 131.0 |
| 27076 | $C_5H_{11}$— | —NCS | | Cr 96.5 | M 141.0 | | |
| 27077 | $C_6H_{13}$— | —NCS | | Cr 56.0 | S 99.5 | S 101.5 | N 132.5 |
| 27078 | $C_7H_{15}$— | —NCS | | Cr 70.0 | B 103.0 | N 135.0 | |
| 68776 | $C_{10}H_{21}$— | —NCS | | Cr ? | N ? | | |
| 27079 | $C_5H_{11}$—O— | —NCS | | Cr 63.0 | S 130.0 | N 164.5 | |

TABLE 440

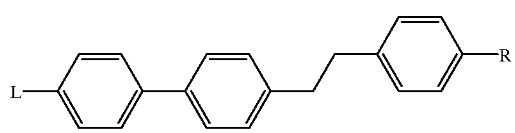

| LCReg | L | R | * | Phases | |
|---|---|---|---|---|---|
| 27080 | $C_2H_5$—CHMe—$CH_2$— | —NCS | 1 | Cr 71.5 | S 98.0 |
| 27081 | $C_3H_7$— | —$CH_3$ | | Cr 83.0 | X 116.0 |

TABLE 440-continued

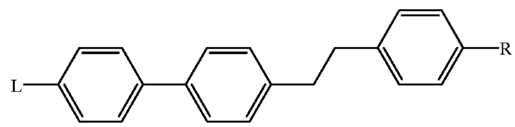

| LCReg | L | R | * | Phases | | |
|---|---|---|---|---|---|---|
| 27082 | $C_5H_{11}$— | —$C_3H_7$ | | Cr 57.0 | B 138.0 | |
| 40282 | $C_3H_7$— | —O—$C_2H_5$ | | Cr 94.0 | B 139.0 | N 148.2 |
| 27083 | $C_5H_{11}$— | —O—$C_2H_5$ | | Cr 82.0 | B 146.0 | |
| 27087 | $C_5H_{11}$— | —$CF_3$ | | Cr 85.0 | B 126.0 | |
| 27088 | $C_3H_7$— | —O—$CF_3$ | | Cr 76.0 | B 141.0 | |
| 27089 | $C_5H_{11}$— | —O—$CF_3$ | | Cr 62.0 | B 136.0 | |
| 27092 | $CF_3$— | —$C_3H_7$ | | Cr 145.0 | B 135.0 | |
| 27093 | $CF_3$—O— | —$C_3H_7$ | | Cr 97.0 | B 137.0 | |

TABLE 441

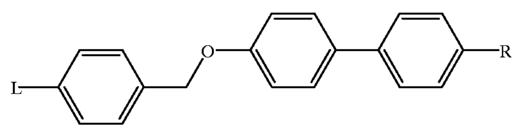

| LCReg | L | R | Phases | | | |
|---|---|---|---|---|---|---|
| 27187 | Br— | —O—$C_8H_{17}$ | Cr 105.8 | E 189.5 | B 206.0 | |
| 27188 | NC— | —O—$C_4H_9$ | Cr 155.0 | A 158.0 | N 189.0 | |
| 27189 | NC— | —O—$C_5H_{11}$ | Cr 139.0 | H 132.0 | G 135.5 | |
| | | | A 146.5 | N 180.0 | | |
| 27190 | NC— | —O—$C_6H_{13}$ | Cr 138.0 | H 116.0 | G 130.0 | |
| | | | A 137.0 | N 179.0 | | |
| 27191 | NC— | —O—$C_7H_{15}$ | Cr 130.0 | H 124.0 | G 126.0 | |
| | | | C 127.0 | N 173.0 | | |
| 27198 | $O_2N$— | —O—$C_5H_{11}$ | Cr 116.0 | H 114.5 | G 114.7 | |
| | | | A 115.0 | N 167.0 | | |
| 27199 | $O_2N$— | —O—$C_6H_{13}$ | Cr 108.0 | H 107.0 | G 114.0 | N 166.0 |
| 27200 | $O_2N$— | —O—$C_7H_{15}$ | Cr 112.0 | H 109.0 | G 115.0 | N 162.0 |
| 27201 | $O_2N$— | —O—$C_8H_{17}$ | Cr 108.0 | G 114.0 | Nre 124.0 | |
| | | | A 154.0 | N 162.0 | | |
| 27202 | $O_2N$— | —O—$C_9H_{19}$ | Cr 112.0 | G 114.0 | Nre 126.0 | |
| | | | A 154.5 | N 161.0 | | |
| 27203 | $O_2N$— | —O—$C_{10}H_{21}$ | Cr 113.0 | A 161.5 | A 161.8 | |
| 27204 | $O_2N$— | —O—$C_{11}H_{23}$ | Cr 113.0 | H 110.0 | A 162.0 | |
| 27205 | $O_2N$— | —O—$C_{12}H_{25}$ | Cr 90.0 | H 108.0 | A 163.0 | |

TABLE 442

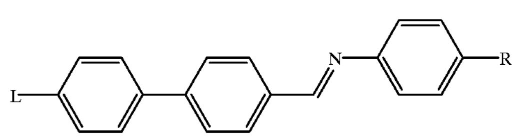

| LCReg | L | R | Phases | | | | |
|---|---|---|---|---|---|---|---|
| 27307 | H— | —$CH_3$ | Cr 142.0 | X <? | | | |
| 27309 | H— | —$C_3H_7$ | (86.0) | Cr 115.2 | E 98.5 | B 115.8 | N 139.2 |
| 27310 | H— | —$C_4H_9$ | (61.0) | Cr 82.0 | E 74.2 | B 120.0 | N 129.8 |
| 27311 | H— | —$C_5H_{11}$ | (59.0) | Cr 79.0 | E 64.5 | B 122.5 | N 139.4 |
| 27312 | H— | —$C_6H_{13}$ | (64.0) | Cr 83.8 | E 65.0 | B 126.5 | N 133.0 |
| 27313 | H— | —$C_7H_{15}$ | (62.0) | Cr 82.0 | E 63.6 | B 127.2 | A 128.0 |
| | | | N 136.1 | | | | |

TABLE 442-continued

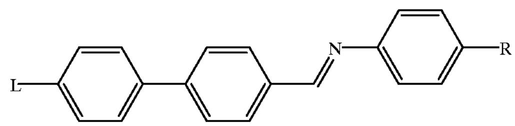

| LCReg | L | R | Phases | | | | |
|---|---|---|---|---|---|---|---|
| 27314 | H— | —$C_8H_{17}$ | (72.0) N 131.5 | Cr 91.0 | E 72.2 | B 126.7 | A 128.8 |
| 27315 | H— | —$C_9H_{19}$ | (74.0) N 131.6 | Cr 88.8 | E 75.0 | B 124.4 | A 129.3 |
| 27316 | H— | —$C_{10}H_{21}$ | (74.0) N 133.4 | Cr 93.4 | E 74.4 | B 126.4 | A 132.6 |
| 27317 | H— | —$C_{12}H_{25}$ | (84.0) | Cr 100.4 | E 83.8 | B 117.6 | A 123.8 |
| 27318 | H— | —$C_{13}H_{27}$ | Cr 100.2 | B 116.7 | A 124.0 | | |
| 27319 | H— | —$C_{15}H_{31}$ | Cr 104.0 | B 112.4 | A 120.0 | | |
| 27320 | H— | —O—$CH_3$ | (165.0) | Cr 185.0 | N 180.0 | | |
| 27321 | H— | —O—$C_2H_5$ | (158.0) | Cr 166.5 | N 191.0 | | |
| 27322 | H— | —O—$C_3H_7$ | (158.0) | Cr 170.0 | N 174.0 | | |

TABLE 443

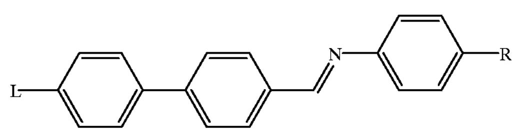

| LCReg | L | R | Phases | | | |
|---|---|---|---|---|---|---|
| 27323 | H— | —O—$C_4H_9$ | (145.0) | Cr 162.0 | B 145.0 | N 179.0 |
| 27324 | H— | —O—$C_5H_{11}$ | (137.0) | Cr 154.0 | B 148.0 | N 171.4 |
| 27325 | H— | —O—$C_6H_{13}$ | (126.0) | Cr 150.0 | B 149.0 | N 172.0 |
| 27326 | H— | —O—$C_7H_{15}$ | (121.0) N 168.0 | Cr 148.0 | B 150.3 | A 152.5 |
| 27327 | H— | —O—$C_8H_{17}$ | (122.0) N 167.0 | Cr 143.5 | B 150.0 | A 156.0 |
| 27328 | H— | —O—$C_9H_{19}$ | (119.0) N 163.0 | Cr 139.0 | B 149.0 | A 157.5 |
| 27329 | H— | —O—$C_{10}H_{21}$ | (117.0) N 162.0 | Cr 138.0 | B 147.0 | A 158.0 |
| 27330 | H— | —O—$C_{12}H_{25}$ | (115.0) | Cr 135.5 | B 144.0 | A 156.0 |
| 27331 | H— | —O—$C_{14}H_{29}$ | (117.0) | Cr 134.0 | B 140.0 | A 153.0 |
| 27357 | H— | —CO—$CH_3$ | Cr 187.5 | X ? | | |
| 69697 | $C_4H_9$— | —CN | Cr ? | B 87.4 | N ? | |

TABLE 444

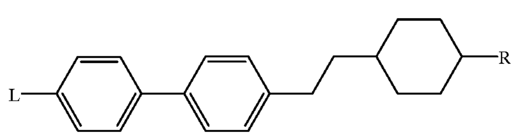

| LCReg | L | R | Phases | | |
|---|---|---|---|---|---|
| 28551 | H— | —$C_3H_7$ | Cr 67.0 | N 82.0 | |
| 28552 | F— | —$C_2H_5$ | Cr 68.0 | N 97.0 | |
| 28553 | F— | —$C_3H_7$ | Cr 76.0 | N 125.0 | |
| 28554 | F— | —$C_4H_9$ | Cr 69.0 | N 113.0 | |
| 28555 | F— | —$C_5H_{11}$ | Cr 82.0 | N 121.0 | |
| 28556 | F— | —$C_6H_{13}$ | Cr 75.0 | N 109.0 | |
| 28557 | F— | —$C_7H_{15}$ | Cr 87.0 | N 119.0 | |
| 28563 | NC— | —$C_3H_7$ | Cr 74.0 | N 188.0 | |
| 28564 | NC— | —$C_4H_9$ | Cr 71.8 | A 74.5 | N 182.2 |

TABLE 444-continued

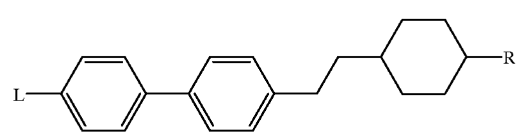

| LCReg | L | R | Phases | | | |
|---|---|---|---|---|---|---|
| 28565 | NC— | —$C_5H_{11}$ | Cr 79.0 | A 86.0 | N 184.0 | |
| 28566 | NC— | —$C_7H_{15}$ | Cr 73.0 | A 153.0 | N 175.0 | |
| 28567 | SCN— | —$C_5H_{11}$ | Cr 95.5 | N 190.0 | | |
| 28569 | $C_5H_{11}$— | —CN | Cr 59.7 | S 68.1 | S 89.0 | N 134.5 |
| 28571 | $C_2H_5$— | —$C_5H_{11}$ | (90.0) | Cr 126.4 | B 126.3 | N 138.9 |
| 28572 | $C_3H_7$— | —$C_2H_5$ | Cr 55.0 | B 51.5 | N 121.5 | |

TABLE 445

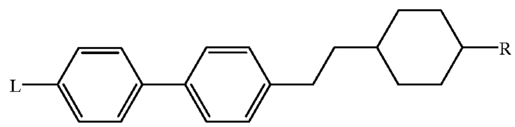

| LCReg | L | R | Phases | | | | |
|---|---|---|---|---|---|---|---|
| 28573 | $C_3H_7$— | —$C_3H_7$ | Cr 67.0 | S 119.0 | N 144.0 | | |
| 28574 | $C_5H_{11}$— | —$C_2H_5$ | Cr 43.5 | S ? | N 141.1 | | |
| 28575 | $C_5H_{11}$— | —$C_3H_7$ | Cr ? | S 43.5 | S 130.0 | A 132.5 | N 141.5 |
| 60670 | $CH_3$—O— | —$C_3H_7$ | Cr 96.0 | N 175.6 | | | |
| 28576 | $C_4H_9$—O— | —$C_3H_7$ | Cr 84.5 | S 139.5 | A 152.5 | N 172.5 | |
| 28577 | $C_8H_{17}$—O— | —$C_7H_{15}$ | Cr 55.0 | B 157.0 | A 163.0 | | |
| 60671 | $CH_3$—S— | —$C_3H_7$ | Cr 92.0 | A 124.0 | N 165.0 | | |
| 28578 | $C_5H_{11}$— | —C:::C—H | Cr 66.0 | S 115.5 | N 126.4 | | |

TABLE 446

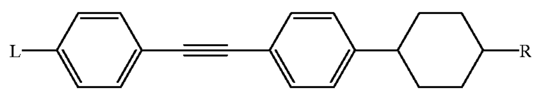

| LCReg | L | R | Phases | | | |
|---|---|---|---|---|---|---|
| 28860 | F— | —$C_3H_7$ | Cr 94.0 | S 83.0 | N 192.2 | |
| 60667 | F— | —$C_4H_9$ | Cr 82.5 | G 96.2 | N 183.9 | |
| 57961 | F— | —$C_5H_{11}$ | Cr 85.8 | G 91.8 | N 187.5 | |
| 60668 | F— | —$C_6H_{13}$ | Cr 74.5 | A 97.6 | N 180.5 | |
| 60669 | F— | —$C_7H_{15}$ | Cr 62.2 | A 89.4 | N 185.7 | |
| 60482 | $C_3H_7$— | —CH═CH═CI | Cr 148.7 | B 161.6 | N 277.3 | |
| 60483 | $C_4H_9$— | —CH═CH═CI | Cr 138.2 | B 183.3 | N 267.0 | |
| 28881 | $CF_3$—O— | —$C_3H_7$ | Cr 88.0 | B 126.0 | A 163.0 | N 198.0 |
| 28882 | $CF_3$—O— | —$C_5H_{11}$ | Cr 50.0 | B 134.0 | A 167.0 | N 189.9 |
| 28883 | H—$CF_2$—O— | —$C_3H_7$ | Cr 87.0 | B 108.0 | A 132.0 | N 212.0 |
| 28884 | H—$CF_2$—O— | —$C_5H_{11}$ | Cr 62.0 | B 123.0 | A 152.0 | N 203.1 |
| 59674 | $H_2C$═CH—$CH_2$— | —$C_3H_7$ | Cr 87.0 | N 188.0 | | |
| 59675 | $H_2C$═CH—$CH_2$— | —$C_4H_9$ | Cr 106.0 | N 180.0 | | |
| 59676 | $H_2C$═CH—$CH_2$— | —$C_5H_{11}$ | Cr 120.0 | N 189.0 | | |

TABLE 447

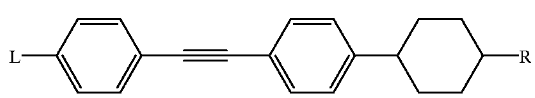

| LCReg | L | R | Phases | | | |
|---|---|---|---|---|---|---|
| 28860 | F— | —$C_3H_7$ | Cr 94.0 | S 83.0 | N 192.2 | |
| 60667 | F— | —$C_4H_9$ | Cr 82.5 | G 96.2 | N 183.9 | |
| 57961 | F— | —$C_5H_{11}$ | Cr 85.8 | G 91.8 | N 187.5 | |
| 60668 | F— | —$C_6H_{13}$ | Cr 74.5 | A 97.6 | N 180.5 | |
| 60669 | F— | —$C_7H_{15}$ | Cr 62.2 | A 89.4 | N 185.7 | |
| 60482 | $C_3H_7$— | —CH═CH═CI | Cr 148.7 | B 161.6 | N 277.3 | |
| 60483 | $C_4H_9$— | —CH═CH═CI | Cr 138.2 | B 183.3 | N 267.0 | |
| 28881 | $CF_3$—O— | —$C_3H_7$ | Cr 88.0 | B 126.0 | A 163.0 | N 198.0 |
| 28882 | $CF_3$—O— | —$C_5H_{11}$ | Cr 50.0 | B 134.0 | A 167.0 | N 189.9 |
| 28883 | H—$CF_2$—O— | —$C_3H_7$ | Cr 87.0 | B 108.0 | A 132.0 | N 212.0 |
| 28884 | H—$CF_2$—O— | —$C_5H_{11}$ | Cr 62.0 | B 123.0 | A 152.0 | N 203.1 |
| 59674 | $H_2C$═CH—$CH_2$— | —$C_3H_7$ | Cr 87.0 | N 188.0 | | |
| 59675 | $H_2C$═CH—$CH_2$— | —$C_4H_9$ | Cr 106.0 | N 180.0 | | |
| 59676 | $H_2C$═CH—$CH_2$— | —$C_5H_{11}$ | Cr 120.0 | N 189.0 | | |

TABLE 448

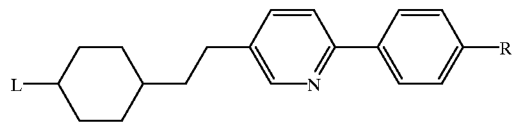

| LCReg | L | R | * | Phases | | |
|---|---|---|---|---|---|---|
| 31279 | $C_5H_{11}$— | —$C_3H_7$ | | Cr 52.0 | B 133.0 | A 150.0 |
| 31280 | $C_3H_7$— | —$C_5H_{11}$ | | Cr 137.5 | S 159.5 | |
| 31281 | $C_3H_7$— | —$C_6H_{13}$ | | Cr 127.0 | S 151.0 | |
| 31282 | $C_4H_9$— | —$C_6H_{13}$ | | Cr 139.5 | S 155.0 | |
| 31283 | $C_4H_9$— | —O—$C_3H_6$—CHMe—$C_8H_{17}$ | 1 | Cr −23.0 | A 120.5 | |

TABLE 449

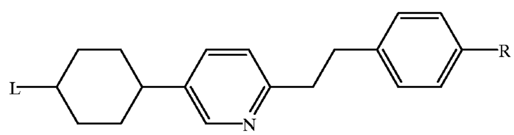

| LCReg | L | R | Phases | | |
|---|---|---|---|---|---|
| 31284 | $C_2H_5$— | —O—$C_4H_9$ | Cr 48.0 | S 61.0 | N 93.0 |
| 31285 | $C_4H_9$— | —O—$C_4H_9$ | Cr 41.0 | S 119.0 | |

TABLE 450

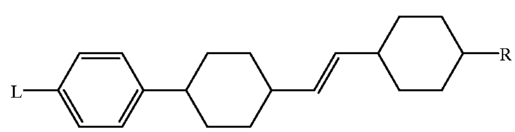

| LCReg | L | R | Phases | | |
|---|---|---|---|---|---|
| 31062 | F— | —$C_3H_7$ | Cr 64.4 | N 167.05 | |
| 31063 | F— | —$C_4H_9$ | Cr 56.4 | S 59.1 | N 163.0 |
| 58205 | F— | —$C_5H_{11}$ | Cr 50.0 | B 64.0 | N 164.0 |
| 31064 | F— | —$C_3H_6$—O—$CH_3$ | Cr 81.0 | N 159.0 | |
| 58204 | NC— | —$C_3H_7$ | Cr 65.0 | N 237.0 | |
| 58199 | $CH_3$— | —$CH_3$ | Cr 77.0 | N 142.0 | |
| 58200 | $CH_3$— | —$C_2H_5$ | Cr 43.0 | B 89.0 | N 157.0 |
| 58202 | $CH_3$— | —$C_3H_7$ | Cr 39.0 | B 90.0 | N 184.0 |
| 58203 | $CH_3$—O— | —$C_3H_7$ | Cr 71.0 | B 104.0 | N 210.0 |
| 58208 | $CH_3$— | —CH═$CH_2$ | Cr 61.0 | B 70.0 | N 174.0 |
| 58211 | $CH_3$— | —CH═CH—$CH_3$ | Cr 78.0 | 226.0 | |
| 58214 | $CH_3$— | —CH═CH—$C_2H_5$ | Cr 62.0 | B 108.0 | N 215.0 |
| 58209 | $C_2H_5$— | —CH═$CH_2$ | Cr 56.0 | B 123.0 | N 159.0 |
| 58212 | $C_2H_5$— | —CH═CH—$CH_3$ | Cr 71.0 | B 113.0 | N 213.0 |
| 58210 | $C_3H_7$— | —CH═$CH_2$ | Cr 30.0 | B 133.0 | N 169.0 |

TABLE 451

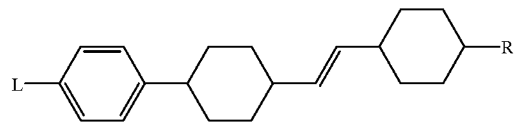

| LCReg | L | R | Phases | | |
|---|---|---|---|---|---|
| 58213 | $C_3H_7$— | —CH═CH—$CH_3$ | Cr 36.0 | B 142.0 | N 215.0 |
| 58216 | $CH_3$—O— | —CH═$CH_2$ | Cr 67.0 | B 93.0 | N 205.0 |
| 58218 | $CH_3$—O— | —CH═CH—$CH_3$ | Cr 85.0 | B 83.0 | N 253.0 |
| 58215 | $CH_3$—O— | —CH═CH—$C_2H_5$ | Cr 75.0 | B 113.0 | N 240.0 |
| 58217 | $C_2H_5$—O— | —CH═$CH_2$ | Cr 51.0 | B 100.0 | N 209.0 |
| 58217 | $C_2H_5$—O— | —CH═CH—$CH_3$ | Cr 77.0 | B 97.0 | N 256.0 |
| 58201 | $CF_3$—O— | —$C_2H_5$ | Cr 39.0 | B 54.0 | N 131.0 |
| 58206 | $CF_3$—O— | —$C_5H_{11}$ | Cr 53.0 | B 75.0 | N 164.0 |
| 58207 | $H_2C$═CH—$C_2H_4$— | —CH═CH—$CH_3$ | Cr 42.0 | B 142.0 | N 220.0 |

TABLE 452

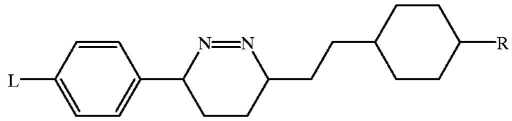

| LCReg | L | R | * | Phases | | | |
|---|---|---|---|---|---|---|---|
| 31325 | $C_3H_7$— | —$C_5H_{11}$ | 2 | Cr 118.0 | B 142.0 | A 180.0 | N 180.0 |

TABLE 453

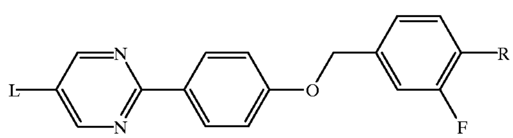

| LCReg | L | R | Phases |
|---|---|---|---|
| 41497 | $C_6H_{13}$— | —O—$C_4H_9$ | (49.0) Cr 90.8 C 88.3 N 108.2 |
| 41498 | $C_7H_{15}$— | —O—$C_4H_9$ | (47.0) Cr 85.3 C 105.1 N 117.1 |
| 41499 | $C_8H_{17}$— | —O—$C_4H_9$ | (40.0) Cr 86.7 C 112.6 N 116.1 |
| 41500 | $C_6H_{13}$— | —O—$C_6H_{13}$ | (65.0) Cr 86.0 C 102.7 N 112.3 |
| 41501 | $C_7H_{15}$— | —O—$C_6H_{13}$ | (47.0) Cr 78.4 C 112.7 N 117.1 |
| 41502 | $C_8H_{17}$≧ | —O—$C_6H_{13}$ | (43.0) Cr 76.7 C 115.0 |
| 41503 | $C_9H_{19}$— | —O—$C_6H_{13}$ | (40.0) Cr 70.2 C 119.2 |
| 41504 | $C_{10}H_{21}$— | —O—$C_6H_{13}$ | (41.0) Cr 70.6 C 117.8 |
| 41505 | $C_{11}H_{23}$— | —O—$C_6H_{13}$ | (33.0) Cr 65.4 C 118.5 |
| 41506 | $C_7H_{15}$—O— | —O—$C_4H_9$ | (75.0) Cr 87.5 C 135.0 N 139.7 |
| 41507 | $C_6H_{13}$—O— | —O—$C_6H_{13}$ | (77.0) Cr 88.0 C 132.8 N 139.0 |
| 41508 | $C_8H_{17}$—O— | —O—$C_6H_{13}$ | (62.0) Cr 75.4 C 140.7 |

TABLE 454

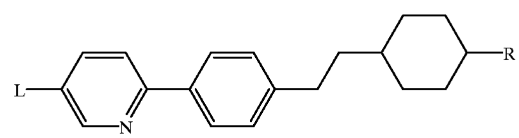

| LCReg | L | R | Phases |
|---|---|---|---|
| 32103 | NC— | —$C_3H_7$ | Cr 96.5 S 163.5 N 176.5 |
| 32104 | NC— | —$C_4H_7$ | Cr 130.5 S 165.0 N 168.0 |
| 32105 | NC— | —$C_5H_{11}$ | Cr 96.0 S 165.0 N 172.0 |
| 32106 | $C_3H_7$— | —$C_3H_7$ | Cr 81.2 N 149.0 |
| 32107 | $C_3H_7$— | —$C_5H_{11}$ | Cr 36.0 G 53.0 B 100.0 N 150.0 |
| 32108 | $C_4H_9$— | —$C_3H_7$ | Cr 87.6 N 142.5 |
| 32109 | $C_5H_{11}$— | —$C_3H_7$ | Cr 93.4 N 156.2 |
| 32110 | $C_5H_{11}$— | —$C_4H_9$ | Cr 102.0 N 137.0 |
| 32111 | $C_5H_{11}$— | —$C_5H_{11}$ | Cr 98.5 S 140.5 N 146.0 |
| 32112 | $C_8H_{17}$— | —$C_4H_9$ | Cr 79.0 S 148.0 N 153.0 |
| 32113 | $C_2H_5$—O— | —$C_3H_7$ | Cr 120.5 S 142.0 N 157.0 |
| 32114 | $C_4H_9$—O— | —$C_3H_7$ | Cr 111.0 S 135.0 N 142.0 |

TABLE 455

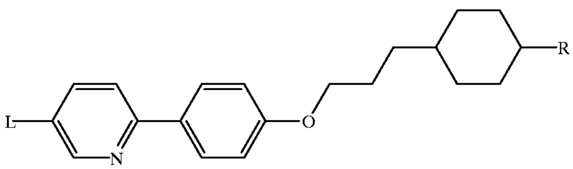

| LCReg | L | R | Phases |
|---|---|---|---|
| 32115 | $C_{10}H_{21}$— | —$C_5H_{11}$ | Cr 57.0 S 71.0 S 122.0 C 136.0 A 139.0 |

TABLE 456

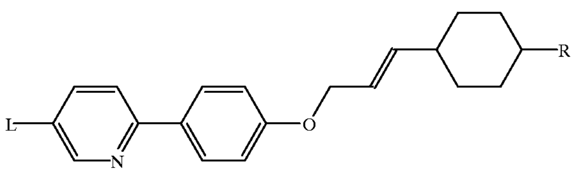

| LCReg | L | R | Phases |
|---|---|---|---|
| 32116 | $C_{10}H_{21}$— | —$C_5H_{11}$ | Cr −35.0 S 128.0 S 130.0 C 145.0 |

TABLE 457

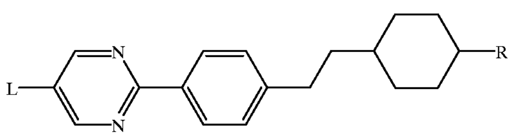

| LCReg | L | R | * | Phases |
|---|---|---|---|---|
| 31525 | $C_3H_7$— | —$C_5H_{11}$ | S | Cr 107.0 N 151.3 |
| 31526 | $C_7H_{15}$— | —$C_3H_7$ | | Cr 101.0 N 143.0 |
| 31527 | $C_7H_{15}$— | —$C_5H_{11}$ | | Cr 92.0 N 140.0 |
| 61413 | $C_7H_{15}$— | —$C_7H_{15}$ | | Cr 86.0 C 70.0 N 137.0 |
| 61414 | $C_{10}H_{21}$— | —$C_3H_7$ | | Cr 88.0 C 92.0 A 105.0 N 131.0 |
| 31528 | $C_{10}H_{21}$— | —$C_5H_{11}$ | | Cr 84.0 C 98.0 A 118.0 N 132.0 |
| 61415 | $C_{10}H_{21}$— | —$C_7H_{15}$ | | Cr 70.0 S 87.0 C 101.0 A 124.0 N 130.0 |
| 31529 | $C_{10}H_{21}$— | —OOC—CHF—$C_4H_9$ | | Cr 32.0 B 108.0 A 126.0 |

TABLE 458

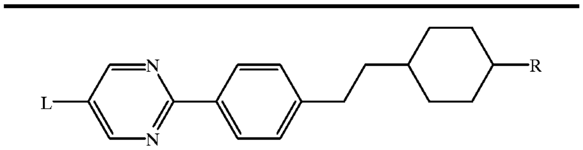

| LCReg | L | R | Phases |
|---|---|---|---|
| 31530 | $C_5H_{11}$— | —$C_5H_{11}$ | Cr 78.0 N 119.0 |
| 31531 | $C_6H_{13}$— | —$C_5H_{11}$ | Cr 79.0 N 113.0 |
| 31532 | $C_7H_{15}$— | —$C_5H_{11}$ | Cr 77.0 N 116.0 |
| 31533 | $C_8H_{17}$— | —$C_5H_{11}$ | Cr 69.0 C 64.0 N 110.0 |
| 31534 | $C_9H_{19}$— | —$C_5H_{11}$ | Cr 74.0 S 62.0 C 82.0 A 97.0 N 113.0 |

TABLE 458-continued

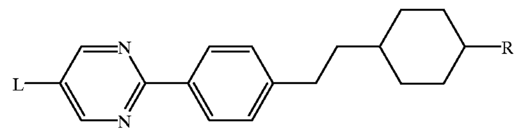

| LCReg | L | R | Phases |
|---|---|---|---|
| 31535 | $C_{10}H_{21}$— | —$C_5H_{11}$ | Cr 66.0 S 71.0 C 86.0 A 102.0 N 109.0 |
| 31536 | $C_{11}H_{23}$— | —$C_5H_{11}$ | Cr 48.0 S 71.0 C 81.0 A 106.0 N 110.0 |

TABLE 459

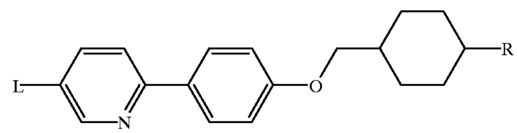

| LCReg | L | R | Phases |
|---|---|---|---|
| 61416 | $C_7H_{15}$— | —$C_3H_7$ | Cr 113.0 N 151.0 |
| 31538 | $C_8H_{17}$— | —$C_3H_7$ | (52.0) Cr 65.0 C 101.7 N 145.2 |
| 31539 | $C_{10}H_{21}$— | —$C_3H_7$ | (63.0) Cr 82.0 S 91.3 C 98.6 N 137.6 |
| 31540 | $C_{12}H_{25}$— | —$C_3H_7$ | (52.0) Cr 87.8 S 61.4 A 116.3 N 135.4. |
| 31541 | $C_6H_{13}$— | —$C_5H_{11}$ | Cr <0.0 S 102.2 N 150.6 |
| 61417 | $C_7H_{15}$— | —$C_5H_{11}$ | Cr 104.0 N 152.0 |
| 31542 | $C_8H_{17}$— | —$C_5H_{11}$ | (20.0) Cr 54.5 S 72.05 S 149.1 A 153.4 |
| 31543 | $C_{10}H_{21}$— | —$C_5H_{11}$ | Cr 42.8 S 89.6 C 116.7 N 140.5 |
| 61418 | $C_7H_{15}$— | —$C_7H_{15}$ | Cr 102.0 C 93.0 N 144.0 |
| 60137 | $C_8H_{17}$— | —$C_7H_{15}$ | Cr 96.0 C 110.0 N 141.0 |
| 61421 | $C_{10}H_{21}$— | —$C_7H_{15}$ | Cr 86.0 C 120.0 N 136.0 |
| 61422 | $C_{10}H_{21}$— | —O—$C_2H_5$ | Cr 95.0 C 98.0 A 111.0 N 130.0 |
| 61424 | $C_9H_{19}$—O— | —$C_3H_7$ | Cr 100.0 C 110.0 N 158.0 |
| 61423 | $C_9H_{19}$—O— | —O—$C_2H_5$ | Cr 88.0 C 118.0 N 154.0 |
| 61425 | $C_8H_{17}$—COO— | —$C_3H_7$ | Cr 125.0 C 114.0 N 169.0 |

TABLE 460

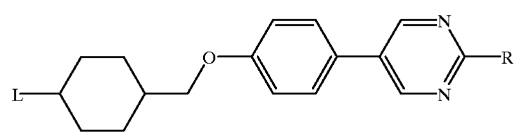

| LCReg | L | R | Phases |
|---|---|---|---|
| 57368 | $C_8H_{17}$— | —O—$C_8H_{17}$ | Cr 99.0 B 140.5 A 162.0 |

TABLE 461

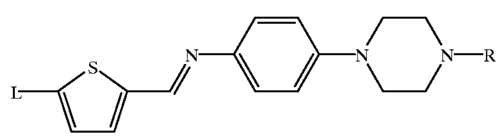

| LCReg | L | R | Phases |
|---|---|---|---|
| 32488 | $C_7H_{15}$— | —$C_3H_7$ | Cr 68.0 E 102.0 B 142.0 N 142.5 |
| 32489 | $C_8H_{17}$— | —$C_5H_{11}$ | Cr 86.0 E 77.5 B 148.0 |

TABLE 462

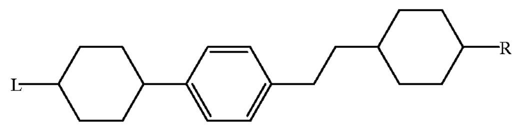

| LCReg | L | R | Phases |
|---|---|---|---|
| 31815 | $C_2H_5$— | —$C_3H_7$ | Cr 58.0 S 78.0 N 105.0 |
| 31816 | $C_3H_7$— | —$C_2H_5$ | Cr 71.0 S 81.0 N 103.0 |
| 31817 | $C_3H_7$— | —$C_3H_7$ | Cr 46.0 S 65.0 S 68.0 S 106.0 N 131.0 |
| 31818 | $C_3H_7$— | —$C_4H_9$ | Cr 24.0 S 114.0 N 128.0 |
| 31819 | $C_3H_7$— | —$C_5H_{11}$ | Cr 40.2 S 126.0 N 132.7 |
| 31820 | $C_4H_9$— | —$C_3H_7$ | Cr 35.0 S 117.0 N 126.0 |
| 31821 | $C_5H_{11}$— | —$C_3H_7$ | Cr 26.0 S 131.0 N 134.0 |
| 31822 | $C_5H_{11}$— | —$C_4H_9$ | Cr 28.0 A 138.0 |
| 31823 | $C_5H_{11}$— | —$C_5H_{11}$ | Cr 23.0 S 135.0 N 136.0 |

TABLE 463

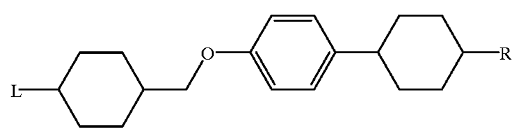

| LCReg | L | R | * | Phases |
|---|---|---|---|---|
| 31825 | $C_3H_7$— | —$C_2H_5$ | | Cr 84.0 S 91.0 N 120.0 |
| 31826 | $C_3H_7$— | —$C_3H_7$ | | Cr 96.5 B 88.5 N 141.5 |
| 31827 | $C_5H_{11}$— | —$C_3H_7$ | | Cr 110.0 B 111.5 N 142.0 |
| 31828 | $C_5H_{11}$— | —$C_5H_{11}$ | | Cr 70.0 B 133.0 N 143.0 |
| 31829 | $C_7H_{15}$— | —$C_3H_7$ | | Cr 121.5 B 123.5 N 136.5 |

TABLE 463-continued

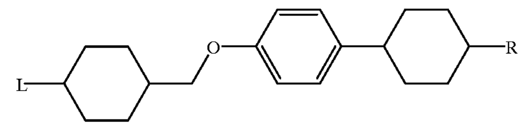

| LCReg | L | R | * | Phases |
|---|---|---|---|---|
| 31831 | $C_4H_9$—CHF —COO— | —OOC—CHF —$C_4H_9$ | 3 | Cr 121.5 B 123.5 N 136.5 Cr <25.0 S 67.0 A 88.9 |

TABLE 464

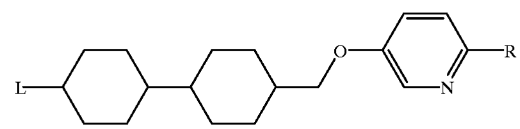

| LCReg | L | R | Phases |
|---|---|---|---|
| 32835 | $C_3H_7$— | —$CH_3$ | Cr 92.0 N 148.0 |
| 32836 | $C_3H_7$— | —$C_5H_{11}$ | Cr 59.0 B 100.0 N 129.2 |

TABLE 465

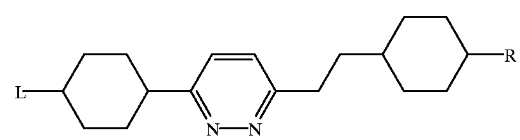

| LCReg | L | R | Phases |
|---|---|---|---|
| 32562 | $C_2H_5$— | —$C_3H_7$ | Cr 127.0 E 136.0 B 147.0 N-127.0 |

TABLE 466

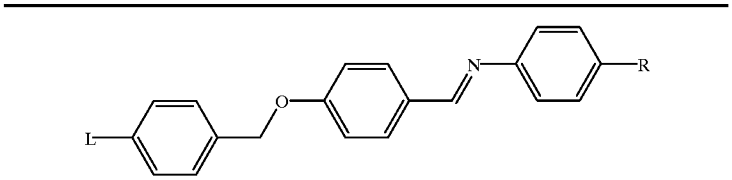

| LCReg | L | R | Phases |
|---|---|---|---|
| 35129 | $O_2N$— | —O—$C_2H_5$ | Cr 151.0 N 213.0 |
| 35130 | $O_2N$— | —O—$C_3H_7$ | Cr 143.0 N 198.0 |
| 35131 | $O_2N$— | —O—$C_4H_9$ | Cr 120.0 N 197.0 |
| 35132 | $O_2N$— | —O—$C_5H_{11}$ | Cr 123.0 N 189.0 |
| 35133 | $O_2N$— | —O—$C_6H_{13}$ | Cr 113.0 H 104.0 C 114.0 N 188.0 |
| 35134 | $O_2N$— | —O—$C_7H_{15}$ | Cr 96.0 H 109.0 C 119.4 N 184.0 |
| 35135 | $O_2N$— | —O—$C_8H_{17}$ | Cr 86.0 H 109.0 C 120.5 N 183.0 |
| 35136 | $O_2N$— | —O—$C_9H_{19}$ | Cr 98.0 H 110.0 C 121.8 N 181.0 |
| 35137 | $O_2N$— | —O—$C_{10}H_{21}$ | Cr 95.0 H 107.0 C 120.0 N 180.0 |
| 35138 | $O_2N$— | —O—$C_{11}H_{23}$ | Cr 105.0 H 95.0 F 105.0 C 118.0 Nre 135.0 A 177.0 N 179.0 |
| 35139 | $O_2N$— | —O—$C_{12}H_{25}$ | Cr 103.0 F 101.0 C 118.0 Nre 121.5 A 178.3 |
| 35140 | $O_2N$— | —O—$C_{13}H_{27}$ | Cr 104.0 F 94.0 C 108.5 A 178.0 |
| 35141 | $O_2N$— | —O—$C_{14}H_{29}$ | Cr 106.0 F 94.0 C 106.5 A 178.0 |
| 63227 | $O_2N$— | —O—$C_6H_{12}$ —CHMe—$C_2H_5$ | Cr 75.0 F* 106.0 C* 125.0 Nre* 150.0 A 160.0 N* 168.0 |
| 35142 | $CH_3$— | —$C_4H_9$ | Cr 131.5 N 147.0 |

TABLE 467

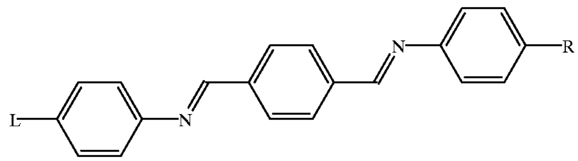

| L | R | Cr | LC |
|---|---|---|---|
| $C_2H_5$— | —$C_2H_5$ | K 127 | S 136 S 149 N 251 I |
| $C_3H_7$— | —$C_3H_7$ | K 109.2 | H 114.5 G 143 C 150.7 A 180.8 N 265 I |
| $C_4H_9$— | —$C_4H_9$ | K 113 | S 74 H 89.2 G 144.5 C 172 A 199 N 235 I |
| $C_5H_{11}$— | —$C_5H_{11}$ | K 72.8 | H 62.8 G 139 F 148.8 C 178.3 A 212 N 233.3 I |
| $C_6H_{13}$— | —$C_6H_{13}$ | K 71.3 | H 64.5 G 141.6 F 152.4 C 186.2 A 207.5 N 215.3 I |
| $C_7H_{15}$— | —$C_7H_{15}$ | K 61.8 | H 48 G 143 F 156.9 C 191.4 A 210 N 211.5 I |
| $C_8H_{17}$— | —$C_8H_{17}$ | K 63.5 | H 46 G 138.5 F 158.8 C 192.5 A 202.5 I |
| $C_9H_{19}$— | —$C_9H_{19}$ | K 57.3 | G 132.5 F 153.5 I 157.5 C 192.7 A 199 I |
| $C_{10}H_{21}$— | —$C_{10}H_{21}$ | K 73 | G 115 F 149 I 156 C 198 A 198 I |
| $C_{12}H_{25}$— | —$C_{12}H_{25}$ | K 80.7 | G 112.0 F 136.9 I 151 C 180.3 I |
| $C_{13}H_{27L}$ — | —$C_{13}H_{27}$ | K 95 | G 115 F 130 I 153 C 176 I |
| $C_{14}H_{29}$— | —$C_{14}H_{29}$ | K 90 | F 120.1 I 144 C 170 I |
| $C_{15}H_{31}$— | —$C_{15}H_{31}$ | K 91 | G 117 I 147 C 170 I |
| $C_{16}H_{33}$— | —$C_{16}H_{33}$ | K 89 | F 133.8 I 138.8 C 160 I |
| $C_2H_2$—OOC —CH═CH— | —CH═CH—COO —$C_2H_5$ | K 180.8 | B 189.7 C 232 A 305 N 7 Z |
| $C_5H_{22}$—OOC —CH═CH— | —CH═CH═COO —$C_5H_{11}$ | K 124.7 | B 133 C 247 A 307 N 314 Z |
| $C_2H_5$OOC —CME═CH— | —CH═CMe —COO—$C_2H_5$ | K 169 | C 241 S 249 N 308 Z |
| $C_4H_9$—O— | —O—$C_4H_9$ | K 191 | C 221 N 285 I |
| $C_6H_{13}$—O— | —O—$C_6H_{13}$ | K 159 | S 176 S 232 S 239 N 262 I |
| $C_8H_{17}$—O— | —O—$C_8H_{17}$ | K 144 | S 172 S 234S 241 N 246 I |
| $C_{12}H_{25}$—O— | —O—$C_{12}H_{25}$ | K 130 | S 162 S 215.0 I |
| $C_2H_5$—S— | —S—$C_2H_5$ | K 175.8 | A 204.5 N 236.2 I |
| $CH_3$—O—$CH_2$ —O— | —O—$CH_2$—O —$CH_3$ | K 136.2 | B 140.9 A 147.1 N 222 I |
| $C_4H_9$—O—$CH_2$ —O— | —O—$CH_2$—O —$C_4H_9$ | K 108.2 | A 118.7 I |
| $C_3H_7$—OOC— | —COO—$C_3H_7$ | K 163 | A 199 N 258 I |
| $C_4H_9$—OOC— | —COO—$C_4H_9$ | K 92 | C 137 A 190 N 209 I |
| $C_5H_{11}$—OOC— | —COO—$C_5H_{11}$ | K 100 | A 208 N 216 I |
| $C_6H_{13}$—OOC— | —COO—$C_6H_{13}$ | K 113 | C 148 A 189 I |
| $C_7H_{15}$—OOC— | —COO—$C_7H_{15}$ | K 92 | C 140 A 196 I |
| CH— | —CH | K 112 | S 146 C 174 A 201 N 238 I |

TABLE 468

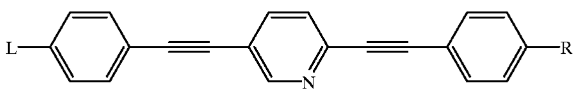

| LCReg | L | R | Phases |
|---|---|---|---|
| 37395 | $C_3H_7$— | —$C_3H_7$ | Cr 139.0 S 144.0 N 237.0 |

TABLE 469

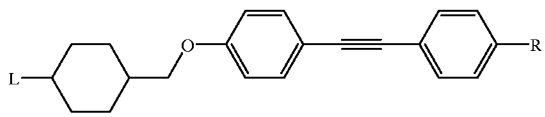

| LCReg | L | R | Phases |
|---|---|---|---|
| 38062 | $C_3H_7$— | —F | Cr 146.1 S 142.1 N 194.3 |
| 38063 | $C_4H_9$— | —Cl | Cr 144.6 S 184.8 N 216.8 |
| 38064 | $C_2H_5$— | —$C_2H_5$ | Cr 120.3 N 163.7 |
| 38065 | $C_2H_5$— | —$C_3H_7$ | Cr 153.6 S 155.8 N 196.1 |
| 38066 | $C_3H_7$— | —$C_3H_7$ | Cr 148.2 S 179.4 N 210.3 |
| 38067 | $C_4H_9$— | —$C_2H_5$ | Cr 136.8 S 178.7 N 203.0 |
| 38068 | $C_4H_9$— | —$C_3H_7$ | Cr 150.9 S 167.5 N 198.0 |

TABLE 470

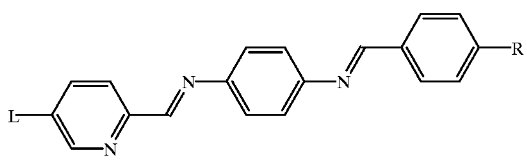

| LCReg | L | R | Phases |
|---|---|---|---|
| 39945 | $C_2H_5$—O— | —O—$C_2H_5$ | CrX 181.8 CrX 185.9 Cr 188.4 N ? |
| 39946 | $C_4H_9$—O— | —O—$C_4H_9$ | Cr 153.3 N 278.9 |
| 39947 | $C_6H_{13}$—O— | —O—$C_6H_{13}$ | Cr 122.4 B 132.6 N 243.0 |
| 39948 | $C_8H_{17}$—O— | —O—$C_8H_{17}$ | Cr 61.2 H 100.2 G 121.2 C 158.4 N 223.0 |
| 39949 | $C_{10}H_{21}$—O— | —O—$C_{10}H_{21}$ | CrX 62.8 cr 89.9 H 87.2 G 95.5 C 173.4 N 202.1 |

TABLE 471

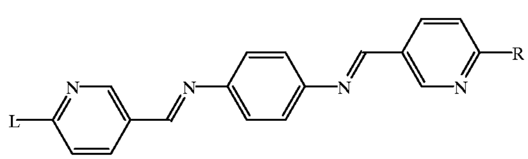

| LCReg | L | R | Phases |
|---|---|---|---|
| 39953 | $C_2H_5$—O— | —O—$C_2H_5$ | Cr 156.8 A 219.4 N 272.9 |
| 39954 | $C_4H_9$—O— | —O—$C_4H_9$ | CrX 122.2 Cr 132.1 B 125.5 A 232.4 N 236.2 |
| 39955 | $C_6H_{13}$—O— | —O—$C_6H_{13}$ | CrX 97.1 Cr 99.6 B 116.5 C 171.0 A 214.0 |

TABLE 471-continued

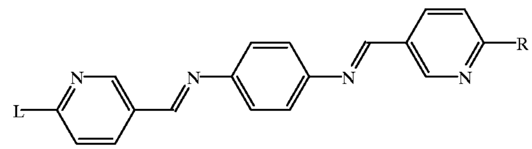

| LCReg | L | R | Phases |
|---|---|---|---|
| 39956 | $C_8H_{17}$—O— | —O—$C_8H_{17}$ | CrX 62.0 Cr 98.3 B 114.5 C 184.0 A 195.8 |
| 39957 | $C_{10}H_{21}$—O— | —O—$C_{10}H_{21}$ | Cr 105.0 B 112.7 C 176.7 A 180.7 |

TABLE 472

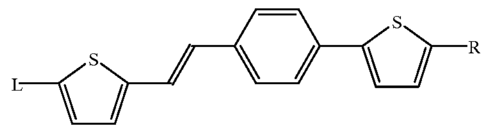

| LCReg | L | R | Phases |
|---|---|---|---|
| 39962 | $C_4H_9$— | —$C_4H_9$ | Cr 91.0 B 180.0 |
| 39963 | $C_8H_{17}$— | —$C_8H_{17}$ | Cr 95.0 B 173.0 |

TABLE 473

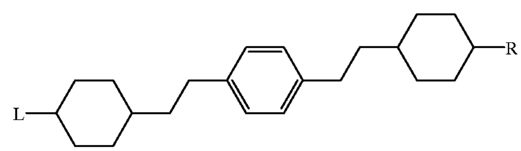

| LCReg | L | R | Phases |
|---|---|---|---|
| 67304 | $C_3H_7$— | —$C_3H_7$ | Cr 64.0 S 102.5 B 103.8 N 115.0 |
| 39743 | $C_4H_9$— | —$C_5H_{11}$ | Cr 21.6 S 125.8 |

TABLE 474

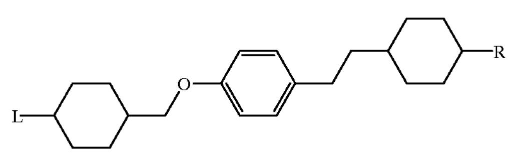

| LCReg | L | R | Phases |
|---|---|---|---|
| 39744 | $C_3H_7$— | —$C_3H_7$ | Cr 97.0 N 124.0 |
| 39745 | $C_3H_7$— | —$C_7H_{15}$ | Cr 65.0 B 118.5 N 123.0 |
| 39746 | $C_5H_{11}$— | —$C_3H_7$ | Cr 81.5 B 105.0 N 125.5 |

TABLE 475

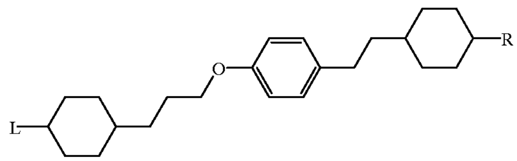

| LCReg | L | R | Phsaes |
|---|---|---|---|
| 39747 | $C_5H_{11}$— | —$C_5H_{11}$ | Cr 86.0 B 109.0 N 117.0 |

TABLE 476

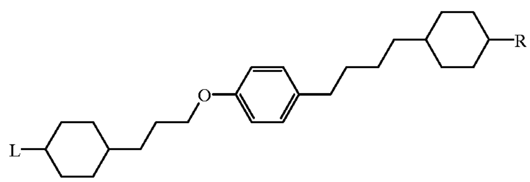

| LCReg | L | R | Phases |
|---|---|---|---|
| 39749 | $C_5H_{11}$— | —$C_5H_{11}$ | Cr 52.0 B 94.0 |

TABLE 477

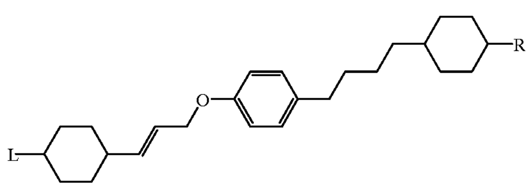

| LCReg | L | R | Phases |
|---|---|---|---|
| 39750 | $C_5H_{11}$— | —$C_5H_{11}$ | Cr 77.0 S 94.0 B 99.0 N 107.0 |

TABLE 478

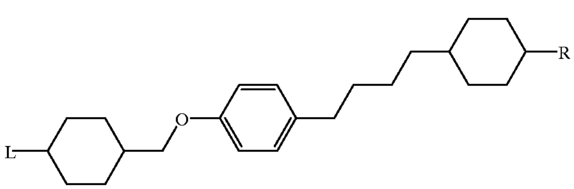

| LCReg | L | R | Phases |
|---|---|---|---|
| 39748 | $C_5H_{11}$— | —$C_5H_{11}$ | Cr 42.0 B 108.0 |

TABLE 479

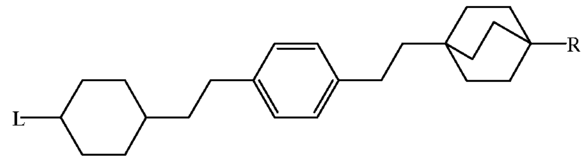

| LCReg | L | R | Phases |
|---|---|---|---|
| 67305 | $C_3H_7$— | —$C_6H_{13}$ | Cr 66.3 B 155.3 N 161.0 |

TABLE 480

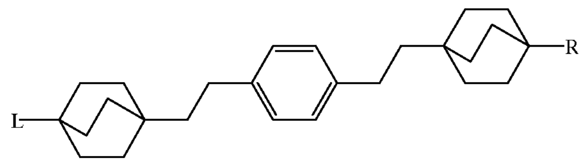

| LCReg | L | R | Phases |
|---|---|---|---|
| 67306 | $C_2H_5$— | —$C_6H_{13}$ | Cr 62.7 S 117.9 B 155.9 N 179.7 |

TABLE 481

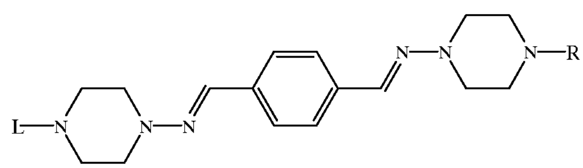

| LCReg | L | R | Phases |
|---|---|---|---|
| 39980 | $CH_3$— | —$CH_3$ | Cr 159.5 N 211.3 |
| 39981 | $C_3H_7$— | —$C_3H_7$ | Cr 188.5 N 206.1 |
| 39982 | $C_4H_9$— | —$C_4H_9$ | Cr 171.3 B 167.3 N 195.6 |
| 39983 | $C_5H_{11}$— | —$C_5H_{11}$ | Cr 50.5 S 151.1 A 174.1 N 197.6 |
| 39984 | $C_6H_{13}$— | —$C_{6H13}$ | Cr 114.2 S 173.0 B 182.8 N 186.1 |

TABLE 482

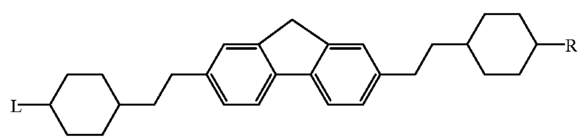

| LCReg | L | R | Phases |
|---|---|---|---|
| 40155 | $C_3H_7$— | —$C_3H_7$ | (163.0) Cr 179.7 A 209.0 N 225.0 |
| 40156 | $C_3H_7$— | —$C_5H_{11}$ | (118.0) Cr 140.0 E 172.6 A 217.9 N 221.7 |
| 40157 | $C_5H_{11}$— | —$C_5H_{11}$ | (129.0) Cr 147.8 E 188.2 A 222.6 |

TABLE 483

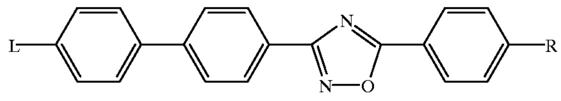

| LCReg | L | R | Phases |
|---|---|---|---|
| 60991 | $C_7H_{15}$—O— | —F | Cr 103.0 S 185.0 N 220.0 |
| 60990 | $C_7H_{15}$—O— | —Br | Cr 127.0 S 212.0 N 234.0 |
| 60980 | $C_5H_{11}$— | —$C_5H_{11}$ | Cr 53.0 S 110.0 N 155.0 |
| 60981 | $C_7H_{15}$—O— | —$C_5H_{11}$ | Cr 101.0 S 103.5 N 187.0 |
| 60982 | $C_7H_{15}$—O— | —$C_7H_{15}$ | Cr 98.0 S 101.0 N 182.0 |
| 60989 | $C_7H_{15}$—O— | —O—$C_4H_9$ | Cr 105.0 N 215.0 |

TABLE 484

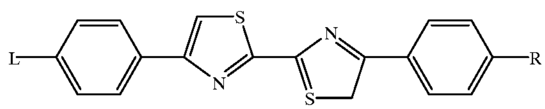

| LCReg | L | R | Phases |
|---|---|---|---|
| 47932 | $C_3H_7$— | —$C_3H_7$ | Cr 185.0 N 224.0 |
| 47933 | $C_4H_9$— | —$C_4H_9$ | Cr 168.0 A 162.0 N 204.0 |
| 47934 | $C_5H_{11}$— | —$C_5H_{11}$ | Cr 142.0 A 186.0 N 206.0 |
| 47935 | $C_6H_{13}$— | —$C_6H_{13}$ | Cr 138.0 A 190.0 |
| 47935 | $C_6H_{13}$—O— | —O—$C_6H_{13}$ | Cr 107.0 A 180.0 N 197.0 |

TABLE 485

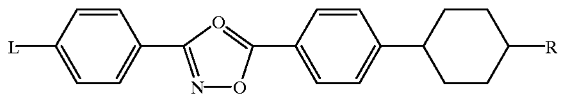

| LCReg | L | R | Phases |
|---|---|---|---|
| 60995 | $O_2N$— | —$C_3H_7$ | Cr 122.0 S 125.0 N 258.0 |
| 60996 | $O_2N$— | —$C_4H_9$ | Cr 129.0 S 153.0 N 244.0 |
| 60997 | $O_2N$— | —$C_5H_{11}$ | Cr 121.0 S 176.0 N 247.0 |
| 61002 | $C_5H_{11}$— | —$C_5H_{11}$ | Cr 68.0 S 163.0 N 194.0 |
| 61003 | $C_7H_{15}$—O— | —$C_5$—$H_{11}$ | Cr 41.0 S 169.5 N 178.5 |

TABLE 486

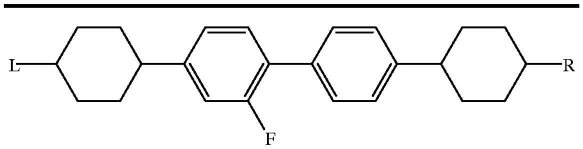

| LCReg | L | R | Phases |
|---|---|---|---|
| 48004 | $C_5H_{11}$— | —$C_3H_7$ | Cr ? 68.0 B 154.0 N 283.0 |
| 48005 | $C_5H_{11}$— | —$C_5H_{11}$ | Cr 80.0 S 156.0 S 181.0 N 278.0 |

TABLE 487

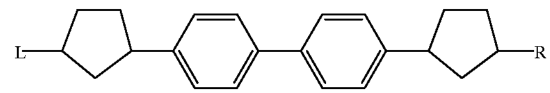

| LCReg | L | R | * | Phases |
|---|---|---|---|---|
| 48055 | $C_5H_{11}$— | —$C_5H_{11}$ | 7 | Cr 20.0 S 30.0 A 73.0 |

TABLE 488

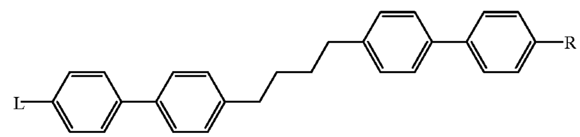

| LCReg | L | R | Phases |
|---|---|---|---|
| 48101 | $C_2H_5$— | —$C_2H_5$ | (152.0) Cr 181.5 B 174.1 |
| 48102 | $C_4H_9$— | —$C_4H_9$ | Cr 130.6 B 190.7 |

TABLE 489

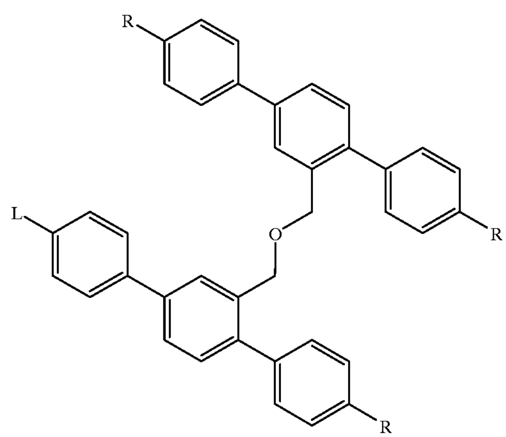

| LCReg | L | R | Phases |
|---|---|---|---|
| 69987 | $C_{10}H_{21}$—O— | —O—$C_{10}H_{21}$ | Cr 99.0 C 128.0 A 168.0 |

TABLE 490

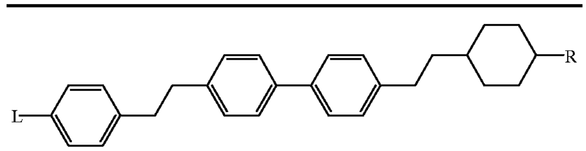

| LCReg | L | R | Phases |
|---|---|---|---|
| 48978 | $C_5H_{11}$— | —$C_3H_7$ | Cr ? J 120.0 B 195.5 A 199.8 |

TABLE 491

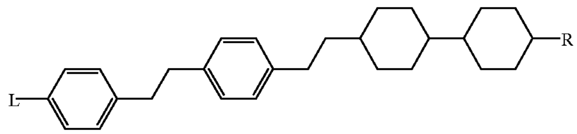

| LCReg | L | R | Phases |
|---|---|---|---|
| 49072 | F— | $—C_3H_7$ | Cr 68.0 S 148.0 N 194.0 |

TABLE 492

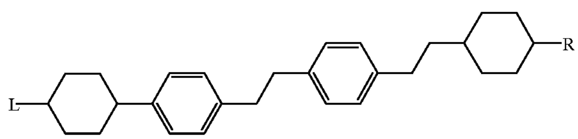

| LCReg | L | R | Phases |
|---|---|---|---|
| 49408 | $C_3H_7—$ | $—C_4H_9$ | Cr 68.9 S 117.5 S 171.5 N 187.3 |
| 49409 | $C_5H_{11}—$ | $—C_4H_9$ | Cr 33.0 A 188.0 |

TABLE 493

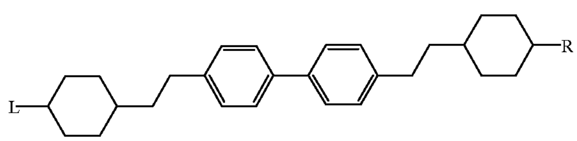

| LCReg | L | R | Phases |
|---|---|---|---|
| 67713 | $C_3H_7—$ | $—C_3H_7$ | Cr 66.0 S 122.0 S 150.5 B 174.0 A 197.5 N 231.0 |
| 65697 | $C_3H_7—$ | $—C_4H_9$ | Cr <20.0 S 102.5 S 151.8 B 184.4 A 208.2 N 229.0 |
| 67714 | $C_3H_7—$ | $—C_5H_{11}$ | Cr 76.0 S 63.5 S 148.0 B 190.5 A 215.0 N 228.0 |
| 49418 | $C_3H_7—$ | $—C_7H_{15}$ | Cr 30.0 J 142.0 B 195.6 A 213.1 N 218.3 |
| 67715 | $C_4H_9—$ | $—C_5H_{11}$ | Cr 68.0 S 73.0 S 158.0 B 197.0 A 219.0 N 225.0 |
| 49419 | $C_5H_{11}—$ | $—C_5H_{11}$ | CrX 68.0 Cr 81.6 J 156.8 B 202.2 A 224.5 |

TABLE 494

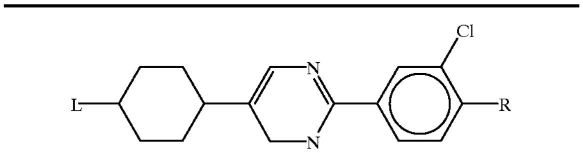

| No | L | R | Cr | LC |
|---|---|---|---|---|
| 28896 | C5H11— | —C3H11 | K 33.4 | S 121.21 |

TABLE 495

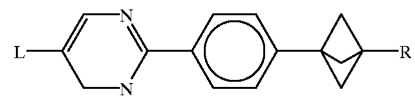

| No | L | R | Cr | LC |
|---|---|---|---|---|
| 28548 | $C_8H_{17}—O—$ | $—C_8H_{17}$ | K 51 | C 63 A 113 N 1211 |

TABLE 496

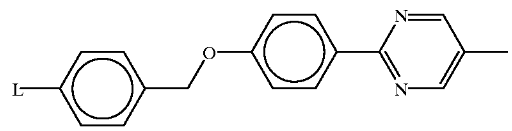

| No | L | R | Cr | LC |
|---|---|---|---|---|
| 33521 | $C_5H_{11}—$ | $—C_6H_{13}$ | K 72 | S 65 N 104.1 |
| 33522 | $C_5H_{11}—$ | $—C_7H_{15}$ | K 76 | S 86 N 109.1 |
| 33523 | $C_5H_{11}—$ | $—C_9H_{19}$ | K 52 | S 107 N 113.1 |
| 33524 | $C_6H_{13}—$ | $—C_6H_{13}$ | K 61 | S 76 N 100.81 |
| 33525 | $C_6H_{13}—$ | $—C_7H_{15}$ | K 48 | S 92 N 107.1 |
| 33526 | $C_6H_{13}—$ | $—C_9H_{19}$ | K 66 | S 109 N 110.1 |
| 33527 | $C_8H_{17}—$ | $—C_8H_{17}$ | K 73 | F 66 C 103.51 |

TABLE 497

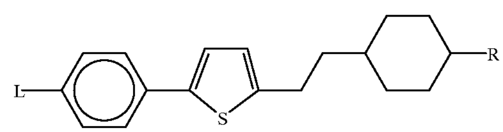

| No | L | R | Cr | LC |
|---|---|---|---|---|
| 38004 | $C_5H_{11}—$ | $—C_5H_{11}$ | K 21.5 | B 88.4 A 96.71 |
| 36005 | $C_6H_{13}—$ | $—C_5H_{11}$ | K 22.5 | B 94.7 A 92.21 |
| 36006 | $C_7H_{15}—$ | $—C_5H_{11}$ | K 20.5 | B 96.2 A 99.81 |
| 36007 | $C_8H_{17}—$ | $—C_5H_{11}$ | K 21 | B 96.8 A 99.11 |
| 36008 | $C_9H_{19}—$ | $—C_5H_{11}$ | K 23.7 | B 97.2 A 100.11 |
| 36009 | $C_{10}H_{21}—$ | $—C_5H_{11}$ | K 55 | B 98.41 |

TABLE 498

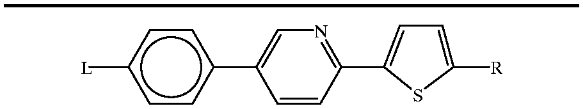

| No. | L | R | Cr | | LC |
|---|---|---|---|---|---|
| 27648 | $C_4H_9—O—$ | —H | K 128 | S | 150.1 |
| 27649 | $C_6H_{13}—$ | $—C_2H_5$ | K 58 | S | 155.1 |
| 27650 | $C_4H_9—O—$ | $—C_2H_5$ | K 102 | S | 180.1 |
| 27651 | $C_4H_9—O—$ | $—C_5H_{11}$ | K 61 | S | 176.1 |

TABLE 499

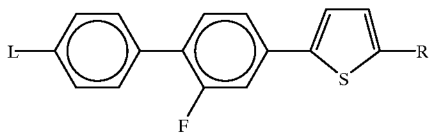

| No | L | R | Cr | LC |
|---|---|---|---|---|
| 27643 | $C_5H_{11}$— | —$C_5H_{11}$ | K 42.4 | C 47.9 A 62 N 97.81 |
| 27644 | $C_5H_{11}$— | —CO—$C_4H_9$ | K 74.9 | A 186.81 |

TABLE 500

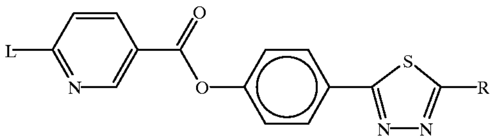

| No | L | R | Cr | LC |
|---|---|---|---|---|
| 36949 | $C_3H_7$—O— | —$C_7H_{15}$ | K 94 | C 136 A 144 N 153.1 |
| 36950 | $C_4H_9$—O— | —$C_7H_{15}$ | K 68 | C 144 A 147 N 154.1 |
| 36951 | $C_4H_9$—O— | —$C_{11}H_{23}$ | K 90 | C 145 A 155.1 |
| 36952 | $C_6H_{13}$—O— | —$C_7H_{15}$ | K 68 | C 103 A 171.1 |

TABLE 501

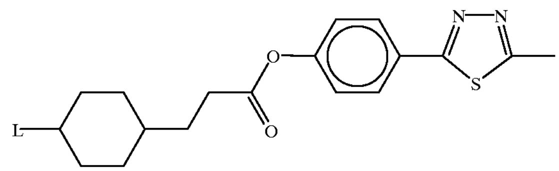

| No | L | R | Cr | LC |
|---|---|---|---|---|
| 37296 | $C_2H_5$— | —$C_9H_{19}$ | K 76 | G 94 C 117 A 124.1 |
| 37297 | $C_3H_7$— | —$C_9H_{19}$ | K 83 | G 105 C 112 A 130.1 |
| 37298 | $C_4H_9$— | —$C_9H_{19}$ | K 72 | G 110 C 119 A 142.1 |

TABLE 502

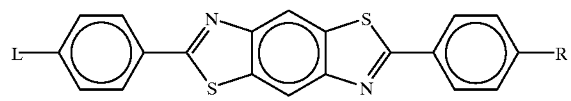

| No | L | R | Cr | LC |
|---|---|---|---|---|
| 26651 | $C_8H_{17}$—O— | —O—$C_8H_{17}$ | K ? | G 259 C 339.5 N 344.1 |
| 26652 | $C_{12}H_{25}$—O— | —O—$C_{12}H_{25}$ | K ? | H 235 C 308.1 |
| 26653 | $C_{16}H_{33}$—O— | —O—$C_{16}H_{33}$ | K ? | H 229 F 272 C 290.1 |

TABLE 503

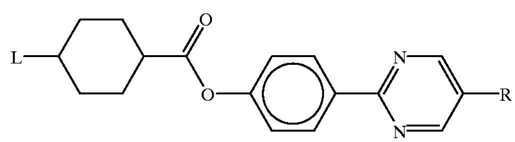

| No. | L | R | | Cr | LC |
|---|---|---|---|---|---|
| 37078 | $(Me)_2C$=CH—$C_2H_4$— | —$C_{10}H_{21}$ | 2 | K 40 | C 83 N 106.1 |
| 37079 | $(Me)_2C$=CH—$C_2H_4$— | —O—$C_{10}H_{21}$ | 2 | K 82 | C 112 N 138.1 |
| 37080 | $CH_3$— | —$C_{10}H_{21}$ | 2 | K 50 | S 54 C 68 N 107.1 |

TABLE 504

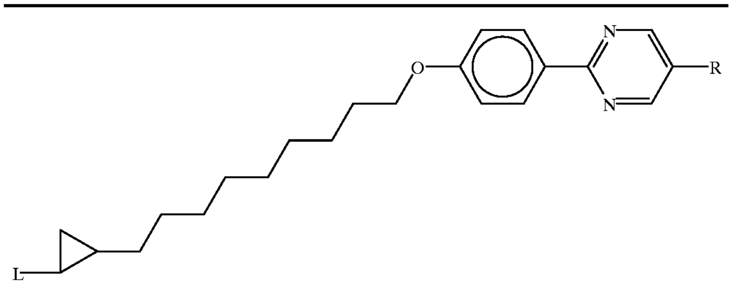

| No | L | R | Cr | LC |
|---|---|---|---|---|
| 37109 | H— | —$C_6H_{13}$ | K 44 | N 53 W |
| 37110 | H— | —$C_8H_{17}$ | K 41.3 | C 51 A 57.6 N 60.2 W |

TABLE 504-continued

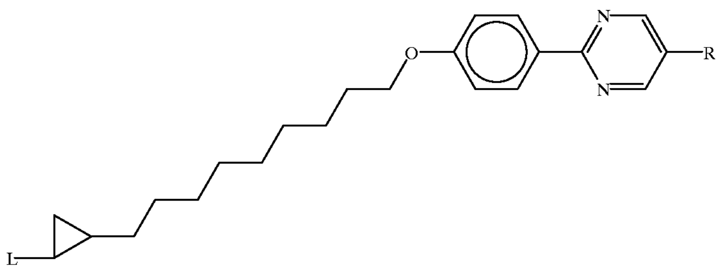

| No | L | R | | Cr | LC |
|---|---|---|---|---|---|
| 37111 | H— | —$C_9H_{19}$ | | K 52.8 | C 56.8 A 67.2 W |
| 37112 | H— | —$C_{10}H_{21}$ | | K 44 | C 64.9 A 67.7 W |
| 37113 | H— | —$C_{11}H_{23}$ | | K 48 | C 70.2 A 71.8 W |
| 37114 | H— | —$C_{12}H_{25}$ | | K 52 | C 72.3 W |
| 37115 | H— | —O—$C_7H_{15}$ | | K 56.4 | C 71.3 A 83.4 N 85.1 W |
| 37116 | H— | —O—$C_8H_{17}$ | | K 69.2 | C 75.8 A 90.2 W |
| 37117 | H— | —O—$C_{11}H_{23}$ | | K 68 | C 95 W |
| 37118 | $C_2H_5$—OOC— | —$C_8H_{17}$ | 1 | K 38 | C 361 |

TABLE 505

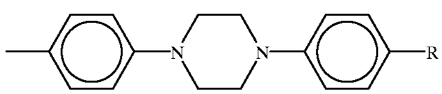

| No | L | R | Cr | LC |
|---|---|---|---|---|
| 26206 | $C_3H_7$— | —$C_3H_7$ | K 90 | P 120 P 1901 |
| 26207 | $C_4H_9$— | —$C_4H_9$ | K 57 | P 119 P 1901 |
| 26208 | $C_5H_{11}$— | —$C_5H_{11}$ | K 41 | P 114 P 1901 |
| 26209 | $C_6H_{13}$— | —$C_6H_{13}$ | K 55 | P 1841 |
| 26210 | $C_7H_{15}$— | —$C_7H_{15}$ | K 28 | P 1801 |
| 26211 | $C_8H_{17}$— | —$C_8H_{17}$ | K 39 | P 1731 |
| 26212 | $C_9H_{19}$— | —$C_9H_{19}$ | K 45 | P 1651 |
| 26213 | $C_{10}H_{21}$— | —$C_{10}H_{21}$ | K 62 | P 1601 |
| 26217 | $C_2H_5$— | —O—$C_2H_5$ | K 166 | S 1821 |
| 26221 | $C_3H_7$—O— | —O—$C_3H_7$ | K 210 | P 2151 |
| 26222 | $C_4H_9$—O— | —O—$C_4H_9$ | K 197 | P 2271 |
| 26223 | $C_5H_{11}$—O— | —O—$C_5H_{11}$ | K 185 | P 2181 |
| 26224 | $C_6H_{13}$—O— | —O—$C_6H_{13}$ | K 172 | P 2181 |
| 26225 | $C_7H_{15}$—O— | —O—$C_7H_{15}$ | K 165 | P 2091 |
| 26226 | $C_8H_{17}$—O— | —O—$C_8H_{17}$ | K 163 | P 2031 |
| 26227 | $C_9H_{19}$—O— | —O—$C_9H_{19}$ | K 162 | P 1941 |

TABLE 505-continued

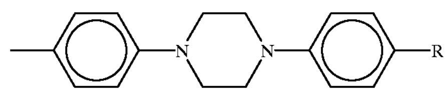

| No | L | R | Cr | LC |
|---|---|---|---|---|
| 26228 | $C_{10}H_{21}$—O— | —O—$C_{10}H_{21}$ | K 161 | P 1891 |
| 26230 | $CH_3$—O— | —OOC—$C_2H_5$ | K 148 | S 155 N 1931 |

TABLE 506

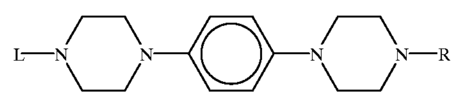

| No | L | R | Cr | LC |
|---|---|---|---|---|
| 28692 | $C_3H_7$— | —$C_3H_7$ | K 163.3 | B 171.51 |
| 28693 | $C_4H_9$— | —$C_4H_9$ | K 36.3 | E 106.9 S 113.4 B 179.51 |
| 28694 | $C_5H_{11}$— | —$C_5H_{11}$ | K 50 | B 155.9 U |
| 28695 | $C_6H_{13}$— | —$C_6H_{13}$ | K 30 | E 76.7 S 107.9 B 182.81 |
| 28696 | $C_7H_{15}$— | —$C_7H_{15}$ | K 27.7 | E 82 S 100.4 B 175.51 |
| 28697 | $C_8H_{17}$— | —$C_8H_{17}$ | K 58.1 | E 64.5 S 93.4 B 178.31 |
| 28698 | $C_9H_{19}$— | —$C_9H_{19}$ | K 52.6 | E 75.3 S 87.3 B 174.11 |

TABLE 507

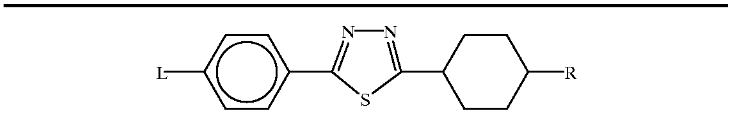

| No | L | R | Cr | LC |
|---|---|---|---|---|
| 27803 | NC— | —$C_6H_{13}$ | K 128 | A 169 N 1991 |
| 27804 | $C_4H_9$— | —$C_3H_7$ | K 76 | A 96 N 1501 |
| 27805 | $C_4H_9$— | —$C_4H_9$ | K 71 | A 120 N 1461 |
| 27806 | $C_4H_9$— | —$C_5H_{11}$ | K 52 | A 115 N 1361 |
| 27807 | $C_4H_9$— | —$C_6H_{13}$ | K 58 | A 117 N 1511 |

TABLE 507-continued

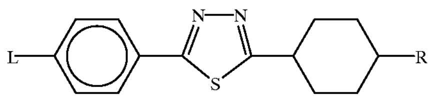

| No | L | R | | Cr | LC |
|---|---|---|---|---|---|
| 27808 | $C_6H_{13}$— | —$C_2H_5$ | | K 50 | A 77 N 1151 |
| 27809 | $C_6H_{13}$— | —$C_3H_7$ | | K 61 | A 126 N 1461 |
| 27810 | $C_6H_{13}$— | —$C_4H_9$ | | K 47 | A 133 N 1391 |
| 27811 | $C_6H_{13}$— | —$C_5H_{11}$ | | K 50 | A 146 N 1501 |
| 27812 | $C_6H_{13}$— | —$C_6H_{13}$ | | K 50 | A 1451 |
| 27815 | $C_9H_{19}$—O— | —$C_4H_9$ | | K 111 | A 166 N 1671 |
| 27816 | $C_9H_{19}$—O— | —$C_6H_{13}$ | | K 108 | C 130 A 1691 |
| 27817 | $C_{10}H_{21}$—O— | —$C_6H_{13}$ | | K 105 | C 122 N 1651 |
| 27818 | $C_{10}H_{21}$—O— | —$C_7H_{15}$ | | K 87 | C 143 A 1691 |
| 27819 | $C_{12}H_{25}$—O— | —$C_6H_{13}$ | | K 58 | C 136 A 1461 |
| 27820 | $C_4H_9$—$CMe_2$—$C_4H_9$—O— | —$C_6H_{13}$ | | K 93 | C 101 A 111 N 1121 |
| 27821 | $C_4H_9$—$CMe_2$—$C_6H_{13}$—O— | —$C_6H_{13}$ | | K 90 | C 117 A 129 N 1291 |
| 27823 | $C_6H_{13}$—O—CHMe—COO— | —$C_2H_5$ | 1 | K 75 | A 611 |
| 27824 | $H_2C/CH_2/CH$—$C_{11}H_{22}$—O— | —$C_5H_{11}$ | | K 111 | C 113 A 156 N 1571 |

TABLE 508

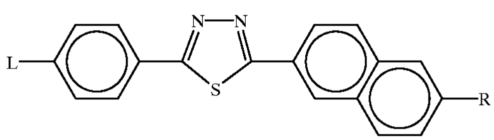

| No | L | R | Cr | LC |
|---|---|---|---|---|
| 28262 | $C_6H_{13}$— | —O—$C_4H_9$ | K 79.5 | C 155.1 N 230.71 |
| 28263 | $C_{10}$—$H_{21}$— | —O—$C_{10}H_{21}$ | K 80.3 | C 198.21 |
| 28265 | $C_6H_{13}$— | —OOC—$C_6H_{13}$ | K 82.3 | C 199.4 N 225.21 |

TABLE 509

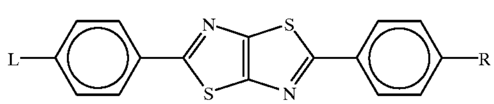

| No | L | R | Cr | LC |
|---|---|---|---|---|
| 26625 | Cl— | —Cl | K 296 | C 258 N 3131 |
| 26628 | $C_4H_9$— | —$C_4H_9$ | K 145 | C 165 N 2441 |
| 26629 | $C_6H_{13}$— | —$C_6H_{13}$ | K 142 | E 135 C 194 N 2251 |
| 26633 | $C_4H_9$—O— | —O—$C_4H_9$ | K 197.7 | C 210.6 N 294.21 |
| 26634 | $C_5H_{11}$—O— | —O—$C_5H_{11}$ | K 179.8 | 1224.1 C 270.71 |
| 26635 | $C_6H_{13}$—O— | —O—$C_6H_{13}$ | K 167.4 | 1232.6 C 262.71 |
| 26636 | $C_7H_{15}$—O— | —O—$C_7H_{15}$ | K 160.7 | 1236.1 C 250.31 |
| 26637 | $C_8H_{17}$—O— | —O—$C_8H_{17}$ | K 153.1 | 1237.1 C 2441 |
| 26638 | $C_9H_{19}$—O— | —O—$C_9H_{19}$ | K 147.6 | 1233.71 |
| 26639 | $C_{10}H_{21}$—O— | —O—$C_{10}H_{21}$ | K 140.6 | 1233.71 |
| 26640 | $C_{12}H_{25}$—O— | —O—$C_{12}H_{25}$ | K 129 | 1221.11 |

TABLE 510

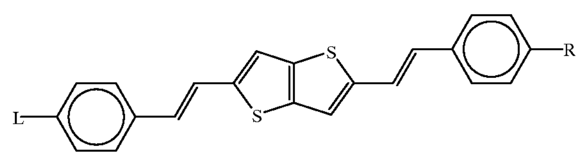

| No | L | R | Cr | LC |
|---|---|---|---|---|
| 43323 | $C_4H_9$— | —$C_4H_9$ | K 319 | S 340 A ? Z |

TABLE 511

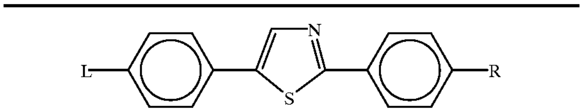

| No. | | | | LC |
|---|---|---|---|---|
| 25843 | $C_6H_{13}$—COO— | —$C_6H_{13}$ | K 73.1 | S 83.2 C 139.3 N 148.71 |
| 25844 | $C_8H_{17}$—COO— | —$C_6H_{13}$ | K 58 | S 75.8 C 146.4 N 148.11 |
| 25845 | $C_8H_{17}$—COO— | —$C_8H_{17}$ | K 59.4 | S 74.5 S 78.5 C 148.51 |
| 25846 | $C_{10}H_{21}$—COO— | —$C_6H_{13}$ | K 74.9 | S 86.2 C 1471 |

TABLE 512

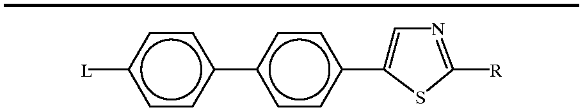

| No | L | R | Cr | LC |
|---|---|---|---|---|
| 26979 | $C_6H_{13}$— | —$C_9H_{19}$ | K 134.2 | S 166.3 S 167.31 |

TABLE 513

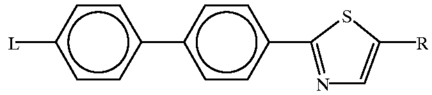

| No | L | R | Cr | LC |
|---|---|---|---|---|
| 26980 | $C_4H_9$— | —$C_7H_{15}$ | K 76 | S 130 N 137I |

TABLE 514

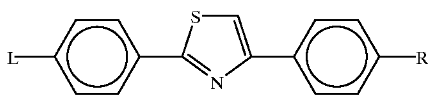

| No | L | R | Cr | LC |
|---|---|---|---|---|
| 25848 | $C_{10}H_{21}$— | —O—$CH_3$ | K 95 | N 154U |
| 25849 | $C_{10}H_{21}$— | —O—$C_6H_{13}$ | K 43 | C 53 A 142U |
| 25850 | $C_{10}H_{21}$— | —O—$C_7H_{15}$ | K 54 | B 64 C 110 A 143U |
| 25851 | $C_{10}H_{21}$— | —O—$C_8H_{17}$ | K 59 | B 73 C 120 A 146U |
| 25852 | $C_{10}H_{21}$— | —O—$C_{10}H_{21}$ | K 66 | B 84 C 137 A 144.6I |

TABLE 515

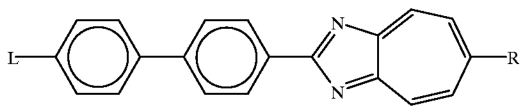

| No | L | R | Cr | LC |
|---|---|---|---|---|
| 27356 | H— | —O—$C_4H_9$ | K 211 | A 207 N 240I |
| 27357 | H— | —O—$C_6H_{13}$ | K 183 | B 225 A 228U |

TABLE 516

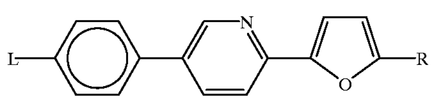

| No | L | R | Cr | LC |
|---|---|---|---|---|
| 27633 | $C_4H_9$— | —H | K 75 | S 96I |
| 27634 | $C_5H_{11}$— | —H | K 65 | S 106I |
| 27635 | $C_6H_{13}$— | —H | K 55 | S 103I |
| 27636 | $C_7H_{15}$— | —H | K 48 | S 100 S 103 S 107I |
| 27637 | $C_8H_{17}$— | —H | K 42 | S 102I |
| 27638 | $C_4H_9$—O— | —H | K 106 | S 136I |
| 27639 | $C_5H_{11}$—O— | —H | K 62 | S 133I |
| 27640 | $C_6H_{13}$—O— | —H | K 76 | S 133I |
| 27641 | $C_7H_{15}$—O— | —H | K 63 | S 136I |
| 27642 | $C_8H_{17}$—O— | —H | K 54 | S 137I |

TABLE 517

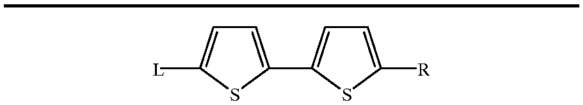

| No | L | R | Cr | LC |
|---|---|---|---|---|
| 8268 | $C_4H_9$—S— | —Br | K ? | I |
| 8269 | $C_4H_9$—S— | —CN | K 30.3 | N-63 E |

TABLE 517-continued

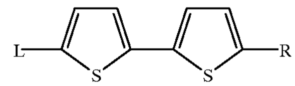

| No | L | R | Cr | LC |
|---|---|---|---|---|
| 8270 | $C_7H_{15}$— | —$C_7H_{15}$ | K 56 | I |
| 8278 | $C_7H_{15}$— | —COO—$C_2H_5$ | K 84 | S 47I |
| 8279 | $C_4H_9$—O— | —COO—$C_2H_5$ | K 87 | S 86I |
| 8280 | $C_5H_{11}$—O— | —COO—$C_2H_5$ | K 72 | S 90I |
| 8281 | $C_6H_{13}$—O— | —COO—$C_2H_5$ | K 60 | S 82I |
| 8282 | $C_7H_{15}$—O— | —COO—$C_2H_5$ | K 86 | S 82I |
| 8283 | $C_8H_{17}$—O— | —COO—$C_2H_5$ | K 72 | S 84I |

TABLE 518

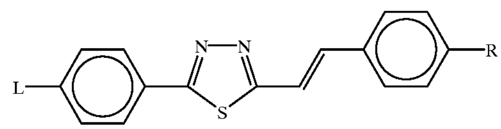

| No | L | R | Cr | LC |
|---|---|---|---|---|
| 32163 | H— | —O—$C_9H_{19}$ | K 105 | S 126I |
| 32165 | $C_6H_{13}$— | —O—$C_4H_9$ | K 68 | S 115 N 165I |
| 32166 | $C_6H_{13}$— | —O—$C_9H_{19}$ | K 83 | S 167 N 177I |
| 32167 | $C_4H_9$—O— | —O—$C_4H_9$ | K 103 | S 117 N 210I |
| 32168 | $C_4H_9$—O— | —O—$C_9H_{19}$ | K 105 | S 141 N 195I |
| 32170 | $C_6H_{13}$—O— | —O—$C_5H_{11}$ | K 95 | S 145 N 199I |

TABLE 519

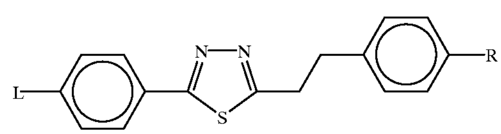

| No | L | R | Cr | LC |
|---|---|---|---|---|
| 32162 | C8H13— | —C4H9 | K 56 | C 89 A 123I |

TABLE 520

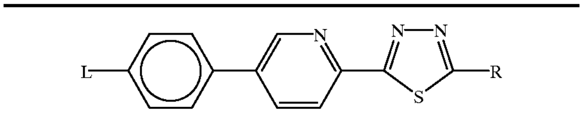

| No | L | R | Cr | LC |
|---|---|---|---|---|
| 27671 | $C_6H_{13}$— | —H | K 82 | S 128I |
| 27672 | $C_6H_{13}$—O— | —H | K 95 | S 152I |
| 27673 | $C_4H_9$— | —$C_5H_{11}$ | K 47 | S 143I |

TABLE 521

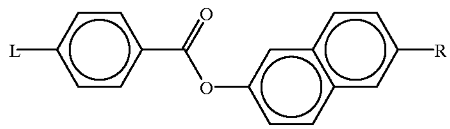

| No | L | R | Cr | LC |
|---|---|---|---|---|
| 22138 | NC— | —O—$C_8H_{17}$ | K 128 | A 122 N 158I |
| 22139 | NC— | —O—$C_9H_{19}$ | K 125 | A 140 N 152I |
| 22140 | NC— | —O—$C_{10}H_{21}$ | K 125 | A 146 N 149I |
| 22141 | NC— | —O—$C_{11}H_{23}$ | K 122.5 | A 149I |
| 22142 | NC— | —O—$C_{12}H_{25}$ | K 123 | A 151I |
| 22146 | $O_2N$— | —O—$C_8H_{17}$ | K 98 | A 109 N 136I |
| 22147 | $O_2N$— | —O—$C_9H_{19}$ | K 94 | A 127.5 N 135I |
| 22148 | $O_2N$— | —O—$C_{10}H_{21}$ | K 93 | A 135 N 135.5I |
| 22149 | $O_2N$— | —O—$C_{11}H_{23}$ | K 92 | A 136.5I |
| 22150 | $O_2N$— | —O—$C_{12}H_{25}$ | K 92 | A 136.5I |
| 22161 | $C_9H_{19}$— | —CN | K 74 | A 105.9 N 131.1I |

TABLE 522

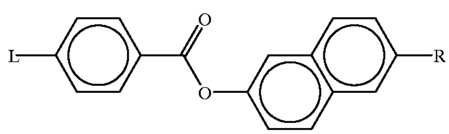

| No | L | R | | Cr | LC |
|---|---|---|---|---|---|
| 22168 | $C_{10}H_{21}$—O— | —CN | | K 78 | R 72 A 139 N 152I |
| 22169 | $C_{11}H_{23}$—O— | —CN | | K 79 | A 146 N 149.5I |
| 22172 | $C_8H_{17}$—S— | —CN | | K 99 | A 109.5 N 129.5I |
| 22173 | $C_9H_{19}$—S— | —CN | | K 107 | A 122 N 127I |
| 22174 | $C_{10}H_{21}$—S— | —CN | | K 100 | A 128.5I |
| 22175 | $C_{11}H_{23}$—S— | —CN | | K 100 | A 130.5I |
| 22176 | $C_{12}H_{25}$—S— | —CN | | K 104 | A 133I |
| 22181 | $C_2H_5$—CHMe —$C_5H_{10}$—O— | —CN | S | K 80 | A 122 N 135I |
| 22182 | $C_9H_{19}$—O— | —COO—$C_3H_5$— SIMe$_2$C$_4$H$_9$ | | K 48 | C 67 A 81I |
| 22184 | $C_6H_{13}$—O— | —$C_5H_{11}$ | | K 81 | A 84.9 N 120I |
| 22185 | $C_8H_{17}$—O— | —$C_7H_{15}$ | | K 73 | A 106.1 N 111.3I |
| 22186 | $C_{10}H_{21}$—O— | —$C_4H_8$—CHMe —OOC—$C_2H_5$ | 1 | K 22.1 | A 9.1I |
| 22187 | $C_{10}H_{21}$—O— | —O—$C_2H_4$—O —$C_4H_9$ | | K 63 | C 72.3 N 98.3I |
| 22188 | $C_{10}H_{21}$—O— | —O—$CH_2$—CHMe —O—$C_2H_5$ | 1 | K 49 | C 59 A 64 N 73I |

TABLE 523

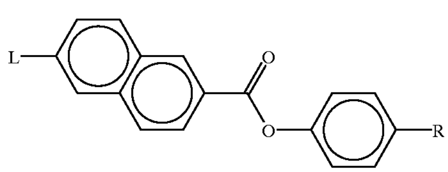

| No | L | R | Cr | LC |
|---|---|---|---|---|
| 22305 | $C_7H_{15}$— | —$C_7H_{15}$ | K 83.1 | C 58 N 109.5I |
| 22307 | $C_6H_{13}$—O— | —$C_5H_{11}$ | K 81 | A 85 N 120I |
| 22309 | $C_8H_{17}$—O— | —$C_7H_{15}$ | K 73 | A 106.1 N 111.3I |

TABLE 523-continued

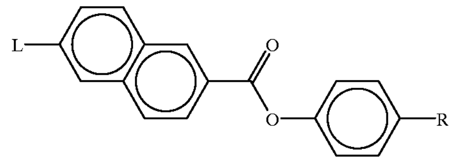

| No | L | R | Cr | LC |
|---|---|---|---|---|
| 22317 | $C_7H_{15}$— | —O—$C_7H_{15}$ | K 83.1 | C 58 N 109.5I |
| 22318 | $C_8H_{17}$— | —O—$C_6H_{13}$ | K 70 | C 73 N 109I |
| 22320 | $C_6H_{13}$—O— | —O—$C_7H_{15}$ | K 82 | C 88.4 N 133.4I |
| 22321 | $C_6H_{13}$—O— | —O—$C_8H_{17}$ | K 85.1 | C 89.1 N 133.3I |
| 22322 | $C_7H_{15}$—O— | —O—$C_7H_{15}$ | K 88.9 | C 94.7 A 105.5 N 129.8I |
| 22323 | $C_7H_{15}$—O— | —O—$C_8H_{17}$ | K 82.5 | C 103.8 A 110.7 N 132.2I |
| 22324 | $C_7H_{15}$—O— | —O—$C_9H_{19}$ | K 90.4 | C 103 A 113.8 N 128I |
| 22325 | $C_8H_{17}$—O— | —O—$C_7H_{15}$ | K 84.7 | C 93.8 A 115.7 N 129.7I |
| 22326 | $C_8H_{17}$—O— | —O—$C_8H_{17}$ | K 85.5 | C 101.8 A 119.8 N 131I |

TABLE 523-continued

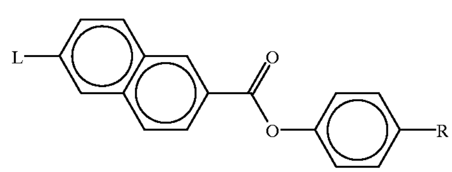

| No | L | R | Cr | LC |
|---|---|---|---|---|
| 22327 | $C_8H_{17}$—O— | —O—$C_9H_{19}$ | K 90 | C 104.2 A 122.4 N 131.8I |

TABLE 524

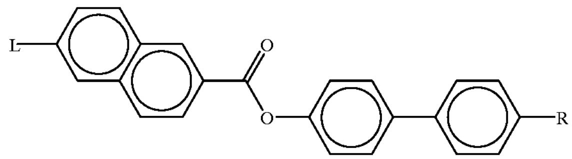

| No | L | R | | Cr | LC |
|---|---|---|---|---|---|
| 35500 | $C_7H_{15}$— | —F | | K 114.9 | S 187.9 N 229.7l |
| 35502 | $H_2C$═CH—COO— $C_8H_{12}$—O— | —$NO_2$ | | K 134 | S > 180 Z |
| 35503 | $C_6H_{13}$—$CHCF_3$ —OOC— | —$C_{10}H_{21}$ | 1 | K 49.5 | A 127.7l |
| 35504 | $C_6H_{13}$—$CHCF_3$ —OOC— | —O—$C_{10}H_{21}$ | 1 | K 35 | S 100.4 C 124.5 A 152.5l |
| 35505 | $C_6H_{13}$—$CHCF_3$ —OOC— | —COO— $C_{10}H_{21}$ | 1 | K 40 | S 96 C ° 97.7 A 123.7l |
| 35506 | $C_6H_{13}$—$CHCF_3$ —OOC— | —COO— $C_{10}H_{21}$ | 1 | K 75 | S 120 C ° 156.9 A 184.2l |
| 35507 | $C_{10}H_{21}$—O— | —COO—$CHCF_3$ —$C_6H_{13}$ | 1 | K 7 | S 97 C ° 120 A 151.9l |
| 35508 | $C_8H_{17}$—OOC— | —COO—$CHCF_3$ —$C_6H_{13}$ | 1 | K 7 | S 64.1 C ° 66 A 108.4l |

TABLE 525

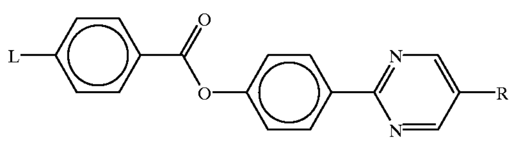

| No | L | R | | Cr | LC |
|---|---|---|---|---|---|
| 33600 | $C_4H_9$—O—CHMe —COO— | —$C_8H_{17}$ | S | K 44 | C° 60 N° 961 |
| 33601 | $C_4H_9$—O—CHMe —COO— | —O—$C_8H_{17}$ | S | K 68 | C° 103 N° 1381 |
| 33603 | $C_6H_{13}$—O— | —$C_4H_9$—O—CHMe—$C_2H_5$ | S | K 56 | C° 54 N° 1521 |
| 33604 | $C_7H_{15}$—O— | —$C_4H_9$—O—CHMe—$C_2H_5$ | S | K 64 | C° 65 N° 1481 |
| 33605 | $C_8H_{17}$—O— | —$C_4H_9$—O—CHMe—$C_2H_5$ | S | K 71 | C° 70 N° 1421 |
| 33606 | $C_9H_{19}$—O— | —$C_4H_9$—O—CHMe—$C_2H_5$ | S | K 78 | C° 77 N° 1421 |
| 33607 | $C_{10}H_{21}$—O— | —$C_4H_9$—O—CHMe—$C_2H_5$ | S | K 74 | C° 82 N° 1411 |
| 33608 | $C_{11}H_{23}$—O— | —$C_4H_9$—O—CHMe—$C_2H_5$ | S | K 78 | C° 85 N° 1361 |
| 33609 | $C_{12}H_{25}$—O— | —$C_4H_9$—O—CHMe—$C_2H_5$ | S | K 83 | C° 88 N° 1331 |
| 33610 | $C_6H_{13}$—O— | —$C_5H_{10}$—O—CHMe—$C_2H_5$ | S | K 72 | C° 50 N° 1481 |
| 33611 | $C_7H_{15}$—O— | —$C_5H_{10}$—O—CHMe—$C_2H_5$ | S | K 58 | C° 64 N° 1441 |
| 33612 | $C_8H_{17}$—O— | —$C_5H_{10}$—O—CHMe—$C_2H_5$ | S | K 56 | C° 72 N° 1421 |
| 33613 | $C_9H_{19}$—O— | —$C_5H_{10}$—O—CHMe—$C_2H_5$ | S | K 68 | C° 80 N° 1381 |
| 33614 | $C_{10}H_{21}$—O— | —$C_5H_{10}$—O—CHMe—$C_2H_5$ | S | K 86 | C° 84 N° 1371 |
| 33615 | $C_{11}H_{23}$—O— | —$C_5H_{10}$—O—CHMe—$C_2H_5$ | S | K 83 | C° 90 N° 1321 |
| 33616 | $C_{12}H_{25}$—O— | —$C_5H_{10}$—O—CHMe—$C_2H_5$ | S | K 69 | C° 94 N° 1321 |
| 33618 | $C_6H_{13}$—CHMe—O— | —O—$C_8H_{17}$ | 1 | K 72 | C° 48 N° 1151 |
| 33620 | $CH_3$—CHMe—CHCl —COO— | —$C_7H_{15}$ | S | K 70 | C° 96 N° 2021 |
| 33621 | $CH_3$—CHMe—CHCl —COO— | —$C_9H_{19}$ | S | K 62 | C° 69 N° 1571 |
| 33622 | $C_2H_5$—CHMe—CHCl —COO— | —$C_8H_{17}$ | 3 | K ? | C° 77 N° 1241 |

TABLE 526

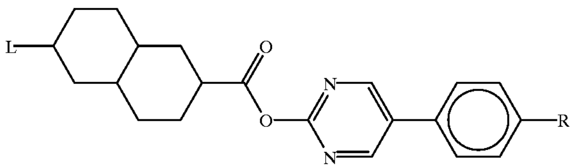

| No | L | R | | Cr | LC |
|---|---|---|---|---|---|
| 36376 | $C_4H_9$— | —O—$C_9H_{19}$ | 2 | K 66 | S 1901 |

TABLE 527

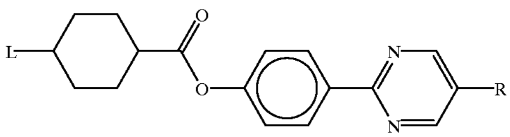

| No | L | R | Cr | LC |
|---|---|---|---|---|
| 37030 | $C_2H_5$— | —CN | K 137 | S 136 N 2431 |
| 37031 | $C_5H_{11}$— | —CN | K 117 | S 192 N 2481 |
| 37033 | $CH_3$— | —$C_{10}H_{21}$ | K 76 | C 77 N 1241 |
| 37035 | $C_2H_5$— | —$C_{10}H_{21}$ | K 82 | C 82 N 1421 |
| 37038 | $C_3H_7$— | —$C_{10}H_{21}$ | K 76 | C 89 N 1611 |
| 37039 | $C_3H_7$— | —$C_{12}H_{25}$ | K 64.9 | S 76.3 C 108.1 N 152.81 |
| 37041 | $C_4H_9$— | —$C_{10}H_{21}$ | K 40 | B 82 C 99 N 1601 |
| 37042 | $C_4H_9$— | —$C_{12}H_{25}$ | K 80 | S 82 S 83.8 C 115.3 N 152.71 |
| 37046 | $C_5H_{11}$— | —$C_{10}H_{21}$ | K 64 | B 85 C 104 N 1611 |
| 37047 | $C_5H_{11}$— | —$C_{11}H_{23}$ | K 70 | S 80 S 82.7 C 114.5 N 160.51 |
| 37048 | $C_5H_{11}$— | —$C_{12}H_{25}$ | K 67 | S 83 S 87.2 C 121.5 N 1561 |
| 37051 | $C_7H_{15}$— | —$C_{10}H_{21}$ | K 78 | B 89 C 116 N 1581 |
| 37052 | $C_9H_{19}$— | —$C_{10}H_{21}$ | K 77 | S 85 C 123 N 1531 |
| 37053 | $C_{10}H_{21}$— | —$C_{10}H_{21}$ | K 77 | S 87 C 125 N 1501 |
| 37054 | $C_5H_{11}$— | —O—$C_8H_{17}$ | K 72.1 | S 68 S 74 C 100 N 1931 |
| 37055 | $C_5H_{11}$— | —O—$C_9H_{19}$ | K 74.3 | G 69 C 117.7 N 1891 |
| 37056 | $C_5H_{11}$— | —O—$C_{10}H_{21}$ | K 74.7 | G 72.5 C 129.8 N 186.51 |
| 37058 | $H_2C$=CH—$C_2H_4$— | —$C_{10}H_{21}$ | K 71 | C 92 N 1621 |

TABLE 527-continued

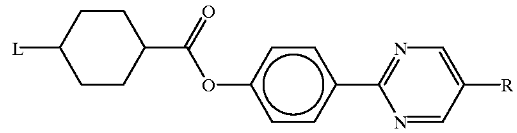

| No | L | R | Cr | LC |
|---|---|---|---|---|
| 37059 | $CH_3$—CH=CH—$C_2H_4$— | —$C_{10}H_{21}$ | K 52 | S 56 S 64 S 69 C 92 N 1701 |

TABLE 528

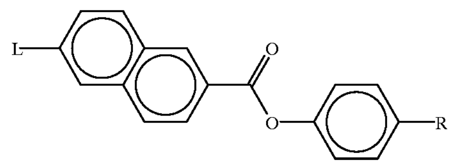

| No | L | R | Cr | LC |
|---|---|---|---|---|
| 22305 | $C_7H_{15}$— | —$C_7H_{15}$ | K 83.1 | C 58 N 109.51 |
| 22307 | $C_6H_{13}$—O— | —$C_5H_{11}$ | K 81 | A 85 N 1201 |
| 22309 | $C_8H_{17}$—O— | —$C_7H_{15}$ | K 73 | A 106.1 N 111.31 |
| 22317 | $C_7H_{15}$— | —O—$C_7H_{15}$ | K 83.1 | C 58 N 109.51 |
| 22318 | $C_8H_{17}$— | —O—$C_6H_{13}$ | K 70 | C 73 N 1091 |
| 22320 | $C_6H_{13}$—O— | —O—$C_7H_{15}$ | K 82 | C 88.4 N 133.41 |
| 22321 | $C_6H_{13}$—O— | —O—$C_8H_{17}$ | K 85.1 | C 89.1 N 133.31 |
| 22322 | $C_7H_{15}$—O— | —O—$C_7H_{15}$ | K 88.9 | C 94.7 A 105.5 N 129.81 |
| 22323 | $C_7H_{15}$—O— | —O—$C_8H_{17}$ | K 82.5 | C 103.8 A 110.7 N 132.21 |
| 22324 | $C_7H_{15}$—O— | —O—$C_9H_{19}$ | K 90.4 | C 103 A 113.8 N 1281 |
| 22325 | $C_8H_{17}$—O— | —O—$C_7H_{15}$ | K 84.7 | C 93.8 A 115.7 N 129.71 |
| 22326 | $C_8H_{17}$—O— | —O—$C_8H_{17}$ | K 85.5 | C 101.8 A 119.8 N 1311 |
| 22327 | $C_8H_{17}$—O— | —O—$C_9H_{19}$ | K 90 | C 104.2 A 122.4 N 131.81 |

TABLE 529

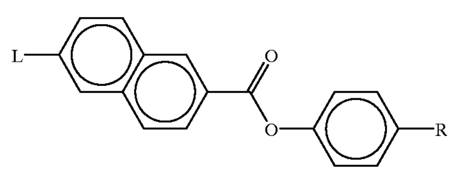

| No | L | R | | Cr | LC |
|---|---|---|---|---|---|
| 22328 | $C_9H_{19}$—O— | —O—$C_8H_{17}$ | | K 87 | C 106.3 A 122.5 N 129.81 |
| 22329 | $C_9H_{19}$—O— | —O—$C_9H_{19}$ | | K 89.4 | C 115.5 A 125.7 N 128.41 |
| 22333 | $C_4H_9$— | —CO—$C_4H_9$ | | K 116 | S 120 N 1301 |
| 22334 | $C_{10}H_{21}$—O— | —COO—CH($C_3H_5$—/—$C_2H_5$)$_2$ | R | K <30 | A 251 |
| 22337 | $C_8H_{17}$—O— | —COO—CHMe—$C_6H_{13}$ | R | K 69.3 | A 62.11 |

TABLE 529-continued

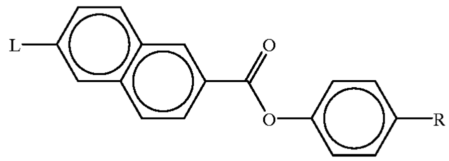

| No | L | R | | Cr | LC |
|---|---|---|---|---|---|
| 22338 | $C_{10}H_{21}$—O— | —COO—CHMe —$C_6H_{13}$ | R | K 60 | A 20U |
| 22341 | $C_{10}H_{21}$—O— | —COO—$CH_2$— CHMe—$C_2H_5$ | 1 | K 85.2 | A 103.61 |
| 22342 | $C_9H_{19}$—O— | —CH═CH—COO— $CHCF_3$—$C_6H_{13}$ | R | K 51 | CA 63 A 691 |
| 22343 | $C_{10}H_{21}$—O— | —CH═CH—COO— $CHCF_3$—$C_6H_{13}$ | R | K 50 | CA 56 A 661 |
| 22344 | $C_{11}H_{23}$—O— | —CH═CH—COO— $CHCF_3$—$C_6H_{13}$ | R | K 45 | CA 52 A 611 |
| 22345 | $C_{10}H_{21}$—O— | —COO—$CHCF_3$ —$C_6H_{13}$ | 1 | K <−30 | A 251 |
| 22346 | $C_{10}H_{21}$—O— | —COO—$CHCF_3$ —$C_8H_{17}$ | 1 | K 7 | S 6 A 13.31 |
| 22347 | $C_{10}H_{21}$—O— | —COO—$CHCF_3$ —$C_6H_{13}$ | 2 | K 52 | A 611 |

TABLE 530

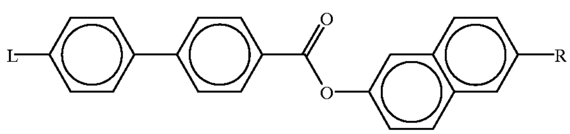

| No | L | R | | Cr | LC |
|---|---|---|---|---|---|
| 35478 | $C_4H_9$—O— | —CN | | K 158 | N >300Z |
| 35479 | $C_7H_{15}$—O— | —CN | | K 132 | N 292Z |
| 35481 | $C_8H_{17}$—O— | —CHMe—COS—$C_6H_{13}$ | 1 | K 89.2 | C° 120 A 140.71 |
| 35482 | $C_9H_{19}$—O— | —CHMe—COS—$C_6H_{13}$ | 1 | K 87.6 | C° 125. A 135.71 |
| 35483 | $C_{10}H_{21}$—O— | —CHMe—COS—$C_6H_{13}$ | 1 | K 85.4 | C° 127.5 A 133.61 |
| 35484 | $C_{11}H_{23}$—O— | —CHMe—COS—$C_6H_{13}$ | 1 | K 83.3 | S 112.8 C° 128.2 A 131.11 |
| 35485 | $C_{12}H_{25}$—O— | —CHMe—COS—$C_6H_{13}$ | 1 | K 86.9 | S 104.8 C° 128.6 A 129.11 |
| 35486 | $C_{13}H_{27}$—O— | —CHMe—COS—$C_6H_{13}$ | 1 | K 81.9 | S 102.6 C° 128.81 |
| 35487 | $C_{14}H_{29}$—O— | —CHMe—COS—$C_6H_{13}$ | 1 | K 77.4 | S 103 C° 124.41 |
| 35488 | $C_7H_{15}$—O— | —CHMe—COO—CHMe—$C_3H_7$ | 5 | K 98 | C° 100.8 A 141.8 N° 147.91 |
| 35489 | $C_8H_{17}$—O— | —CHMe—COO—CHMe—$C_3H_7$ | 5 | K 94.1 | C° 101.6 A 139.1 N° 147.91 |
| 35490 | $C_9H_{19}$—O— | —CHMe—COO—CHMe—$C_3H_7$ | 5 | K 79.1 | C° 105.9 A 134.1 A/? N° 142.81 |
| 35491 | $C_{10}H_{21}$—O— | —CHMe—COO—CHMe—$C_3H_7$ | 5 | K 66.9 | C° 108.4 A/138.6 N° 147.91 |
| 35492 | $C_{11}H_{23}$—O— | —CHMe—COO—CHMe—$C_3H_7$ | 5 | K 73.3 | C° 114.1 A/127.5 N° 134.31 |
| 35493 | $C_{12}H_{25}$—O— | —CHMe—COO—CHMe—$C_3H_7$ | 5 | K 69 | C° 113.4 A/126.4 N° 132.61 |
| 35494 | $C_{13}H_{27}$—O— | —CHMe—COO—CHMe—$C_3H_7$ | 5 | K 68.6 | C° 119.7 A/133.7 N° 138.51 |
| 35495 | $C_{14}H_{29}$—O— | —CHMe—COO—CHMe—$C_3H_7$ | 5 | K 71.7 | C° 119.4 A/132.8 N° 136.51 |
| 35496 | $C_8H_{17}$—O— | —COO—$CHCF_3$—$C_6H_{13}$ | 1 | K 93.5 | S 147.4 C° 150.7 A 176.41 |
| 35497 | $C_8H_{17}$—O— | —COO—$CHCF_3$—$C_8H_{17}$ | 1 | K 84 | S 133 C° 135.6 A 163.81 |
| 35498 | $C_6H_{13}$—$CHCF_3$ —OOC— | —O—$C_{10}H_{21}$ | 1 | K ? | S 10 S 75 C° 106 A 150.51 |

TABLE 531
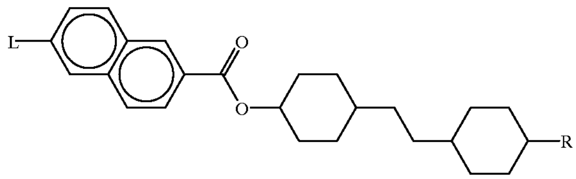
| No | L | R | Cr | LC |
|---|---|---|---|---|
| 46421 | $C_8H_{17}$— | $C_5H_{11}$ | K 54 | S 142.5 N 1781 |
TABLE 532
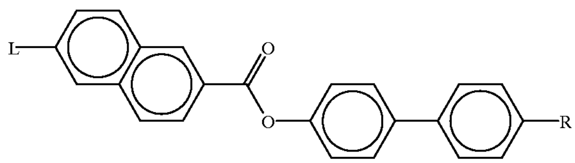
| No | L | R | | Cr | LC |
|---|---|---|---|---|---|
| 35500 | $C_7H_{15}$— | —F | | K 114.9 | S 187.9 N 229.71 |
| 35501 | $C_7H_{15}$—O— | —CN | | K 136 | N 304 Z |
| 35502 | $H_2C$═CH—COO —$C_6H_{12}$—O— | —$NO_2$ | | K 134 | S >180 Z |
| 35503 | $C_8H_{13}$—$CHCF_3$ —OOC— | —$C_{10}H_{21}$ | 1 | K 49.5 | A 127.71 |
| 35504 | $C_8H_{13}$—$CHCF_3$ —OOC— | —O—$C_{10}H_{21}$ | 1 | K 35 | S 100.4 C° 124.5 A 152.51 |
| 35505 | $C_8H_{13}$—$CHCF_3$ —OOC— | —COO—$C_{10}H_{21}$ | 1 | K 40 | S 98 C° 97.7 A 123.71 |
| 35506 | $C_8H_{13}$—$CHCF_3$ —OOC— | —COO—$C_{10}H_{21}$ | 1 | K 75 | S 120 C° 156.9 A 184.21 |
| 35507 | $C_{10}H_{21}$—O— | —COO—$CHCF_3$ —$C_8H_{13}$ | 1 | K ? | S 97 C° 120 A 151.91 |
| 35508 | $C_8H_{17}$—OOC— | —COO—$CHCF_3$ —$C_8H_{13}$ | 1 | K ? | S 64.1 C° 66 A 108.41 |
TABLE 533
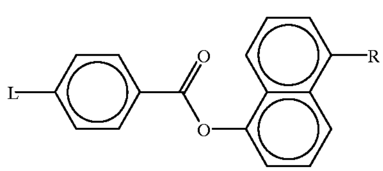
| No | L | R | | Cr | LC |
|---|---|---|---|---|---|
| 22447 | $C_8F_{11}$—$CH_2$—O— | —O—$C_8H_{17}$ | | K ? | A 921 |
| 22448 | $C_8F_{11}$—$CH_2$—O— | —O—$C_3H_6$—CHMe—$C_2H_5$ | 1 | K ? | C° 37 A 801 |

TABLE 534

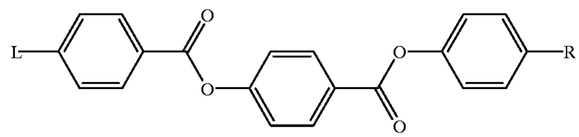

| L | R | | Cr | LC |
|---|---|---|---|---|
| $C_8H_{17}$—O— | —CH═C(COO—$C_6H_{13}$)$_2$ | | K 52 | C 51 A 85 N 1011 |
| $C_8H_{17}$—O— | —CH═C(COO—$C_7H_{15}$)$_2$ | | K 58 | C 51.5 A 83 N 971 |
| $C_8H_{17}$—O— | —CH═C(COO—$C_8H_{17}$)$_2$ | | K 59 | C 53 A 84 N 941 |
| $C_8H_{17}$—O— | —CH═C(COO—$C_9H_{19}$)$_2$ | | K 58 | C 53 A 86 N 941 |
| $C_8H_{17}$—O— | —CH═C(COO—$C_{10}H_{21}$)$_2$ | | K 63 | C 55 A 84 2 911 |
| $C_8H_{17}$—O— | —CH═C(COO—$C_{11}H_{23}$)$_2$ | | K 61 | C 58 A 84 N 901 |
| $C_8H_{17}$—O— | —CH═C(COO—$C_{12}H_{25}$)$_2$ | | K 67 | C 57 A 84 N 891 |
| $C_8H_{17}$—O— | —CH═C(COO—$C_{16}H_{33}$)$_2$ | | K 83 | C 65 A 85 N 861 |
| $C_8H_{17}$—O— | —CH═C(COO—$C_{18}H_{37}$)$_2$ | | K 86 | C 59 A 831 |
| $C_9H_{19}$—O— | —CH═C(COO—$C_5H_{11}$)$_2$ | | K 70 | C 58 A 88 N 1071 |
| $C_8H_{17}$—O— | —CHCN—CH(COO—$C_3H_7$)$_2$ | 2 | K 60 | A 100 N 1311 |
| $C_4H_9$—O— | —O—$C_8H_{17}$ | | K ? | C 65 N 2071 |
| $C_5H_{11}$—O— | —O—$C_8H_{17}$ | | K 97 | C 101 N 2011 |
| $C_6H_{13}$—O— | —O—$C_8H_{17}$ | | K 96 | C 132 A 144 N 1981 |
| $C_7H_{15}$—O— | —O—$C_7H_{15}$ | | K 87 | C 143 A 162 N 1931 |
| $C_7H_{15}$—O— | —O—$C_8H_{17}$ | | K ? | C 142 A 155 N 1931 |
| $C_8H_{17}$—O— | —O—$CH_3$ | | K 107 | A 122 N 2261 |
| $C_8H_{17}$—O— | —O—$C_2H_5$ | | K 110 | A 130 N 2131 |
| $C_8H_{17}$—O— | —O—$C_8H_{17}$ | | K 87 | C 145 A 163 N 189.51 |
| $C_8H_{17}$—O— | —O—CHMe—COO—$C_2H_5$ | S | K 86 | A 117 N° 1221 |
| $C_8H_{17}$—O— | —O—CHMe—COO—$C_8H_{17}$ | S | K 71 | A 94 N° 1131 |
| $C_8H_{17}$—O— | —CO—$CH_3$ | | K 131 | A 210 N 2271 |
| $C_6H_{13}$—O— | —COO—$C_3H_7$ | | K 101.5 | C 188.5 N 1931 |
| $C_8H_{17}$—O— | —CO—N(—$CH_3$)$_2$ | | K 127 | A 144 N 2041 |
| $C_8H_{17}$—O— | —COO—N═C(—$CH_3$)$_2$ | | K 116 | A 180 N 230 Z |
| $C_8H_{17}$—O— | —COO—N═C(—$C_2H_5$)$_2$ | | K 77.5 | A 155.5 N 192 Z |
| $C_8H_{17}$—O— | —COO—N═C(—$C_3H_7$)$_2$ | | K 91 | A 128 N 1651 |
| $C_8H_{17}$—O— | —COO—N═C(—$C_7H_{15}$)$_2$ | | K 76 | A 83 N 116.51 |
| $C_8H_{17}$—O— | —COO—N═C(—$C_{11}H_{23}$)$_2$ | | K 73 | A 78 N 991 |
| $C_8H_{17}$—O— | —COO—N═C(—$C_{13}H_{27}$)$_2$ | | K 59 | A 78 N 931 |

TABLE 535

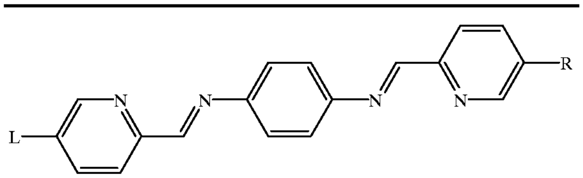

| L | R | Cr | LC |
|---|---|---|---|
| $C_6H_{13}$—O— | —O—$C_6H_{13}$ | K 122.4 | B 132.6 N 2431 |
| $C_8H_{17}$—O— | —O—$C_8H_{17}$ | K 61.2 | H 100.2 G 121.2 C 158.4 N 223.11 |
| $C_{10}H_{21}$—O— | —O—$C_{10}H_{21}$ | K 89.9 | H 87.2 G 95.5 C 173.4 N 202.11 |

TABLE 536

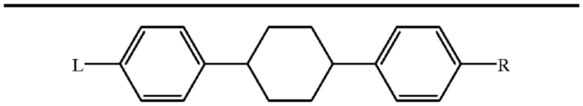

| L | R | Cr | LC |
|---|---|---|---|
| $C_4H_9$— | —$C_4H_9$ | K 89 | P 1071 |
| $C_6H_{13}$— | —$C_6H_{13}$ | K 70 | P 1121 |

TABLE 536-continued

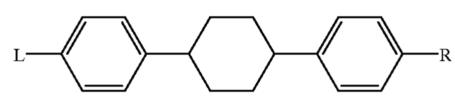

| L | R | Cr | LC |
|---|---|---|---|
| $C_7H_{15}$— | —$C_7H_{15}$ | K 60 | P 1141 |
| $C_{12}H_{25}$— | —$C_{12}H_{25}$ | K 53 | P 108.81 |
| $C_{18}H_{33}$— | —$C_{18}H_{33}$ | K 69 | P 102.51 |

TABLE 537

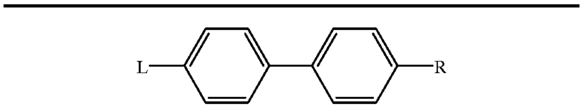

| L | R | Cr | LC |
|---|---|---|---|
| $C_8H_{17}$— | —$C_8H_{17}$ | K 57 | P 611 |
| $C_9H_{19}$— | —$C_9H_{19}$ | K 57 | P 681 |

TABLE 538

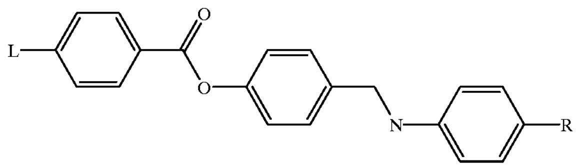

| L | R | Cr | LC |
|---|---|---|---|
| $C_{10}H_{21}$—O— | —$CH_3$ | K 106.5 | S 121.5 N 202.51 |
| $C_{10}H_{21}$—O— | —$C_2H_5$ | K 84 | S 136.5 N 1971 |
| $C_{10}H_{21}$—O— | —$C_4H_9$ | K 68 | B 88 C 151 N 1921 |
| $C_{12}H_{25}$—O— | —$CH_3$ | K 99.5 | S 142.5 N 193.51 |
| $C_{12}H_{25}$—O— | —$C_2H_5$ | K 90 | S 150 N 186.51 |
| $C_{12}H_{25}$—O— | —$C_4H_9$ | K 66 | B 91 C 159 N 1851 |
| $C_{14}H_{29}$—O— | —$CH_3$ | K 95 | S 155 N 1841 |
| $C_{14}H_{29}$—O— | —$C_2H_5$ | K 94 | S 155 N 1801 |
| $C_{14}H_{29}$—O— | —$C_4H_9$ | K 64 | B 95 C 162 N 1781 |
| $C_{16}H_{33}$—O— | —$CH_3$ | K 91 | S 160.5 N 1781 |
| $C_{16}H_{33}$—O— | —$C_2H_5$ | K 94 | S 157 N 1721 |
| $C_{16}H_{33}$—O— | —$C_4H_9$ | K 63 | B 96 C 163 N 1721 |
| $C_{18}H_{37}$—O— | —$CH_3$ | K 88 | S 159 N 171.51 |
| $C_{18}H_{37}$—O— | —$C_2H_5$ | K 95 | S 157.5 N 166.51 |
| $C_5H_{11}$—O— | —O—$C_8H_{17}$ | K 95 | S 136 N 2261 |
| $C_8H_{13}$—O— | —O—$C_8H_{17}$ | K 90 | S 151 N 2211 |
| $C_7H_{15}$—O— | —O—$C_2H_5$ | K 101.5 | C 73.8 N 2501 |
| $C_7H_{15}$—O— | —O—$C_3H_7$ | K 114.3 | S 84.5 C 108 N 2351 |
| $C_7H_{15}$—O— | —O—$C_4H_9$ | K 90.4 | S 88.4 C 128.4 N 234.61 |
| $C_7H_{15}$—O— | —O—$C_5H_{11}$ | K 89.4 | S 85.5 C 141.5 N 221.51 |
| $C_7H_{15}$—O— | —O—$C_6H_{13}$ | K 92 | S 83 S 84 C 150 N 221.71 |
| $C_7H_{15}$—O— | —O—$C_7H_{15}$ | K 101.4 | S 85 C 157 N 215.51 |
| $C_7H_{15}$—O— | —O—$C_8H_{17}$ | K 89.7 | S 84 S 86 C 162.6 N 213.41 |
| $C_7H_{15}$—O— | —O—$C_9H_{19}$ | K 92.9 | S 81.2 S 85.8 C 168.8 N 208.71 |
| $C_7H_{15}$—O— | —O—$C_{10}H_{21}$ | K 90.4 | S 80 S 85.5 C 167.4 N 205.31 |
| $C_8H_{17}$—O— | —O—$C_8H_{17}$ | K 94 | S 169 N 215.51 |

TABLE 538-continued

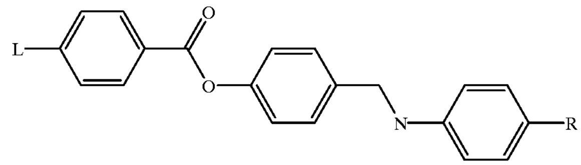

| L | R | Cr | LC |
|---|---|---|---|
| $C_9H_{19}$—O— | —O—$C_2H_5$ | K 104.2 | C 99 N 2361 |
| $C_9H_{19}$—O— | —O—$C_3H_7$ | K 105.4 | S 79 C 134.6 N 2241 |
| $C_9H_{19}$—O— | —O—$C_4H_9$ | K 94.6 | S 80 C 148.8 N 221.81 |
| $C_9H_{19}$—O— | —O—$C_5H_{11}$ | K 91.2 | S 79 S 80.5 C 158.8 N 215.31 |

TABLE 539

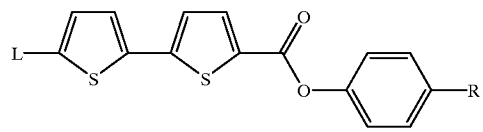

| L | R | Cr | LC |
|---|---|---|---|
| $C_7H_{15}$— | —O—$C_8H_{17}$ | K 84.4 | C 79.3 N 104.81 |
| $C_8H_{17}$— | —O—$C_8H_{17}$ | K 87.1 | B 58 C 91.7 N 104.51 |
| $C_9H_{19}$— | —O—$C_8H_{17}$ | K 76.8 | B 65.8 C 97.2 N 1051 |
| $C_{10}H_{21}$— | —O—$C_8H_{17}$ | K 81 | B 72.2 C 102.7 N 104.71 |

TABLE 540

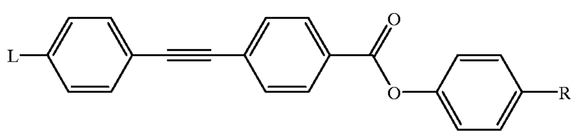

| L | R | | Cr | LC |
|---|---|---|---|---|
| $C_7H_{15}$—O— | —COO—CHMe—$C_6H_{13}$ | 1 | K 92.3 | ° 73.7 CA 87.5 C-g 90 C° 96.1 C-a 98.4 A 1361 |
| $C_8H_{17}$—O— | —COO—CHMe—$C_6H_{13}$ | 1 | K 67.6 | ° 71.6 CA 95.1 C-g 97 C° 104 C-a 105.5 A 135.31 |
| $C_9H_{19}$—O— | —COO—CHMe—$C_6H_{13}$ | 1 | K 62.2 | ° 64 CA 92.5 C-g 95 C° 107.6 C-a 108.5 A 128.61 |
| $C_{10}H_{21}$—O— | —COO—CHMe—$C_6H_{13}$ | P | K 58.2 | CA 94.6 C-g 96.1 C° 111.2 A 128.81 |
| $C_{11}H_{23}$—O— | —COO—CHMe—$C_6H_{13}$ | 1 | K 66 | CA 89 C-g 92.3 C° 112.4 A 1231 |
| $C_{12}H_{25}$—O— | —COO—CHMe—$C_6H_{13}$ | 1 | K 73.4 | CA 92 C-g 94.3 C° 113.2 A 121.31 |
| $C_{10}H_{21}$—O— | —COO—$CH_2$—CHMe—$C_2H_5$ | S | K 53 | S 54 C° 131 A 169 N° 1721 |
| $C_6H_{13}$—CHMe—OOC— | —O—$C_6H_{13}$ | P | K 92 | C° 62 A 1221 |
| $C_6H_{13}$—CHMe—OOC— | —O—$C_7H_{15}$ | P | K 83 | C° 85 A 1171 |
| $C_6H_{13}$—CHMe—OOC— | —O—$C_8H_{17}$ | P | K 84 | C° 90 A 1171 |
| $C_6H_{13}$—CHMe—OOC— | —O—$C_9H_{19}$ | P | K 87 | C° 99 A 1121 |
| $C_6H_{13}$—CHMe—OOC— | —O—$C_{10}H_{21}$ | P | K 87 | C° 102 A 1121 |
| $C_6H_{13}$—CHMe—OOC— | —O—$C_{11}H_{23}$ | P | K 91 | C° 107 A 1091 |
| $C_6H_{13}$—CHMe—OOC— | —O—$C_{12}H_{25}$ | P | K 81 | C° 106 A 1091 |
| $C_2H_5$—CHMe—$CH_2$ —OOC— | —O—$C_8H_{17}$ | S | K 84 | C° 120 A 159 N° 1761 |
| $C_2H_5$—CHMe—$CH_2$ —OOC— | —O—$C_{10}H_{21}$ | S | K 91 | C° 122 A 158 N° 1881 |

TABLE 541

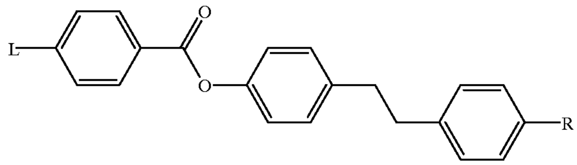

| L | R | | Cr | LC |
|---|---|---|---|---|
| $C_9H_{19}$—O— | —$C_5H_{11}$ | | K 74 | S 48 S 70.5 F 74 C 102 N 124.51 |
| $C_{10}H_{21}$—O— | —$C_5H_{11}$ | | K 75 | S 56.5 B 83.5 C 111 N 1251 |
| $C_{11}H_{23}$—O— | —$C_5H_{11}$ | | K 74 | S 65 B 94 G 118 A 120 N 1231 |
| $C_{12}H_{25}$—O— | —$C_5H_{11}$ | | K 78 | B 90 C 115 N 1241 |
| $C_7H_{15}$— | —CO—$CH_3$ | | K 125 | S 132 N 140.51 |
| $C_4H_9$—O— | —CO—$CH_3$ | | K 134 | S 144 N 1761 |
| $C_6H_{13}$—O— | —CO—$CH_3$ | | K 149.5 | C 154.5 N 1691 |
| $C_5H_{11}$—COO— | —CO—$CH_3$ | | K 143 | S 150 N 1791 |
| $C_4H_9$— | —COO—$C_2H_5$ | | K 118 | B 119.5 N 1251 |
| $C_4H_9$—O— | —COO—$C_2H_5$ | | K 121 | A 129 N 156.51 |
| $C_6H_{13}$—CHMe—OOC— | —O—$C_6H_{13}$ | R | K 51 | S 821 |
| $C_6H_{13}$—CHMe—OOC— | —O—$C_7H_{15}$ | R | K 52 | S 811 |
| $C_6H_{13}$—CHMe—OOC— | —O—$C_8H_{17}$ | R | K 73 | S 831 |
| $C_6H_{13}$—CHMe—OOC— | —O—$C_9H_{19}$ | R | K 70 | S 771 |
| $C_6H_{13}$—CHMe—OOC— | —O—$C_{10}H_{21}$ | R | K 72 | S 76 A 811 |
| $C_6H_{13}$—CHMe—OOC— | —O—$C_{11}H_{23}$ | R | K 55 | S 70 C° 74 A 791 |
| $C_6H_{13}$—CHMe—OOC— | —O—$C_{12}H_{25}$ | R | K 54 | S 69 C° 75 A 791 |
| $CH_3$—CHMe—CHCl—COO— | —O—$C_6H_{13}$ | 1 | K 59 | S 84 B 98 C° 106 N 1251 |
| $CH_3$—CHMe—CHCl—COO— | —O—$C_7H_{15}$ | 1 | K 69 | S 96 C° 110 A 111 N° 1221 |
| $CH_3$—CHMe—CHCl—COO— | —O—$C_8H_{17}$ | 1 | K 81 | S 98 C° 112 A 115 N° 121.71 |
| $CH_3$—CHMe—CHCl—COO— | —O—$C_9H_{19}$ | 1 | K 49 | I° 96.5 C° 114 A 117 N° 1201 |
| $CH_3$—CHMe—CHCl—COO— | —O—$C_{10}H_{21}$ | 1 | K 48 | I° 96 C° 114 A 118 N° 119.51 |
| $CH_3$—CHMe—CHCl—COO— | —O—$C_{11}H_{23}$ | 1 | K 57 | I° 95.5 C° 114 A 1191 |
| $CH_3$—CHMe—CHCl—COO— | —O—$C_{12}H_{25}$ | 1 | K 50 | I° 95.2 C° 114 A 1181 |
| $C_2H_5$—CHMe—$C_3H_6$—O— | —O—$C_9H_{19}$ | 1 | K 65 | J° 82 I° 95 C° 111 N° 1231 |
| $C_2H_5$—CHMe—$C_4H_8$—O— | —O—$C_9H_{19}$ | 1 | K 80 | J° 79 I° 93 C° 111 A 1181 |
| $C_2H_5$—CHMe—$C_5H_{10}$—O— | —O—$C_9H_{19}$ | 1 | K 72 | J° 82 I° 99 C° 121 N° 1231 |
| $C_6H_{13}$—O— | —COO—CHMe—$C_6H_{13}$ | R | K 50 | C° 65 A 1001 |
| $C_7H_{15}$—O— | —COO—CHMe—$C_6H_{13}$ | R | K 62 | C° 78 A 971 |
| $C_8H_{17}$—O— | —COO—CHMe—$C_6H_{13}$ | R | K 68 | C° 83 A 991 |

TABLE 542

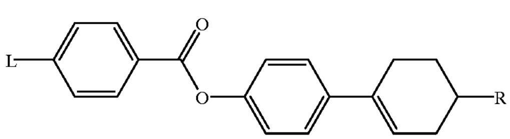

| L | R | | Cr | LC |
|---|---|---|---|---|
| $Me_3S1$—O—$Me_2Si$—$C_4H_9$— | —$C_3H_7$ | 2 | K 65 | G 88 C 931 |
| $Me_3S1$—$CH_2$—$S1Me_2$—$C_4H_9$— | —$C_3H_7$ | 2 | K 45 | C 851 |
| $Me_3S1$—$C_2H_4$—$S1Me_2$—$C_4H_9$— | —$C_3H_7$ | 2 | K 73 | E 77 C 841 |
| $Me_3S1$—($CH_2$—$S1Me_2$)$_2$—$C_4H_9$— | —$C_3H_7$ | 2 | K ? | G 43 C 711 |
| ($Me_3S1$—$CH_2$)$_2$—S1Me—$C_2H_4$—$S1Me_2$—$C_4H_9$— | —$C_3H_7$ | 2 | K ? | G 45 C 551 |
| $Me_3S1$—$C_2H_4$—$S1Me_2$—O—$S1Me_2$—$C_4H_9$— | —$C_3H_7$ | 2 | K 28 | C 721 |

TABLE 543

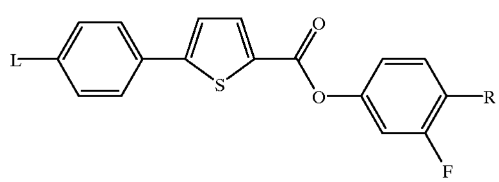

| L | R | Cr | LC |
|---|---|---|---|
| $C_7H_{15}$— | —O—$C_6H_{13}$ | K 74 | C 77.9 A 123.31 |
| $C_7H_{15}$— | —O—$C_8H_{17}$ | K 78.8 | C 77.9 A 1221 |
| $C_8H_{17}$— | —O—$C_6H_{13}$ | K 70 | C 99 A 122.31 |
| $C_8H_{17}$— | —O—$C_8H_{17}$ | K 77.3 | C 100.2 A 120.31 |
| $C_9H_{19}$— | —O—$C_6H_{13}$ | K 66.5 | C 103.5 A 123.81 |
| $C_9H_{19}$— | —O—$C_8H_{17}$ | K 72.9 | C 107.4 A 121.71 |

TABLE 544

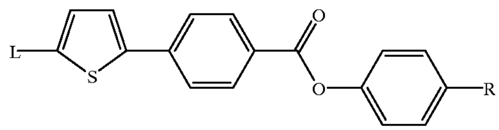

| L | R | Cr | LC |
|---|---|---|---|
| $C_8H_{17}$— | —$C_7H_{15}$ | K 60 | E 54.6 B 81.8 A 128.2 N 128.61 |
| $C_8H_{17}$— | —$C_8H_{17}$ | K 70 | E 47.4 B 82.2 A 126.61 |
| $C_4H_9$— | —O—$C_8H_{17}$ | K 84.4 | C 73.9 N 149.51 |
| $C_4H_9$— | —O—$C_9H_{19}$ | K 92 | C 78.6 N 141.71 |
| $C_4H_9$— | —O—$C_{10}H_{21}$ | K 88.8 | C 82.8 N 143.81 |
| $C_8H_{17}$— | —O—$C_5H_{11}$ | K 88.9 | E 84.3 B 99.7 A 137.6 N 147.31 |
| $C_8H_{17}$— | —O—$C_6H_{13}$ | K 86.1 | E 75.9 B 99.7 C 120.7 A 138.6 N 148.91 |
| $C_8H_{17}$— | —O—$C_7H_{15}$ | K 91.7 | E 73.3 B 97.8 C 125.6 A 138.8 N 146.21 |
| $C_8H_{17}$— | —O—$C_8H_{17}$ | K 87 | E 70.1 B 95.2 C 130.5 A 139.5 N 146.41 |
| $C_8H_{17}$— | —O—$C_9H_{19}$ | K 95.6 | E 68.9 B 95.5 C 130 A 139.5 N 143.21 |
| $C_8H_{17}$— | —O—$C_{10}H_{21}$ | K 92.3 | E 66.2 B 93.5 C 131 A 138.9 N 142.61 |
| $C_{10}H_{21}$— | —O—$C_5H_{11}$ | K 90.1 | H 81.5 B 102.8 C 119.6 A 141.1 N 143.21 |
| $C_{10}H_{21}$— | —O—$C_6H_{13}$ | K 89.5 | H 70 B 99.4 C 131.5 A 142.7 N 145.31 |
| $C_{10}H_{21}$— | —O—$C_7H_{15}$ | K 94.2 | H 65.5 B 100.5 C 135.7 A 141.7 N 143.11 |
| $C_{10}H_{21}$— | —O—$C_8H_{17}$ | K 93 | H 62.2 B 99.5 C 138 A 142 N 142.91 |
| $C_{10}H_{21}$— | —O—$C_9H_{19}$ | K 97 | H 60.5 B 99.9 C 137.8 A 141.11 |
| $C_{10}H_{21}$— | —O—$C_{10}H_{21}$ | K 96.5 | B 99.5 C 138.3 A 140.71 |
| $C_{12}H_{25}$— | —O—$C_5H_{11}$ | K 95.8 | H 83.2 G 93.4 B 109.8 C 123.9 A 140.41 |
| $C_{12}H_{25}$— | —O—$C_6H_{13}$ | K 95.8 | H 86.5 B 103.1 C 134 A 142.11 |
| $C_{12}H_{25}$— | —O—$C_7H_{15}$ | K 97.4 | H 82 B 102.5 C 137.1 A 140.41 |
| $C_{12}H_{25}$— | —O—$C_8H_{17}$ | K 97.4 | H 69 B 101.3 C 139.6 A 140.91 |
| $C_{12}H_{25}$— | —O—$C_9H_{19}$ | K 99.8 | H 63.7 B 102.2 C 139.61 |
| $C_{12}H_{25}$— | —O—$C_{10}H_{21}$ | K 97.9 | B 102.2 C 139.31 |

TABLE 545

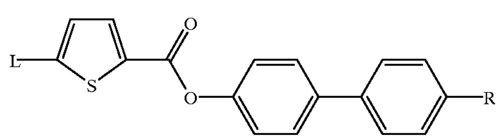

| L | R | Cr | LC |
|---|---|---|---|
| $C_6H_{13}$— | —Br | K 104.5 | S 141.5 N 146.51 |
| $C_{10}H_{21}$— | —Br | K 95 | S 1431 |
| $C_{12}H_{25}$— | —Br | K 100.5 | S 144.51 |
| $C_3H_7$— | —CN | K 133.1 | A 107.3 N 209.11 |

TABLE 545-continued

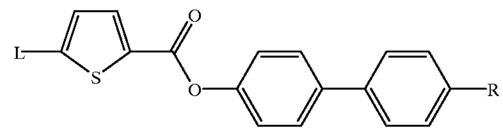

| L | R | Cr | LC |
|---|---|---|---|
| $C_{12}H_{25}$— | —CN | K 98.5 | S 1651 |
| $C_6H_{13}$— | —COO—$C_3H_6$—S1Me$_2$C$_4$H$_9$ | K 45 | S-17 C 41 A 701 |
| H— | —O—$C_8H_{17}$ | K 116.7 | F 93 N 116.51 |
| H— | —O—$C_9H_{19}$ | K 113 | F 94.6 N 114.51 |
| H— | —O—$C_{10}H_{21}$ | K 110.8 | F 96.5 N 1161 |
| H— | —O—$C_{12}H_{25}$ | K 114.6 | B 99.6 C 99.7 N 115.21 |
| $C_2H_5$— | —$C_9H_{19}$ | K 89.7 | G 95 N 114.61 |
| $C_2H_5$— | —$C_{10}H_{21}$ | K 72 | G 66.4 N 109.71 |
| $C_3H_7$— | —$C_8H_{17}$ | K 88.9 | G 73.6 N 110.81 |
| $C_3H_7$— | —$C_9H_{19}$ | K 88.2 | G 76.7 N 113.31 |
| $C_3H_7$— | —$C_{10}H_{21}$ | K 83 | G 74.1 N 110.81 |
| $C_4H_9$— | —$C_8H_{17}$ | K 90 | G 79 N 104.31 |
| $C_4H_9$— | —$C_9H_{19}$ | K 71.1 | G 81.6 N 106.61 |
| $C_4H_9$— | —$C_{10}H_{21}$ | K 70 | K 79.5 J 80.5 F 81.5 I 82.7 N 103.71 |
| $C_5H_{11}$— | —$C_8H_{17}$ | K 82.4 | G 82.3 N 108.51 |
| $C_5H_{11}$— | —$C_9H_{19}$ | K 80 | G 85.8 N 110.21 |
| $C_5H_{11}$— | —$C_{10}H_{21}$ | K 73.2 | K 78.9 J 82.5 F 84.3 I 86.3 C 87.7 N 106.71 |
| $C_6H_{13}$— | —$C_8H_{17}$ | K 78 | K 80.7 J 82.2 I 85 C 86.7 N 104.51 |
| $C_6H_{13}$— | —$C_9H_{19}$ | K 74.5 | K 82.6 J 85.4 F 87 I 88.3 C 91.4 N 107.21 |
| $C_6H_{13}$— | —$C_{10}H_{21}$ | K 67.4 | K 79.2 J 80.9 F 85 I 88 C 92.8 N 103.81 |
| $C_7H_{15}$— | —$C_8H_{17}$ | K 88 | K 88 J 76 I 81.6 C 91.6 N 107.41 |
| $C_7H_{15}$— | —$C_9H_{19}$ | K 86.3 | K 79 J 82.2 F 84.8 I 86.4 C 98 N 110.21 |
| $C_7H_{15}$— | —$C_{10}H_{21}$ | K 76.8 | K 76.6 J 78.1 F 83.4 I 86.5 C 96.6 N 106.71 |
| $C_8H_{17}$— | —$C_8H_{17}$ | K 87.3 | J 71.1 I 80 C 96.3 N 106.71 |
| $C_8H_{17}$— | —$C_9H_{19}$ | K 88.8 | J 76.4 F 82.6 I 84.9 C 100.6 N 108.11 |
| $C_8H_{17}$— | —$C_{10}H_{21}$ | K 75.8 | K 66.1 J 74 F 38.9 I 86.7 C 103 N 1071 |

TABLE 546

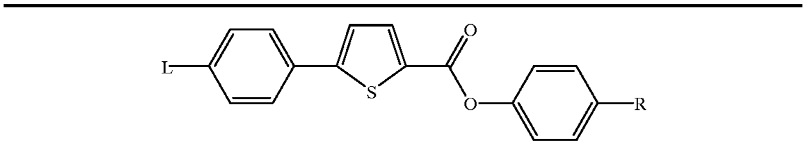

| L | R | Cr | LC |
|---|---|---|---|
| $C_5H_{11}$— | —O—$C_8H_{17}$ | K 86.3 | C 88.3 N 132.41 |
| $C_6H_{13}$— | —O—$C_8H_{17}$ | K 87 | C 102.2 N 126.81 |
| $C_7H_{15}$— | —O—$C_8H_{17}$ | K 87.3 | I 76.4 C 112.6 A 129 N 130.91 |

TABLE 546-continued

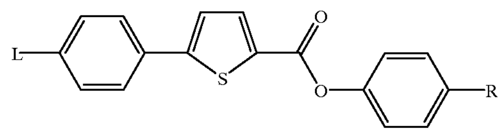

| L | R | | Cr | LC |
|---|---|---|---|---|
| $C_8H_{17}$— | —O—$C_8H_{17}$ | | K 87.6 | I 83.4 C 120 A 125 B 128.21 |
| $C_9H_{19}$— | —O—$C_8H_{17}$ | | K 84.6 | B 92.3 C 124.7 A 129 N 129.51 |
| $C_{10}H_{21}$— | —O—$C_8H_{17}$ | | K 87.8 | G 94.3 C 127.2 A 128.31 |
| $C_{10}H_{21}$—O— | —COO—CHMe—$C_6H_{13}$ | 1 | K ? | CA ? C-g ? C° ? 1 |
| $C_{12}H_{25}$—O— | —COO—CHMe—$C_6H_{13}$ | 1 | K ? | CA ? C-g ? C° ? 1 |

TABLE 547

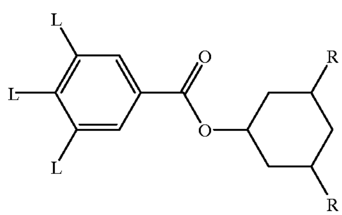

| L | R | Cr | LC |
|---|---|---|---|
| $C_{10}H_{21}$—O— | —OOC—$C_{10}H_{21}$ | K 40.7 | P-321 |

TABLE 548

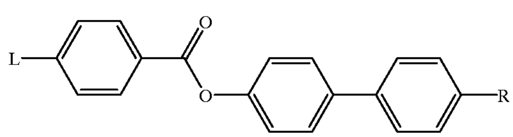

| L | R | | Cr | LC |
|---|---|---|---|---|
| $C_2H_5$—CHMe—$CH_2$— | —O—$C_7H_{15}$ | B | K 65 | J° 85 I° 81 C° 110 N° 1541 |
| $C_2H_5$—CHMe—$CH_2$— | —O—$C_8H_{17}$ | S | K 60 | J° 90 I° 92 C° 114 N° 1631 |
| $C_2H_5$—CHMe—$CH_2$— | —O—$C_9H_{19}$ | S | K 89 | J° 88 I° 90 C° 116 N° 1521 |
| $C_2H_5$—CHMe—$CH_2$— | —O—$C_{10}H_{21}$ | S | K 65 | J° 78 I° 87 C° 117 N° 1481 |
| $C_2H_5$—CHMe—$CH_2$— | —O—$C_{12}H_{25}$ | S | K 50 | J° 70 I° 87 C° 116 N° 1381 |
| $C_2H_5$—CHMe—$CH_2$— | —O—$C_{14}H_{29}$ | 1 | K 80.8 | C° 93.1 A 130.8U |
| $C_2H_5$—CHMe—$CH_2$— | —O—$C_{10}H_{21}$ | 2 | K 55 | J 78.8 I 90 C 117.3 N 151.61 |
| $C_2H_5$—CHMe—$CH_2$—O—$C_2H_4$— | —O—$C_{10}H_{21}$ | S | K 79.5 | S 75 C° 115.51 |
| $C_2H_5$—CHMe—$CH_2$—O—CHMe— | —O—$C_{10}H_{21}$ | 3 | K 89 | C° 951 |
| $C_2H_5$—CHMe—$CH_2$—NMe—$CH_2$— | —O—$C_8H_{17}$ | S | K 68 | S 103 C° 114 N° 1281 |
| $C_2H_5$—CHMe—$CH_2$—NMe—$CH_2$— | —O—$C_{12}H_{25}$ | S | K <25 | S 93 C° 111 N° 1151 |
| $C_2H_5$—CHMe—$CH_2$—NMe—$CH_2$— | —O—$C_{14}H_{29}$ | S | K 48 | S 83 C° 105 N° 1091 |
| $C_2H_5$—CHMe—$CH_2$—NMe—$CH_2$— | —O—$C_{16}H_{33}$ | S | K 65 | S 82 C° 104 N° 1071 |
| $C_2H_5$—CHMe—$CH_2$—NMe—$CH_2$— | —O—$C_{18}H_{37}$ | S | K 72 | S 75 C° 104 N° 1071 |
| $C_2H_5$—CHMe—$CH_2$—O— | —O—$C_8H_{17}$ | S | K 136.5 | C° 128.8 N° 1741 |
| $C_6H_{13}$—CHMe—$CH_2$—O— | —O—$C_8H_{17}$ | 1 | K 108.2 | C° 125.3 N° 141.31 |
| $C_2H_5$—CHMe—$CH_2$—OOC— | —O—$C_6H_{13}$ | 1 | K 94 | E 121.3 B 125.8 A 165.9 N° 177.51 |
| $C_2H_5$—CHMe—$CH_2$—OOC— | —O—$C_8H_{17}$ | 1 | K 85.3 | E 102 B 119 C° 126.9 A 162.9 N° 170.41 |
| $C_2H_5$—CHMe—$CH_2$—OOC— | —O—$C_{10}H_{21}$ | 1 | K 85.5 | B 97.9 C° 143.5 A 158.8 N° 162.71 |
| $C_2H_5$—CHMe—$CH_2$—COO— | —O—$C_8H_{17}$ | S | K 110 | C° 148.3 N° 169.91 |
| $C_2H_5$—CHMe—$CH_2$—O—CHMe—COO— | —O—$C_7H_{15}$ | 3 | K 120 | C° 130 N° 1341 |

TABLE 548-continued

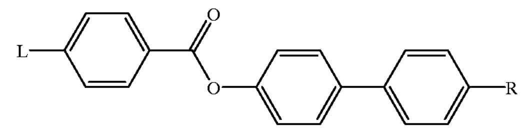

| L | R | | Cr | LC |
|---|---|---|---|---|
| $C_2H_5$—CHMe—$CH_2$—O—CHMe—COO— | —O—$C_8H_{17}$ | 3 | K 115 | C° 135 N° 1391 |
| $C_2H_5$—CHMe—$CH_2$—O—CHMe—COO— | —O—$C_9H_{19}$ | 3 | K 104 | C° 131 N° 1331 |
| $C_2H_5$—CHMe—$CH_2$—O—CHMe—COO— | —O—$C_{10}H_{21}$ | 3 | K 103 | C° 1341 |
| $C_2H_5$—CHMe—$CH_2$—O—CHMe—COO— | —O—$C_{12}H_{25}$ | 3 | K 106 | C° 1291 |
| $C_2H_5$—CHMe—$CH_2$—OCOO— | —O—$C_6H_{13}$ | S | K 99.7 | C° 125.1 N° 1851 |
| $C_2H_5$—CHMe—$CH_2$—OCOO— | —O—$C_8H_{17}$ | S | K 104 | C° 135.9 N° 173.81 |
| $C_2H_5$—CHMe—$CH_2$—OCOO— | —O—$C_9H_{19}$ | S | K 102.8 | C° 139.8 N° 170.41 |
| $C_2H_5$—CHMe—$CH_2$—OCOO— | —O—$C_{10}H_{21}$ | S | K 106.8 | C° 142.9 N° 168.81 |
| $C_2H_5$—CHMe—$CH_2$— | —O—$C_2H_4$<br>—O—$C_4H_9$ | S | K ? | S 64 C° 76 A 92 N° 1261 |

TABLE 549

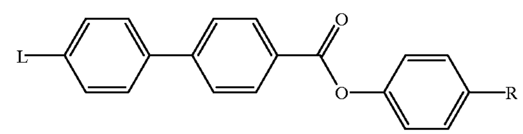

| L | R | | Cr | LC |
|---|---|---|---|---|
| $C_3H_7$— | —COO—$CH_2$—CHMe—$C_2H_5$ | 1 | K 127 | A 158 N° 1661 |
| $C_5H_{11}$— | —COO—$CH_2$—CHMe—$C_2H_5$ | 1 | K 89 | A 161.8 N° 162.91 |
| $C_6H_{13}$— | —COO—$CH_2$—CHMe—$C_2H_5$ | 1 | K 68 | C° 86 A 1571 |
| $C_7H_{15}$— | —COO—$CH_2$—CHMe—$C_2H_5$ | 1 | K 62 | C° 90 A 1581 |
| $C_8H_{17}$— | —COO—$CH_2$—CHMe—$C_2H_5$ | 1 | K 67 | C° 101 A 1531 |
| $C_9H_{19}$— | —COO—$CH_2$—CHMe—$C_2H_5$ | 1 | K 53 | C° 100 A 1511 |
| $C_{10}H_{21}$— | —COO—$CH_2$—CHMe—$C_2H_5$ | 1 | K 57 | C° 102 A 1461 |
| $C_{12}H_{25}$— | —COO—$CH_2$—CHMe—$C_2H_5$ | 1 | K 42 | C° 81 A 175U |
| $C_5H_{11}$— | —COO—$CH_2$—CHMe—$C_2H_5$ | 2 | K 106.5 | A 1631 |
| $C_8H_{17}$— | —COO—$CH_2$—CHMe—$C_2H_5$ | 2 | K 68.9 | I 51.4 C 103.6 A 154.51 |
| $C_8H_{17}$— | —COO—$CH_2$—CHMe—$C_3H_7$ | 2 | K 57.2 | I 36.4 C 93.7 A 150.41 |
| $C_8H_{17}$— | —COO—$CH_2$—CHMe—$C_4H_9$ | 2 | K 54.5 | I 35.7 C 91.7 A 1451 |
| $C_7H_{15}$— | —OCOO—$CH_2$—CHMe—$C_2H_5$ | S | K 88.8 | B 105 A 160.7 N° 163.81 |
| $C_8H_{17}$— | —OCOO—$CH_2$—CHMe—$C_2H_5$ | S | K 78.3 | A 150.2 N° 165.21 |
| $C_4H_9$—O— | —$CH_2$—CHMe—$C_2H_5$ | S | K 107 | E 102 A 174 N° 1931 |
| $C_5H_{11}$—O— | —$CH_2$—CHMe—$C_2H_5$ | S | K 91 | E 70 B 96 A 172 N° 186 |
| $C_6H_{13}$—O— | —$CH_2$—CHMe—$C_2H_5$ | S | K 88.5 | J° 84 C° 103.5 A 172 N° 1821 |
| $C_7H_{15}$—O— | —$CH_2$—CHMe—$C_2H_5$ | S | K 86.5 | K 66 J° 70 I° 79 C° 126 A 170 N° 1771 |
| $C_8H_{17}$—O— | —$CH_2$—CHMe—$C_2H_5$ | S | K 77 | K 61 J° 72 I° 80 C° 132 A 171 N° 1741 |
| $C_9H_{19}$—O— | —$CH_2$—CHMe—$C_2H_5$ | S | K 82 | K 61 J° 70 I° 79 C° 133 A 169 N° 1711 |
| $C_{10}H_{21}$—O— | —$CH_2$—CHMe—$C_2H_5$ | S | K 38 | K 60 J° 70 I° 79 C° 133 A 1671 |
| $C_{12}H_{25}$—O— | —$CH_2$—CHMe—$C_2H_5$ | S | K 74 | J° 68 I° 79 C° 131 A 1621 |
| $C_{14}H_{29}$—O— | —$CH_2$—CHMe—$C_2H_5$ | S | K 73 | J° 67 I° 79 C° 124 A 1571 |
| $C_{16}H_{33}$—O— | —$CH_2$—CHMe—$C_2H_5$ | S | K 68 | J° 65 I° 79 C° 120 A 1541 |
| $C_{18}H_{37}$—O— | —$CH_2$—CHMe—$C_2H_5$ | S | K 71 | J° 64.5 I° 79 C° 118 A 1501 |
| $C_4H_9$—O— | —$CH_2$—CHMe—$C_2H_5$ | 2 | K 107 | E 103 A 174 N 1921 |
| $C_5H_{11}$—O— | —$CH_2$—CHMe—$C_2H_5$ | 2 | K 90 | E 72 B 98 A 172 N 1861 |
| $C_6H_{13}$—O— | —$CH_2$—CHMe—$C_2H_5$ | 2 | K 88 | G 84 C 103 A 172 N 1821 |
| $C_7H_{15}$—O— | —$CH_2$—CHMe—$C_2H_5$ | 2 | K 86 | H 66 G 70 F 79 C 126 A 170 N 1771 |
| $C_8H_{17}$—O— | —$CH_2$—CHMe—$C_2H_5$ | 2 | K 74 | K 61 J 72 I 79 C 132 A 171 N 1741 |

TABLE 550

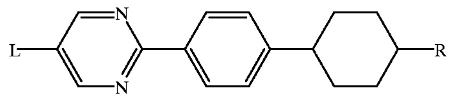

| LCReg | L | R | Phases |
|---|---|---|---|
| 24794 | $C_2H_5$— | —$C_2H_5$ | Cr 115.9 N 158.0 |
| 24795 | $C_3H_7$— | —$C_2H_5$ | Cr 100.0 N 173.0 |
| 24796 | $C_5H_{11}$ | —$C_2H_5$ | Cr 91.0 N 162.0 |
| 24797 | $C_2H_5$— | —$C_3H_7$ | Cr 109.0 N 184.0 |
| 24798 | $C_3H_7$— | —$C_3H_7$ | Cr 97.0 N 198.0 |
| 24799 | $C_5H_{11}$— | —$C_3H_7$ | Cr 92.0 N 184.0 |
| 61401 | $C_7H_{15}$— | —$C_3H_7$ | Cr 106.0 N 169.0 |
| 61404 | $C_{10}H_{21}$— | —$C_3H_7$ | Cr 72.0 C 77.0 A 116.0 N 151.0 |

TABLE 550-continued

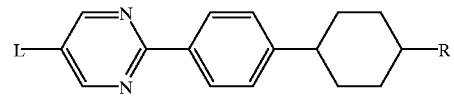

| LCReg | L | R | Phases |
|---|---|---|---|
| 4800 | $C_2H_5$— | —$C_5H_{11}$ | Cr 116.0 N 178.0 |
| 24801 | $C_3H_7$— | —$C_5H_{11}$ | Cr 101.0 N 187.0 |
| 24802 | $C_5H_{11}$— | —$C_5H_{11}$ | Cr 73.0 N 177.0 |
| 61402 | $C_7H_{15}$— | —$C_5H_{11}$ | Cr 75.0 N 162.0 |
| 24803 | $C_8H_{17}$ | —$C_5H_{11}$ | Cr 74.0 C 88.0 A 103.0 N 158.0 |
| 24804 | $C_{10}H_{21}$— | —$C_5H_{11}$ | Cr 60.0 B 83.0 C 93.0 A 131.0 N 152.0 |
| 61403 | $C_7H_{15}$— | —$C_7H_{15}$ | Cr 64.0 C 63.0 A 102.0 N 158.0 |

TABLE 551

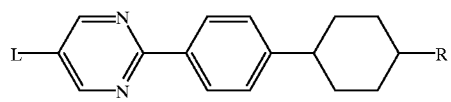

| LCReg | L | R | Phases |
|---|---|---|---|
| 61406 | $C_{10}H_{21}$— | —$C_7H_{15}$ | Cr 50.0 S 2.0 B 101.0 A 136.0 N 149.0 |
| 61407 | $C_7H_{15}$— | —O—$C_4H_9$ | Cr 59.0 B 92.0 A 137.0 N 143.0 |
| 61409 | $C_{10}H_{21}$— | —O—$C_4H_9$ | Cr 59.0 B 92.0 A 137.0 N 143.0 |
| 61411 | $C_{10}H_{21}$— | —OOC—$C_3H_7$ | Cr 82.0 B 116.0 A 150.0 N 158.0 |
| 24805 | $C_8H_{17}$—O— | —$C_5H_{11}$ | Cr 65.0 F 83.0 C 119.0 N 181.0 |
| 61408 | $C_9H_{19}$—O— | —$C_5H_{11}$ | Cr 73.0 C 128.0 A 139.0 N 176.0 |
| 61410 | $C_9H_{19}$—O— | —O—$C_4H_9$ | Cr 88.0 C 85.0 A 153.0 N 167.0 |
| 24806 | $C_4H_9$—CMe2—$C_6H_{12}$—O— | —$C_3H_7$ | Cr 48.0 A 85.0 N 117.0 |
| 61443 | $C_6H_{13}$—COO— | —$C_5H_{11}$ | Cr 112.0 N 188.0 |
| 61444 | $C_7H_{15}$—COO— | —$C_5H_{11}$ | Cr 118.0 N 185.0 |
| 61412 | $C_8H_{17}$—COO— | —$C_5H_{11}$ | Cr 122.0 C 113.0 N 178.0 |
| 61446 | $C_9H_{19}$—COO— | —$C_5H_{11}$ | Cr 120.0 C 125.0 N 177.0 |
| 61447 | $C_{10}H_{21}$—COO— | —$C_5H_{11}$ | Cr 118.0 C 133.0 N 172.0 |
| 61448 | $C_{11}H_{23}$—COO— | —$C_5H_{11}$ | Cr 120.0 C 138.0 N 169.0 |
| 61449 | $C_3H_7$—CH═CH—$CH_2$—O— | —$C_5H_{11}$ | Cr 99.9 N 187.0 |

TABLE 552

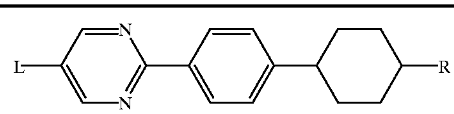

| LCReg | L | R | Phases |
|---|---|---|---|
| 61450 | $C_4H_9$—CH═CH—$CH_2$—O— | —$C_5H_{11}$ | Cr 99.0 N 177.0 |
| 61451 | $C_5H_{11}$—CH═CH—$CH_2$—O— | —$C_5H_{11}$ | Cr 97.0 C 115.0 N 176.0 |
| 61452 | $C_6H_{13}$—CH═CH—$CH_2$—O— | —$C_5H_{11}$ | Cr 94.0 C 125.0 N 170.0 |
| 61453 | $C_7H_{15}$—CH═CH—$CH_2$—O— | —$C_5H_{11}$ | Cr 86.0 C 135.0 N 167.0 |
| 61454 | $C_8H_{17}$—CH═CH—$CH_2$—O— | —$C_5H_{11}$ | Cr 93.0 C 140.0 N 163.0 |
| 61405 | $C_3H_7$—CH═CH—$C_3H_6$—O— | —$C_5H_{11}$ | Cr 87.0 C 93.0 N 184.0 |
| 61455 | $H_2C$═CH—$C_4H_8$—O— | —$C_5H_{11}$ | Cr 82.0 N 184.0 |
| 61456 | $H_2C$═CH—$C_5H_{10}$—O— | —$C_5H_{11}$ | Cr 55.0 C 65.0 A 112.0 N 185.0 |
| 61420 | $CH_3$—CH═CH—$C_5H_{10}$—O— | —$C_5H_{11}$ | Cr 81.0 C 111.0 A 130.0 N 185.0 |
| 61457 | $H_2C$═CH—$C_6H_{12}$—O— | —$C_5H_{11}$ | Cr 67.0 C 96.0 A 121.0 N 176.0 |
| 61458 | $H_2C$═CH—$C_7H_{14}$—O— | —$C_5H_{11}$ | Cr 59.0 C 91.0 A 142.0 N 176.0 |
| 61459 | $H_2C$═CH—$C_8H_{16}$—O— | —$C_5H_{11}$ | Cr 55.0 C 103.0 A 145.0 N 169.0 |
| 61419 | $H_2C$═CH—$C_9H_{18}$—O— | —$C_5H_{11}$ | Cr 57.0 C 97.0 A 151.0 N 168.0 |
| 61435 | $C_4H_9$—CH%CH—$C_2H_4$—O— | —$C_5H_{11}$ | Cr 93.0 N 161.0 |
| 61445 | $C_2H_5$—CH%CH—$C_4H_8$—O— | —$C_5H_{11}$ | Cr 86.0 C 95.0 N 168.0 |

TABLE 553

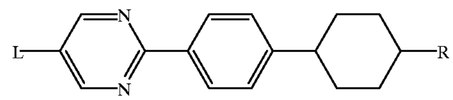

| LCReg | L | R | Phases |
|---|---|---|---|
| 24812 | $H_2C/CH_2$¥CH—$C_4H_8$—O— | —$C_5H_{11}$ | Cr 81.0 S 75.0 N 180.0 |
| 24813 | $H_2C/CH_2$¥CH—$C_6H_{12}$—O— | —$C_3H_7$ | Cr 80.0 S 70.0 C 84.0 N 174.0 |
| 24814 | $H_2C/CH_2$¥CH—$C_6H_{12}$—O— | —$C_5H_{11}$ | Cr 63.0 S 93.0 C 100.0 N 173.0 |
| 24815 | $H_2C/CH_2$¥CH—$C_8H_{16}$—O— | —$C_3H_7$ | Cr 86.0 C 111.0 A 123.0 N 165.0 |
| 24816 | $H_2C/CH_2$¥CH—$C_8H_{16}$—O— | —$C_5H_{11}$ | Cr 75.0 C 122.0 A 134.0 N 164.0 |

TABLE 554

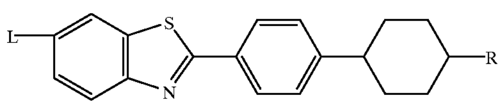

| LCReg | L | R | Phases |
|---|---|---|---|
| 24981 | $C_6H_{13}$— | —$C_5H_{11}$ | Cr 67.0 S 125.0 A 204.0 N 214.0 |

TABLE 555

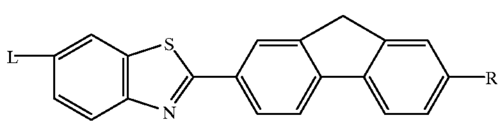

| LCReg | L | R | Phases |
|---|---|---|---|
| 7527 | $C_6H_{13}$— | —$C_6H_{13}$ | (158.0) Cr 170.0 S 172.0 A 236.0 |

TABLE 556

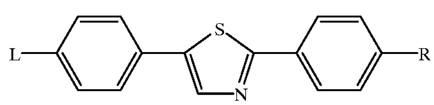

| LCReg | L | R | Phases |
|---|---|---|---|
| 22823 | H— | —O—$C_6H_{13}$ | Cr 73.0 N 88.0 |
| 22826 | Me3Si—$C_3H_6$—O— | —$C_6H_{13}$ | (91.0) Cr 96.0 C 109.0 |
| 22827 | $C_4H_9$SiMe2—$C_3H_6$—COO— | —$C_6H_{13}$ | (49.0) Cr 51.0 C 90.0 |
| 22828 | $C_6H_{13}$— | —$C_6H_{13}$ | (51.0) Cr 68.8 A 116.5 N 120.1 |
| 22829 | $C_9H_{19}$— | —$C_6H_{13}$ | (51.0) Cr 61.0 C 72.0 A 126.8 |
| 22830 | $CH_3$—O— | —$CH_3$ | Cr 142.0 N 177.0 |
| 22831 | $CH_3$—O— | —$C_2H_5$ | Cr 95.0 N 161.5 |
| 22832 | $CH_3$—O— | —$C_3H_7$ | Cr 106.0 N 172.0 |
| 22833 | $CH_3$—O— | —$C_4H_9$ | Cr 116.0 N 156.0 |
| 22834 | $CH_3$—O— | —$C_5H_{11}$ | Cr 103.0 N 163.0 |
| 22835 | $CH_3$—O— | —$C_6H_{13}$ | Cr 96.0 N 152.0 |
| 22836 | $CH_3$—O— | —$C_{10}H_2$1 | Cr 95.0 N 154.0 |
| 22837 | $C_2H_5$—O— | —$C_6H_{13}$ | Cr 68.0 N 164.0 |
| 22838 | $C_3H_7$—O— | —$C_6H_{13}$ | Cr 79.0 C 70.0 A 101.0 N 147.5 |
| 22841 | $CH_3$—O— | —O—$C_3H_7$ | Cr 104.0 N 195.5 |

TABLE 557

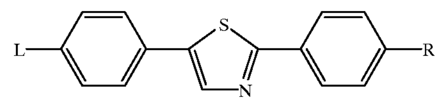

| LCReg | L | R | Phases |
|---|---|---|---|
| 22842 | $CH_3$—O— | —O—$C_4H_9$ | Cr 88.0 N 173.0 |
| 22843 | $CH_3$—O— | —O—$C_5H_{11}$ | Cr 90.0 N 184.5 |
| 22844 | $CH_3$—O— | —O—$C_6H_{13}$ | Cr 82.0 N 173.0 |
| 22845 | $CH_3$—O— | —O—$C_7H_{15}$ | Cr 97.0 N 176.5 |
| 22846 | $CH_3$—O— | —O—$C_8H_{17}$ | Cr 93.0 N 162.0 |
| 22847 | $CH_3$—O— | —O—$C_9H_{19}$ | Cr 103.0 N 166.0 |
| 22848 | $CH_3$—O— | —O—$C_{10}H_{21}$ | Cr 87.0 N 156.0 |
| 22849 | $C_2H_5$—O— | —O—$C_6H_{13}$ | Cr 101.0 N 189.5 |
| 22850 | $C_3H_7$—O— | —O—$C_6H_{13}$ | Cr 98.0 N 173.5 |
| 22851 | $C_3H_7$—O— | —O—$C_8H_{17}$ | Cr 78.0 C 98.0 N 161.0 |
| 22852 | $C_4H_9$—COO— | —$C_6H_{13}$ | (96.0) Cr 101.9 C 128.5 N 149.4 |
| 22853 | $C_6H_{13}$—COO— | —$C_6H_{13}$ | (−10.0) Cr 73.1 S 83.2 C 139.3 N 148.7 |
| 22854 | $C_8H_{17}$—COO— | —$C_6H_{13}$ | (45.0) Cr 58.0 S 75.8 C 146.4 N 148.1 |
| 22855 | $C_8H_{17}$—COO— | —$C_8H_{17}$ | (−10.0) Cr 59.4 S 74.5 S 78.5 C 148.5 |
| 22856 | $C_{10}H_{21}$—COO— | —$C_6H_{13}$ | (42.0) Cr 74.9 S 86.2 C 147.0 |

TABLE 558

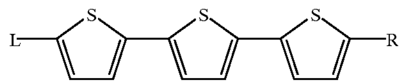

| LCReg | L | R | Phases |
|---|---|---|---|
| 60709 | $C_3H_7$— | —$C_3H_7$ | Cr 50.0 S 74.0 |
| 60710 | $C_4H_9$— | —$C_4H_9$ | Cr 50.0 S 75.0 |
| 60711 | $C_5H_{11}$— | —$C_5H_{11}$ | Cr 53.0 S 77.0 |
| 60712 | $C_6H_{13}$— | —$C_6H_{13}$ | Cr 51.0 S 82.0 |
| 60713 | $C_7H_{15}$— | —$C_7H_{15}$ | Cr 55.0 G 78.0 F 83.0 C 89.0 |
| 60714 | $C_8H_{17}$— | —$C_8H_{17}$ | Cr 65.0 G 72.0 F 87.0 C 91.0 |
| 60715 | $C_9H_{19}$— | —$C_9H_{19}$ | Cr 64.0 G 62.0 F 91.0 C 95.0 |
| 60716 | $C_{10}H_{21}$— | —$C_{10}H_{21}$ | Cr 71.0 F 95.0 C 96.0 |
| 60701 | $C_3H_7$— | —CO—$C_2H_5$ | Cr 155.5 A 166.5 |
| 60702 | $C_4H_9$— | —CO—$C_3H_7$ | Cr 148.3 A 155.7 |
| 60703 | $C_5H_{11}$— | —CO—$C_4H_9$ | Cr 137.2 A 163.0 |
| 60704 | $C_6H_{13}$— | —CO—$C_5H_{11}$ | Cr 138.4 A 162.0 |
| 60705 | $C_7H_{15}$— | —CO—$C_6H_{13}$ | Cr 132.0 C 138.9 A 161.8 |
| 60706 | $C_8H_{17}$— | —CO—$C_7H_{15}$ | Cr 133.0 C 151.0 A 159.7 |
| 60707 | $C_9H_{19}$— | —CO—$C_8H_{17}$ | Cr 129.4 C 154.2 A 158.7 |

TABLE 559

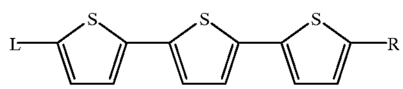

| LCReg | L | R | Phases |
|---|---|---|---|
| 60708 | $C_{10}H_{21}$— | —CO—$C_9H_{19}$ | Cr 127.0 C 152.0 |

TABLE 560

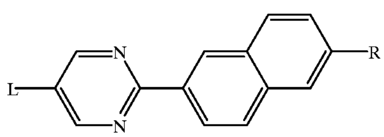

| LCReg | L | R | Phases |
|---|---|---|---|
| 61943 | Br— | —O—$C_8H_{17}$ | Cr ? |
| 6771 | NC— | —$C_7H_{15}$ | Cr 125.6 S 154.1 N 163.7 |
| 6772 | NC— | —O—$C_5H_{11}$ | Cr 135.5 N 191.1 |
| 6773 | $C_2H_5$— | —$C_7H_{15}$ | Cr 63.1 |
| 6774 | $C_4H_9$— | —$C_7H_{15}$ | Cr 56.3 N 55.9 |
| 6775 | $C_5H_{11}$— | —$C_7H_{15}$ | Cr 46.8 N 77.4 |
| 6776 | $C_6H_{13}$— | —$C_7H_{15}$ | Cr 40.4 N 73.5 |
| 6777 | $C_3H_7$— | —O—$C_5H_{11}$ | Cr 104.5 N 98.3 |
| 6778 | $C_4H_9$— | —O—$C_5H_{11}$ | Cr 100.8 |
| 6779 | $C_5H_{11}$— | —O—$C_5H_{11}$ | Cr 114.4 N 99.3 |
| 6780 | $C_6H_{13}$— | —O—$C_5H_{11}$ | Cr 100.3 N 92.0 |
| 61958 | $C_8H_{17}$—O— | —O—$C_8H_{17}$ | Cr 93.0 C 105.0 A 111.0 N 129.0 |
| 6781 | $C_3H_7$—C≡C— | —O—$C_4H_9$ | Cr 136.5 N 146.5 |
| 61959 | $C_4H_9$—OH/O¥CH(t) —$CH_2$—O— | —O—$C_8H_{17}$ | (55.0) Cr 85.0 C*128.4 A 130.5 N*141.0 |

TABLE 561

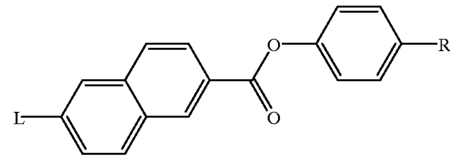

| LCReg | L | R | Phases |
|---|---|---|---|
| 19527 | $C_4H_9$— | —CN | Cr 97.0 N 130.0 |
| 19528 | $C_5H_{11}$— | —CN | Cr 84.5 N 139.5 |
| 19529 | $C_5H_{11}$—O— | —CN | Cr 145.0 N 153.5 |
| 19530 | $C_6H_{13}$—O— | —CN | Cr 102.0 N 148.8 |
| 19531 | $C_7H_{15}$—O— | —CN | Cr 107.0 N 143.1 |
| 19532 | $C_4H_9$— | —$C_2H_4$—CN | Cr 87.5 N 90.0 |
| 19533 | $H_2C$═CH— $C_3H_6$—O— | —CN | Cr 100.0 N 161.5 |
| 19534 | $C_4H_9$— | —$NO_2$ | Cr 96.0 N 110.5 |
| 19535 | $C_4H_9$— | —CH═C(CN)$_2$ | Cr 124.5 N 141.5 |
| 19536 | $C_8H_{17}$— | —CH═C(CN)$_2$ | Cr 114.5 N 136.5 |
| 19537 | $C_{10}H_{21}$—O— | —O—$C_3H_6$—SiMe 2$C_4H_9$ | (−50.0) Cr 38.0 C 67.0 A 89.0 |
| 19539 | $C_4H_9$— | —$C_3H_7$ | Cr 50.0 N 85.0 |
| 19540 | $C_4H_9$— | —$C_4H_9$ | Cr 49.0 N 74.0 |
| 19541 | $C_4H_9$— | —$C_5H_{11}$ | Cr 40.7 N 82.9 |
| 19542 | $C_4H_9$— | —$C_6H_{13}$ | Cr 47.0 N 77.0 |

TABLE 562

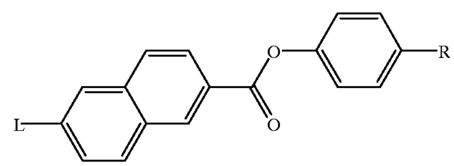

| LCReg | L | R | Phases |
|---|---|---|---|
| 19543 | $C_5H_{11}$— | —$C_4H_9$ | Cr 47.3 N 84.3 |
| 19544 | $C_5H_{11}$— | —$C_5H_{11}$ | Cr 52.9 N 93.2 |
| 19545 | $C_5H_{11}$— | —$C_6H_{13}$ | Cr 49.0 N 82.0 |
| 19546 | $C_6H_{13}$— | —$C_4H_9$ | Cr 53.0 N 75.2 |
| 19547 | $C_6H_{13}$— | —$C_5H_{11}$ | Cr 47.8 N 84.4 |
| 19548 | $C_6H_{13}$— | —$C_6H_{13}$ | Cr 57.4 N 77.2 |
| 19549 | $C_7H_{15}$— | —$C_7H_{15}$ | Cr 83.1 C 58.0 N 109.5 |
| 19550 | $C_8H_{17}$— | —$C_2H_5$ | Cr 66.5 N 66.5 |
| 19551 | $C_6H_{13}$—O— | —$C_5H_{11}$ | Cr 81.0 A 85.0 N 120.0 |
| 19552 | $C_6H_{13}$—O— | —$C_6H_{13}$ | Cr 64.4 N 118.0 |
| 19553 | $C_8H_{17}$—O— | —$C_7H_{15}$ | Cr 73.0 A 106.1 N 111.3 |
| 19554 | $C_4H_9$— | —O—$C_4H_9$ | Cr 79.0 N 116.5 |
| 19555 | $C_4H_9$— | —O—$C_5H_{11}$ | Cr 76.5 N 108.0 |
| 19556 | $C_4H_9$— | —O—$C_6H_{13}$ | Cr 77.5 N 110.5 |
| 19557 | $C_4H_9$— | —O—$C_7H_{15}$ | Cr 82.0 N 106.0 |

TABLE 563

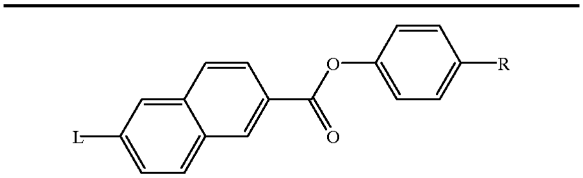

| LCReg | L | R | Phases |
|---|---|---|---|
| 19558 | $C_4H_9$— | —O—$C_8H_{17}$ | Cr 83.5 N 107.0 |
| 19559 | $C_6H_{13}$— | —O—$C_6H_{13}$ | Cr 76.1 N 109.7 |
| 19560 | $C_6H_{13}$— | —O—$C_8H_{17}$ | Cr 76.1 N 109.7 |

TABLE 563-continued

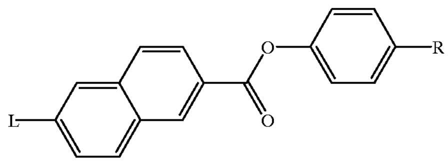

| LCReg | L | R | Phases |
|---|---|---|---|
| 19561 | $C_7H_{15}$— | —O—$C_7H_{15}$ | Cr 83.1 C 58.0 N 109.5 |
| 19562 | $C_8H_{17}$— | —O—$C_6H_{13}$ | Cr 70.0 C 73.0 N 109.0 |
| 19563 | $C_5H_{11}$—O— | —O—$C_8H_{17}$ | Cr 88.4 N 131.4 |
| 19564 | $C_6H_{13}$—O— | —O—$C_7H_{15}$ | Cr 82.0 C 88.4 N 133.4 |
| 19565 | $C_6H_{13}$—O— | —O—$C_8H_{17}$ | Cr 85.1 C 89.1 N 133.3 |
| 19566 | $C_7H_{15}$—O— | —O—$C_7H_{15}$ | Cr 88.9 C 94.7 A 105.5 N 129.8 |
| 19567 | $C_7H_{15}$—O— | —O—$C_8H_{17}$ | Cr 82.5 C 103.8 A 110.7 N 132.2 |
| 19568 | $C_7H_{15}$—O— | —O—$C_9H_{19}$ | Cr 90.4 C 103.0 A 113.8 N 128.0 |
| 19569 | $C_8H_{17}$—O— | —O—$C_7H_{15}$ | Cr 84.7 C 93.8 A 115.7 N 129.7 |
| 19570 | $C_8H_{17}$—O— | —O—$C_8H_{17}$ | Cr 85.5 C 101.8 A 119.8 N 131.0 |
| 19571 | $C_8H_{17}$—O— | —O—$C_9H_{19}$ | Cr 90.0 C 104.2 A 122.4 N 131.8 |
| 19572 | $C_9H_{19}$—O— | —O—$C_8H_{17}$ | Cr 87.0 C 106.3 A 122.5 N 129.8 |

TABLE 565-continued

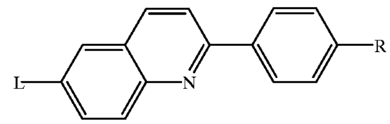

| LCReg | L | R | Phases |
|---|---|---|---|
| 6284 | $C_4H_9$—O— | —$C_4H_9$ | Cr 77.0 N 112.0 |
| 6286 | $C_4H_9$— | —O—$CH_3$ | Cr 96.0 N 100.0 |
| 6287 | $C_4H_9$— | —O—$C_2H_5$ | Cr 93.0 N 124.0 |
| 6288 | $C_4H_9$— | —O—$C_4H_9$ | Cr 89.0 N 118.0 |
| 60022 | $C_5H_{11}$— | —O—$C_5H_{11}$ | Cr 73.0 C 77.0 N 118.0 |
| 60030 | $C_6H_{13}$— | —O—$C_5H_{11}$ | Cr 73.0 C 88.0 N 114.0 |
| 60037 | $C_7H_{15}$— | —O—$C_5H_{11}$ | Cr 71.0 C 96.0 A 98.0 N 118.0 |
| 41316 | $C_8H_{17}$— | —O—$C_5H_{11}$ | Cr 73.0 C 92.0 A 105.0 N 112.0 |

TABLE 564

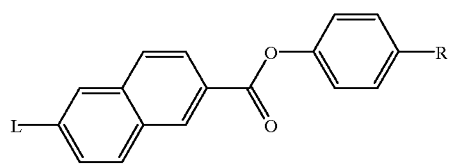

| LCReg | L | R | * | Phases |
|---|---|---|---|---|
| 19573 | $C_9H_{19}$—O— | —O—$C_9H_{19}$ | | Cr 89.4 C 115.5 A 125.7 N 128.4 |
| 19574 | $C_4H_9$— | —CO—$CH_3$ | | Cr 122.0 N 124.0 |
| 19575 | $C_4H_9$— | —CO—$C_2H_5$ | | Cr 123.0 N 154.0 |
| 19576 | $C_4H_9$— | —CO—$C_3H_7$ | | Cr 117.5 N 123.5 |
| 19577 | $C_4H_9$— | —CO—$C_4H_9$ | | Cr 116.0 S 120.0 N 130.0 |
| 19578 | $C_{10}H_{21}$—O— | —COO—CH($C_3H_6$—/—$C_2H_5$) | R | Cr <30.0 A 25.0 |
| 19580 | $C_8H_{17}$—O— | —COO—CHMe—$C_6H_{13}$ | R | Cr 69.3 A 62.1 |
| 19581 | $C_{10}H_{21}$—O— | —COO—CHMe—$C_6H_{13}$ | R | Cr 60.0 A 20.0 |
| 19584 | $C_{10}H_{21}$—O— | —COO—$CH_2$—CHMe—$C_2H_5$ | 1 | Cr 85.2 A 103.6 |
| 62391 | $C_9H_{19}$—O— | —CH═CH—COO—$CHCF_3$—$C_6H_{13}$ | R | Cr 51.0 CA*63.0 A 69.0 |
| 62392 | $C_{10}H_{21}$—O— | —CH═CH—COO—$CHCF_3$—$C_6H_{13}$ | R | Cr 50.0 CA*56.0 A 66.0 |
| 62393 | $C_{11}H_{23}$—O— | —CH═CH—COO—$CHCF_3$—$C_6H_{13}$ | R | Cr 45.0 CA*52.0 A 61.0 |
| 19585 | $C_{10}H_{21}$—O— | —COO—$CHCF_3$—$C_6H_{13}$ | 1 | Cr <−30.0 A 25.0 |
| 19586 | $C_{10}H_{21}$—O— | —COO—$CHCF_3$—$C_8H_{17}$ | 1 | (−5.0) Cr ? S 6.0 A 13.3 |
| 19587 | $C_{10}H_{21}$—O— | —COO—$CHCF_3$—$C_6H_{13}$ | 2 | Cr 52.0 A 61.0 |

TABLE 565

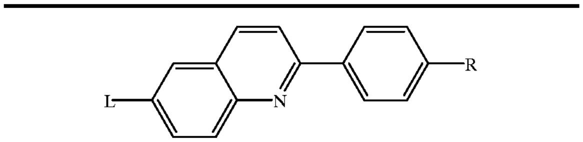

| LCReg | L | R | Phases |
|---|---|---|---|
| 6275 | NC— | —$C_2H_5$ | Cr 124.5 N 138.0 |
| 6276 | NC— | —$C_3H_7$ | Cr 107.0 N 146.5 |
| 6277 | NC— | —$C_4H_9$ | Cr 97.0 N 110.0 |
| 6278 | NC— | —$C_5H_{11}$ | Cr 91.8 N 135.5 |
| 6279 | NC— | —$C_6H_{13}$ | Cr 86.3 N 124.0 |
| 41314 | $C_6H_{13}$— | —$C_8H_{17}$ | Cr 68.0 C 106.0 N 116.0 |
| 6283 | $C_4H_9$—O— | —$C_2H_5$ | Cr 94.0 N 100.0 |

TABLE 566

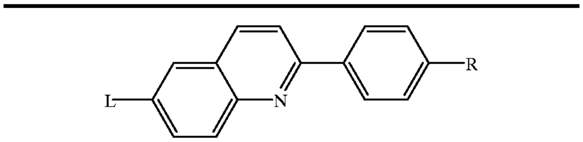

| LCReg | L | R | Phases |
|---|---|---|---|
| 60023 | $C_5H_{11}$— | —O—$C_6H_{13}$ | Cr 68.0 C 93.0 N 125.0 |
| 60031 | $C_6H_{13}$— | —O—$C_6H_{13}$ | Cr 66.0 C 98.0 N 117.0 |
| 60038 | $C_7H_{15}$— | —O—$C_6H_{13}$ | Cr 65.0 C 104.0 A 106.0 N 121.0 |
| 41317 | $C_8H_{17}$— | —O—$C_6H_{13}$ | Cr 69.0 C 104.0 A 113.0 N 117.0 |
| 60024 | $C_5H_{11}$— | —O—$C_7H_{15}$ | Cr 73.0 C 98.0 N 121.0 |
| 60032 | $C_6H_{13}$— | —O—$C_7H_{15}$ | Cr 70.0 C 105.0 N 116.0 |
| 60039 | $C_7H_{15}$— | —O—$C_7H_{15}$ | Cr 70.0 C 109.0 A 113.0 N 120.0 |

TABLE 566-continued

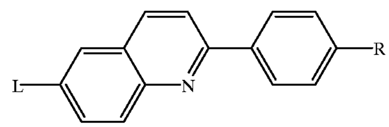

| LCReg | L | R | Phases |
|---|---|---|---|
| 41318 | $C_8H_{17}$— | —O—$C_7H_{15}$ | Cr 71.0 C 109.0 A 115.0 N 116.0 |
| 60025 | $C_5H_{11}$— | —O—$C_8H_{17}$ | Cr 72.0 C 104.0 N 120.0 |
| 60033 | $C_6H_{13}$— | —O—$C_8H_{17}$ | Cr 68.0 C 106.0 N 116.0 |
| 60040 | $C_7H_{15}$— | —O—$C_8H_{17}$ | Cr 70.0 C 109.0 A 117.0 N 120.0 |
| 41319 | $C_8H_{17}$— | —O—$C_8H_{17}$ | Cr 69.0 C 113.0 A 118.0 |
| 60026 | $C_5H_{11}$— | —O—$C_9H_{19}$ | Cr 76.0 C 107.0 A 109.0 N 118.0 |
| 60034 | $C_6H_{13}$— | —O—$C_9H_{19}$ | Cr 76.0 C 111.0 A 113.0 N 116.0 |
| 60041 | $C_7H_{15}$— | —O—$C_9H_{19}$ | Cr 76.0 C 113.0 A 119.0 |

TABLE 567

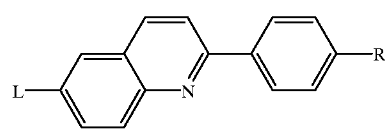

| LCReg | L | R | Phases |
|---|---|---|---|
| 41320 | $C_8H_{17}$— | —O—$C_9H_{19}$ | Cr 75.0 C 114.0 A 117.0 |
| 60027 | $C_5H_{11}$— | —O—$C_{10}H_{21}$ | Cr 77.0 C 107.0 A 113.0 N 118.0 |
| 41315 | $C_6H_{13}$— | —O—$C_{10}H_{21}$ | Cr 75.0 C 110.0 A 114.0 N 116.0 |
| 60042 | $C_7H_{15}$— | —O—$C_{10}H_{21}$ | Cr 74.0 C 114.0 A 119.0 |
| 41321 | $C_8H_{17}$— | —O—$C_{10}H_{21}$ | Cr 68.0 C 114.0 A 116.0 |
| 60028 | $C_5H_{11}$— | —O—$C_{11}H_{23}$ | Cr 83.0 C 105.0 A 114.0 N 116.0 |
| 60035 | $C_6H_{13}$— | —O—$C_{11}H_{23}$ | Cr 82.0 C 110.0 A 115.0 |
| 60043 | $C_7H_{15}$— | —O—$C_{11}H_{23}$ | Cr 81.0 C 113.0 A 118.0 |
| 41322 | $C_8H_{17}$— | —O—$C_{11}H_{23}$ | Cr 80.0 C 115.0 A 117.0 |
| 60029 | $C_5H_{11}$— | —O—$C_{12}H_{25}$ | Cr 83.0 C 104.0 A 114.0 N 116.0 |
| 60036 | $C_6H_{13}$— | —O—$C_{12}H_{25}$ | Cr 103.0 C 108.0 A 113.0 |
| 60044 | $C_7H_{15}$— | —O—$C_{12}H_{25}$ | Cr 79.0 C 112.0 A 118.0 |
| 41323 | $C_8H_{17}$— | —O—$C_{12}H_{25}$ | Cr 79.0 C 113.0 A 115.0 |

TABLE 568

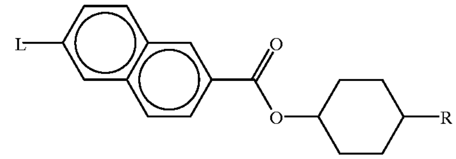

| No | L | R | Cr | LC |
|---|---|---|---|---|
| 24420 | $C_8H_{17}$— | —$C_5H_{11}$ | K 44.5 | S 65 N 841 |
| 24421 | $C_8H_{17}$— | —$C_6H_{13}$ | K 46.5 | S 36.5 N 69.51 |

TABLE 569

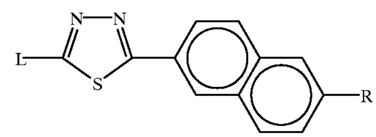

| No | L | R | Cr | LC |
|---|---|---|---|---|
| 8289 | $C_6H_{13}$— | —O—$C_6H_{13}$ | K 107.4 | C 114.11 |
| 8290 | $C_6H_{13}$— | —O—$C_{10}H_{21}$ | K 92.8 | C 116.51 |
| 8291 | $C_6H_{13}$— | —OOC—$C_6H_{13}$ | K 81.7 | C 106.7 A 110.91 |

TABLE 570

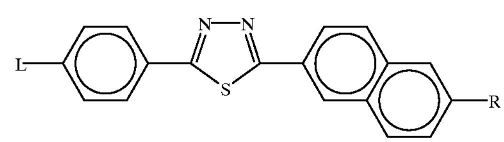

| No | L | R | Cr | LC |
|---|---|---|---|---|
| 28262 | $C_6H_{13}$— | —O—$C_4H_9$ | K 79.5 | C 155.1 N 230.71 |
| 28263 | $C_{10}H_{21}$— | —O—$C_{10}H_{21}$ | K 80.3 | C 198.21 |
| 28265 | $C_6H_{13}$— | —OOC—$C_6H_{13}$ | K 82.3 | C 199.4 N 225.21 |

TABLE 571

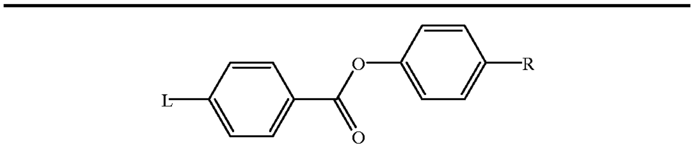

| LCReg | L | R | Phases |
|---|---|---|---|
| 7584 | OCN— | —NCO | Cr 118.0 N 148.0 |
| 57383 | SCN— | —O—H | Cr 151.6 N 191.5 |
| 7639 | H—O—SiMe2- | —O—$C_6H_{13}$ | Cr 61.0 A 75.0 N 80.0 |

TABLE 571-continued

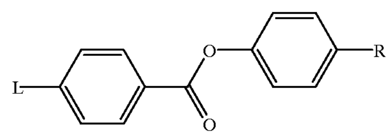

| LCReg | L | R | Phases |
|---|---|---|---|
| 7648 | $C_{10}H_{20}$—COO—<br>H—CH=CMe—COO—<br>$C_6H_{12}$—O— | —O—$C_6H_{13}$ | Cr 48.0 S 51.0 N 57.0 |
| 70192 | H—CONH— | —O—$C_{10}H_{21}$ | (157.0) Cr 185.0 A 186.0 |
| 70193 | H—CONH— | —O—$C_{11}H_{23}$ | (152.0) Cr 179.0 A 186.0 |
| 70194 | H—CONH— | —O—$C_{12}H_{25}$ | (145.0) Cr 170.0 A 185.0 |
| 7730 | NC— | —$C_8H_{17}$ | Cr 66.0 N 71.0 |
| 63051 | NC— | —$C_{10}H_{21}$ | (51.0) Cr 66.4 A 81.6 |
| 7731 | NC— | —O—$C_5H_{11}$ | Cr 93.0 N 89.5 |
| 7732 | NC— | —O—$C_6H_{13}$ | CrX 65.0 Cr 82.5 N 90.0 |
| 7733 | NC— | —O—$C_7H_{15}$ | CrX 61.0 Cr 70.0 A 79.0 N 92.0 |
| 7734 | NC— | —O—$C_8H_{17}$ | Cr 69.0 C 51.0 A 87.0 N 93.0 |
| 7735 | NC— | —O—$C_9H_{19}$ | (56.0) Cr 70.3 C 55.7 A 96.3 |
| 7736 | NC— | —O—$C_{10}H_{21}$ | (55.0) Cr 68.6 C 61.4 A 101.3 |

TABLE 572

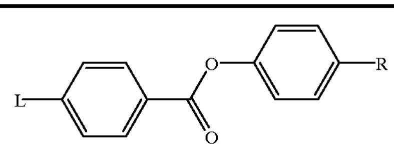

| LCReg | L | R | Phases |
|---|---|---|---|
| 7737 | NC— | —O—$C_{12}H_{25}$ | Cr 76.0 C 62.0 A 104.0 |
| 63044 | NC— | —CO—$C_9H_{19}$ | (100.0) Cr 107.5 C 112.6 A 113.2 |
| 63056 | NC— | —OOC—$C_9H_{19}$ | (76.0) Cr 82.1 A 102.1 N 105.8 |
| 7740 | NC—$C_5H_{10}$—O— | —O—$CH_3$ | Cr 55.0 N 70.0 |
| 40721 | NC— | —OCOO—CH=$CH_2$ | Cr 139.0 N 180.0 |
| 40720 | NC— | —OCOO—$CH_2$—CH=$CH_2$ | Cr 113.0 N 126.0 |
| 7742 | NC— | —O—$C_2H_4$—CH=$CH_2$ | (53.0) Cr 89.3 N 59.6 |
| 63059 | $O_2N$— | —$C_{10}H_{21}$ | (31.0) Cr 42.4 A 59.0 |
| 7749 | $O_2N$— | —O—$C_4H_9$ | (50.0) Cr 90.5 N 54.8 |
| 7750 | $O_2N$— | —O—$C_5H_{11}$ | (38.0) Cr 85.0 N 54.0 |
| 7751 | $O_2N$— | —O—$C_6H_{13}$ | (55.0) Cr 80.5 N 66.0 |
| 7752 | $O_2N$— | —O—$C_7H_{15}$ | Cr 73.0 A 60.0 N 71.0 |
| 7753 | $O_2N$— | —O—$C_8H_{17}$ | Cr 66.0 A 73.0 N 75.0 |
| 7754 | $O_2N$— | —O—$C_9H_{19}$ | Cr 69.0 A 78.0 |
| 7756 | $O_2N$— | —O—$C_{11}H_{23}$ | (46.0) Cr 73.0 A 85.0 |

TABLE 573

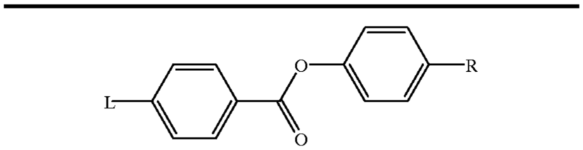

| LCReg | L | R | Phases |
|---|---|---|---|
| 7757 | $O_2N$— | —O—$C_{12}H_{25}$ | (56.0) Cr 67.0 A 86.0 |
| 63045 | $O_2N$— | —CO—$C_9H_{19}$ | (62.0) Cr 89.5 A 71.8 N 77.8 |
| 63023 | $O_2N$— | —OOC—$C_9H_{19}$ | (64.0) Cr 70.5 A 88.9 N 91.4 |
| 7761 | CN— | —$C_6H_{13}$ | Cr 50.0 N 58.0 |
| 7762 | CN— | —$C_8H_{17}$ | Cr 43.5 N 63.5 |

TABLE 573-continued

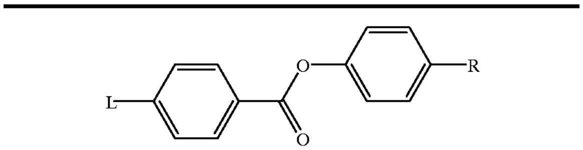

| LCReg | L | R | Phases |
|---|---|---|---|
| 7763 | CN— | —O—$C_6H_{13}$ | Cr 85.5 N 89.5 |
| 59531 | CN— | —O—$C_8H_{17}$ | Cr 63.0 N 89.0 |
| 68222 | CN— | —O—$C_9H_{19}$ | Cr 68.0 N 81.0 |
| 59532 | CN— | —O—$C_{10}H_{21}$ | Cr 75.0 A 91.0 N 92.0 |
| 68215 | CN— | —O—$C_{11}H_{23}$ | Cr 80.0 S 90.0 |
| 7764 | CN— | —OOC—$C_7H_{15}$ | Cr 74.0 N 99.5 |
| 7765 | CN— | —OCOO—$C_6H_{13}$ | Cr 83.5 N 95.0 |

TABLE 573-continued

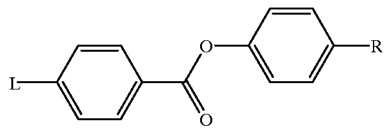

| LCReg | L | R | Phases |
|---|---|---|---|
| 7861 | $C_{10}H_{21}$—O— | —CO—H | (34.0) Cr 64.8 A 63.3 N 73.8 |
| 7863 | $C_{12}H_{25}$—O— | —CO—H | Cr 66.6 A 73.0 N 75.0 |
| 7865 | $C_{16}H_{33}$—O— | —CO—H | Cr 78.0 S 82.5 |

TABLE 574

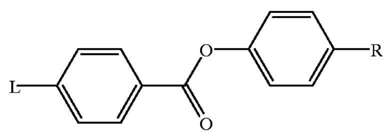

| LCReg | L | R | * | Phases |
|---|---|---|---|---|
| 7866 | $C_{18}H_{37}$—O— | —CO—H | | Cr 73.0 S 83.0 |
| 70199 | $C_9H_{19}$—O— | —NHOC—H | | (113.0) Cr 127.0 C 135.0 |
| 70200 | $C_{10}H_{21}$—O— | —NHOC—H | | (110.0) Cr 125.0 C 141.0 |
| 70201 | $C_{12}H_{25}$—O— | —NHOC—H | | (106.0) Cr 121.0 C 145.0 |
| 70202 | $C_{14}H_{29}$—O— | —NHOC—H | | (104.0) Cr 119.0 C 149.0 |
| 7906 | $C_6H_{13}$—O— | —F | | (37.0) Cr 60.4 A 38.3 |
| 7907 | $C_7H_{15}$—O— | —F | | Cr 66.1 A 40.6 |
| 7908 | $C_8H_{17}$—O— | —F | | (43.0) Cr 59.2 A 43.8 |
| 7909 | $C_{10}H_{21}$—O— | —F | | (42.0) Cr 65.0 A 46.3 |
| 7914 | $C_6H_{13}$—O— | —Cl | | Cr 86.0 A 70.0 |
| 7915 | $C_7H_{15}$—O— | —Cl | | Cr 79.5 A 72.0 |
| 7916 | $C_8H_{17}$—O— | —Cl | | Cr 76.0 A 77.0 |
| 7917 | $C_{10}H_{21}$—O— | —Cl | | Cr 73.0 A 80.5 |
| 7924 | $C_{10}H_{21}$—O— | —Br | | (61.0) Cr 79.8 A 85.1 |
| 7926 | $C_8H_{17}$—O— | —CH(OH)—$CH_2$—Br | 1 | Cr 65.0 N*52.0 |

TABLE 575

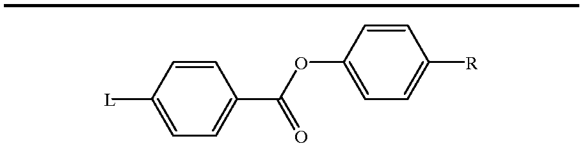

| LCReg | L | R | Phases |
|---|---|---|---|
| 7927 | $CH_3$—O— | —O—$C_6H_{12}$—Br | Cr 62.0 N 69.5 |
| 7928 | $C_4H_9$—O— | —O—$C_6H_{12}$—Br | Cr 61.0 N 85.0 |
| 7929 | $C_4H_9$—O— | —O—$C_8H_{16}$—Br | Cr 65.0 N 77.0 |
| 66740 | $C_6H_{13}$—O— | —O—$C_{10}H_{20}$—Br | Cr 65.0 X 75.5 |
| 7930 | $C_4H_9$—O— | —O—$C_{11}H_{22}$—Br | Cr 61.0 N 76.0 |
| 7931 | $C_8H_{17}$—O— | —CO—$CH_2$—Br | Cr 94.0 A 104.0 |
| 7932 | $C_4H_9$—O— | —OOC—$C_{10}H_{20}$—Br | Cr 42.0 N 78.0 |
| 7915 | $C_6H_{13}$—O— | —OOC—$C_{10}H_{20}$—Br | Cr 57.0 N 91.0 |
| 7933 | $C_7H_{15}$—O— | —OOC—$C_{10}H_{20}$—Br | Cr 48.0 N 77.0 |
| 7941 | $C_{10}H_{21}$—O— | −1 | (68.0) Cr 86.2 A 87.0 |
| 7942 | $C_{12}H_{25}$—O— | −1 | (66.0) Cr 78.2 A 86.8 |
| 7943 | $C_{14}H_{29}$—O— | −1 | (66.0) Cr 86.5 A 84.9 |
| 7944 | $CH_3$— | —CN | Cr ? N 63.3 |

TABLE 575-continued

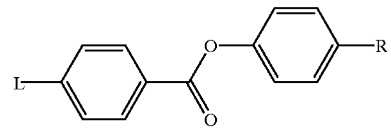

| LCReg | L | R | Phases |
|---|---|---|---|
| 7949 | $C_6H_{13}$— | —CN | Cr 44.4 N 48.6 |
| 7950 | $C_7H_{15}$— | —CN | Cr 44.0 N 56.5 |

TABLE 576

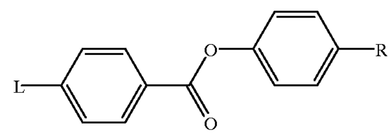

| LCReg | L | R | Phases |
|---|---|---|---|
| 7951 | $C_8H_{17}$— | —CN | Cr 47.0 N 55.0 |
| 7952 | $C_9H_{19}$— | —CN | Cr 45.5 N 60.5 |
| 7953 | $C_{10}H_{21}$— | —CN | (35.0) Cr 60.4 A 56.3 N 60.9 |
| 7954 | $C_2H_5$—O— | —CN | Cr 121.0 N 105.0 |
| 7955 | $C_4H_9$—O— | —CN | (84.0) Cr 108.2 N 87.1 |
| 7956 | $C_5H_{11}$—O— | —CN | Cr 87.0 N 78.0 |
| 7957 | $C_6H_{13}$—O— | —CN | Cr 71.2 N 83.2 |
| 7958 | $C_7H_{15}$—O— | —CN | Cr 71.5 N 82.0 |
| 7959 | $C_8H_{17}$—O— | —CN | Cr 75.6 N 88.0 |
| 7960 | $C_9H_{19}$—O— | —CN | Cr 62.0 A 59.0 N 84.0 |
| 7961 | $C_{10}H_{21}$—O— | —CN | Cr 79.0 A 79.0 N 86.5 |
| 7962 | $C_{11}H_{23}$—O— | —CN | Cr 80.6 A 85.8 N 86.1 |
| 7963 | $C_{12}H_{25}$—O— | —CN | Cr 71.8 A 87.2 |
| 7965 | $C_3H_7$—COO— | —CN | Cr 95.0 N 105.0 |
| 7966 | $C_4H_9$—COO— | —CN | Cr 73.0 N 89.0 |

TABLE 577

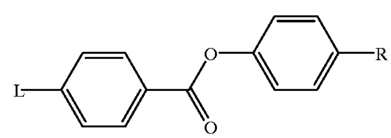

| LCReg | L | R | Phases |
|---|---|---|---|
| 7967 | $C_5H_{11}$—COO— | —CN | Cr 63.0 N 84.0 |
| 7968 | $C_6H_{13}$—COO— | —CN | Cr 85.0 N 83.5 |
| 7969 | $C_7H_{15}$—COO— | —CN | Cr 58.0 N 98.0 |
| 7970 | $C_8H_{17}$—COO— | —CN | Cr 74.0 N 85.8 |
| 63057 | $C_9H_{19}$—COO— | —CN | (61.0) Cr 67.1 A 73.8 N 87.0 |
| 8000 | $C_2H_5$—OCOO— | —CN | Cr 114.8 N 115.8 |
| 8001 | $C_3H_7$—OCOO— | —CN | Cr 90.5 N 89.8 |
| 8002 | $C_4H_9$—OCOO— | —CN | Cr 75.4 N 82.8 |
| 8003 | $C_5H_{11}$—OCOO— | —CN | Cr 77.7 N 78.6 |
| 8004 | $C_6H_{13}$—OCOO— | —CN | Cr 59.7 N 77.6 |
| 8005 | $C_7H_{15}$—OCOO— | —CN | Cr 47.8 N 77.4 |
| 8006 | $C_8H_{17}$—OCOO— | —CN | Cr 72.8 N 78.3 |
| 8007 | $C_9H_{19}$—OCOO— | —CN | Cr 52.8 A 65.8 N 78.6 |
| 8008 | $C_{10}H_{21}$—OCOO— | —CN | Cr 66.7 A 78.2 N 80.6 |
| 8016 | $C_8H_{17}$— | —$C_2H_4$—CN | Cr 36.0 A 27.0 |

TABLE 578

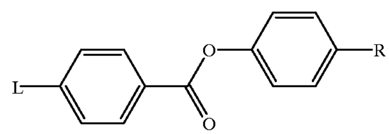

| LCReg | L | R | Phases |
|---|---|---|---|
| 8017 | $C_9H_{19}$— | —$C_2H_4$—CN | Cr 35.0 A 37.5 |
| 8026 | $C_{10}H_{21}$—O— | —$C_2H_4$—CN | Cr 65.0 N 66.5 |
| 8031 | $C_3H_7$— | —CH═CH—CN | Cr 101.7 N 166.7 |
| 8032 | $C_4H_9$— | —CH═CH—CN | Cr 106.0 N 154.0 |
| 8033 | $C_5H_{11}$— | —CH═CH—CN | Cr 119.4 N 157.3 |
| 8034 | $C_6H_{13}$— | —CH═CH—CN | Cr 97.5 N 147.7 |
| 8035 | $C_7H_{15}$— | —CH═CH—CN | Cr 84.6 S 124.6 N 147.6 |
| 8036 | $C_8H_{17}$— | —CH═CH—CN | Cr 89.3 S 136.2 N 147.3 |
| 8037 | $C_6H_{13}$—O— | —CH═CH—CN | Cr 115.0 N 181.0 |
| 8042 | $C_9H_{19}$—O— | —S—CN | Cr 41.0 A 14.0 |
| 8043 | $C_7H_{15}$— | —O—$C_4H_8$—CN | Cr 62.2 N 47.5 |
| 8044 | $C_7H_{15}$—O— | —O—$C_4H_8$—CN | Cr ? N <68.0 |
| 8061 | $C_5F_{11}$— | —CN | Cr 100.0 S 123.0 |
| 8062 | $C_6F_{13}$— | —CN | Cr 101.0 A 123.0 |
| 8063 | $C_7F_{15}$— | —CN | Cr 108.0 A 134.0 |

TABLE 579

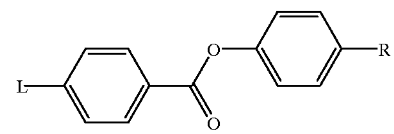

| LCReg | L | R | Phases |
|---|---|---|---|
| 8064 | $C_8F_{17}$— | —CN | Cr 119.0 A 147.0 |
| 8065 | $C_9F_{19}$— | —CN | Cr 132.0 A 156.0 |
| 8066 | $C_{10}F_{21}$— | —CN | Cr 141.0 C 138.0 A 167.0 |
| 8070 | $CF_3$—$C_2H_4$— | —CN | Cr 99.0 S 57.0 |
| 8067 | $C_4F_9$—O— | —CN | Cr 80.0 S 128.0 |
| 8068 | $C_5F_{11}$—O— | —CN | Cr 143.0 S 136.0 N 142.0 |
| 8069 | $C_7F_{15}$—O— | —CN | Cr 104.0 S 128.0 |
| 8072 | $C_3F_7$—$CH_2$—O— | —CN | (43.0) Cr ? A 58.0 |
| 8077 | H—$C_4F_8$— | —CN | Cr 74.0 S 94.0 |
| 8074 | $CF_3$—$CFCF_3$—$C_2F_4$— | —CN | Cr 90.0 S 98.5 |
| 8075 | $CF_3$—$CFCF_3$—$C_4F_8$— | —CN | Cr 109.6 S 121.3 |
| 8076 | $CF_3$—$CFCF_3$—$C_6F_{12}$— | —CN | Cr 130.7 S 140.7 |
| 58379 | $H_2C$═CH—O—$C_{11}H_{22}$—O— | —CN | Cr ? S ? N ? |
| 8048 | $H_2C$═CH—$CH_2$—O— | —CN | Cr 102.5 N 90.0 |
| 8049 | $CH_3$—CH═CH—$CH_2$—O— | —CN | (100.0) Cr 127.2 N 100.2 |

TABLE 580

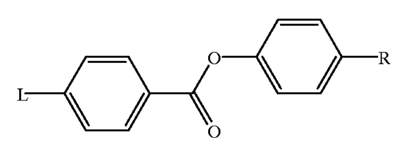

| LCReg | L | R | Phases |
|---|---|---|---|
| 8051 | $H_2C$═CH—$C_2H_4$—O— | —CN | (51.0) Cr 86.5 N 62.0 |
| 8052 | $H_2C$═CH—$C_3H_6$—O— | —CN | Cr 76.0 N 79.0 |
| 8054 | $H_2C$═CH—$C_4H_8$—O— | —CN | Cr 64.0 N 63.5 |
| 8055 | $H_2C$═CH—$C_5H_{10}$—O— | —CN | Cr 78.5 N 74.8 |
| 8056 | $H_2C$═CH—$C_6H_{12}$—O— | —CN | Cr 49.0 N 72.0 |
| 66687 | $H_2C$═CH—$C_8H_{16}$—O— | —CN | Cr 40.0 N 71.0 |
| 8057 | $H_2C$═CH—$C_8H_{16}$—COO— | —CN | Cr 63.0 N 79.0 |
| 8058 | $H_2C$═CH—$C_9H_{18}$—O— | —CN | Cr 76.0 N 79.0 |
| 8085 | $C_7H_{15}$—O— | —$NO_2$ | Cr 56.0 A 43.0 N 62.0 |
| 8086 | $C_8H_{17}$—O— | —$NO_2$ | CrX 47.5 Cr 50.5 A 61.4 N 68.1 |
| 8087 | $C_9H_{19}$—O— | —$NO_2$ | Cr 63.5 A 72.5 |
| 8088 | $C_{10}H_{21}$—O— | —$NO_2$ | Cr 61.3 A 79.3 |
| 8089 | $C_{11}H_{23}$—O— | —$NO_2$ | Cr 64.5 A 82.2 |
| 8090 | $C_{12}H_{25}$—O— | —$NO_2$ | Cr 64.0 A 82.5 |
| 8091 | $C_{14}H_{29}$—O— | —$NO_2$ | Cr 72.5 A 87.5 |

TABLE 581

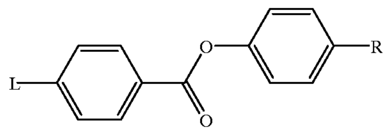

| LCReg | L | R | Phases |
|---|---|---|---|
| 8092 | $C_{16}H_{33}$—O— | —$NO_2$ | Cr 76.5 A 87.0 |
| 8095 | $C_6F_{13}$— | —$NO_2$ | Cr 82.0 A 98.0 |
| 8096 | $C_7F_{15}$— | —$NO_2$ | Cr 98.0 A 118.0 |
| 8097 | $C_{10}F_{21}$— | —$NO_2$ | Cr 107.0 B 91.0 A 155.0 |
| 8098 | $C_{12}F_{25}$— | —$NO_2$ | Cr 118.0 B 135.0 A 168.0 |
| 8099 | $CF_3$—$CFCF_3$—$C_2F_4$— | —$NO_2$ | Cr 68.6 S 79.2 |
| 8102 | $C_6H_{13}$— | —NC | Cr 26.5 N 41.5 |
| 8103 | $C_7H_{15}$— | —NC | Cr 38.0 N 51.0 |
| 8104 | $C_8H_{17}$— | —NC | Cr 43.0 N 48.0 |
| 59515 | $C_5H_{11}$—O— | —NC | Cr 61.0 N 76.0 |
| 59514 | $C_6H_{13}$—O— | —NC | Cr 61.0 N 81.0 |
| 59516 | $C_7H_{15}$—O— | —NC | Cr 62.0 N 79.0 |
| 59517 | $C_8H_{17}$—O— | —NC | Cr 65.0 N 82.0 |
| 59518 | $C_9H_{19}$—O— | —NC | Cr 68.0 N 81.0 |
| 59519 | $C_{10}H_{21}$—O— | —NC | Cr 68.0 A 71.0 N 84.0 |

TABLE 582

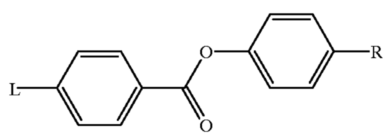

| LCReg | L | R | Phases |
|---|---|---|---|
| 59520 | $C_{12}H_{25}$—O— | —NC | Cr 62.0 A 84.0 N 85.0 |
| 59521 | $C_{14}H_{29}$—O— | —NC | Cr 67.0 A 88.0 |
| 8105 | $C_5H_{11}$—COO— | —NC | Cr 55.5 N 86.0 |
| 8106 | $C_6H_{13}$—COO— | —NC | Cr 75.7 N 82.0 |
| 8107 | $C_7H_{15}$—COO— | —NC | Cr 56.5 N 85.0 |
| 8108 | $C_4H_9$—OCOO— | —NC | Cr 72.0 N 84.0 |
| 8109 | $C_6H_{13}$—OCOO— | —NC | Cr 60.5 N 75.5 |
| 8111 | $CH_3$—O— | —NCO | Cr 91.3 N 94.2 |
| 8120 | $C_7H_{15}$— | —NCS | Cr 62.0 A 57.0 N 57.5 |
| 8121 | $C_8H_{17}$— | —NCS | Cr 49.0 A 56.5 |
| 8123 | $C_4H_9$—O— | —NCS | Cr 82.0 A 52.0 N 88.0 |
| 8124 | $C_5H_{11}$—O— | —NCS | Cr 66.0 A 67.0 N 85.5 |
| 8125 | $C_6H_{13}$—O— | —NCS | Cr 70.0 A 80.0 N 91.0 |
| 8126 | $C_7H_{15}$—O— | —NCS | Cr 63.5 A 88.0 N 93.0 |
| 8127 | $C_8H_{17}$—O— | —NCS | Cr 71.0 A 91.5 N 92.5 |

TABLE 583

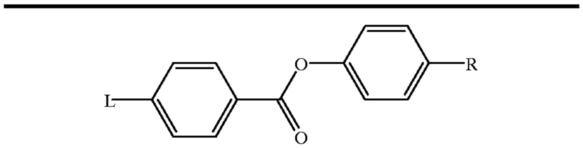

| LCReg | L | R | Phases |
|---|---|---|---|
| 8128 | $C_9H_{19}$—O— | —NCS | Cr 70.4 A 93.9 |
| 8129 | $C_{10}H_{21}$—O— | —NCS | Cr 76.4 A 96.0 |
| 8130 | $C_{11}H_{23}$—O— | —NCS | Cr 81.9 A 95.4 |
| 8131 | $C_{12}H_{25}$—O— | —NCS | Cr 88.5 A 96.4 |
| 8132 | $C_{14}H_{29}$—O— | —NCS | Cr 81.0 A 95.1 |
| 8133 | $C_{16}H_{33}$—O— | —NCS | Cr 79.4 A 92.8 |
| 57379 | $H_2C$═CH—$CH_2$—O— | —NCS | Cr 97.8 N 130.0 |
| 8138 | $C_9H_{19}$—O— | —CH═C(CN)2 | Cr 84.0 A 90.0 N 96.0 |
| 8157 | $C_2H_5$— | —$C_2H_5$ | Cr ? N ? |

TABLE 583-continued

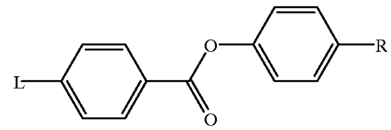

| LCReg | L | R | Phases |
|---|---|---|---|
| 8158 | $C_2H_5$— | —$C_6H_{13}$ | Cr 8.3 N 15.5 |
| 8167 | $C_4H_9$— | —$C_7H_{15}$ | Cr 9.0 N 15.0 |
| 8190 | $C_7H_{15}$— | —$C_5H_{11}$ | Cr 24.0 N 30.0 |
| 8191 | $C_7H_{15}$— | —$C_7H_{15}$ | Cr 26.0 N 33.0 |
| 8194 | $C_8H_{17}$— | —$C_5H_{11}$ | (13.0) Cr 24.1 N 30.1 |
| 8202 | $CH_3$— | —O—$C_5H_{11}$ | Cr 61.0 S 63.0 |

TABLE 584

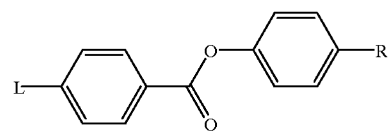

| LCReg | L | R | Phases |
|---|---|---|---|
| 8203 | $CH_3$— | —O—$C_6H_{13}$ | Cr 48.0 N 51.7 |
| 8211 | $C_3H_7$— | —O—$C_5H_{11}$ | (22.0) Cr 45.5 N 49.9 |
| 8212 | $C_3H_7$— | —O—$C_6H_{13}$ | (26.0) Cr 52.3 N 59.1 |
| 8213 | $C_3H_7$— | —O—$C_7H_{15}$ | (28.0) Cr 46.3 N 53.2 |
| 8214 | $C_3H_7$— | —O—$C_8H_{17}$ | (32.0) Cr 51.7 N 59.4 |
| 8215 | $C_3H_7$— | —O—$C_9H_{19}$ | Cr 47.0 N 54.0 is |
| 8216 | $C_3H_7$— | —O—$C_{10}H_{21}$ | (38.0) CrX 43.0 Cr 50.9 N 57.5 |
| 8217 | $C_3H_7$— | —O—$C_{12}H_{25}$ | (49.0) Cr 54.6 N 58.1 |
| 8226 | $C_4H_9$— | —O—$C_7H_{15}$ | (28.0) Cr 37.1 N 46.0 |
| 8227 | $C_4H_9$— | —O—$C_8H_{17}$ | (25.0) Cr 43.6 N 51.2 |
| 8228 | $C_4H_9$— | —O—$C_9H_{19}$ | Cr 43.0 N 48.0 |
| 8229 | $C_4H_9$— | —O—$C_{10}H_{21}$ | (37.0) Cr 45.7 N 51.2 |
| 8234 | $C_5H_{11}$— | —O—$C_2H_5$ | (40.0) Cr 63.0 N 63.4 |
| 8236 | $C_5H_{11}$— | —O—$C_4H_9$ | (30.0) Cr 49.6 N 57.7 |
| 8237 | $C_5H_{11}$— | —O—$C_5H_{11}$ | (28.0) Cr 42.8 N 51.8 |

TABLE 585

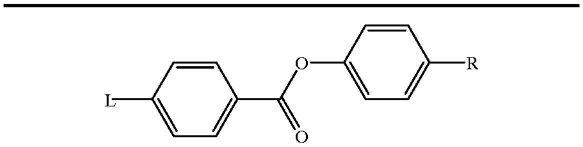

| LCReg | L | R | Phases |
|---|---|---|---|
| 8238 | $C_5H_{11}$— | —O—$C_6H_{13}$ | Cr 40.9 N 59.3 |
| 8239 | $C_5H_{11}$— | —O—$C_7H_{15}$ | (25.0) Cr 42.2 N 57.4 |
| 8240 | $C_5H_{11}$— | —O—$C_8H_{17}$ | (33.0) Cr 49.8 N 60.6 |
| 8241 | $C_5H_{11}$— | —O—$C_9H_{19}$ | (36.0) Cr 48.2 N 58.4 |
| 8242 | $C_5H_{11}$— | —O—$C_{10}H_{21}$ | (35.0) Cr 49.0 N 60.3 |
| 8243 | $C_5H_{11}$— | —O—$C_{12}H_{25}$ | (48.0) Cr 56.5 N 60.6 |
| 8247 | $C_6H_{13}$— | —O—$C_2H_5$ | (33.0) CrX 52.0 Cr 56.4 N 51.8 |
| 8249 | $C_6H_{13}$— | —O—$C_4H_9$ | (25.0) CrX 24.1 Cr 40.2 N 49.4 |
| 8250 | $C_6H_{13}$— | —O—$C_5H_{11}$ | (31.0) Crx 28.8 Cr 42.5 N 45.0 |
| 8251 | $C_6H_{13}$— | —O—$C_6H_{13}$ | (30.0) Cr 46.3 N 53.2 |
| 8252 | $C_6H_{13}$— | —O—$C_7H_{15}$ | (35.0) CrX 33.3 Cr 49.1 N 51.5 |
| 8253 | $C_6H_{13}$— | —O—$C_8H_{17}$ | (30.0) Cr 45.3 N 56.7 |
| 8254 | $C_6H_{13}$— | —O—$C_9H_{19}$ | Cr 50.0 N 55.0 |
| 8255 | $C_6H_{13}$— | —O—$C_{10}H_{21}$ | (37.0) Cr 45.5 N 57.3 |
| 8256 | $C_6H_{13}$— | —O—$C_{12}H_{25}$ | (46.0) Cr 55.6 N 58.3 |

TABLE 586

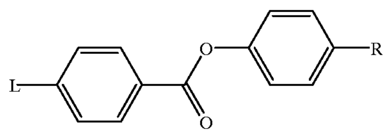

| LCReg | L | R | Phases |
|---|---|---|---|
| 8259 | $C_7H_{15}$— | —O—$C_4H_9$ | Cr 46.0 N 57.0 |
| 8260 | $C_7H_{15}$— | —O—$C_5H_{11}$ | Cr 45.0 N 61.0 |
| 8261 | $C_7H_{15}$— | —O—$C_6H_{13}$ | (26.0) Cr 41.8 N 61.0 |
| 8262 | $C_7H_{15}$— | —O—$C_{14}H_{29}$ | (55.0) Cr 63.8 C 56.4 N 63.9 |
| 8263 | $C_8H_{17}$— | —O—$C_4H_9$ | Cr 46.0 N 54.0 |
| 8264 | $C_8H_{17}$— | —O—$C_8H_{17}$ | Cr 41.0 C 37.0 N 64.0 |
| 8266 | $C_9H_{19}$— | —O—$C_2H_5$ | Cr 54.0 N 61.0 |
| 8268 | $C_9H_{19}$— | —O—$C_4H_9$ | Cr 45.0 N 59.0 |
| 8269 | $C_9H_{19}$— | —O—$C_5H_{11}$ | Cr 40.0 N 56.0 |
| 8270 | $C_9H_{19}$— | —O—$C_6H_{13}$ | Cr 43.0 C 34.0 N 62.0 |
| 8271 | $C_9H_{19}$— | —O—$C_7H_{15}$ | Cr 46.0 C 41.0 N 61.0 |
| 8272 | $C_9H_{19}$— | —O—$C_8H_{17}$ | (37.0) Cr 53.0 C 48.0 N 64.0 |
| 8273 | $C_9H_{19}$— | —O—$C_9H_{19}$ | Cr 54.0 C 52.0 N 63.0 |
| 8274 | $C_9H_{19}$— | —O—$C_{10}H_{21}$ | (42.0) Cr 58.7 C 57.9 N 65.8 |
| 8275 | $C_9H_{19}$— | —O—$C_{12}H_{25}$ | (47.0) Cr 62.1 B 47.5 C 63.1 A 63.8 N 66.5 |

TABLE 587

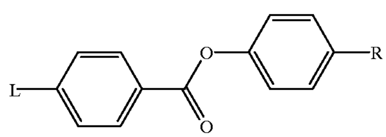

| LCReg | L | R | Phases |
|---|---|---|---|
| 8276 | $C_9H_{19}$— | —O—$C_{14}H_{29}$ | (55.0) Cr 63.7 B 55.7 C 65.4 A 66.8 |
| 8277 | $C_9H_{19}$— | —O—$C_{16}H_{33}$ | (62.0) Cr 69.4 B 61.3 C 66.4 A 67.6 |
| 8282 | $C_{10}H_{21}$— | —O—$C_4H_9$ | (35.0) Cr 48.9 N 55.7 |
| 8284 | $C_{10}H_{21}$— | —O—$C_6H_{13}$ | (30.0) Cr 44.1 B 33.6 A 47.7 N 59.0 |
| 8285 | $C_{10}H_{21}$— | —O—$C_7H_{15}$ | (40.0) Cr 52.8 B 38.2 C 40.6 A 51.7 N 58.7 |
| 8286 | $C_{10}H_{21}$— | —O—$C_8H_{17}$ | (40.0) Cr 55.2 B 40.5 C 52.4 A 55.9 N 62.5 |
| 8287 | $C_{10}H_{21}$— | —O—$C_{10}H_{21}$ | (45.0) Cr 61.4 B 45.9 C 60.5 A 62.1 N 64.5 |
| 8288 | $C_{10}H_{21}$— | —O—$C_{12}H_{25}$ | (47.0) Cr 64.5 B 51.0 C 64.1 A 65.7 |
| 8289 | $C_{10}H_{21}$— | —O—$C_{14}H_{29}$ | (55.0) Cr 65.2 B 58.1 C 66.7 |
| 8290 | $C_{10}H_{21}$— | —O—$C_{16}H_{33}$ | (62.0) Cr 67.2 B 64.2 C 69.6 |
| 8292 | $C_{12}H_{25}$— | —O—$C_{16}H_{33}$ | (66.0) Cr 73.7 B 68.9 C 71.0 |
| 8306 | $C_5H_{11}$— | —CO—$CH_3$ | Cr 64.0 N 73.0 |
| 8307 | $C_5H_{11}$— | —CO—$C_2H_5$ | Cr 64.0 N 75.0 |
| 8313 | $C_9H_{19}$— | —CO—$C_5H_{11}$ | (76.0) Cr 86.7 A 88.5 |
| 8314 | $C_{10}H_{21}$— | —CO—$C_4H_9$ | (70.0) Cr 81.4 A 87.3 |

TABLE 588

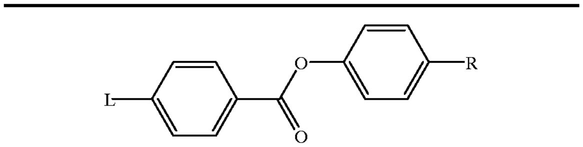

| LCReg | L | R | Phases |
|---|---|---|---|
| 8315 | $C_{10}H_{21}$— | —CO—$C_5H_{11}$ | (86.0) Cr 87.8 A 93.3 |
| 8317 | $C_{10}H_{21}$— | —CO—$C_9H_{19}$ | (95.0) CrX 93.5 Cr 101.8 |
| 8318 | $C_4H_9$— | —CO—$CH_2$—OOC—$C_3H_7$ | Cr 80.2 S 90.4 N 95.6 |
| 8324 | $CH_3$—O— | —$C_5H_{11}$ | Cr 29.5 N 43.5 |

TABLE 588-continued

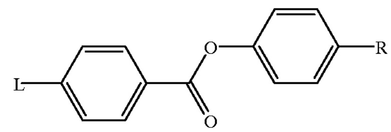

| LCReg | L | R | Phases |
|---|---|---|---|
| 8326 | $CH_3$—O— | —$C_7H_{15}$ | Cr 32.6 N 42.8 |
| 8332 | $C_2H_5$—O— | —$C_3H_7$ | Cr 83.0 N 69.0 |
| 8336 | $C_2H_5$—O— | —$C_7H_{15}$ | Cr 48.5 N 51.9 |
| 8356 | $C_5H_{11}$—O— | —$C_5H_{11}$ | Cr 39.0 N 55.0 |
| 8357 | $C_5H_{11}$—O— | —$C_6H_{13}$ | Cr 40.0 N 47.0 |
| 8358 | $C_5H_{11}$—O— | —$C_7H_{15}$ | Cr 43.0 N 56.0 |
| 8359 | $C_5H_{11}$—O— | —$C_8H_{17}$ | Cr 51.0 N 52.0 |
| 8360 | $C_5H_{11}$—O— | —$C_9H_{19}$ | Cr 49.0 N 55.0 |
| 8364 | $C_6H_{13}$—O— | —$C_3H_7$ | Cr 56.0 N 59.0 |
| 8365 | $C_6H_{13}$—O— | —$C_4H_9$ | (43.0) Cr 49.5 N 51.9 |
| 8366 | $C_6H_{13}$—O— | —$C_5H_{11}$ | Cr 50.0 N 63.0 |

TABLE 589

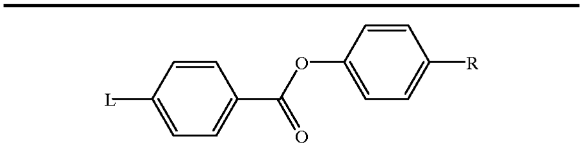

| LCReg | L | R | Phases |
|---|---|---|---|
| 8367 | $C_6H_{13}$—O— | —$C_6H_{13}$ | (23.0) Cr 43.7 A 36.7 N 59.6 |
| 8368 | $C_6H_{13}$—O— | —$C_7H_{15}$ | Cr 46.0 N 63.5 |
| 8369 | $C_6H_{13}$—O— | —$C_8H_{17}$ | (40.0) Cr 43.6 A 42.1 N 61.6 |
| 8370 | $C_6H_{13}$—O— | —$C_9H_{19}$ | (15.0) Cr 38.3 C 26.1 A 40.0 N 65.2 |
| 8371 | $C_6H_{13}$—O— | —$C_{10}H_{21}$ | Cr 51.0 A 49.0 N 62.0 |
| 8372 | $C_6H_{13}$—O— | —$C_{12}H_{25}$ | (40.0) Cr 61.2 A 51.4 N 62.2 |
| 8376 | $C_7H_{15}$—O— | —$C_5H_{11}$ | (20.0) Cr 42.3 A 44.8 N 60.4 |

TABLE 589-continued

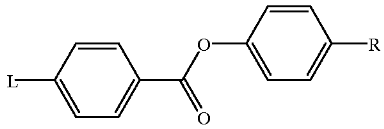

| LCReg | L | R | Phases |
|---|---|---|---|
| 8377 | $C_7H_{15}$—O— | —$C_6H_{13}$ | (28.0) Cr 50.6 A 45.5 N 56.7 |
| 8378 | $C_7H_{15}$—O— | —$C_8H_{17}$ | (33.0) Cr 54.4 A 52.1 N 60.7 |
| 8379 | $C_7H_{15}$—O— | —$C_9H_{19}$ | Cr 47.0 A 54.0 N 64.0 |
| 8380 | $C_7H_{15}$—O— | —$C_{10}H_{21}$ | (39.0) Cr 53.1 A 55.0 N 61.5 |
| 8381 | $C_8H_{17}$—O— | —$CH_3$ | Cr 59.5 N 57.5 |
| 8383 | $C_8H_{17}$—O— | —$C_3H_7$ | Cr 59.0 C 47.0 N 63.0 |
| 8384 | $C_8H_{17}$—O— | —$C_4H_9$ | Cr 52.1 A 50.7 N 57.9 |
| 8385 | $C_8H_{17}$—O— | —$C_5H_{11}$ | Cr 56.0 A 56.5 N 66.0 |

TABLE 590

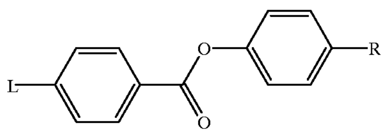

| LCReg | L | R | Phases |
|---|---|---|---|
| 8386 | $C_8H_{17}$—O— | —$C_6H_{13}$ | (39.0) Cr 53.5 A 59.2 N 63.1 |
| 8387 | $C_8H_{17}$—O— | —$C_7H_{15}$ | Cr 50.6 A 65.3 N 73.1 |
| 8388 | $C_8H_{17}$—O— | —$C_8H_{17}$ | CrX 47.0 Cr 53.4 A 63.8 N 66.3 |
| 8389 | $C_8H_{17}$—O— | —$C_9H_{19}$ | (25.0) Cr 59.3 A 66.1 N 70.1 |
| 8390 | $C_8H_{17}$—O— | —$C_{10}H_{21}$ | (35.0) Cr 56.4 A 67.4 N 69.1 |
| 65020 | $C_8H_{17}$—O— | —$C_{12}H_{25}$ | Cr 59.1 A 67.9 |
| 65021 | $C_8H_{17}$—O— | —$C_{14}H_{29}$ | Cr 61.7 A 67.6 |
| 65022 | $C_8H_{17}$—O— | —$C_{16}H_{33}$ | Cr 65.7 A 66.6 |
| 8391 | $C_9H_{19}$—O— | —$CH_3$ | Cr 52.0 A 44.0 N 58.0 |
| 8392 | $C_9H_{19}$—O— | —$C_4H_9$ | (41.0) Cr 55.9 A 56.2 N 57.2 |
| 8393 | $C_9H_{19}$—O— | —$C_5H_{11}$ | Cr 61.0 A 63.0 N 66.0 |
| 8394 | $C_9H_{19}$—O— | —$C_9H_{19}$ | Cr 54.0 A 69.0 |
| 8395 | $C_{10}H_{21}$—O— | —$CH_3$ | (32.0) Cr 55.1 A 50.5 N 59.4 |
| 8396 | $C_{10}H_{21}$—O— | —$C_3H_7$ | Cr 59.5 A 62.5 N 66.0 |
| 8397 | $C_{10}H_{21}$—O— | —$C_4H_9$ | (35.0) Cr 44.3 A 61.2 |

TABLE 591

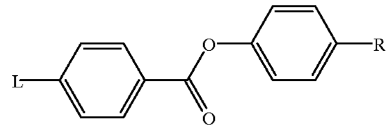

| LCReg | L | R | Phases |
|---|---|---|---|
| 8398 | $C_{10}H_{21}$—O— | —$C_5H_{11}$ | Cr 55.0 A 68.5 N 69.0 |
| 8399 | $C_{10}H_{21}$—O— | —$C_6H_{13}$ | (37.0) Cr 57.5 A 66.9 |
| 8400 | $C_{10}H_{21}$—O— | —$C_7H_{15}$ | (41.0) Cr 55.8 A 71.4 |
| 8401 | $C_{10}H_{21}$—O— | —$C_9H_{19}$ | Cr 60.0 A 73.0 |
| 8402 | $C_{10}H_{21}$—O— | —$C_{10}H_{21}$ | (46.0) CrX 59.0 Cr 61.9 A 75.5 |
| 8403 | $C_{10}H_{21}$—O— | —$C_{12}H_{25}$ | (52.0) Cr 65.8 A 74.3 |
| 8405 | $C_{12}H_{25}$—O— | —$CH_3$ | Cr 64.0 S 57.0 N 61.5 |
| 8406 | $C_{12}H_{25}$—O— | —$C_5H_{11}$ | Cr 55.7 A 72.2 |
| 8407 | $C_{12}H_{25}$—O— | —$C_{10}H_{21}$ | (65.0) Cr 74.2 C 66.0 A 75.4 |
| 8409 | $C_{14}H_{29}$—O— | —$C_7H_{15}$ | (50.0) Cr 69.6 B 59.7 A 76.3 |
| 8410 | $C_{14}H_{29}$—O— | —$C_8H_{17}$ | (53.0) Cr 70.3 B 60.1 C 64.5 A 76.6 |
| 8414 | $C_{16}H_{33}$—O— | —$C_5H_{11}$ | Cr 62.9 A 73.2 |
| 8415 | $C_{16}H_{33}$—O— | —$C_{10}H_{21}$ | (68.0) Cr 77.8 |
| 8420 | $CH_3$—O— | —O—$C_4H_9$ | Cr 78.0 N 80.0 |
| 8421 | $CH_3$—O— | —O—$C_5H_{11}$ | Cr 67.0 N 72.5 |

TABLE 592

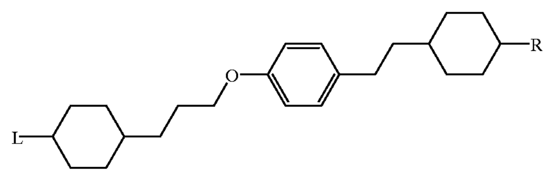

| LCReg | L | R | Phases |
|---|---|---|---|
| 39747 | $C_5H_{11}$— | —$C_5H_{11}$ | Cr 86.0 B 109.0 N 117.0 |

TABLE 593

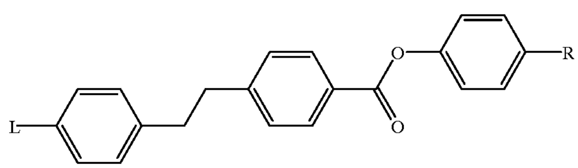

| LCReg | L | R | Phases |
|---|---|---|---|
| 34764 | Me3Si—O—Me2Si—$C_4H_8$— | —O—$C_8H_{17}$ | Cr ? G 41.0 C 86.0 |
| 66146 | Me3Si—$CH_2$—SiMe2-$C_4H_8$— | —O—$C_8H_{17}$ | Cr 51.0 G 44.0 C 84.0 |
| 66169 | Me3Si—$C_3H_6$—SiMe2-$C_4H_8$— | —O—$C_8H_{17}$ | Cr ? G 44.0 C 83.0 |
| 66166 | Me3Si—$CH_2$—SiMe2-$C_2H_4$—SiMe2-$C_4H_8$— | —O—$C_8H_{17}$ | Cr ? SmI 38.0 C 72.0 |
| 34759 | $C_3H_7$— | —CN | Cr 101.0 N 152.0 |
| 34760 | $C_4H_9$— | —CN | Cr 75.0 N 141.0 |
| 34761 | $C_5H_{11}$— | —CN | Cr 86.0 N 144.0 |
| 34766 | $C_4H_9$— | —$C_5H_{11}$ | Cr 87.0 N 109.0 |
| 57487 | $CH_3$—O— | —$C_2H_4$—COO—$C_2H_5$ | Cr 88.0 N 92.0 |
| 34776 | $C_5H_{11}$—O— | —COO—CHMe—$C_6H_{13}$ | Cr 54.0 A 89.0 |
| 34777 | $C_7H_{15}$—O— | —COO—CHMe—$C_6H_{13}$ | Cr 65.0 S 49.0 C* 62.0 A 90.0 |
| 34778 | $C_8H_{17}$—O— | —COO—CHMe—$C_6H_{13}$ | Cr 54.0 S 49.0 C* 75.0 A 91.0 |

TABLE 593-continued

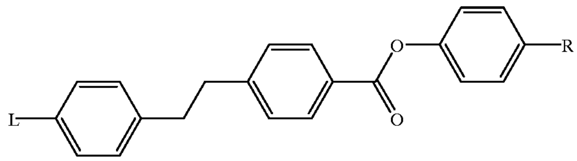

| LCReg | L | R | Phases |
|---|---|---|---|
| 34779 | $C_9H_{19}$—O— | —COO—CHMe—$C_6H_{13}$ | Cr 54.0 S 43.0 C* 82.0 A 88.0 |
| 34780 | $C_{10}H_{21}$—O— | —COO—CHMe—$C_6H_{13}$ | Cr 37.0 S 38.0 C* 83.0 A 87.0 |
| 34781 | $C_{12}H_{25}$—O— | —COO—CHMe—$C_6H_{13}$ | Cr 52.0 C* 84.5 A 84.7 |

TABLE 594

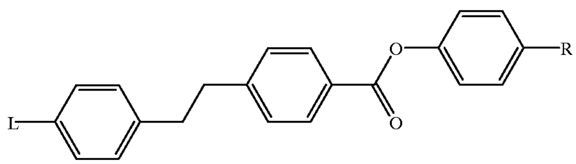

| LCReg | L | R | * | Phases |
|---|---|---|---|---|
| 34768 | $C_6H_{13}$—CHMe—OOC— | —O—$C_6H_{13}$ | R | Cr 81.0 S 66.0 C* 69.0 A 101.0 |
| 34769 | $C_6H_{13}$—CHMe—OOC— | —O—$C_7H_{15}$ | R | Cr 70.0 C* 85.0 A 98.0 |
| 34770 | $C_6H_{13}$—CHMe—OOC— | —O—$C_8H_{17}$ | R | Cr 75.0 C* 89.0 A 97.0 |
| 34771 | $C_6H_{13}$—CHMe—OOC— | —O—$C_9H_{19}$ | R | Cr 81.0 C* 90.0 A 94.0 |
| 34772 | $C_6H_{13}$—CHMe—OOC— | —O—$C_{10}H_{21}$ | R | Cr 84.0 C* 91.0 A 94.0 |
| 34773 | $C_6H_{13}$—CHMe—OOC— | —O—$C_{11}H_{23}$ | R | Cr 84.0 C* 92.0 A 93.0 |
| 34774 | $C_6H_{13}$—CHMe—OOC— | —O—$C_{12}H_{25}$ | R | Cr 80.0 C* 92.0 A 93.0 |
| 34775 | $C_2H_5$—CHMe—$CH_2$—OOC— | —O—$C_{10}H_{21}$ | S | Cr 64.0 C* 88.0 A 133.0 |

TABLE 595

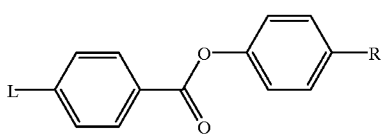

| LCReg | L | R | Phases |
|---|---|---|---|
| 8422 | $CH_3$—O— | —O—$C_6H_{13}$ | Cr 56.0 N 77.0 |
| 8423 | $CH_3$—O— | —O—$C_7H_{15}$ | Cr 62.0 N 73.0 |
| 8424 | $CH_3$—O— | —O—$C_8H_{17}$ | Cr 64.0 N 77.5 |
| 8425 | $CH_3$—O— | —O—$C_9H_{19}$ | Cr 72.0 N 74.0 |
| 8426 | $CH_3$—O— | —O—$C_{11}H_{23}$ | Cr 79.0 N 75.0 |
| 8429 | $C_2H_5$—O— | —O—$C_2H_5$ | CrX 113.0 Cr 116.6 N 116.9 |
| 8431 | $C_2H_5$—O— | —O—$C_4H_9$ | Cr 94.0 N 104.8 |
| 8433 | $C_2H_5$—O— | —O—$C_6H_{13}$ | Cr 83.0 N 97.5 |
| 8434 | $C_2H_5$—O— | —O—$C_7H_{15}$ | Cr 81.0 N 91.5 |
| 8435 | $C_2H_5$—O— | —O—$C_8H_{17}$ | Cr 83.2 N 93.2 |
| 8436 | $C_2H_5$—O— | —O—$C_9H_{19}$ | Cr 86.0 N 89.5 |
| 8437 | $C_2H_5$—O— | —O—$C_{10}H_{21}$ | Cr 89.0 N 90.0 |
| 8441 | $C_3H_7$—O— | —O—$C_2H_5$ | Cr 92.0 N 95.5 |
| 8443 | $C_3H_7$—O— | —O—$C_4H_9$ | Cr 82.0 N 86.0 |
| 8445 | $C_3H_7$—O— | —O—$C_6H_{13}$ | Cr 60.5 N 82.0 |

TABLE 596

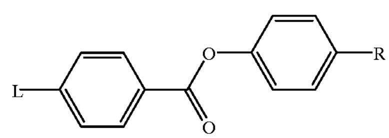

| LCReg | L | R | Phases |
|---|---|---|---|
| 8446 | $C_3H_7$—O— | —O—$C_7H_{15}$ | Cr 66.0 N 78.0 |
| 8447 | $C_3H_7$—O— | —O—$C_8H_{17}$ | Cr 62.0 N 79.0 |
| 8448 | $C_3H_7$—O— | —O—$C_9H_{19}$ | Cr 73.0 N 77.0 |
| 8449 | $C_3H_7$—O— | —O—$C_{10}H_{21}$ | Cr 71.5 N 78.0 |
| 8450 | $C_3H_7$—O— | —O—$C_{11}H_{23}$ | Cr 74.5 N 75.0 |
| 8451 | $C_3H_7$—O— | —O—$C_{12}H_{25}$ | Cr 75.9 N 76.6 |
| 8453 | $C_4H_9$—O— | —O—$C_2H_5$ | Cr 97.0 N 101.0 |
| 8455 | $C_4H_9$—O— | —O—$C_4H_9$ | Cr 87.0 N 92.0 |
| 8456 | $C_4H_9$—O— | —O—$C_5H_{11}$ | Cr 72.0 N 86.5 |
| 8457 | $C_4H_9$—O— | —O—$C_6H_{13}$ | Cr 64.0 N 92.0 |
| 8458 | $C_4H_9$—O— | —O—$C_7H_{15}$ | Cr 64.0 N 86.0 |
| 8459 | $C_4H_9$—O— | —O—$C_8H_{17}$ | Cr 65.0 N 89.0 |
| 8460 | $C_4H_9$—O— | —O—$C_9H_{19}$ | Cr 67.0 N 86.0 |
| 8461 | $C_4H_9$—O— | —O—$C_{10}H_{21}$ | Cr 78.0 N 87.0 |
| 8464 | $C_5H_{11}$—O— | —O—$C_2H_5$ | Cr 84.5 N 90.8 |

TABLE 597

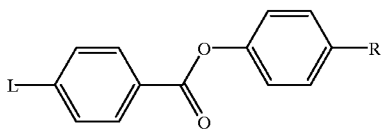

| LCReg | L | R | Phases |
|---|---|---|---|
| 8465 | $C_5H_{11}$—O— | —O—$C_3H_7$ | Cr 76.8 N 78.5 |
| 8466 | $C_5H_{11}$—O— | —O—$C_4H_9$ | Cr 67.0 N 82.0 |
| 8467 | $C_5H_{11}$—O— | —O—$C_5H_{11}$ | Cr 70.0 N 81.0 |
| 8468 | $C_5H_{11}$—O— | —O—$C_6H_{13}$ | Cr 57.5 N 84.5 |
| 8469 | $C_5H_{11}$—O— | —O—$C_7H_{15}$ | Cr 58.0 N 82.0 |
| 8470 | $C_5H_{11}$—O— | —O—$C_8H_{17}$ | Cr 52.0 N 85.0 |
| 8471 | $C_5H_{11}$—O— | —O—$C_9H_{19}$ | Cr 58.0 N 88.0 |
| 8472 | $C_5H_{11}$—O— | —O—$C_{10}H_{21}$ | (57.0) Cr 63.4 N 82.0 |
| 8473 | $C_5H_{11}$—O— | —O—$C_{12}H_{25}$ | (55.0) Cr 66.6 N 80.0 |
| 8474 | $C_5H_{11}$—O— | —O—$C_{14}H_{29}$ | (63.0) Cr 72.5 N 78.2 |
| 8475 | $C_5H_{11}$—O— | —O—$C_{16}H_{33}$ | (72.0) Cr 76.4 N 76.5 |
| 8476 | $C_5H_{11}$—O— | —O—$C_{18}H_{37}$ | (76.0) Cr 80.8 N 74.7 |
| 8477 | $C_6H_{13}$—O— | —O—$CH_3$ | Cr 93.5 N 78.5 |
| 8478 | $C_6H_{13}$—O— | —O—$C_2H_5$ | Cr 78.0 N 95.9 |
| 8479 | $C_6H_{13}$—O— | —O—$C_3H_7$ | Cr 70.0 N 82.3 |

TABLE 598

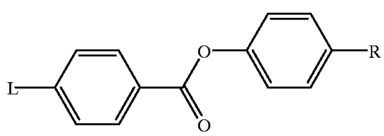

| LCReg | L | R | Phases |
|---|---|---|---|
| 8480 | $C_6H_{13}$—O— | —O—$C_4H_9$ | Cr 66.0 N 89.5 |
| 8481 | $C_6H_{13}$—O— | —O—$C_5H_{11}$ | Cr 71.0 N 86.5 |
| 8482 | $C_6H_{13}$—O— | —O—$C_6H_{13}$ | Cr 64.5 N 90.0 |
| 8483 | $C_6H_{13}$—O— | —O—$C_7H_{15}$ | Cr 55.0 N 88.0 |
| 8484 | $C_6H_{13}$—O— | —O—$C_8H_{17}$ | (34.0) Cr 48.0 C 46.0 N 89.0 |
| 8485 | $C_6H_{13}$—O— | —O—$C_9H_{19}$ | Cr 58.5 N 88.2 is |
| 64980 | $C_6H_{13}$—O— | —O—$C_{10}H_{21}$ | Cr 61.0 C 54.5 N 86.9 |
| 8486 | $C_6H_{13}$—O— | —O—$C_{12}H_{25}$ | Cr 66.8 C 59.7 N 84.7 |
| 64981 | $C_6H_{13}$—O— | —O—$C_{14}H_{29}$ | Cr 72.4 C 62.2 N 82.5 |
| 8488 | $C_7H_{15}$—O— | —O—$C_2H_5$ | Cr 77.0 N 91.0 |
| 8489 | $C_7H_{15}$—O— | —O—$C_3H_7$ | Cr 69.0 N 78.5 |
| 8490 | $C_7H_{15}$—O— | —O—$C_4H_9$ | Cr 68.0 N 86.5 |
| 8491 | $C_7H_{15}$—O— | —O—$C_5H_{11}$ | (49.0) Cr 59.2 C 47.6 N 82.1 |
| 8492 | $C_7H_{15}$—O— | —O—$C_6H_{13}$ | (42.0) Cr 65.9 C 51.4 N 86.7 |
| 8493 | $C_7H_{15}$—O— | —O—$C_7H_{15}$ | Cr 70.0 C 56.0 N 86.0 |

TABLE 599

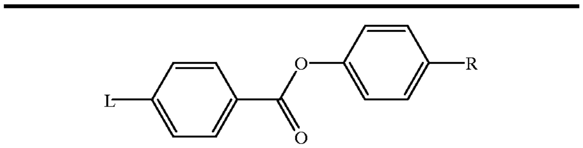

| LCReg | L | R | Phases |
|---|---|---|---|
| 8494 | $C_7H_{15}$—O— | —O—$C_8H_{17}$ | Cr 60.5 A 58.0 N 87.5 |
| 8495 | $C_7H_{15}$—O— | —O—$C_9H_{19}$ | Cr 68.0 N 86.5 |
| 8496 | $C_7H_{15}$—O— | —O—$C_{12}H_{25}$ | Cr 70.0 N 86.0 |
| 8497 | $C_8H_{17}$—O— | —O—$CH_3$ | Cr 82.0 N 76.0 |
| 8498 | $C_8H_{17}$—O— | —O—$C_2H_5$ | Cr 79.2 N 93.8 |
| 8499 | $C_8H_{17}$—O— | —O—$C_3H_7$ | CrX 57.0 Cr 69.0 A 59.0 N 81.0 |
| 8500 | $C_8H_{17}$—O— | —O—$C_4H_9$ | Cr 65.0 C 59.0 A 60.0 N 89.0 |
| 8501 | $C_8H_{17}$—O— | —O—$C_5H_{11}$ | Cr 58.0 C 64.0 A 66.0 N 85.0 |
| 8502 | $C_8H_{17}$—O— | —O—$C_6H_{13}$ | (39.0) Cr 55.0 C 66.0 N 89.0 |
| 8503 | $C_8H_{17}$—O— | —O—$C_7H_{15}$ | Cr 62.5 C 70.2 N 88.1 |

TABLE 599-continued

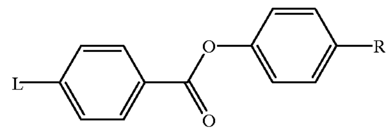

| LCReg | L | R | Phases |
|---|---|---|---|
| 8504 | $C_8H_{17}$—O— | —O—$C_8H_{17}$ | Cr 63.0 C 74.0 N 91.0 |
| 8505 | $C_8H_{17}$—O— | —O—$C_9H_{19}$ | Cr 66.0 C 76.0 N 89.0 |
| 8506 | $C_8H_{17}$—O— | —O—$C_{10}H_{21}$ | (55.0) Cr 67.7 C 78.0 N 90.2 |
| 8507 | $C_8H_{17}$—O— | —O—$C_{12}H_{25}$ | (52.0) Cr 72.4 C 80.5 A 82.0 N 88.9 |
| 64984 | $C_8H_{17}$—O— | —O—$C_{14}H_{29}$ | Cr 71.4 C 79.6 A 83.2 N 86.2 |

TABLE 600

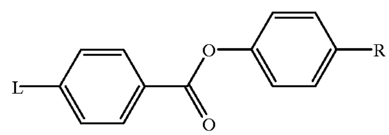

| LCReg | L | R | Phases |
|---|---|---|---|
| 64985 | $C_8H_{17}$—O— | —O—$C_{16}H_{33}$ | Cr 76.0 C 78.5 A 83.6 N 84.9 |
| 64986 | $C_8H_{17}$—O— | —O—$C_{18}H_{37}$ | Cr 81.1 C 77.4 A 83.4 N 83.7 |
| 8509 | $C_9H_{19}$—O— | —O—$C_2H_5$ | Cr 89.5 A 63.0 N 91.5 |
| 8510 | $C_9H_{19}$—O— | —O—$C_3H_7$ | Cr 67.5 A 68.0 N 81.0 |
| 8511 | $C_9H_{19}$—O— | —O—$C_4H_9$ | (35.0) Cr 61.0 B 50.0 C 61.6 A 73.0 N 87.0 |
| 8512 | $C_9H_{19}$—O— | —O—$C_5H_{11}$ | Cr 68.5 A 73.5 N 84.0 |
| 8513 | $C_9H_{19}$—O— | —O—$C_6H_{13}$ | (42.0) Cr 65.8 C 73.6 A 74.8 N 88.2 |
| 8514 | $C_9H_{19}$—O— | —O—$C_7H_{15}$ | Cr 72.6 S 78.2 N 87.8 |
| 8515 | $C_9H_{19}$—O— | —O—$C_8H_{17}$ | (58.0) Cr 66.9 C 79.3 N 89.3 |
| 8516 | $C_9H_{19}$—O— | —O—$C_9H_{19}$ | Cr 78.6 C 81.7 N 88.7 |
| 8517 | $C_9H_{19}$—O— | —O—$C_{10}H_{21}$ | (59.0) Cr 71.2 C 83.4 N 89.6 |
| 8518 | $C_9H_{19}$—O— | —O—$C_{12}H_{25}$ | Cr 74.0 S 84.9 S 86.3 N 89.0 |
| 8520 | $C_{10}H_{21}$—O— | —O—$C_2H_5$ | Cr 81.7 A 68.2 N 92.3 |
| 8521 | $C_{10}H_{21}$—O— | —O—$C_3H_7$ | Cr 60.5 A 73.2 N 82.2 |
| 8522 | $C_{10}H_{21}$—O— | —O—$C_4H_9$ | (53.0) Cr 58.0 C 57.6 A 77.0 N 86.0 |

TABLE 601

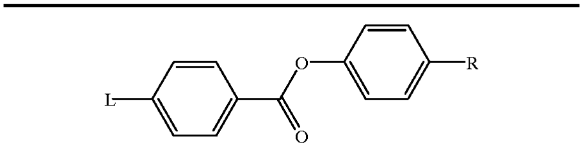

| LCReg | L | R | Phases |
|---|---|---|---|
| 8523 | $C_{10}H_{21}$—O— | —O—$C_5H_{11}$ | (39.0) Cr 62.6 B 45.8 C 67.1 A 79.4 N 84.8 |
| 8524 | $C_{10}H_{21}$—O— | —O—$C_6H_{13}$ | (35.0) Cr 62.5 E 38.0 B 44.5 C 77.5 A 83.3 N 88.9 |
| 8525 | $C_{10}H_{21}$—O— | —O—$C_7H_{15}$ | Cr 70.3 C 80.5 A 84.5 N 87.8 |
| 8526 | $C_{10}H_{21}$—O— | —O—$C_8H_{17}$ | Cr 71.0 C 85.0 A 87.0 N 91.0 |
| 8527 | $C_{10}H_{21}$—O— | —O—$C_9H_{19}$ | Cr 74.0 C 86.0 A 88.0 N 89.0 |
| 8528 | $C_{10}H_{21}$—O— | —O—$C_{10}H_{21}$ | (61.0) Cr 70.8 C 87.5 A 89.0 N 90.4 |
| 8529 | $C_{10}H_{21}$—O— | —O—$C_{12}H_{25}$ | Cr 75.2 C 87.5 A 88.3 |
| 64987 | $C_{10}H_{21}$—O— | —O—$C_{14}H_{29}$ | Cr 78.5 C 86.8 A 88.1 |
| 64988 | $C_{10}H_{21}$—O— | —O—$C_{16}H_{33}$ | Cr 78.2 C 84.8 A 87.1 |
| 8531 | $C_{11}H_{23}$—O— | —O—$C_2H_5$ | Cr 73.5 A 74.5 N 90.0 |

TABLE 601-continued

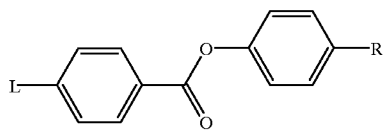

| LCReg | L | R | Phases |
|---|---|---|---|
| 8532 | $C_{11}H_{23}$—O— | —O—$C_3H_7$ | Cr 65.0 A 78.0 N 81.0 |
| 8533 | $C_{11}H_{23}$—O— | —O—$C_4H_9$ | Cr 63.0 A 86.2 N 88.2 |
| 8534 | $C_{11}H_{23}$—O— | —O—$C_5H_{11}$ | (48.0) Cr 72.3 B 49.8 C 67.3 A 82.7 N 83.7 |
| 8535 | $C_{11}H_{23}$—O— | —O—$C_6H_{13}$ | (40.0) Cr 69.2 B 49.7 C 78.5 A 85.0 N 87.3 |
| 8536 | $C_{11}H_{23}$—O— | —O—$C_7H_{15}$ | Cr 68.5 B 54.0 C 84.0 A 88.0 |

TABLE 602

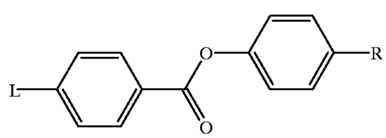

| LCReg | L | R | Phases |
|---|---|---|---|
| 8537 | $C_{11}H_{23}$—O— | —O—$C_8H_{17}$ | Cr 67.5 B 54.0 C 88.0 A 91.0 |
| 8538 | $C_{11}H_{23}$—O— | —O—$C_9H_{19}$ | Cr 74.0 C 89.5 A 90.5 |
| 8539 | $C_{11}H_{23}$—O— | —O—$C_{12}H_{25}$ | Cr 80.5 C 92.5 |
| 8540 | $C_{11}H_{23}$—O— | —O—$C_{14}H_{29}$ | (71.0) Cr 82.3 C 89.2 |
| 8542 | $C_{12}H_{25}$—O— | —O—$C_2H_5$ | Cr 76.5 A 76.0 N 91.0 |
| 8543 | $C_{12}H_{25}$—O— | —O—$C_3H_7$ | Cr 65.0 A 79.5 N 81.0 |
| 8544 | $C_{12}H_{25}$—O— | —O—$C_4H_9$ | Cr 67.3 B 51.2 A 81.6 |
| 8545 | $C_{12}H_{25}$—O— | —O—$C_5H_{11}$ | Cr 63.0 B 53.5 C 66.0 A 84.5 |
| 8546 | $C_{12}H_{25}$—O— | —O—$C_6H_{13}$ | Cr 68.4 B 56.3 C 78.2 A 87.8 |
| 8547 | $C_{12}H_{25}$—O— | —O—$C_7H_{15}$ | Cr 71.0 B 57.0 C 83.0 A 89.5 |
| 8548 | $C_{12}H_{25}$—O— | —O—$C_8H_{17}$ | Cr 69.5 B 60.2 C 89.1 A 91.2 |
| 8549 | $C_{12}H_{25}$—O— | —O—$C_9H_{19}$ | Cr 75.5 C 89.0 A 92.0 |
| 8550 | $C_{12}H_{25}$—O— | —O—$C_{10}H_{21}$ | Cr 79.9 B 60.9 C 91.4 |
| 64990 | $C_{12}H_{25}$—O— | —O—$C_{12}H_{25}$ | Cr 82.0 B 61.5 C 90.4 |
| 64991 | $C_{12}H_{25}$—O— | —O—$C_{14}H_{29}$ | Cr 84.1 B 62.9 C 90.0 |

TABLE 603

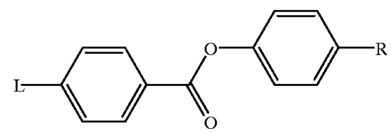

| LCReg | L | R | Phases |
|---|---|---|---|
| 8551 | $C_{14}H_{29}$—O— | —O—$CH_3$ | Cr 55.5 S 125.0 |
| 64994 | $C_{14}H_{29}$—O— | —O—$C_2H_5$ | Cr 78.4 A 78.8 N 87.5 |
| 64995 | $C_{14}H_{29}$—O— | —O—$C_4H_9$ | Cr 77.4 B 61.4 A 86.5 |
| 67196 | $C_{14}H_{29}$—O— | —O—$C_5H_{11}$ | Cr 61.0 S 135.0 |
| 64996 | $C_{14}H_{29}$—O— | —O—$C_6H_{13}$ | Cr 76.6 B 65.6 C 74.8 A 88.1 |
| 8552 | $C_{14}H_{29}$—O— | —O—$C_7H_{15}$ | (56.0) Cr 61.0 B 67.2 C 85.2 A 89.2 |
| 64997 | $C_{14}H_{29}$—O— | —O—$C_8H_{17}$ | Cr 73.8 B 70.0 C 90.3 A 91.5 |
| 64998 | $C_{14}H_{29}$—O— | —O—$C_{10}H_{21}$ | Cr 83.8 B 71.0 C 91.9 |
| 64999 | $C_{14}H_{29}$—O— | —O—$C_{12}H_{25}$ | Cr 85.7 B 71.5 C 91.2 |
| 65000 | $C_{14}H_{29}$—O— | —O—$C_{14}H_{29}$ | Cr 89.9 B 72.2 C 90.9 |
| 8553 | $C_{16}H_{33}$—O— | —O—$CH_3$ | Cr 84.0 A 101.0 |
| 65003 | $C_{16}H_{33}$—O— | —O—$C_2H_5$ | Cr 80.6 A 81.1 N 85.6 |
| 65004 | $C_{16}H_{33}$—O— | —O—$C_4H_9$ | Cr 82.6 B 66.4 A 86.1 |
| 67197 | $C_{16}H_{33}$—O— | —O—$C_5H_{11}$ | Cr 95.0 S 90.0 un |
| 65005 | $C_{16}H_{33}$—O— | —O—$C_6H_{13}$ | Cr 81.3 B 71.4 A 88.3 |

TABLE 604

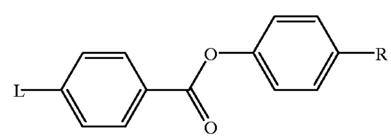

| LCReg | L | R | Phases |
|---|---|---|---|
| 65006 | $C_{16}H_{33}$—O— | —O—$C_8H_{17}$ | Cr 77.4 B 76.9 C 90.5 A 91.3 |
| 8554 | $C_{16}H_{33}$—O— | —O—$C_{10}H_{21}$ | (64.0) Cr 81.9 B 78.4 C 91.8 |
| 65007 | $C_{16}H_{33}$—O— | —O—$C_{12}H_{25}$ | Cr 86.6 B 79.3 C 91.1 |
| 65008 | $C_{16}H_{33}$—O— | —O—$C_{14}H_{29}$ | Cr 90.4 B 80.3 C 90.6 |
| 65009 | $C_{16}H_{33}$—O— | —O—$C_{16}H_{33}$ | Cr 92.9 B 82.2 C 89.7 |
| 65010 | $C_{16}H_{33}$—O— | —O—$C_{18}H_{37}$ | Cr ? B 84.8 C 89.4 |
| 65011 | $C_{18}H_{37}$—O— | —O—$C_2H_5$ | Cr 82.6 A 81.9 N 84.1 |
| 65012 | $C_{18}H_{37}$—O— | —O—$C_4H_9$ | Cr 86.3 B 68.7 A 84.9 |
| 65013 | $C_{18}H_{37}$—O— | —O—$C_6H_{13}$ | Cr 84.9 B 75.5 A 87.7 |
| 65014 | $C_{18}H_{37}$—O— | —O—$C_8H_{17}$ | Cr 80.7 B 81.3 C 89.5 A 90.5 |
| 65015 | $C_{18}H_{37}$—O— | —O—$C_{10}H_{21}$ | Cr 83.6 B 83.1 C 90.9 |
| 65016 | $C_{18}H_{37}$—O— | —O—$C_{12}H_{25}$ | Cr 86.5 B 84.1 C 90.5 |
| 65017 | $C_{18}H_{37}$—O— | —O—$C_{14}H_{29}$ | Cr 92.0 B 85.2 C 90.3 |
| 65018 | $C_{18}H_{37}$—O— | —O—$C_{16}H_{33}$ | Cr 83.4 B 87.3 C 89.6 |
| 65019 | $C_{18}H_{37}$—O— | —O—$C_{18}H_{37}$ | Cr 97.1 B 89.1 C 89.2 |

TABLE 605

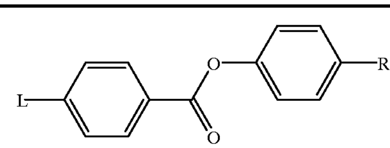

| LCReg | L | R | Phases |
|---|---|---|---|
| 8697 | $C_{10}H_{21}$—O— | —O—$C_4H_8$—CMe2—$C_4H_9$ | CrX 29.0 Cr 38.0 C 39.0 A 48.0 |
| 8698 | $C_{10}H_{21}$—O— | —O—$C_6H_{12}$—CMe2—$C_4H_9$ | Cr 23.0 B 30.0 C 54.0 A 62.0 |
| 60370 | $C_{10}H_{21}$—O— | —O—$C_2H_4$—O—$C_4H_9$ | (38.0) Cr 53.5 C 53.2 N 55.0 |
| 8756 | $C_2H_5$—O— | —CO—$C_6H_{13}$ | Cr 100.0 A 86.0 N 107.0 |
| 8757 | $C_2H_5$—O— | —CO—$C_7H_{15}$ | Cr 102.0 N 104.0 |
| 8759 | $C_3H_7$—O— | —CO—$C_2H_5$ | Cr 107.1 N 116.0 |
| 8761 | $C_3H_7$—O— | —CO—$C_4H_9$ | Cr 89.0 A 90.0 N 97.5 |
| 8763 | $C_3H_7$—O— | —CO—$C_6H_{13}$ | Cr 97.0 A 98.0 N 100.0 |

TABLE 605-continued

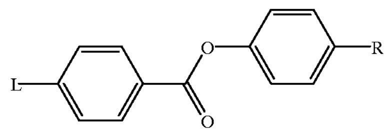

| LCReg | L | R | Phases |
|---|---|---|---|
| 8765 | $C_4H_9$—O— | —CO—$C_2H_5$ | CrX 84.0 Cr 100.2 A 101.2 N 121.3 |
| 8771 | $C_5H_{11}$—O— | —CO—$C_3H_7$ | Cr 89.7 A 100.8 |
| 8772 | $C_5H_{11}$—O— | —CO—$C_4H_9$ | Cr 75.0 A 111.0 |
| 8773 | $C_5H_{11}$—O— | —CO—$C_5H_{11}$ | (77.0) CrX 87.0 Cr 90.5 A 111.5 |
| 8774 | $C_5H_{11}$—O— | —CO—$C_7H_{15}$ | Cr 89.0 S 113.0 |
| 8776 | $C_6H_{13}$—O— | —CO—$C_2H_5$ | (59.0) Cr 89.0 A 119.0 N 123.4 |
| 8777 | $C_6H_{13}$—O— | —CO—$C_3H_7$ | Cr 89.9 A 105.3 |

TABLE 606

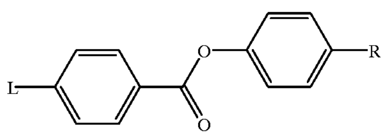

| LCReg | L | R | Phases |
|---|---|---|---|
| 8778 | $C_6H_{13}$—O— | —CO—$C_7H_{15}$ | (78.0) CrX 86.1 Cr 94.9 A 119.5 |
| 8780 | $C_7H_{15}$—O— | —CO—$C_2H_5$ | Cr 95.0 A 121.1 |
| 8781 | $C_7H_{15}$—O— | —CO—$C_3H_7$ | Cr 101.4 A 107.6 |
| 8782 | $C_7H_{15}$—O— | —CO—$C_5H_{11}$ | (78.0) Cr 97.3 A 117.8 |
| 8783 | $C_7H_{15}$—O— | —CO—$C_7H_{15}$ | (89.0) Cr 102.6 A 119.6 |
| 8784 | $C_8H_{17}$—O— | —CO—$CH_3$ | Cr 84.0 A 95.0 |
| 8785 | $C_8H_{17}$—O— | —CO—$C_2H_5$ | Cr 83.8 A 124.1 |
| 8786 | $C_8H_{17}$—O— | —CO—$C_3H_7$ | Cr 98.3 A 111.5 |

TABLE 606-continued

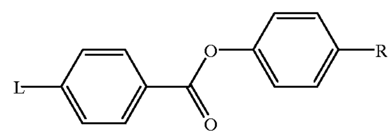

| LCReg | L | R | Phases |
|---|---|---|---|
| 8787 | $C_8H_{17}$—O— | —CO—$C_5H_{11}$ | (87.0) Cr 100.3 A 119.6 |
| 8788 | $C_8H_{17}$—O— | —CO—$C_7H_{15}$ | (86.0) Cr 99.7 A 121.3 |
| 8789 | $C_9H_{19}$—O— | —CO—$CH_3$ | Cr 93.2 A 94.5 |
| 8790 | $C_9H_{19}$—O— | —CO—$C_2H_5$ | Cr 96.1 A 125.2 |
| 8791 | $C_9H_{19}$—O— | —CO—$C_3H_7$ | Cr 106.6 A 110.8 |
| 8792 | $C_{10}H_{21}$—O— | —CO—$CH_3$ | CrX 76.0 Cr 84.2 A 95.0 |
| 8793 | $C_{10}H_{21}$—O— | —CO—$C_2H_5$ | Cr 88.8 A 126.4 |

TABLE 607

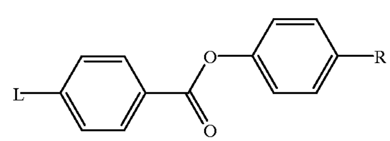

| LCReg | L | R | Phases |
|---|---|---|---|
| 8794 | $C_{10}H_{21}$—O— | —CO—$C_3H_7$ | Cr 96.4 A 112.2 |
| 8795 | $C_{10}H_{21}$—O— | —CO—$C_4H_9$ | (77.0) Cr 92.6 A 120.6 |
| 8796 | $C_{10}H_{21}$—O— | —CO—$C_7H_{15}$ | (92.0) Cr 105.5 A 121.2 |
| 8797 | $C_{10}H_{21}$—O— | —CO—$C_9H_{19}$ | (95.0) Cr 107.6 A 120.7 |
| 8798 | $C_{12}H_{25}$—O— | —CO—$CH_3$ | Cr 87.5 S 102.0 |
| 8799 | $C_{12}H_{25}$—O— | —CO—$C_4H_9$ | (80.0) Cr 96.6 A 120.8 |
| 8800 | $C_{12}H_{25}$—O— | —CO—$C_7H_{15}$ | (103.0) Cr 107.6 A 119.5 |
| 8801 | $C_{12}H_{25}$—O— | —CO—$C_9H_{19}$ | (104.0) Cr 112.0 A 119.1 |
| 8802 | $C_{14}H_{29}$—O— | —CO—$CH_3$ | Cr 90.0 S 102.5 |
| 8803 | $C_{16}H_{33}$—O— | —CO—$CH_3$ | Cr 88.5 S 101.0 |
| 8804 | $C_{18}H_{37}$—O— | —CO—$CH_3$ | Cr 85.0 S 95.0 |
| 8805 | $C_7H_{15}$—O— | —CO—$CH_2$—OOC—$C_3H_7$ | Cr 53.0 S 68.2 N 120.0 |

TABLE 608

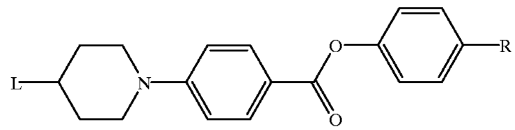

| LCReg | L | R | Phases |
|---|---|---|---|
| 30512 | $CH_3$— | —CN | Cr 125.0 N 158.0 |
| 30513 | $C_2H_5$— | —CN | Cr 125.0 N 188.0 |
| 30514 | $C_3H_7$— | —CN | Cr 130.0 N 206.0 |
| 30515 | $C_4H_9$— | —CN | Cr 94.0 N 198.0 |
| 30516 | $C_5H_{11}$— | —CN | Cr 115.5 N 202.0 |
| 30517 | $C_6H_{13}$— | —CN | Cr 90.0 N 187.0 |
| 30518 | $C_7H_{15}$— | —CN | Cr 105.0 A 145.0 N 180.0 |
| 30519 | $C_8H_{17}$— | —CN | Cr 116.0 A 161.0 N 181.0 |
| 30520 | $C_9H_{19}$— | —CN | Cr 95.0 A 173.0 N 180.0 |
| 30521 | $C_{10}H_{21}$— | —CN | Cr 82.0 A 179.0 |
| 30523 | $C_4H_9$— | —$C_4H_9$ | Cr 106.0 A 155.0 N 157.0 |
| 30524 | $C_5H_{11}$— | —$C_4H_9$ | Cr 105.0 A 168.0 |
| 30525 | $C_6H_{13}$— | —$C_4H_9$ | Cr 109.0 A 164.0 |
| 30526 | $C_7H_{15}$— | —$C_4H_9$ | Cr 104.0 A 165.0 |
| 30527 | $C_8H_{17}$— | —$C_4H_9$ | Cr 104.0 A 165.0 |

TABLE 609

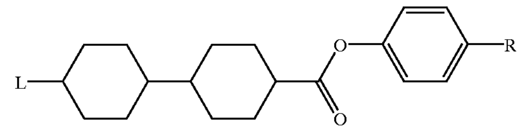

| LCReg | L | R | Phases |
|---|---|---|---|
| 62725 | $C_2H_5$— | —F | Cr 74.6 N 156.2 |
| 31081 | $C_3H_7$— | —F | Cr 70.9 N 183.1 |
| 62726 | $C_4H_9$— | —F | Cr 72.7 N 179.7 |
| 62727 | $C_5H_{11}$— | —F | Cr 65.2 N 181.0 |
| 31082 | $C_7H_{15}$— | —F | Cr 74.3 N 170.1 |
| 31084 | $CH_3$—CH═CH— | —F | Cr 75.0 N 209.0 |
| 31085 | $H_2C$═CH—$C_3H_6$— | —F | Cr 70.3 N 158.7 |
| 62728 | $C_2H_5$— | —Cl | Cr 93.2 N 188.5 |
| 31086 | $C_3H_7$— | —Cl | Cr 82.8 N 214.9 |
| 62729 | $C_4H_9$— | —Cl | Cr 85.2 N 198.5 |
| 62730 | $C_5H_{11}$— | —Cl | Cr 85.8 N 205.7 |
| 31087 | $C_7H_{15}$— | —Cl | Cr 87.2 N 196.8 |
| 31088 | $H_2C$═CH—$C_2H_4$— | —Cl | Cr 78.3 N 213.5 |
| 31089 | $C_3H_7$— | —CN | Cr 93.0 N 210.0 |
| 31090 | $C_5H_{11}$— | —CN | Cr 92.0 N 232.0 |

TABLE 610

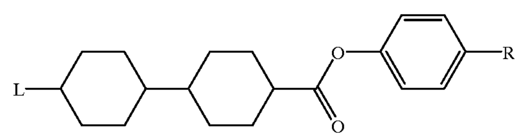

| LCReg | L | R | * | Phases |
|---|---|---|---|---|
| 31091 | $C_7H_{15}$— | —CN | | Cr 90.0 S 118.0 N 222.0 |
| 31092 | $C_3H_7$— | —$CH_3$ | | Cr 53.0 S 96.0 N 204.0 |
| 31093 | $C_3H_7$— | —$C_3H_7$ | | Cr 60.0 S 152.0 N 203.0 |
| 31094 | $C_3H_7$— | —$C_5H_{11}$ | | Cr 34.0 S 159.0 N 192.0 |
| 31095 | $C_3H_7$— | —$C_7H_{15}$ | | Cr 46.0 S 153.0 N 176.0 |
| 31096 | $C_5H_{11}$— | —$C_5H_{11}$ | | Cr 38.0 S 176.8 N 190.1 |
| 31097 | $C_3H_7$— | —$CH_2$—O—$CH_3$ | | Cr 51.0 S 125.0 N 131.0 |
| 31098 | $C_3H_7$— | —$CH_2$—O—$C_3H_7$ | | Cr 24.0 S 130.0 N 168.0 |
| 31099 | $C_5H_{11}$— | —O—$CH_2$—CHMe—O—$C_4H_9$ | R | Cr 29.8 B 150.8 |
| 31100 | $C_5H_{11}$— | —O—CHMe—COO—$C_4H_9$ | R | Cr 109.2 B 44.6 |
| 31101 | $C_5H_{11}$— | —O—$CH_2$—CHMe—OOC—$C_4H_9$ | S | Cr 61.7 B 137.9 |
| 31112 | $C_5H_{11}$— | —O—CHCN—$CH_3$ | R | Cr 82.5 A 146.9 N* 179.6 |
| 31105 | $C_5H_{11}$— | —O—$CF_3$ | | Cr 57.0 B 124.0 N 184.1 |
| 31106 | $C_5H_{11}$— | —O—$CH_2$—$CF_3$ | | Cr 84.0 B 178.0 N 197.4 |
| 31107 | $C_7H_{15}$— | —O—$CH_2$—$CF_3$ | | (67.0) Cr ? B 172.0 A 187.0 |

TABLE 611

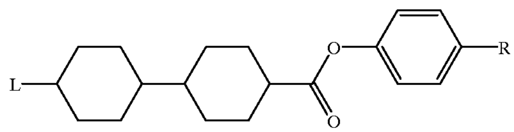

| LCReg | L | R | Phases |
|---|---|---|---|
| 31108 | $C_7H_{15}$— | —O—$CH_2$—$C_5F_{11}$ | (68.0) Cr ? B 195.0 N 198.0 |
| 31109 | $C_5H_{11}$— | —CO—$CF_3$ | Cr 84.0 N 182.8 |
| 31110 | $C_5H_{11}$— | —O—$CF_2$—H | Cr 61.0 B 93.0 N 196.9 |
| 31111 | $C_5H_{11}$— | —O—$CH_2$—$CF_2$—H | Cr 84.0 X 197.4 |
| 31103 | $C_5H_{11}$— | —CH=C(COO—$CH_2$—CH=$CH_2$ | Cr 101.3 N 143.4 |

TABLE 612

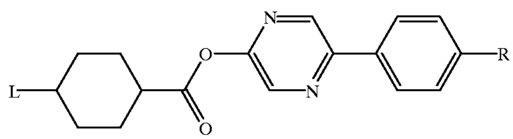

| LCReg | L | R | Phases |
|---|---|---|---|
| 62476 | $C_2H_5$— | —$C_3H_7$ | (20.0) Cr 90.0 S 89.0 N 164.8 |
| 62477 | $C_3H_7$— | —$C_3H_7$ | (60.0) Cr 88.0 S 80.9 N 188.9 |
| 62478 | $C_4H_9$— | —$C_3H_7$ | (60.0) Cr 71.0 S 63.8 N 168.9 |
| 62479 | $C_5H_{11}$— | —$C_3H_7$ | (63.0) Cr 83.0 S 69.0 N 185.5 |
| 31290 | $C_5H_{11}$— | —$C_5H_{11}$ | Cr ? |
| 62480 | $C_6H_{13}$— | —$C_3H_7$ | (62.0) Cr 81.0 S 72.0 N 171.0 |
| 62481 | $C_7H_{15}$— | —$C_3H_7$ | (62.0) Cr 82.0 S 81.5 N 173.4 |

TABLE 613

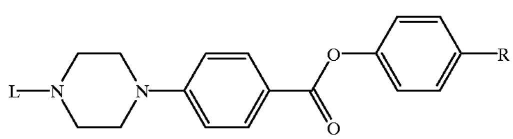

| LCReg | L | R | Phases |
|---|---|---|---|
| 30553 | $C_3H_7$— | —CN | Cr 124.6 N 202.4 |
| 30554 | $C_4H_9$— | —CN | Cr 110.3 N 202.4 |
| 30555 | $C_5H_{11}$— | —CN | Cr 92.9 N 204.3 |
| 30556 | $C_6H_{13}$— | —CN | Cr 84.5 N 184.8 |
| 30557 | $C_7H_{15}$— | —CN | Cr 85.7 N 180.6 |
| 30558 | $C_3H_7$— | —$C_3H_7$ | Cr 96.3 A 118.8 N 157.8 |
| 30559 | $C_5H_{11}$— | —$C_3H_7$ | Cr 104.5 A 162.5 N 175.3 |
| 30560 | $C_4H_9$— | —O—$C_4H_9$ | Cr 100.0 A 165.0 N 194.3 |

TABLE 614

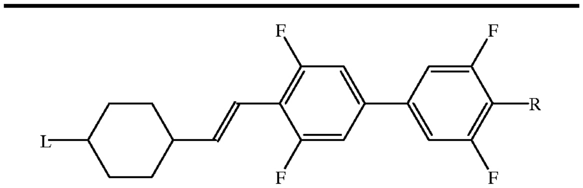

| LCReg | L | R | Phases |
|---|---|---|---|
| 63117 | $C_5H_{11}$— | —F | Cr ? |
| 32761 | $C_5H_{11}$— | —O—$C_3H_7$ | Cr 32.0 A 118.0 N 178.0 |

TABLE 614-continued

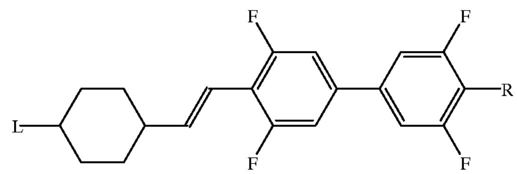

| LCReg | L | R | Phases |
|---|---|---|---|
| 32762 | $C_5H_{11}$— | —O—$C_4H_9$ | Cr 33.0 A 125.0 N 177.0 |
| 32763 | $C_5H_{11}$— | —O—$C_5H_{11}$ | Cr 31.0 A 132.0 N 168.0 |
| 32764 | $C_5H_{11}$— | —O—$C_6H_{13}$ | Cr 32.0 A 137.0 N 165.0 |
| 32765 | $C_5H_{11}$— | —O—$C_7H_{15}$ | Cr 34.0 A 136.0 N 157.0 |
| 63115 | $C_5H_{11}$— | —O—$C_8H_{17}$ | Cr 30.0 A 125.9 N 145.3 |
| 63116 | $C_5H_{11}$— | —O—$C_9H_{19}$ | Cr 30.0 A 119.0 N 136.2 |
| 63118 | $C_5H_{11}$— | —O—$C_{10}H_{21}$ | Cr 50.0 A 130.0 N 144.8 |

TABLE 615

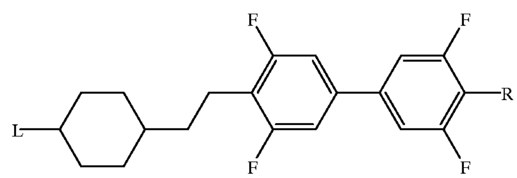

| LCReg | L | R | Phases |
|---|---|---|---|
| 32756 | $C_5H_{11}$— | —O—$C_3H_7$ | Cr 57.0 A 45.0 N 97.0 |
| 32757 | $C_5H_{11}$— | —O—$C_5H_{11}$ | Cr 38.0 A 73.0 N 88.0 |
| 32758 | $C_5H_{11}$— | —O—$C_6H_{13}$ | Cr 35.0 A 77.0 N 91.0 |
| 32759 | $C_5H_{11}$— | —O—$C_7H_{15}$ | Cr 32.0 A 77.0 N 85.0 |
| 32760 | $C_5H_{11}$— | —O—$C_8H_{17}$ | Cr 33.0 A 77.4 N 86.0 |
| 63120 | $C_5H_{11}$— | —O—$C_9H_{19}$ | Cr 38.4 A 61.8 N 75.4 |
| 63119 | $C_5H_{11}$— | —O—$C_{10}H_{21}$ | Cr 36.7 A 62.0 N 71.4 |

TABLE 616

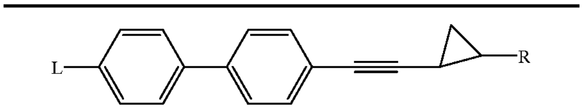

| LCReg | L | R | * | Phases |
|---|---|---|---|---|
| 30600 | $C_8H_{17}$— | —O—CMe3 | 1 | Cr 49.2 B 36.6 |
| 30601 | $C_8H_{17}$— | —O—$C_2H_5$ | 2 | Cr 35.2 B 78.0 |

The liquid crystalline charge transport materials according to the present invention are useful for various applications such as photosensors, electroluminescence devices, photoconductors, space modulating devices, and thin film transistors, and temperature sensors.

The liquid crystalline charge transport materials according to the present invention can realize high-speed mobility and inhibition of the creation of structural traps. Therefore, high-speed response photosensors may be mentioned as the first application thereof. Next, by virtue of excellent charge transport properties, the liquid crystalline charge transport materials according to the present invention can be used as a charge transport layer in electroluminescence devices. Further, since electric field alignment and photoconductivity can be simultaneously switched, they can be used in image display devices. Furthermore, the materials according to the present invention have liquid crystallinity, and the charge mobility of each phase varies depending upon the temperature. Further, the photoconductivity is also different. Therefore, these materials can be used as a temperature sensor which, unlike the conventional temperature sensor, can realize simultaneous switching by temperature and light.

FIG. 1 is a diagram showing the application of the liquid crystalline charge transport material of the present invention to an image display device as a representative embodiment. The image display device shown in FIG. 1 comprises: a transparent substrate 15, such as glass; and, laminated on the substrate 15 in the following order, a transparent electrode 13, such as ITO (indium titanium oxide), a charge generating layer 14' capable of generating carriers in response to exposure, the liquid crystalline charge transport material 14 of the present invention, and a counter electrode 13' (such as a gold electrode). When this image display device is subjected to imagewise exposure (input of an image) through the bottom of the device as shown in the schematic diagram, the liquid crystalline charge transport material 14 is aligned in response to the exposure, resulting in flow of carriers in the counter electrode 13' (gold electrode). The input image can be reproduced by optical reading of the alignment of the liquid crystal. The larger the smectic properties of the liquid crystal, the longer the storage time of the alignment of the liquid crystal and the longer the storage time of the input information.

Figure 2:
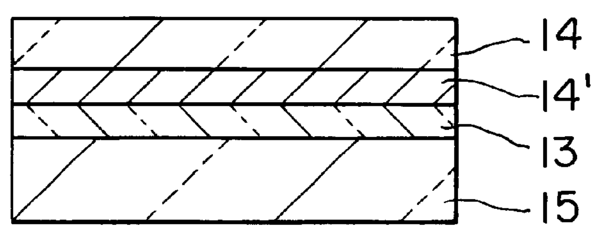
FIG. 2 is a typical diagram showing an image recording device.
Figure 3:
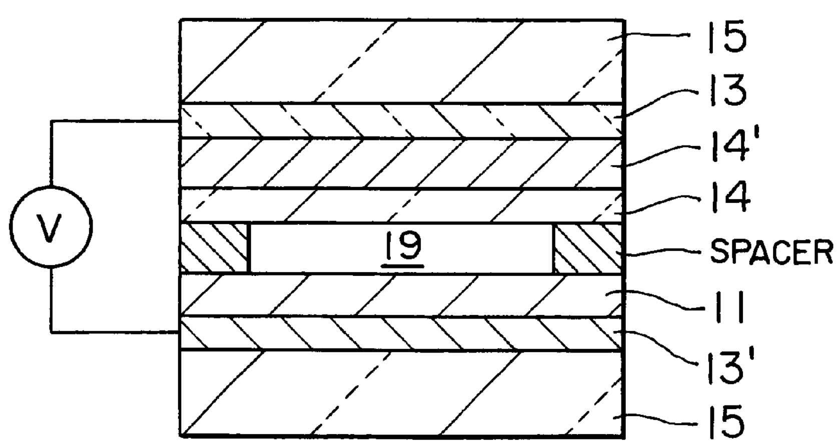
FIG. 3 is a typical diagram showing an image recording device.

FIGS. 2 and 3 are explanatory diagrams of embodiments where the liquid crystalline charge transport material according to the present invention has been applied to a charge transport layer in an image recording device. FIG. 2 is a typical diagram of a photosensor, an embodiment where the liquid crystalline charge transport material according to the present invention has been applied to a charge transport layer. Use of the photosensor will be described in more detail. As shown in FIG. 3, the device is subjected to pattern exposure from the direction of the above in the drawing while applying a voltage across the upper and lower electrodes 13, 13'. Carriers are generated in a pattern form in 14', and charges transported by a charge transport layer 14 are discharged in a space 19 and reach the surface of an information recording layer 11.

The information recording layer 11 is, for example, a liquid crystal/polymer composite layer formed of a composite of a smectic liquid crystal and a polymer. The liquid crystal is aligned in a pattern form in an electric field of accumulated charges and accumulated, enabling optical reading.

Figure 4:
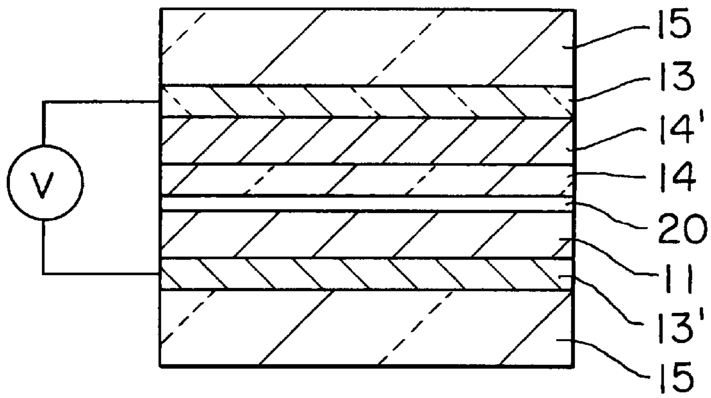
FIG. 4 is a typical diagram showing an image recording device.

In the embodiment shown in FIG. 4, exposure with a voltage being applied may be carried out in the same manner as described above in connection with the embodiment shown in FIG. 3. The generated charges (image) are accumulated on the top surface of a dielectric layer 20, and the liquid crystal is aligned in a pattern form in an electric field of charges accumulated in the same manner as described above in connection with the embodiment shown in FIG. 3 and accumulated, enabling optical reading.

Figure 5:
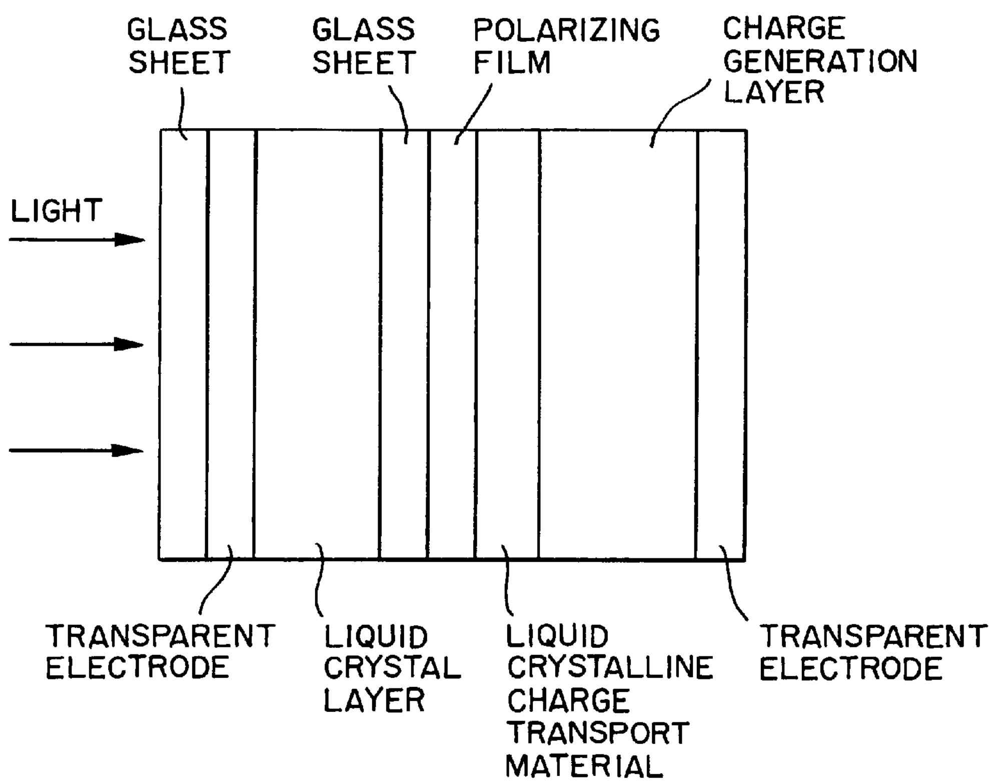
FIG. 5 is a typical diagram showing a space light modulating device.
Figure 6:
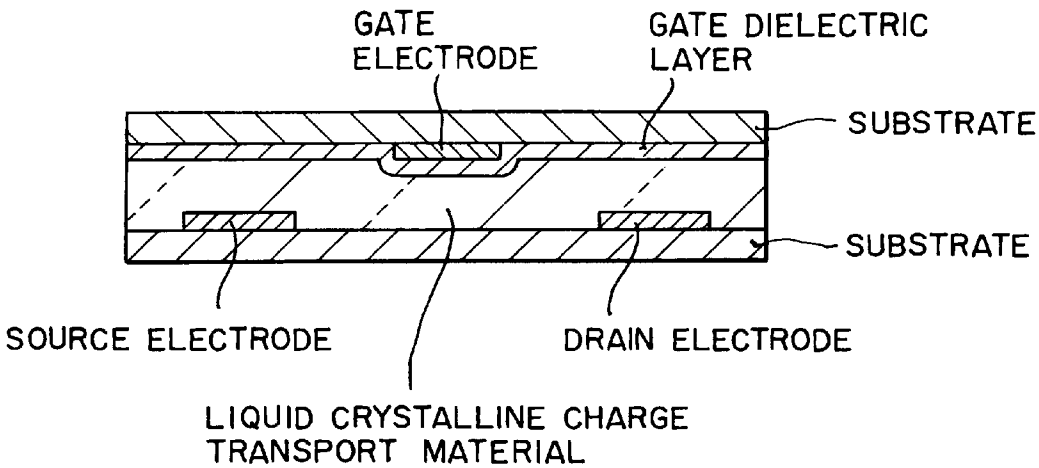
FIG. 6 is a typical diagram showing a thin film transistor.

Further, the liquid crystalline charge transport material according to the present invention can be used also in a space optical modulating device schematically shown in FIG. 5. Furthermore, the liquid crystalline charge transport material of the present invention can also be used as an active layer of a thin film transistor. For example, as shown in FIG. 6, the liquid crystalline material may be disposed on a substrate having thereon source, drain, and gate electrodes.

Figure 7:
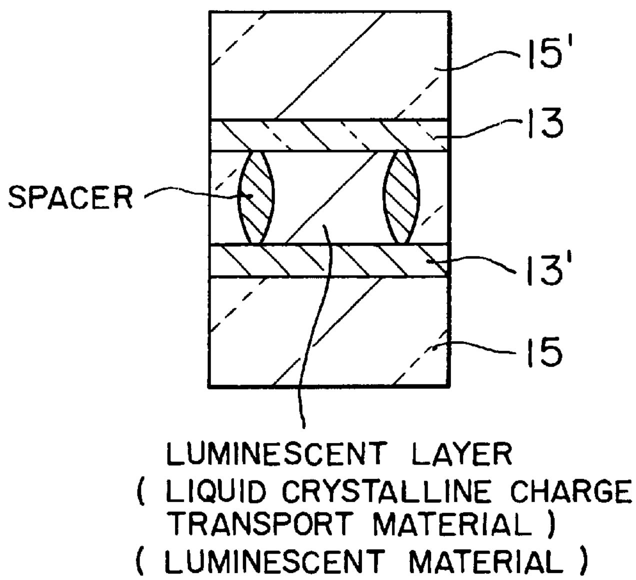
FIG. 7 is a typical diagram showing an electroluminescence device.

FIGS. 7 to 10 are explanatory diagrams of representative embodiments where the liquid crystalline charge transport material according to the present invention has been applied to an electroluminescence device. The simplest structure of the electroluminescence device is as shown in FIG. 7, that is, such that a fluorescent layer is sandwiched between a transparent electrode 13 and an electrode 13' (a cathode and an anode) and this assembly is further sandwiched between a substrate 15 and a transparent substrate 15'. In order to provide intense light emission, preferably, the cathode material, which functions to inject electrons, has a small work function, while the anode material has a work function equal to or larger than the cathode material.

Anode materials usable herein include, for example, transparent or semitransparent electrode materials, such as ITO, indium oxide, tin oxide (doped with antimony, arsenic, or fluorine), $Cd_2SnO_4$, zinc oxide, copper iodide, and gold. Cathode materials usable herein include, for example, alkali metals and alkaline earth metals, for example, sodium, potassium, magnesium, and lithium, sodium—potassium alloy, magnesium—indium alloy, magnesium—silver alloy, aluminum, gold, silver, gallium, indium, and copper, and, in addition, the materials described above in connection with the anode material.

The material used in the luminescent layer comprises the liquid crystalline charge transport material of the present invention and a luminescent material. Preferably, the liquid crystalline charge transport material is a material capable of transporting both an electron and a hole, a mixture of materials capable of transporting both an electron and a hole, or a mixture of an electron transport material with a hole transport material. However, use of a material capable of transporting any one of the electron and the hole suffices for utilization of light emission at the electrode interface. When the liquid crystal per se is fluorescent, the luminescent material is not particularly necessary. Many cases where the core of the liquid crystal comprises an organic dye compound having intense fluorescence in a solid state satisfy the above requirements.

Dye materials having high fluorescent quantum efficiency can be used as the fluorescent material, and examples thereof include laser oscillation dyes, such as diphenylethylene derivatives, triphenylamine derivatives, diaminocarbazole derivatives, bisstyryl derivatives, benzothiazole derivatives, benzoxazole derivatives, aromatic diamine derivatives, quinacridone compounds, perylene compounds, oxadiazole derivatives, coumarin compounds, anthraquinone derivatives, and DCM-1. The luminescent material is added in such an amount as will not break the liquid crystallinity of the liquid crystalline charge transport material according to the present invention, preferably in an amount of about 0.01 to 30% based on the liquid crystalline charge transport material.

Figure 9:
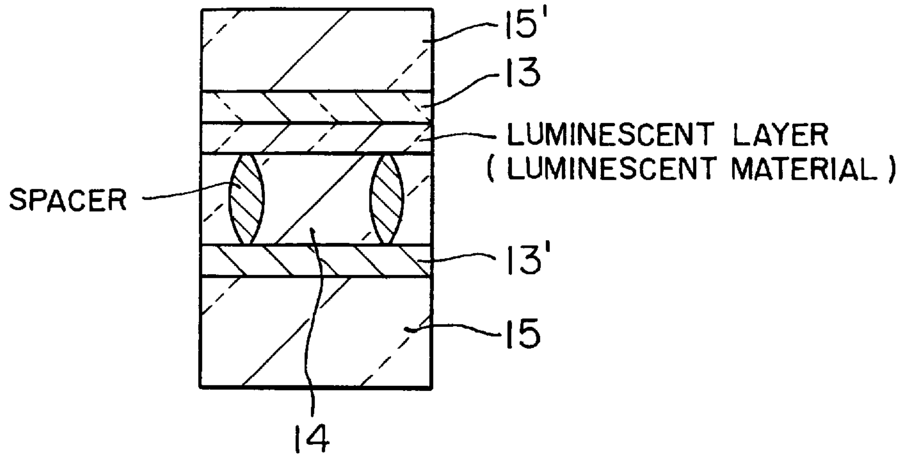
FIG. 9 is a typical diagram showing an electroluminescence device.
Figure 10:
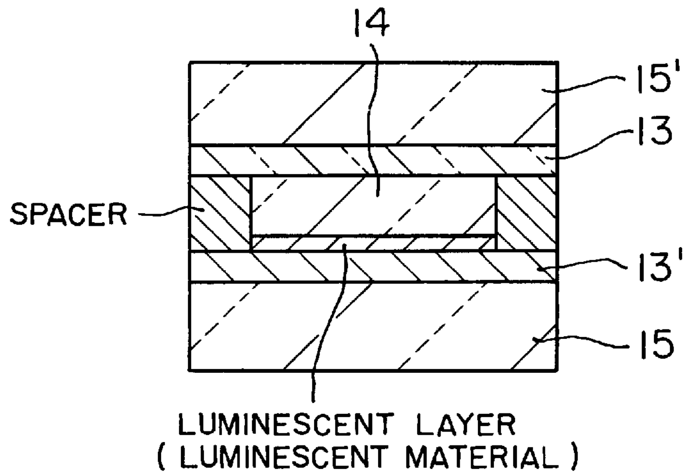
FIG. 10 is a typical diagram showing an electroluminescence device.

In the case of the layer construction as shown in FIGS. 9 and 10, the thickness of the luminescent layer (luminescent material) is such that the electron or hole transfer is not inhibited. The thickness of the luminescent layer is preferably 0.2 to 15 μm. The layer thickness may be regulated by incorporation of spacer particles in the material or by a sealing agent provided around the cell.

Figure 11:
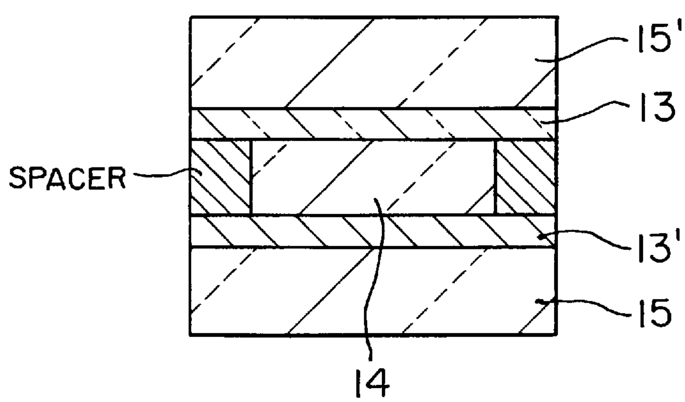
FIG. 11 is a typical diagram showing a temperature sensor.

FIG. 11 is an explanatory diagram showing a representative embodiment wherein the liquid crystalline charge transport material of the present invention has been applied to a temperature sensor. The temperature sensor comprises electrodes 13, 13' and the liquid crystalline charge transport material 14 of the present invention. A change in charge mobility with a temperature change, a change in conductivity with a temperature change, a change in conductivity at the time of light irradiation with a temperature change, a change in light transmission with a temperature change and the like may be utilized in the temperature sensor.

When the light irradiation is also used in the temperature sensor, the electrode material and the substrate should be transparent.

Figure 12:
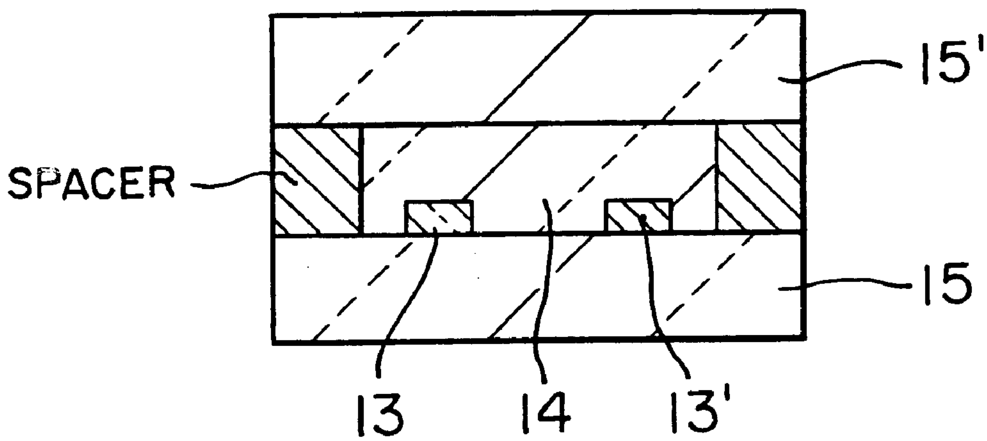
FIG. 12 is a typical diagram showing an electroluminescence device (an embodiment of an electrode pattern)
Figure 13:
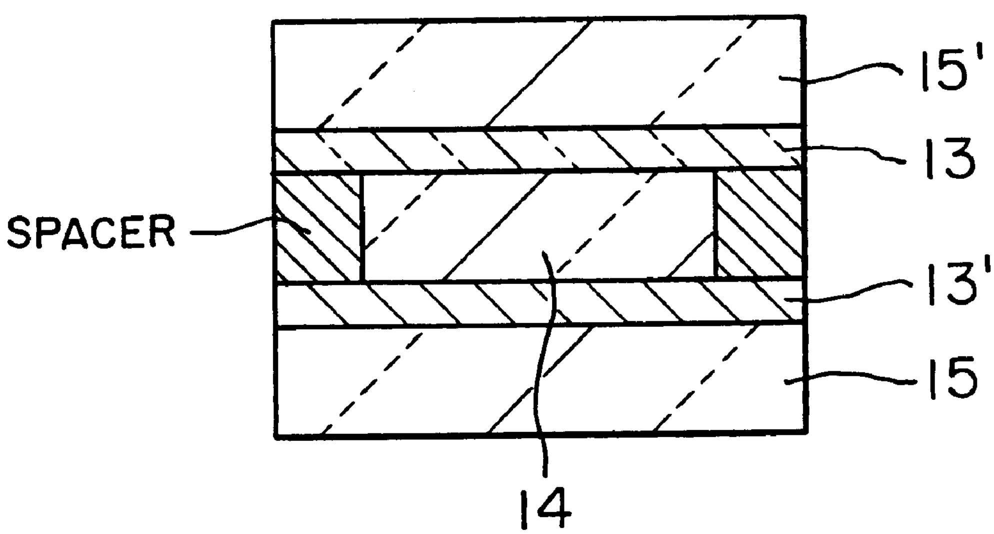
FIG. 13 is a typical diagram showing a photosensor.

FIGS. 12 and 13 are diagrams showing representative embodiments where the liquid crystalline charge transport material of the present invention has been applied to a photosensor. The photosensor comprises electrodes 13, 13' and the liquid crystalline charge transport material 14 of the present invention. A change in current value upon light irradiation may be utilized in the photosensor.

The following examples further illustrate the present invention but are not intended to limit it.

EXAMPLE 1

The hole carrier mobility of a benzothiazole compound liquid crystal (2-(4'-heptyloxyphenyl)-6-dodecylbenzothiazole, Crystal-90.3° C.-SmA-100.4° C.-Iso. ) was measured by the time-of-flight method and found to be $5\times10^{-3}$ $cm^2/v.s$ in smectic A phase.

EXAMPLE 2

The hole and electron carrier mobility of a naphthalene compound liquid crystal (2-(4'-octylphenyl )-6-dodecyloxynaphthalene, Crystal-79 .3° C.-$SmX_1$-100.4° C.-$SmX_2$-121.3° C.-Iso.) was measured and found to be $1.5\times10^{-3}$ $cm^2/v.s$ in smectic $X_1$ phase and $2.5\times10^{-4}$ $cm^2/v.s$ in smectic $X_2$ phase.

EXAMPLE 3

Two glass substrates each having an ITO electrode (surface electric resistance: 100–200 Ω/□) provided by vacuum film formation were laminated onto each other so that the ITO electrodes faced each other while providing a gap therebetween using spacer particles, thereby preparing a cell. A naphthalene compound liquid crystal (2-(4'-octylphenyl)-6-dodecyloxynaphthalene) was mixed with 1% by mole of a luminescent material (3-(2-benzothiazolyl)-7-(diethylamino)-2H-1-benzopyran-2-one (manufactured by Nihon Kanko Shikiso Kenkyusho (Japan Photosensitive Dye Laboratory), oscillating wavelength: 607–585 nm), and the mixture was poured at 125° C. into the cell. A d.c. electric field of 250 V was applied to the cell in a dark place. As a result, light emission derived from the fluorescent wavelength of the luminescent dye was observed.

EXAMPLE 4

A glass substrate having an ITO electrode (surface electric resistance: 100–200 Ω/□) provided by vacuum film formation and a glass substrate having a silver electrode (specific resistance: not more than 1 Ω/cm, layer thickness: 3000 Å) were laminated onto each other so that the electrodes faced each other while providing a gap therebetween using spacer particles, thereby preparing a cell. A naphthalene compound liquid crystal (2-(4'-octylphenyl)-6-dodecyloxynaphthalene) was mixed with 1% by mole of a luminescent material (3-(2-benzothiazolyl)-7-(diethylamino)-2H-1-benzopyran-2-one (manufactured by Nihon Kanko Shikiso Kenkyusho (Japan Photosensitive Dye Laboratory), oscillating wavelength: 607–685 nm), and the mixture was poured at 125° C. into the cell. A d.c. electric field of 250 V was applied to the cell in a dark place. As a result, light emission derived from the fluorescent wavelength of the luminescent dye was observed.

EXAMPLE 5

A cell was prepared in the same manner as in Example 4, except that a benzothiazole compound liquid crystal (2-(4'-heptyloxyphenyl)-6-dodecylbenzothiazole) was used as the liquid crystalline material and no luminescent material was used. A d.c. electric field of 250 V was applied to the cell. As a result, light emission derived from the liquid crystal was observed.

EXAMPLE 6

Figure 8:
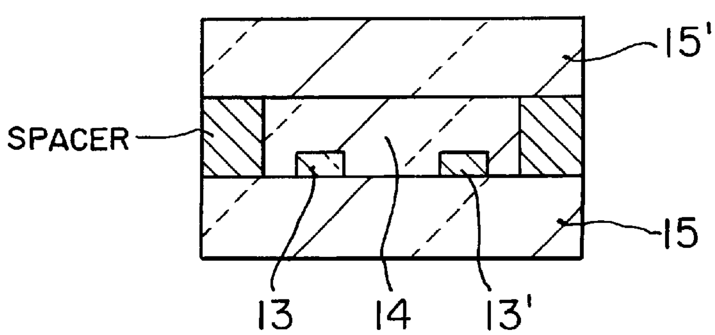
FIG. 8 is a typical diagram showing an electroluminescence device (an embodiment of an electrode pattern)

A cell having an electrode pattern shown in FIG. 8 was prepared using the same liquid crystalline material and luminescent material as used in Example 4. In this case, the liquid crystalline material was mixed with 1% by mole of the luminescent material, and the mixture was poured at 125° C. into the cell. A d.c. electric field of 250 V was applied to the cell in a dark place. As a result, light emission derived from the fluorescent wavelength of the luminescent dye was observed.

EXAMPLE 7

A cell having a layer construction shown in FIG. 9 was prepared using the same liquid crystalline material and luminescent material as used in Example 4. In this case, the liquid crystalline material was mixed with 1% by mole of the luminescent material, and the mixture was poured at 125° C. into the cell. A d.c. electric field of 250 V was applied to the cell in a dark place. As a result, light emission derived from the fluorescent wavelength of the luminescent dye was observed.

EXAMPLE 8

A cell having a layer construction shown in FIG. 10 was prepared using the same liquid crystalline material and luminescent material as used in Example 4. In this case, the liquid crystalline material was mixed with 1% by mole of the luminescent material, and the mixture was poured at 125° C. into the cell. A d.c. electric field of 250 V was applied to the cell in a dark place. As a result, light emission derived from the fluorescent wavelength of the luminescent dye was observed.

As described above, the liquid crystalline charge transport materials according to the present invention are useful for various applications such as photosensors, electroluminescence devices, photoconductors, space modulating devices, thin film transistors, and temperature sensors.

What is claimed is:

1. A liquid crystalline charge transport material that exhibits smectic liquid crystallinity and has an electron mobility of not less than $1\times10^{-5}$ cm2/v.s., said material having liquid crystalline molecules that have a self-aligning property and are used as a hopping site thereby to inhibit spatial and energetic dispersion and to exhibit a band-like transport property.

2. The liquid crystalline charge transport material according to claim 1 which has smectic liquid crystallinity and a hole mobility of not less than $1\times10^{-5}$ $cm^2$/v.s.

3. The liquid crystalline charge transport material according to claim 1, which has a core of (aromatic ring of 6π electron system) 1, (aromatic ring of 10π electron system) m, and (aromatic ring of 14π electron system) n (wherein 1+m+n=1 to 4 and 1, m, and n are an integer of 0 to 4).

4. The liquid crystalline charge transport material according to claim 3, wherein the aromatic ring of 6π electron system, 10π electron system or 14π electron system is linked through a group having a carbon-carbon double bond or a carbon-carbon triple bond.

5. An image display device comprising the material according to claim 1 in a drive path.

6. An electroluminescence device comprising the material according to claim 1 in a drive path.

7. A photoconductor comprising the material according to claim 1 in a drive path.

8. A space light modulating device comprising the material according to claim 1 in a drive path.

9. A thin film transistor comprising the material according to claim 1 in a drive path.

10. A temperature sensor comprising the material according to claim 1 in a drive path.

11. An optical sensor comprising the material according to claim 1 in a drive path.

* * * * *